US012307067B2

(12) United States Patent
Dryer et al.

(10) Patent No.: US 12,307,067 B2
(45) Date of Patent: May 20, 2025

(54) SYSTEMS, METHODS, AND GRAPHICAL USER INTERFACES FOR ANNOTATING, MEASURING, AND MODELING ENVIRONMENTS

(71) Applicant: Apple Inc., Cupertino, CA (US)

(72) Inventors: Allison W. Dryer, Tiburon, CA (US); Giancarlo Yerkes, San Carlos, CA (US); Grant R. Paul, San Francisco, CA (US); Lisa K Forssell, Palo Alto, CA (US); Joseph A. Malia, Isle of Wight (GB)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/382,444

(22) Filed: Oct. 20, 2023

(65) Prior Publication Data

US 2024/0045562 A1 Feb. 8, 2024

Related U.S. Application Data

(63) Continuation of application No. 17/344,846, filed on Jun. 10, 2021, now Pat. No. 11,797,146, which is a (Continued)

(51) Int. Cl.
*G06F 3/04815* (2022.01)
*G06F 3/03* (2006.01)
(Continued)

(52) U.S. Cl.
CPC ........ *G06F 3/04815* (2013.01); *G06F 3/0304* (2013.01); *G06F 3/0484* (2013.01); (Continued)

(58) Field of Classification Search
None
See application file for complete search history.

(56) References Cited

U.S. PATENT DOCUMENTS 7,072,810 B2 7/2006 Ramanathan et al.
8,244,462 B1 8/2012 Zhu
(Continued)

FOREIGN PATENT DOCUMENTS

AU 2018101226 A4 9/2018
AU 2019100486 A4 6/2019
(Continued)

OTHER PUBLICATIONS

Office Action, dated Dec. 22, 2023, received in Korean Patent Application No. 2020-0123687, which corresponds with U.S. Appl. No. 17/018,980, 9 pages.
(Continued)

*Primary Examiner* — Jeffrey J Chow
(74) *Attorney, Agent, or Firm* — Morgan, Lewis & Bockius LLP

(57) ABSTRACT

A system displays a representation of a camera field of view including a first portion of a physical environment, captures depth information indicative of a first subset of the first portion, and displays, overlaid on a portion of the representation of the field of view corresponding to the first subset, an indication of an extent of the first portion for which depth information has been captured. In response to detecting movement of the field of view, the system: updates the representation of the field of view to include a representation of a second portion of the physical environment; captures depth information indicative of a second subset of the second portion; and updates the indication to indicate an extent of the second portion for which depth information has been captured, including displaying the indication overlaid on a portion of the representation of the field of view corresponding to the second subset.

48 Claims, 209 Drawing Sheets

Related U.S. Application Data continuation of application No. 17/018,980, filed on Sep. 11, 2020, now Pat. No. 11,138,771.

(60) Provisional application No. 62/969,647, filed on Feb. 3, 2020.

(51) Int. Cl.

| | |
|---|---|
| ***G06F 3/048*** | (2013.01) |
| ***G06F 3/0482*** | (2013.01) |
| ***G06F 3/0484*** | (2022.01) |
| ***G06T 7/13*** | (2017.01) |
| ***G06T 7/55*** | (2017.01) |
| ***G06T 7/62*** | (2017.01) |
| ***G06T 11/20*** | (2006.01) |
| ***G06T 13/00*** | (2011.01) |
| ***G06T 19/00*** | (2011.01) |
| ***G06T 19/20*** | (2011.01) |
| ***G06V 20/20*** | (2022.01) |

(52) U.S. Cl.

CPC .................. *G06T 7/13* (2017.01); *G06T 7/55* (2017.01); *G06T 7/62* (2017.01); *G06T 11/203* (2013.01); *G06T 13/00* (2013.01); *G06T 19/006* (2013.01); *G06T 19/20* (2013.01); *G06V 20/20* (2022.01); *G06F 3/048* (2013.01); *G06F 3/0482* (2013.01); *G06T 2200/24* (2013.01); *G06T 2219/004* (2013.01); *G06T 2219/2004* (2013.01)

(56) References Cited

U.S. PATENT DOCUMENTS

| | | | | |
|---|---|---|---|---|
| 8,365,081 | B1 | 1/2013 | Amacher et al. | |
| 8,982,156 | B2 | 3/2015 | Maggiore | |
| 9,152,209 | B2 | 10/2015 | Jeong et al. | |
| 9,330,500 | B2 | 5/2016 | Karsch et al. | |
| 9,483,879 | B2 * | 11/2016 | Gourlay | G06T 19/20 |
| 9,495,794 | B2 | 11/2016 | Masumoto | |
| 9,661,308 | B1 | 5/2017 | Wang et al. | |
| 9,665,960 | B1 | 5/2017 | Masters et al. | |
| 9,678,651 | B2 | 6/2017 | Moha et al. | |
| 9,696,897 | B2 | 7/2017 | Garcia | |
| 9,767,606 | B2 | 9/2017 | Kapinos et al. | |
| 9,846,027 | B2 | 12/2017 | Kimura et al. | |
| 9,870,644 | B2 | 1/2018 | Ha et al. | |
| 9,953,434 | B2 | 4/2018 | Natori et al. | |
| 10,049,504 | B2 | 8/2018 | Chen et al. | |
| 10,074,179 | B2 | 9/2018 | Arita et al. | |
| 10,268,266 | B2 | 4/2019 | Mathey-Owens et al. | |
| 10,296,869 | B2 | 5/2019 | Hulth | |
| 10,347,033 | B2 | 7/2019 | Masumoto | |
| 10,445,867 | B2 | 10/2019 | Glatfelter et al. | |
| 10,540,699 | B1 | 1/2020 | Prabhu et al. | |
| 10,606,075 | B2 | 3/2020 | Choi et al. | |
| 10,606,609 | B2 | 3/2020 | Energin et al. | |
| 10,762,716 | B1 | 9/2020 | Paul et al. | |
| 10,861,241 | B2 | 12/2020 | Ghaleb | |
| 10,943,411 | B1 * | 3/2021 | Powers | G06T 7/74 |
| 10,972,680 | B2 | 4/2021 | Wigdor et al. | |
| 10,999,629 | B1 | 5/2021 | Cieslak et al. | |
| 11,204,678 | B1 | 12/2021 | Baker et al. | |
| 11,523,063 | B2 | 12/2022 | Ith et al. | |
| 2008/0008361 | A1 | 1/2008 | Nozaki et al. | |
| 2008/0222233 | A1 | 9/2008 | Shi et al. | |
| 2008/0255961 | A1 | 10/2008 | Livesey | |
| 2009/0002719 | A1 | 1/2009 | Chang et al. | |
| 2010/0235726 | A1 | 9/2010 | Ording | |
| 2011/0022942 | A1 | 1/2011 | Flemings et al. | |
| 2011/0107270 | A1 | 5/2011 | Wang et al. | |
| 2011/0216167 | A1 | 9/2011 | Katz et al. | |
| 2011/0249117 | A1 | 10/2011 | Yoshihama et al. | |
| 2011/0252405 | A1 | 10/2011 | Meirman et al. | |
| 2011/0279381 | A1 | 11/2011 | Tong et al. | |
| 2011/0279445 | A1 | 11/2011 | Murphy et al. | |
| 2011/0304607 | A1 | 12/2011 | Ito | |
| 2012/0121134 | A1 | 5/2012 | Yoshizumi | |
| 2012/0194544 | A1 | 8/2012 | Yokohata | |
| 2012/0249741 | A1 | 10/2012 | Maciocci et al. | |
| 2013/0044128 | A1 | 2/2013 | Liu et al. | |
| 2013/0127895 | A1 | 5/2013 | Miller et al. | |
| 2013/0215230 | A1 | 8/2013 | Miesnieks et al. | |
| 2013/0332892 | A1 | 12/2013 | Matsuki | |
| 2014/0071130 | A1 | 3/2014 | Piedmonte | |
| 2014/0098191 | A1 | 4/2014 | Rime et al. | |
| 2014/0125668 | A1 | 5/2014 | Steed et al. | |
| 2015/0062120 | A1 | 3/2015 | Reisner-Kollmann et al. | |
| 2015/0062123 | A1 | 3/2015 | Yuen | |
| 2015/0067588 | A1 | 3/2015 | Shim et al. | |
| 2015/0074711 | A1 | 3/2015 | Spitz et al. | |
| 2015/0169525 | A1 | 6/2015 | Palm et al. | |
| 2015/0187119 | A1 | 7/2015 | Masumoto | |
| 2015/0221345 | A1 | 8/2015 | Zhao et al. | |
| 2015/0227645 | A1 | 8/2015 | Childs et al. | |
| 2016/0026253 | A1 | 1/2016 | Bradski et al. | |
| 2016/0040981 | A1 | 2/2016 | Kang et al. | |
| 2016/0049011 | A1 | 2/2016 | Kasahara et al. | |
| 2016/0063714 | A1 | 3/2016 | Middleton et al. | |
| 2016/0086322 | A1 | 3/2016 | Arita et al. | |
| 2016/0147408 | A1 | 5/2016 | Bevis et al. | |
| 2016/0148433 | A1 | 5/2016 | Petrovskaya et al. | |
| 2016/0170624 | A1 | 6/2016 | Zambetti et al. | |
| 2016/0189426 | A1 | 6/2016 | Thomas et al. | |
| 2016/0329006 | A1 | 6/2016 | Weber et al. | |
| 2016/0210602 | A1 | 7/2016 | Siddique et al. | |
| 2016/0240011 | A1 | 8/2016 | Metaio et al. | |
| 2016/0363990 | A1 | 12/2016 | Key | |
| 2017/0021273 | A1 | 1/2017 | Rios | |
| 2017/0053621 | A1 | 2/2017 | Chen et al. | |
| 2017/0061696 | A1 | 3/2017 | Li et al. | |
| 2017/0115488 | A1 | 4/2017 | Ambrus et al. | |
| 2017/0132841 | A1 | 5/2017 | Morrison | |
| 2017/0212585 | A1 | 7/2017 | Kim et al. | |
| 2017/0220887 | A1 | 8/2017 | Fathi et al. | |
| 2017/0230641 | A1 | 8/2017 | Scavezz et al. | |
| 2017/0277670 | A1 | 9/2017 | Smith et al. | |
| 2017/0289221 | A1 | 10/2017 | Khalid et al. | |
| 2017/0316576 | A1 | 11/2017 | Colbert et al. | |
| 2017/0358142 | A1 | 12/2017 | Lee et al. | |
| 2017/0372510 | A1 | 12/2017 | Ye et al. | |
| 2018/0004283 | A1 | 1/2018 | Mathey-Owens et al. | |
| 2018/0088794 | A1 | 3/2018 | Graham et al. | |
| 2018/0114372 | A1 | 4/2018 | Nagy et al. | |
| 2018/0165888 | A1 | 6/2018 | Duan et al. | |
| 2018/0203561 | A1 | 7/2018 | Chang et al. | |
| 2018/0203581 | A1 | 7/2018 | Takeda | |
| 2018/0204385 | A1 | 7/2018 | Sarangdhar et al. | |
| 2018/0300952 | A1 | 10/2018 | Evans et al. | |
| 2018/0336732 | A1 | 11/2018 | Schuster | |
| 2018/0336737 | A1 | 11/2018 | Varady et al. | |
| 2019/0033058 | A1 | 1/2019 | Tsurumi | |
| 2019/0051054 | A1 | 2/2019 | Jovanovic et al. | |
| 2019/0065027 | A1 | 2/2019 | Hauenstein et al. | |
| 2019/0068889 | A1 | 2/2019 | Lee et al. | |
| 2019/0172261 | A1 | 6/2019 | Alt et al. | |
| 2019/0180082 | A1 | 6/2019 | Moravec et al. | |
| 2019/0180506 | A1 | 6/2019 | Gebbi et al. | |
| 2019/0180512 | A1 | 6/2019 | Fedosov et al. | |
| 2019/0213389 | A1 | 7/2019 | Peruch et al. | |
| 2019/0221035 | A1 | 7/2019 | Clark et al. | |
| 2019/0221041 | A1 | 7/2019 | Lin | |
| 2019/0310757 | A1 | 10/2019 | Lee et al. | |
| 2019/0311512 | A1 | 10/2019 | VanBlon et al. | |
| 2019/0333278 | A1 | 10/2019 | Palangie et al. | |
| 2019/0339058 | A1 | 11/2019 | Dryer et al. | |
| 2019/0339839 | A1 | 11/2019 | Paul, Sr. et al. | |
| 2019/0340799 | A1 | 11/2019 | Dryer et al. | |
| 2019/0355121 | A1 | 11/2019 | Nelson et al. | |
| 2019/0369404 | A1 | 12/2019 | Joshi et al. | |
| 2020/0005538 | A1 | 1/2020 | Neeter | |
| 2020/0020164 | A1 | 1/2020 | Coffman et al. | |
| 2020/0027201 | A1 | 1/2020 | Chen | |

(56) References Cited

U.S. PATENT DOCUMENTS

| | | | | |
|---|---|---|---|---|
| 2020/0053318 | A1 | 2/2020 | Li et al. | |
| 2020/0098140 | A1 | 3/2020 | Jagnow et al. | |
| 2020/0106965 | A1 | 4/2020 | Lam et al. | |
| 2020/0143593 | A1 | 5/2020 | Rudman et al. | |
| 2020/0184667 | A1 | 6/2020 | Miller et al. | |
| 2020/0200794 | A1 | 6/2020 | Niles et al. | |
| 2020/0232783 | A1 | 7/2020 | Dryer et al. | |
| 2020/0261799 | A1 | 8/2020 | Cahill et al. | |
| 2020/0312029 | A1 | 10/2020 | Heinen et al. | |
| 2020/0322595 | A1* | 10/2020 | Abe | H04N 13/383 |
| 2020/0382718 | A1 | 12/2020 | Malia et al. | |
| 2021/0004996 | A1 | 1/2021 | Murillo et al. | |
| 2021/0019946 | A1 | 1/2021 | Sonasath et al. | |
| 2021/0019953 | A1* | 1/2021 | Pekelny | G06T 7/32 |
| 2021/0096726 | A1 | 4/2021 | Faulkner et al. | |
| 2021/0097768 | A1 | 4/2021 | Malia et al. | |
| 2021/0097776 | A1 | 4/2021 | Faulkner et al. | |
| 2021/0174596 | A1 | 6/2021 | Zhang et al. | |
| 2021/0191600 | A1 | 6/2021 | Lemay et al. | |
| 2021/0158427 | A1 | 8/2021 | Jobetto et al. | |
| 2021/0241483 | A1 | 8/2021 | Dryer et al. | |
| 2021/0241505 | A1 | 8/2021 | Dryer et al. | |
| 2021/0254962 | A1 | 8/2021 | Dryer et al. | |
| 2021/0286502 | A1 | 9/2021 | Lemay et al. | |
| 2021/0295602 | A1 | 9/2021 | Scalpel et al. | |
| 2021/0304465 | A1 | 9/2021 | Dryer et al. | |
| 2022/0036648 | A1 | 2/2022 | Wang et al. | |
| 2022/0091722 | A1 | 3/2022 | Faulkner et al. | |
| 2022/0092861 | A1 | 3/2022 | Sharma et al. | |
| 2022/0130118 | A1 | 4/2022 | Malia et al. | |
| 2022/0239842 | A1 | 7/2022 | Malia et al. | |
| 2022/0276041 | A1 | 9/2022 | Dryer et al. | |
| 2022/0335697 | A1 | 10/2022 | Harding et al. | |
| 2023/0199296 | A1 | 6/2023 | Malia et al. | |
| 2023/0368458 | A1 | 11/2023 | Dryer et al. | |
| 2023/0386146 | A1 | 11/2023 | Scapel et al. | |
| 2024/0011764 | A1 | 1/2024 | Dryer et al. | |
| 2024/0153219 | A1 | 5/2024 | Queen et al. | |
| 2024/0273832 | A1 | 8/2024 | Newman et al. | |
| 2024/0290051 | A1 | 8/2024 | Malia et al. | |

FOREIGN PATENT DOCUMENTS

| | | | |
|---|---|---|---|
| CN | 1629888 | A | 6/2005 |
| CN | 102607423 | A | 7/2012 |
| CN | 103218854 | A | 7/2013 |
| CN | 105103198 | A | 11/2015 |
| CN | 105164999 | A | 12/2015 |
| CN | 105554247 | A | 5/2016 |
| CN | 105579946 | A | 5/2016 |
| CN | 105589199 | A | 5/2016 |
| CN | 105608746 | A | 5/2016 |
| CN | 106164934 | A | 11/2016 |
| CN | 106251185 | A | 12/2016 |
| CN | 106575299 | A | 4/2017 |
| CN | 112189220 | B | 1/2021 |
| EP | 1563370 | A | 8/2005 |
| EP | 2 394 714 | A1 | 12/2011 |
| EP | 2 983 139 | A1 | 2/2016 |
| EP | 2 988 486 | A1 | 2/2016 |
| EP | 3017591 | A1 | 5/2016 |
| JP | 6264665 | B2 | 11/2002 |
| JP | 2008-287691 | A | 11/2008 |
| JP | 2011-199560 | | 10/2011 |
| JP | 2011259243 | A | 12/2011 |
| JP | 2013-229672 | A | 11/2013 |
| JP | 2014-143453 | A | 8/2014 |
| JP | 2015-080199 | A | 4/2015 |
| JP | 2015146173 | A | 8/2015 |
| JP | 2016-110676 | A | 6/2016 |
| JP | 2017-536618 | A | 12/2017 |
| KR | 20100003252 | A | 1/2010 |
| KR | 20130108684 | A | 10/2013 |
| KR | 20150018828 | A | 2/2015 |
| KR | 101629134 | B1 | 6/2016 |
| KR | 20160141688 | A | 12/2016 |
| KR | 20170087501 | A | 7/2017 |
| KR | 20180066276 | A | 6/2018 |
| KR | 20210031894 | A | 3/2021 |
| KR | 20210081904 | A | 7/2021 |
| WO | WO 2011/029209 | A1 | 3/2011 |
| WO | WO 2013/096052 | A2 | 6/2013 |
| WO | WO 2013/099616 | A1 | 7/2013 |
| WO | WO 2013/176830 | A | 11/2013 |
| WO | WO 2014/013689 | A1 | 1/2014 |
| WO | WO 2014/157340 | A1 | 10/2014 |
| WO | WO 2014/197631 | A1 | 12/2014 |
| WO | WO 2016/017254 | A1 | 2/2016 |
| WO | WO 2017/134886 | | 8/2017 |
| WO | WO 2018/164932 | A | 9/2018 |
| WO | WO 2019/032736 | A1 | 2/2019 |
| WO | WO 2019/217148 | A1 | 11/2019 |
| WO | WO 2021/158427 | A1 | 8/2021 |

OTHER PUBLICATIONS

Office Action, dated Nov. 24, 2023, received in Korean Patent Application No. 2023-7019367, which corresponds with U.S. Appl. No. 17/307,957, 7 pages.

Office Action, dated Dec. 8, 2023, received in Japanese Patent Application No. 2022-142210, which corresponds with U.S. Appl. No. 17/344,846, 5 pages.

Office Action, dated Dec. 11, 2023, received in Korean Patent Application No. 2023-7012345, which corresponds with U.S. Appl. No. 17/716,984, 10 pages.

International Search Report and Written Opinion, dated Dec. 14, 2023, received in International Patent Application No. PCT/US2023/021563, which corresponds with U.S. Appl. No. 18/144,746, 29 pages.

Aakash G Technical, "App Review #1 / Measure—Tango AR / How to Use", https://www.youtube.com/watch?v=fj2iiOg36KE, May 13, 2017, 2 pages.

Anonymous, "How to Select Surface and Image Anchors", https:helpx.adobe.com/aeor/how-to-surface-and-image-anchors.html, Oct. 20, 2020, 6 pages.

Apple, "MeasureKit—AR ruler app for iOS 11", https://measurekit.com, Sep. 15, 2017, 10 pages.

Berthiaume, "Augmented Reality Scanning Enables Retail Innovation (Video)", https://www.scandit.com/gb/augmented-reality-scanning-enables-retail-innovation-video, Oct. 3, 2017, 5 pages.

Bhalwankar, "Triple Tap to Zoom Feature in Android Phones", https://www.youtube.com/watch?v=KInbLhA2jg8, Jan. 25, 2014, 2 pages.

Burns, "Google Measure it Demo with Tango", https://www.youtube.com/watch?v=b74VtGGJPBg, May 20, 2016, 2 pages.

IPhoneWave, "How to Use iPhone, [online]", http://web.archive.org/web/20111012000236/http:www.ipodwave.com:80/iphone/howto/camera_video.html, Oct. 12, 2011, 5 pages.

Jain et al., "OverLay: Practical Mobile Augmented Reality", Proceedings of the 13th Annual International conference on Mobile Systems, Applications, and Services. May 18, 2015, 14 pages.

LaanLabs, "AirMeasure—AR Tape & Ruler", https://itunes.apple.com/us/app/airmeasure-ar-tape-ruler/id1251282152, Jun. 4, 2018, 3 pages.

Laanlabs, "AirMeasure—The Augmented Reality Toolkit", https://www.youtube.com/watch?v=9ycpvj6hbdE, Sep. 12, 2017, 2 pages.

Langlotz et al., "Sketching up the World: in Situ Authoring for Mobile Augmented reality", http://mooslechner.infor/workperformed/at/smartphone2010.pdf, Jul. 27, 2011, 8 pages.

Lenovo, Lenovo Tech World 2016—Keynote Livestream from San Francisco, https://www.youtube.com/watch?v=MBgQLraVGJQ, Jun. 9, 2016, 2 pages.

Lenovo, "Lenovo_PHAB2_Pro_User_Guide V1.0", https://pcsupport.lenovo.com/do/en/products/tablets/phab-series/phab2-pro-documentation/doc_userguide, Aug. 29, 2017, 10 pages.

Lynch, "How to Zoom in On iPhone: The Quick Tutorial!", https://www.payetteforward.com/how-to-zoom-in-on-iphone-quck-tutorial, Feb. 26, 2018, 4 pages.

(56) References Cited

OTHER PUBLICATIONS

Mapletree Apps, "Apple ARKit iPhone Demo—Measure 3D Pro—Ruler on iOS (1)", https://www.youtube.com/watch?v=fzn3RsveJss, Oct. 1, 2017, 2 pages.
Mapletree Apps, "Apple ARKit iPhone Demo—Measure 3D Pro—Ruler on iOS (2)", https://www.youtube.com/watch?v=fzn3RsveJss, Oct. 1, 2017, 2 pages.
Mapletree Apps, "Measure 3D Tutorial series #1—How to Measure a Room", https://www.youtube.com/watch?v=HGV18HXXZqw, Apr. 19, 2018, 2 pages.
Mapletree Apps, Measure 3D Tutorial series #4—How to Measure Length in Horizonal and Vertical Planes, https://www.youtube.com/watch?V-2PjcbrgS50Q, Apr. 19, 2018, 2 pages.
Mapletree Appls, "Measure 3D Tutorial #5—How to Measure Rectangle Shapes", https://www.youtube.com/watch?v=8Gg0SMwkvQU, Apr. 19, 2018, 2 pages.
Marriott, Adobe Aero: Getting Started with AR/Tutorial, https://www.youtube.com/watch?v=EU2V8Pn0GE4, Nov. 19, 2019, 3 pages.
Miller, "Apple Shares Detailed Human Interface Guidelines for Developers Building ARKit Apps", https://9to5mac.com/2017/08/29/arkit-human-interface-guidelines/, Aug. 29, 2017, 5 pages.
Nuernberger et al., "SnapToReality: Aligning Augmented Reality to the Real World", http://eyalofek.org/Papers/CHI2016_Snap2Reality.pdf., May 7-12, 2016, 12 pages.
Occipital HQ, "TapMeasure Spatial Utility to Capture and Measure Your Space", https://www.youtube.com/watch?v=Hy1Ex2MAXM, Sep. 19, 2017, 2 pages.
SmartPicture, "PLNAR—Your AR Measurement Tool", https://www.youtube.com/watch?v=H_cqZqKLjws, Sep. 28, 2017, 2 pages.
SmarPicture Tech, "Mobile App Design for Bay Area—Rely on the Reinvently Agency", https://appadvice.com/app/plnar/1282049921, Sep. 21, 2018, 5 pages.
YouTube, "A1 Corner & Edge Detection (beta)", https://www.youtube.com/watch?v=YSNklighUtxA, Nov. 21, 2020, 2 pages.
YouTube, AR Measure—Automatic Measure in Augmented Reality, https://www.youtube.com/watch?v=70CQfH76vg4, Mar. 16, 2019, 2 pages.
YouTube, Huawei P30 Pro AR Measure / Measure length, depth, area and volume, hxos plus, https;//www.youtube.com/watch?v=0OX5QaK7YY, Mar. 26, 2019, 2 pages.
YouTube, Yes, I'm a Designer: "Designing an Augmented Reality Scene in Adobe Aero", https:www.youtube.com/watch?v=fo8aGOvCY7k, Jan. 27, 2020, 3 pages.
Office Action, dated Feb. 21, 2019, received in U.S. Appl. No. 16/145,015, 34 pages.
Notice of Allowance, dated Jun. 5, 2019, received in U.S. Appl. No. 16/145,015, 12 pages.
Office Action, dated Aug. 31, 2018, received in Danish Patent Application No. 201870350, which corresponds with U.S. Appl. No. 16/145,015, 11 pages.
Office Action, dated May 28, 2019, received in Danish Patent Application No. 201870350, which corresponds with U.S. Appl. No. 16/145,015, 6 pages.
Office Action, dated Feb. 21, 2020, received in Danish Patent Application No. 201870350, which corresponds with U.S. Appl. No. 16/145,015, 3 pages.
Notice of Allowance, dated Nov. 22, 2019, received in U.S. Appl. No. 16/138,779, 17 pages.
Office Action, dated Jul. 7, 2021, received in Australian Patent Application No. 2019267352, which corresponds with U.S. Appl. No. 16/138,779, 5 pages.
Office Action, dated Aug. 31, 2018, received in Danish Patent Application No. 201870351, which corresponds with U.S. Appl. No. 16/138,779, 11 pages.
Office Action, dated Feb. 13, 2020, received in Danish Patent Application No. 201870351, which corresponds with U.S. Appl. No. 16/138,779, 10 pages.
Office Action, dated Mar. 21, 2019, received in U.S. Appl. No. 16/145,025, 14 pages.
Final Office Action, dated Sep. 19, 2019, received in U.S. Appl. No. 16/145,025, 15 pages.
Office Action, dated Jun. 12, 2020, received in U.S. Appl. No. 16/145,025, 17 pages.
Final Office Action, dated Dec. 18, 2020, received in U.S. Appl. No. 16/145,025, 17 pages.
Notice of Allowance, dated Mar. 17, 2021, received in U.S. Appl. No. 16/145,025, 5 pages.
Innovation Patent, dated May 22, 2019, received in Australian Patent Application No. 2019100486, which corresponds with U.S. Appl. No. 16/138,779, 3 pages.
Certificate of Examination, dated Jul. 19, 2019, received in Australian Patent Application No. 2019100486, which corresponds with U.S. Appl. No. 16/138,779, 5 pages.
Office Action, dated Aug. 3, 2020, received in Chinese Patent Application No. 201910261469.3, which corresponds with U.S. Appl. No. 16/138,779, 5 pages.
Office Action, dated Jan. 20, 2021, received in Chinese Patent Application No. 201910261469.3, which corresponds with U.S. Appl. No. 16/138,779, 11 pages.
Notice of Allowance, dated Apr. 20, 2021, received in Chinese Patent Application No. 201910261469.3, which corresponds with U.S. Appl. No. 16/138,779, 6 pages.
Patent, dated Jul. 13, 2021, received in Chinese Patent Application No. 201910261469.3, which corresponds with U.S. Appl. No. 16/138,779, 6 pages.
Office Action, dated Sep. 28, 2018, received in Danish Patent Application No. 201870352, which corresponds with U.S. Appl. No. 16/145,025, 7 pages.
Office Action, dated Jan. 31, 2019, received in Danish Patent Application No. 201870352, which corresponds with U.S. Appl. No. 16/145,025, 4 pages.
Office Action, dated Sep. 16, 2019, received in Danish Patent Application No. 201870352, which corresponds with U.S. Appl. No. 16/145,025, 3 pages.
Office Action, dated Aug. 27, 2020, received in Danish Patent Application No. 201870352, which corresponds with U.S. Appl. No. 16/145,025, 2 pages.
Intention to Grant, dated Mar. 10, 2021, received in Danish Patent Application No. 201870352, which corresponds with U.S. Appl. No. 16/145,025, 2 pages.
Decision to Grant, dated Jul. 2, 2021, received in Danish Patent Application No. 201870352, which corresponds with U.S. Appl. No. 16/145,025, 2 pages.
Patent, dated Nov. 9, 2021, received in Danish Patent Application No. 201870352, which corresponds with U.S. Appl. No. 16/145,025, 3 pages.
Office Action, dated Jul. 17, 2019, received in European Patent Application No. 19159743.4, which corresponds with U.S. Appl. No. 16/145,025, 8 pages.
Office Action, dated Oct. 5, 2020, received in European Patent Application No. 19159743.4, which corresponds with U.S. Appl. No. 16/145,025, 6 pages.
Decision to Grant, dated Jun. 24, 2021, received in European Patent Application No. 19159743.4, which corresponds with U.S. Appl. No. 16/145,025, 2 pages.
Certificate of Grant, dated Aug. 13, 2021, received in European Patent Application No. 19159743.4, which corresponds with U.S. Appl. No. 16/145,025, 3 pages.
Office Action, dated Dec. 13, 2021, received in Japanese Patent Application No. 2020-562126, which corresponds with U.S. Appl. No. 16/145,025, 2 pages.
Notice of Allowance, dated May 30, 2022, received in Japanese Patent Application No. 2020-562126, which corresponds with U.S. Appl. No. 16/145,025, 2 pages.
Patent, dated Jun. 30, 2022, received in Japanese Patent Application No. 2020-562126, which corresponds with U.S. Appl. No. 16/145,025, 3 pages.
Notice of Allowance, dated May 15, 2020, received in U.S. Appl. No. 16/574,029, 10 pages.
Office Action, dated Jan. 20, 2022, received in Australian Patent Application No. 2019349408, which corresponds with U.S. Appl. No. 16/574,029, 3 pages.

(56) References Cited

OTHER PUBLICATIONS

Notice of Acceptance, dated Jul. 29, 2022, received in Australian Patent Application No. 2019349408, which corresponds with U.S. Appl. No. 16/574,029, 3 pages.
Notice of Allowance, dated Mar. 2, 2022, received in Chinese Patent Application No. 202110369762.9, which corresponds with U.S. Appl. No. 16/574,029, 7 pages.
Patent, dated Mar. 29, 2022, received in Chinese Patent Application No. 202110369762.9, which corresponds with U.S. Appl. No. 16/574,029, 6 pages.
Notice of Allowance, dated Apr. 25, 2022, received in Japanese Patent Application No. 2021-510765, which corresponds with U.S. Appl. No. 16/574,029, 2 pages.
Patent, dated May 12, 2022, received in Japanese Patent Application No. 2021-510765, which corresponds with U.S. Appl. No. 16/574,029, 3 pages.
Office Action, dated Dec. 29, 2022, received in Indian Patent Application No. 202117008282, which corresponds with U.S. Appl. No. 16/574,029, 10 pages.
Office Action, dated Feb. 24, 2023, received in Indian Patent Application No. 202118009402, which corresponds with U.S. Appl. No. 16/574,029, 7 pages.
Patent, dated Apr. 11, 2023, received in Korean Patent Application No. 2021-7005584, which corresponds with U.S. Appl. No. 16/574,029, 4 pages.
Office Action, dated Apr. 30, 2021, received in U.S. Appl. No. 17/030,209, 27 pages.
Office Action, dated Jan. 8, 2021, received in U.S. Appl. No. 17/018,958, 27 pages.
Notice of Allowance, dated Apr. 20, 2021, received in U.S. Appl. No. 17/018,958, 12 pages.
Office Action, dated Nov. 5, 2021, received in Australian Patent Application No. 2020239688, which corresponds with U.S. Appl. No. 17/018,958, 4 pages.
Notice of Allowance, dated Feb. 22, 2022, received in Australian Patent Application No. 2020239688, which corresponds with U.S. Appl. No. 17/018,958, 3 pages.
Office Action, dated Dec. 18, 2020, received in Danish Patent Application No. 202070602, which corresponds with U.S. Appl. No. 17/018,958, 10 pages.
Office Action, dated Mar. 14, 2022, received in Danish Patent Application No. 202070602, which corresponds with U.S. Appl. No. 17/018,958, 5 pages.
Office action, dated Dec. 3, 2021, received in Indian Patent Application No. 202014041448, which corresponds with U.S. Appl. No. 17/018,958, 10 pages.
Notice of Allowance, dated Dec. 20, 2021, received in Japanese Patent Application No. 2020-159787, which corresponds with U.S. Appl. No. 17/018,958, 2 pages.
Notice of Allowance, dated Feb. 18, 2022, received in Japanese Patent Application No. 2022-005327, which corresponds with U.S. Appl. No. 17/018,958, 2 pages.
Patent, dated Mar. 14, 2022, received in Japanese Patent Application No. 2022-005327, which corresponds with U.S. Appl. No. 17/018,958, 3 pages.
Office Action, dated Nov. 8, 2021, received in Korean Patent Application No. 2020-0124085, which corresponds with U.S. Appl. No. 17/018,958, 9 pages.
Notice of Allowance, dated Jul. 13, 2022, received in Korean Patent Application No. 2020-0124085, which corresponds with U.S. Appl. No. 17/018,958, 2 pages.
Office Action, dated Aug. 13, 2021, received in U.S. Appl. No. 17/202,233, 19 pages.
Final Office Action, dated Feb. 15, 2022, received in U.S. Appl. No. 17/202,233, 24 pages.
Office Action, dated Aug. 16, 2022, received in U.S. Appl. No. 17/202,233, 25 pages.
Office Action, dated Feb. 21, 2021, received in U.S. Appl. No. 16/841,550, 8 pages.
Notice of Allowance, dated May 4, 2021, received in U.S. Appl. No. 16/841,550, 12 pages.
Office Action, dated Jan. 22, 2021, received in U.S. Appl. No. 17/018,980, 17 pages.
Office Action, dated May 14, 2021, received in U.S. Appl. No. 17/018,980, 4 pages.
Notice of Allowance, dated May 28, 2021, received in U.S. Appl. No. 17/018,980, 5 pages.
Office Action, dated Aug. 20, 2021, received in Australian Patent Application No. 2020239675, which corresponds with U.S. Appl. No. 17/018,980, 4 pages.
Office Action, dated Dec. 16, 2021, received in Australian Patent Application No. 2020239675, which corresponds with U.S. Appl. No. 17/018,980, 2 pages.
Notice of Allowance, dated Jan. 21, 2022, received in Australian Patent Application No. 2020239675, which corresponds with U.S. Appl. No. 17/018,980, 3 pages.
Certificate of Grant, dated May 26, 2022, received in Australian Patent Application No. 2020239675, which corresponds with U.S. Appl. No. 17/018,980, 3 pages.
Office Action, dated Dec. 18, 2020, received in Danish Patent Application No. 202070603, which corresponds with U.S. Appl. No. 17/018,980, 9 pages.
Office Action, dated Feb. 25, 2022, received in Danish Patent Application No. 202070603, which corresponds with U.S. Appl. No. 17/018,980, 2 pages.
Office Action, dated Feb. 17, 2023, received in Danish Patent Application No. 202070603, which corresponds with U.S. Appl. No. 17/018,980, 4 pages.
Office Action, dated Aug. 10, 2021, received in Indian Patent Application No. 202014040937, which corresponds with U.S. Appl. No. 17/018,980, 7 pages.
Office Action, dated Dec. 20, 2021, received in Japanese Patent Application No. 2020-159788, which corresponds with U.S. Appl. No. 17/018,980, 2 pages.
Notice of Allowance, dated Feb. 18, 2022, received in Japanese Patent Application No. 2022-005328, which corresponds with U.S. Appl. No. 17/018,980, 2 pages.
Patent, dated Mar. 14, 2022, received in Japanese Patent Application No. 2022-005328, which corresponds with U.S. Appl. No. 17/018,980, 3 pages.
Office Action, dated Jan. 7, 2021, received in U.S. Appl. No. 17/018,994, 7 pages.
Notice of Allowance, dated Feb. 23, 2021, received in U.S. Appl. No. 17/018,994, 8 pages.
Office Action, dated Aug. 13, 2021, received in Australian Patent Application No. 2020239691, U.S. Appl. No. 17/018,994, 5 pages.
Office Action, dated Nov. 15, 2021, received in Australian Patent Application No. 2020239691, U.S. Appl. No. 17/018,994, 4 pages.
Notice of Allowance, dated Mar. 2, 2022, received in Australian Patent Application No. 2020239691, U.S. Appl. No. 17/018,994, 3 pages.
Office Action, dated Jan. 12, 2021, received in Danish Patent Application No. 2020-70604, which corresponds with U.S. Appl. No. 17/018,994, 8 pages.
Office Action, dated Feb. 4, 2022, received in Danish Patent Application No. 2020-70604, which corresponds with U.S. Appl. No. 17/018,994, 3 pages.
Office Action, dated Dec. 2, 2021, received in Indian Patent Application No. 202014041104, which corresponds with U.S. Appl. No. 17/018,994, 7 pages.
Office Action, dated Jan. 7, 2022, received in Japanese Patent Application No. 2020-159789, which corresponds with U.S. Appl. No. 17/018,994, 5 pages.
Office Action, dated Apr. 5, 2022, received in U.S. Appl. No. 17/307,957, 10 pages.
Notice of Allowance, dated May 4, 2022, received in U.S. Appl. No. 17/307,957, 12 pages.
Patent, dated Jan. 19, 2023, received in Australian Patent Application No. 2021240284, which corresponds with U.S. Appl. No. 17/307,957, 3 pages.
Office Action, dated Jul. 22, 2022, received in U.S. Appl. No. 17/344,846, 8 pages.

(56) References Cited

OTHER PUBLICATIONS

Final Office Action, dated Dec. 23, 2022, received in U.S. Appl. No. 17/344,846, 8 pages.
Notice of Allowance, dated Apr. 28, 2023, received in U.S. Appl. No. 17/344,846, 5 pages.
Office Action, dated Feb. 3, 2023, received in U.S. Appl. No. 17/568,624, 44 pages.
Office Action, dated May 17, 2023, received in U.S. Appl. No. 17/750,133, 23 pages.
European Search Report, dated Sep. 23, 2021, received in European Patent Application No. 21178349.3, which corresponds with U.S. Appl. No. 16/145,015, 4 pages.
Invitation to Pay Additional Fees, dated Jul. 15, 2019, received in International Patent Application No. PCT/US2019/029904, which corresponds with U.S. Appl. No. 16/145,015, 29 pages.
International Search Report and Written Opinion, dated Sep. 9, 2019, received in International Patent Application No. PCT/US2019/029904, which corresponds with U.S. Appl. No. 16/145,015, 31 pages.
European Search Report, dated Jul. 4, 2019, received in European Patent Application No. 19158743.4, which corresponds with U.S. Appl. No. 16/145,025, 4 pages.
Invitation to Pay Additional Fees, dated Dec. 12, 2019, received in International Patent Application No. U.S. Appl. No. 16/574,029, which corresponds with U.S. Appl. No. 16/574,029, 18 pages.
Invitation to Pay Additional Fees, dated Jan. 19, 2021, received in International Patent Application No. PCT/US2020/052641, which corresponds with U.S. Appl. No. 17/030,209, 15 pages.
Invitation to Pay Additional Fees, dated Jun. 23, 2021, received in International Patent Application No. PCT/US2021/022378, which corresponds with U.S. Appl. No. 17/200,676, 15 pages.
International Search Report and Written Opinion, dated Aug. 13, 2021, received in International Patent Application No. PCT/US2021/022378, which corresponds with U.S. Appl. No. 17/200,676, 19 pages.
Invitation to Pay Additional Fees, dated May 17, 2021, received in International Patent Application No. PCT/US2021/015556, which corresponds with U.S. Appl. No. 17/018,958, 19 pages.
International Search Report and Written Opinion, dated Jul. 8, 2021, received in International Patent Application No. PCT/US2021/015556, which corresponds with U.S. Appl. No. 17/018,958, 26 pages.
Perhiniak, "Yes I'm a Designer: Designing an Augmentged Reality Scene in Adobe Aero" https://wwwyoutube.com/watch?v=fo8a?G0, Jan. 27, 2020, 14 pages.
YouTube, "How Do I Use The iPhone Measure App? How Accurate Is It?", https://www.youtube.com/watch?v=RvhZ074Vs7c, Aug. 8, 2018, 3 pages.
YouTube, "Third Aurora: Adobe Aero Tutorial—How to get Started with Adobe Aero", https://www.youtube.com/watch?v=EU2v8P, Nov. 18, 2019, 3 pages.
Intention to Grant, dated Mar. 30, 2023, received in European Patent Application No. 21178349.3, which corresponds with U.S. Appl. No. 16/145,015, 8 pages.
Office Action, dated Sep. 19, 2023, received in European Patent Application No. 21178349.3, which corresponds with U.S. Appl. No. 16/145,015, 11 pages.
Notice of Acceptance, dated Aug. 9, 2021, received in Australian Patent Application No. 2019267352, which corresponds with U.S. Appl. No. 16/138,779, 3 pages.
Office Action, dated Oct. 26, 2022, received in Korean Patent Application No. 2020-7032392, which corresponds with U.S. Appl. No. 16/145,025, 5 pages.
Notice of Allowance, dated May 19, 2023, received in Korean Patent Application No. 2020-7032392, which corresponds with U.S. Appl. No. 16/145,025, 2 pages.
Patent, dated Jun. 8, 2023, received in Korean Patent Application No. 2020-7032392, which corresponds with U.S. Appl. No. 16/145,025, 4 pages.
Office Action, dated Sep. 20, 2022, received in Indian Patent Application No. 202017052984, which corresponds with U.S. Appl. No. 16/145,025, 11 pages.
Office Action, dated Jul. 6, 2022, received in Korean Patent Application No. 2021-7005584, which corresponds with U.S. Appl. No. 16/574,029, 13 pages.
Notice of Allowance, dated Mar. 22, 2023, received in Korean Patent Application No. 2021-7005584, which corresponds with U.S. Appl. No. 16/574,029, 2 pages.
Office Action, dated Aug. 13, 2021, received in Australian Patent Application No. 2020239688, which corresponds with U.S. Appl. No. 17/018,958, 4 pages.
Certificate of Grant, dated Jun. 23, 2022, received in Australian Patent Application No. 2020239688, which corresponds with U.S. Appl. No. 17/018,958, 4 pages.
Office Action, dated Nov. 14, 2022, received in Danish Patent Application No. 202070602, which corresponds with U.S. Appl. No. 17/018,958, 2 pages.
Patent, dated Jul. 22, 2022, received in Korean Patent Application No. 2020-0124085, which corresponds with U.S. Appl. No. 17/018,958, 4 pages.
Notice of Allowance, dated Mar. 22, 2023, received in U.S. Appl. No. 17/202,233, 8 pages.
Notice of Allowance, dated Dec. 7, 2021, received in U.S. Appl. No. 16/997,860, 10 pages.
Office Action, dated Nov. 2, 2022, received in Danish Patent Application No. 2020-70604, which corresponds with U.S. Appl. No. 17/018,994, 3 pages.
Notice of Allowance, dated Aug. 8, 2022, received in Japanese Patent Application No. 2020-159789, which corresponds with U.S. Appl. No. 17/018,994, 1 page.
Office Action, dated Sep. 14, 2023, received in U.S. Appl. No. 17/720,227, 5 pages.
Patent, dated Sep. 9, 2022, received in Japanese Patent Application No. 2020-159789, which corresponds with U.S. Appl. No. 17/018,994, 3 pages.
Office Action, dated Aug. 31, 2022, received in Australian Patent Application No. 2021240284, which corresponds with U.S. Appl. No. 17/307,957, 2 pages.
Notice of Allowance, dated Sep. 14, 2022, received in Australian Patent Application No. 2021240284, which corresponds with U.S. Appl. No. 17/307,957, 3 pages.
Office Action, dated Nov. 2, 2022, received in Chinese Patent Application No. 202110660753.5, 2 pages.
Patent, dated Jun. 20, 2023, received in Chinese Patent Application No. 202110660753.5, 7 pages.
Office Action, dated Sep. 1, 2023, received in Japanese Patent Application No. 2022-103836, which corresponds with U.S. Appl. No. 17/307,957, 2 pages.
Office Action, dated Mar. 29, 2023, received in Australian Patent Application No. 2022202851, which corresponds with U.S. Appl. No. 17/344,846, 3 pages.
Noticed of Allowance, dated Dec. 7, 2022, received in U.S. Appl. No. 17/716,984, 10 pages.
Office Action, dated Sep. 4, 2023, received in Australian Patent Application No. 2022235625, which corresponds with U.S. Appl. No. 17/568,624, 3 pages.
Office Action, dated Jun. 2, 2023, received in Japanese Patent Application No. 2022-077644, which corresponds with U.S. Appl. No. 17/716,984, 6 pages.
Notice of Allowance, dated Jun. 28, 2023, received in U.S. Appl. No. 17/750,133, 10 pages.
Office Action, dated Jul. 5, 2023, received in Australian Patent Application No. 2022231686, which corresponds with U.S. Appl. No. 17/750,133, 2 pages.
Notice of Allowance, dated Jul. 6, 2023, received in U.S. Appl. No. 18/107,381, 24 pages.
International Search Report and Written Opinion, dated Feb. 5, 2020, received in International Patent Application No. PCT/US2019052140, which corresponds with U.S. Appl. No. 16/574,029, 22 pages.

(56) References Cited

OTHER PUBLICATIONS

International Search Report and Written Opinion, dated Mar. 12, 2021, received in International Patent Application No. PCT/US2020/052641, which corresponds with U.S. Appl. No. 17/030,209, 21 pages.
Invitation to Pay Additional Fees, dated Jul. 26, 2022, received in International Patent Application No. PCT/US2022/024894, which corresponds with U.S. Appl. No. 17/720,227, 34 pages.
Invitation to Pay Additional Fees, dated Oct. 5, 2023, received in International Patent Application No. PCT/US2023/021563, which corresponds with U.S. Appl. No. 18/144,746, 19 pages.
Notice of Allowance, dated Sep. 13, 2021, received in U.S. Appl. No. 17/030,209, 9 pages.
Notice of Allowance, dated Nov. 13, 2023, received in U.S. Appl. No. 17/720,227, 5 pages.
Final Office Action, dated May 15, 2023, received in U.S. Appl. No. 17/568,624, 31 pages.
Office Action, dated Oct. 27, 2023, received in U.S. Appl. No. 17/568,624, 33 pages.
Final Office Action, dated Jun. 2, 2023, received in Japanese Patent Application No. 2022-077644, which corresponds with U.S. Appl. No. 17/716,984, 4 pages.
Fukiage et al., "Reduction of Contradictory Partial Occlusion in Mixed Reality by Using Characteristics of Transparency Perception", 2012 IEEE International Symposium On, IEEE, Nov. 5, 2012, 11 pages.
Joaquim, et al., "Dynamic Occlusion Handling for Real-Time AR Applications", https://doi.org/10.1145335/99973365700, Nov. 2019, 10 pages.
Office action, dated Sep. 30, 2024, received in Indian Patent Application No. 202014041448, which corresponds with U.S. Appl. No. 17/018,958, 8 pages.
Patent, dated Sep. 23, 2024, received in Indian Patent Application No. 202014041104, which corresponds with U.S. Appl. No. 17/018,994, 6 pages.
Final Office Action, dated Jul. 5, 2024, received in Korean Patent Application No. 2023-7019367, which corresponds with U.S. Appl. No. 17/307,957, 3 pages.
Grant Certificate, dated Jul. 25, 2024, received in Australian Patent Application No. 2022202851, which corresponds with U.S. Appl. No. 17/344,846, 3 pages.
Grant Certificate, dated Jul. 25, 2024, received in Australian Patent Application No. 2022235625, which corresponds with U.S. Appl. No. 17/568,624, 3 pages.
Office Action, dated Nov. 5, 2024, received in Japanese Patent Application No. 2022-077644, which corresponds with U.S. Appl. No. 17/716,984, 17 pages.
Office Action, dated Sep. 23, 2024, received in Korean Patent Application No. 2023-7012345, which corresponds with U.S. Appl. No. 17/716,984, 5 pages.
Certificate of Grant, dated Jun. 13, 2024, received in Australian Patent Application No. 2022231686, which corresponds with U.S. Appl. No. 17/750,133, 3 pages.
Intent to Grant, dated Oct. 14, 2024, received in European Patent Application No. 24151350.6, 11 pages.
Notice of Allowance, dated Aug. 7, 2024, received in U.S. Appl. No. 18/372,606, 7 pages.
Office Action, dated Sep. 6, 2024, received in U.S. Appl. No. 18/219,627, 17 pages.
Notice of Allowance, dated Jun. 13, 2024, received in U.S. Appl. No. 18/388,176, 10 pages.
Office Action, dated Aug. 14, 2024, received in U.S. Appl. No. 18/412,251, 10 pages.
Office Action, dated May 23, 2024, received in European Patent Application No. 21717681.7, which corresponds with U.S. Appl. No. 17/202,233, 6 pages.
Notice of Allowance, dated Mar. 5, 2024, received in Japanese Patent Application No. 2022-103836, which corresponds with U.S. Appl. No. 17/307,957, 1 page.
Notice of Allowance, dated Mar. 25, 2024, received in Australian Patent Application No. 2022202851, which corresponds with U.S. Appl. No. 17/344,846, 3 pages.
Patent, dated May 13, 2024, received in Japanese Patent Application No. 2022-142210, which corresponds with U.S. Appl. No. 17/344,846, 3 pages.
Notice of Allowance, dated Feb. 15, 2024, received in U.S. Appl. No. 17/568,624, 8 pages.
Notice of Allowance, dated Mar. 25, 2024, received in Australian Patent Application No. 2022235625, which corresponds with U.S. Appl. No. 17/568,624, 3 pages.
Notice of Allowance, dated Feb. 9, 2024, received in Australian Patent Application No. 2022231686, which corresponds with U.S. Appl. No. 17/750,133, 3 pages.
Office Action, dated Apr. 24, 2024, received in U.S. Appl. No. 18/372,606, 8 pages.
Extended European Search Report, dated Apr. 26, 2024, received in European Patent Application No. 24151350.6, which corresponds with U.S. Appl. No. 17/750,133, 8 pages.
Office Action, dated Dec. 23, 2024, received in Indian Patent Application No. 202118009402, which corresponds with U.S. Appl. No. 16/574,029, 3 pages.
Notice of Allowance, dated Dec. 4, 2024, received in Korean Patent Application No. 2020-0123687, which corresponds with U.S. Appl. No. 17/018,980, 3 pages.
Notice of Allowance, dated Nov. 7, 2024, received in Korean Patent Application No. 2023-7019367, which corresponds with U.S. Appl. No. 17/307,957, 3 pages.
Office Action, dated Mar. 20, 2025, received in U.S. Appl. No. 18/144,746, 22 pages.
Patent, dated Mar. 11, 2025, received in Indian Patent Application No. 202017052984, which corresponds with U.S. Appl. No. 16/145,025, 4 pages.
Patent, dated Mar. 21, 2025, received in Indian Patent Application No. 202118009402, which corresponds with U.S. Appl. No. 16/574,029, 4 pages.
Office Action, dated Mar. 4, 2025, received in Japanese Patent Application No. 2024-026846, which corresponds with U.S. Appl. No. 16/997,860, 7 pages.
Office Action, dated Jan. 16, 2025, received in Chinese Patent Application No. 202210629947.3, which corresponds with U.S. Appl. No. 17/030,209, 2 pages.
Patent, dated Feb. 27, 2025, received in Indian Patent Application No. 202014041448, which corresponds with U.S. Appl. No. 17/018,958, 6 pages.
Patent, dated Feb. 6, 2025, received in Korean Patent Application No. 2023-7019367, which corresponds with U.S. Appl. No. 17/307,957, 4 pages.
Decision to Grant, dated Feb. 20, 2025, received in European Patent Application No. 24151350.6, 7 pages.
Final Office Action, dated Jan. 17, 2025, received in U.S. Appl. No. 18/219,627, 19 pages.
Office Action, dated Feb. 27, 2025, received in U.S. Appl. No. 18/656,318, 15 pages.

* cited by examiner

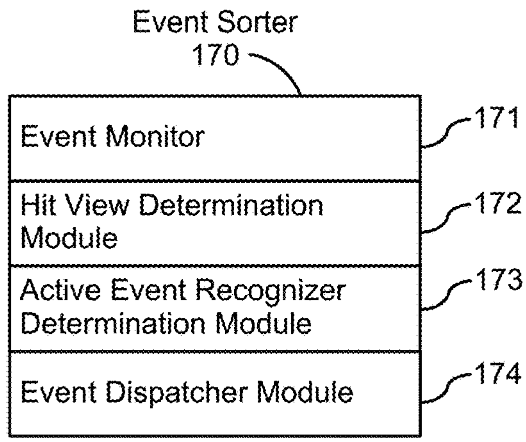
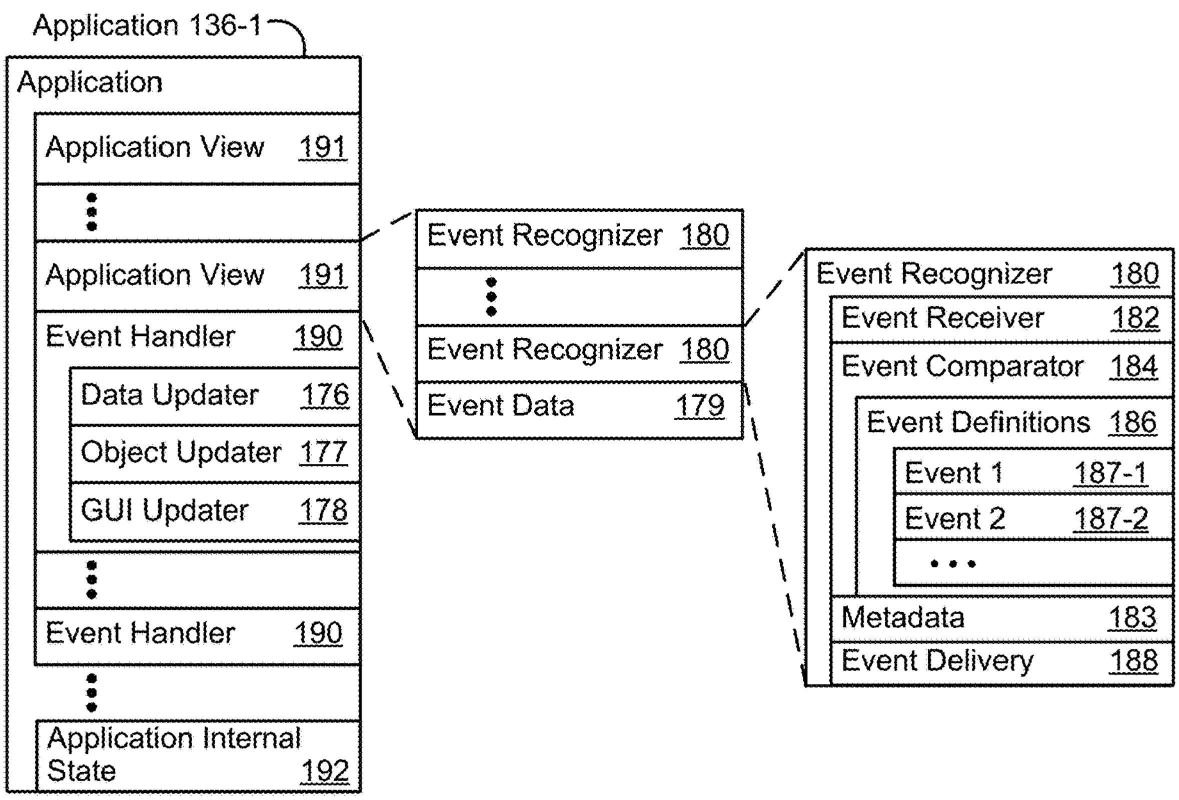
Figure 1B

594

593-2

599

Figure 8A:
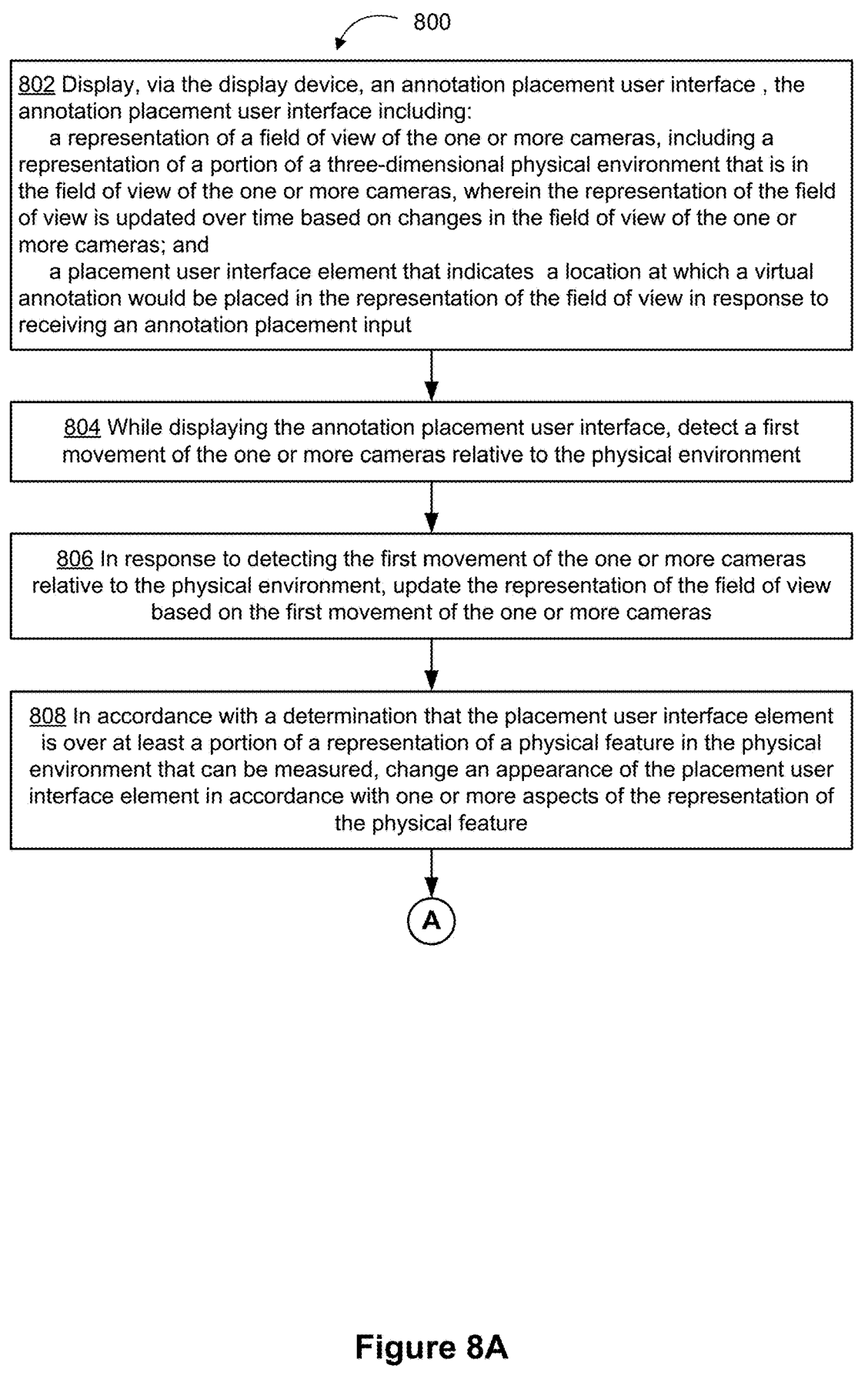

800

802 Display, via the display device, an annotation placement user interface , the annotation placement user interface including:
a representation of a field of view of the one or more cameras, including a representation of a portion of a three-dimensional physical environment that is in the field of view of the one or more cameras, wherein the representation of the field of view is updated over time based on changes in the field of view of the one or more cameras; and
a placement user interface element that indicates a location at which a virtual annotation would be placed in the representation of the field of view in response to receiving an annotation placement input 804 While displaying the annotation placement user interface, detect a first movement of the one or more cameras relative to the physical environment 806 In response to detecting the first movement of the one or more cameras relative to the physical environment, update the representation of the field of view based on the first movement of the one or more cameras 808 In accordance with a determination that the placement user interface element is over at least a portion of a representation of a physical feature in the physical environment that can be measured, change an appearance of the placement user interface element in accordance with one or more aspects of the representation of the physical feature

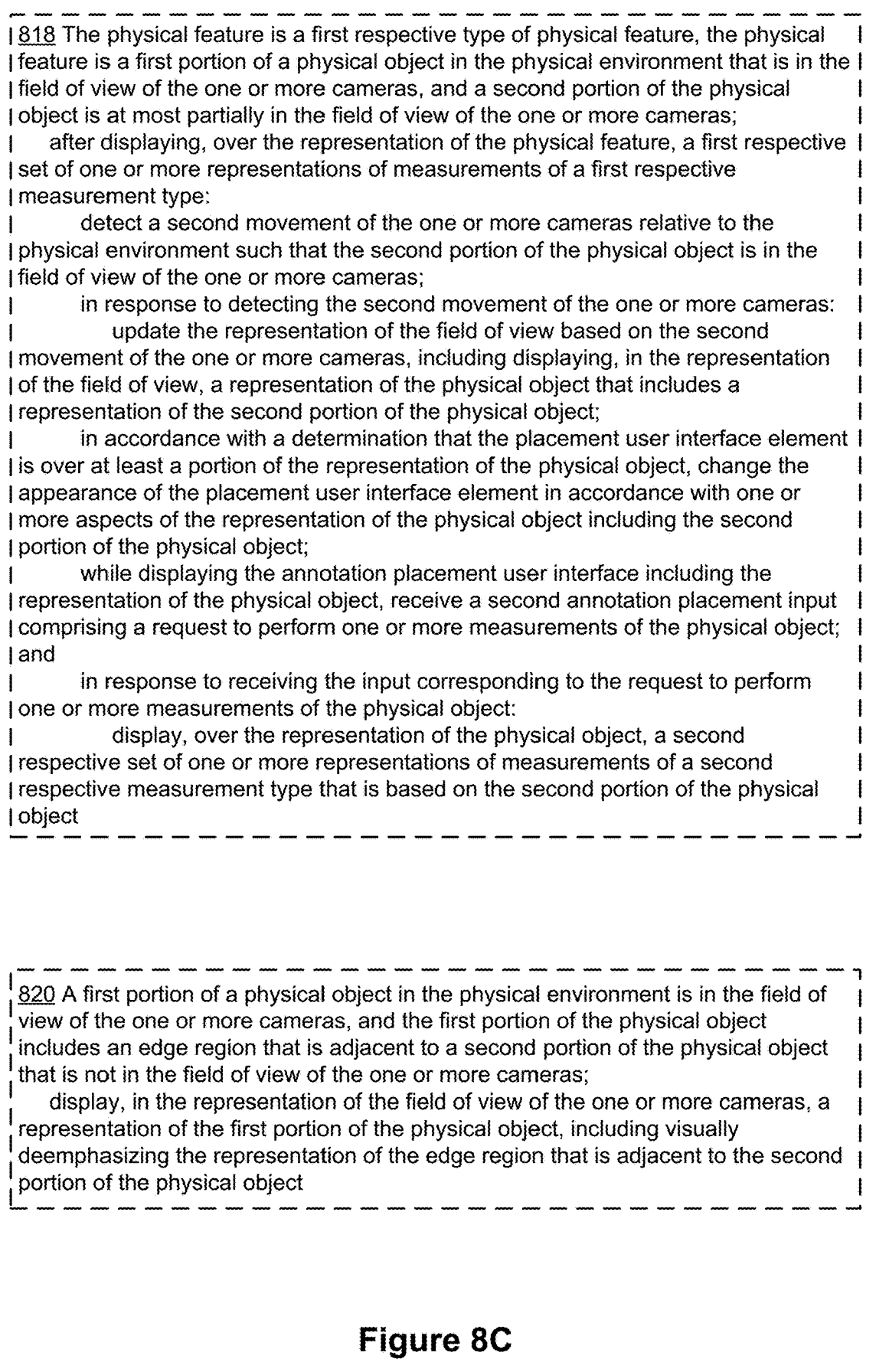

818 The physical feature is a first respective type of physical feature, the physical feature is a first portion of a physical object in the physical environment that is in the field of view of the one or more cameras, and a second portion of the physical object is at most partially in the field of view of the one or more cameras;

after displaying, over the representation of the physical feature, a first respective set of one or more representations of measurements of a first respective measurement type:

detect a second movement of the one or more cameras relative to the physical environment such that the second portion of the physical object is in the field of view of the one or more cameras;

in response to detecting the second movement of the one or more cameras:

update the representation of the field of view based on the second movement of the one or more cameras, including displaying, in the representation of the field of view, a representation of the physical object that includes a representation of the second portion of the physical object;

in accordance with a determination that the placement user interface element is over at least a portion of the representation of the physical object, change the appearance of the placement user interface element in accordance with one or more aspects of the representation of the physical object including the second portion of the physical object;

while displaying the annotation placement user interface including the representation of the physical object, receive a second annotation placement input comprising a request to perform one or more measurements of the physical object; and in response to receiving the input corresponding to the request to perform one or more measurements of the physical object:

display, over the representation of the physical object, a second respective set of one or more representations of measurements of a second respective measurement type that is based on the second portion of the physical object 820 A first portion of a physical object in the physical environment is in the field of view of the one or more cameras, and the first portion of the physical object includes an edge region that is adjacent to a second portion of the physical object that is not in the field of view of the one or more cameras;

display, in the representation of the field of view of the one or more cameras, a representation of the first portion of the physical object, including visually deemphasizing the representation of the edge region that is adjacent to the second portion of the physical object

Figure 8C

822 The determination that the physical feature is the first type of physical feature includes a determination that the physical feature is a piece of furniture, and the measurements of the first measurement type include one or more of: a height, a width, a depth, and a volume of the physical feature.

824 The determination that the physical feature is the first type of physical feature includes a determination that the physical feature is a person, and the measurements of the first measurement type include a distance between a base of the person and a top of the person 826 The determination that the physical feature is the first type of physical feature includes a determination that the physical feature is an animal, and the measurements of the first measurement type include one or more of: a neck circumference of the animal, a chest circumference of the animal, and a length of the animal 828 The determination that the physical feature is the first type of physical feature includes a determination that the physical feature is a face of a person, and the measurements of the first measurement type include a distance between a first pupil of a first eye of the person and a second pupil of a second eye of the person 830 The determination that the physical feature is the first type of physical feature includes a determination that the physical feature is a foot of a person, and the measurements of the first measurement type include a length of the foot 832 The determination that the physical feature is the first type of physical feature includes a determination that the physical feature includes a first hand and a second hand separated in space, and the measurements of the first measurement type include a distance between the first hand and the second hand

Figure 8D

Figure 8E:
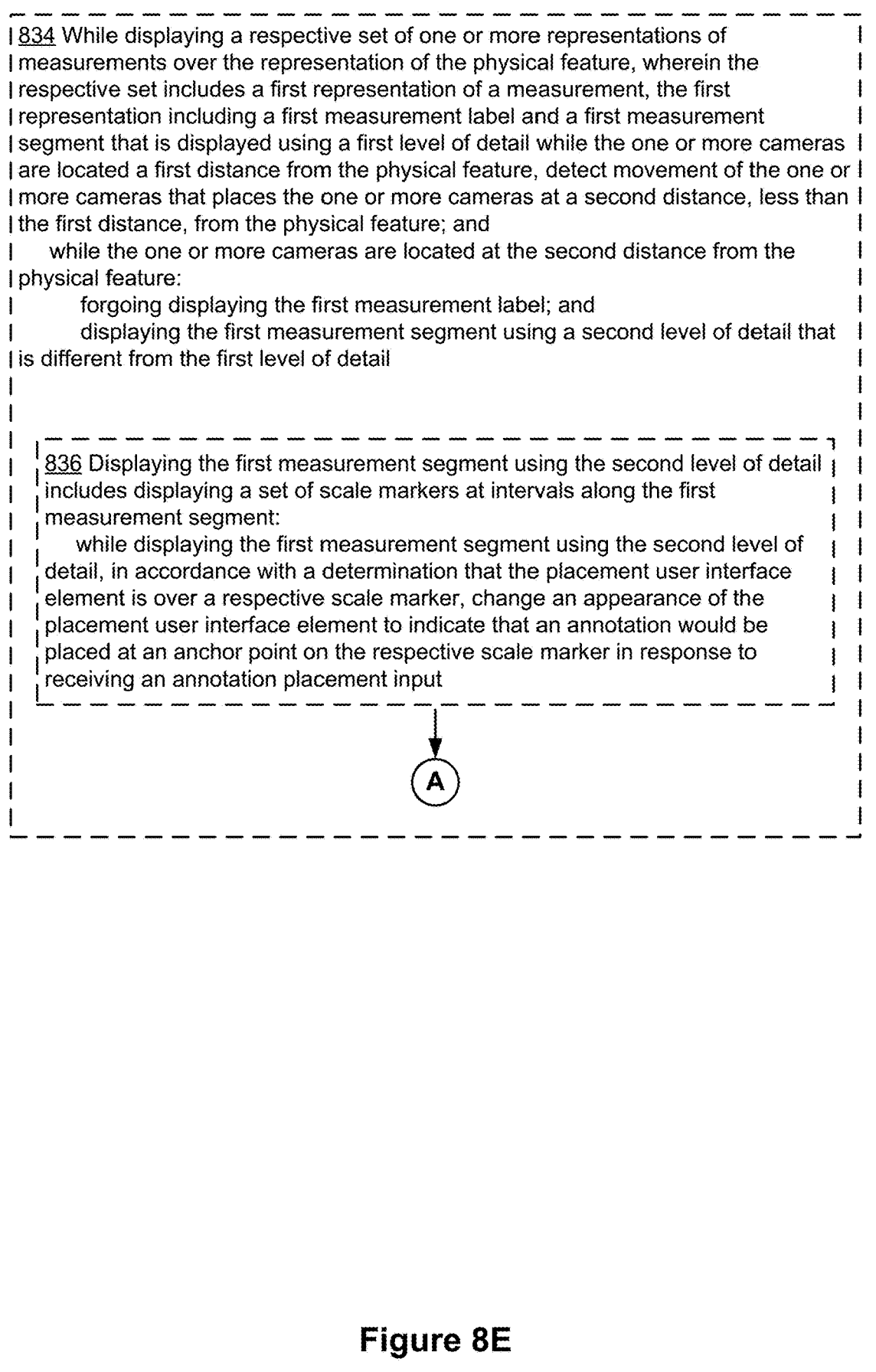

834 While displaying a respective set of one or more representations of measurements over the representation of the physical feature, wherein the respective set includes a first representation of a measurement, the first representation including a first measurement label and a first measurement segment that is displayed using a first level of detail while the one or more cameras are located a first distance from the physical feature, detect movement of the one or more cameras that places the one or more cameras at a second distance, less than the first distance, from the physical feature; and while the one or more cameras are located at the second distance from the physical feature:

forgoing displaying the first measurement label; and displaying the first measurement segment using a second level of detail that is different from the first level of detail 836 Displaying the first measurement segment using the second level of detail includes displaying a set of scale markers at intervals along the first measurement segment:

while displaying the first measurement segment using the second level of detail, in accordance with a determination that the placement user interface element is over a respective scale marker, change an appearance of the placement user interface element to indicate that an annotation would be placed at an anchor point on the respective scale marker in response to receiving an annotation placement input

Figure 8F:
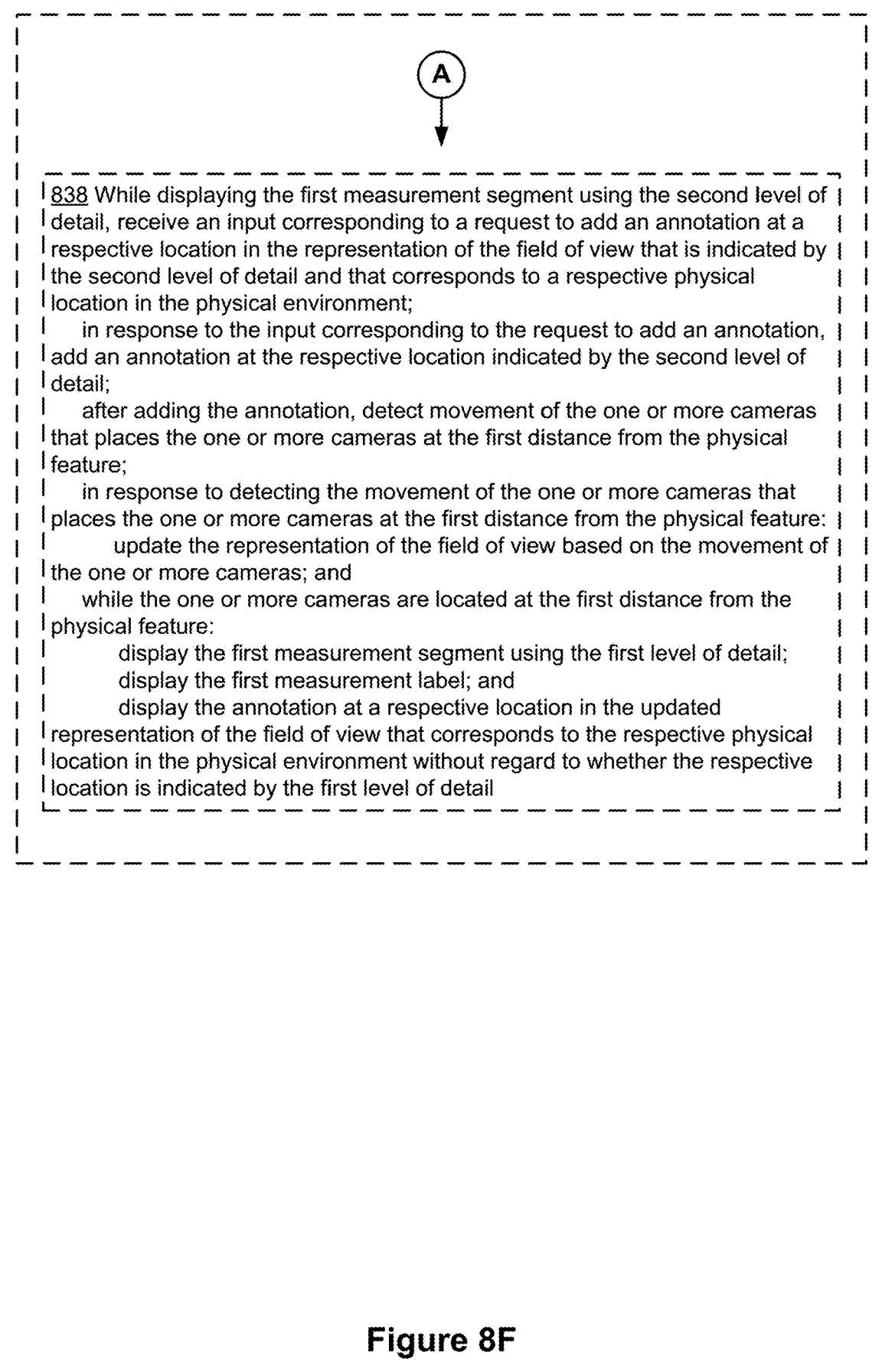

838 While displaying the first measurement segment using the second level of detail, receive an input corresponding to a request to add an annotation at a respective location in the representation of the field of view that is indicated by the second level of detail and that corresponds to a respective physical location in the physical environment;

in response to the input corresponding to the request to add an annotation, add an annotation at the respective location indicated by the second level of detail;

after adding the annotation, detect movement of the one or more cameras that places the one or more cameras at the first distance from the physical feature;

in response to detecting the movement of the one or more cameras that places the one or more cameras at the first distance from the physical feature:

update the representation of the field of view based on the movement of the one or more cameras; and while the one or more cameras are located at the first distance from the physical feature:

display the first measurement segment using the first level of detail;

display the first measurement label; and display the annotation at a respective location in the updated representation of the field of view that corresponds to the respective physical location in the physical environment without regard to whether the respective location is indicated by the first level of detail

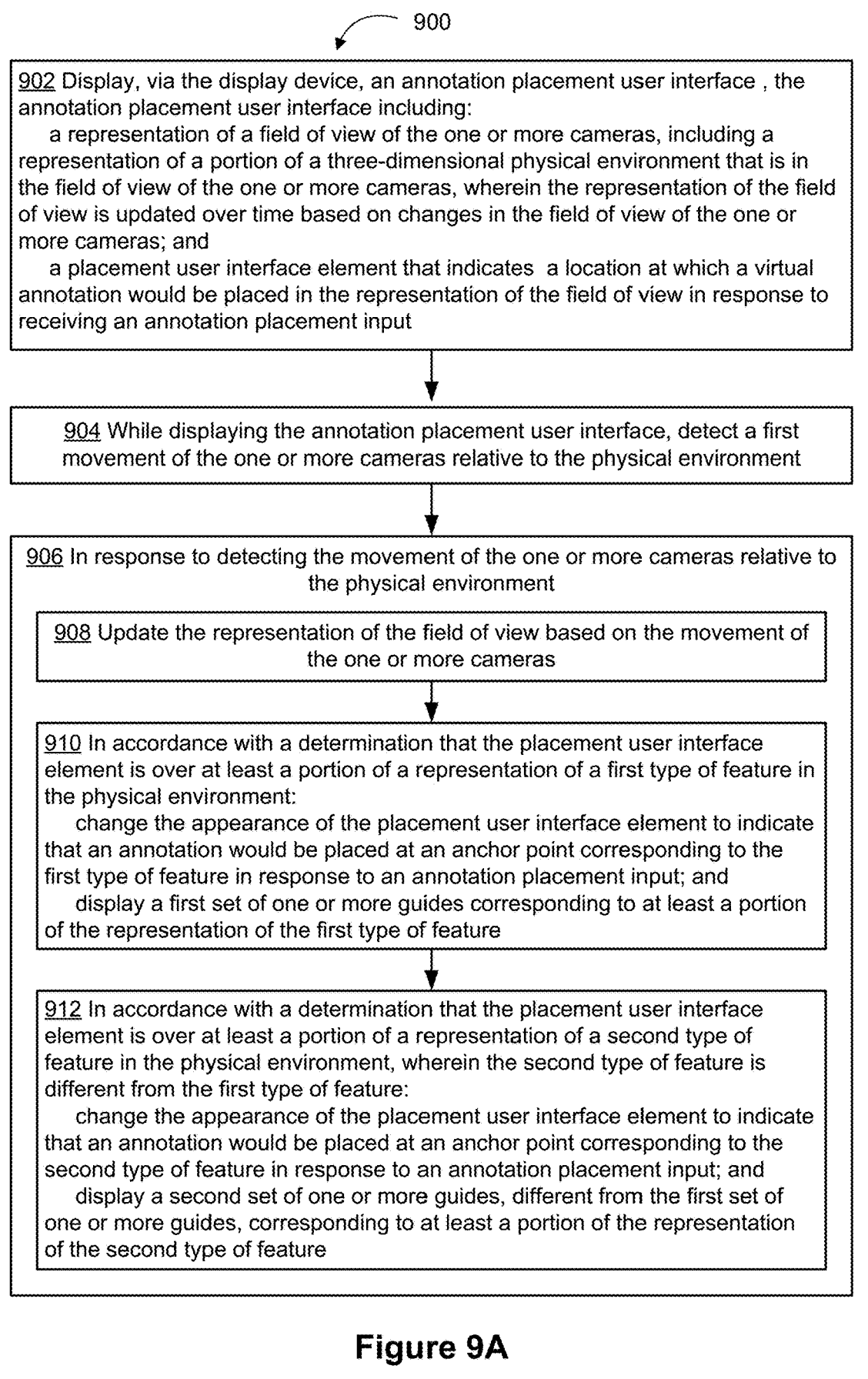

902 Display, via the display device, an annotation placement user interface , the annotation placement user interface including:
a representation of a field of view of the one or more cameras, including a representation of a portion of a three-dimensional physical environment that is in the field of view of the one or more cameras, wherein the representation of the field of view is updated over time based on changes in the field of view of the one or more cameras; and
a placement user interface element that indicates a location at which a virtual annotation would be placed in the representation of the field of view in response to receiving an annotation placement input

↓

904 While displaying the annotation placement user interface, detect a first movement of the one or more cameras relative to the physical environment

↓

906 In response to detecting the movement of the one or more cameras relative to the physical environment 908 Update the representation of the field of view based on the movement of the one or more cameras

↓

910 In accordance with a determination that the placement user interface element is over at least a portion of a representation of a first type of feature in the physical environment:
change the appearance of the placement user interface element to indicate that an annotation would be placed at an anchor point corresponding to the first type of feature in response to an annotation placement input; and
display a first set of one or more guides corresponding to at least a portion of the representation of the first type of feature

↓

912 In accordance with a determination that the placement user interface element is over at least a portion of a representation of a second type of feature in the physical environment, wherein the second type of feature is different from the first type of feature:
change the appearance of the placement user interface element to indicate that an annotation would be placed at an anchor point corresponding to the second type of feature in response to an annotation placement input; and
display a second set of one or more guides, different from the first set of one or more guides, corresponding to at least a portion of the representation of the second type of feature

Figure 9A

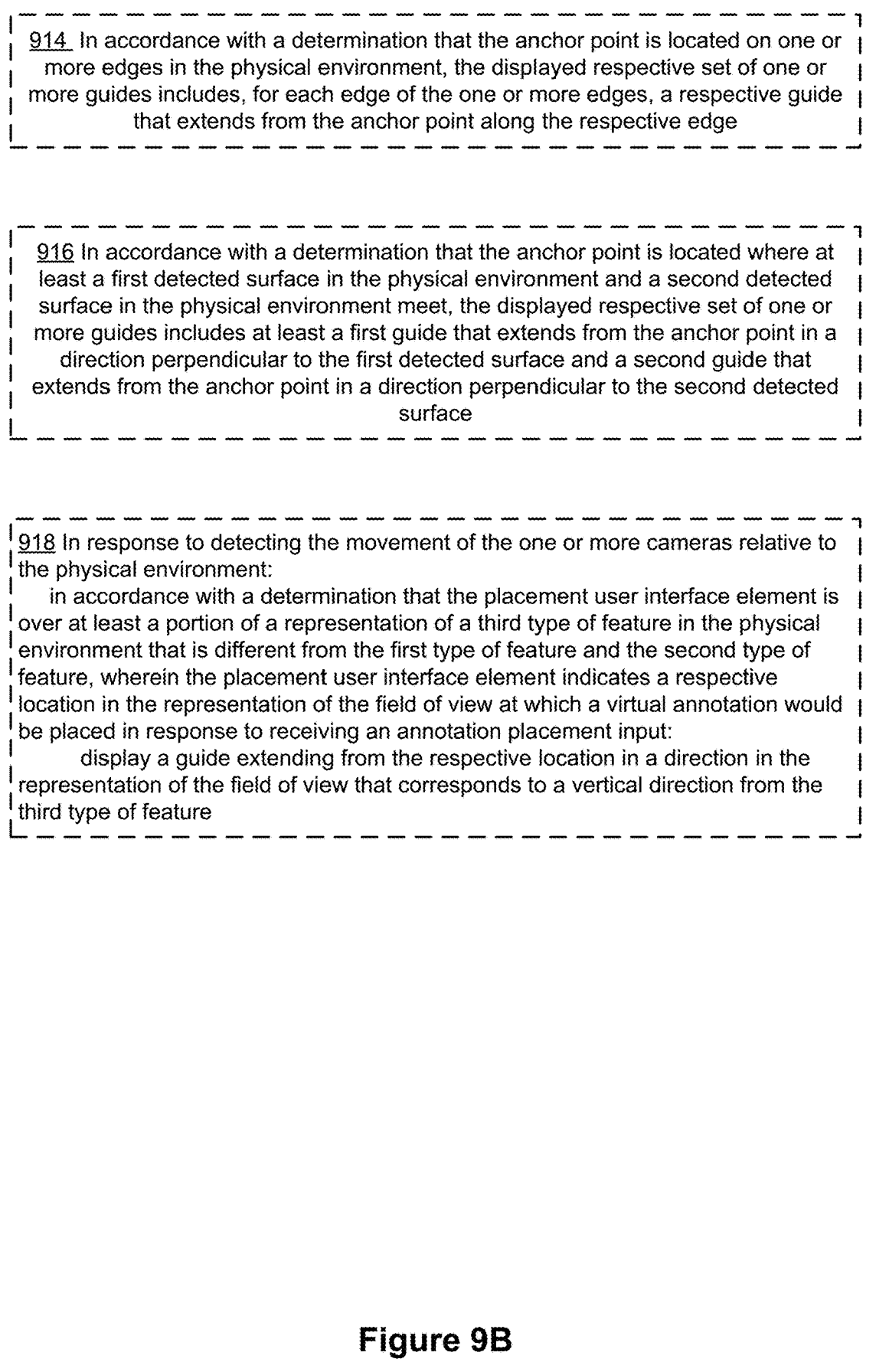

914 In accordance with a determination that the anchor point is located on one or more edges in the physical environment, the displayed respective set of one or more guides includes, for each edge of the one or more edges, a respective guide that extends from the anchor point along the respective edge 916 In accordance with a determination that the anchor point is located where at least a first detected surface in the physical environment and a second detected surface in the physical environment meet, the displayed respective set of one or more guides includes at least a first guide that extends from the anchor point in a direction perpendicular to the first detected surface and a second guide that extends from the anchor point in a direction perpendicular to the second detected surface 918 In response to detecting the movement of the one or more cameras relative to the physical environment:

in accordance with a determination that the placement user interface element is over at least a portion of a representation of a third type of feature in the physical environment that is different from the first type of feature and the second type of feature, wherein the placement user interface element indicates a respective location in the representation of the field of view at which a virtual annotation would be placed in response to receiving an annotation placement input:

display a guide extending from the respective location in a direction in the representation of the field of view that corresponds to a vertical direction from the third type of feature

Figure 9B

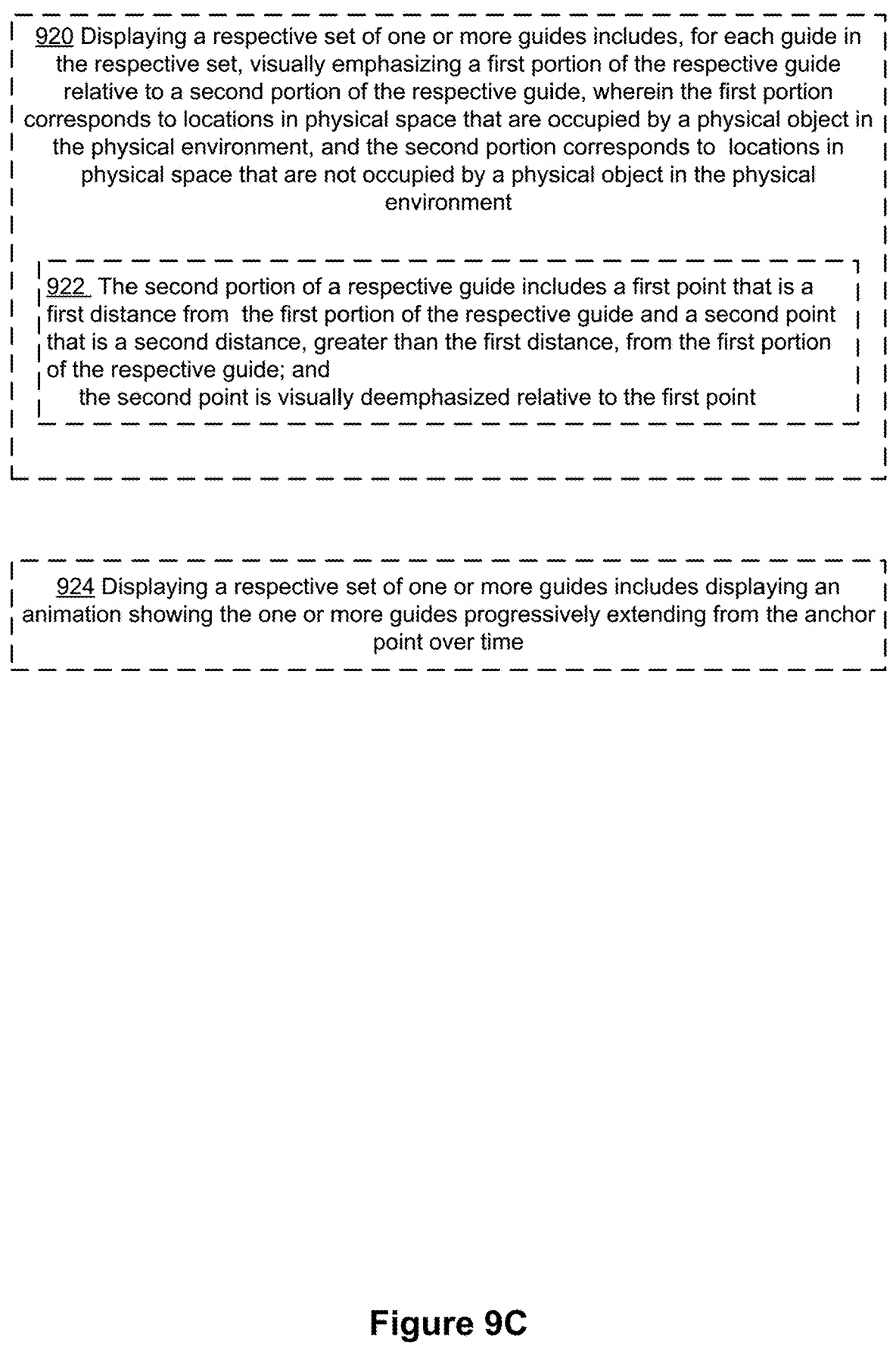

920 Displaying a respective set of one or more guides includes, for each guide in the respective set, visually emphasizing a first portion of the respective guide relative to a second portion of the respective guide, wherein the first portion corresponds to locations in physical space that are occupied by a physical object in the physical environment, and the second portion corresponds to locations in physical space that are not occupied by a physical object in the physical environment 922 The second portion of a respective guide includes a first point that is a first distance from the first portion of the respective guide and a second point that is a second distance, greater than the first distance, from the first portion of the respective guide; and
the second point is visually deemphasized relative to the first point 924 Displaying a respective set of one or more guides includes displaying an animation showing the one or more guides progressively extending from the anchor point over time

Figure 9C

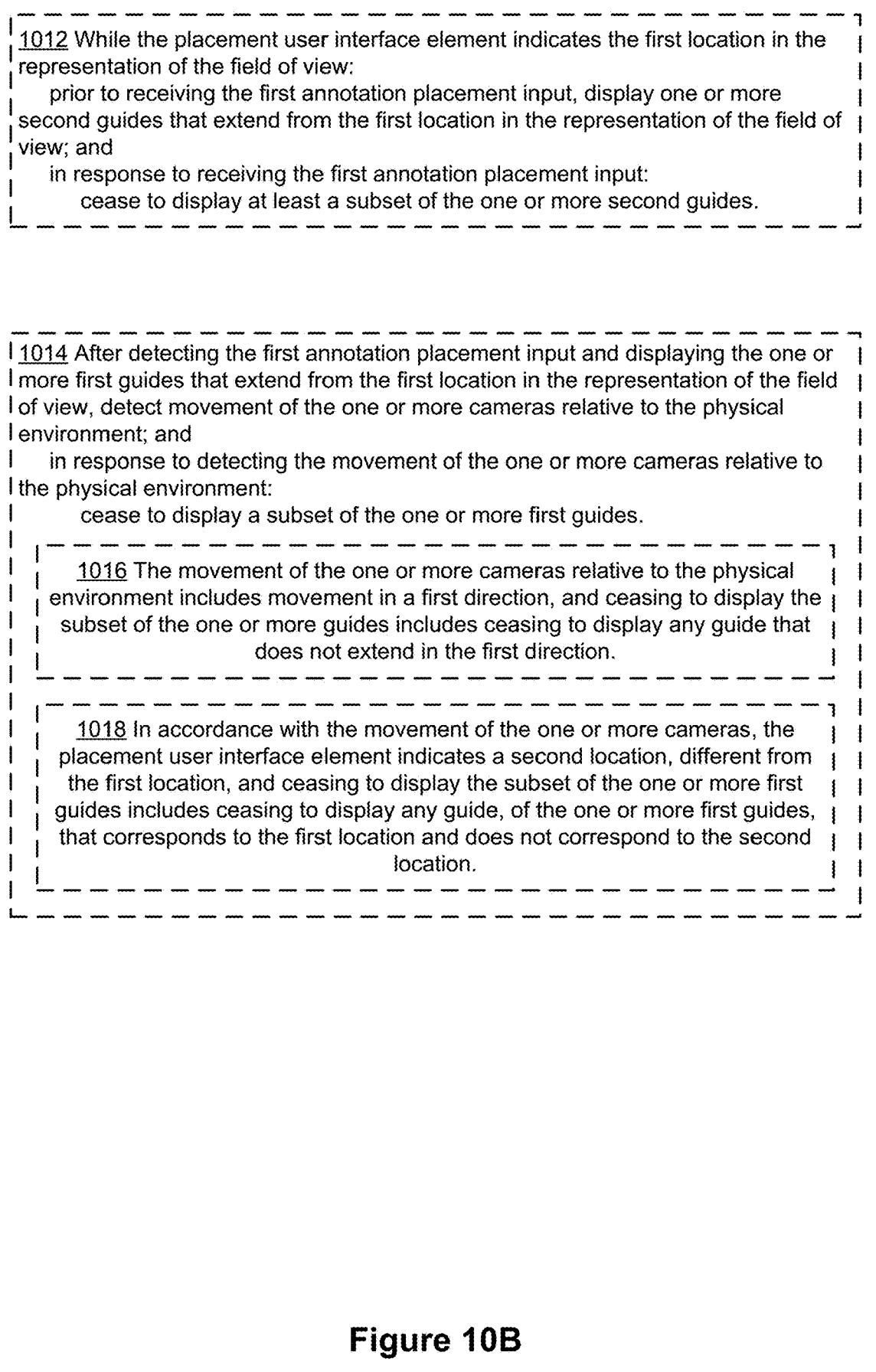

1012 While the placement user interface element indicates the first location in the representation of the field of view:
prior to receiving the first annotation placement input, display one or more second guides that extend from the first location in the representation of the field of view; and
in response to receiving the first annotation placement input:
cease to display at least a subset of the one or more second guides.

1014 After detecting the first annotation placement input and displaying the one or more first guides that extend from the first location in the representation of the field of view, detect movement of the one or more cameras relative to the physical environment; and
in response to detecting the movement of the one or more cameras relative to the physical environment:
cease to display a subset of the one or more first guides.

1016 The movement of the one or more cameras relative to the physical environment includes movement in a first direction, and ceasing to display the subset of the one or more guides includes ceasing to display any guide that does not extend in the first direction.

1018 In accordance with the movement of the one or more cameras, the placement user interface element indicates a second location, different from the first location, and ceasing to display the subset of the one or more first guides includes ceasing to display any guide, of the one or more first guides, that corresponds to the first location and does not correspond to the second location.

Figure 10B

Figure 10C:
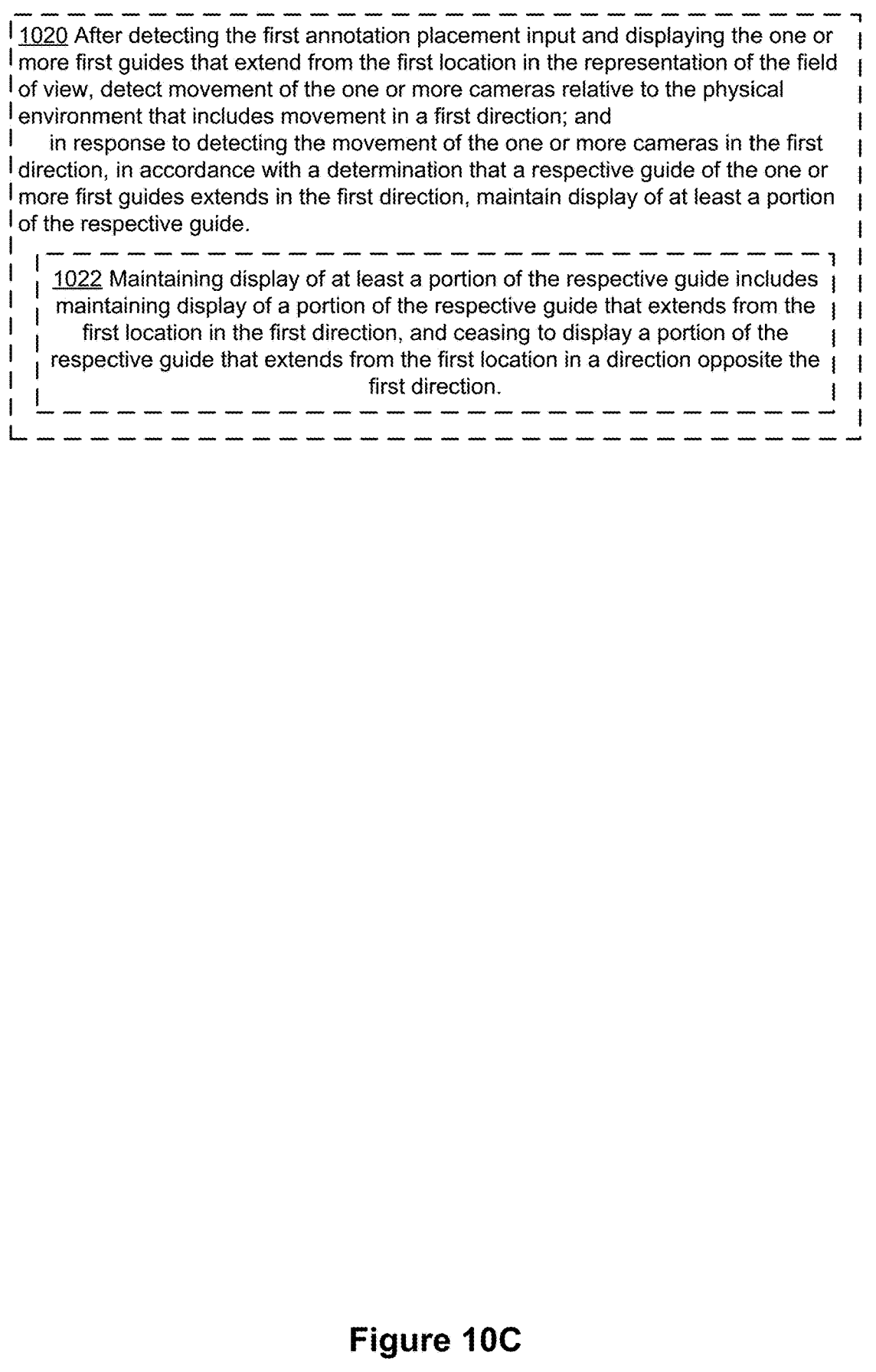

1020 After detecting the first annotation placement input and displaying the one or more first guides that extend from the first location in the representation of the field of view, detect movement of the one or more cameras relative to the physical environment that includes movement in a first direction; and in response to detecting the movement of the one or more cameras in the first direction, in accordance with a determination that a respective guide of the one or more first guides extends in the first direction, maintain display of at least a portion of the respective guide.

1022 Maintaining display of at least a portion of the respective guide includes maintaining display of a portion of the respective guide that extends from the first location in the first direction, and ceasing to display a portion of the respective guide that extends from the first location in a direction opposite the first direction.

Figure 11A:
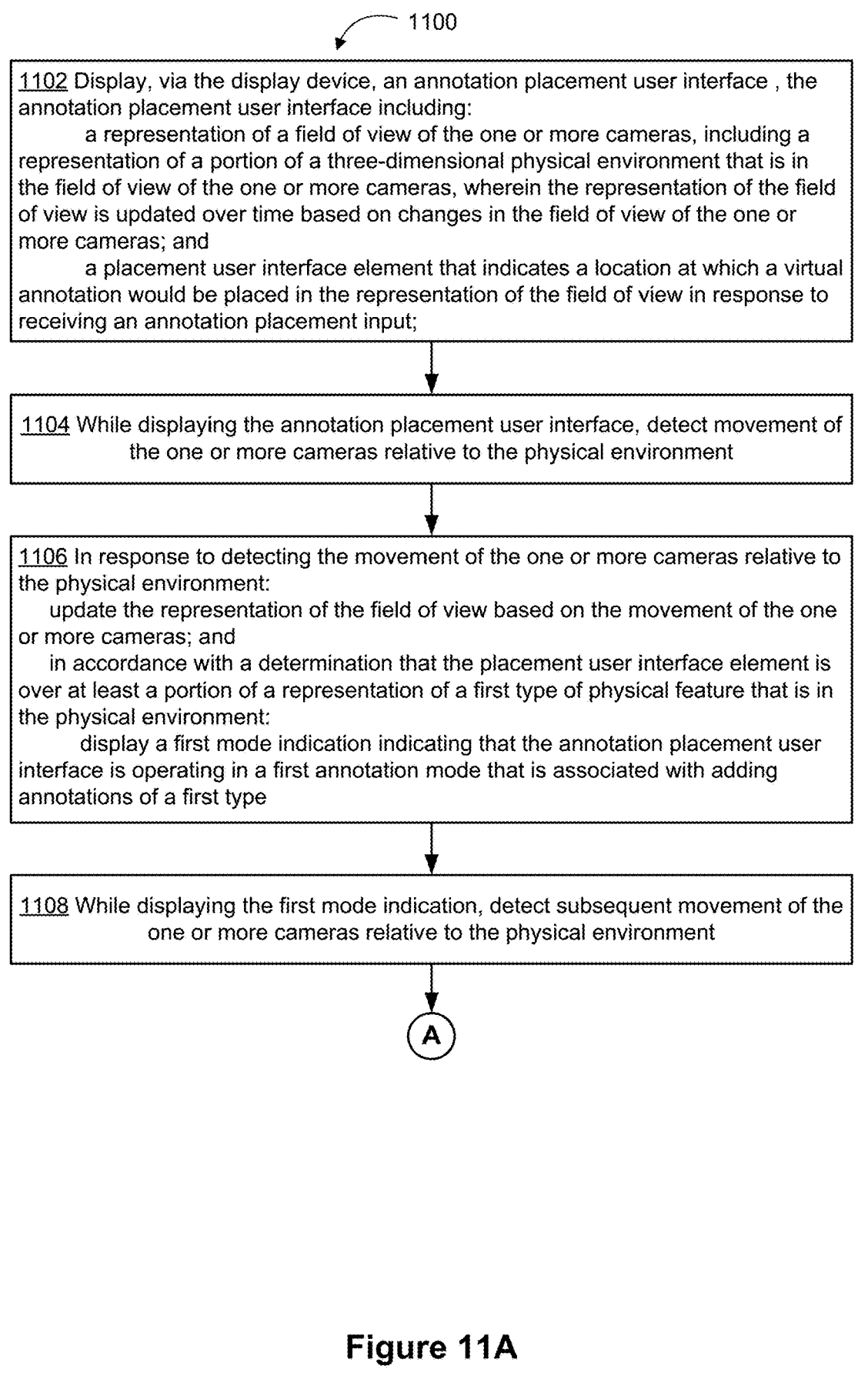

1102 Display, via the display device, an annotation placement user interface , the annotation placement user interface including:

a representation of a field of view of the one or more cameras, including a representation of a portion of a three-dimensional physical environment that is in the field of view of the one or more cameras, wherein the representation of the field of view is updated over time based on changes in the field of view of the one or more cameras; and a placement user interface element that indicates a location at which a virtual annotation would be placed in the representation of the field of view in response to receiving an annotation placement input;

↓

1104 While displaying the annotation placement user interface, detect movement of the one or more cameras relative to the physical environment

↓

1106 In response to detecting the movement of the one or more cameras relative to the physical environment:

update the representation of the field of view based on the movement of the one or more cameras; and in accordance with a determination that the placement user interface element is over at least a portion of a representation of a first type of physical feature that is in the physical environment:

display a first mode indication indicating that the annotation placement user interface is operating in a first annotation mode that is associated with adding annotations of a first type

↓

1108 While displaying the first mode indication, detect subsequent movement of the one or more cameras relative to the physical environment

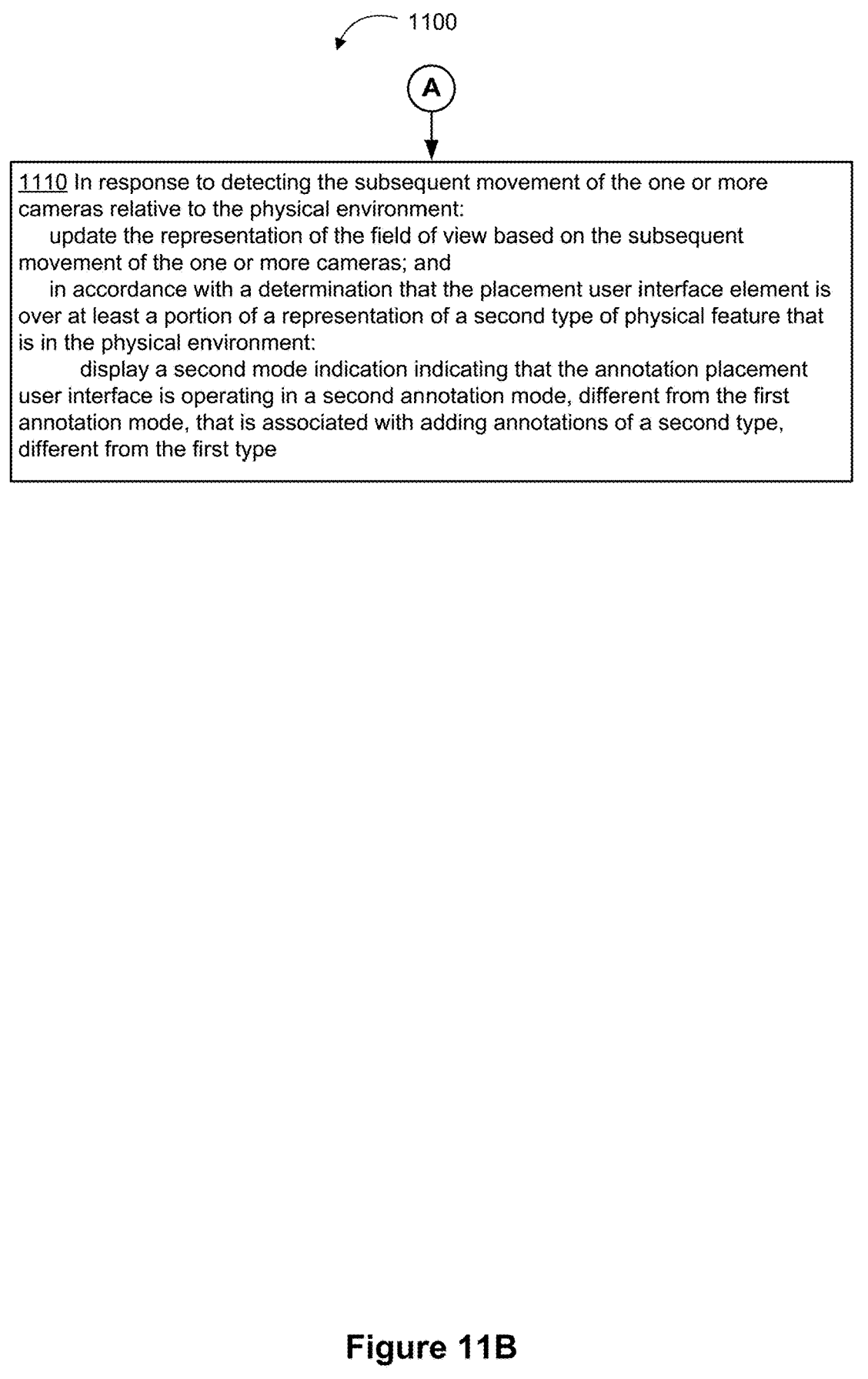

1110 In response to detecting the subsequent movement of the one or more cameras relative to the physical environment:

update the representation of the field of view based on the subsequent movement of the one or more cameras; and in accordance with a determination that the placement user interface element is over at least a portion of a representation of a second type of physical feature that is in the physical environment:

display a second mode indication indicating that the annotation placement user interface is operating in a second annotation mode, different from the first annotation mode, that is associated with adding annotations of a second type, different from the first type

Figure 11B

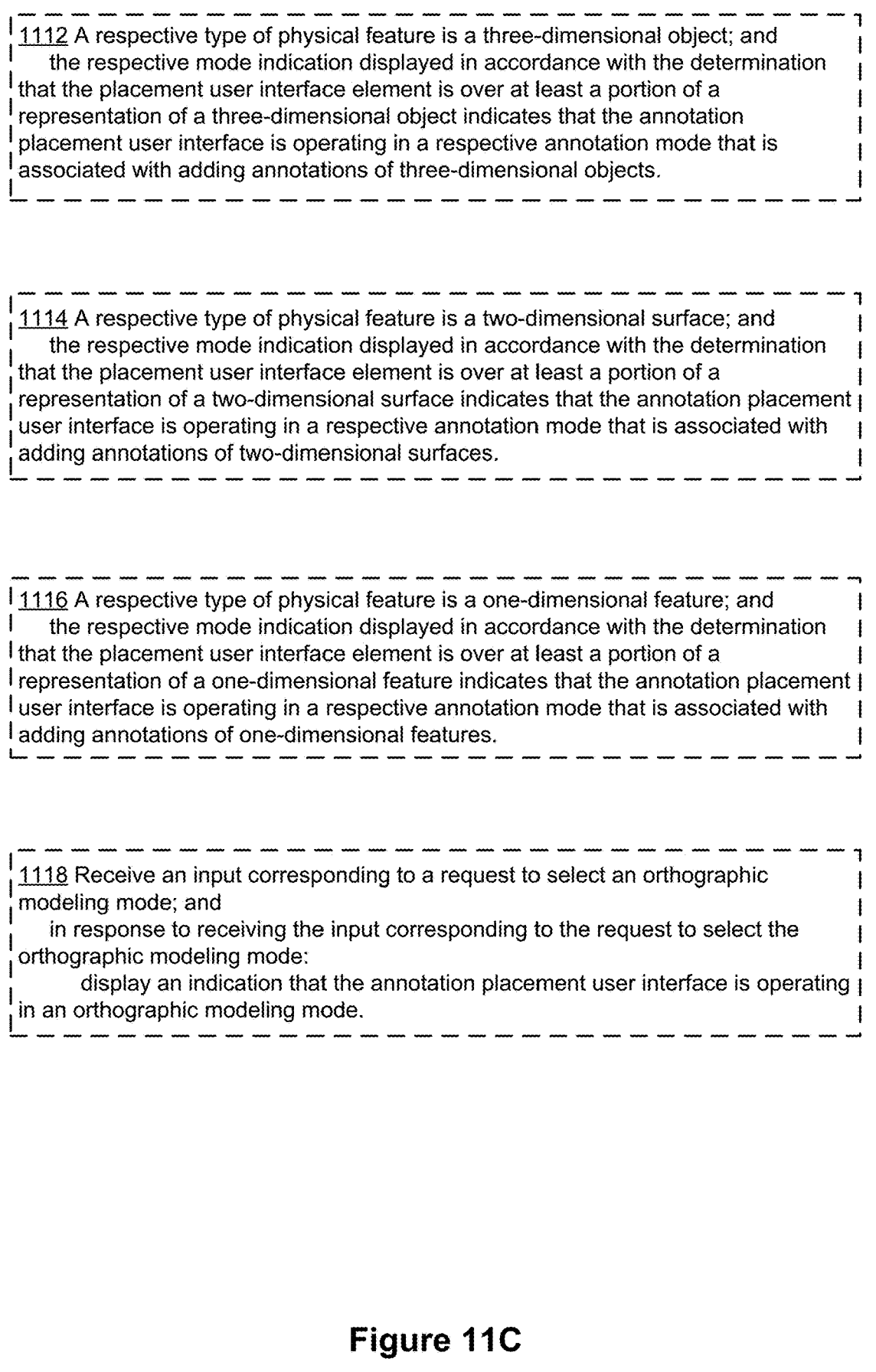

1112 A respective type of physical feature is a three-dimensional object; and
the respective mode indication displayed in accordance with the determination that the placement user interface element is over at least a portion of a representation of a three-dimensional object indicates that the annotation placement user interface is operating in a respective annotation mode that is associated with adding annotations of three-dimensional objects.

1114 A respective type of physical feature is a two-dimensional surface; and
the respective mode indication displayed in accordance with the determination that the placement user interface element is over at least a portion of a representation of a two-dimensional surface indicates that the annotation placement user interface is operating in a respective annotation mode that is associated with adding annotations of two-dimensional surfaces.

1116 A respective type of physical feature is a one-dimensional feature; and
the respective mode indication displayed in accordance with the determination that the placement user interface element is over at least a portion of a representation of a one-dimensional feature indicates that the annotation placement user interface is operating in a respective annotation mode that is associated with adding annotations of one-dimensional features.

1118 Receive an input corresponding to a request to select an orthographic modeling mode; and
in response to receiving the input corresponding to the request to select the orthographic modeling mode:
display an indication that the annotation placement user interface is operating in an orthographic modeling mode.

Figure 11C

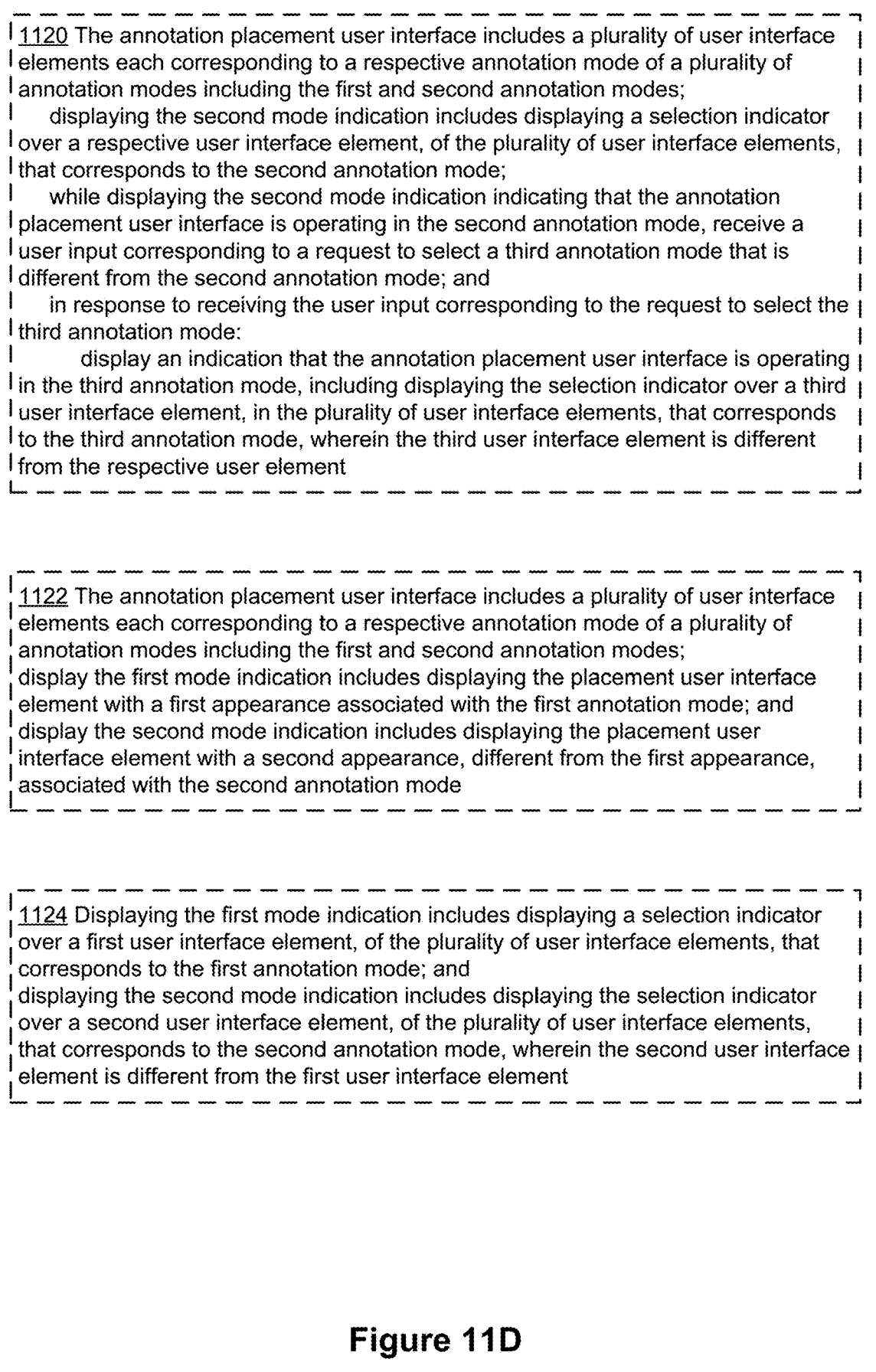

1120 The annotation placement user interface includes a plurality of user interface elements each corresponding to a respective annotation mode of a plurality of annotation modes including the first and second annotation modes;
displaying the second mode indication includes displaying a selection indicator over a respective user interface element, of the plurality of user interface elements, that corresponds to the second annotation mode;
while displaying the second mode indication indicating that the annotation placement user interface is operating in the second annotation mode, receive a user input corresponding to a request to select a third annotation mode that is different from the second annotation mode; and
in response to receiving the user input corresponding to the request to select the third annotation mode:
display an indication that the annotation placement user interface is operating in the third annotation mode, including displaying the selection indicator over a third user interface element, in the plurality of user interface elements, that corresponds to the third annotation mode, wherein the third user interface element is different from the respective user element 1122 The annotation placement user interface includes a plurality of user interface elements each corresponding to a respective annotation mode of a plurality of annotation modes including the first and second annotation modes;
display the first mode indication includes displaying the placement user interface element with a first appearance associated with the first annotation mode; and
display the second mode indication includes displaying the placement user interface element with a second appearance, different from the first appearance, associated with the second annotation mode 1124 Displaying the first mode indication includes displaying a selection indicator over a first user interface element, of the plurality of user interface elements, that corresponds to the first annotation mode; and
displaying the second mode indication includes displaying the selection indicator over a second user interface element, of the plurality of user interface elements, that corresponds to the second annotation mode, wherein the second user interface element is different from the first user interface element

Figure 11D

1126 Displaying the first mode indication includes displaying a selection indicator over a fourth user interface element, of the plurality of user interface elements, that corresponds to a fourth annotation mode, different from the first annotation mode and the second annotation mode; and
displaying the second mode indication includes displaying the selection indicator over the fourth user interface element that corresponds to the fourth annotation mode

Figure 11E

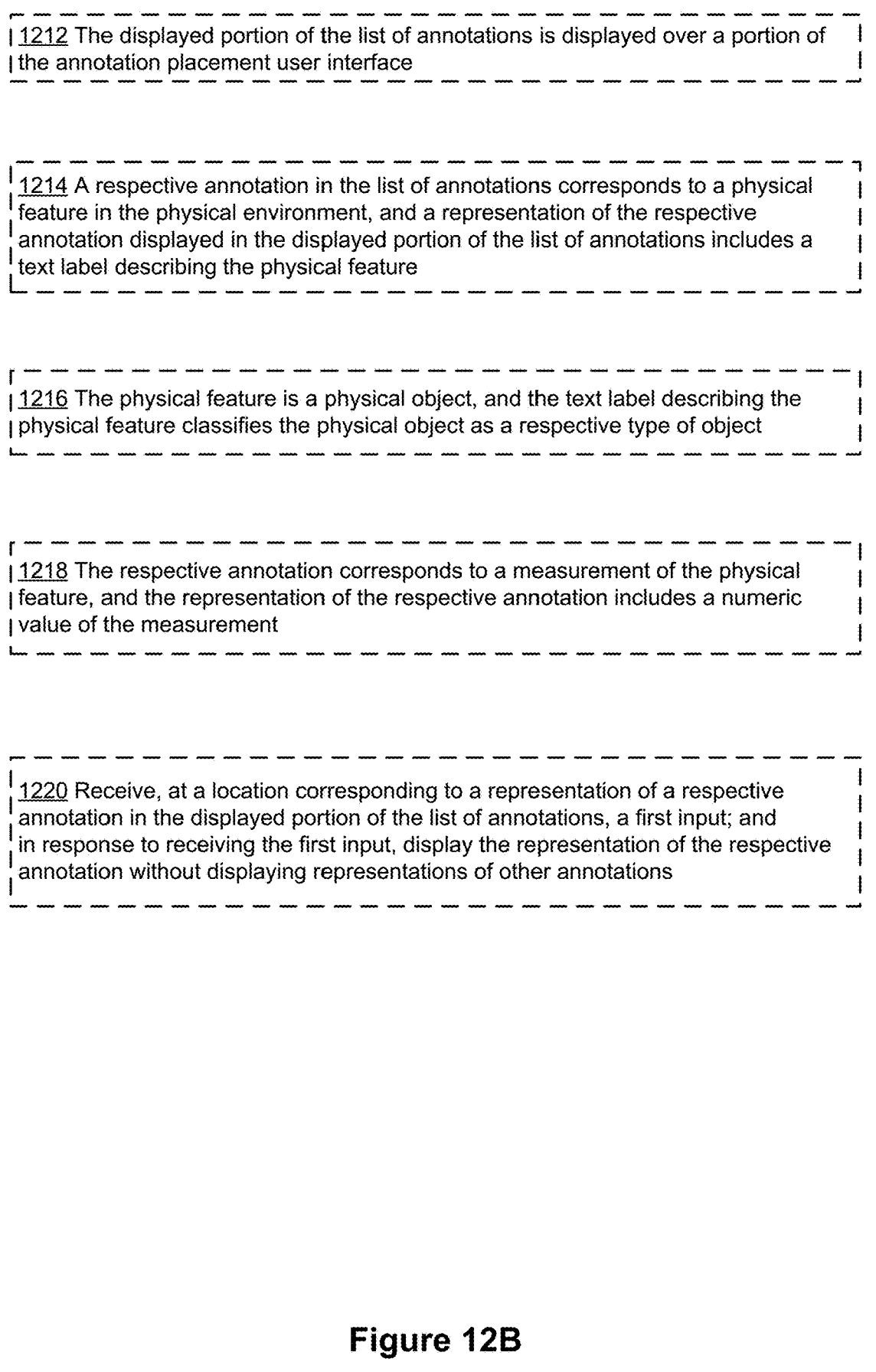

1212 The displayed portion of the list of annotations is displayed over a portion of the annotation placement user interface 1214 A respective annotation in the list of annotations corresponds to a physical feature in the physical environment, and a representation of the respective annotation displayed in the displayed portion of the list of annotations includes a text label describing the physical feature 1216 The physical feature is a physical object, and the text label describing the physical feature classifies the physical object as a respective type of object 1218 The respective annotation corresponds to a measurement of the physical feature, and the representation of the respective annotation includes a numeric value of the measurement 1220 Receive, at a location corresponding to a representation of a respective annotation in the displayed portion of the list of annotations, a first input; and in response to receiving the first input, display the representation of the respective annotation without displaying representations of other annotations

Figure 12B

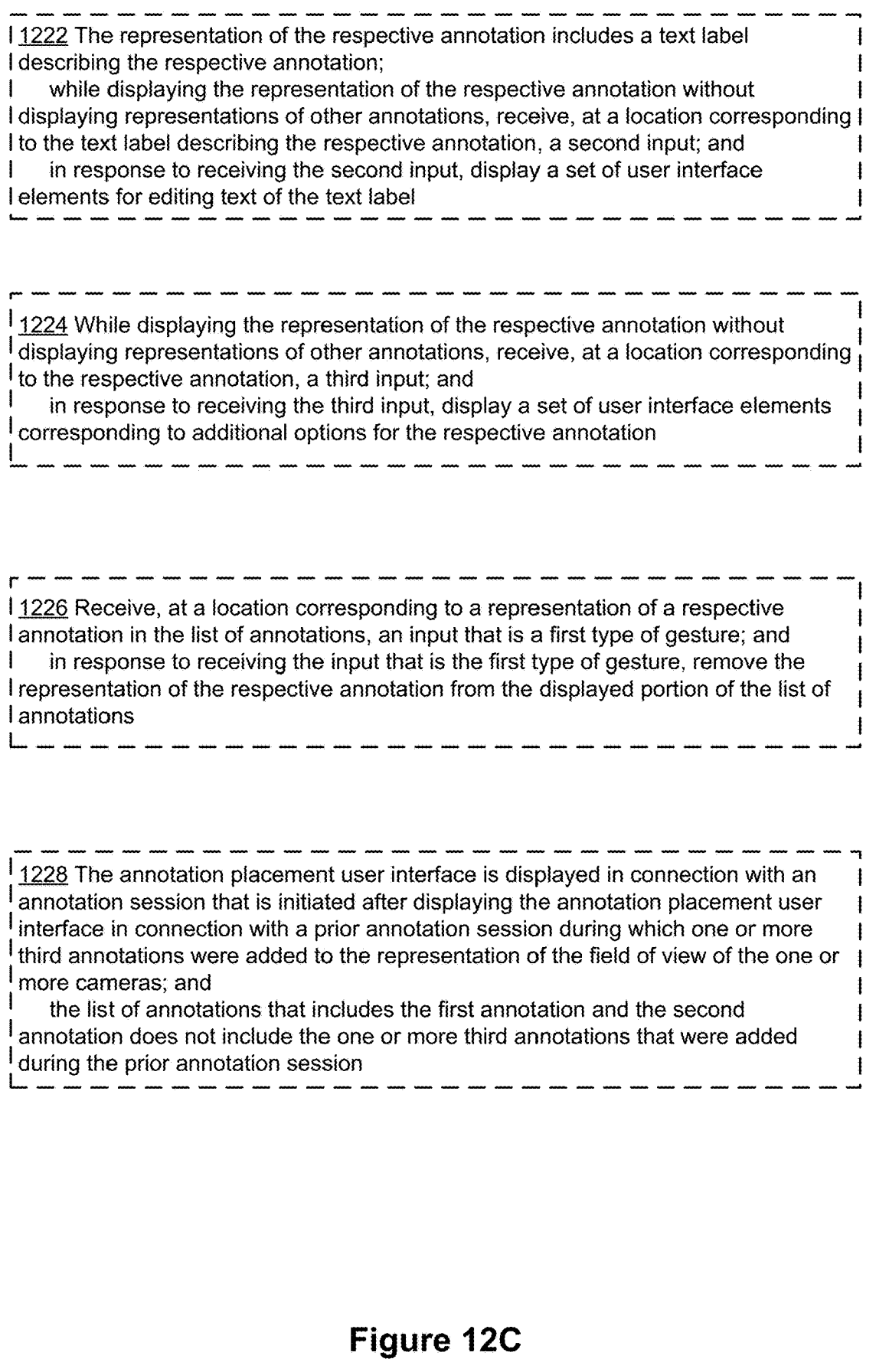

1222 The representation of the respective annotation includes a text label describing the respective annotation;
while displaying the representation of the respective annotation without displaying representations of other annotations, receive, at a location corresponding to the text label describing the respective annotation, a second input; and
in response to receiving the second input, display a set of user interface elements for editing text of the text label 1224 While displaying the representation of the respective annotation without displaying representations of other annotations, receive, at a location corresponding to the respective annotation, a third input; and
in response to receiving the third input, display a set of user interface elements corresponding to additional options for the respective annotation 1226 Receive, at a location corresponding to a representation of a respective annotation in the list of annotations, an input that is a first type of gesture; and
in response to receiving the input that is the first type of gesture, remove the representation of the respective annotation from the displayed portion of the list of annotations 1228 The annotation placement user interface is displayed in connection with an annotation session that is initiated after displaying the annotation placement user interface in connection with a prior annotation session during which one or more third annotations were added to the representation of the field of view of the one or more cameras; and
the list of annotations that includes the first annotation and the second annotation does not include the one or more third annotations that were added during the prior annotation session

Figure 12C

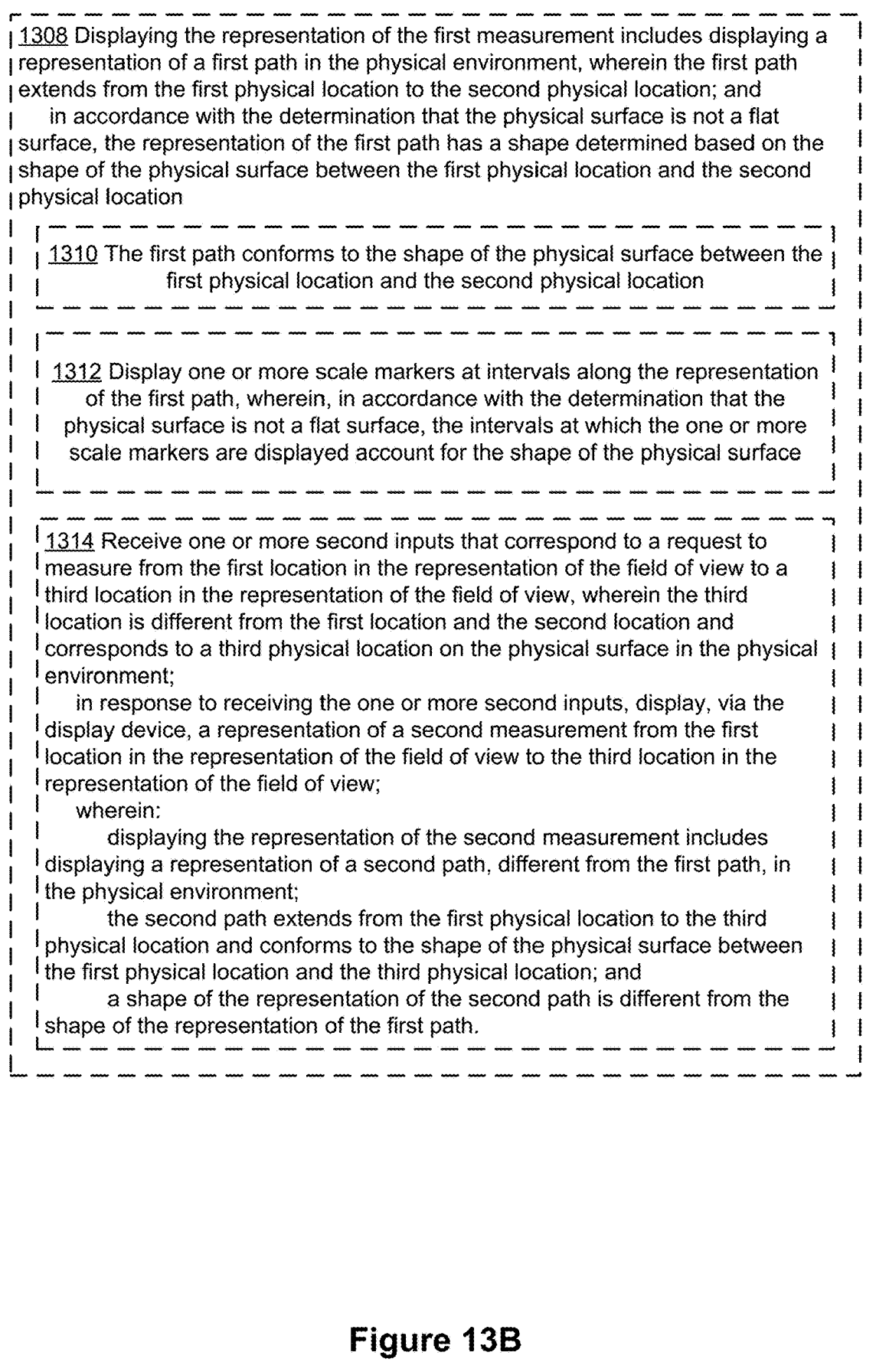

1308 Displaying the representation of the first measurement includes displaying a representation of a first path in the physical environment, wherein the first path extends from the first physical location to the second physical location; and in accordance with the determination that the physical surface is not a flat surface, the representation of the first path has a shape determined based on the shape of the physical surface between the first physical location and the second physical location 1310 The first path conforms to the shape of the physical surface between the first physical location and the second physical location 1312 Display one or more scale markers at intervals along the representation of the first path, wherein, in accordance with the determination that the physical surface is not a flat surface, the intervals at which the one or more scale markers are displayed account for the shape of the physical surface 1314 Receive one or more second inputs that correspond to a request to measure from the first location in the representation of the field of view to a third location in the representation of the field of view, wherein the third location is different from the first location and the second location and corresponds to a third physical location on the physical surface in the physical environment;

in response to receiving the one or more second inputs, display, via the display device, a representation of a second measurement from the first location in the representation of the field of view to the third location in the representation of the field of view;

wherein:

displaying the representation of the second measurement includes displaying a representation of a second path, different from the first path, in the physical environment;

the second path extends from the first physical location to the third physical location and conforms to the shape of the physical surface between the first physical location and the third physical location; and a shape of the representation of the second path is different from the shape of the representation of the first path.

Figure 13B

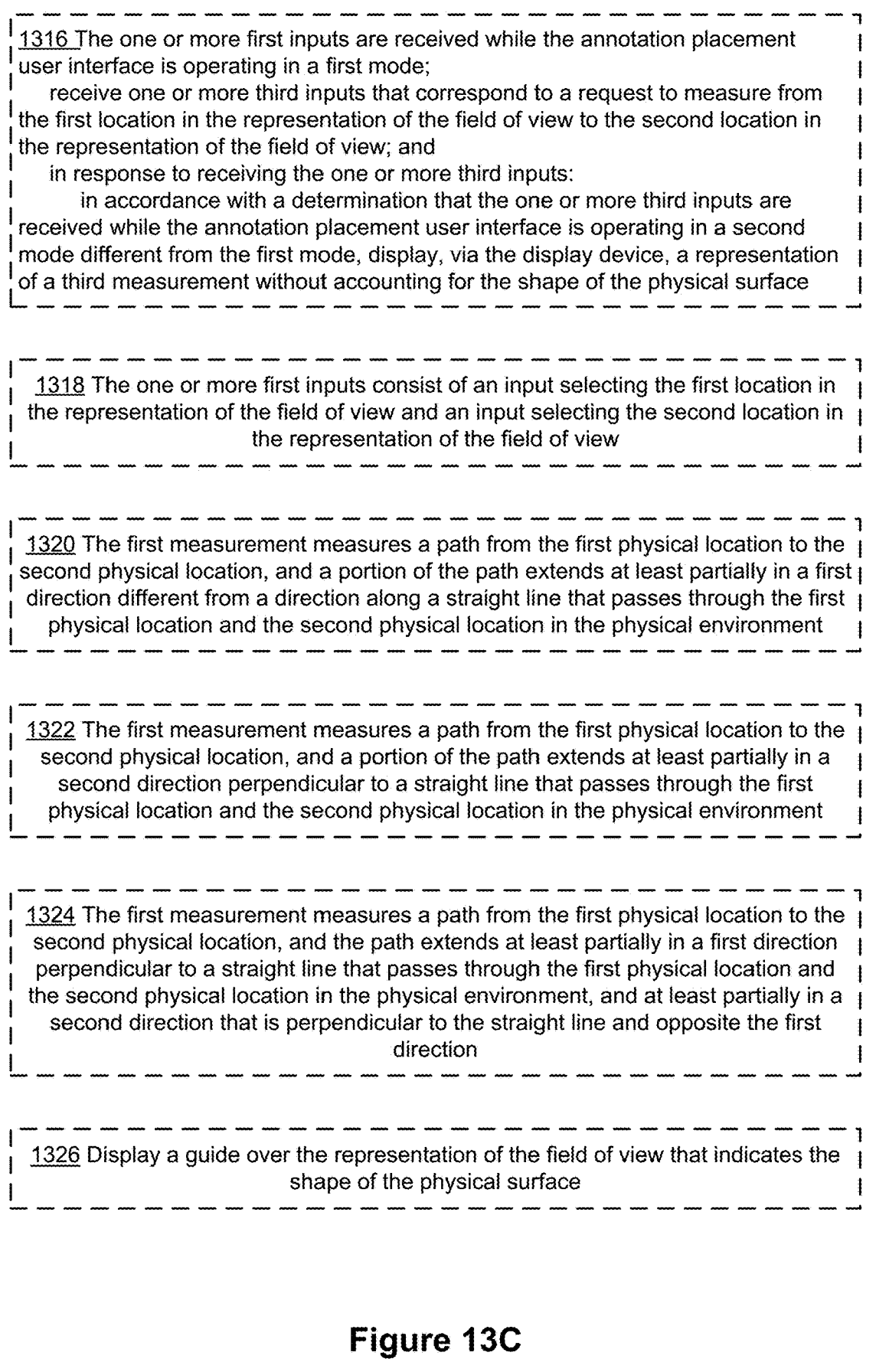

1316 The one or more first inputs are received while the annotation placement user interface is operating in a first mode;
receive one or more third inputs that correspond to a request to measure from the first location in the representation of the field of view to the second location in the representation of the field of view; and
in response to receiving the one or more third inputs:
in accordance with a determination that the one or more third inputs are received while the annotation placement user interface is operating in a second mode different from the first mode, display, via the display device, a representation of a third measurement without accounting for the shape of the physical surface 1318 The one or more first inputs consist of an input selecting the first location in the representation of the field of view and an input selecting the second location in the representation of the field of view 1320 The first measurement measures a path from the first physical location to the second physical location, and a portion of the path extends at least partially in a first direction different from a direction along a straight line that passes through the first physical location and the second physical location in the physical environment 1322 The first measurement measures a path from the first physical location to the second physical location, and a portion of the path extends at least partially in a second direction perpendicular to a straight line that passes through the first physical location and the second physical location in the physical environment 1324 The first measurement measures a path from the first physical location to the second physical location, and the path extends at least partially in a first direction perpendicular to a straight line that passes through the first physical location and the second physical location in the physical environment, and at least partially in a second direction that is perpendicular to the straight line and opposite the first direction 1326 Display a guide over the representation of the field of view that indicates the shape of the physical surface

Figure 13C

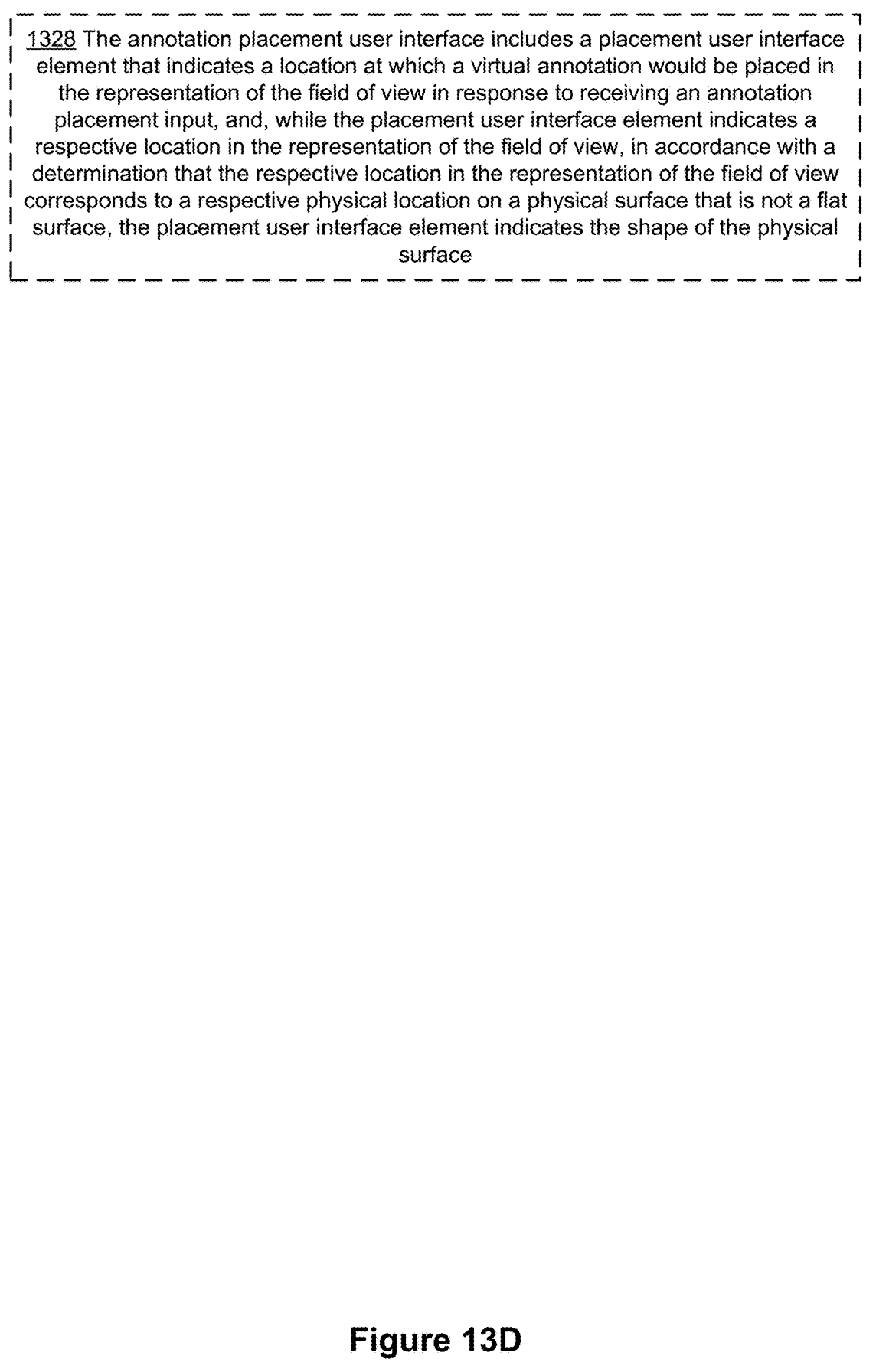

1328 The annotation placement user interface includes a placement user interface element that indicates a location at which a virtual annotation would be placed in the representation of the field of view in response to receiving an annotation placement input, and, while the placement user interface element indicates a respective location in the representation of the field of view, in accordance with a determination that the respective location in the representation of the field of view corresponds to a respective physical location on a physical surface that is not a flat surface, the placement user interface element indicates the shape of the physical surface

Figure 13D

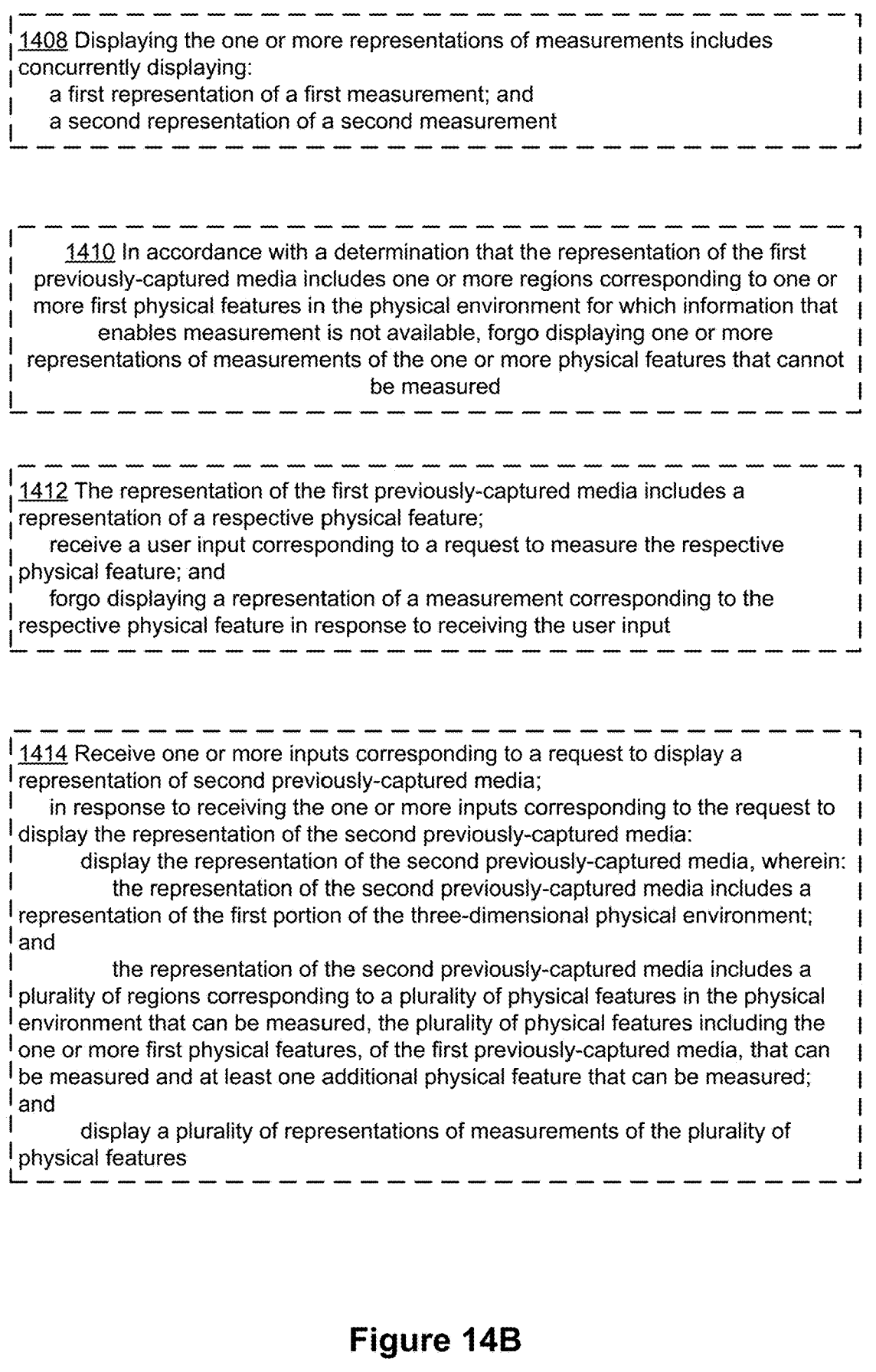

1408 Displaying the one or more representations of measurements includes concurrently displaying:
a first representation of a first measurement; and
a second representation of a second measurement 1410 In accordance with a determination that the representation of the first previously-captured media includes one or more regions corresponding to one or more first physical features in the physical environment for which information that enables measurement is not available, forgo displaying one or more representations of measurements of the one or more physical features that cannot be measured 1412 The representation of the first previously-captured media includes a representation of a respective physical feature;
receive a user input corresponding to a request to measure the respective physical feature; and
forgo displaying a representation of a measurement corresponding to the respective physical feature in response to receiving the user input 1414 Receive one or more inputs corresponding to a request to display a representation of second previously-captured media;
in response to receiving the one or more inputs corresponding to the request to display the representation of the second previously-captured media:
display the representation of the second previously-captured media, wherein:
the representation of the second previously-captured media includes a representation of the first portion of the three-dimensional physical environment; and
the representation of the second previously-captured media includes a plurality of regions corresponding to a plurality of physical features in the physical environment that can be measured, the plurality of physical features including the one or more first physical features, of the first previously-captured media, that can be measured and at least one additional physical feature that can be measured; and
display a plurality of representations of measurements of the plurality of physical features

Figure 14B

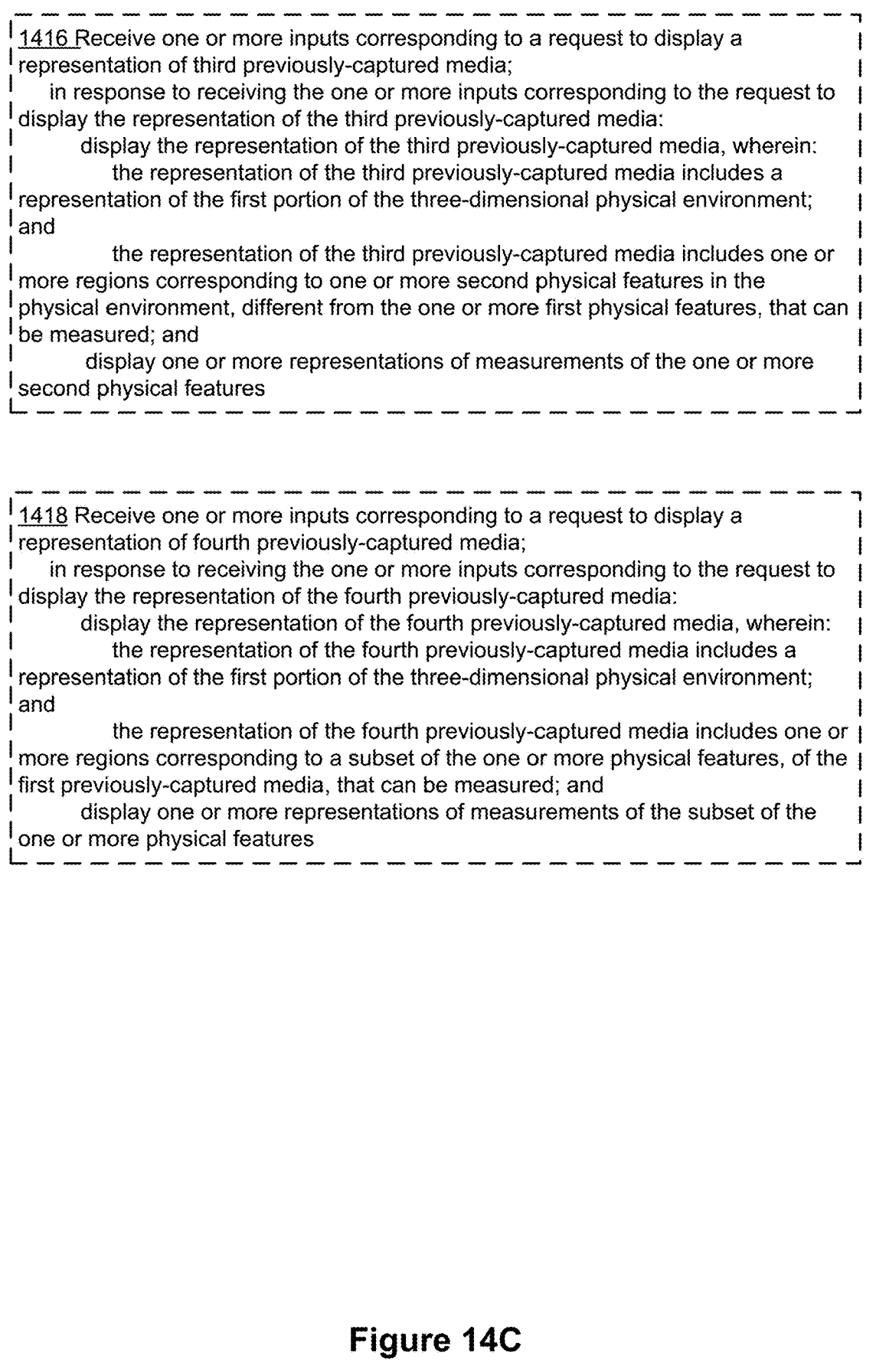

1416 Receive one or more inputs corresponding to a request to display a representation of third previously-captured media;
in response to receiving the one or more inputs corresponding to the request to display the representation of the third previously-captured media:
display the representation of the third previously-captured media, wherein:
the representation of the third previously-captured media includes a representation of the first portion of the three-dimensional physical environment; and
the representation of the third previously-captured media includes one or more regions corresponding to one or more second physical features in the physical environment, different from the one or more first physical features, that can be measured; and
display one or more representations of measurements of the one or more second physical features 1418 Receive one or more inputs corresponding to a request to display a representation of fourth previously-captured media;
in response to receiving the one or more inputs corresponding to the request to display the representation of the fourth previously-captured media:
display the representation of the fourth previously-captured media, wherein:
the representation of the fourth previously-captured media includes a representation of the first portion of the three-dimensional physical environment; and
the representation of the fourth previously-captured media includes one or more regions corresponding to a subset of the one or more physical features, of the first previously-captured media, that can be measured; and
display one or more representations of measurements of the subset of the one or more physical features

Figure 14C

Figure 14D:
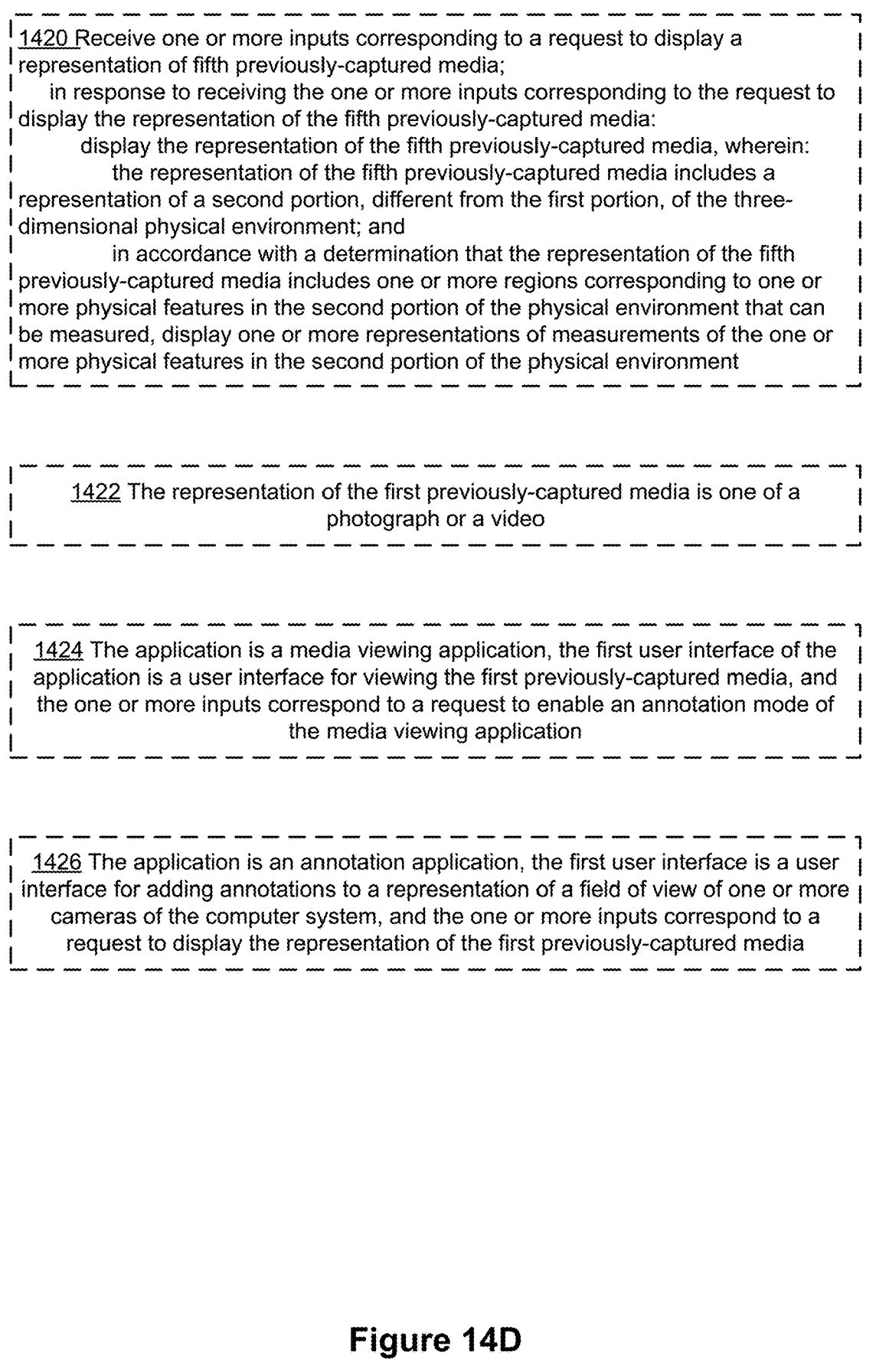

1420 Receive one or more inputs corresponding to a request to display a representation of fifth previously-captured media;
in response to receiving the one or more inputs corresponding to the request to display the representation of the fifth previously-captured media:
display the representation of the fifth previously-captured media, wherein:
the representation of the fifth previously-captured media includes a representation of a second portion, different from the first portion, of the three-dimensional physical environment; and
in accordance with a determination that the representation of the fifth previously-captured media includes one or more regions corresponding to one or more physical features in the second portion of the physical environment that can be measured, display one or more representations of measurements of the one or more physical features in the second portion of the physical environment 1422 The representation of the first previously-captured media is one of a photograph or a video 1424 The application is a media viewing application, the first user interface of the application is a user interface for viewing the first previously-captured media, and the one or more inputs correspond to a request to enable an annotation mode of the media viewing application 1426 The application is an annotation application, the first user interface is a user interface for adding annotations to a representation of a field of view of one or more cameras of the computer system, and the one or more inputs correspond to a request to display the representation of the first previously-captured media

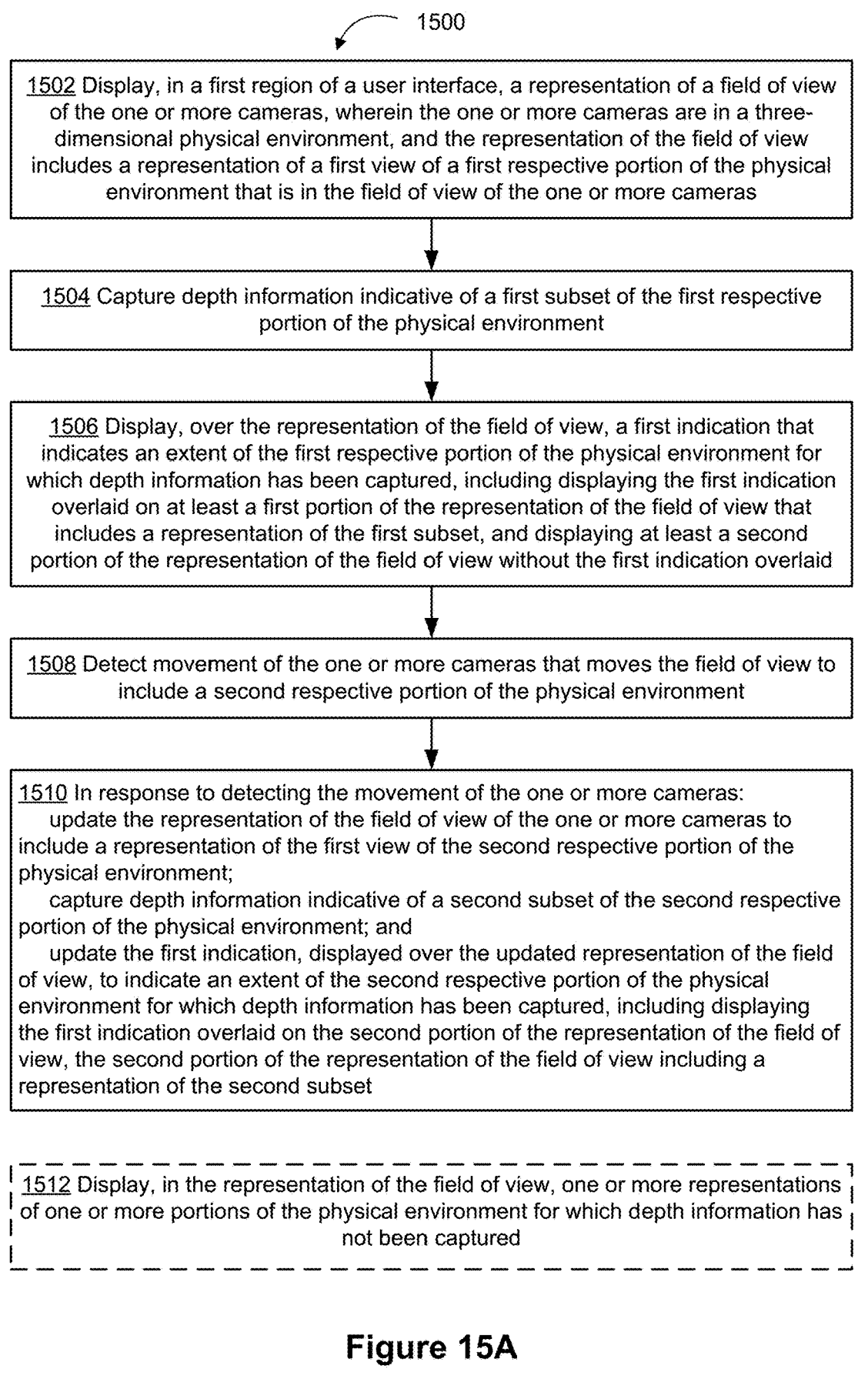

1502 Display, in a first region of a user interface, a representation of a field of view of the one or more cameras, wherein the one or more cameras are in a three-dimensional physical environment, and the representation of the field of view includes a representation of a first view of a first respective portion of the physical environment that is in the field of view of the one or more cameras 1504 Capture depth information indicative of a first subset of the first respective portion of the physical environment 1506 Display, over the representation of the field of view, a first indication that indicates an extent of the first respective portion of the physical environment for which depth information has been captured, including displaying the first indication overlaid on at least a first portion of the representation of the field of view that includes a representation of the first subset, and displaying at least a second portion of the representation of the field of view without the first indication overlaid 1508 Detect movement of the one or more cameras that moves the field of view to include a second respective portion of the physical environment 1510 In response to detecting the movement of the one or more cameras:
update the representation of the field of view of the one or more cameras to include a representation of the first view of the second respective portion of the physical environment;
capture depth information indicative of a second subset of the second respective portion of the physical environment; and
update the first indication, displayed over the updated representation of the field of view, to indicate an extent of the second respective portion of the physical environment for which depth information has been captured, including displaying the first indication overlaid on the second portion of the representation of the field of view, the second portion of the representation of the field of view including a representation of the second subset 1512 Display, in the representation of the field of view, one or more representations of one or more portions of the physical environment for which depth information has not been captured

Figure 15A

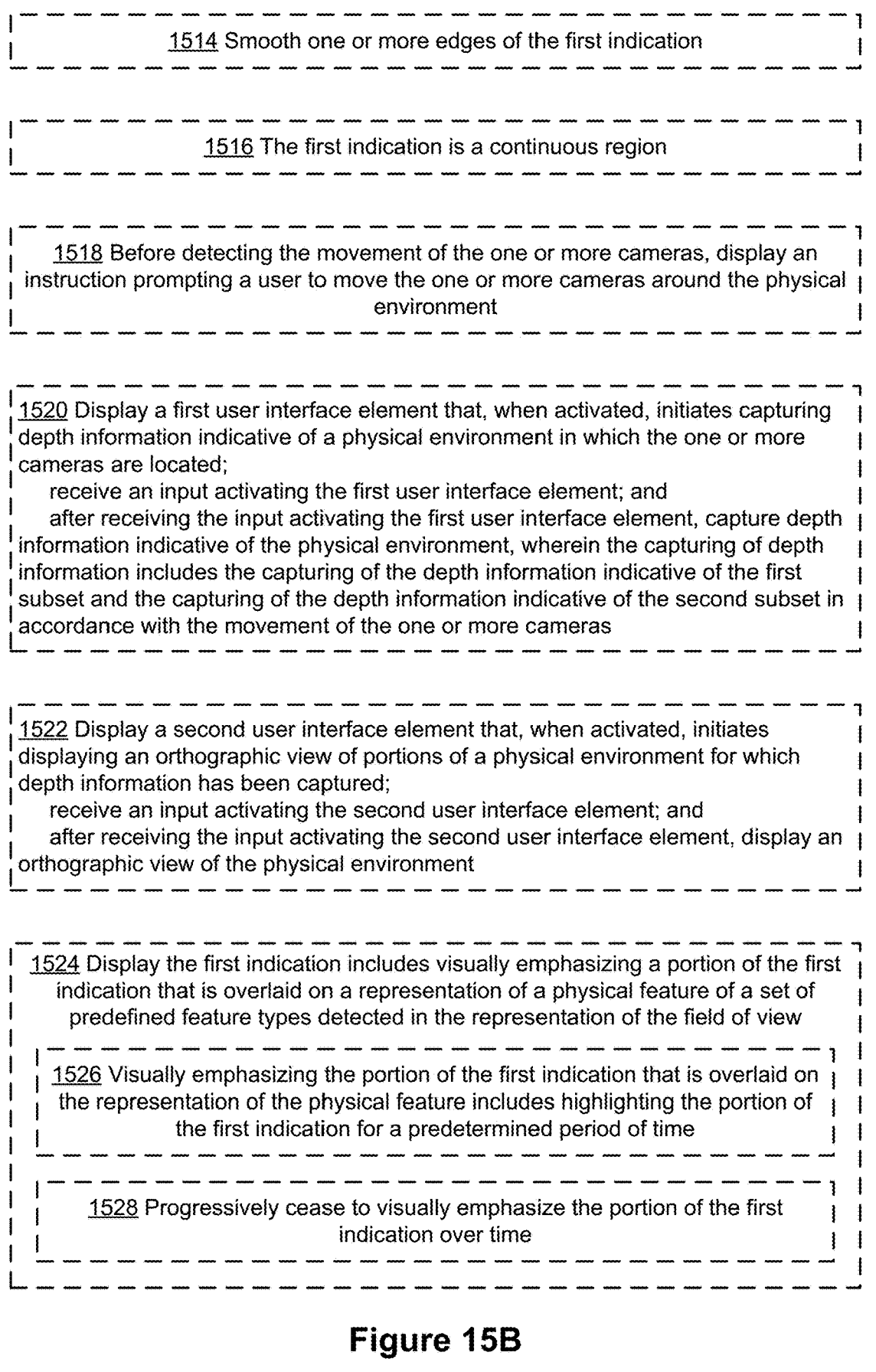

1514 Smooth one or more edges of the first indication

1516 The first indication is a continuous region

1518 Before detecting the movement of the one or more cameras, display an instruction prompting a user to move the one or more cameras around the physical environment 1520 Display a first user interface element that, when activated, initiates capturing depth information indicative of a physical environment in which the one or more cameras are located;
receive an input activating the first user interface element; and
after receiving the input activating the first user interface element, capture depth information indicative of the physical environment, wherein the capturing of depth information includes the capturing of the depth information indicative of the first subset and the capturing of the depth information indicative of the second subset in accordance with the movement of the one or more cameras 1522 Display a second user interface element that, when activated, initiates displaying an orthographic view of portions of a physical environment for which depth information has been captured;
receive an input activating the second user interface element; and
after receiving the input activating the second user interface element, display an orthographic view of the physical environment 1524 Display the first indication includes visually emphasizing a portion of the first indication that is overlaid on a representation of a physical feature of a set of predefined feature types detected in the representation of the field of view 1526 Visually emphasizing the portion of the first indication that is overlaid on the representation of the physical feature includes highlighting the portion of the first indication for a predetermined period of time 1528 Progressively cease to visually emphasize the portion of the first indication over time

Figure 15B

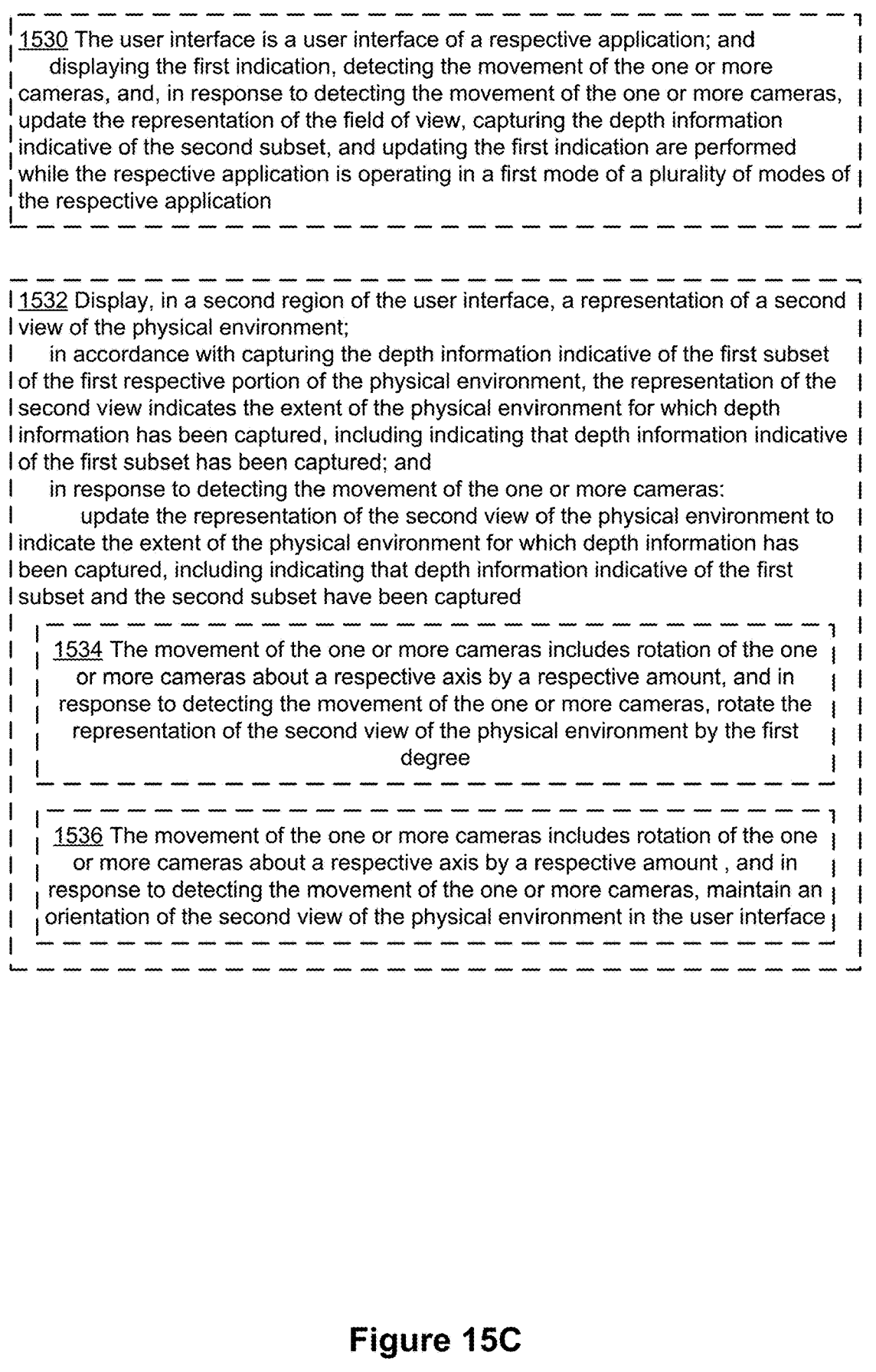

1530 The user interface is a user interface of a respective application; and
displaying the first indication, detecting the movement of the one or more cameras, and, in response to detecting the movement of the one or more cameras, update the representation of the field of view, capturing the depth information indicative of the second subset, and updating the first indication are performed while the respective application is operating in a first mode of a plurality of modes of the respective application 1532 Display, in a second region of the user interface, a representation of a second view of the physical environment;
in accordance with capturing the depth information indicative of the first subset of the first respective portion of the physical environment, the representation of the second view indicates the extent of the physical environment for which depth information has been captured, including indicating that depth information indicative of the first subset has been captured; and
in response to detecting the movement of the one or more cameras:
update the representation of the second view of the physical environment to indicate the extent of the physical environment for which depth information has been captured, including indicating that depth information indicative of the first subset and the second subset have been captured 1534 The movement of the one or more cameras includes rotation of the one or more cameras about a respective axis by a respective amount, and in response to detecting the movement of the one or more cameras, rotate the representation of the second view of the physical environment by the first degree 1536 The movement of the one or more cameras includes rotation of the one or more cameras about a respective axis by a respective amount , and in response to detecting the movement of the one or more cameras, maintain an orientation of the second view of the physical environment in the user interface

Figure 15C

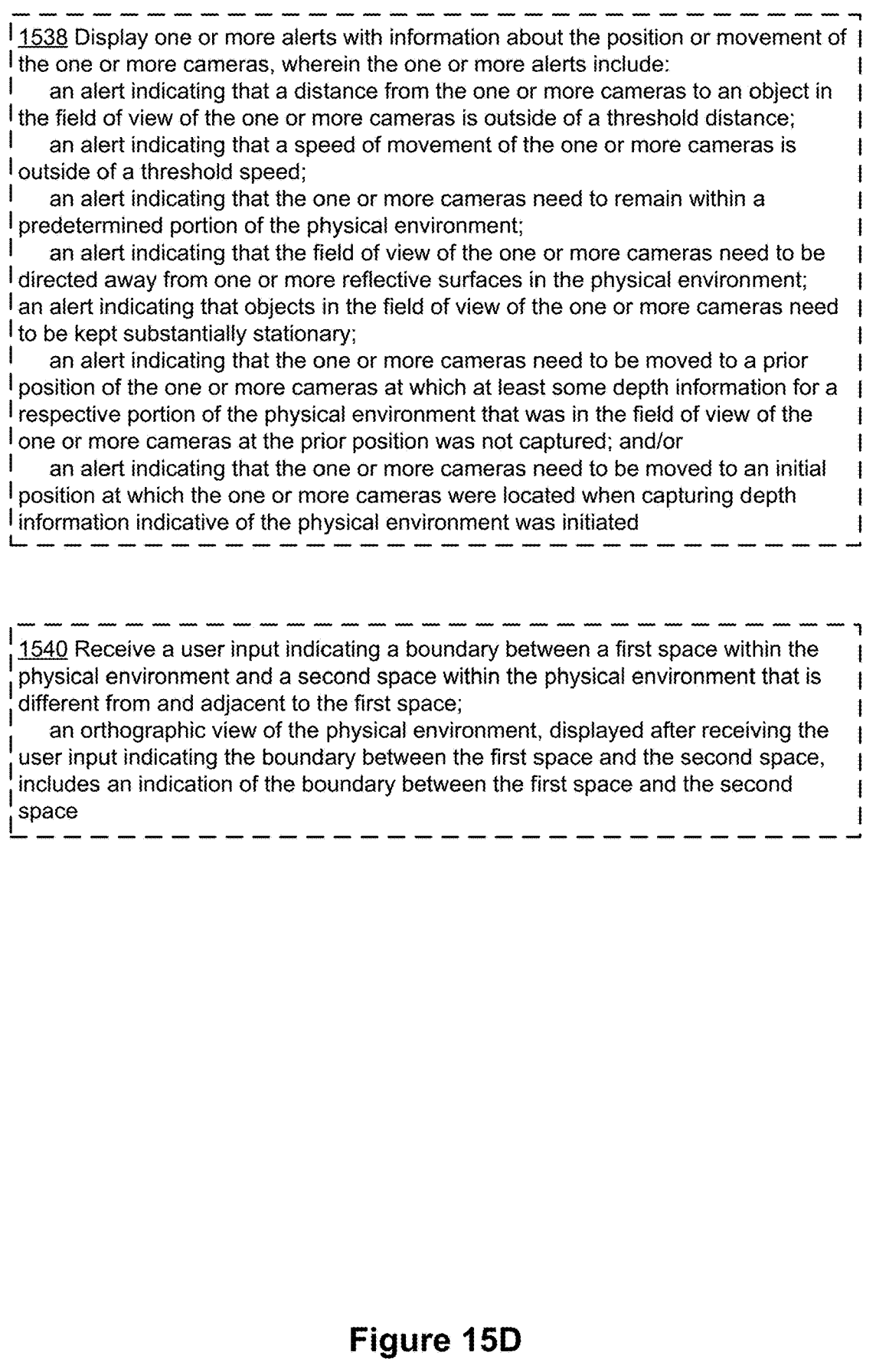

1538 Display one or more alerts with information about the position or movement of the one or more cameras, wherein the one or more alerts include:

an alert indicating that a distance from the one or more cameras to an object in the field of view of the one or more cameras is outside of a threshold distance;

an alert indicating that a speed of movement of the one or more cameras is outside of a threshold speed;

an alert indicating that the one or more cameras need to remain within a predetermined portion of the physical environment;

an alert indicating that the field of view of the one or more cameras need to be directed away from one or more reflective surfaces in the physical environment;

an alert indicating that objects in the field of view of the one or more cameras need to be kept substantially stationary;

an alert indicating that the one or more cameras need to be moved to a prior position of the one or more cameras at which at least some depth information for a respective portion of the physical environment that was in the field of view of the one or more cameras at the prior position was not captured; and/or an alert indicating that the one or more cameras need to be moved to an initial position at which the one or more cameras were located when capturing depth information indicative of the physical environment was initiated 1540 Receive a user input indicating a boundary between a first space within the physical environment and a second space within the physical environment that is different from and adjacent to the first space;

an orthographic view of the physical environment, displayed after receiving the user input indicating the boundary between the first space and the second space, includes an indication of the boundary between the first space and the second space

Figure 15D

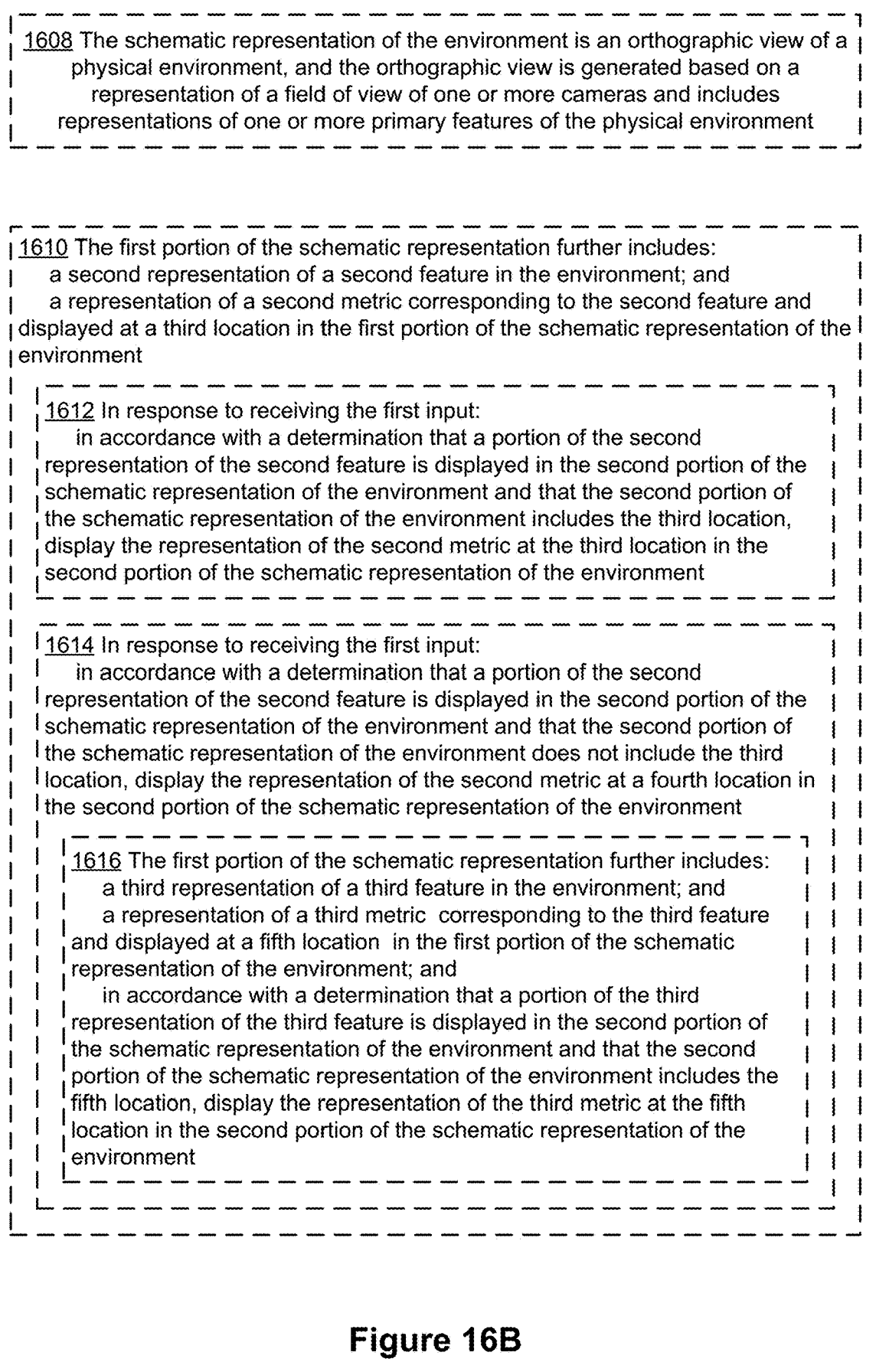

1608 The schematic representation of the environment is an orthographic view of a physical environment, and the orthographic view is generated based on a representation of a field of view of one or more cameras and includes representations of one or more primary features of the physical environment 1610 The first portion of the schematic representation further includes:
a second representation of a second feature in the environment; and
a representation of a second metric corresponding to the second feature and displayed at a third location in the first portion of the schematic representation of the environment 1612 In response to receiving the first input:
in accordance with a determination that a portion of the second representation of the second feature is displayed in the second portion of the schematic representation of the environment and that the second portion of the schematic representation of the environment includes the third location, display the representation of the second metric at the third location in the second portion of the schematic representation of the environment 1614 In response to receiving the first input:
in accordance with a determination that a portion of the second representation of the second feature is displayed in the second portion of the schematic representation of the environment and that the second portion of the schematic representation of the environment does not include the third location, display the representation of the second metric at a fourth location in the second portion of the schematic representation of the environment 1616 The first portion of the schematic representation further includes:
a third representation of a third feature in the environment; and
a representation of a third metric corresponding to the third feature and displayed at a fifth location in the first portion of the schematic representation of the environment; and
in accordance with a determination that a portion of the third representation of the third feature is displayed in the second portion of the schematic representation of the environment and that the second portion of the schematic representation of the environment includes the fifth location, display the representation of the third metric at the fifth location in the second portion of the schematic representation of the environment

Figure 16B

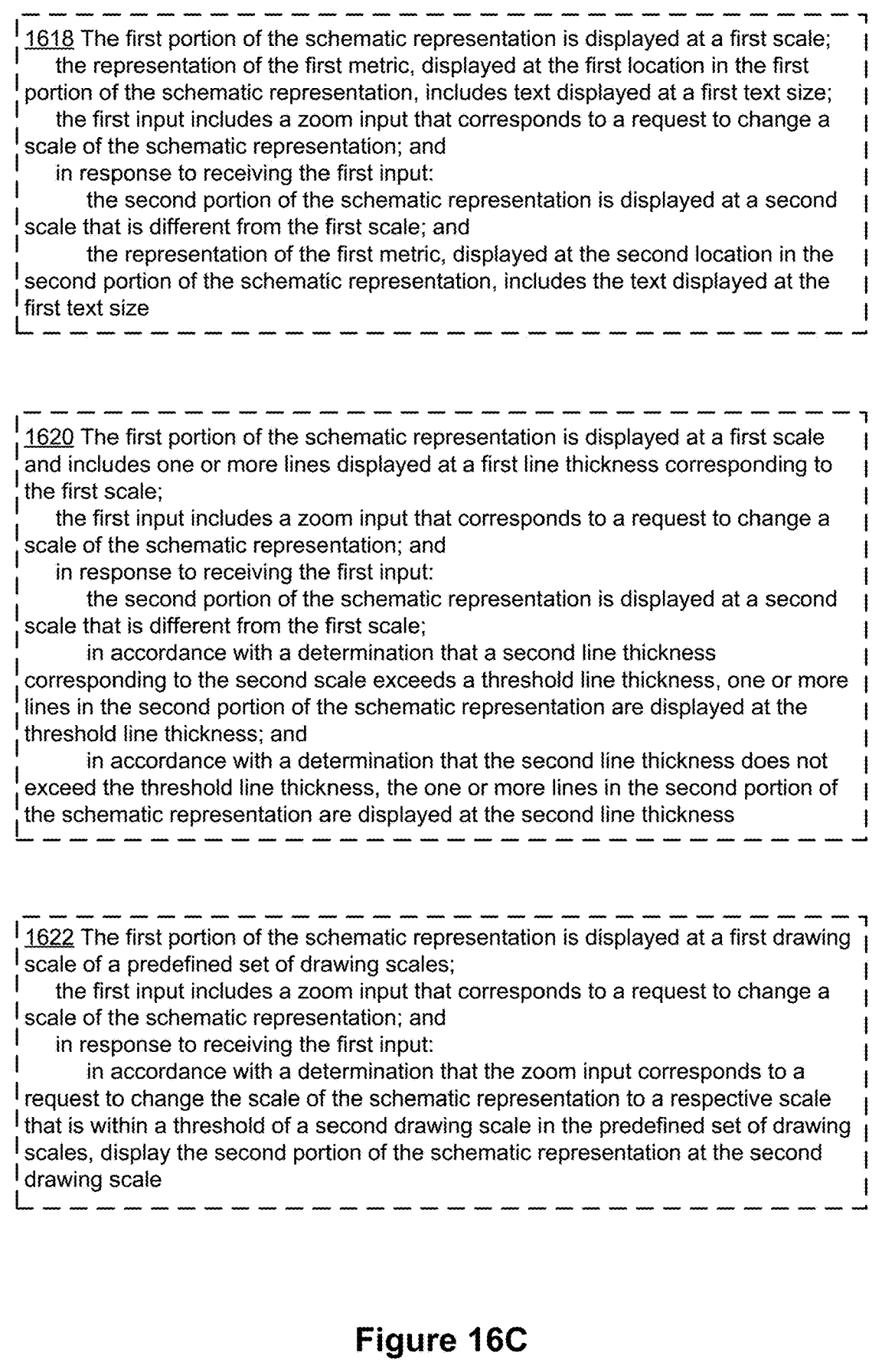

1618 The first portion of the schematic representation is displayed at a first scale;
the representation of the first metric, displayed at the first location in the first portion of the schematic representation, includes text displayed at a first text size;
the first input includes a zoom input that corresponds to a request to change a scale of the schematic representation; and
in response to receiving the first input:
the second portion of the schematic representation is displayed at a second scale that is different from the first scale; and
the representation of the first metric, displayed at the second location in the second portion of the schematic representation, includes the text displayed at the first text size 1620 The first portion of the schematic representation is displayed at a first scale and includes one or more lines displayed at a first line thickness corresponding to the first scale;
the first input includes a zoom input that corresponds to a request to change a scale of the schematic representation; and
in response to receiving the first input:
the second portion of the schematic representation is displayed at a second scale that is different from the first scale;
in accordance with a determination that a second line thickness corresponding to the second scale exceeds a threshold line thickness, one or more lines in the second portion of the schematic representation are displayed at the threshold line thickness; and
in accordance with a determination that the second line thickness does not exceed the threshold line thickness, the one or more lines in the second portion of the schematic representation are displayed at the second line thickness 1622 The first portion of the schematic representation is displayed at a first drawing scale of a predefined set of drawing scales;
the first input includes a zoom input that corresponds to a request to change a scale of the schematic representation; and
in response to receiving the first input:
in accordance with a determination that the zoom input corresponds to a request to change the scale of the schematic representation to a respective scale that is within a threshold of a second drawing scale in the predefined set of drawing scales, display the second portion of the schematic representation at the second drawing scale

Figure 16C

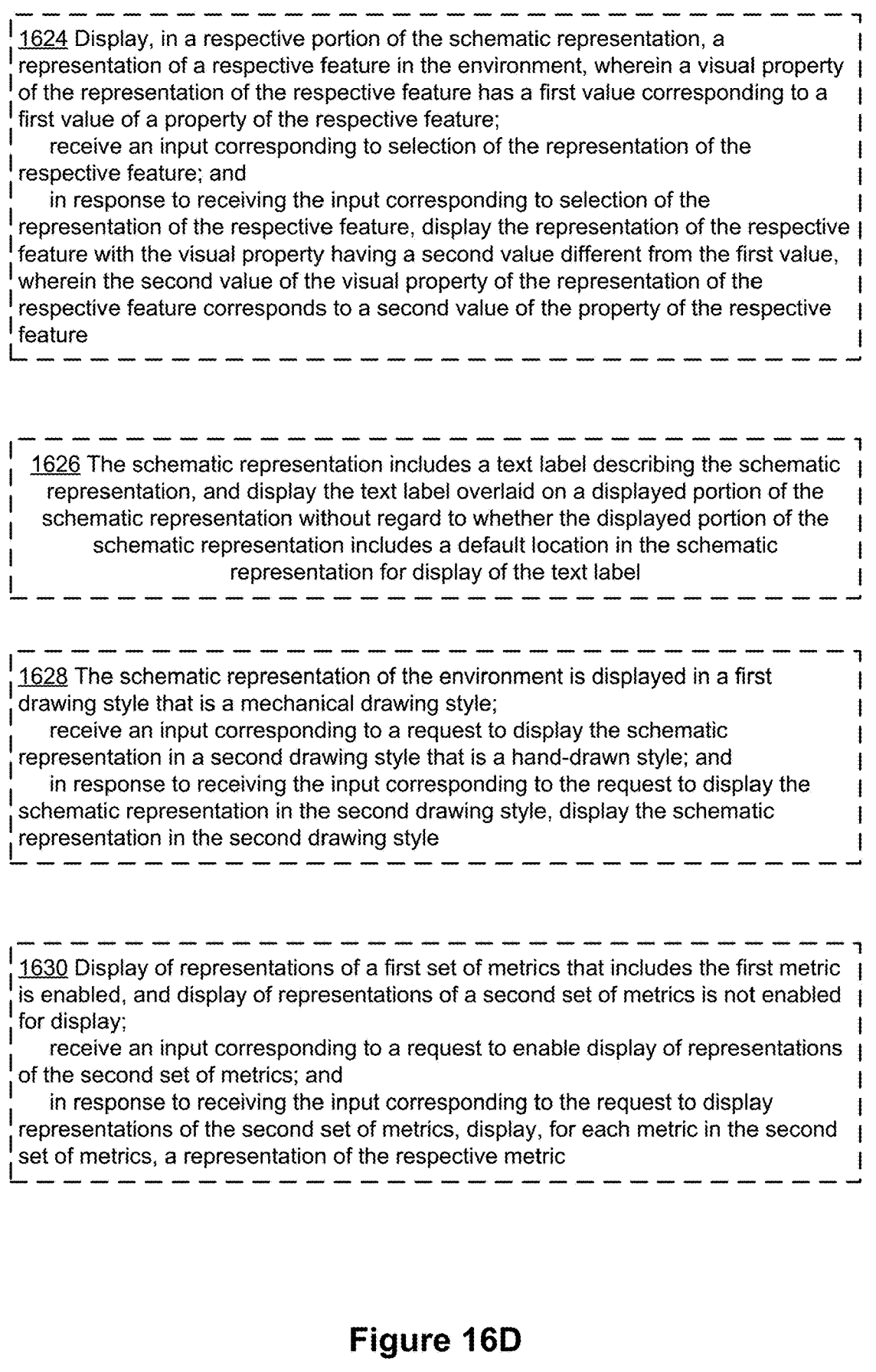

1624 Display, in a respective portion of the schematic representation, a representation of a respective feature in the environment, wherein a visual property of the representation of the respective feature has a first value corresponding to a first value of a property of the respective feature;

receive an input corresponding to selection of the representation of the respective feature; and in response to receiving the input corresponding to selection of the representation of the respective feature, display the representation of the respective feature with the visual property having a second value different from the first value, wherein the second value of the visual property of the representation of the respective feature corresponds to a second value of the property of the respective feature 1626 The schematic representation includes a text label describing the schematic representation, and display the text label overlaid on a displayed portion of the schematic representation without regard to whether the displayed portion of the schematic representation includes a default location in the schematic representation for display of the text label 1628 The schematic representation of the environment is displayed in a first drawing style that is a mechanical drawing style;

receive an input corresponding to a request to display the schematic representation in a second drawing style that is a hand-drawn style; and in response to receiving the input corresponding to the request to display the schematic representation in the second drawing style, display the schematic representation in the second drawing style 1630 Display of representations of a first set of metrics that includes the first metric is enabled, and display of representations of a second set of metrics is not enabled for display;

receive an input corresponding to a request to enable display of representations of the second set of metrics; and in response to receiving the input corresponding to the request to display representations of the second set of metrics, display, for each metric in the second set of metrics, a representation of the respective metric

Figure 16D

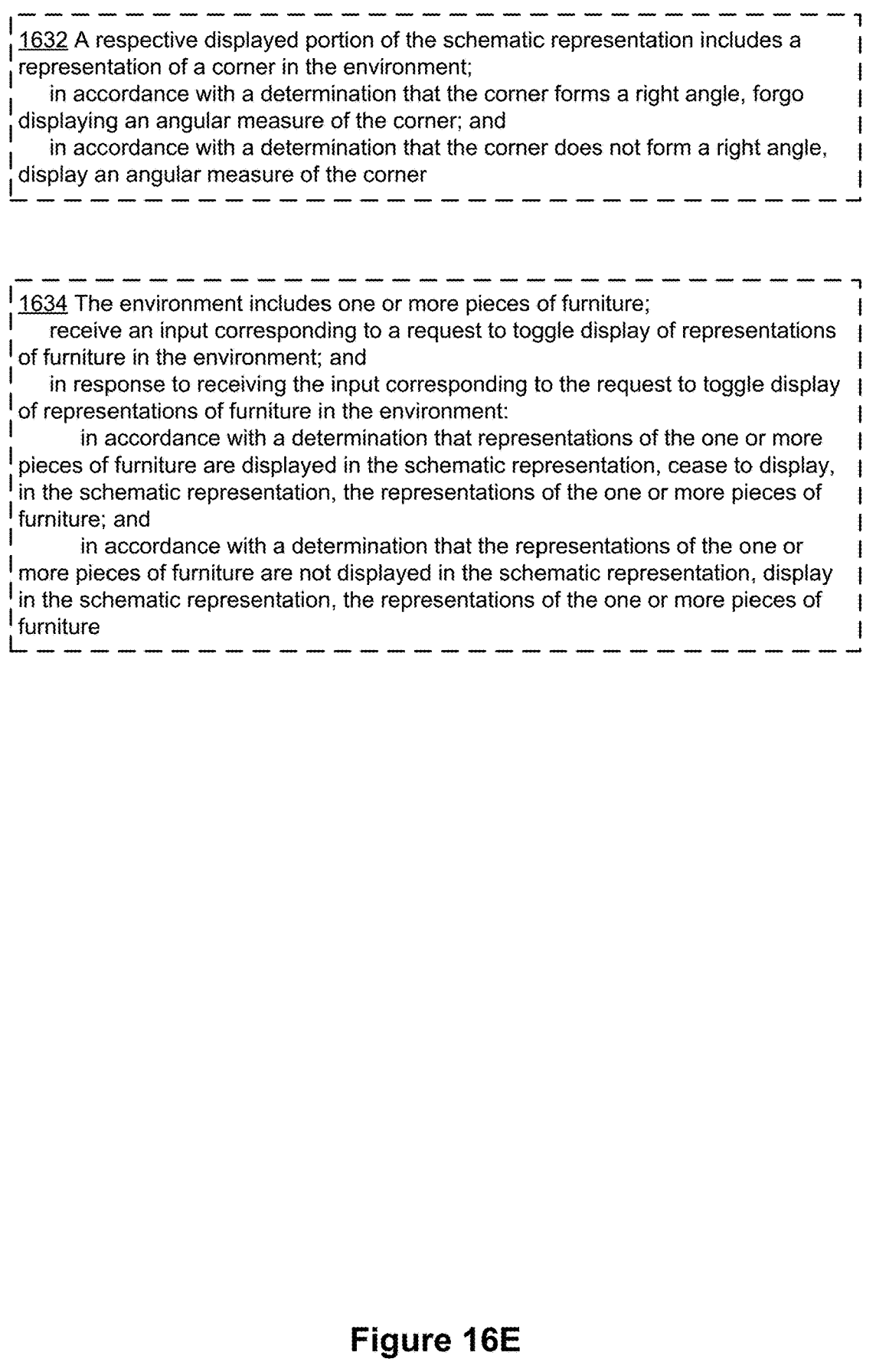

1632 A respective displayed portion of the schematic representation includes a representation of a corner in the environment;

in accordance with a determination that the corner forms a right angle, forgo displaying an angular measure of the corner; and in accordance with a determination that the corner does not form a right angle, display an angular measure of the corner 1634 The environment includes one or more pieces of furniture;

receive an input corresponding to a request to toggle display of representations of furniture in the environment; and in response to receiving the input corresponding to the request to toggle display of representations of furniture in the environment:

in accordance with a determination that representations of the one or more pieces of furniture are displayed in the schematic representation, cease to display, in the schematic representation, the representations of the one or more pieces of furniture; and in accordance with a determination that the representations of the one or more pieces of furniture are not displayed in the schematic representation, display in the schematic representation, the representations of the one or more pieces of furniture

Figure 16E

SYSTEMS, METHODS, AND GRAPHICAL USER INTERFACES FOR ANNOTATING, MEASURING, AND MODELING ENVIRONMENTS

RELATED APPLICATIONS

This application is a continuation of U.S. patent application Ser. No. 17/344,846, filed Jun. 10, 2021, which is a continuation of U.S. patent application Ser. No. 17/018,980, filed Sep. 11, 2020, now U.S. Pat. No. 11,138,771, which claims priority to U.S. Provisional Patent Application No. 62/969,647, filed Feb. 3, 2020, each of which is hereby incorporated by reference in its entirety.

TECHNICAL FIELD

This relates generally to computer systems for augmented and/or virtual reality, including but not limited to electronic devices for annotating, measuring, and modeling environments, such as physical environments, and/or objects therein using augmented and/or virtual reality environments.

BACKGROUND

The development of computer systems for augmented and/or virtual reality has increased significantly in recent years. Augmented reality environments are useful for annotating and modeling physical environments and objects therein. But conventional methods of annotating and measuring using augmented and/or virtual reality are cumbersome, inefficient, and limited. In some cases, conventional methods of measuring using augmented reality are limited in functionality, by requiring the user to specify what type of measurement to make of a particular feature. In some cases, conventional methods of annotating using augmented reality do not provide guides to help the user add annotations, or provide guides in a static manner without considering the current context as annotation progresses. In some cases, conventional methods of annotating using augmented reality do not keep track of annotations that have been made, and the user is not able to efficiently review past annotation activity. In some cases, conventional methods of annotating and measuring using augmented reality are limited to straight-line annotations and measurements that do not take into account the shape or curvature of physical surfaces. In some cases, conventional methods of annotating using augmented reality require separate inputs for each annotation that the user adds. In some cases, conventional methods of modeling a physical environment do not provide the user with sufficient feedback about the progress of the modeling process. In some cases, conventional methods of viewing a model, such as a schematic representation, of an environment do not maintain relevant aspects of the model in view. In addition, conventional methods take longer than necessary, thereby wasting energy. This latter consideration is particularly important in battery-operated devices.

SUMMARY

Accordingly, there is a need for computer systems with improved methods and interfaces for annotating, measuring, and modeling environments using augmented and/or virtual reality environments. Such methods and interfaces optionally complement or replace conventional methods for annotating, measuring, and modeling environments using augmented and/or virtual reality environments. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for augmented and/or virtual reality are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a touchpad. In some embodiments, the computer system has (and/or is in communication with) a touch-sensitive display (also known as a "touch screen" or "touch-screen display"). In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, in addition to an augmented reality-based measurement function, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system with a display device and one or more cameras. The method includes displaying, via the display device, an annotation placement user interface, the annotation placement user interface including: a representation of a field of view of the one or more cameras, including a representation of a portion of a three-dimensional physical environment that is in the field of view of the one or more cameras. The method includes that the representation of the field of view is updated over time based on changes in the field of view of the one or more cameras; and a placement user interface element that indicates a location at which a virtual annotation would be placed in the representation of the field of view in response to receiving an annotation placement input. The method includes, while displaying the annotation placement user interface, detecting a first movement of the one or more cameras relative to the physical environment; and in response to detecting the first movement of the one or more cameras relative to the physical environment, updating the representation of the field of view based on the first movement of the one or more cameras. The method also includes, in accordance with a determination that the placement user interface element is over at least a portion of a representation of a physical feature in the physical environment that can be measured, changing an appearance of the placement user interface element in accordance with one or more aspects of the representation of the physical feature. The method includes, while displaying the annotation placement user interface, receiving an annotation placement input comprising a request to perform one or more measurements of the physical feature. The method also includes, in response to receiving the input corresponding to the request to perform one or more measurements of the physical feature: in accordance with a determination that the physical feature is a first type of physical feature, displaying, over the representation of the physical feature, a first set of one or more representations of measurements of a first measurement type; and in accordance with a determination that the physical feature is a second type of physical feature, different from the first type of physical feature, displaying, over the representation of the physical feature, a second set of one or more representations of measurements of a second measurement type different from the first measurement type.

In accordance with some embodiments, a method is performed at a computer system with a display device and one or more cameras. The method includes displaying, via the display device, an annotation placement user interface. The annotation placement user interface includes a representation of a field of view of the one or more cameras, including a representation of a portion of a three-dimensional physical environment that is in the field of view of the one or more cameras, wherein the representation of the field of view is updated over time based on changes in the field of view of the one or more cameras, and a placement user interface element that indicates a location at which a virtual annotation would be placed in the representation of the field of view in response to receiving an annotation placement input. The method includes, while displaying the annotation placement user interface, detecting movement of the one or more cameras relative to the physical environment. The method also includes, in response to detecting the movement of the one or more cameras relative to the physical environment: updating the representation of the field of view based on the movement of the one or more cameras; in accordance with a determination that the placement user interface element is over at least a portion of a representation of a first type of feature in the physical environment: changing the appearance of the placement user interface element to indicate that an annotation would be placed at an anchor point corresponding to the first type of feature in response to an annotation placement input; and displaying a first set of one or more guides corresponding to at least a portion of the representation of the first type of feature. The method also includes, in accordance with a determination that the placement user interface element is over at least a portion of a representation of a second type of feature in the physical environment, wherein the second type of feature is different from the first type of feature: changing the appearance of the placement user interface element to indicate that an annotation would be placed at an anchor point corresponding to the second type of feature in response to an annotation placement input; and displaying a second set of one or more guides, different from the first set of one or more guides, corresponding to at least a portion of the representation of the second type of feature.

In accordance with some embodiments, a method is performed at a computer system with a display device and one or more cameras. The method includes displaying, via the display device, an annotation placement user interface. The method also includes that the annotation placement user interface includes: a representation of a field of view of the one or more cameras, including a representation of a portion of a three-dimensional physical environment that is in the field of view of the one or more cameras. The method also includes that the representation of the field of view is updated over time based on changes in the field of view of the one or more cameras. The method also includes that the annotation placement user interface also includes a placement user interface element that indicates a location at which a virtual annotation would be placed in the representation of the field of view in response to receiving an annotation placement input. The method includes, while the placement user interface element indicates a first location in the representation of the field of view, receiving a first annotation placement input, and in response to receiving the first annotation placement input: displaying an annotation at the first location in the representation of the field of view; and displaying one or more first guides that extend from the first location in the representation of the field of view.

In accordance with some embodiments, a method is performed at a computer system with a display device and one or more cameras. The method includes displaying, via the display device, an annotation placement user interface, the annotation placement user interface includes: a representation of a field of view of the one or more cameras, including a representation of a portion of a three-dimensional physical environment that is in the field of view of the one or more cameras, wherein the representation of the field of view is updated over time based on changes in the field of view of the one or more cameras; and a placement user interface element that indicates a location at which a virtual annotation would be placed in the representation of the field of view in response to receiving an annotation placement input. The method also includes, while displaying the annotation placement user interface, detecting movement of the one or more cameras relative to the physical environment, and in response to detecting the movement of the one or more cameras relative to the physical environment: updating the representation of the field of view based on the movement of the one or more cameras; and in accordance with a determination that the placement user interface element is over at least a portion of a representation of a first type of physical feature that is in the physical environment: displaying a first mode indication indicating that the annotation placement user interface is operating in a first annotation mode that is associated with adding annotations of a first type. The method also includes, while displaying the first mode indication, detecting subsequent movement of the one or more cameras relative to the physical environment, and in response to detecting the subsequent movement of the one or more cameras relative to the physical environment: updating the representation of the field of view based on the subsequent movement of the one or more cameras; and in accordance with a determination that the placement user interface element is over at least a portion of a representation of a second type of physical feature that is in the physical environment: displaying a second mode indication indicating that the annotation placement user interface is operating in a second annotation mode, different from the first annotation mode, that is associated with adding annotations of a second type, different from the first type.

In accordance with some embodiments, a method is performed at a computer system with a display device and one or more cameras. The method includes receiving a first input corresponding to a request to display an annotation placement user interface. The method also includes that in response to receiving the first input, displaying, via the display device, the annotation placement user interface, the annotation placement user interface includes a representation of a field of view of the one or more cameras, including a representation of a portion of a three-dimensional physical environment that is in the field of view of the one or more cameras, wherein the representation of the field of view is updated over time based on changes in the field of view. The annotation placement user interface also includes a placement user interface element that indicates a location at which a virtual annotation would be placed in the representation of the field of view in response to receiving an annotation placement input. The annotation placement user interface includes a session history user interface element. The method includes, while displaying the annotation placement user interface: receiving a set of inputs corresponding to a plurality of requests to annotate the representation of the field of view; and in response to receiving the set of inputs, adding a first annotation and a second annotation to the representation of the field of view of the one or more cameras. The method also includes, after adding the first annotation and the second annotation to the representation of the field of view of the one or more cameras, receiving an input corresponding to activation of the session history user interface element; and in response to receiving the input corresponding to activation of the session history user interface element, displaying at least a portion of a list of annotations that includes the first annotation and the second annotation, including concurrently displaying a representation of the first annotation and a representation of the second annotation.

In accordance with some embodiments, a method is performed at a computer system with a display device and one or more cameras. The method includes displaying, via the display device, an annotation placement user interface, the annotation placement user interface including a representation of a field of view of the one or more cameras, the representation of the field of view including a representation of a portion of a three-dimensional physical environment that is in the field of view of the one or more cameras. The representation of the field of view is updated over time based on changes in the field of view of the one or more cameras. The method includes receiving one or more first inputs that correspond to a request to measure from a first location in the representation of the field of view to a second location, different from the first location, in the representation of the field of view. The first location in the representation of the field of view corresponds to a first physical location on a physical surface in the physical environment, and the second location in the representation of the field of view corresponds to a second physical location, different from the first physical location, on the physical surface. The method also includes, in response to receiving the one or more first inputs, displaying, via the display device, a representation of a first measurement from the first location in the representation of the field of view to the second location in the representation of the field of view, including, in accordance with a determination that the physical surface is not a flat surface, accounting for the shape of the physical surface when displaying the representation of the first measurement.

In accordance with some embodiments, a method is performed at a computer system with a display device. The method includes displaying, via the display device, a first user interface of an application executing on the computer system. The method includes that while displaying the first user interface of the application, receiving one or more inputs corresponding to a request to display a second user interface of the application for displaying an annotated representation of first previously-captured media. The method includes, in response to receiving the one or more inputs corresponding to the request to display the second user interface for displaying the annotated representation of the first previously-captured media, displaying the second user interface, including: displaying the representation of the first previously-captured media, wherein the representation of the first previously-captured media includes a representation of a first portion of a three-dimensional physical environment in which the first media was captured; and in accordance with a determination that the representation of the first previously-captured media includes one or more regions corresponding to one or more first physical features in the physical environment that can be measured, displaying one or more representations of measurements of the one or more first physical features.

In accordance with some embodiments, a method is performed at a computer system with a display device and one or more cameras. The method includes displaying, in a first region of a user interface, a representation of a field of view of the one or more cameras. The one or more cameras are in a three-dimensional physical environment, and the representation of the field of view includes a representation of a first view of a first respective portion of the physical environment that is in the field of view of the one or more cameras. The method includes capturing depth information indicative of a first subset of the first respective portion of the physical environment. The method also includes displaying, over the representation of the field of view, a first indication that indicates an extent of the first respective portion of the physical environment for which depth information has been captured, including displaying the first indication overlaid on at least a first portion of the representation of the field of view that includes a representation of the first subset, and displaying at least a second portion of the representation of the field of view without the first indication overlaid. The method includes detecting movement of the one or more cameras that moves the field of view to include a second respective portion of the physical environment, and in response to detecting the movement of the one or more cameras, updating the representation of the field of view of the one or more cameras to include a representation of the first view of the second respective portion of the physical environment. The method also includes, in response to detecting the movement of the one or more cameras, capturing depth information indicative of a second subset of the second respective portion of the physical environment. The method also includes, in response to detecting the movement of the one or more cameras, updating the first indication, displayed over the updated representation of the field of view, to indicate an extent of the second respective portion of the physical environment for which depth information has been captured, including displaying the first indication overlaid on the second portion of the representation of the field of view, the second portion of the representation of the field of view including a representation of the second subset.

In accordance with some embodiments, a method is performed at a computer system with a display device. The method includes displaying a first portion of a schematic representation of an environment. The first portion of the schematic representation includes: a first representation of a first feature in the environment; and a representation of a first metric corresponding to the first feature and displayed at a first location in the first portion of the schematic representation of the environment. The method also includes receiving a first input corresponding to a request to display a second portion of the schematic representation of the environment. The method includes, in response to receiving the first input, displaying the second portion of the schematic representation of the environment. The method includes, in response to receiving the first input, in accordance with a determination that a portion of the first representation of the first feature is displayed in the second portion of the schematic representation of the environment and that the second portion of the schematic representation of the environment does not include the first location, displaying the representation of the first metric at a second location in the second portion of the schematic representation of the environment.

In accordance with some embodiments, a computer system includes (and/or is in communication with) a display generation component (also called a display device, e.g., a display, a projector, a head-mounted display, a heads-up display, or the like), one or more cameras (e.g., video cameras that continuously, or repeatedly at regular intervals, provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or one or more cameras tracking the position of one or more features of the user such as the user's hands), optionally one or more depth sensors, optionally one or more pose sensors, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, cause the computer system to perform or cause performance of the operations of any of the methods described herein. In accordance with some embodiments, a graphical user interface on a computer system that includes (and/or is in communication with) a display generation component, one or more cameras, one or more input devices, optionally one or more pose sensors, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, in accordance with any of the methods described herein. In accordance with some embodiments, a computer system includes (and/or is in communication with) a display generation component, one or more cameras, one or more input devices, optionally one or more pose sensors, optionally one or more sensors to detect intensities of contacts with the touch-sensitive surface, optionally one or more tactile output generators, and means for performing or causing performance of the operations of any of the methods described herein. In accordance with some embodiments, an information processing apparatus, for use in a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, includes means for performing or causing performance of the operations of any of the methods described herein.

Thus, computer systems that have (and/or are in communication with) a display generation component, one or more cameras, one or more input devices, optionally one or more pose sensors, optionally one or more sensors to detect intensities of contacts with the touch-sensitive surface, and optionally one or more tactile output generators, are provided with improved methods and interfaces for annotating, measuring, and modeling environments, such as physical environments, and/or objects therein using augmented and/or virtual reality environments, thereby increasing the effectiveness, efficiency, and user satisfaction with such computer systems. Such methods and interfaces may complement or replace conventional methods for annotating, measuring, and modeling environments, such as physical environments, and/or objects therein using augmented and/or virtual reality environments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 1B is a block diagram illustrating example components for event handling in accordance with some embodiments.

FIGS. 8A-8F are flow diagrams of a process for displaying automatically determined measurements of a physical environment using augmented reality in accordance with some embodiments.

FIGS. 9A-9C are flow diagrams of a process for providing alignment guides based on automatically determined anchor points in an augmented reality environment in accordance with some embodiments.

FIGS. 10A-10C are flow diagrams of a process for providing dynamic alignment guides in response to user input in an augmented reality environment in accordance with some embodiments.

FIGS. 11A-11E are flow diagrams of a process for automatically changing annotation mode based on the types of physical features that are in view in an augmented reality environment in accordance with some embodiments.

FIGS. 12A-12C are flow diagrams of a process for displaying a session history including a list of annotations added using an annotation placement user interface during an annotation session in accordance with some embodiments.

FIGS. 13A-13D are flow diagrams of a process for measuring paths along physical surfaces, taking shape and curvature of the physical surfaces into account, in accordance with some embodiments.

FIGS. 14A-14D are flow diagrams of a process for measuring physical features represented in previously-captured media in accordance with some embodiments.

FIGS. 15A-15D are flow diagrams of a process for scanning a physical environment to capture depth information for modeling the physical environment in accordance with some embodiments.

FIGS. 16A-16E are flow diagrams of a process for viewing and interacting with a schematic representation of an environment in accordance with some embodiments.

DESCRIPTION OF EMBODIMENTS

Figure 1A:
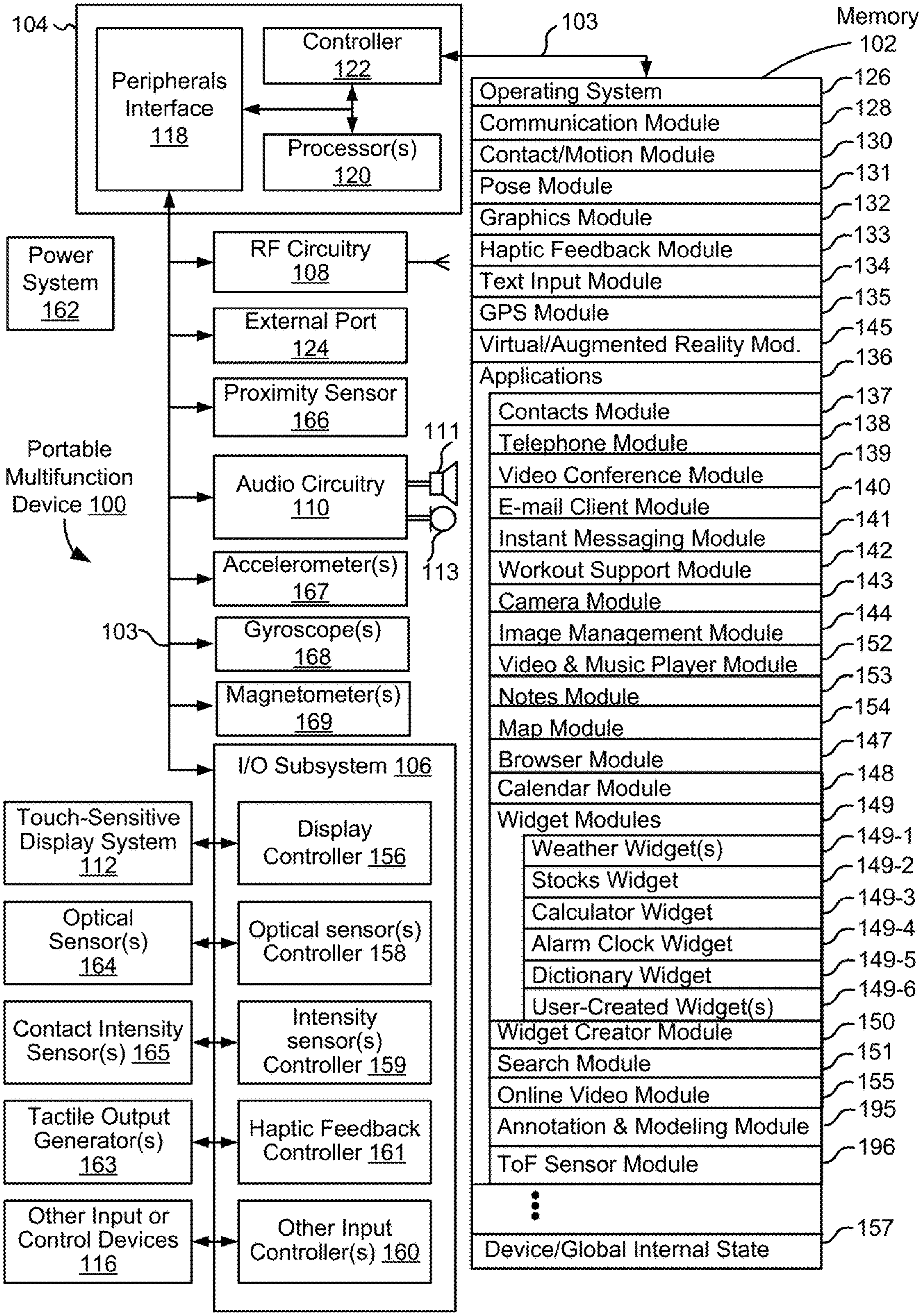
FIG. 1A is a block diagram illustrating a portable multifunction device with a touch-sensitive display in accordance with some embodiments.

As noted above, augmented reality environments are useful for annotating and modeling physical environments and objects therein, by providing different views of the physical environments and objects therein and enabling a user to superimpose annotations such as measurements on the physical environment and objects therein and to visualize interactions between the annotations and the physical environment and objects therein. Conventional methods of annotating and modeling using augmented and/or virtual reality environments are often limited in functionality. In some cases, conventional methods of measuring using augmented reality are limited in functionality, by requiring the user to specify what type of measurement to make of a particular feature. In some cases, conventional methods of annotating using augmented reality do not provide guides to help the user add annotations, or provide guides in a static manner without considering the current context as annotation progresses. In some cases, conventional methods of annotating using augmented reality do not keep track of annotations that have been made, and the user is not able to efficiently review past annotation activity. In some cases, conventional methods of annotating and measuring using augmented reality are limited to straight-line annotations and measurements that do not take into account the shape or curvature of physical surfaces. In some cases, conventional methods of annotating using augmented reality require separate inputs for each annotation that the user adds. In some cases, conventional methods of modeling a physical environment do not provide the user with sufficient feedback about the progress of the modeling process. In some cases, conventional methods of viewing a model, such as a schematic representation, of an environment do not maintain relevant aspects of the model in view. The embodiments disclosed herein provide an intuitive way for a user to annotate, measure, and model an environment using augmented and/or virtual reality environments (e.g., by providing more intelligent and sophisticated functionality, by enabling the user to perform different operations in the augmented reality environment with fewer inputs, and/or by simplifying the user interface). Additionally, the embodiments herein provide improved feedback that provide additional information to the user about the physical objects being measured or modeled and about the operations being performed in the virtual/augmented reality environment.

The systems, methods, and GUIs described herein improve user interface interactions with augmented and/or virtual reality environments in multiple ways. For example, they make it easier to annotate and model a physical environment, by providing automatic detection of features in the physical space and making appropriate measurements for different types of detected features, improved labeling and guides (e.g., for improved annotation placement), by enabling the user to interact with and manage measurement information, by keep relevant annotations and measurements in view over a representation of an environment, and by providing the user with improved feedback about the progress of the modeling process while modeling an environment.

Figure 10A:
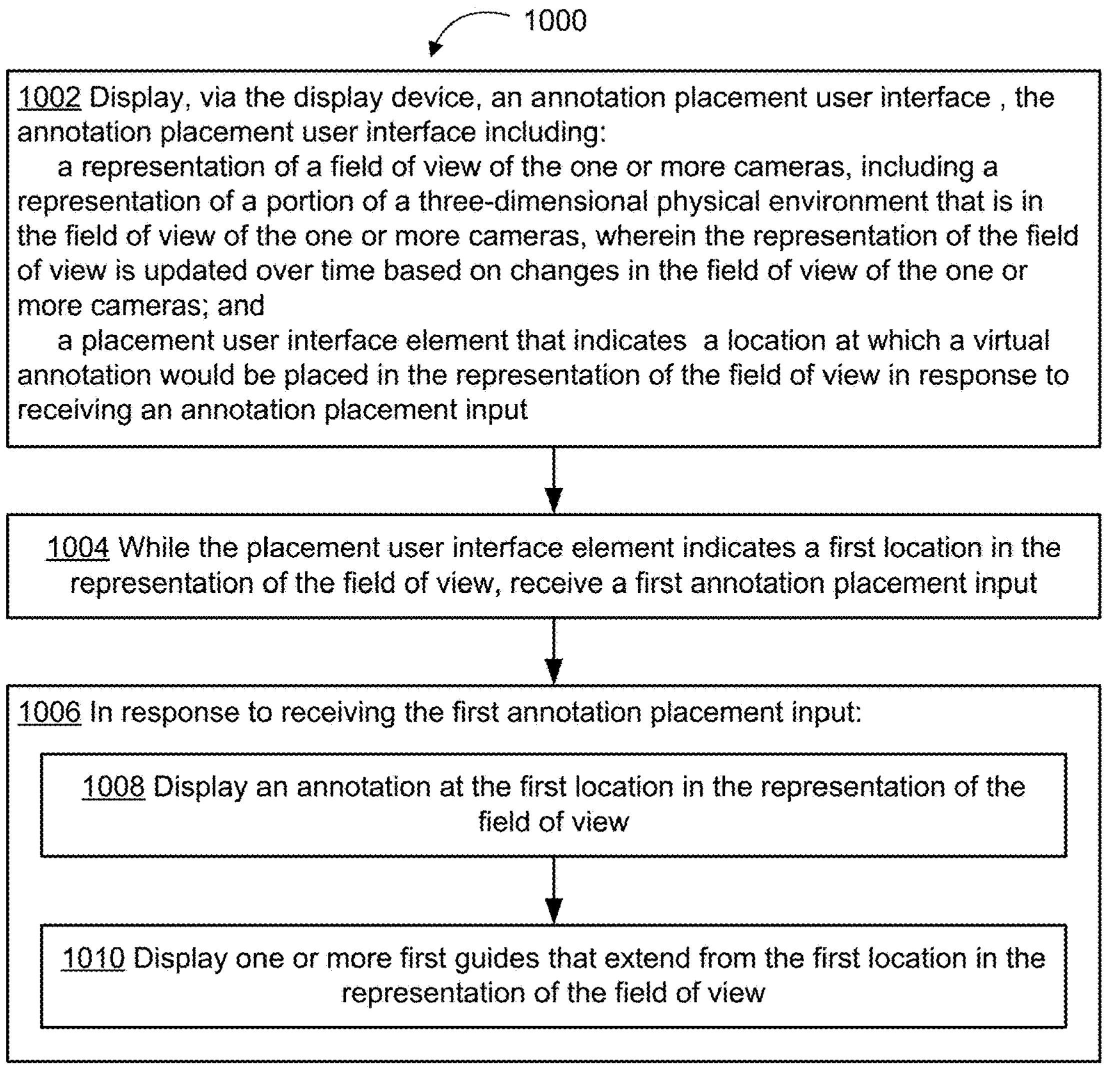
Figure 12A:
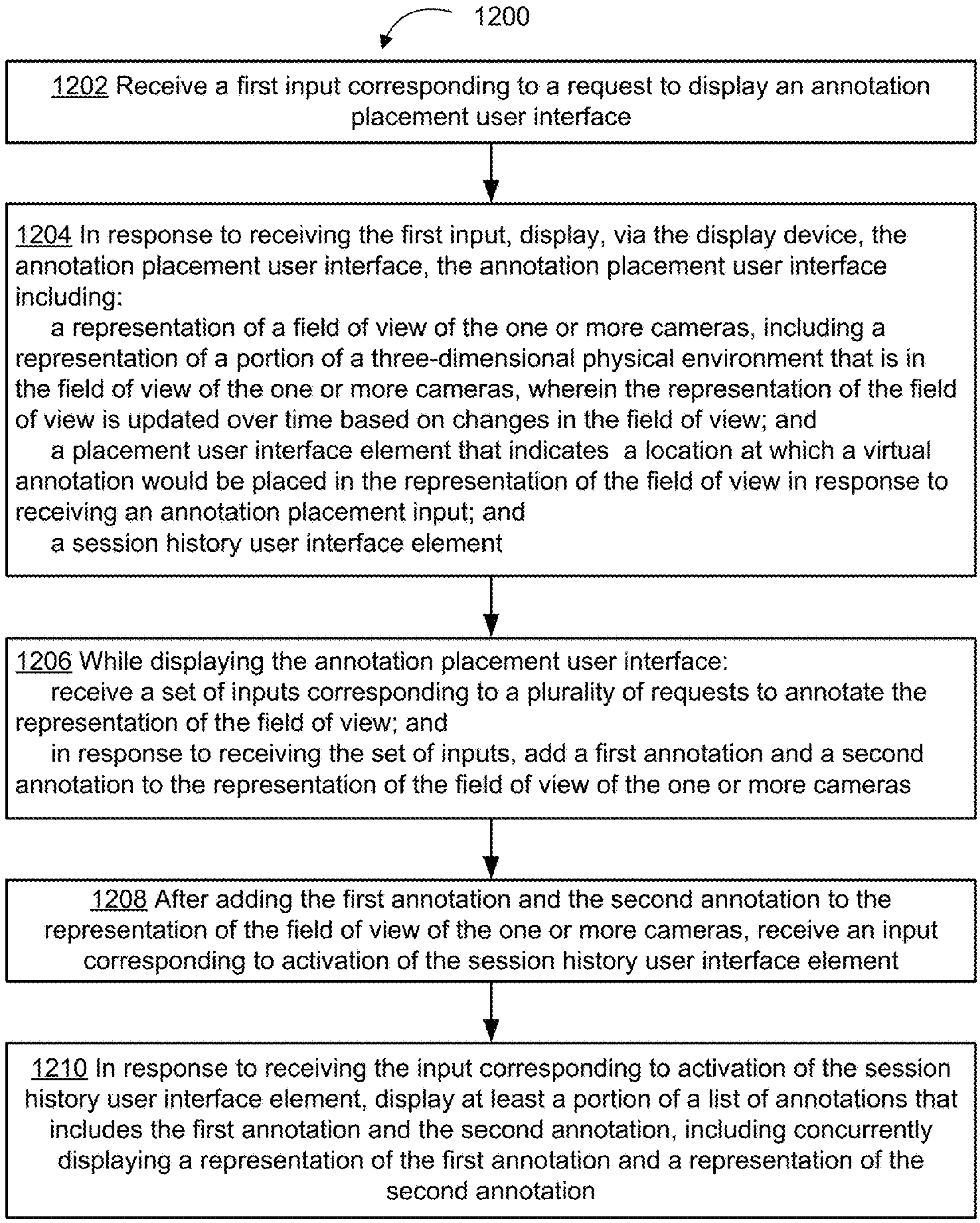
Figure 13A:
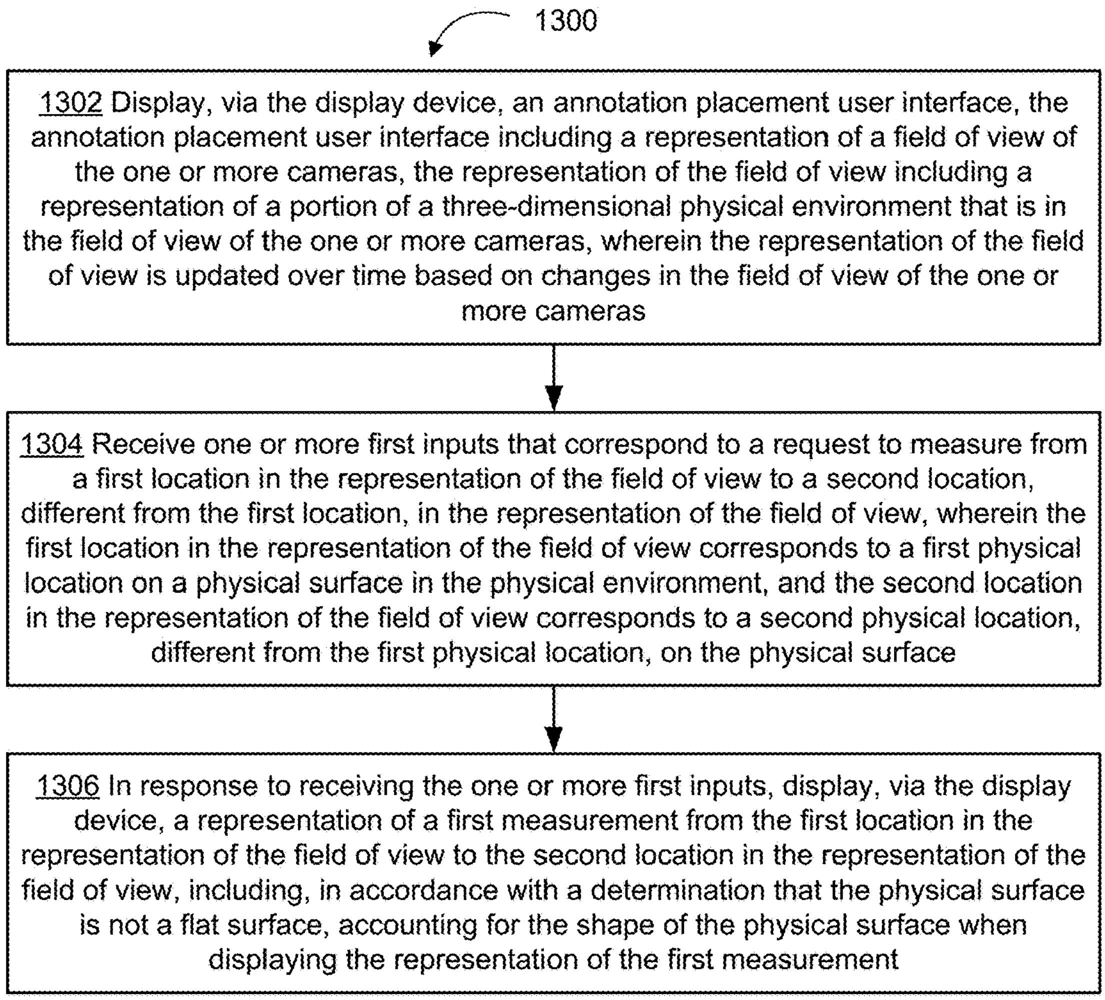
Figure 14A:
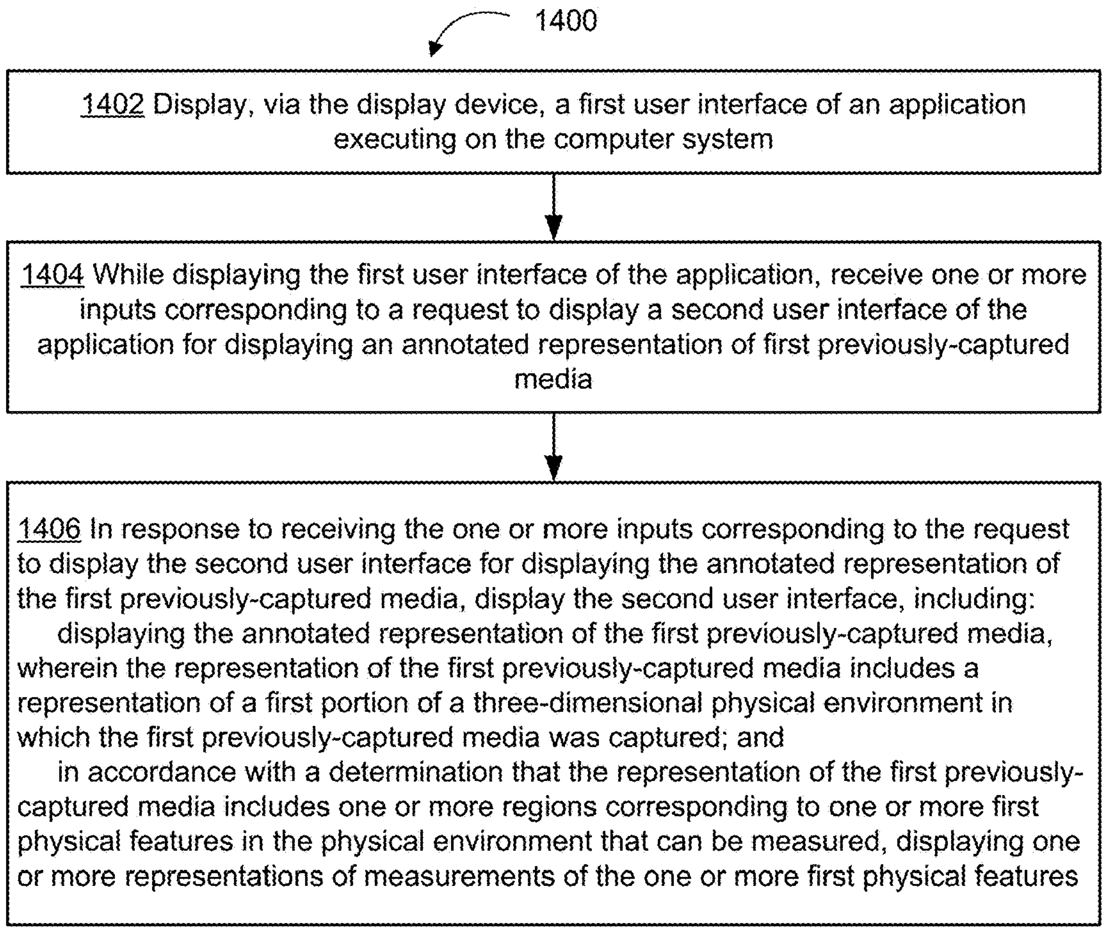
Figure 16A:
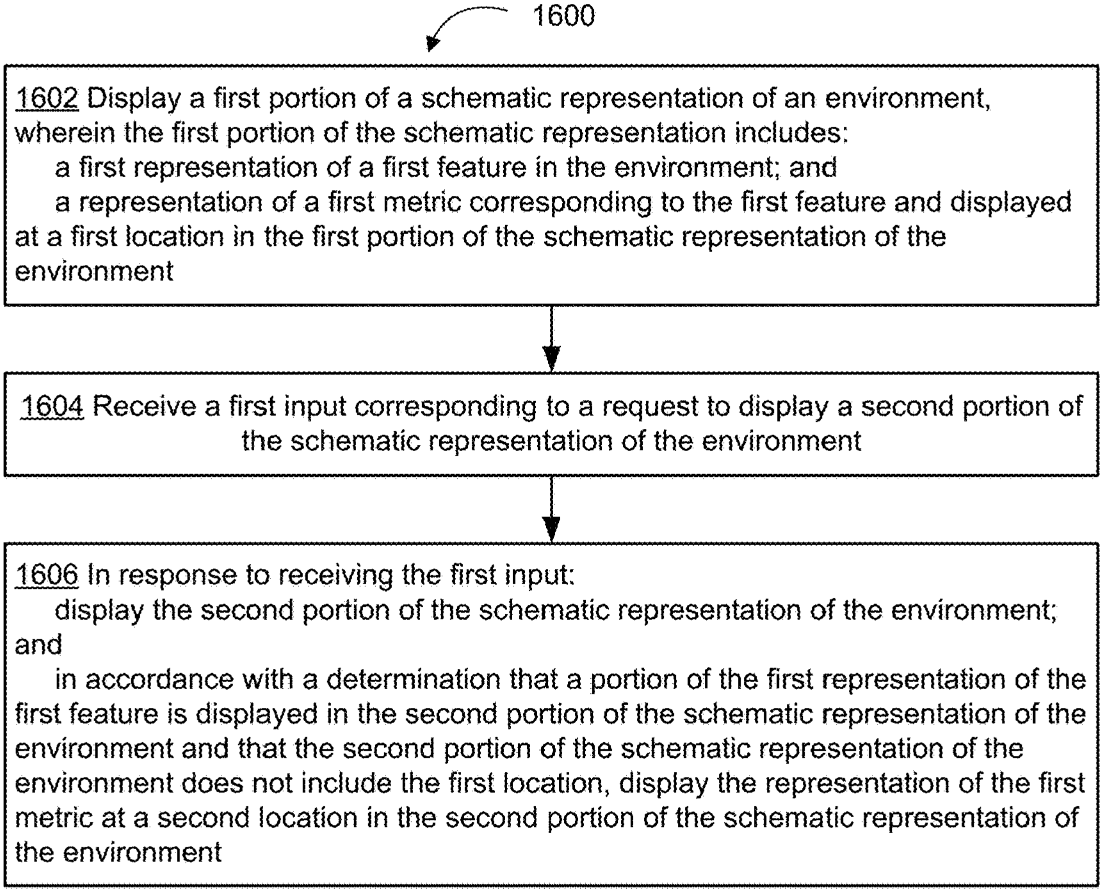

Below, FIGS. 1A-1B, 2A-2B, and 3A-3C provide a description of example devices. FIGS. 4A-4B and 5A-5CN, 6A-6Y, and 7A-7AT illustrate example user interfaces for interacting with, annotating, measuring, and modeling environments, such as augmented reality environments, and media items. FIGS. 8A-8F illustrate a flow diagram of a method of displaying automatically determined measurements of a physical environment using augmented reality. FIGS. 9A-9C illustrate a flow diagram of a method of providing alignment guides based on automatically determined anchor points in an augmented reality environment. FIGS. 10A-10C illustrate a flow diagram of a method of providing dynamic alignment guides in response to user input in an augmented reality environment. FIGS. 11A-11E illustrate a flow diagram of a method for automatically changing annotation mode based on the types of physical features that are in view in an augmented reality environment in accordance with some embodiments. FIGS. 12A-12C illustrate a flow diagram of a method for displaying a session history including a list of annotations added using an annotation placement user interface during an annotation session in accordance with some embodiments. FIGS. 13A-13D illustrate a flow diagram of a method for measuring paths along physical surfaces, taking shape and curvature of the physical surfaces into account, in accordance with some embodiments. FIGS. 14A-14D illustrate a flow diagram of a method for measuring physical features represented in previously-captured media in accordance with some embodiments. FIGS. 15A-15D illustrate a flow diagram of a method for scanning a physical environment to capture depth information for modeling the physical environment in accordance with some embodiments. FIGS. 16A-16E illustrate a flow diagram of a method for viewing and interacting with a schematic representation of an environment in accordance with some embodiments.

Figure 5A:
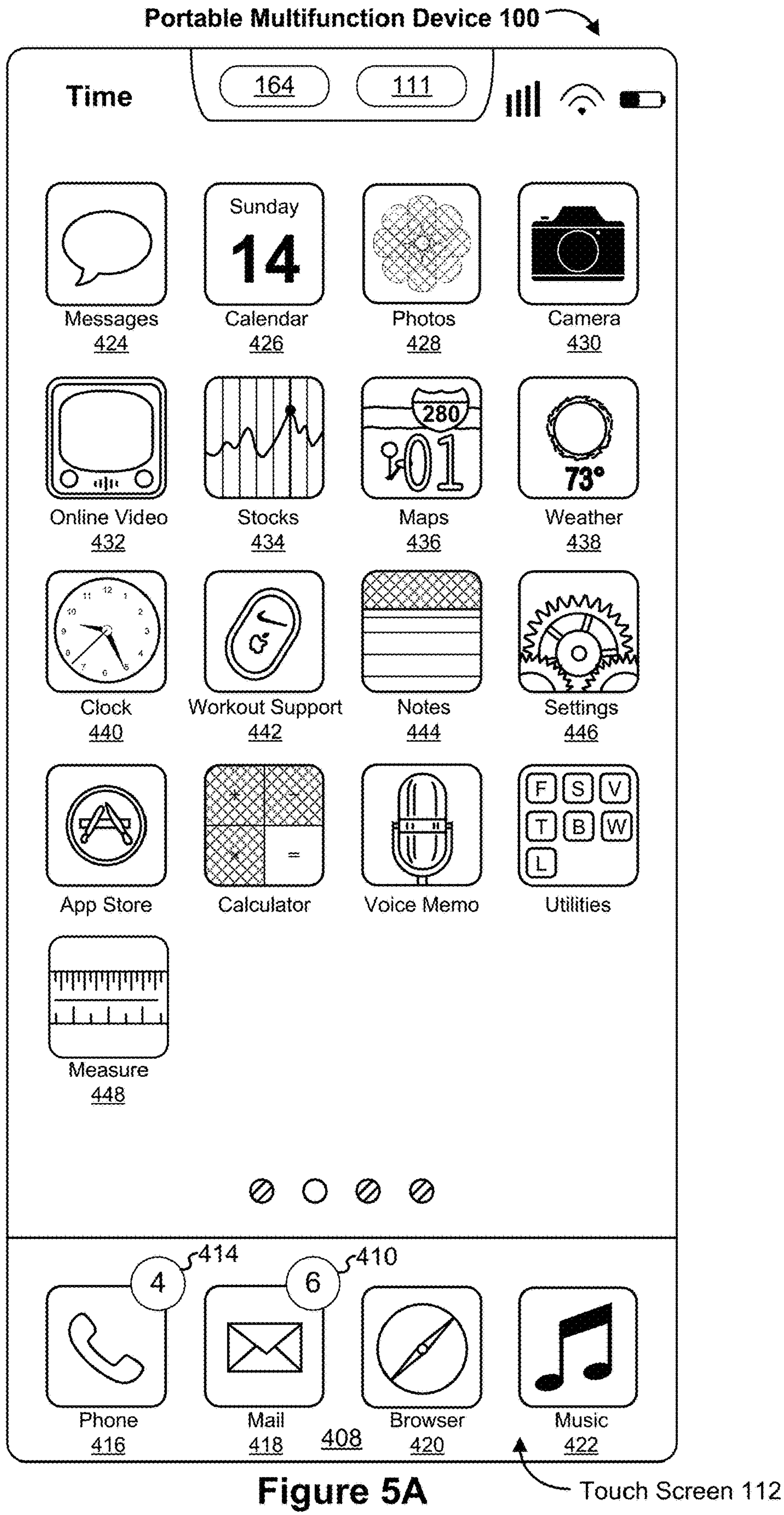
FIGS. 5A-5CN illustrate example user interfaces for annotating and measuring a physical environment using augmented reality in accordance with some embodiments.
Figure 5B:
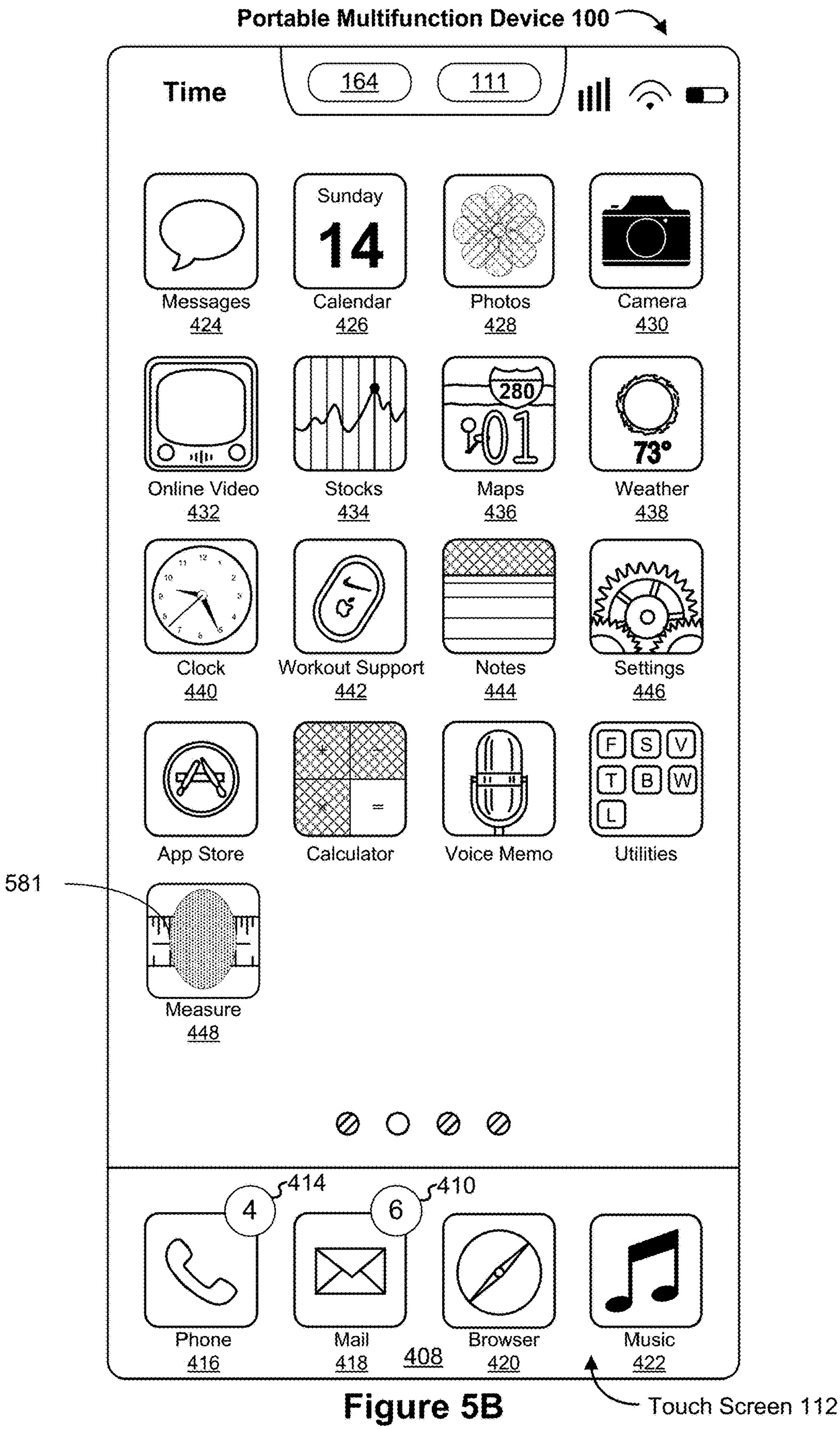
Figure 5C:
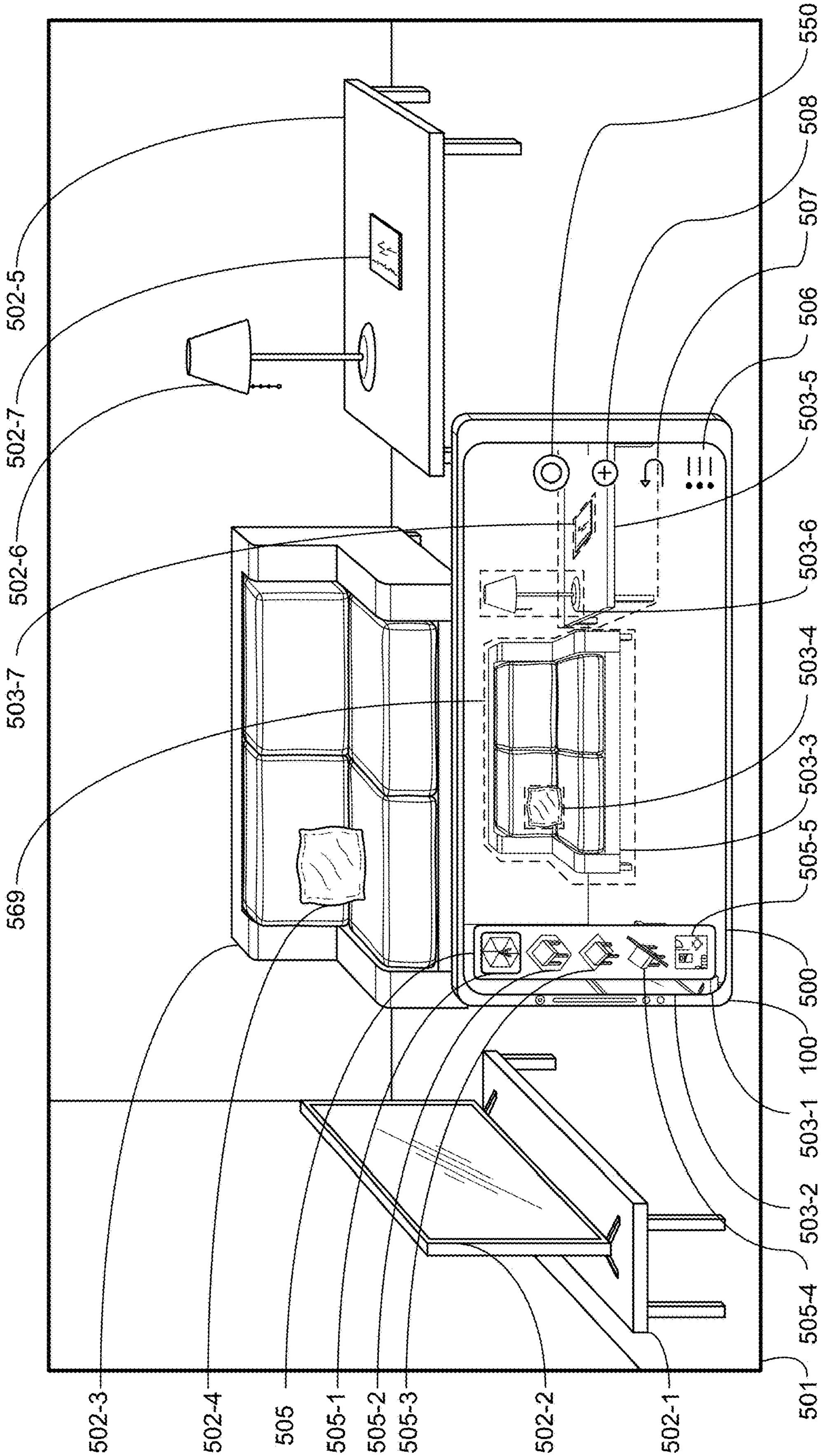

The user interfaces in FIGS. 5A-5CN, 6A-6Y, and 7A-7AT are used to illustrate the processes in FIGS. 8A-8F, 9A-9C, 10A-10C, 11A-11C, 12A-12C, 13A-13D, 14A-14D, 15A-15D, and 16A-16E.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Computer systems for augmented and/or virtual reality include electronic devices that produce augmented and/or virtual reality environments. Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad) that also includes, or is in communication with, one or more cameras.

In the discussion that follows, a computer system that includes an electronic device that has (and/or is in communication with) a display and a touch-sensitive surface is described. It should be understood, however, that the computer system optionally includes one or more other physical user-interface devices, such as a physical keyboard, a mouse, a joystick, a wand controller, and/or cameras tracking the position of one or more features of the user such as the user's hands.

The device typically supports a variety of applications, such as one or more of the following: a gaming application, a note taking application, a drawing application, a presentation application, a word processing application, a spreadsheet application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed by the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164 (e.g., as part of one or more cameras). Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2A). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2A) optionally include an up/down button for volume control of speaker 111 and/or microphone 113. The one or more buttons optionally include a push button (e.g., 206, FIG. 2A).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. In some embodiments, tactile output generator(s) 163 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the pose (e.g., position and orientation or attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's pose (e.g., location and/or attitude).

Operating system 126 (e.g., iOS, Android, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California. In some embodiments, the external port is a USB Type-C connector that is the same as, or similar to and/or compatible with the USB Type-C connector used in some electronic devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Pose module 131, in conjunction with accelerometers 167, gyroscopes 168, and/or magnetometers 169, optionally detects pose information concerning the device, such as the device's pose (e.g., roll, pitch, yaw and/or position) in a particular frame of reference. Pose module 131 includes software components for performing various operations related to detecting the position of the device and detecting changes to the pose of the device.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Virtual/augmented reality module 145 provides virtual and/or augmented reality logic to applications 136 that implement augmented reality, and in some embodiments virtual reality, features. Virtual/augmented reality module 145 facilitates superposition of virtual content, such as a virtual user interface object, on a representation of at least a portion of a field of view of the one or more cameras. For example, with assistance from the virtual/augmented reality module 145, the representation of at least a portion of a field of view of the one or more cameras may include a respective physical object and the virtual user interface object may be displayed at a location, in a displayed augmented reality environment, that is determined based on the respective physical object in the field of view of the one or more cameras or a virtual reality environment that is determined based on the pose of at least a portion of a computer system (e.g., a pose of a display device that is used to display the user interface to a user of the computer system).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or online video module 155;
- annotation and modeling module 195; and/or
- time-of-flight ("ToF") sensor module 196.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

In conjunction with touch-sensitive display system 112, display controller 156, contact module 130, graphics module 132, camera module 143, image management module 152, video & music player module 152, and virtual/augmented reality module 145, annotation and modeling module 195 includes executable instructions that allow the user to model physical environments and/or physical objects therein and to annotate (e.g., measure, draw on, and/or add virtual objects to and manipulate virtual objects within) a representation (e.g., live or previously-captured) of a physical environment and/or physical objects therein in an augmented and/or virtual reality environment, as described in more detail herein.

In conjunction with camera module 143, ToF sensor module 196 includes executable instructions for capturing depth information of a physical environment. In some embodiments, ToF sensor module 196 operates in conjunction with camera module 143 to provide depth information of a physical environment.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touch-sensitive surface. In some other embodiments, the menu button is a physical push button or other physical input control device instead of a touch-sensitive surface.

FIG. 1B is a block diagram illustrating example components for event handling in accordance with some embodiments. In some embodiments, memory 102 (in FIG. 1A) or 370 (FIG. 3A) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current pose (e.g., position and orientation) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; inputs based on real-time analysis of video images obtained by one or more cameras; movement of the device; oral instructions; detected eye movements; biometric inputs; and/or any combination thereof are optionally utilized as inputs corresponding to sub-events which define an event to be recognized.

Figure 2A:
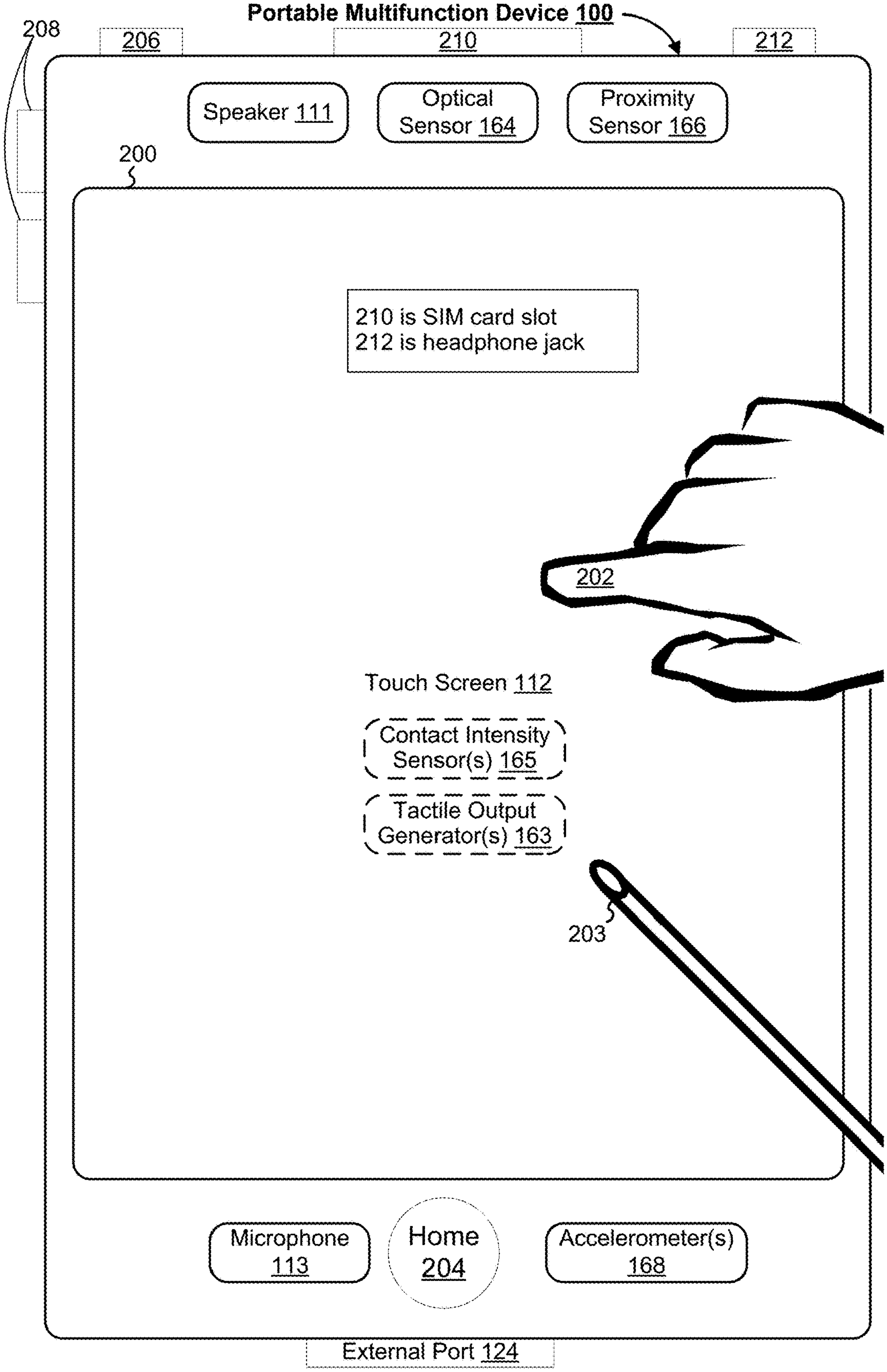
FIG. 2A illustrates a portable multifunction device having a touch screen in accordance with some embodiments.

FIG. 2A illustrates a portable multifunction device 100 (e.g., a view of the front of device 100) having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 163 for generating tactile outputs for a user of device 100.

Figure 2B:
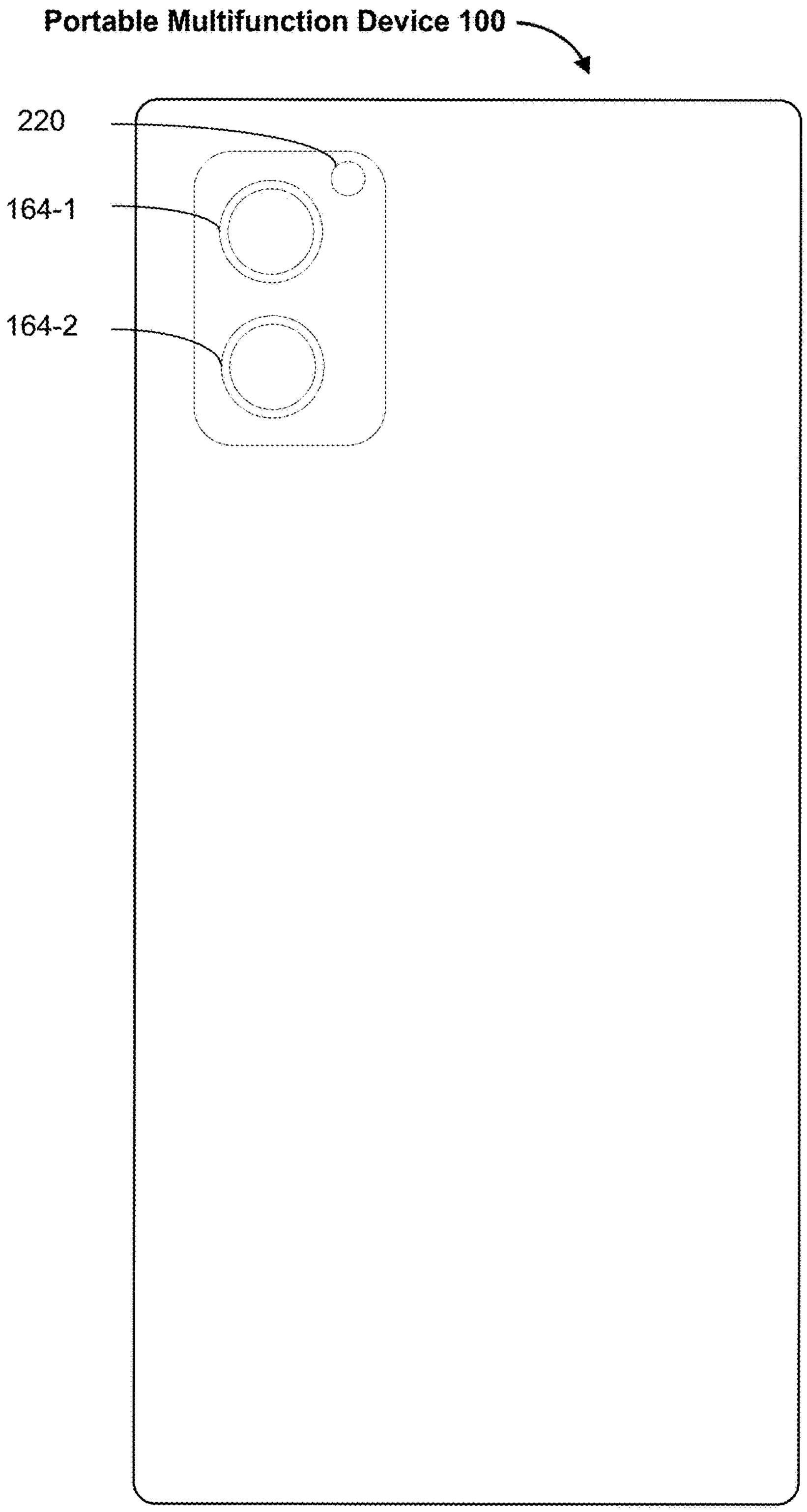
FIG. 2B illustrates a portable multifunction device having optical sensors and a time-of-flight sensor in accordance with some embodiments.

FIG. 2B illustrates a portable multifunction device 100 (e.g., a view of the back of device 100) that optionally includes optical sensors 164-1 and 164-2, and time-of-flight ("ToF") sensor 220. When optical sensors (e.g., cameras) 164-1 and 164-2 concurrently capture a representation of a physical environment (e.g., an image or a video), the portable multifunction device can determine depth information from the disparity between the information concurrently captured by the optical sensors (e.g., disparities between the captured images). Depth information provided by (e.g., image) disparities determined using optical sensors 164-1 and 164-2 may lack accuracy, but typically provides high resolution. To improve the accuracy of depth information provided by the disparity between images, time-of-flight sensor 220 is optionally used in conjunction with optical sensors 164-1 and 164-2. ToF sensor 220 emits a waveform (e.g., light from a light emitting diode (LED) or a laser), and measures the time it takes for the reflection(s) of the waveform (e.g., light) to return back to ToF sensor 220. Depth information is determined from the measured time it takes for the light to return back to ToF sensor 220. A ToF sensor typically provides high accuracy (e.g., accuracy of 1 cm or better with respect to measured distances or depths), but may lack high resolution (e.g., ToF sensor 220 optionally has a resolution that is one quarter of the resolution of optical sensors 164, or less than one quarter of the resolution of optical sensors 164, or one sixteenth of the resolution of optical sensors 164, or less than one sixteenth of the resolution of optical sensors 164). Therefore, combining depth information from a ToF sensor with depth information provided by (e.g., image) disparities determined using optical sensors (e.g., cameras) provides a depth map that is both accurate and has high resolution.

Figure 3A:
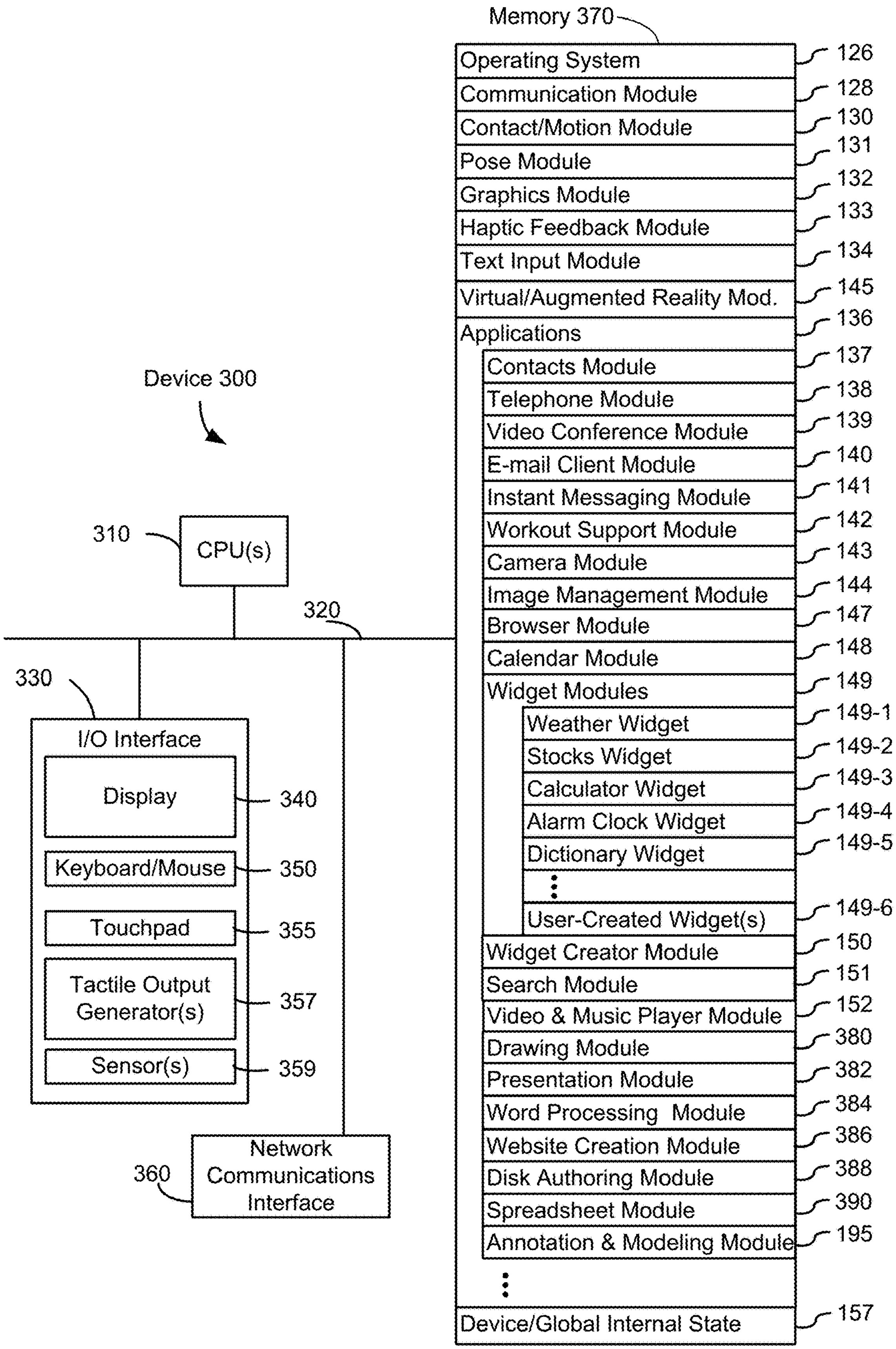
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is optionally a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., optical, acceleration, proximity, touch-sensitive, and/or contact intensity sensors similar to analogous described above with reference to FIG. 1A, and optionally a time-of-flight sensor 220 described above with reference to FIG. 2B). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
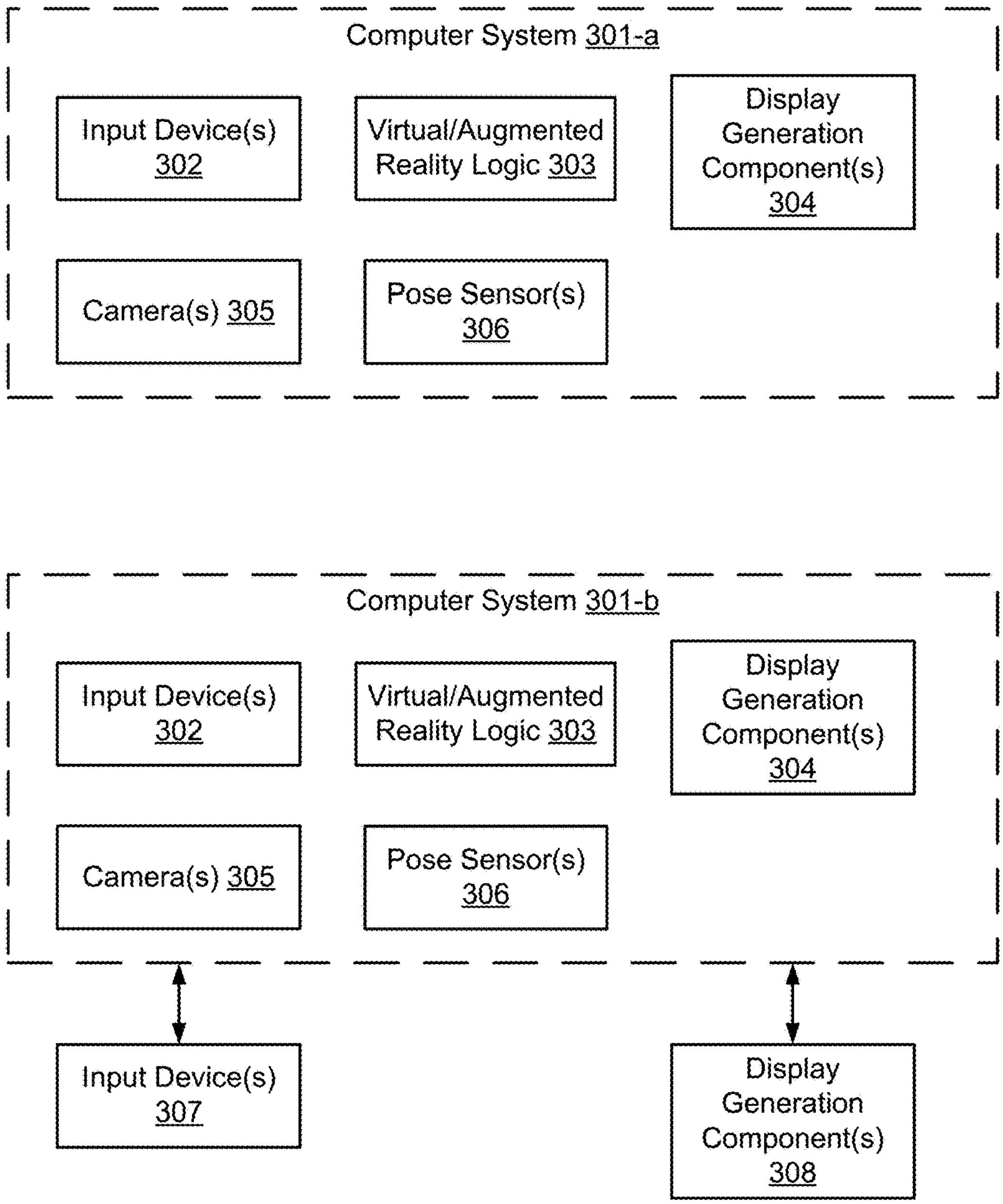
FIGS. 3B-3C are block diagrams of example computer systems in accordance with some embodiments.
Figure 3C:
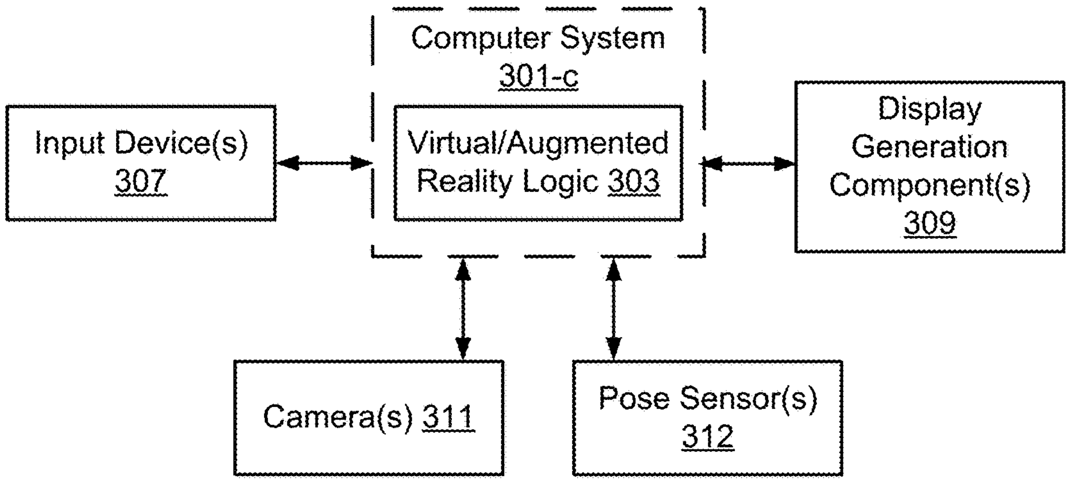

FIGS. 3B-3C are block diagrams of example computer systems 301 in accordance with some embodiments.

In some embodiments, computer system 301 includes and/or is in communication with:

- input device(s) (302 and/or 307, e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands);
- virtual/augmented reality logic 303 (e.g., virtual/augmented reality module 145);
- display generation component(s) (304 and/or 308, e.g., a display, a projector, a head-mounted display, a heads-up display, or the like) for displaying virtual user interface elements to the user;
- camera(s) (e.g., 305 and/or 311) for capturing images of a field of view of the device, e.g., images that are used to determine placement of virtual user interface elements, determine a pose of the device, and/or display a portion of the physical environment in which the camera(s) are located; and
- pose sensor(s) (e.g., 306 and/or 311) for determining a pose of the device relative to the physical environment and/or changes in pose of the device.

In some embodiments, computer system 301 (e.g., camera(s) 305 and/or 311) includes and/or is in communication with a time-of-flight sensor (e.g., time-of-flight sensor 220, FIG. 2B) for capturing depth information as described above with reference to FIG. 2B.

In some computer systems (e.g., 301-*a* in FIG. 3B), input device(s) 302, virtual/augmented reality logic 303, display generation component(s) 304, camera(s) 305; and pose sensor(s) 306 are all integrated into the computer system (e.g., portable multifunction device 100 in FIGS. 1A-1B or device 300 in FIG. 3 such as a smartphone or tablet).

In some computer systems (e.g., 301-*b*), in addition to integrated input device(s) 302, virtual/augmented reality logic 303, display generation component(s) 304, camera(s) 305; and pose sensor(s) 306, the computer system is also in communication with additional devices that are separate from the computer system, such as separate input device(s) 307 such as a touch-sensitive surface, a wand, a remote control, or the like and/or separate display generation component(s) 308 such as virtual reality headset or augmented reality glasses that overlay virtual objects on a physical environment.

In some computer systems (e.g., 301-*c* in FIG. 3C), the input device(s) 307, display generation component(s) 309, camera(s) 311; and/or pose sensor(s) 312 are separate from the computer system and are in communication with the computer system. In some embodiments, other combinations of components in computer system 301 and in communication with the computer system are used. For example, in some embodiments, display generation component(s) 309, camera(s) 311, and pose sensor(s) 312 are incorporated in a headset that is either integrated with or in communication with the computer system.

In some embodiments, all of the operations described below with reference to FIGS. 5A-5CN are performed on a single computing device with virtual/augmented reality logic 303 (e.g., computer system 301-*a* described below with reference to FIG. 3B). However, it should be understood that frequently multiple different computing devices are linked together to perform the operations described below with reference to FIGS. 5A-5CN, 6A-6Y, 7A-7AT (e.g., a computing device with virtual/augmented reality logic 303 communicates with a separate computing device with a display 450 and/or a separate computing device with a touch-sensitive surface 451). In any of these embodiments, the computing device that is described below with reference to FIGS. 5A-5CN, 6A-6Y, 7A-7AT is the computing device (or devices) that contain(s) the virtual/augmented reality logic 303. Additionally, it should be understood that the virtual/augmented reality logic 303 could be divided between a plurality of distinct modules or computing devices in various embodiments; however, for the purposes of the description herein, the virtual/augmented reality logic 303 will be primarily referred to as residing in a single computing device so as not to unnecessarily obscure other aspects of the embodiments.

In some embodiments, the virtual/augmented reality logic 303 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input for an input that has been detected (e.g., by a contact motion module 130 in FIGS. 1A and 3), recognized (e.g., by an event recognizer 180 in FIG. 1B) and/or distributed (e.g., by event sorter 170 in FIG. 1B) is used to update the graphical user interface on a display. In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 451 processes raw contact input data so as to identify gestures from the raw contact input data and sends information indicative of the gestures to the computing device that includes the virtual/augmented reality logic 303).

In some embodiments, both a display and a touch-sensitive surface are integrated with the computer system (e.g., 301-*a* in FIG. 3B) that contains the virtual/augmented reality logic 303. For example, the computer system may be a desktop computer or laptop computer with an integrated display (e.g., 340 in FIG. 3) and touchpad (e.g., 355 in FIG. 3). As another example, the computing device may be a portable multifunction device 100 (e.g., a smartphone, PDA, tablet computer, etc.) with a touch screen (e.g., 112 in FIG. 2A).

In some embodiments, a touch-sensitive surface is integrated with the computer system while a display is not integrated with the computer system that contains the virtual/augmented reality logic 303. For example, the computer system may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the computer system may be a portable multifunction device 100 (e.g., a smartphone, PDA, tablet computer, etc.) with a touch screen (e.g., 112 in FIG. 2A) connected (via wired or wireless connection) to a separate display (e.g., a computer monitor, television, etc.).

In some embodiments, a display is integrated with the computer system while a touch-sensitive surface is not integrated with the computer system that contains the virtual/augmented reality logic 303. For example, the computer system may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the computer system may be a portable multifunction device 100 (e.g., a smartphone, PDA, tablet computer, etc.) with a touch screen (e.g., 112 in FIG. 2A) connected (via wired or wireless connection) to a separate touch-sensitive surface (e.g., a remote touchpad, another portable multifunction device with a touch screen serving as a remote touchpad, etc.).

In some embodiments, neither a display nor a touch-sensitive surface is integrated with the computer system (e.g., 301-*c* in FIG. 3C) that contains the virtual/augmented reality logic 303. For example, the computer system may be a stand-alone computing device 300 (e.g., a set-top box, gaming console, etc.) connected (via wired or wireless connection) to a separate touch-sensitive surface (e.g., a remote touchpad, a portable multifunction device, etc.) and a separate display (e.g., a computer monitor, television, etc.).

In some embodiments, the computer system has an integrated audio system (e.g., audio circuitry 110 and speaker 111 in portable multifunction device 100). In some embodiments, the computing device is in communication with an audio system that is separate from the computing device. In some embodiments, the audio system (e.g., an audio system integrated in a television unit) is integrated with a separate display. In some embodiments, the audio system (e.g., a stereo system) is a stand-alone system that is separate from the computer system and the display.

Attention is now directed towards embodiments of user interfaces ("UI") that are, optionally, implemented on portable multifunction device 100.

Figure 4A:
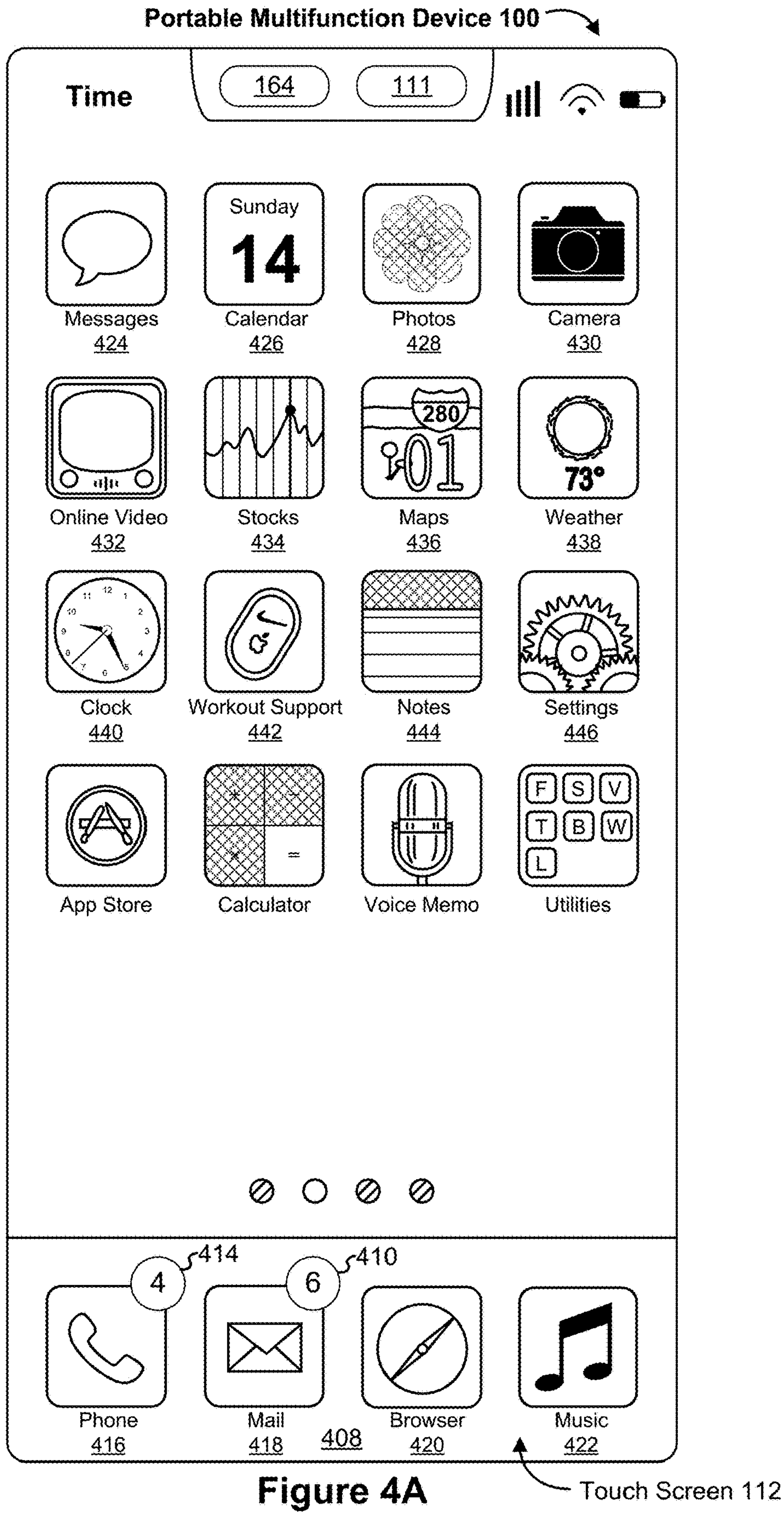
FIG. 4A illustrates an example user interface for presenting a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser"; and
  - Icon 422 for video and music player module 152, labeled "Music"; and
- Icons for other applications, such as:
  - Icon 424 for IM module 141, labeled "Messages";
  - Icon 426 for calendar module 148, labeled "Calendar";
  - Icon 428 for image management module 144, labeled "Photos";
  - Icon 430 for camera module 143, labeled "Camera";
  - Icon 432 for online video module 155, labeled "Online Video";
  - Icon 434 for stocks widget 149-2, labeled "Stocks";
  - Icon 436 for map module 154, labeled "Maps";
  - Icon 438 for weather widget 149-1, labeled "Weather";
  - Icon 440 for alarm clock widget 149-4, labeled "Clock";
  - Icon 442 for workout support module 142, labeled "Workout Support";
  - Icon 444 for notes module 153, labeled "Notes"; and
  - Icon 446 for a settings application or module, labeled "Settings," which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
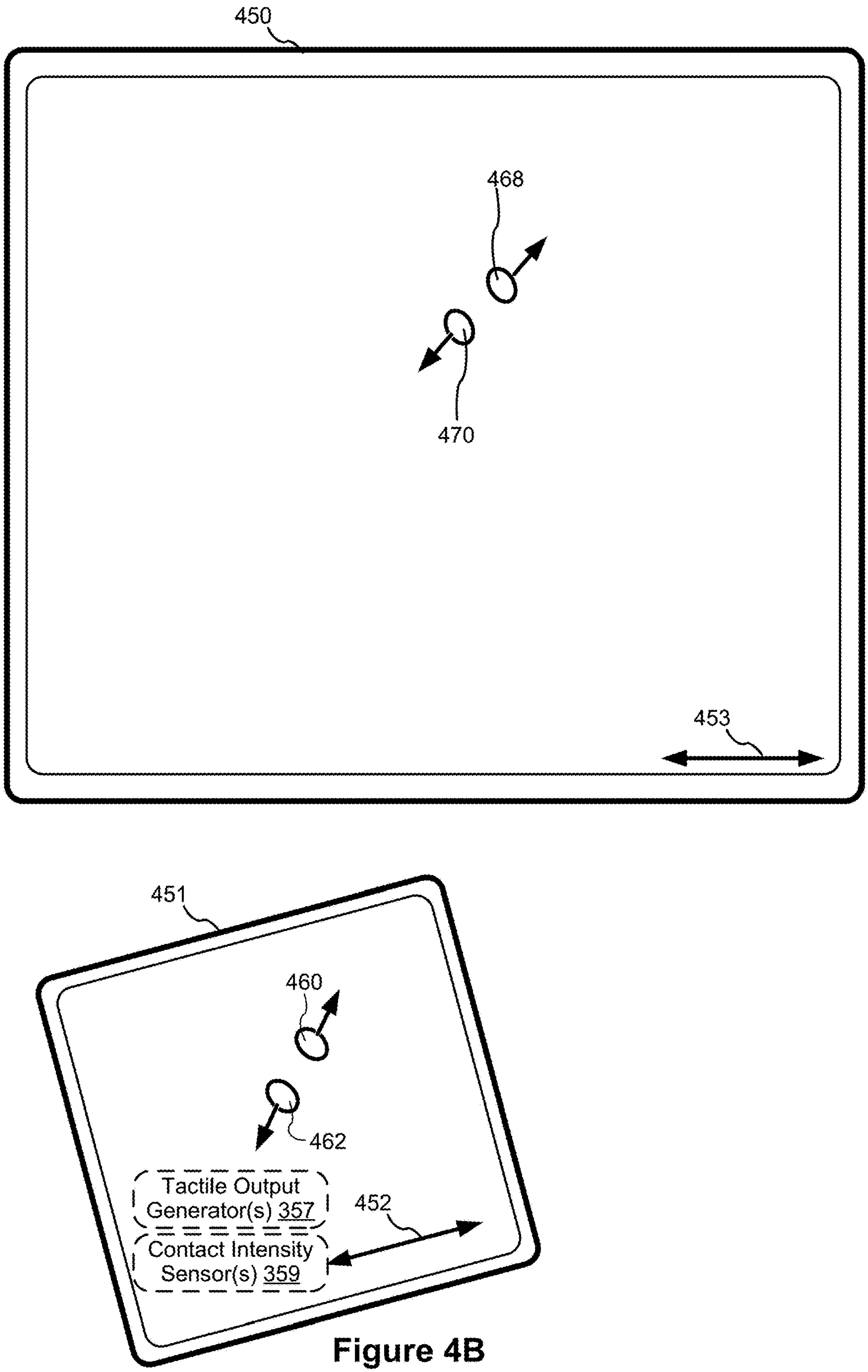
FIG. 4B illustrates an example user interface for a multifunction device with a touch-sensitive surface that is separate from the display in accordance with some embodiments.

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input, movement of the device or of one or more cameras of the device relative to a surrounding physical environment), and/or user movement relative to the device that is tracked using one or more cameras). For example, a swipe gesture is, optionally, replaced with a mouse click (e.g., instead of a contact) followed by movement of the cursor along the path of the swipe (e.g., instead of movement of the contact), or by a hand gesture involving a user moving his or her hand in a particular direction. As another example, a tap gesture is, optionally, replaced with a mouse click while the cursor is located over the location of the tap gesture (e.g., instead of detection of the contact followed by ceasing to detect the contact) or by a corresponding hand gesture that is representative of a tap gesture. Similarly, when multiple user inputs are simultaneously detected, it should be understood that multiple input devices of a particular type are, optionally, used simultaneously, or multiple input devices of different types are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3A or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device). In some embodiments, a focus indicator (e.g., a cursor or selection indicator) is displayed via the display device to indicate a current portion of the user interface that will be affected by inputs received from the one or more input devices.

User Interfaces and Associated Processes

Attention is now directed towards embodiments of user interfaces ("UI") and associated processes that may be implemented on a computer system (e.g., portable multifunction device 100 (FIG. 1A), device 300 (FIG. 3A), or computer system 301 (FIG. 3B)) that includes (and/or is in communication with) a display generation component (e.g., a display device, such as a display, a projector, a head-mounted display, a heads-up display, or the like), one or more cameras (e.g., video cameras that continuously provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more pose sensors, optionally one or more sensors to detect intensities of contacts with the touch-sensitive surface, and optionally one or more tactile output generators.

FIGS. 5A-5CN, 6A-6Y, and 7A-7AT illustrate example user interfaces for annotating, measuring, and modeling environments such as physical environments in accordance with some embodiments. The user interfaces in these figures are used to illustrate the processes described below, including the processes in FIGS. 8A-8F, 9A-9C, 10A-10C, 11A-11E, 12A-12C, 13A-13D, 14A-14D, 15A-15D, and 16A-16E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5CN illustrate example user interfaces for annotating and measuring a physical environment using augmented reality in accordance with some embodiments.

FIG. 5A shows a home screen user interface with a measuring application 448. FIG. 5B shows an input 81 over the icon 448. FIG. 5C shows the response to the input 581 over the icon 448. FIG. 5C shows that the portable multifunction device 100 is displaying an augmented reality view 500. The augmented reality view 500 is created based on a three-dimensional physical environment 501 that is in the field of view of the one or more optical sensors 164 of portable multifunction device 100 (e.g., that is in the field of view of a currently selected optical sensor of the one or more optical sensors 164, or any one of the one or more optical sensors 164; or, optionally, that is in a combined field of view of two or more of optical sensors 164). This augmented reality view 500 is used to overlay annotations, such as measurements, edge markings, surface markings, bounding boxes or the like, on top of representations of objects found in the three-dimensional physical environment 501.

The three-dimensional physical environment 501 includes a plurality of items, such as a TV stand 502-1, a TV (and/or any other type of display) 502-2, a couch 502-3, a pillow 502-4, a table 502-5, a lamp 502-6, and a magazine 502-7. The augmented reality view 500 includes corresponding representations of the plurality of items. These corresponding representations of the plurality of items are a TV stand 503-1 (obscured), a TV 503-2 (obscured), a couch 503-3, a pillow 503-4, a table 503-5, a lamp 503-6, and a magazine 503-7. These corresponding representations of the plurality of items have a dashed outline 569 surrounding them to indicate that measurements (e.g., metrics) of these objects have been determined. The augmented reality view 500 shown on the portable multifunction device 100 has a plurality of user interface objects that overlay the augmented reality view 500. These user interface objects are each used to control what is displayed in the augmented reality, and to also aid the user in taking and overlaying measurements of the objects shown in the three-dimensional physical environment 501. The terms "take," "taking," and "taken," when used with respect to measurements are to be understood to mean, or include, "generate," "generating" and "generated," respectively. The terms "overlay" and "overlaying" when used as verbs, are to be understood to mean, or include, "display over" and "displaying over," respectively, or alternatively, to mean represented in a displayed augmented reality user interface or virtual reality user interface to appear as overlaying (e.g., an object, region, or the like).

In some embodiments, another user interface element that is displayed in (or overlays) the augmented reality view 500 is a mode indication user interface 505. In some embodiments, displayed within the mode indication user interface 505 are icons 505 for a plurality of different measurement modes that the user can switch between, with icons 505 (e.g., 505-1 to 505-5) for five such measurement modes being shown in the example in FIG. 5C. Measurement modes are sometimes herein called annotation modes. A respective measurement mode is selected by selecting a corresponding measurement mode icon 505, e.g., by selecting the automatic measurement mode icon 505-1, the three-dimensional measurement mode icon 505-2, the two-dimensional surface measurement mode icon 505-3, the point-to-point measurement mode icon 505-4, and the floor plan measurement mode icon 505-5. The automatic measurement mode icon 505-1, when selected, can cause the portable multifunction device 100 to automatically detect what surface or object the reticle (e.g., reticle 504, shown in FIG. 5E and numerous subsequent figures) is overlaying (e.g., a three-dimensional object, a two-dimensional surface, etc.), and based on that determination the device can automatically indicate that the surface or object is measurable. Reticle 504 is an example of an annotation placement user interface element, sometimes simply called a placement user interface element. For example, when the automatic measurement mode icon is selected the device can switch between measurement modes depending on what it is measuring (e.g., when the reticle is over table's surface, a two-dimensional measurement is shown, and when the reticle moves over a couch the three-dimensional measurement is shown). In some embodiments, the reticle will change in appearance based on the object the reticle 504 is over. In some embodiments, there can be instances where the user wants to override the automatic mode, and manually specify which type of measurement should be taken. When this occurs, the user can switch the measurement mode by tapping on a respective measurement mode icon 505, such as the three-dimensional measurement mode icon 505-2, the two-dimensional surface measurement mode icon 505-3, or the point-to-point measurement mode icon 505-4. In some embodiments, the user may also swipe in any direction to change the modes. The three-dimensional measurement mode icon 505-2, the two-dimensional surface measurement mode icon 505-3, and the point-to-point measurement mode icon 505-4, when selected allow the user to instruct device 100 to generate one or more measurements in either three-dimensions (e.g., length, width, and height), two dimensions (e.g., two dimensions selected from either length, width, or height), or one dimension, from one point to another point (e.g., the length of an edge of a table), respectively. In some embodiments, floor plan measurement mode icon 505-5, when selected, allows the user to scan the three-dimensional physical environment 501 using device 100 to produce a floor plan (e.g., a bird's eye-view). In some embodiments, a reticle 504 (e.g., see FIG. 5E) is visually altered depending on which measurement mode the user has selected, thereby indicating to the user which measurement mode is currently in use. In some embodiments, to show which of these mode icons is selected, a selection indicator 537 is displayed around the selected icon.

In some embodiments, another user interface element that is displayed in (or overlays) the augmented reality view 500 is a measurement list button 506, which when selected causes device 100 to display a list of all measurements (e.g., metrics) taken during a current annotation session. In some embodiments, another user interface element that is displayed in (or overlays) the augmented reality view 500 is a measurement lock-in user interface object 508, sometimes herein called annotation creation button 508, which when selected drops a measurement point at a predefined location, e.g., the location of reticle 504 or the location of a focus point 504-1 of reticle 504 (e.g., see FIG. 5BU). In some embodiments, another user interface element that is displayed in (or overlays) the augmented reality view 500 is an undo user interface object 507, which when selected removes the most recent dropped measurement point. Lastly, in some embodiments, another user interface element that is displayed in (or overlays) the augmented reality view 500 is a record user interface object 550 that, when selected, records the augmented reality view 500, including the (e.g., any) displayed measurements, in a video format, image format, or other suitable format. This recording can then be shared with users on other devices via a messaging application, email, or other suitable ways of transmitting data to another user.

Figure 5D:
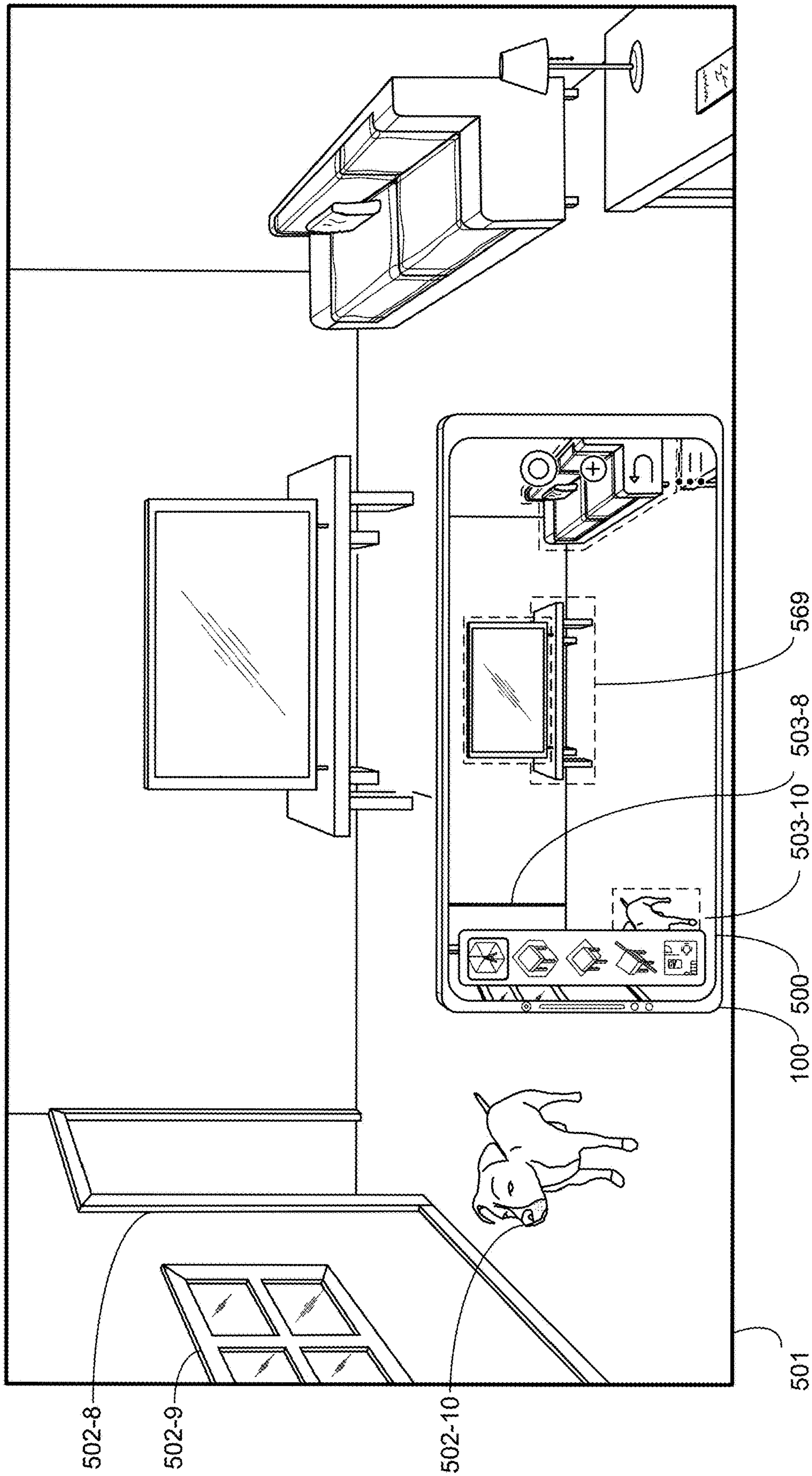

FIG. 5D shows the same three-dimensional physical environment 501, but at a different orientation (e.g., a real-time representation of a current field of view of the camera, as determined by the orientation of the portable multifunction device 100). The transition from FIG. 5C to FIG. 5D signifies a user holding the portable multifunction device 100 at a different orientation, which allows for the one or more optical sensors 164 to see different portions of the three-dimensional physical environment 501. As shown, in this other orientation, a hallway 502-8, a window 502-9 (partially obscured), and a dog 502-10 in the three-dimensional physical environment 501 are now in view of the one or more optical sensors 164 and corresponding representations 503-8 (hallway), 502-9 (window), and 502-10 (dog) are shown in augmented reality view 500. These corresponding representations of the plurality of items have dashed outlines 569 surrounding them to indicate that measurements (e.g., metrics) of these items/objects have been determined.

Figure 5E:
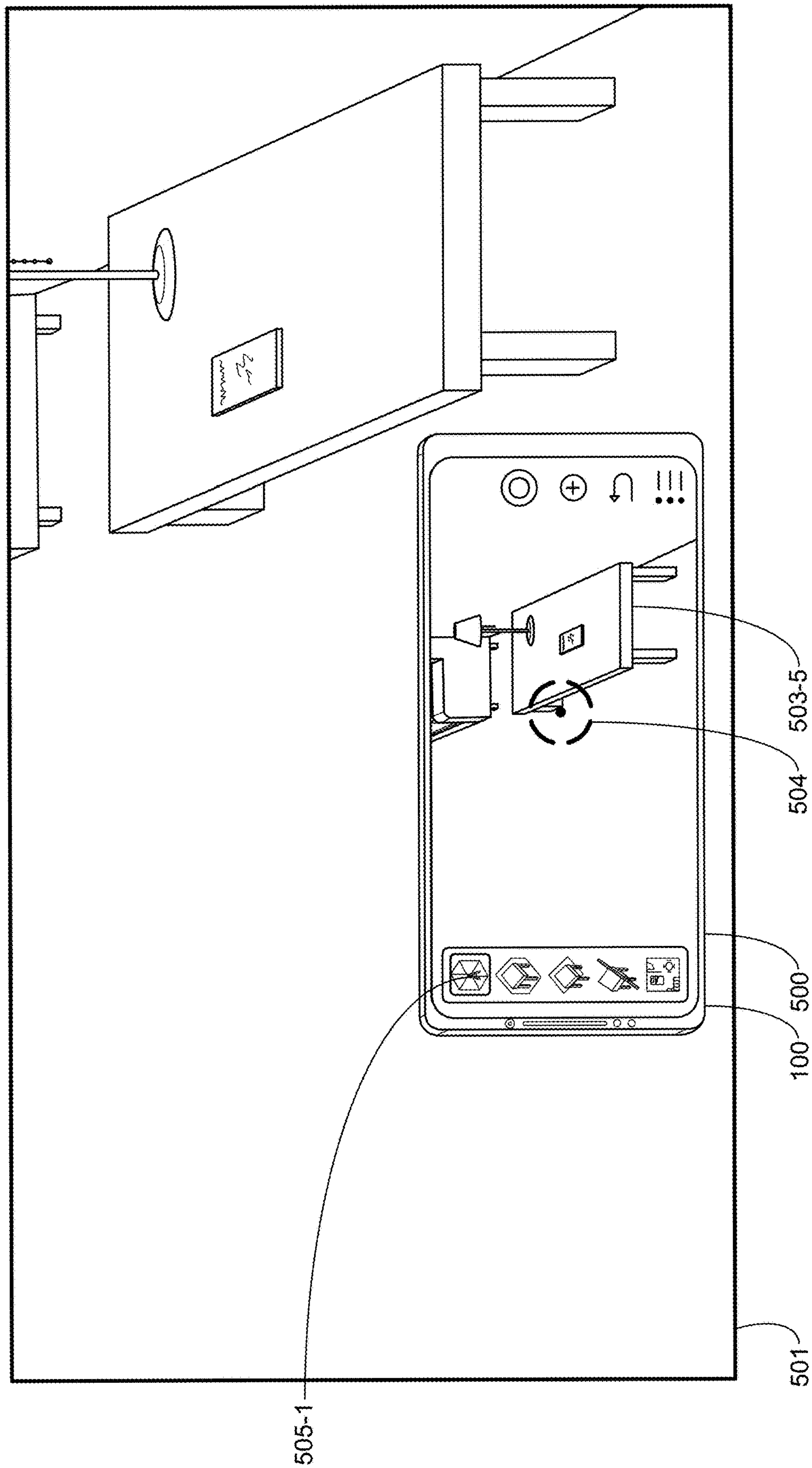

FIG. 5E shows the portable multifunction device 100 with the automatic measurement mode icon 505-1 selected, and shows augmented reality view 500 after device 100 and its one or more optical sensors 164 have moved closer to the table 503-5. One of the user interface objects shown is a reticle 504, which indicates to the user where the measurement, if inserted (e.g., dropped), would start.

Figure 5F:
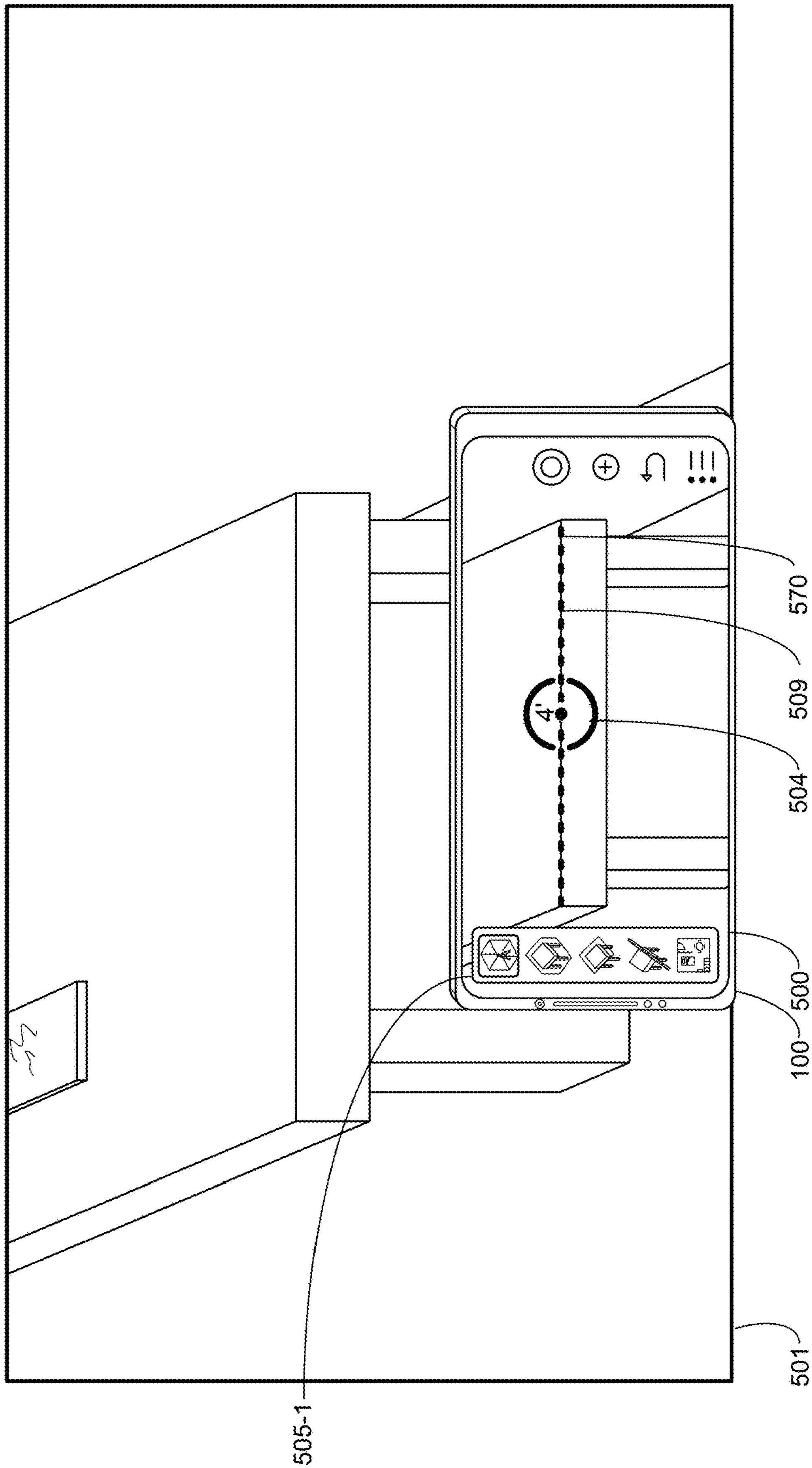

FIG. 5F shows augmented reality view 500 after device 100 has been moved closer to an edge of the table 509. As the one or more optical sensors 164 of device 100 move closer to an edge of the table 509, the device 100 recognizes that the full table is no longer in view, and instead provides an indication 570 of an edge to select. While not shown in FIG. 5F, in some embodiments the representation of an edge region (e.g., a first edge) of a physical object (e.g., table 509), where the edge region is fully in view and adjacent other portions the physical object table 509 that are not fully in view, includes visually deemphasized (e.g., faded) portions of the edge region that are adjacent to regions not fully in view. In some embodiments, points in the edge region (e.g., representing the first edge) are progressively deemphasized the closer they are to a second portion of the physical object (e.g., a first point in the edge region that is a first distance from the boundary between the first portion and the second portion of the physical object is visually deemphasized relative to a second point in the edge region that is a second distance, greater than the first distance, from the boundary).

Figure 5G:
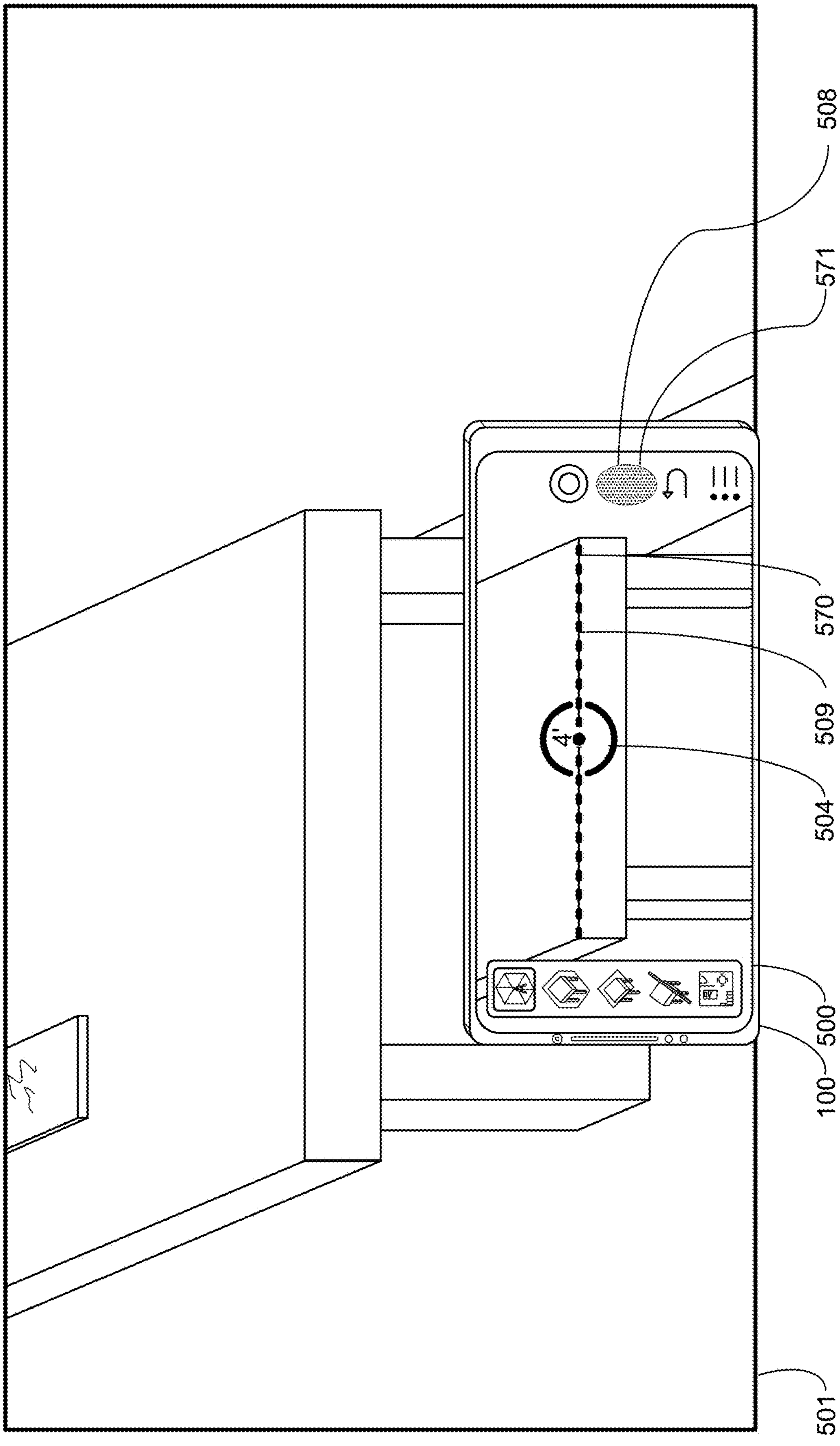

FIG. 5G shows augmented reality view 500 with an input 571 over the measurement lock-in user interface object 508 to lock in the measurement of the edge of table 509 that is identified by indication 570.

Figure 5H:
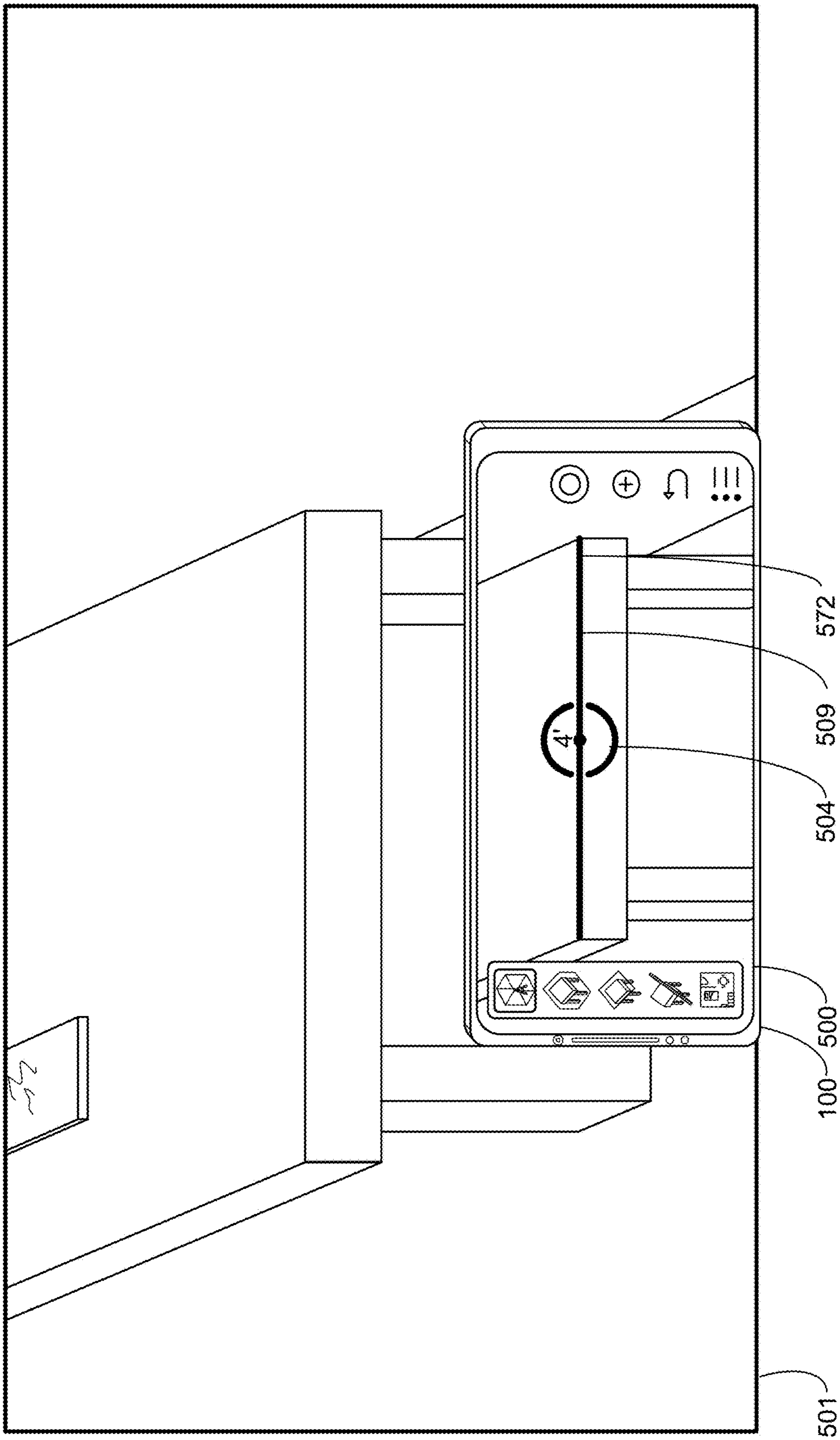

FIG. 5H shows augmented reality view 500 with the response to input 571 over the measurement lock-in user interface object 508 to select the edge of table 509 that is identified by indication 570. As shown, in FIG. 5H, indication 570 is no longer displayed in augmented reality view 500, and instead augmented reality view 500 now includes an emphasized line 572 identifying the edge of the table 509 and an annotation representing the measured length (e.g., four feet) of the table edge, as measured by device 100.

Figure 5I:
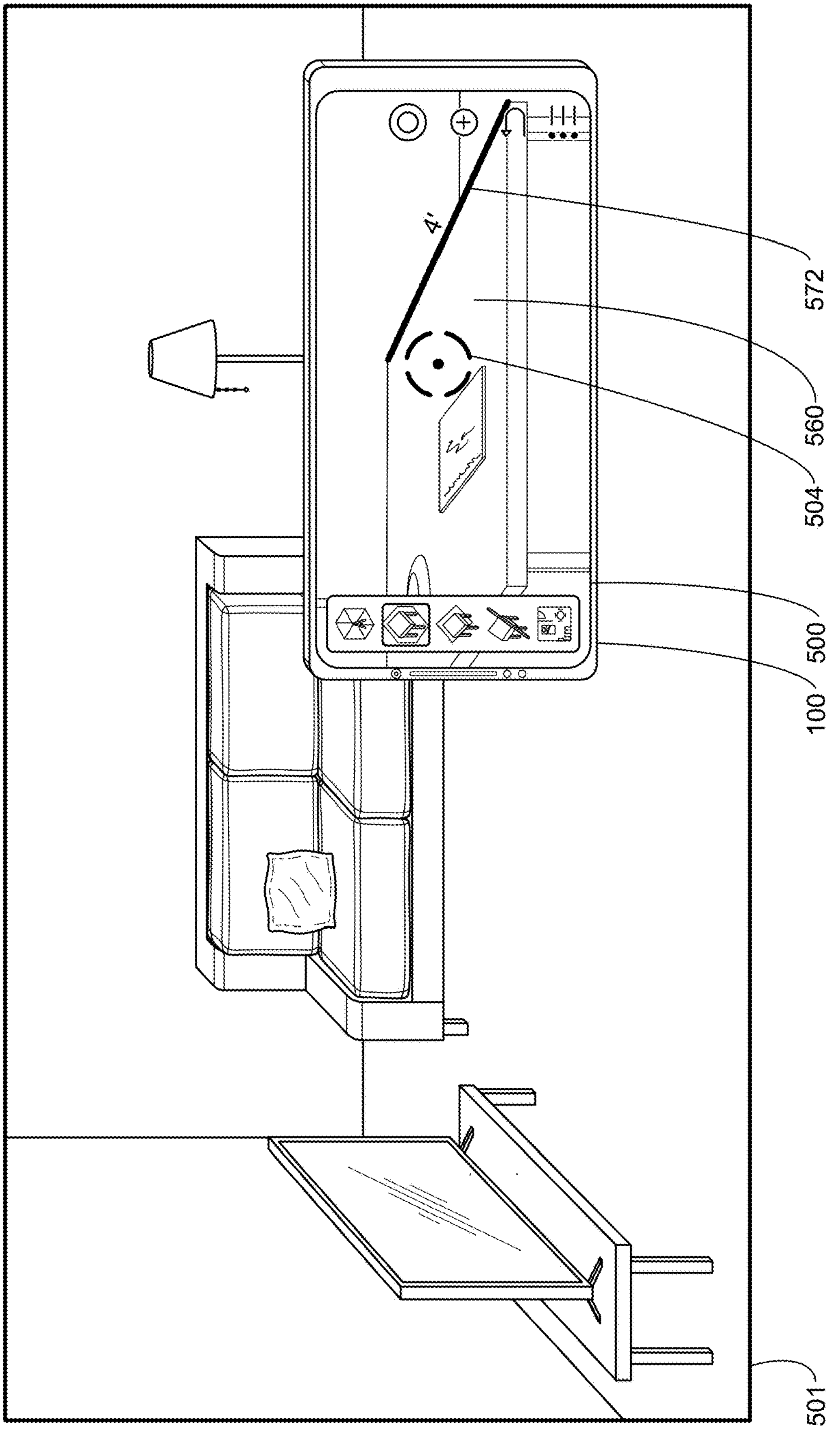
Figure 5J:
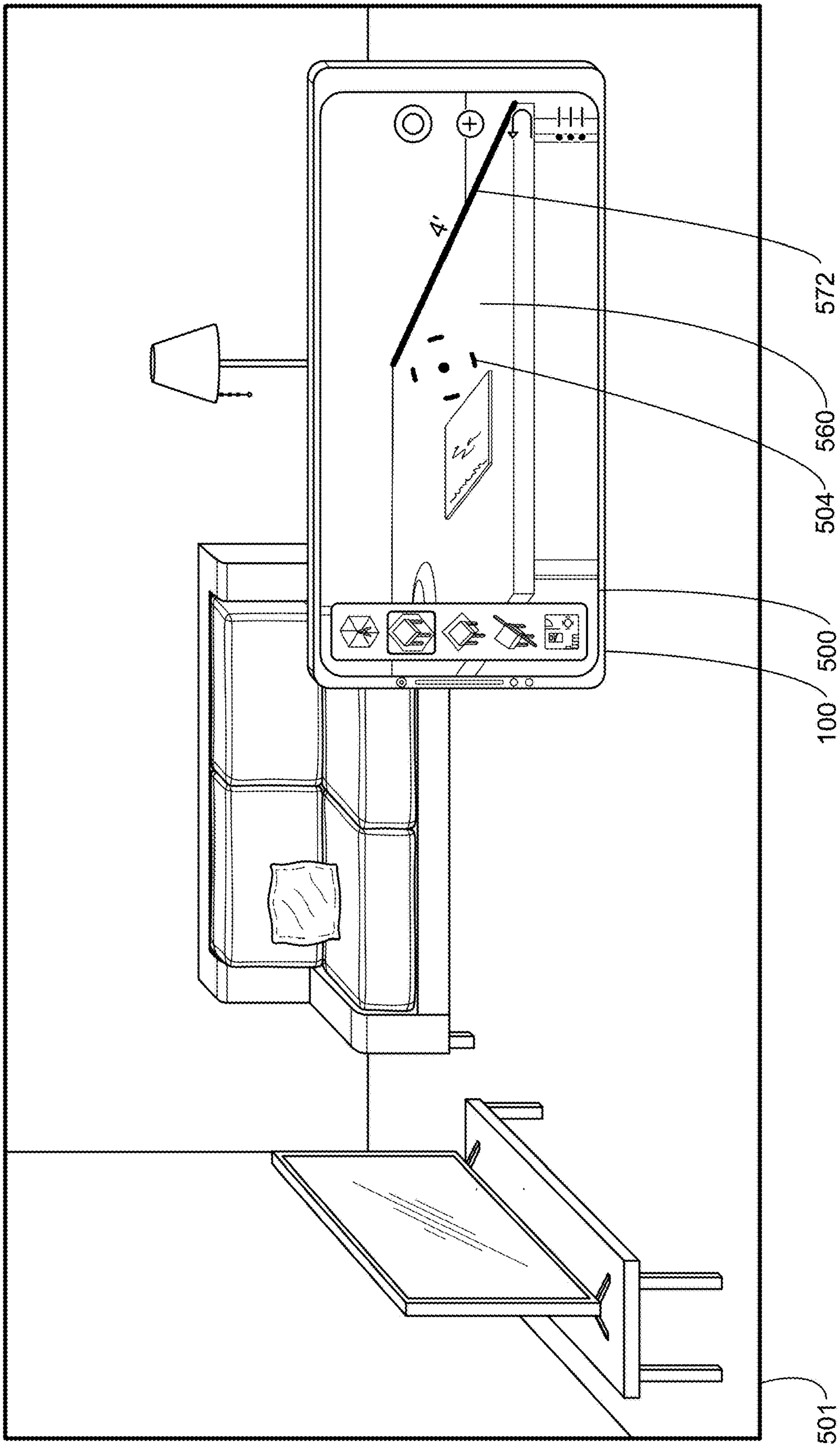
Figure 5K:
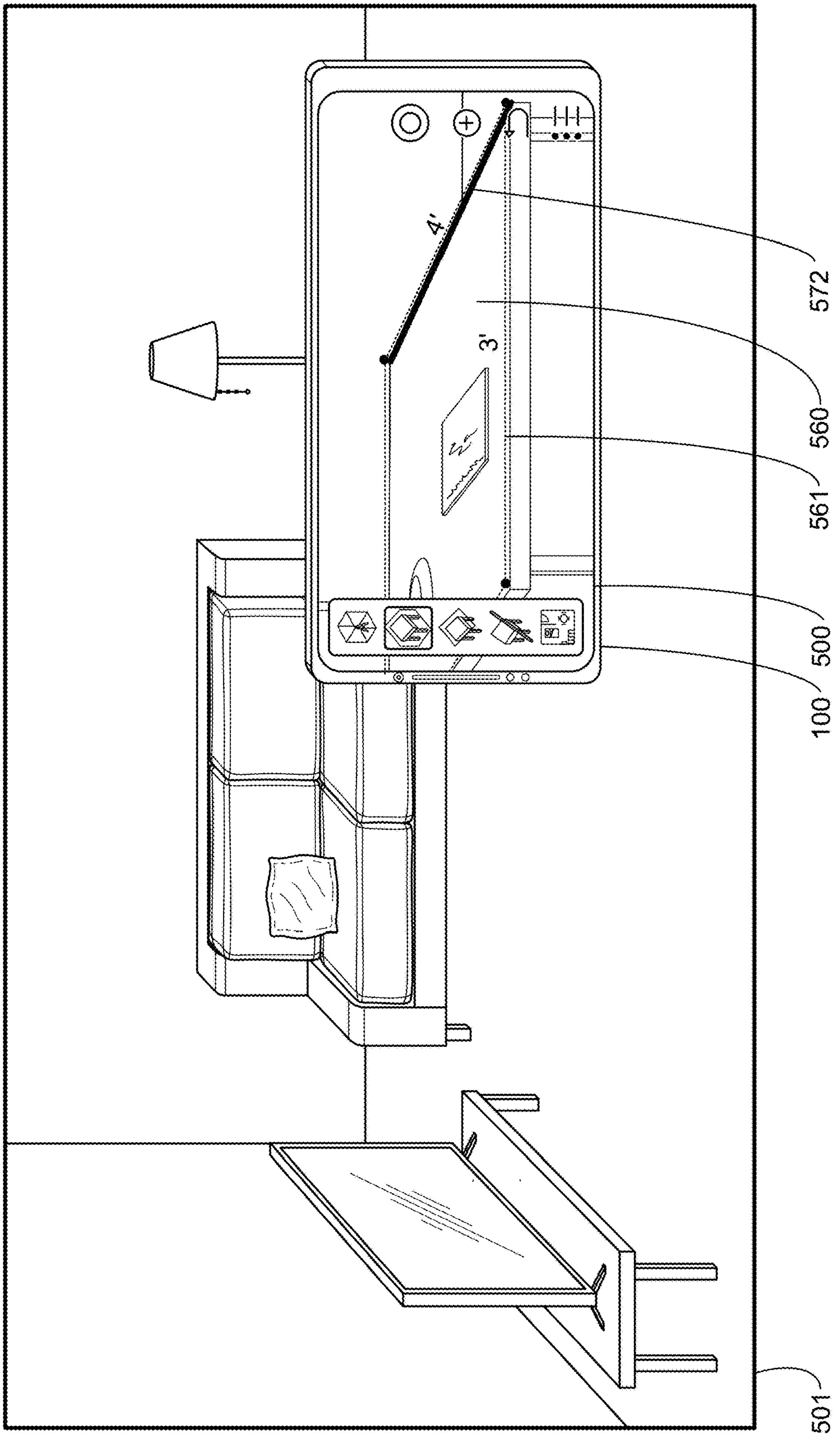
Figure 5L:
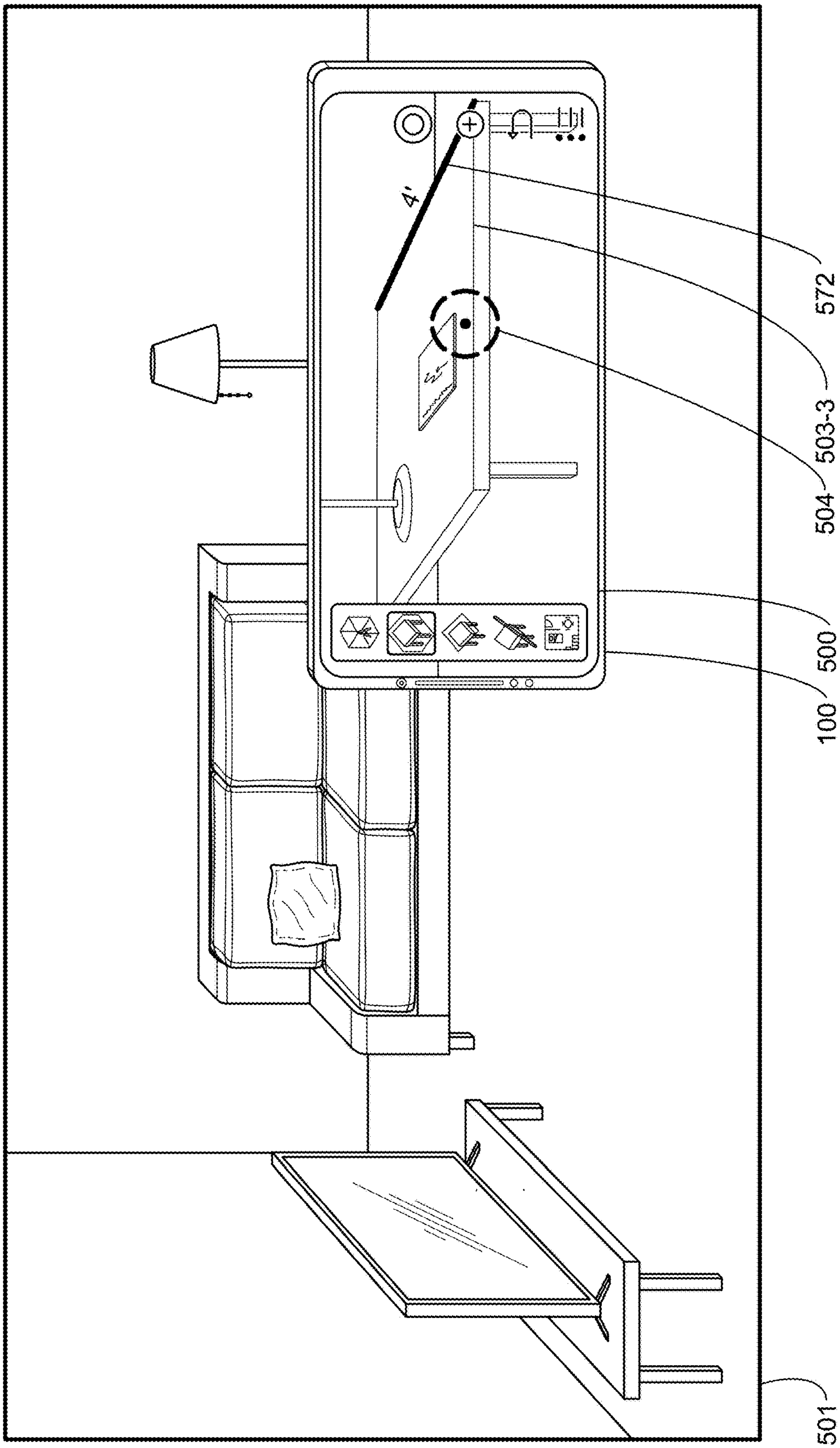
Figure 5M:
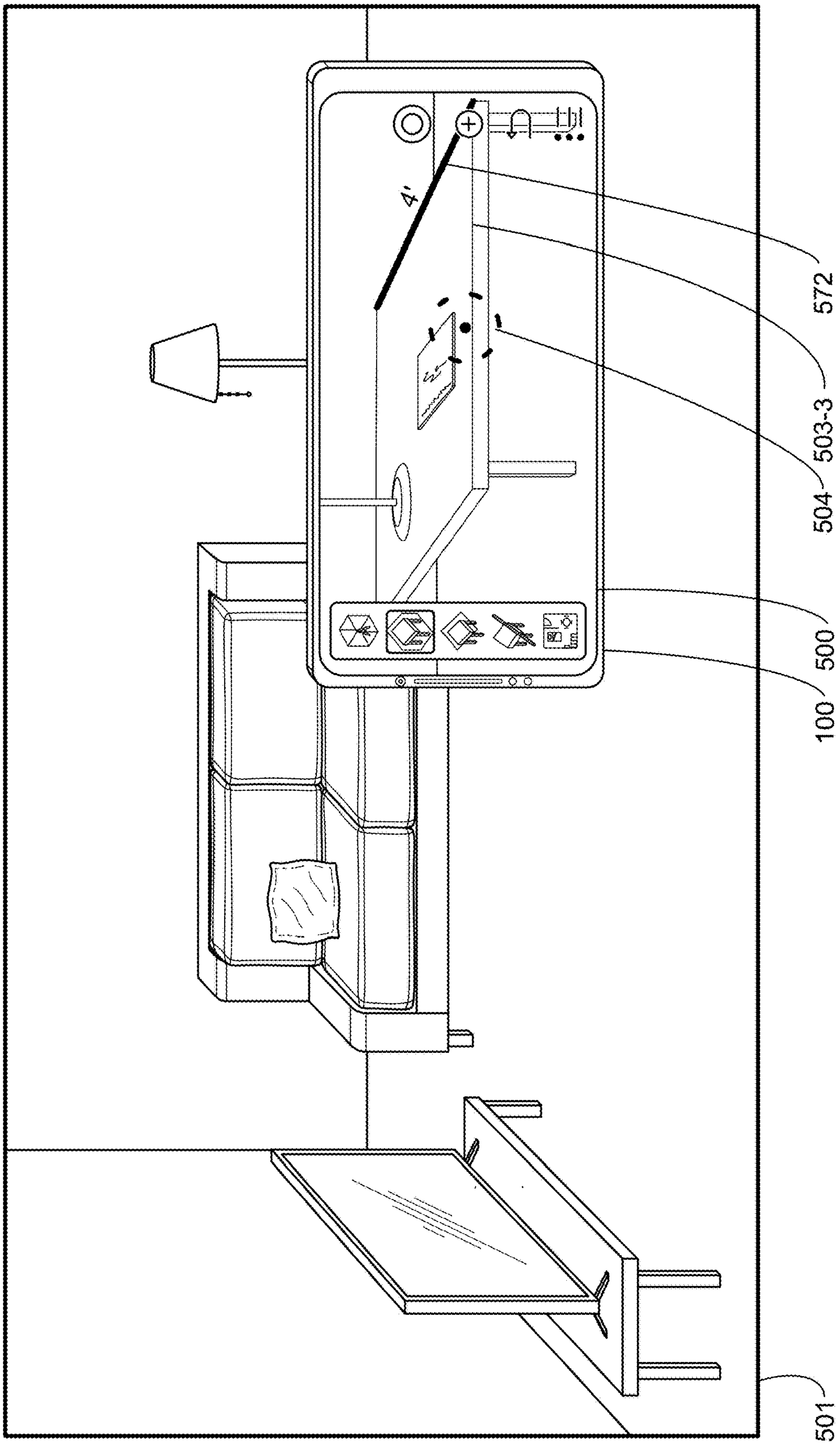
Figure 5N:
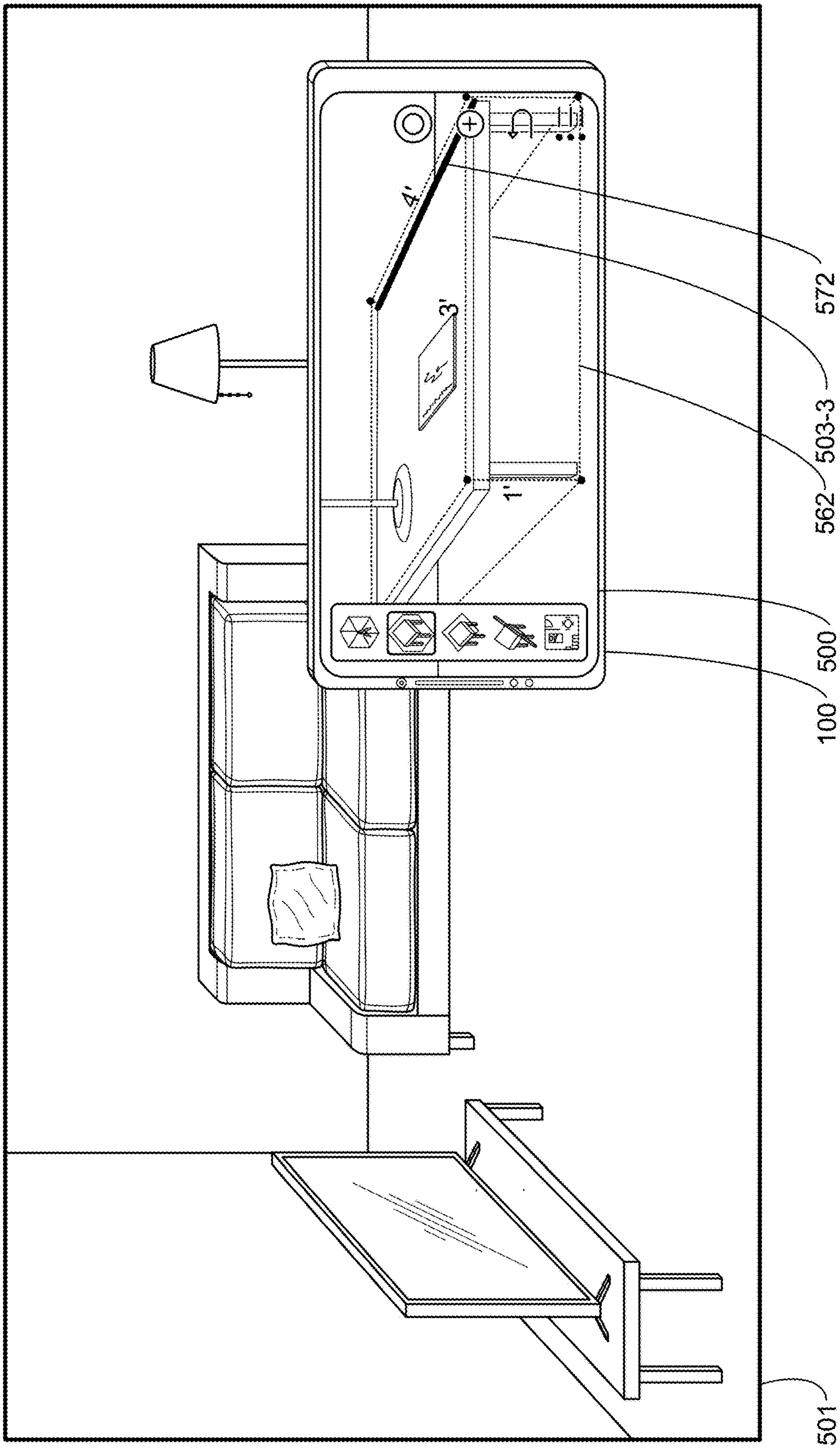

FIGS. 5I through 5K and 5L through 5N are alternative embodiments of the augmented reality view 500 of FIG. 5H, where additional indications of potential corresponding measurements are shown after an initial measurement is taken. In some embodiments, when the one or more optical sensors 164 move relative to the three-dimensional physical environment 501, the device 100 automatically detects whether there are other related surfaces that were not previously fully in the field of view, prior to the movement of the one or more optical sensors, and that can (now) be measured. When the device detects related surfaces that can be measured, additional indications may be shown in augmented reality view 500. For example, in FIG. 5I, the device 100 is moved, and the one or more optical sensors 164 of device 100 have tabletop 560 in view. FIGS. 5I through 5K shows the reticle 504 making an animated transition to cover the tabletop 560. FIG. 5K shows the animation complete and a resulting indication 561 around the tabletop 560, notifying the user that the table's measurement can be locked in. In some embodiments, the indication that other related surfaces can be measured include representations of one or more additional measurements, such as the additional measurement, representing a length of another edge of tabletop 560, shown in FIG. 5K. FIGS. 5L through 5N show the entire table 503-3 now in view of the one or more optical sensors 164 or device 100. FIGS. 5L through 5N shows an appearance of the reticle 504 changing (e.g., an animated change in appearance) to cover the entirety of the table. FIG. 5N shows the change in appearance of reticle 504 complete, and a resulting additional indication 562 around the entirety of the table 503-3, notifying the user that the table's measurements can be locked in. FIG. 5M shows an intermediate stage of the animated change in appearance of the reticle 504.

With respect to indication 562, shown around the entirety of the table 503-3, if the user in either FIG. 5K or FIG. 5N were to select the measurement lock-in user interface object 508, the indicated surface or object would be measured and an annotation representing the generated measurement(s) would be added to augmented reality view 500.

Figure 5O:
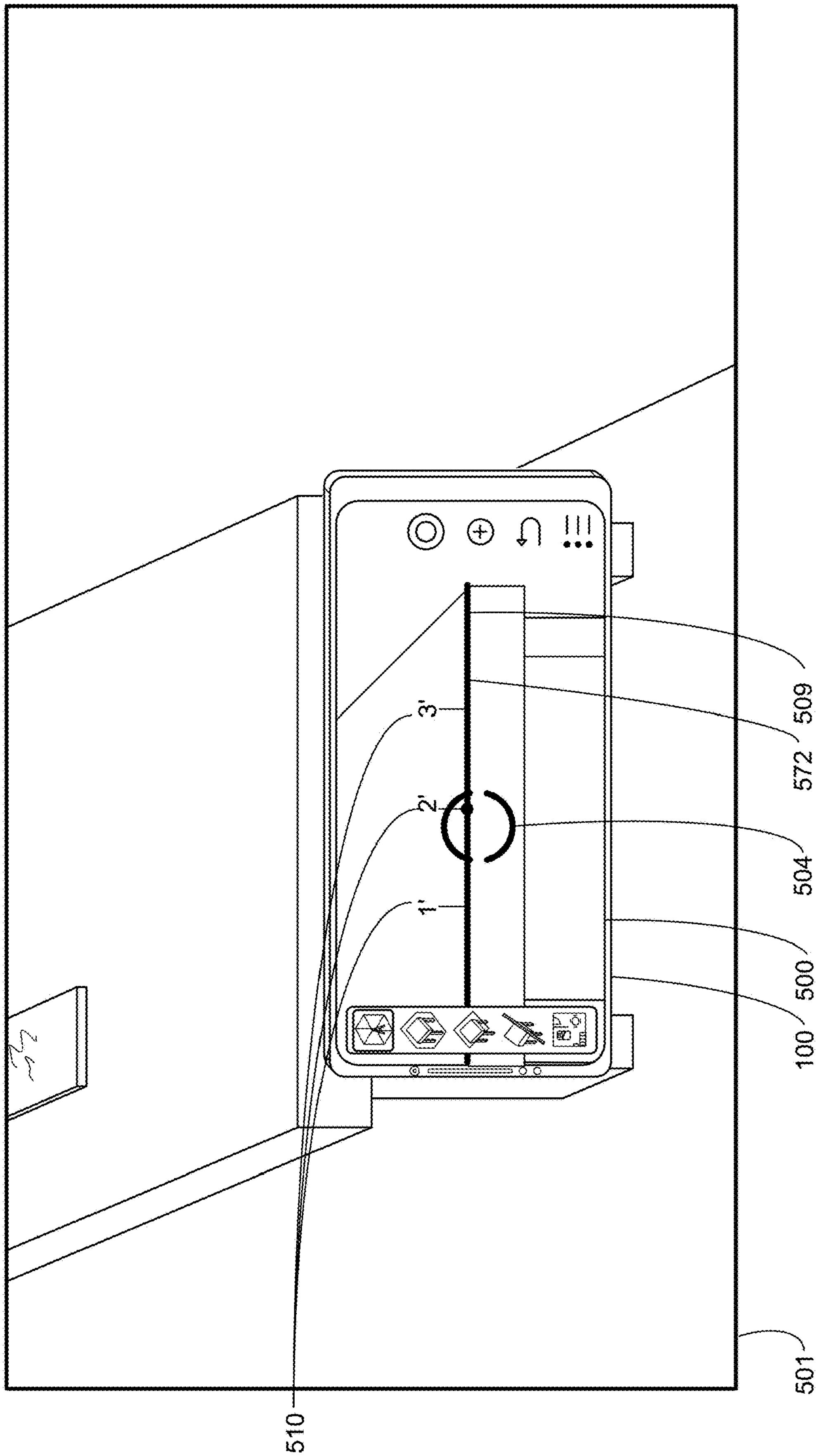

FIG. 5O displays the emphasized line 572 in augmented reality view 500 includes additional details when the one or more optical sensors 164 are moved closer to the edge of the table 509. In some embodiments, these additional details are tick marks 510. These tick marks 510 represent measurement increments (e.g., 1 inch, 2 inches, and 3 inches). In some embodiments, since displaying these tick marks at all times would clutter the user interface, the tick marks shown when a threshold distance between device 100 and an object or object feature (e.g., an edge of table 509) is met. Additionally, in some embodiments, the granulation of tick marks displayed is also dependent on the one or more optical sensors' 164 proximity to the object of object feature (e.g., in some embodiments, more tick marks are shown as device 100 gets closer to the object, as the distance between device 100's optical sensors and the object satisfies one or more additional (e.g., shorter) threshold distances.

Figure 5P:
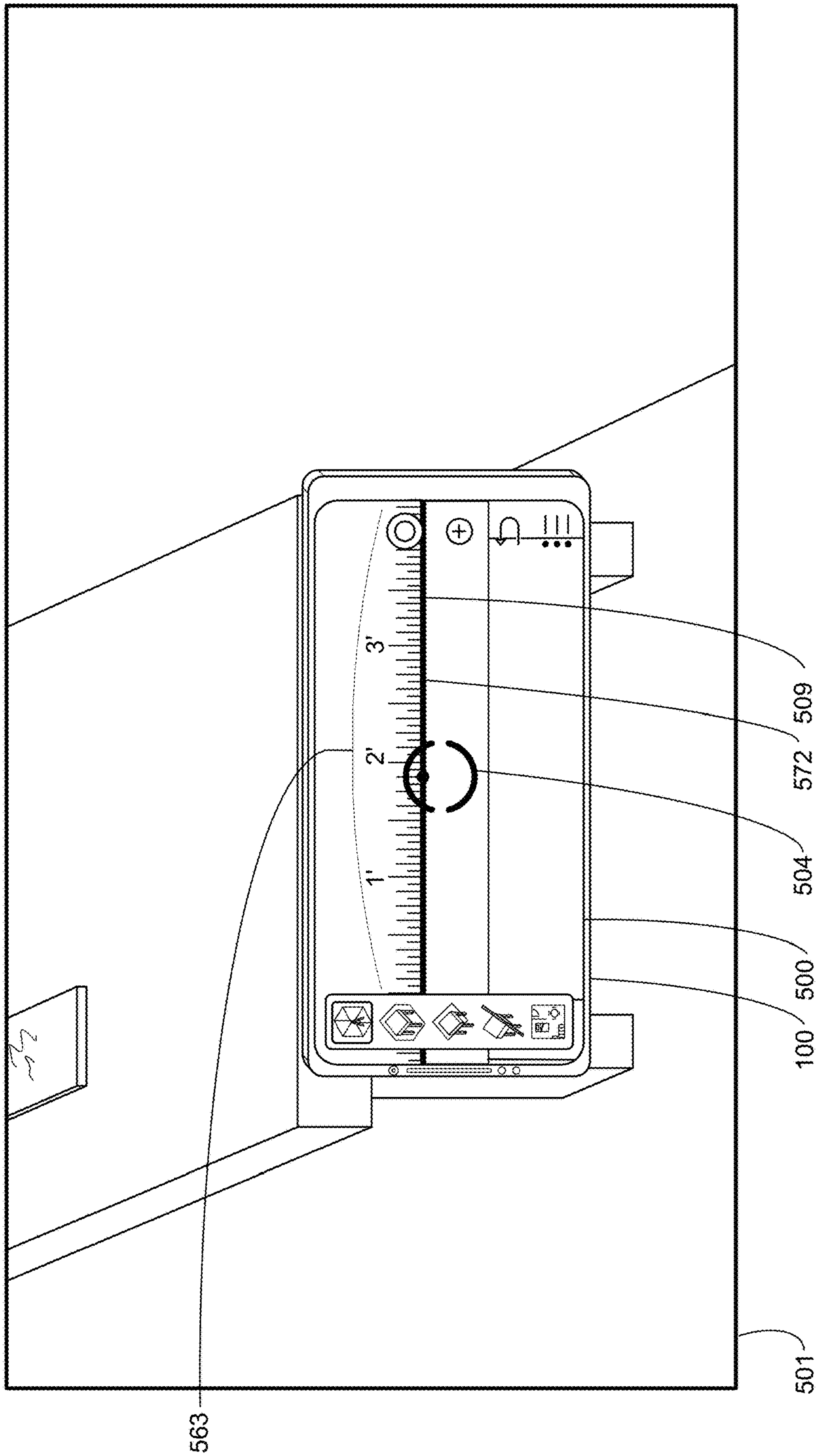

FIG. 5P shows additional tick marks 563 displayed by device 100 in augmented reality view 500 when the device 100 determines that the one or more optical sensors 164 have moved closer to an object or feature of the object (e.g., at or within a first distance from a physical feature), such as the edge of the table 509. In some embodiments, the additional tick marks 563 can be used to take additional measurements of an object (e.g., table 509). FIG. 5P, also shows the reticle 504 snapping to the 1.8-inch mark, which was not previously shown when the device 100 was placed farther away from table 509.

Figure 5Q:
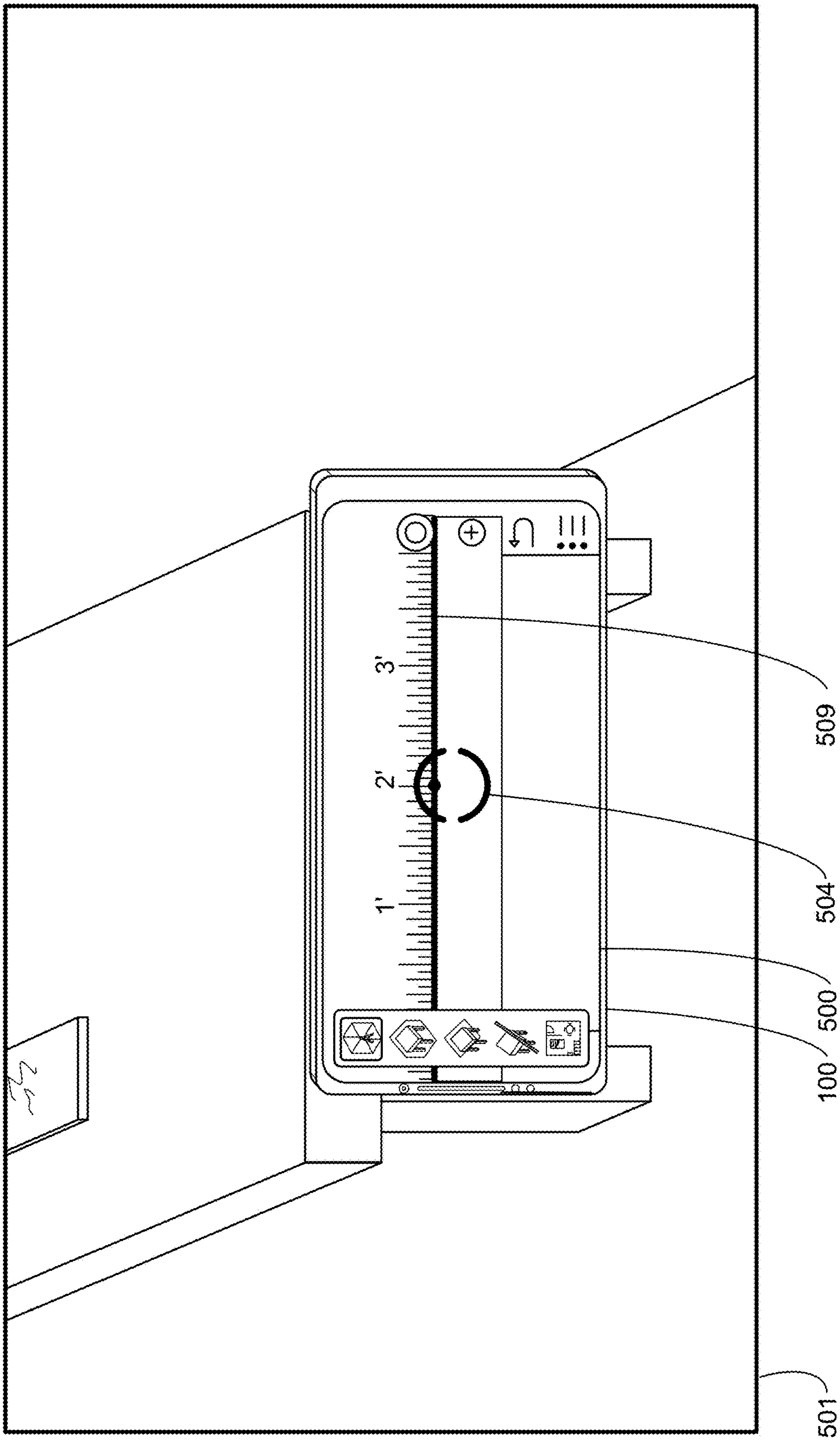

FIG. 5Q shows that the user can more precisely place the reticle 504 over a desired measurement point when the tick marks, or additional tick marks, are shown in augmented reality view 500. For example, the reticle can snap to smaller measuring increments as the device 100 is moved closer to the edge of the table 509. Here, the reticle has snapped to the 2-inch mark.

Figure 5R:
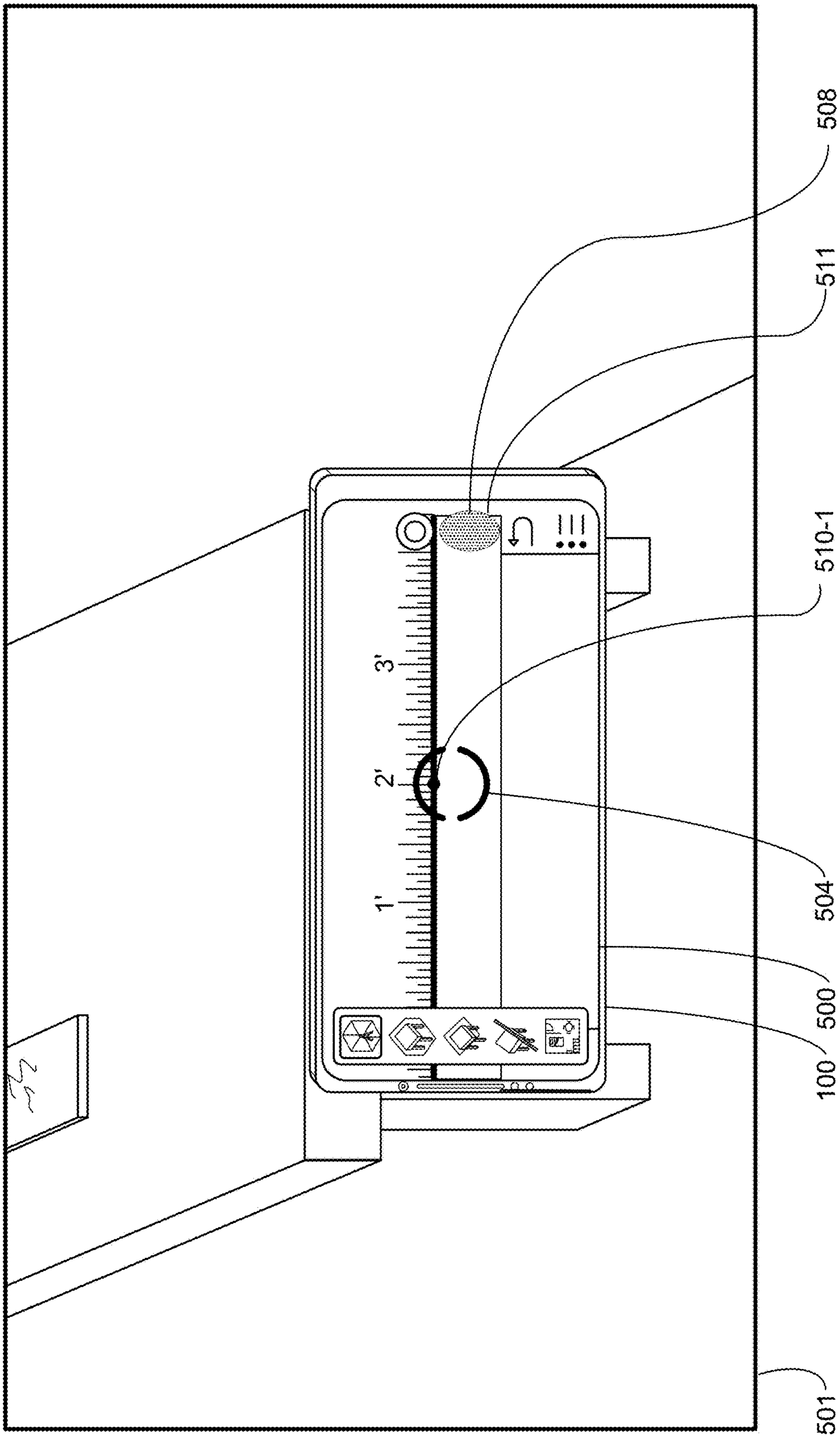

FIG. 5R shows an input 511 at the measurement lock-in user interface object 508 while the reticle 504 is snapped to a specific tick mark 510-1 (e.g., 2-inches).

Figure 5S:
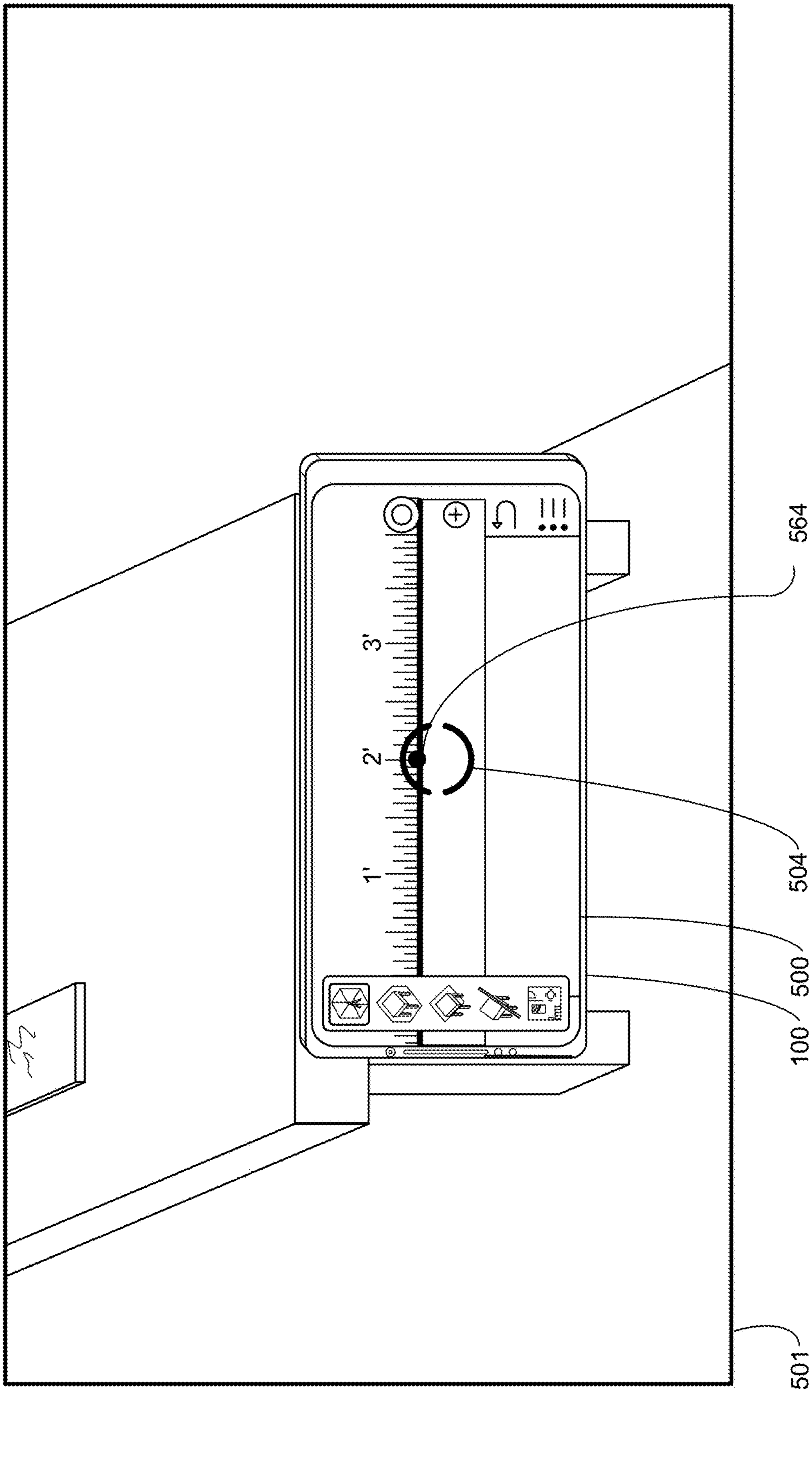

FIG. 5S shows a response (e.g., addition of an annotation to augmented reality view 500) to the input 511 at the measurement lock-in user interface object 508 while the reticle 504 is snapped to the specific tick mark 510-1. In particular, in this example, a point 564 is displayed in augmented reality view 500 when the measurement lock-in user interface object 508 is selected. This point is placed at the location where the reticle 504 was snapped to.

Figure 5T:
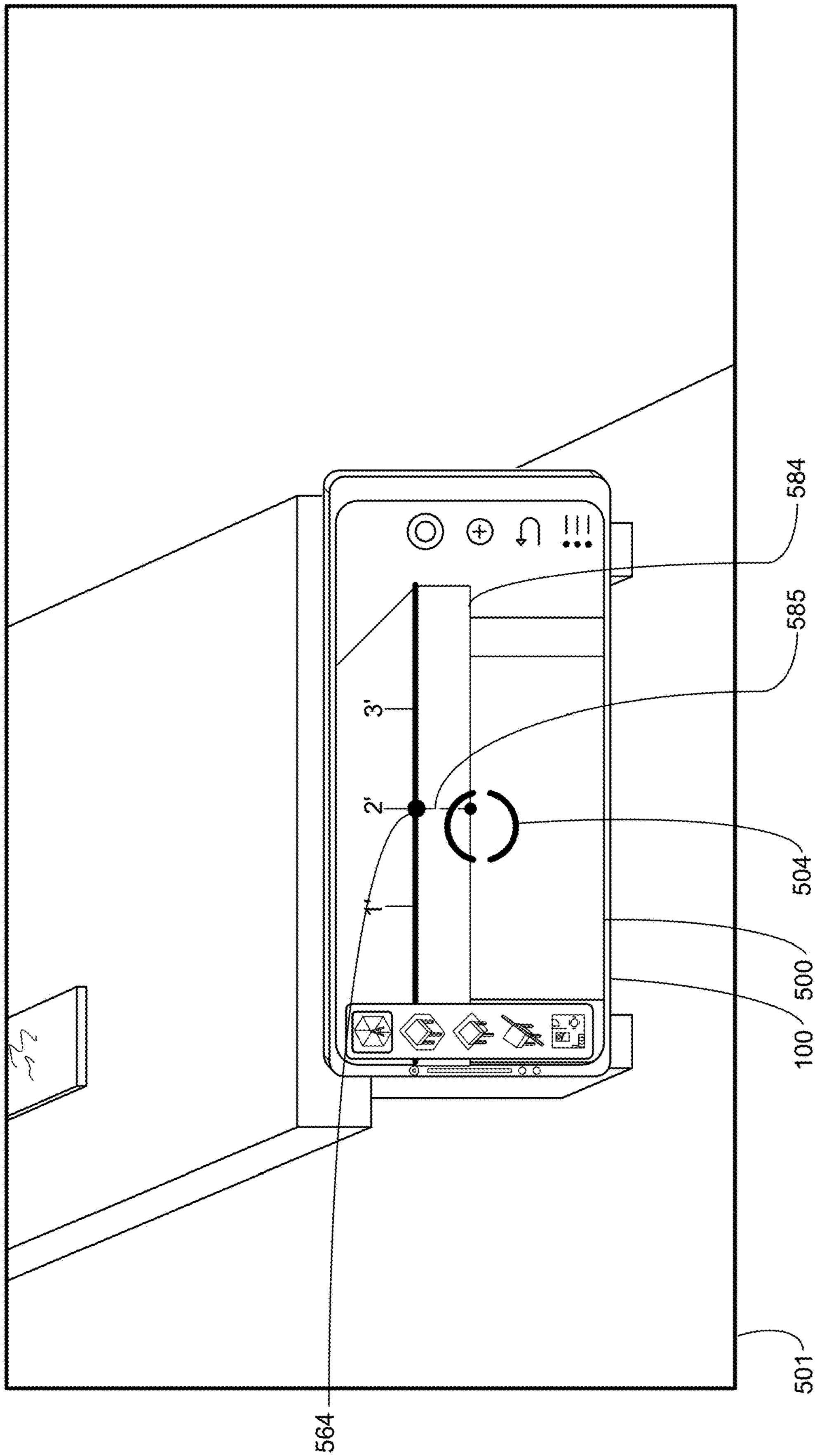

FIG. 5T shows augmented reality view 500 after the one or more optical sensors 164 of device 100 have been moved further away from the edge of the table 509, but with the edge of the table 584 still in view of the one or more optical sensors 164. Additionally, in some embodiments, or in certain circumstances when predefined criteria are satisfied, a guide line 585 is displayed in augmented reality view 500 to aid in placement of an annotation (e.g., a measurement). In this example, as the one or more optical sensors are moved away from the edge of the table 509, the tick marks 510 and the additional tick marks 563 cease to be displayed. However, the previously added annotation (e.g., point 564, previously placed at the tick mark 510-1) remains displayed despite the tick marks 510 and the additional tick marks 563 no longer being displayed.

Figure 5U:
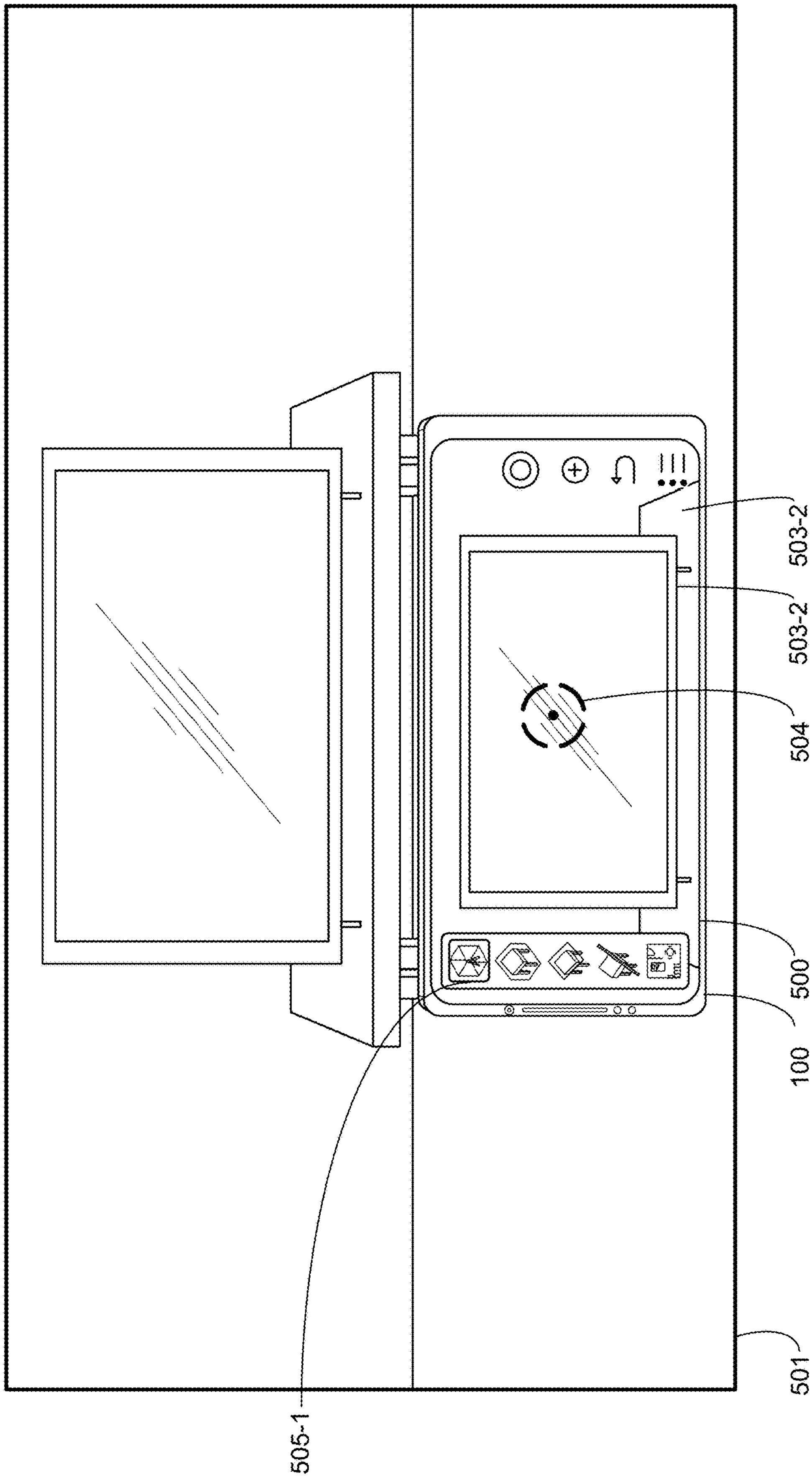

FIG. 5U shows the portable multifunction device 100 still having the automatic measurement mode icon 505-1 selected, and shows the device 100 and its one or more optical sensors 164 positioned near different object, in this example TV stand 502-1 and TV 502-2, than the object previously measured. FIG. 5U shows the reticle 504 over the representation 503-2 of the TV in augmented reality view 500. In some embodiments, while the reticle 504 is over the representation 503-2 of the TV, the device 100 automatically detects the TV and determines that measurements (made by device 100) of the TV are ready to be locked in.

Figure 5V:
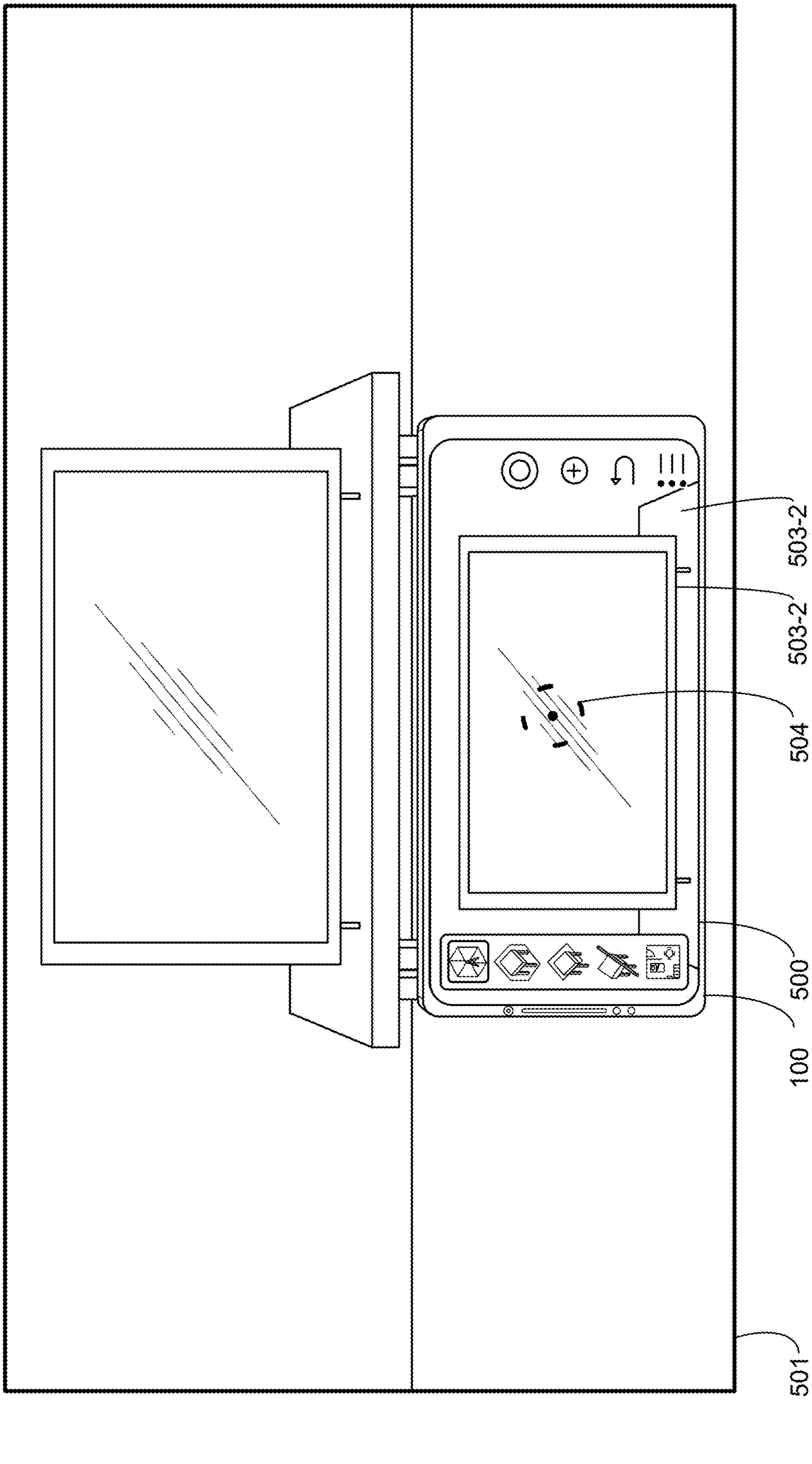
Figure 5W:
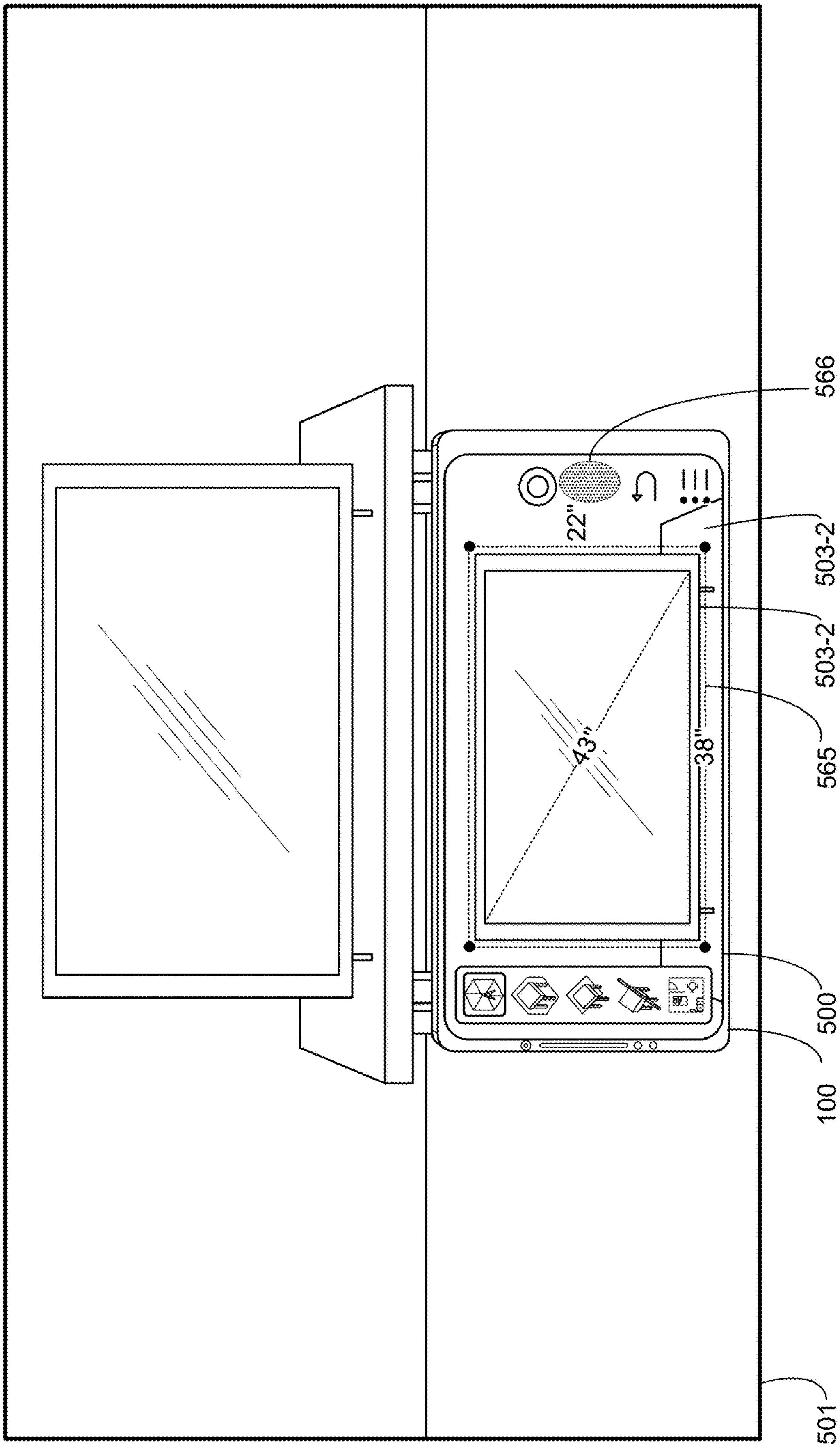

FIG. 5U through FIG. 5W shows an animated change in appearance of the reticle 504, which indicates that measurements of the TV are ready to be locked in. FIG. 5V shows the animated change in appearance of reticle 504 progressing. In some embodiments, when the animation is complete, an indication (e.g., a bounding box 565) will be displayed around the representation 503-2 of the TV in augmented reality view 500. In some embodiments, the indication (e.g., bounding box 565) can have a shaded fill to signify that the surface of an object (e.g., the TV) is capable of being locked-in. In some embodiments, the device 100 determines that the object in view of its one or more cameras is a television, and in response to that determination, a diagonal length of the television is displayed as an annotation in (e.g., that is added to) augmented reality view 500. In some embodiments, other commonly used measurements (e.g., certain measurements of a human) associated with certain detected objects can also be displayed in addition to the measurements normally shown (e.g., length, width, height, and volume). FIG. 5W also shows an input 566 over the measurement lock-in user interface object 508, to lock in the TV's 503-2 measurement.

Figure 5X:
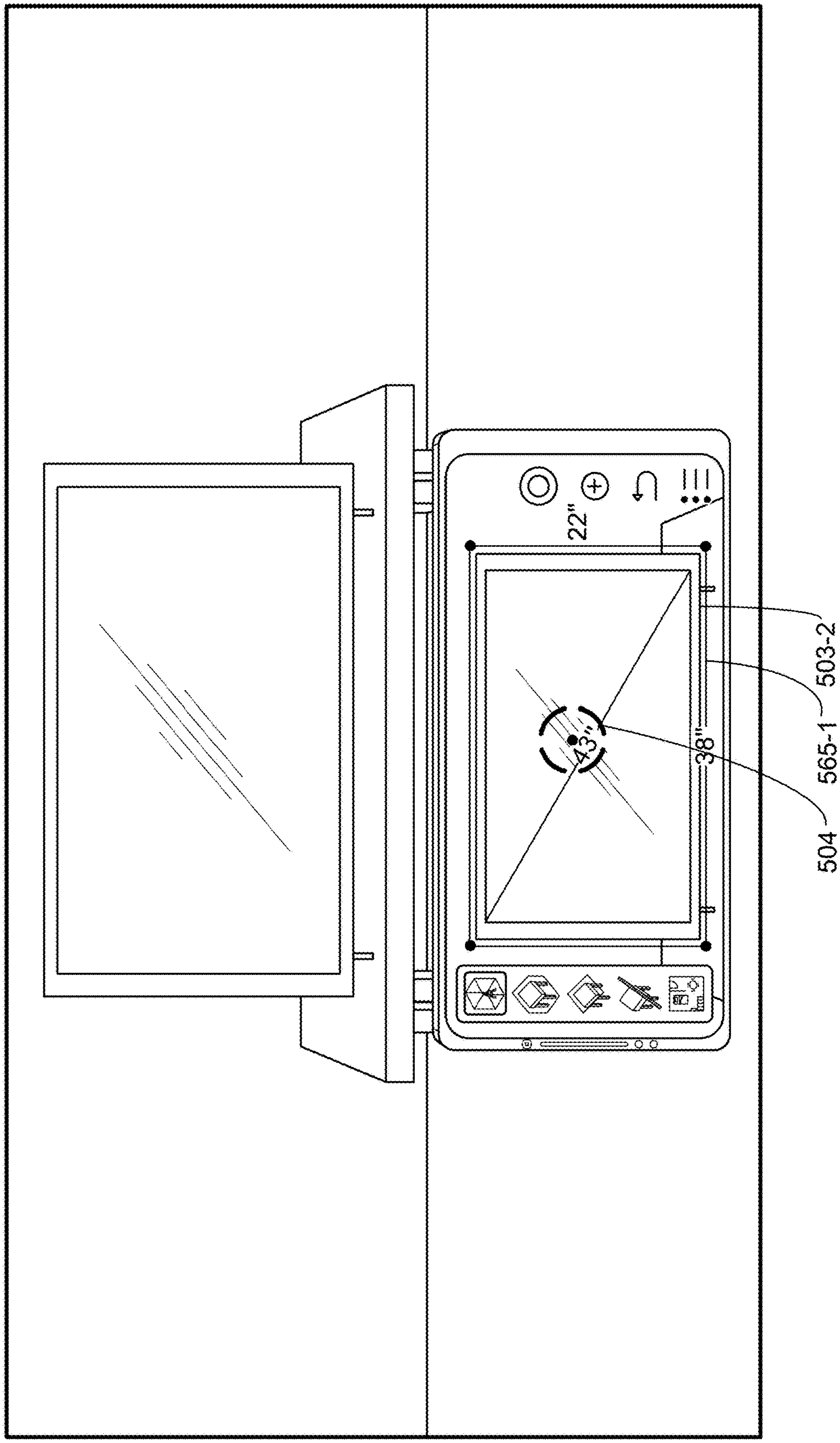

FIG. 5X shows the TV's measurement locked in. In some embodiments, to show that the measurement is locked in, device 100 replaces the dashed indication (e.g., bounding box) 565 with a solid indication (e.g., bounding box) 565-1. Additionally, in some embodiments, the reticle 504 is redisplayed after the indication (e.g., bounding box) 565 has been locked in. When device 100 is thereafter moved so that a different object (e.g., the TV stand) is in view of the device's one or more cameras, the reticle 504 splits apart to show a new box around the different object (e.g., the TV stand), and the previously measured object (e.g., the TV 503-2) is represented augmented reality view 500 with dotted lines, and/or surrounded by a bounding box having dotted lines. In some embodiments, if the user locks on to the new object (e.g., the TV stand), the representation in augmented reality view 500 of the previously measured object ceases to be surrounded by a corresponding indication (e.g., bounding box) 565. In some embodiments, the representation of the previously measured object in augmented reality view 500 has a different dotted bounding box than the new object. In some embodiments, the representation of the previously measured object has the same dotted bounding box as the new object. In some embodiments, if the user moves the device 100 so that reticle 504 is no longer over the representation of the previously measured object, without locking in measurements of the previously measured object, then the representation of the previously measured object, to the extent that it is still in the field of view of the device's one or more cameras, is displayed with solid lines, at least on the object's periphery, and/or displayed in a solid box until the reticle is moved over a new object that is capable of being measured by the device. In some embodiments, when augmented reality view 500 includes representation of both the previously measured object and a new object, the previously measured object is displayed in augmented reality view 500 with a bounding box having a different dotting pattern than the bounding box displayed around the new object. In some embodiments, the previously measured object is displayed in augmented reality view 500 with a bounding box having the same dotting pattern as the bounding box displayed around the new object.

Figure 5Y:
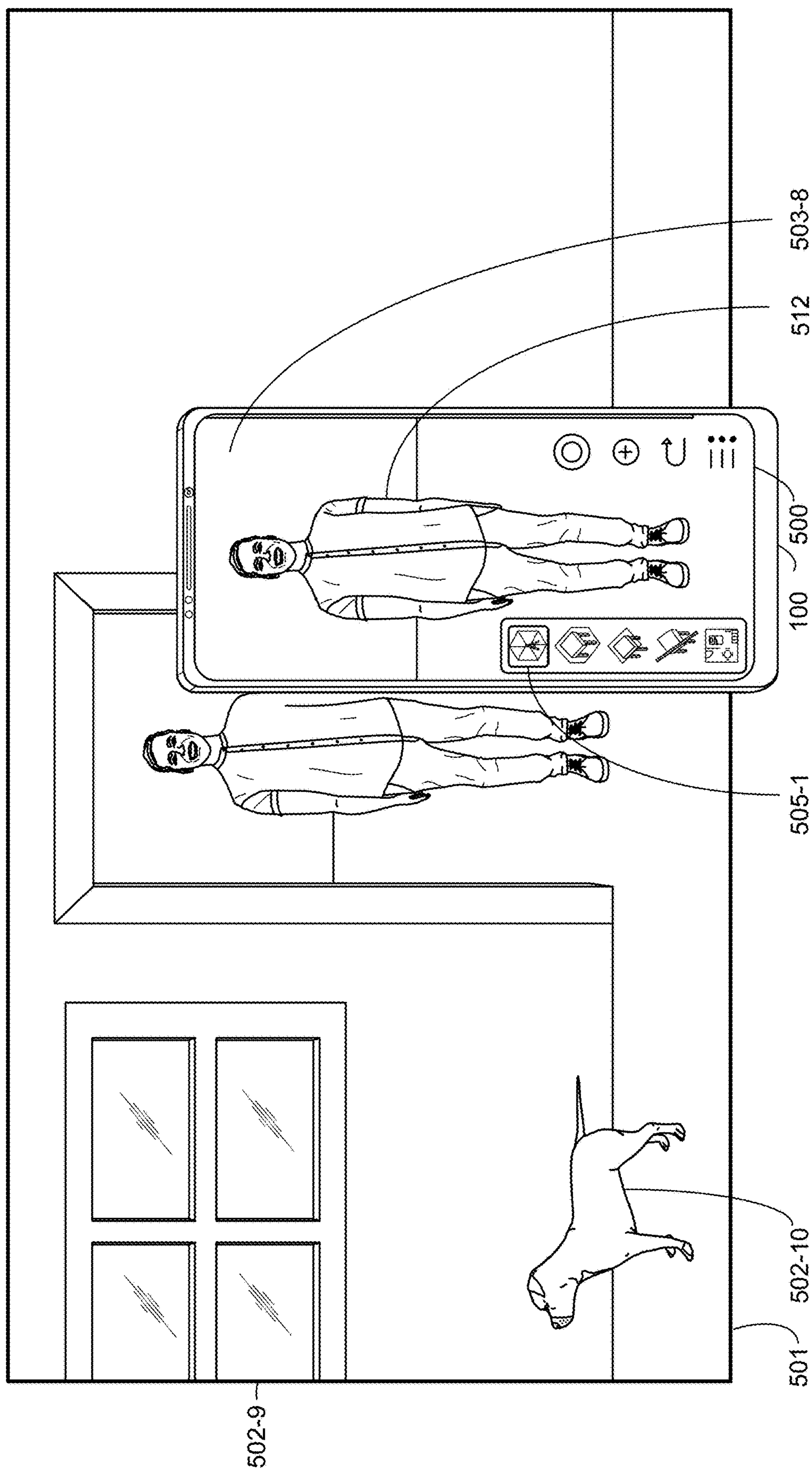

FIG. 5Y shows another orientation of the portable multifunction device 100, with hallway 502-8 in view of the device's one or more optical sensors 164; a representation 503-8 of the hallway is shown in augmented reality view 500. In this orientation, the window 502-9 and the dog 502-10 are in view of the one or more optical sensors 164 of device 100. FIG. 5Y shows the portable multifunction device 100 still having the automatic measurement mode icon 505-1 selected. FIG. 5Y also shows a representation 512 of a person standing in the hallway. The person is automatically measured after the device detects a person is in view of the one or more optical sensors 164. In some embodiments, placing a reticle (not shown in FIG. 5Y) over the representation 512 of the person causes the portable multifunction device 100 to place a bounding line around the representation 512 of the person to indicate that the person can be measured.

Figure 5Z:
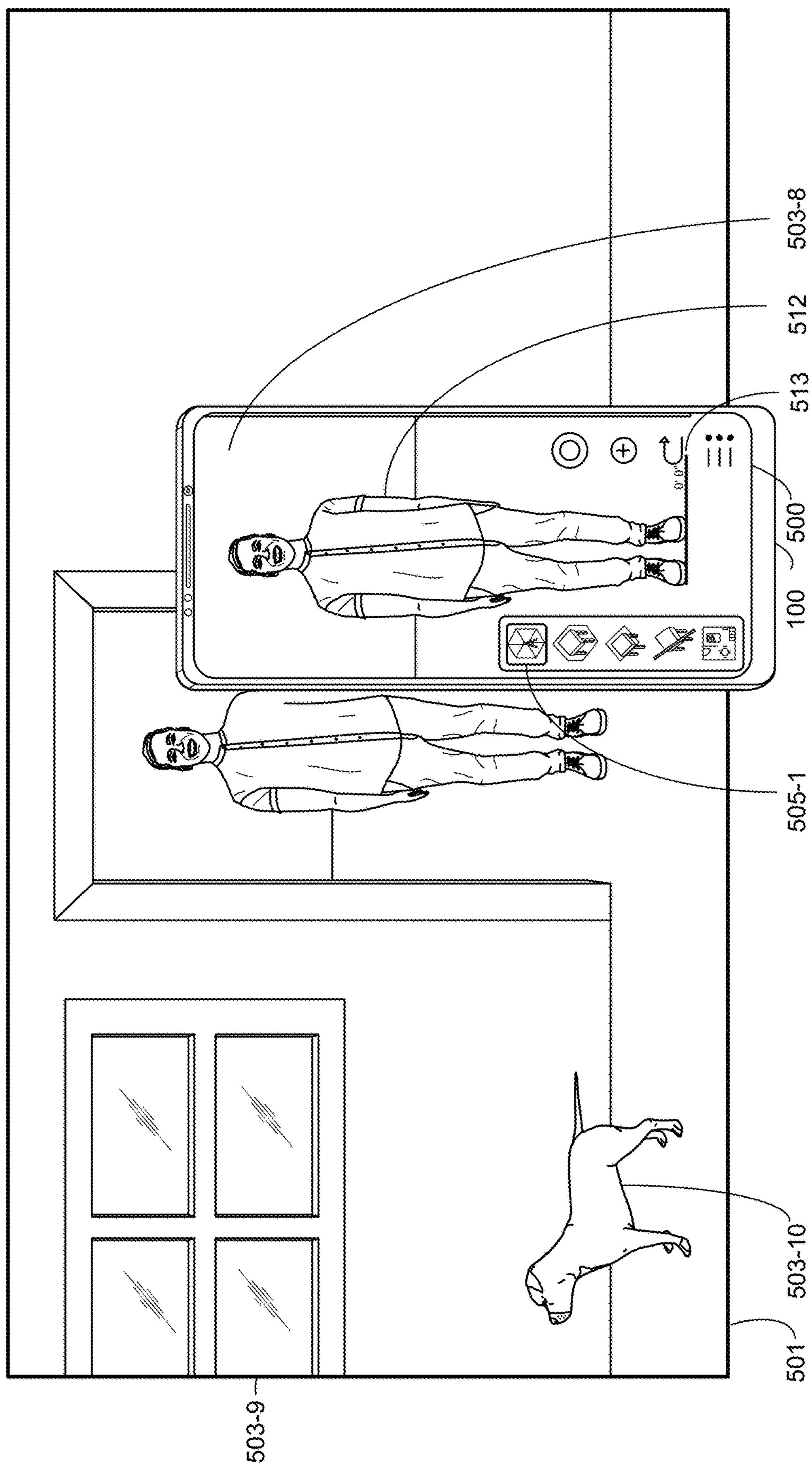
Figure 5A:
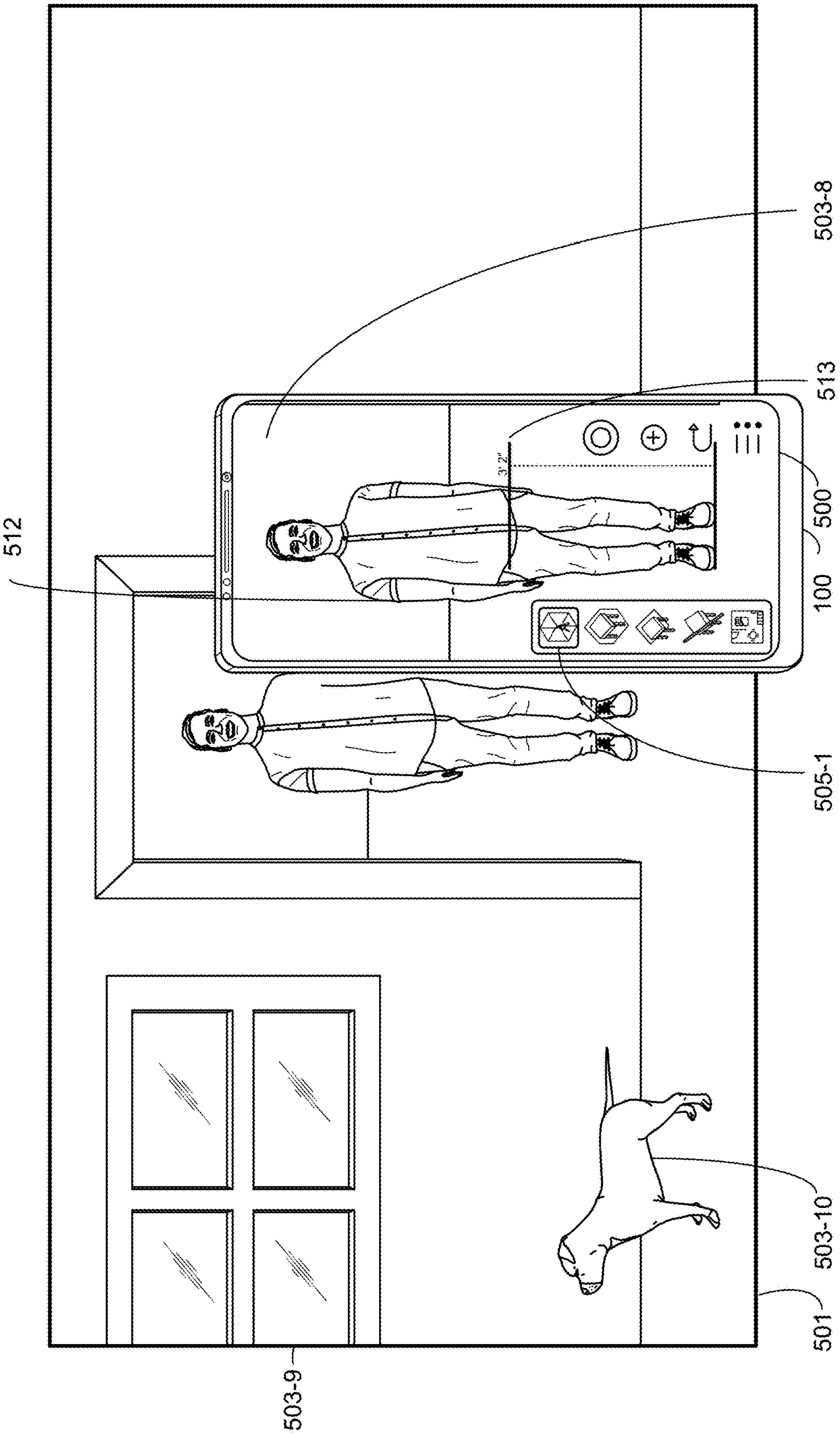
Figure 5A:
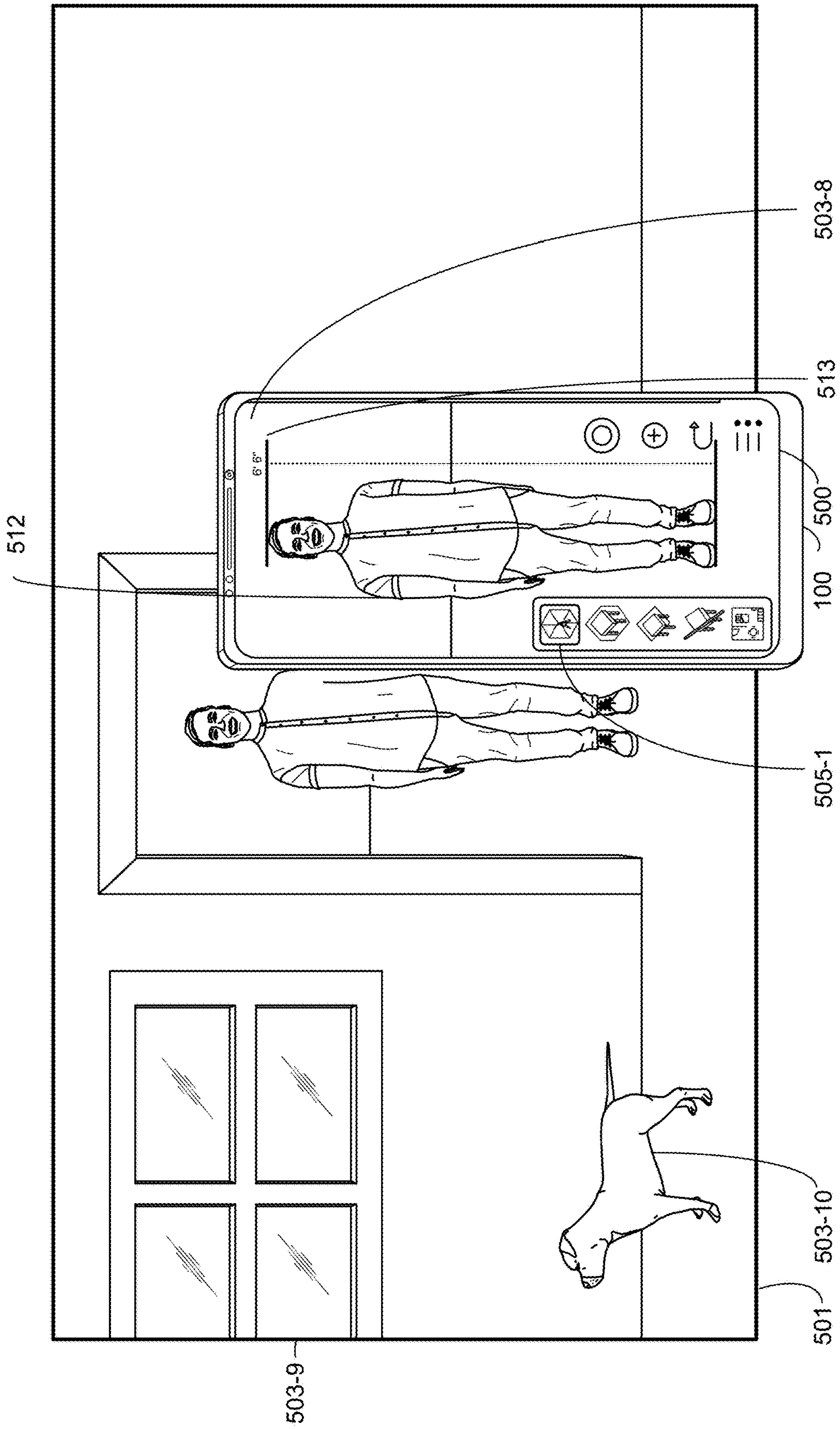
Figure 5A:
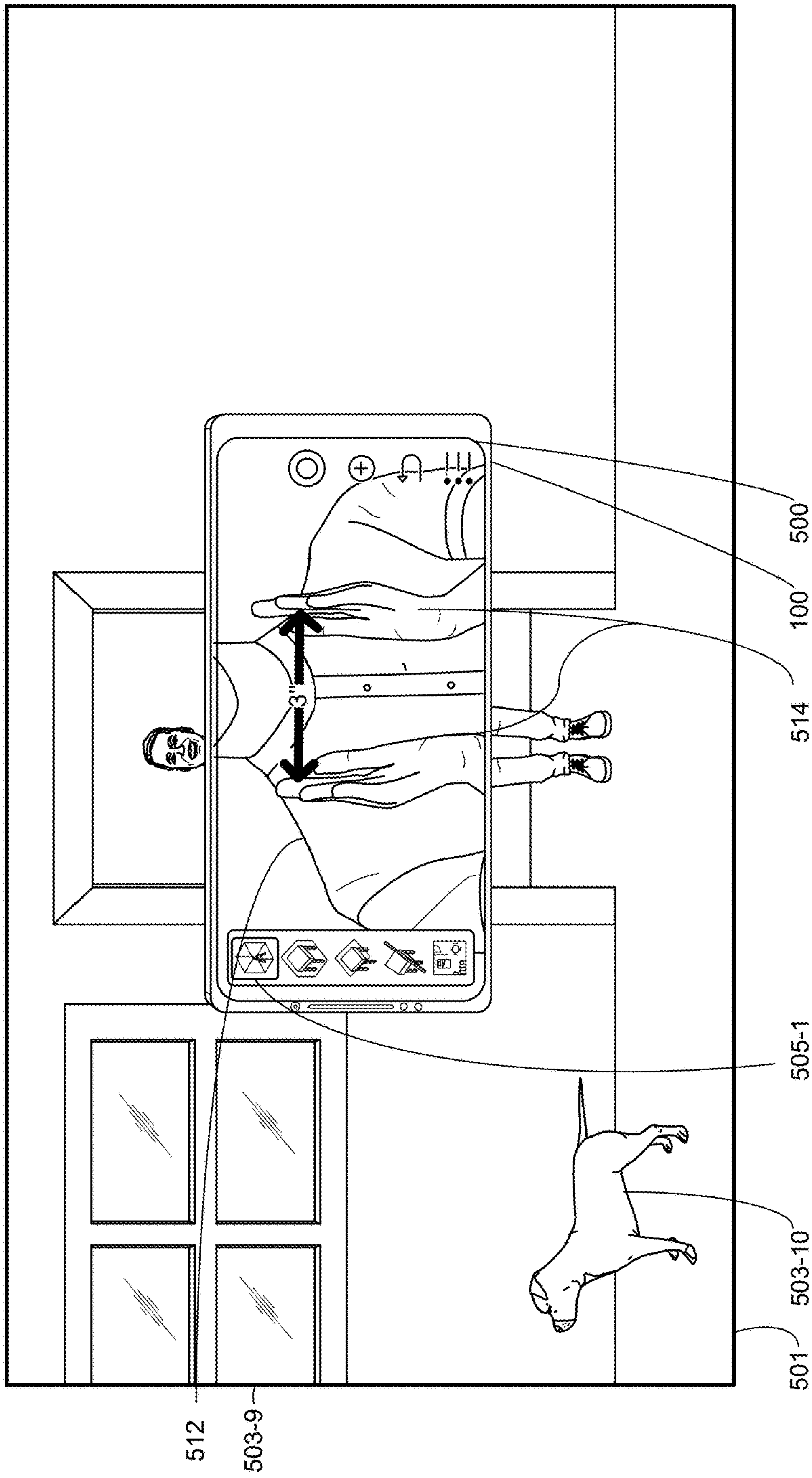
Figure 5A:
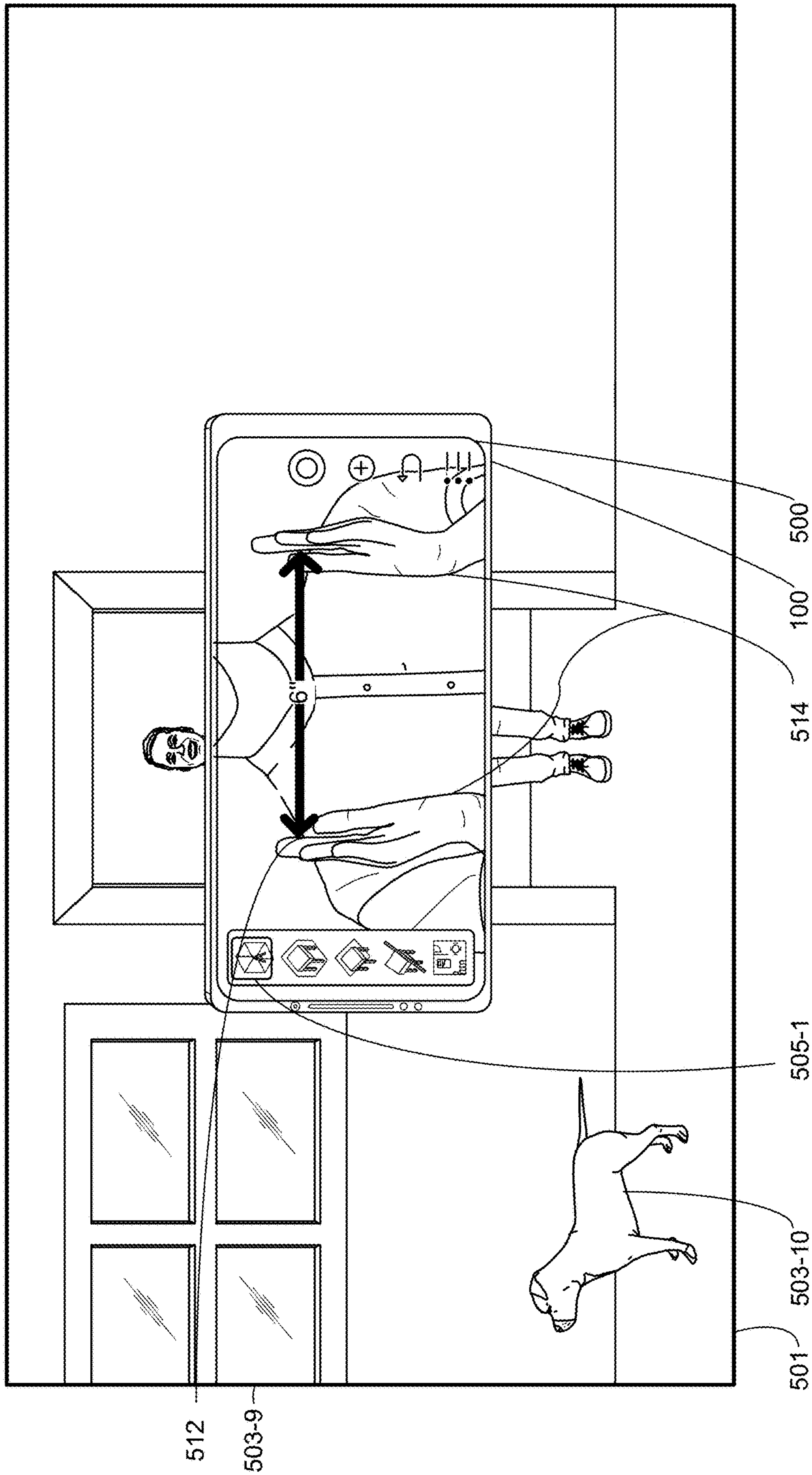
Figure 5A:
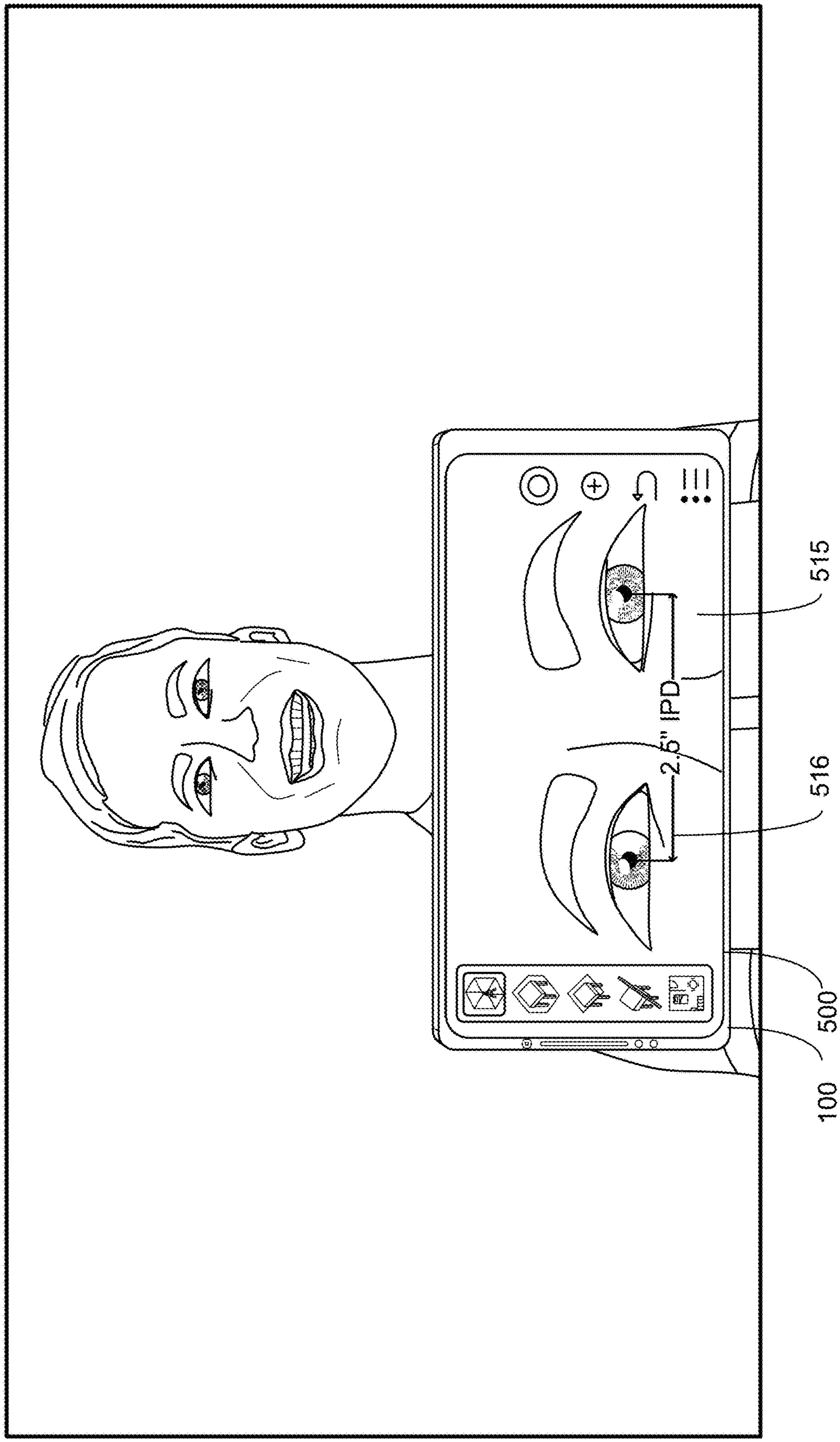
Figure 5A:
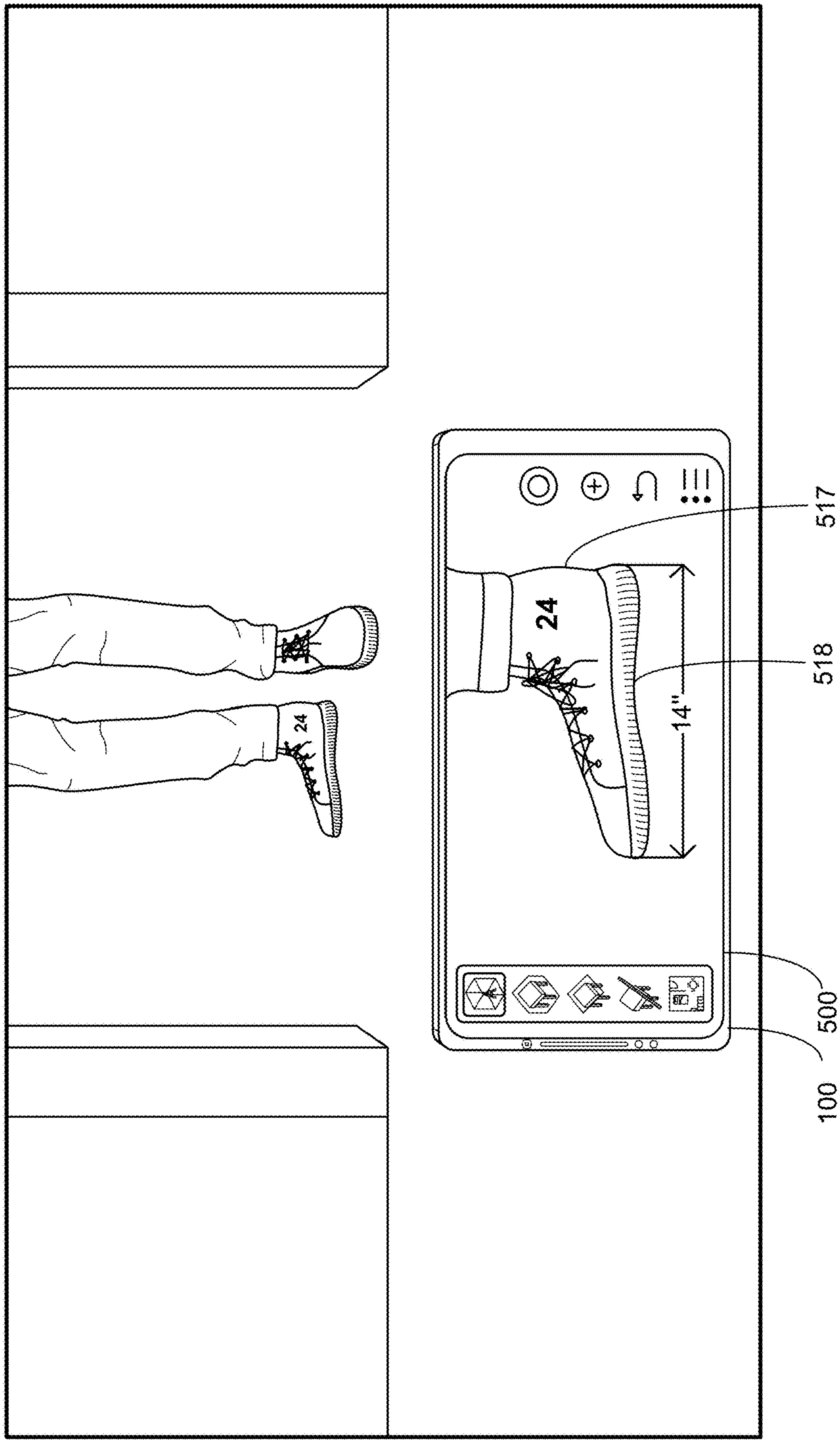
Figure 5A:
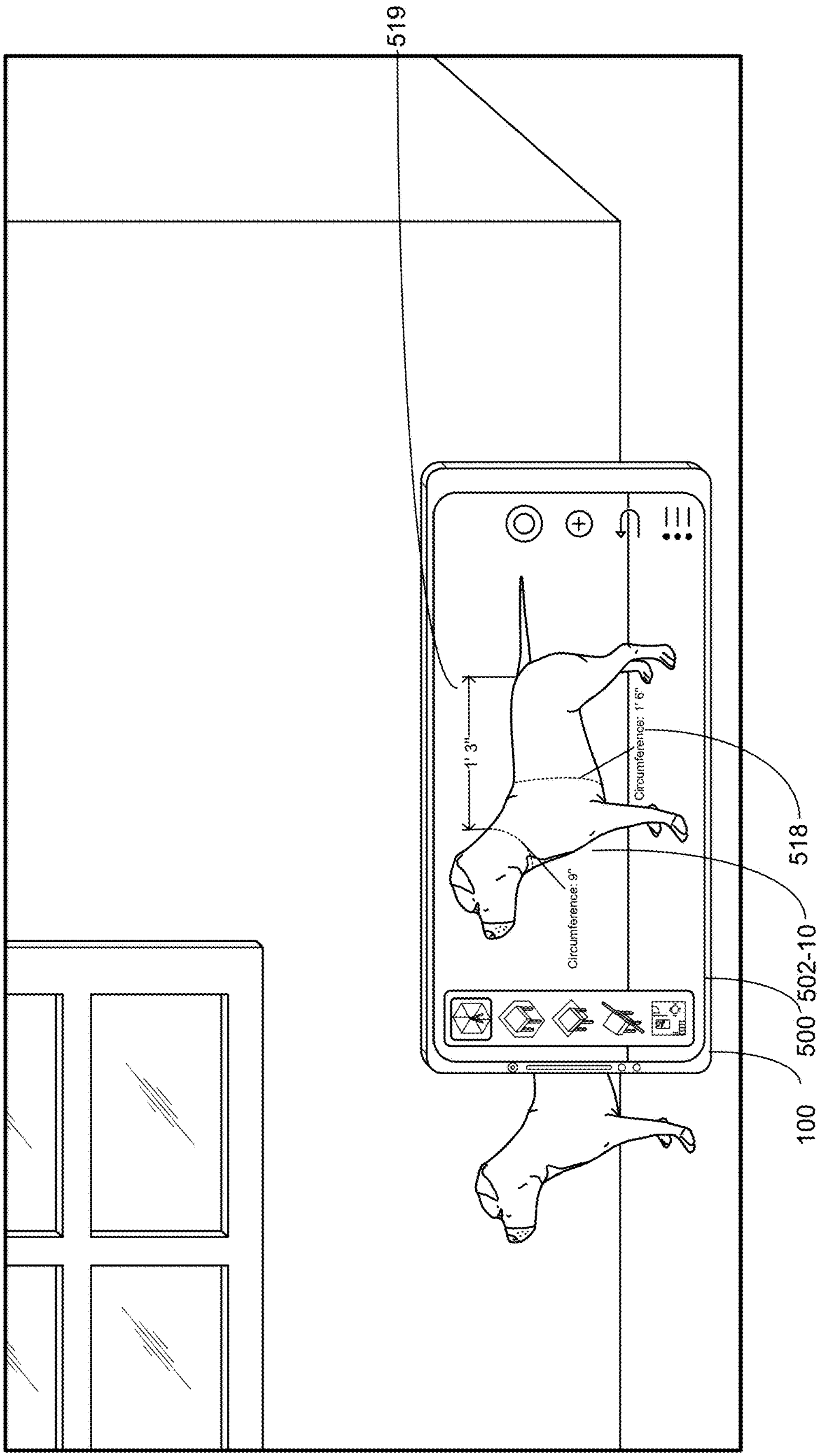
Figure 5A:
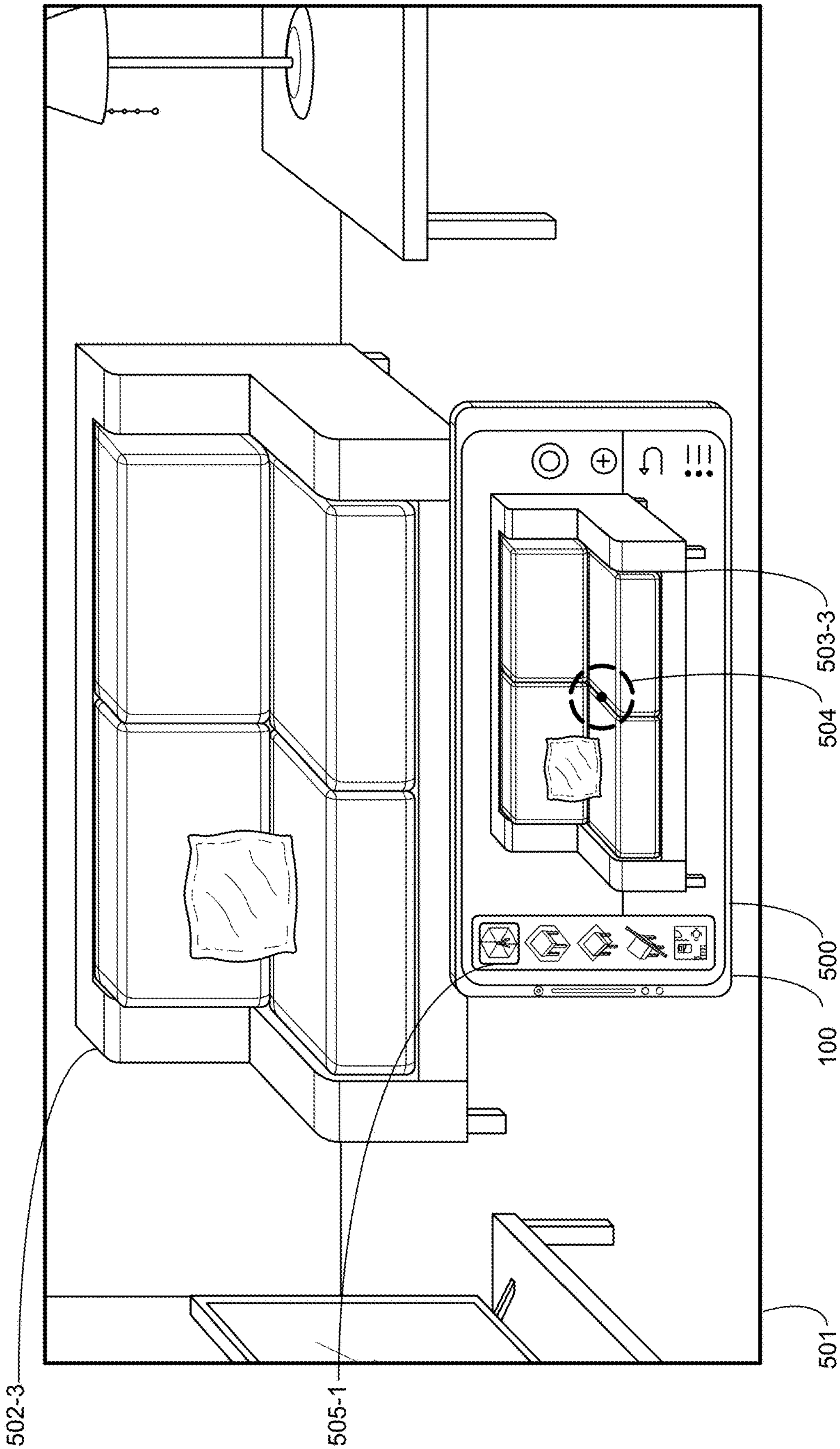
Figure 5A:
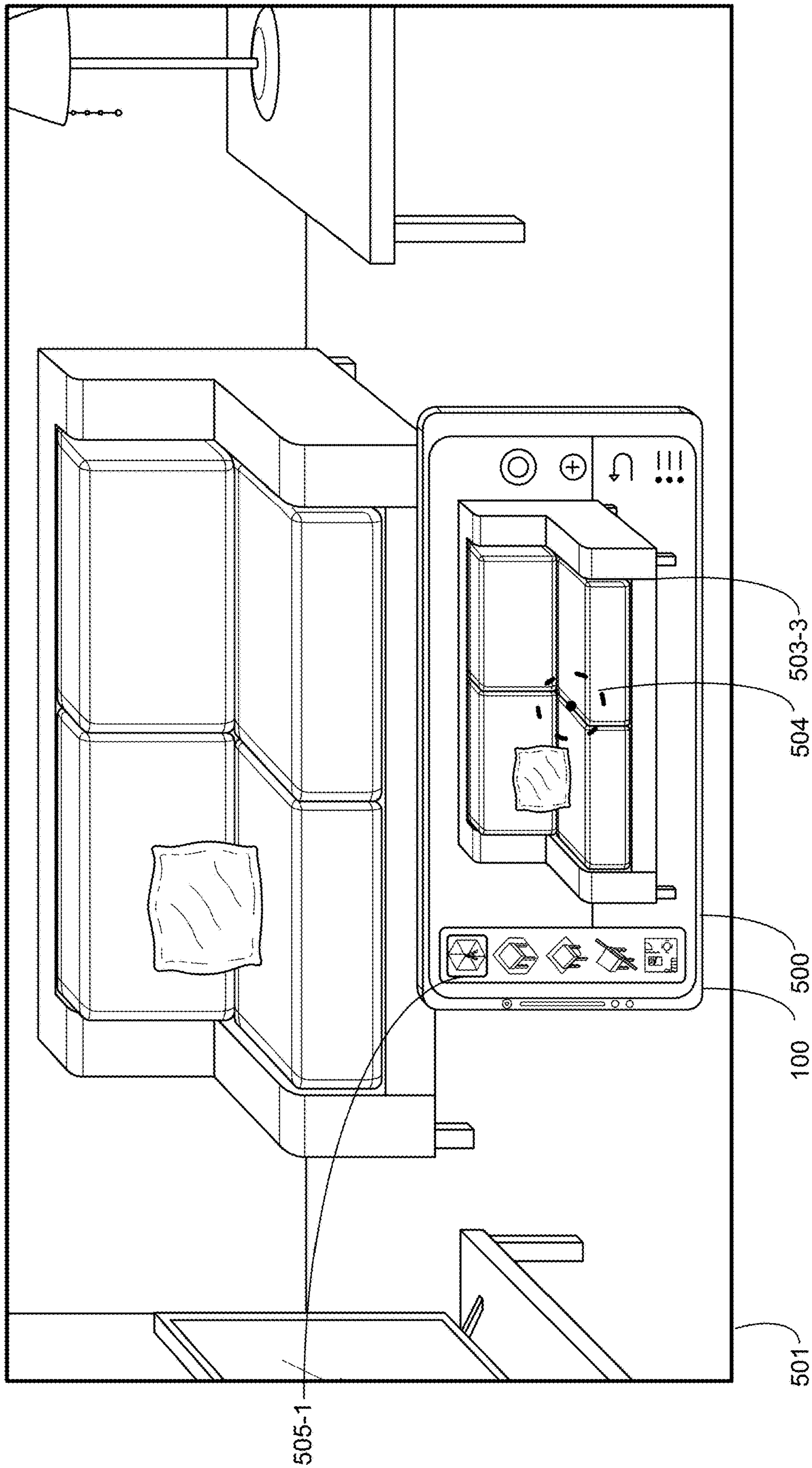
Figure 5A:
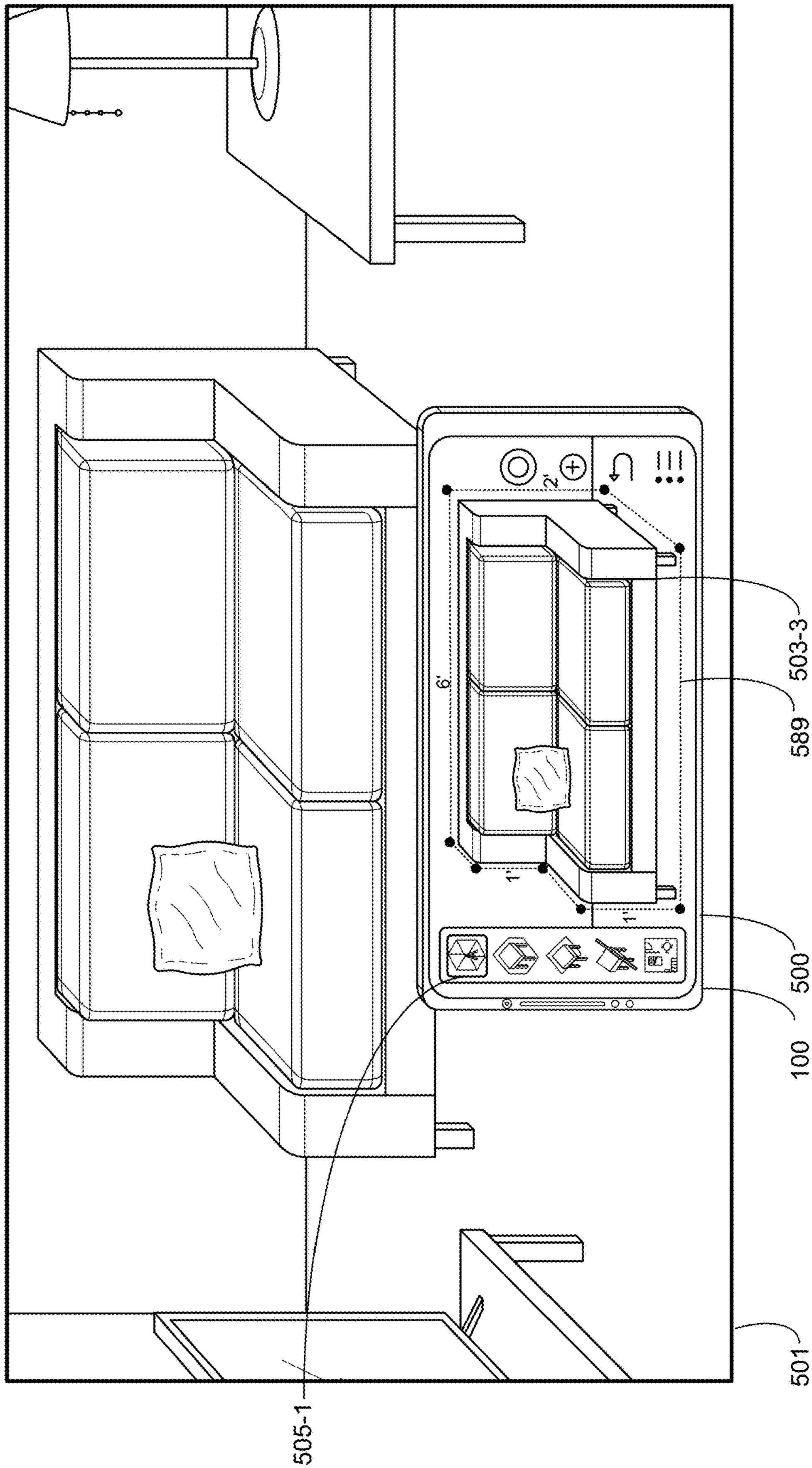
Figure 5A:
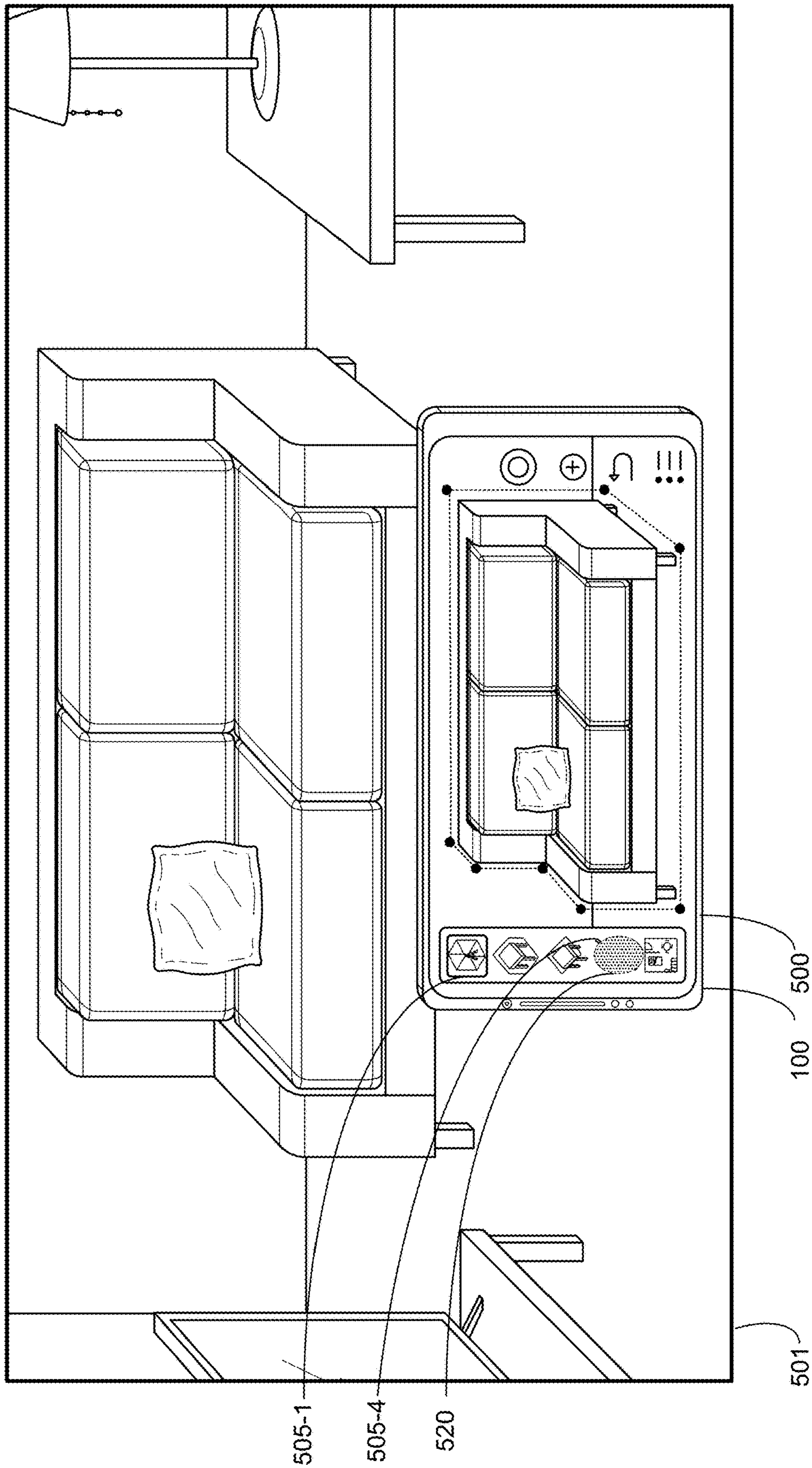
Figure 5A:
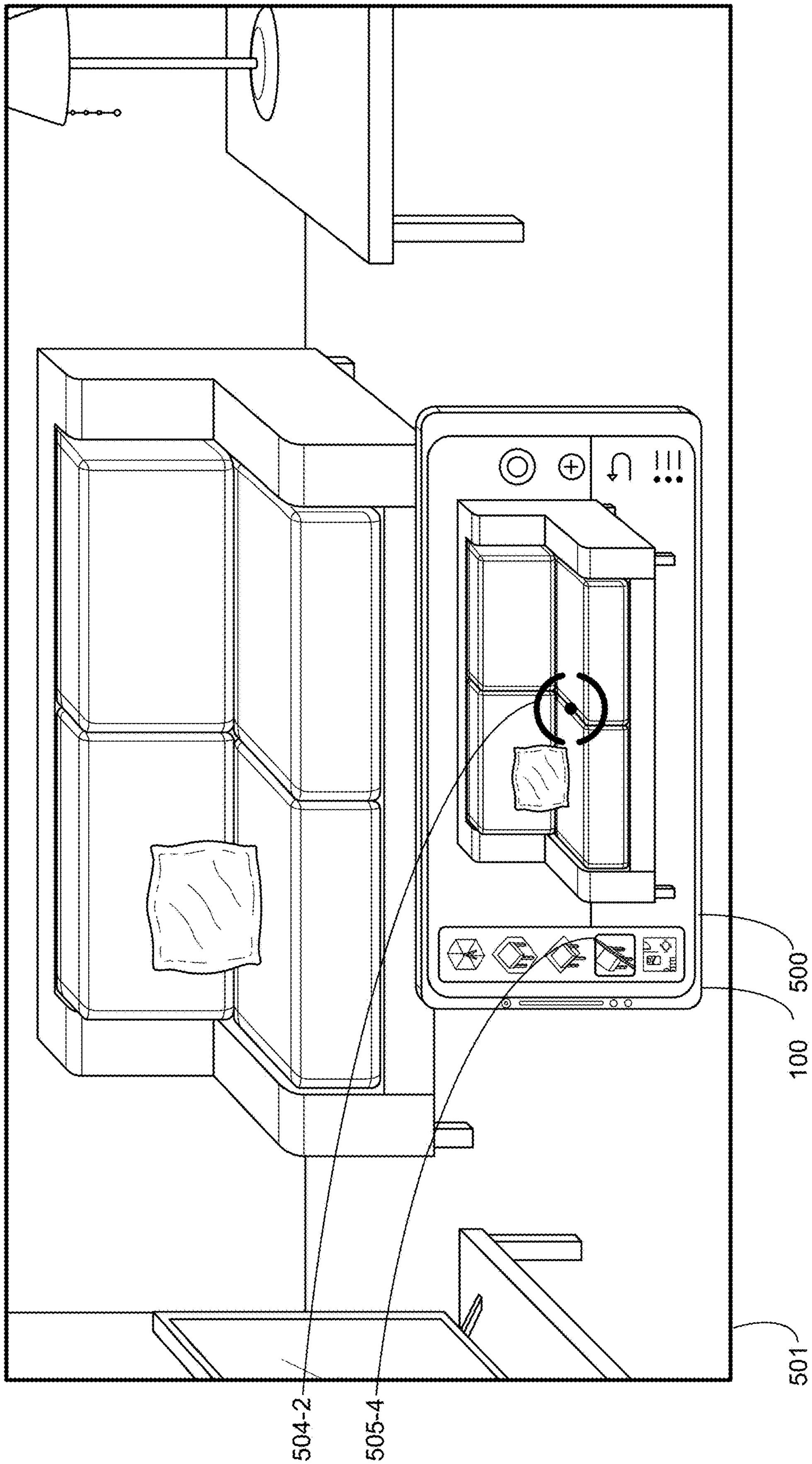
Figure 5A:
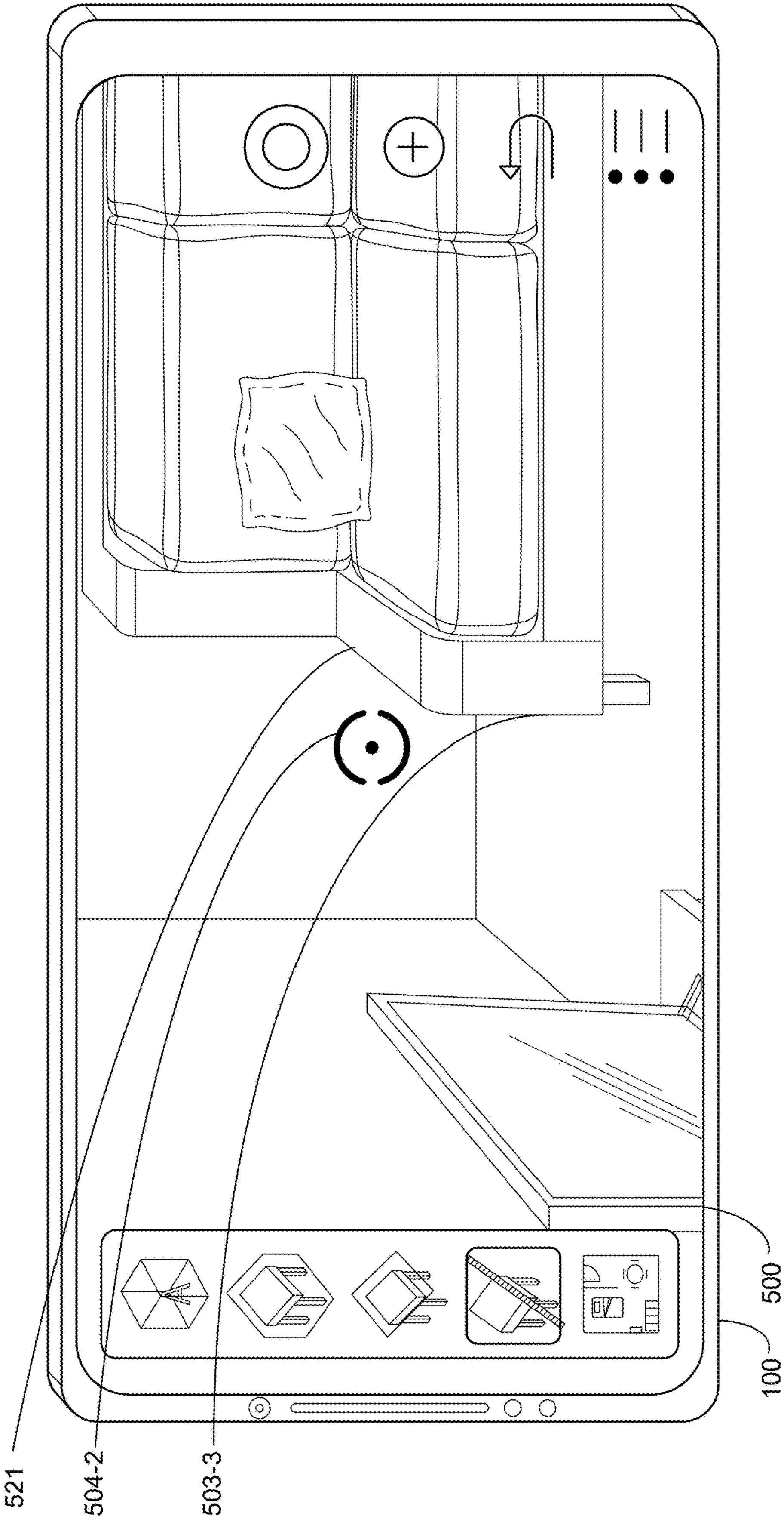
Figure 5A:
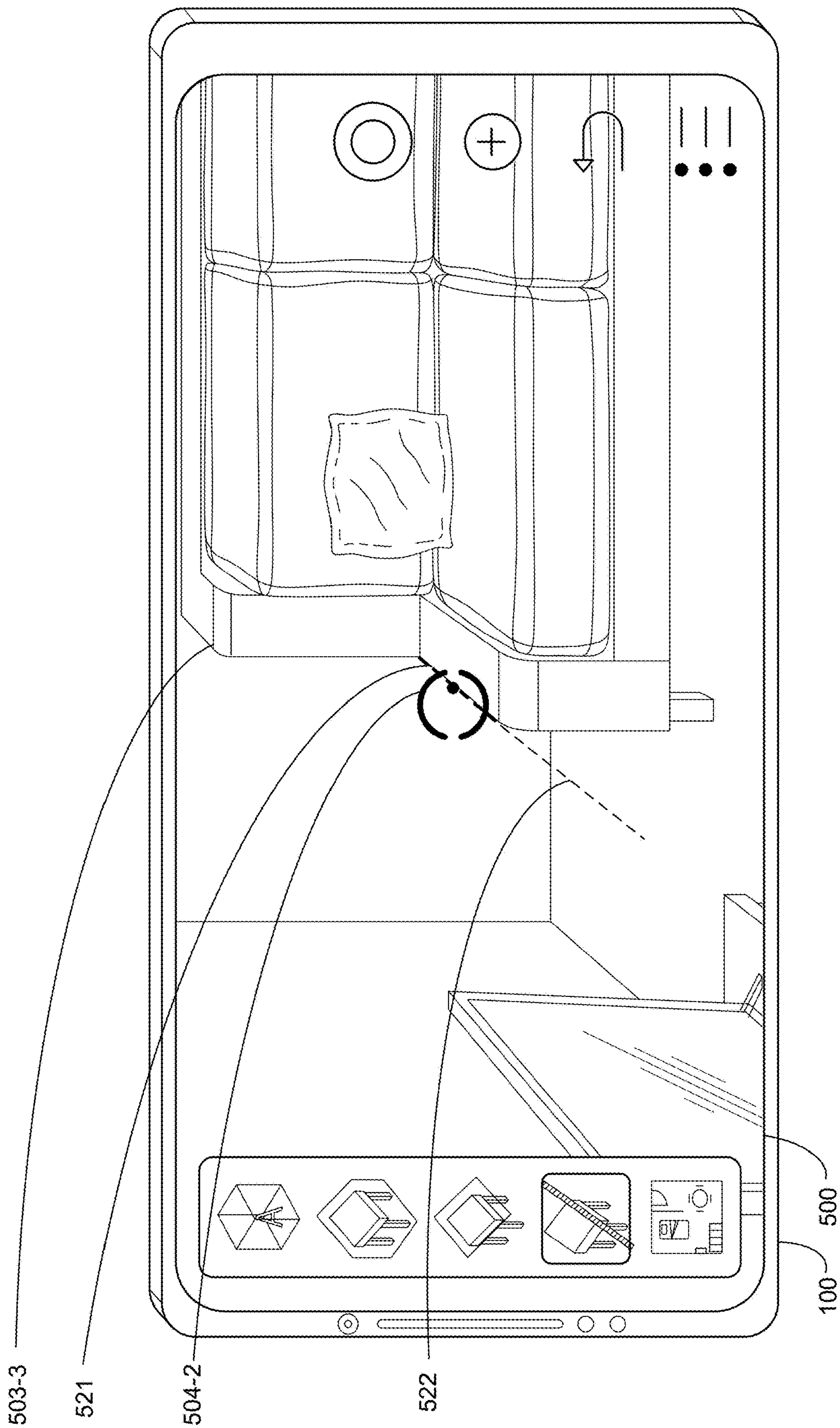
Figure 5A:
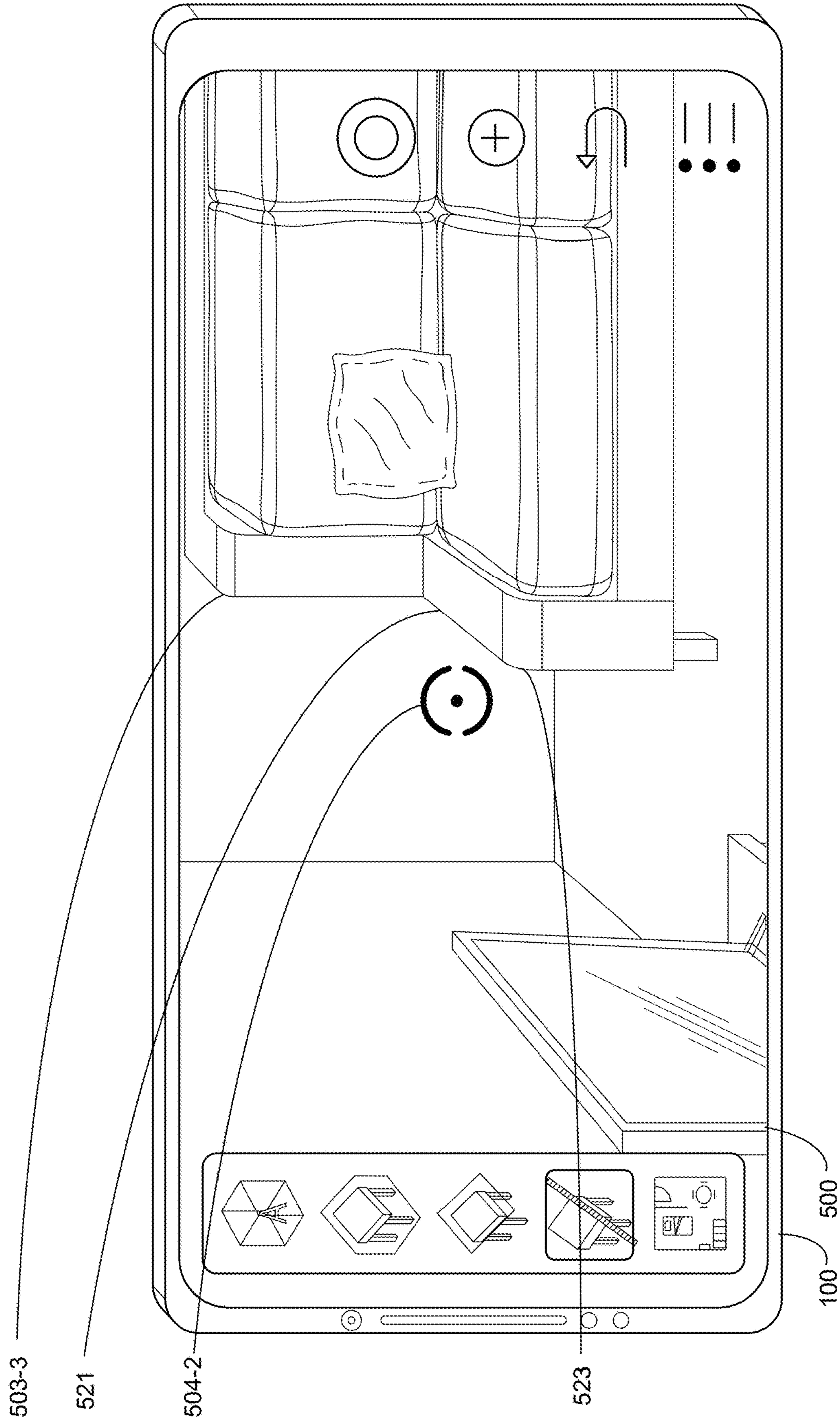
Figure 5A:
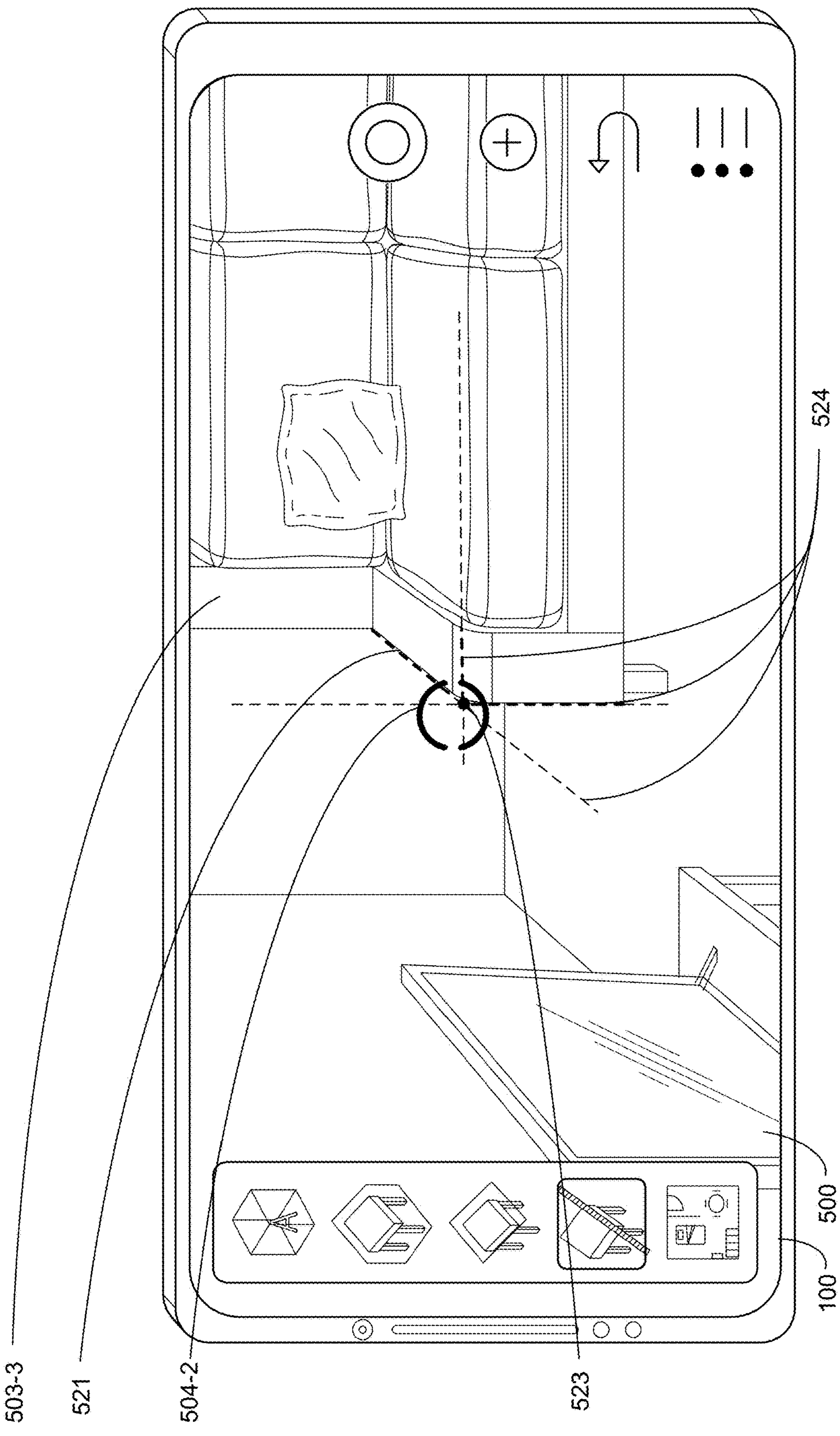
Figure 5A:
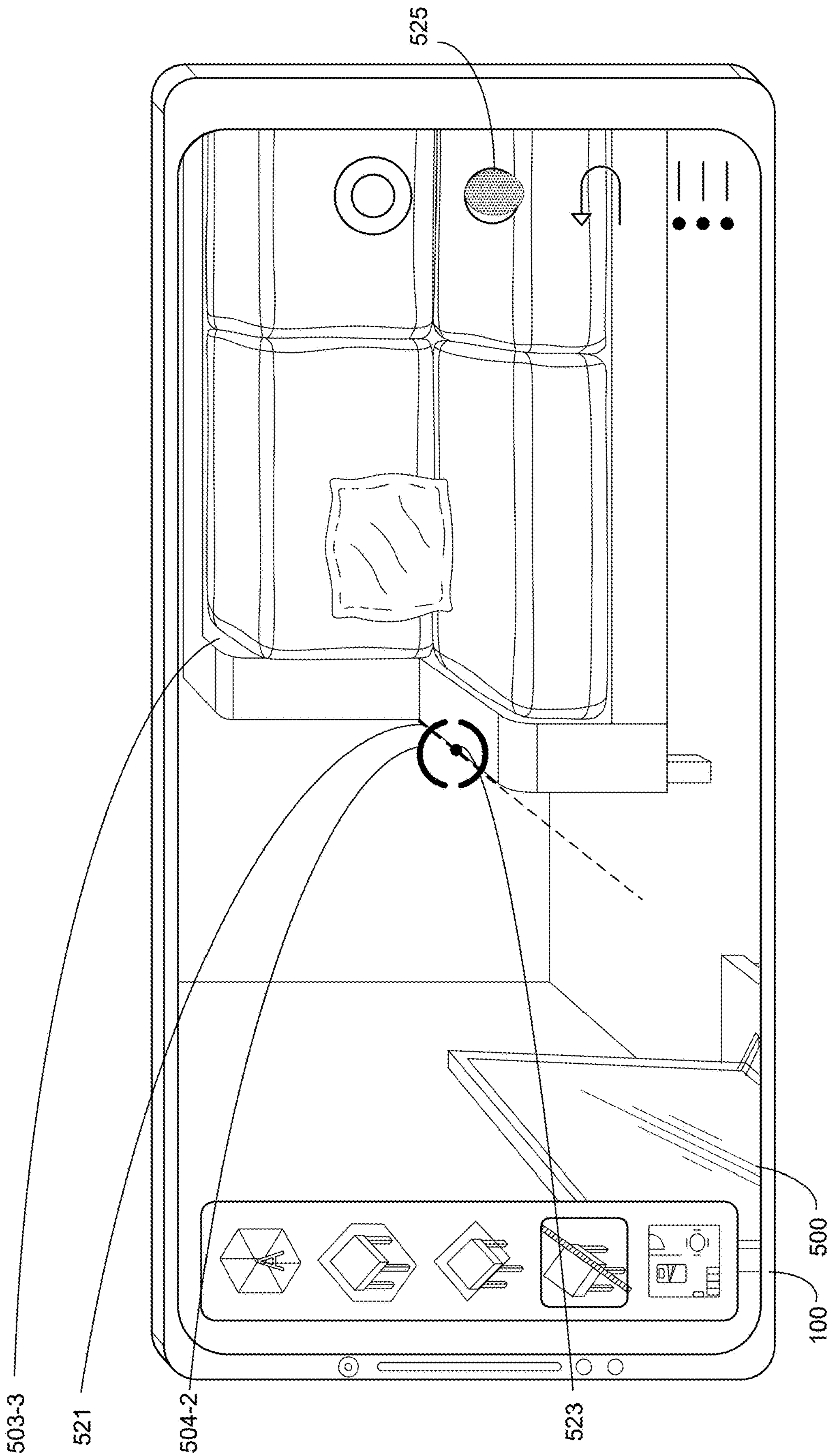
Figure 5A:
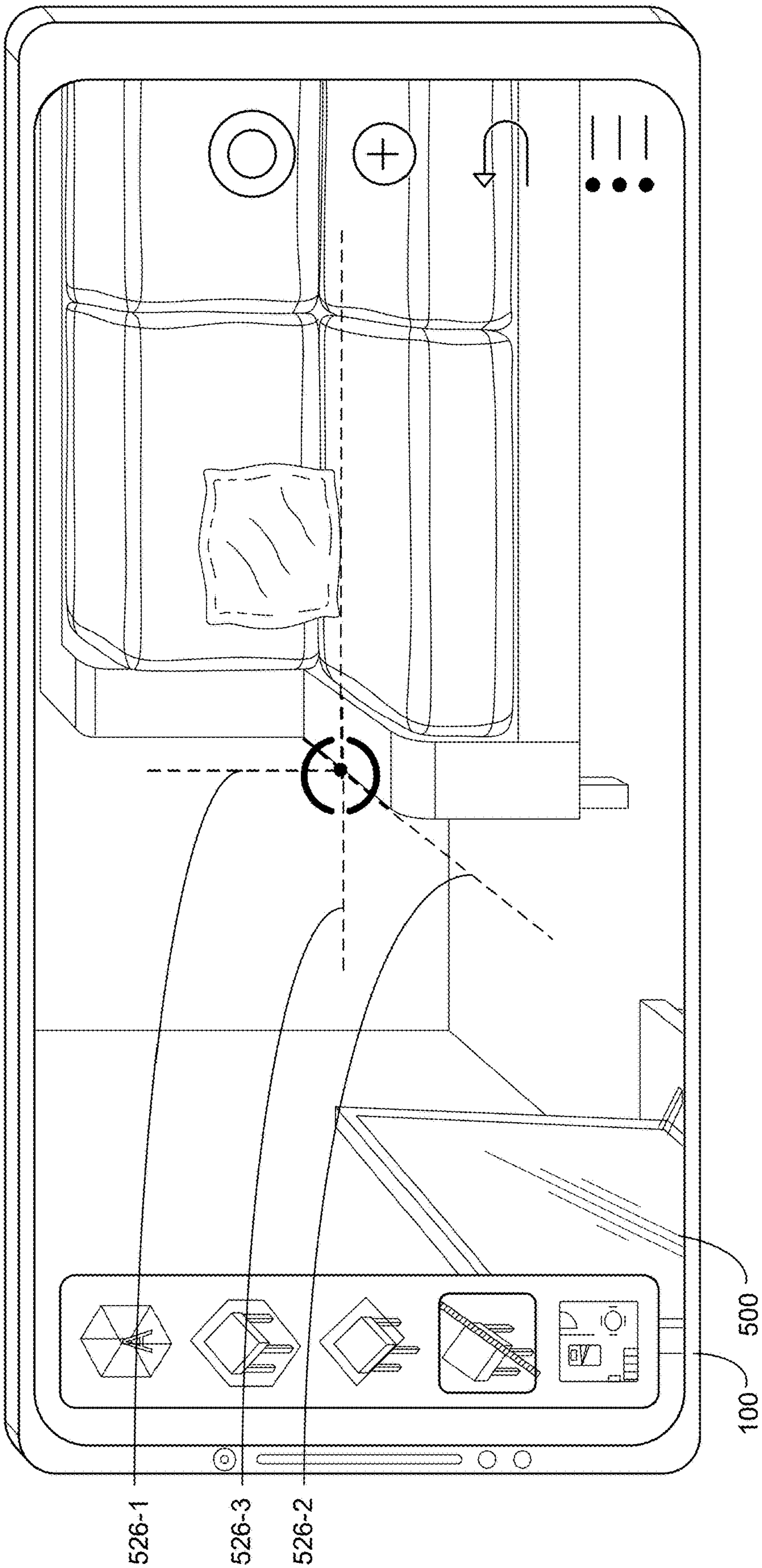
Figure 5A:
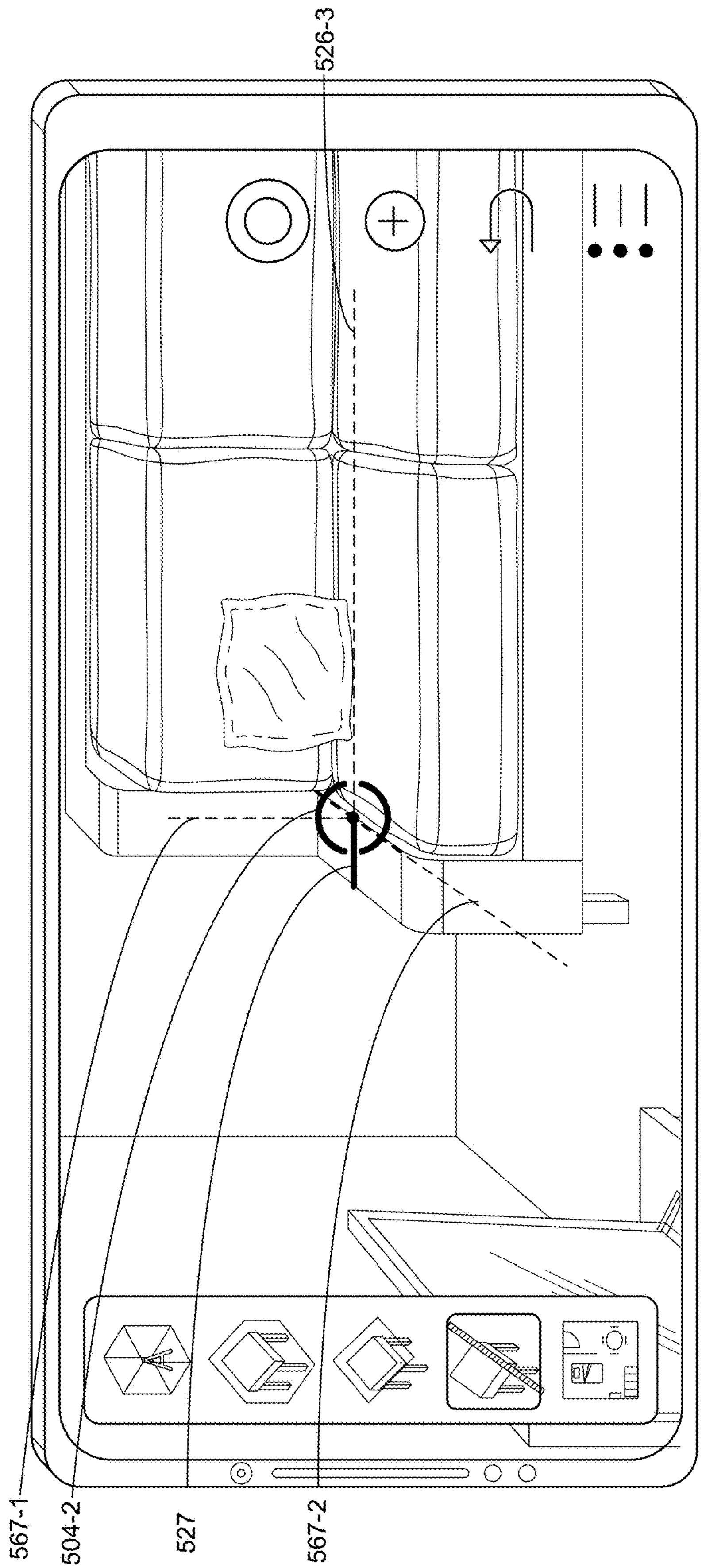
Figure 5A:
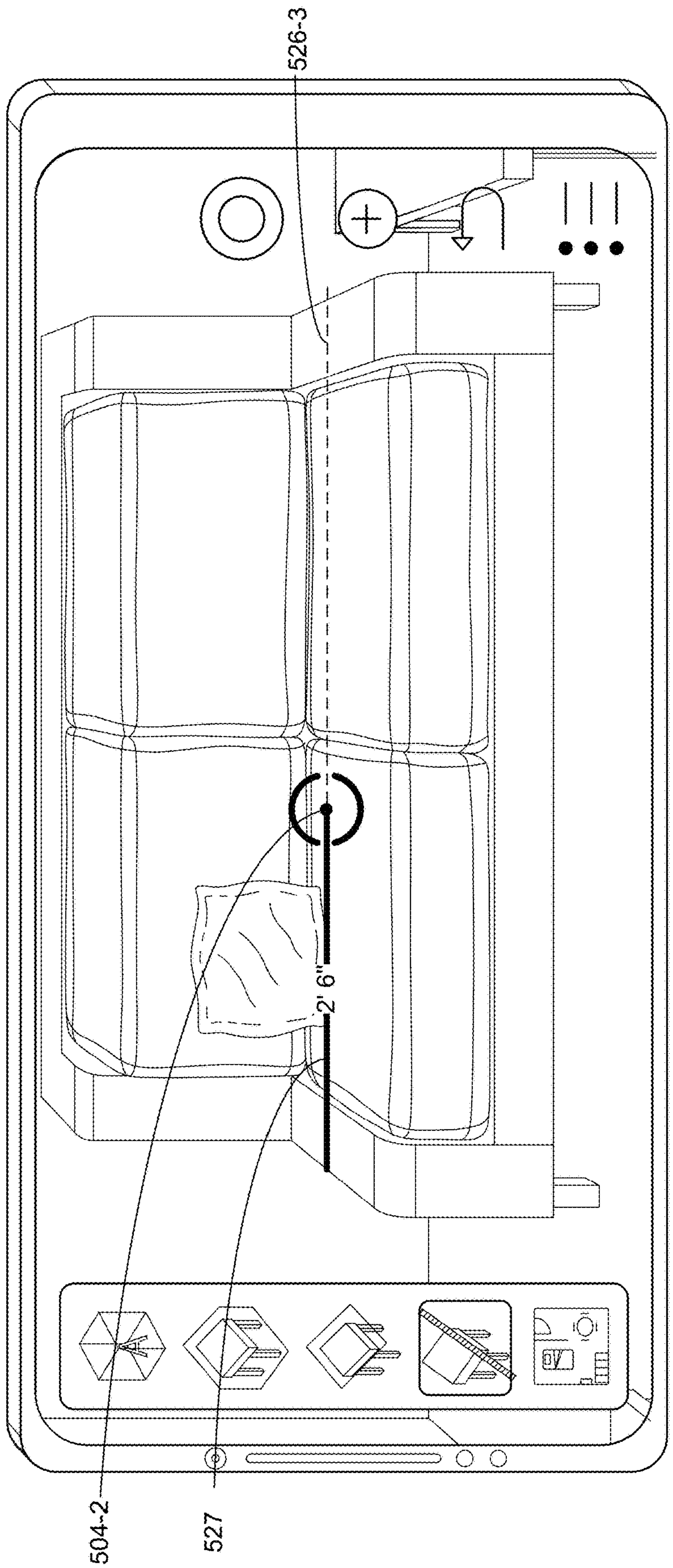
Figure 5A:
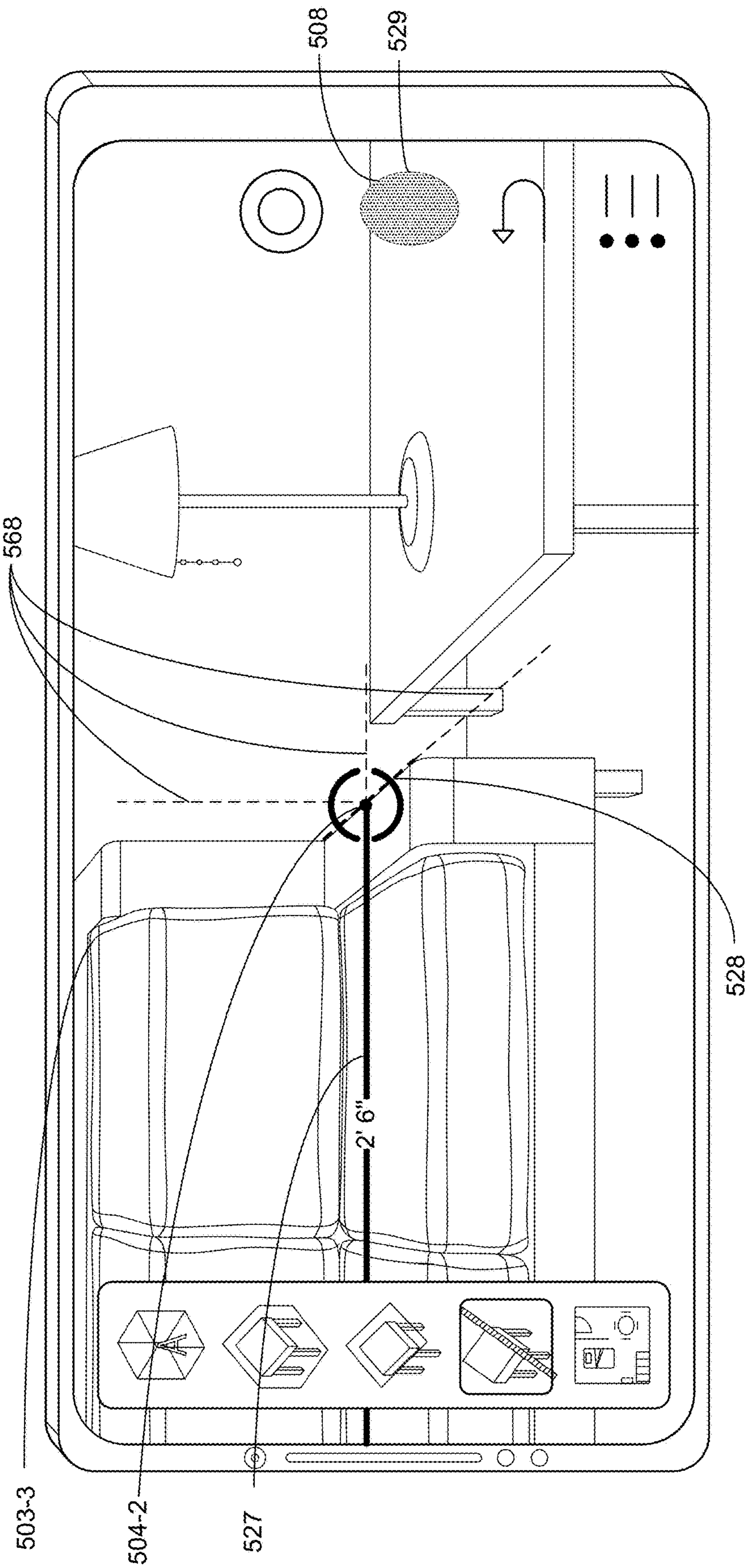
Figure 5A:
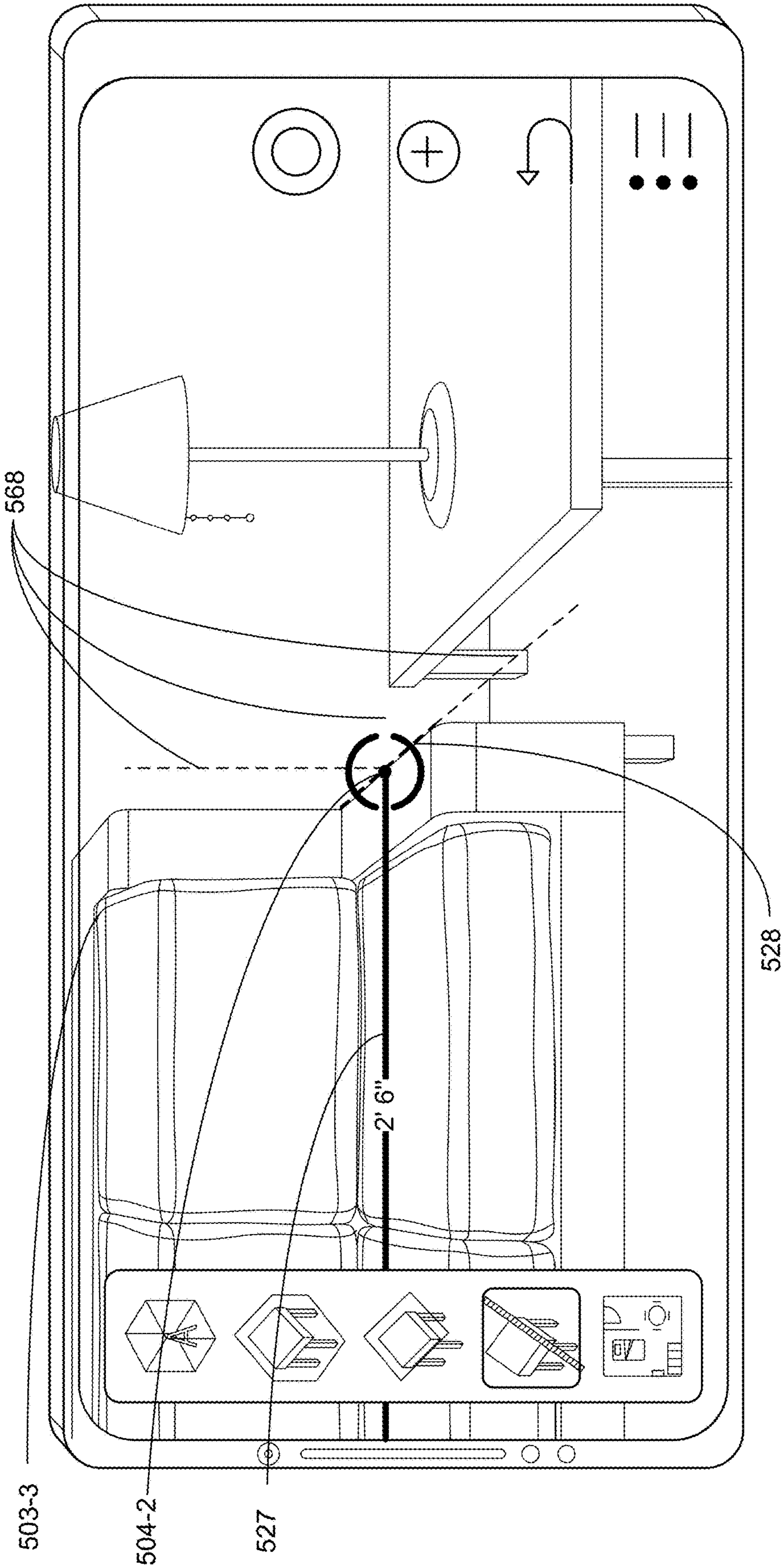
Figure 5A:
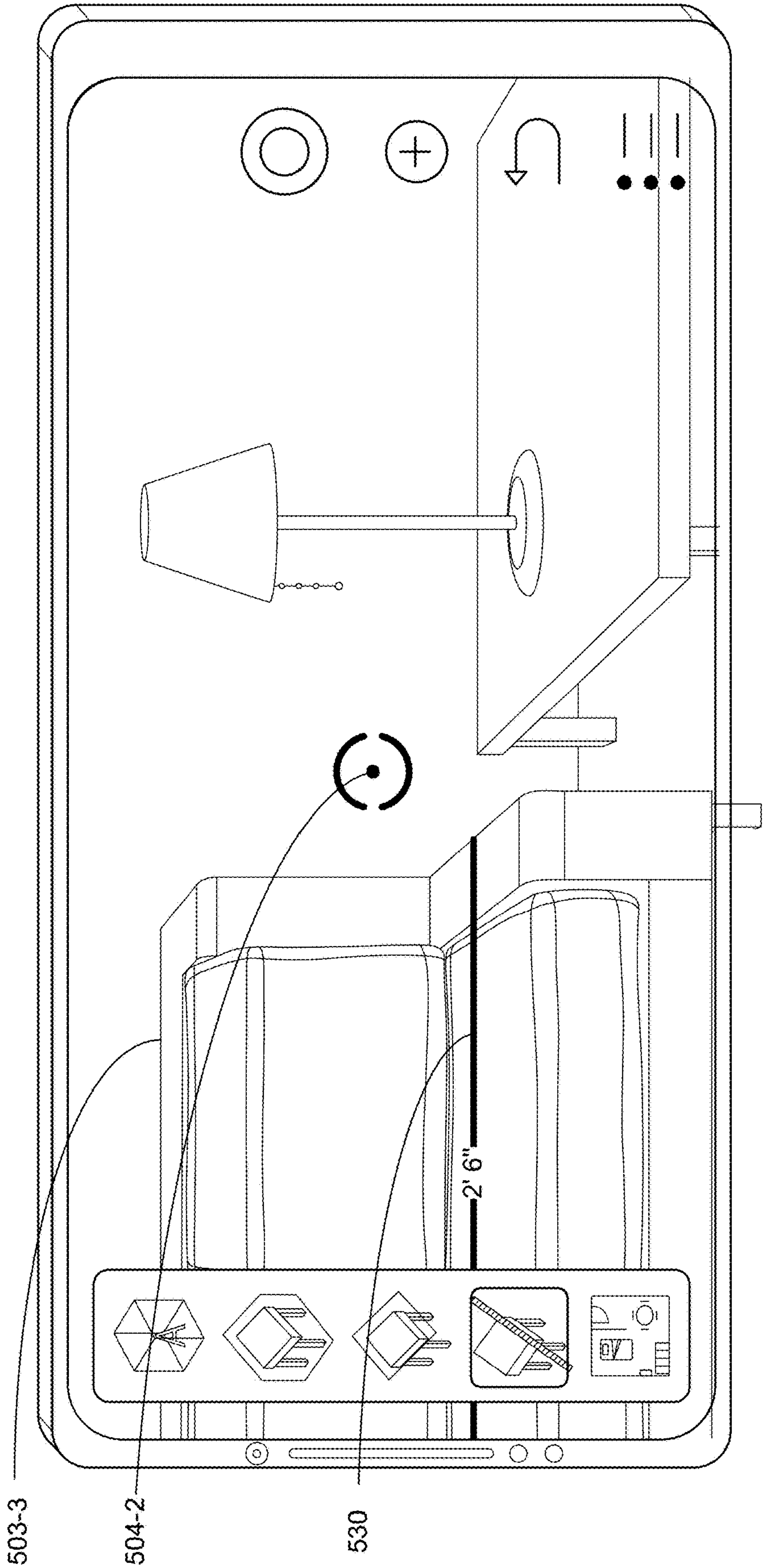
Figure 5A:
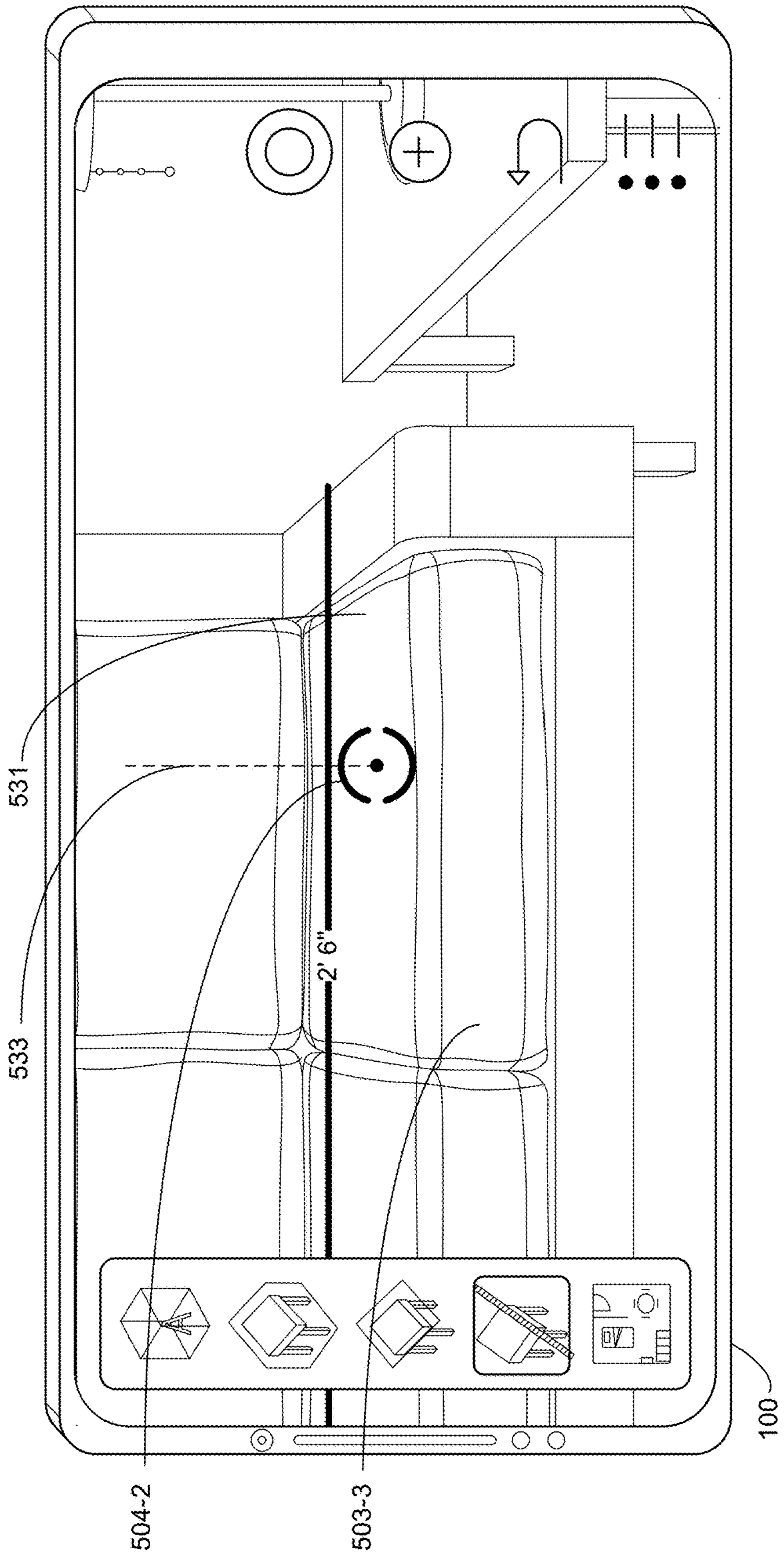
Figure 5A:
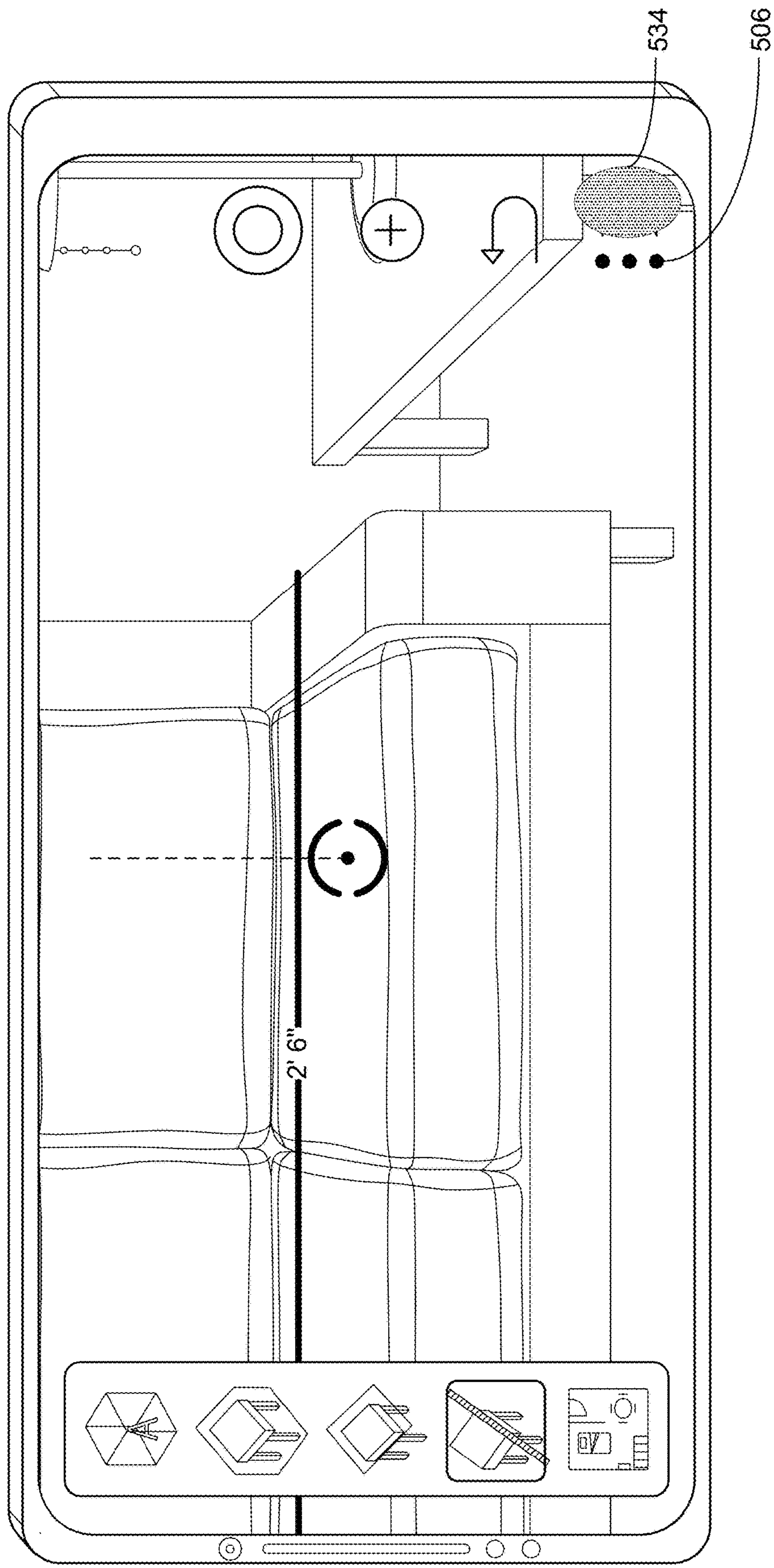
Figure 5A:
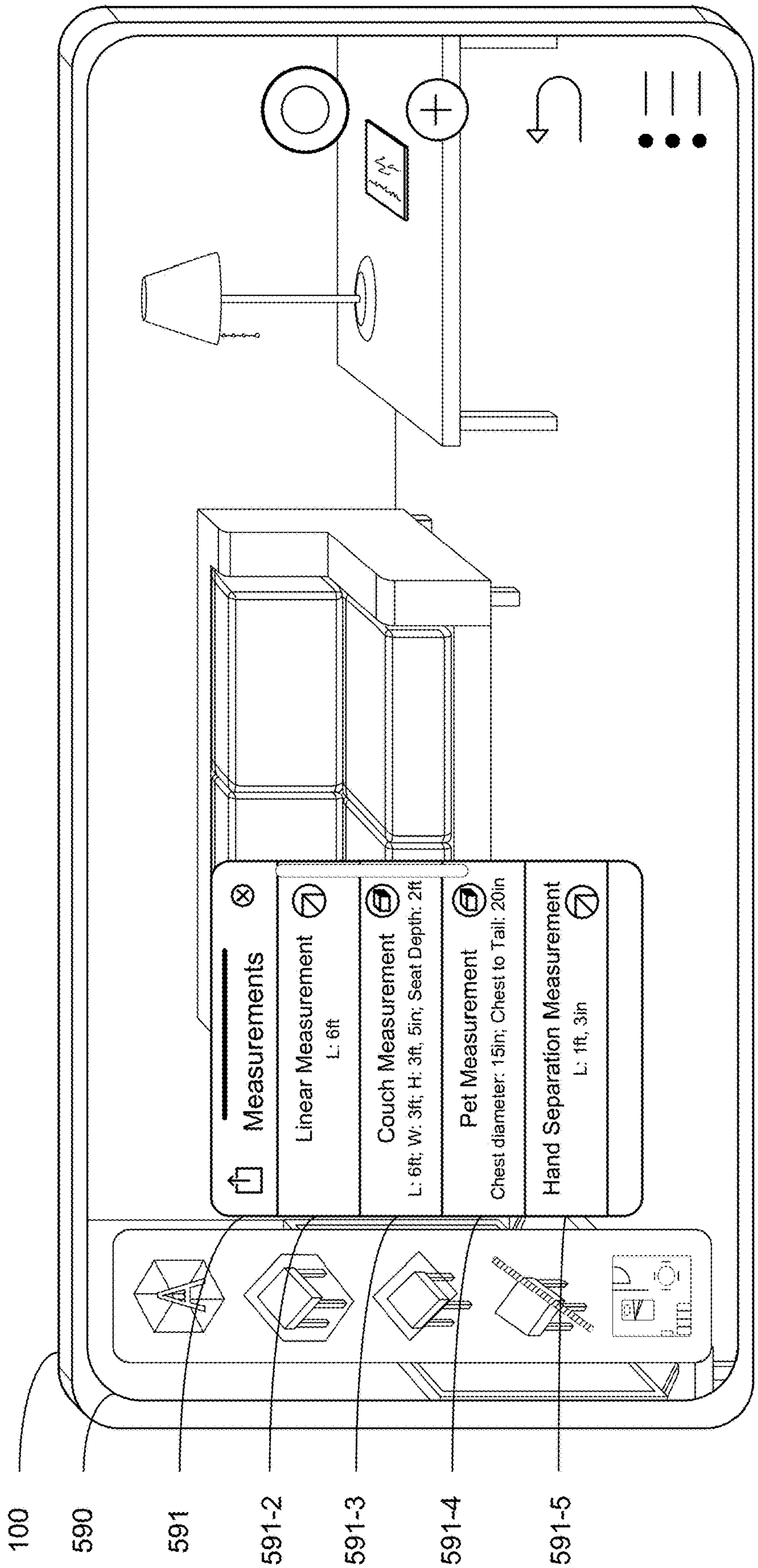
Figure 5B:
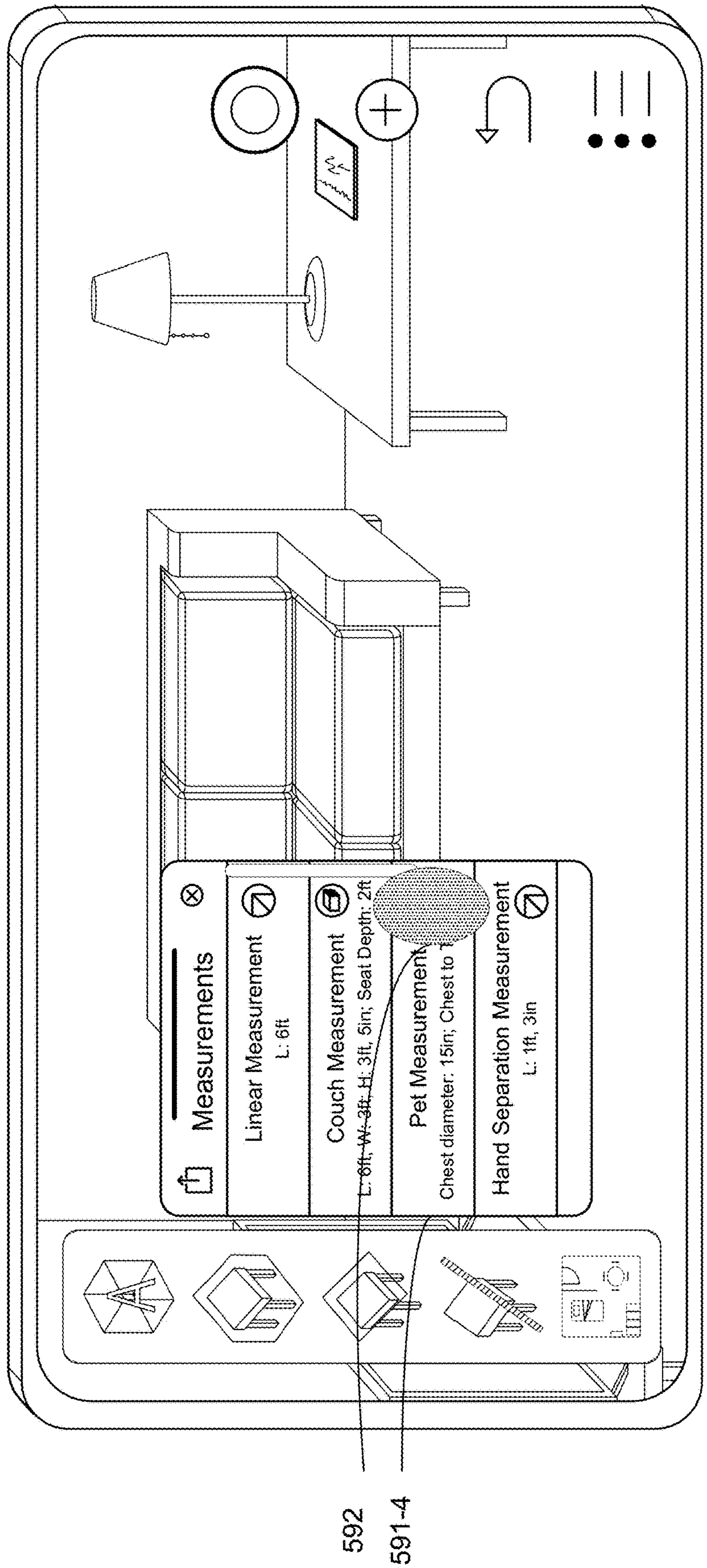
Figure 5B:
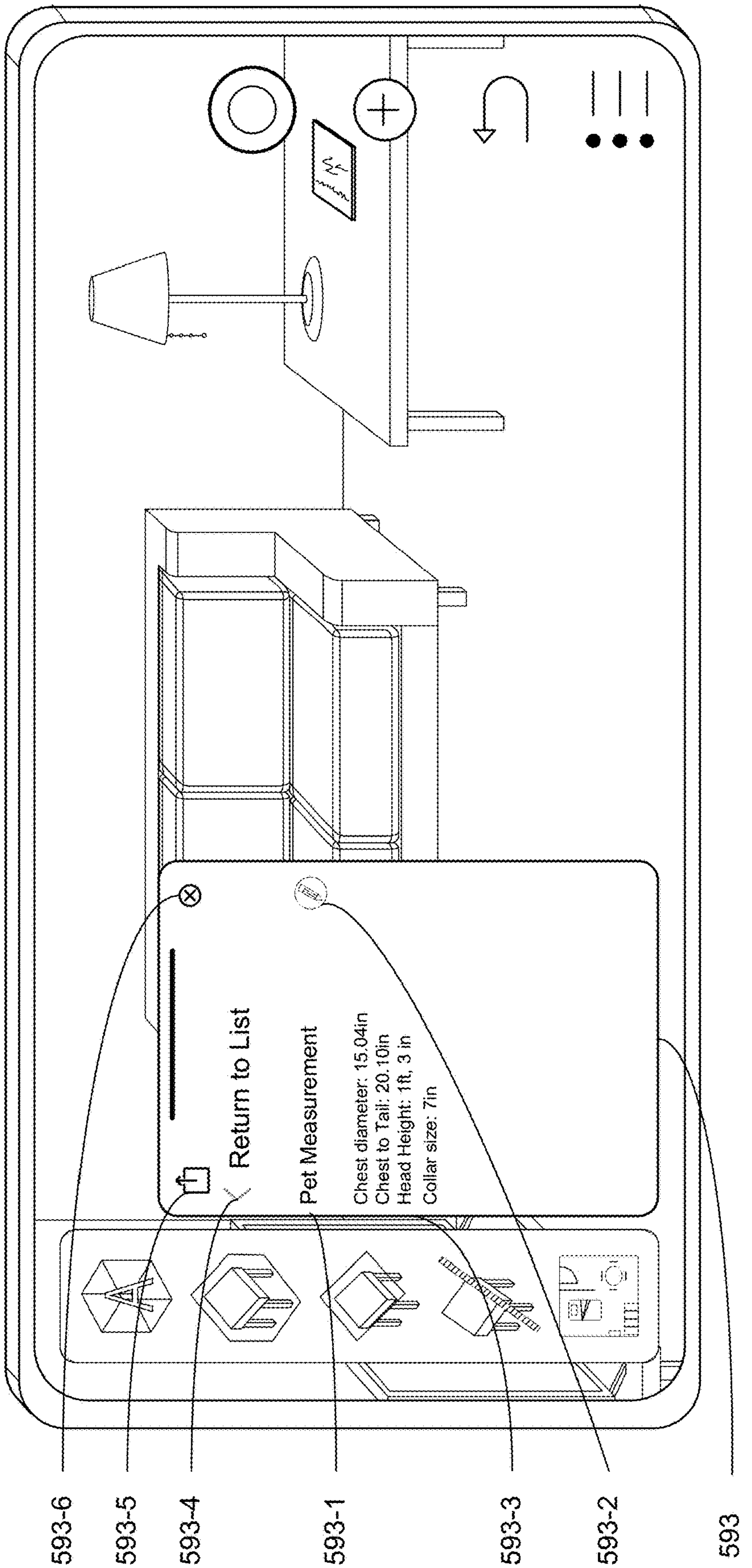
Figure 5B:
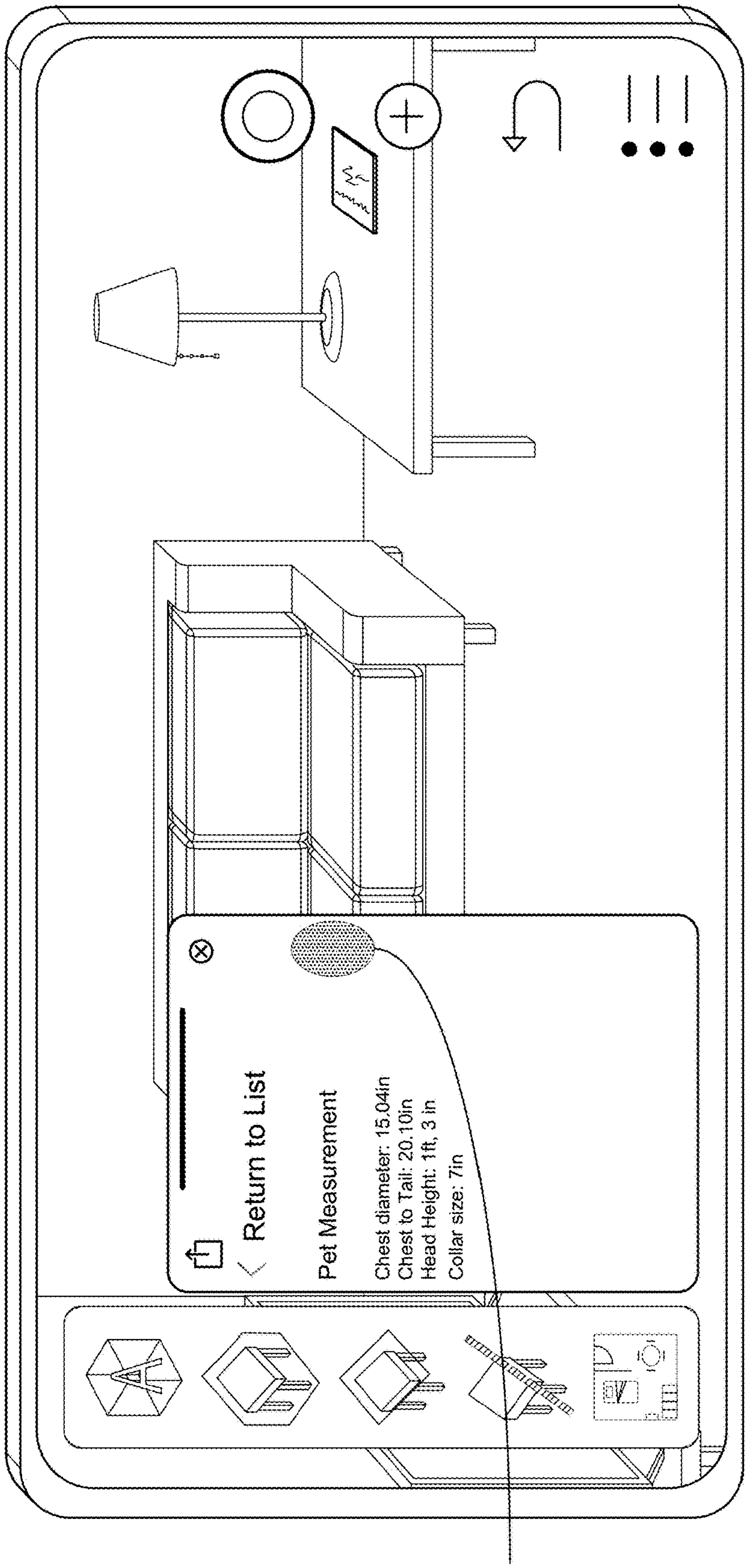
Figure 5B:
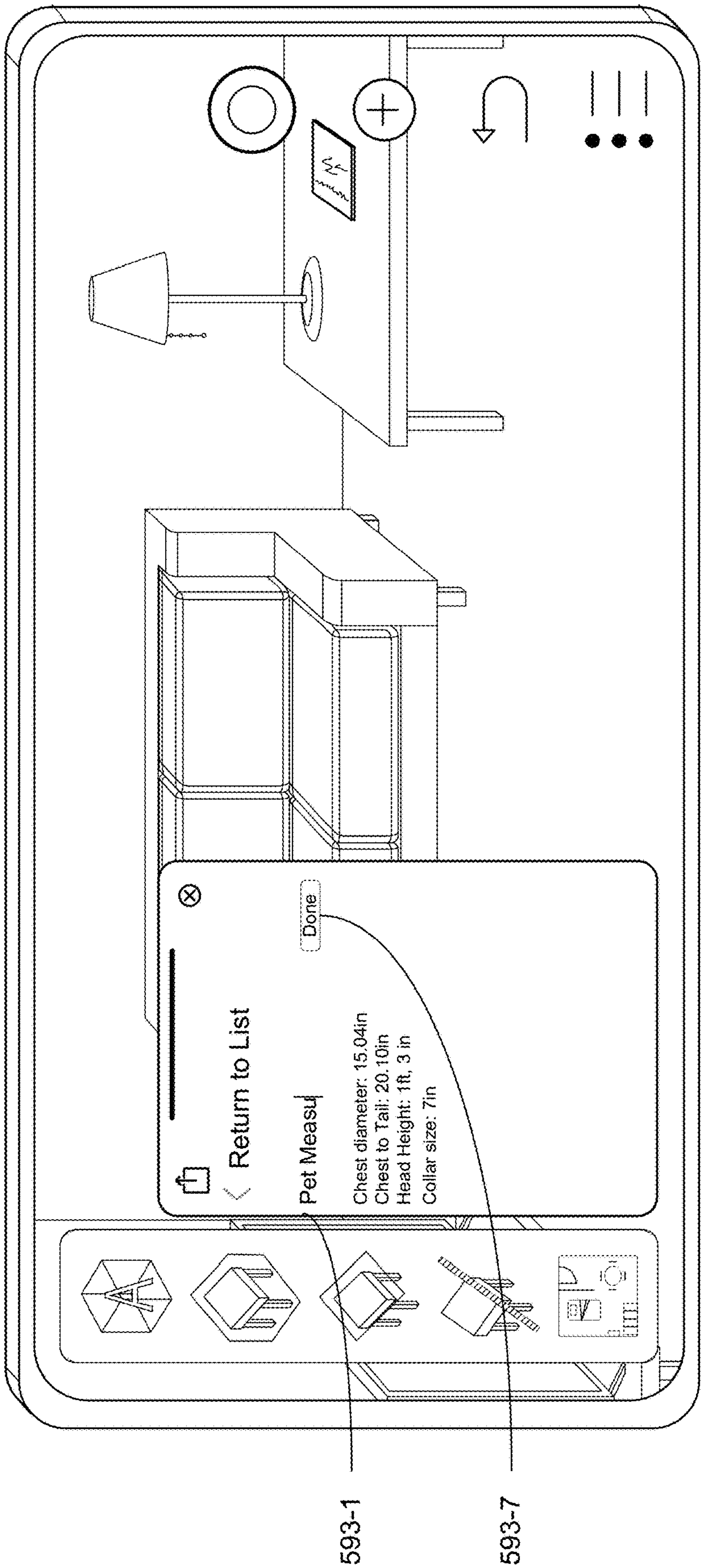
Figure 5B:
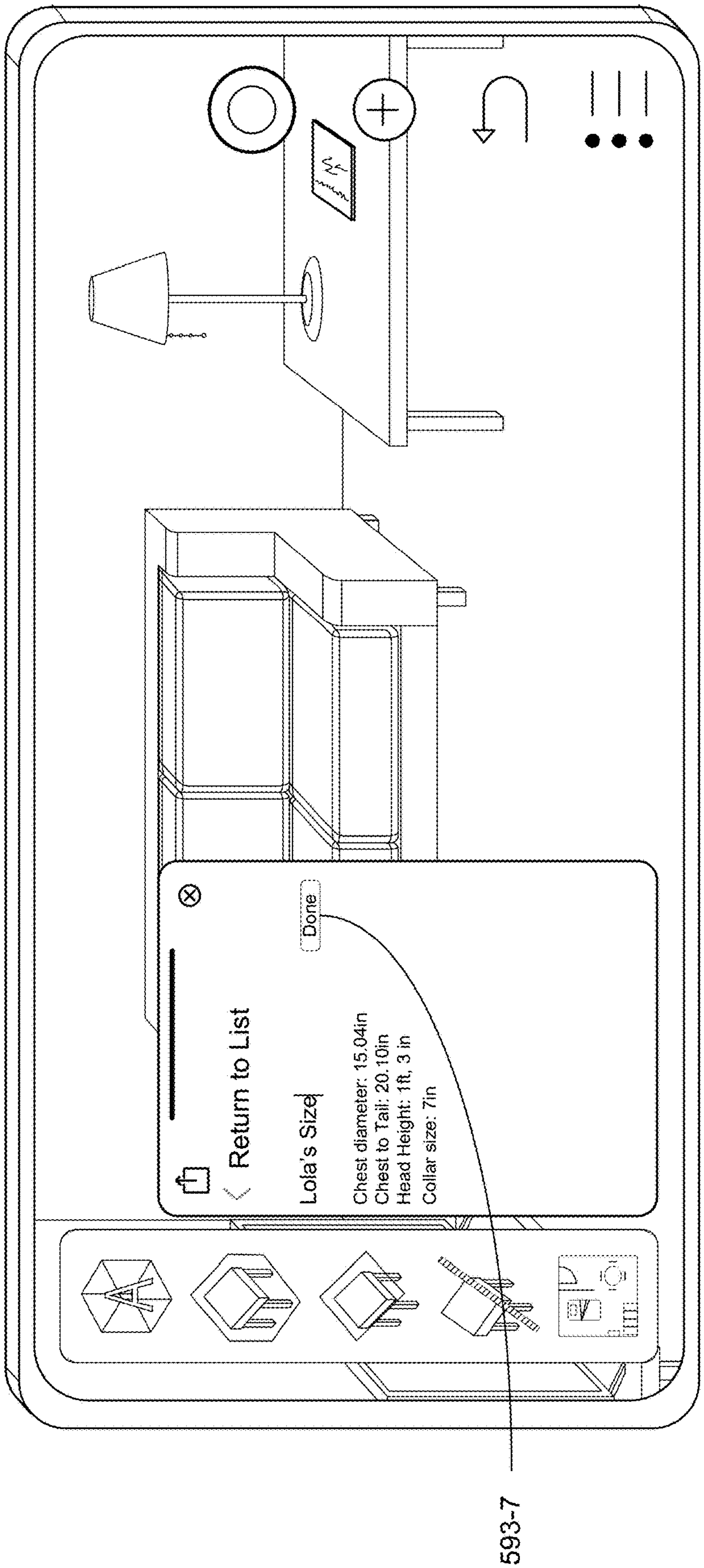
Figure 5B:
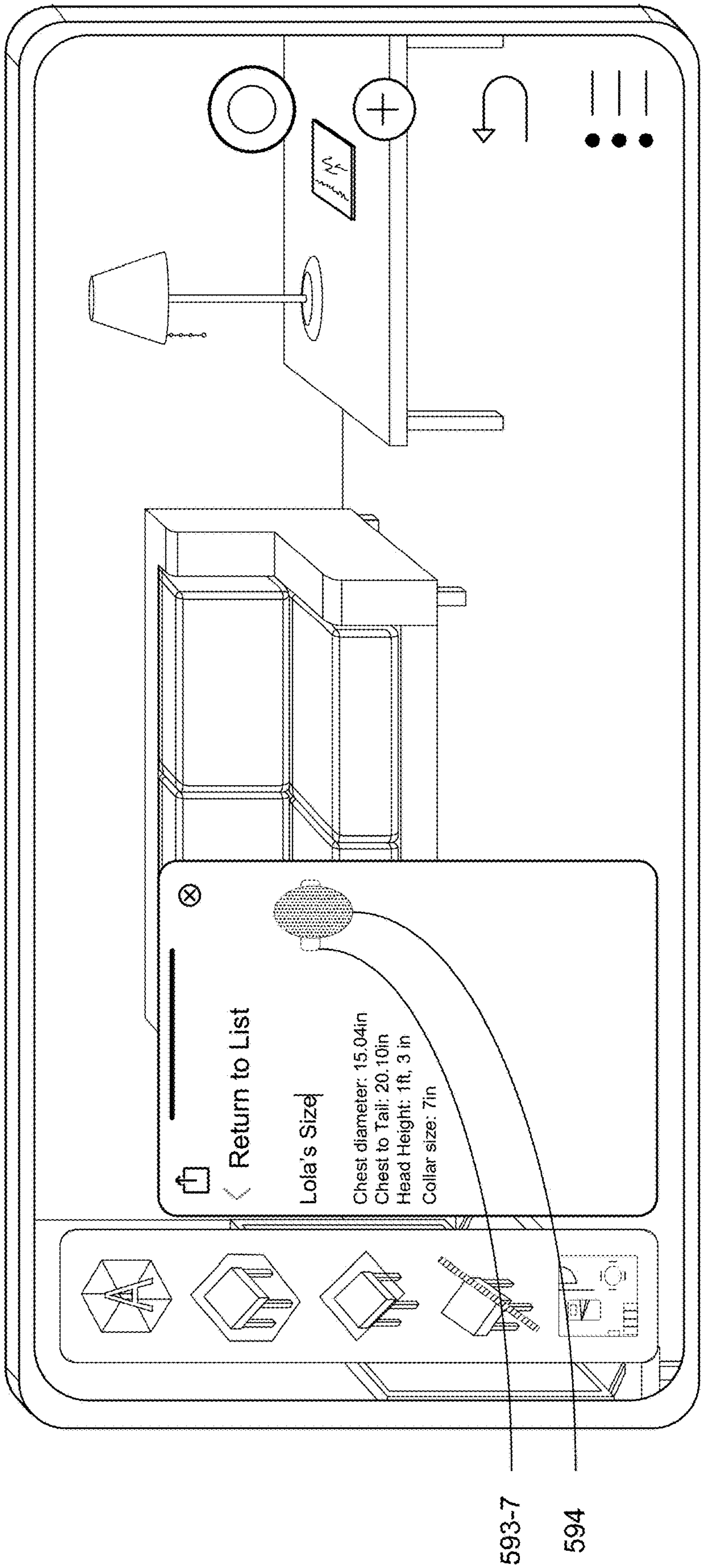
Figure 5B:
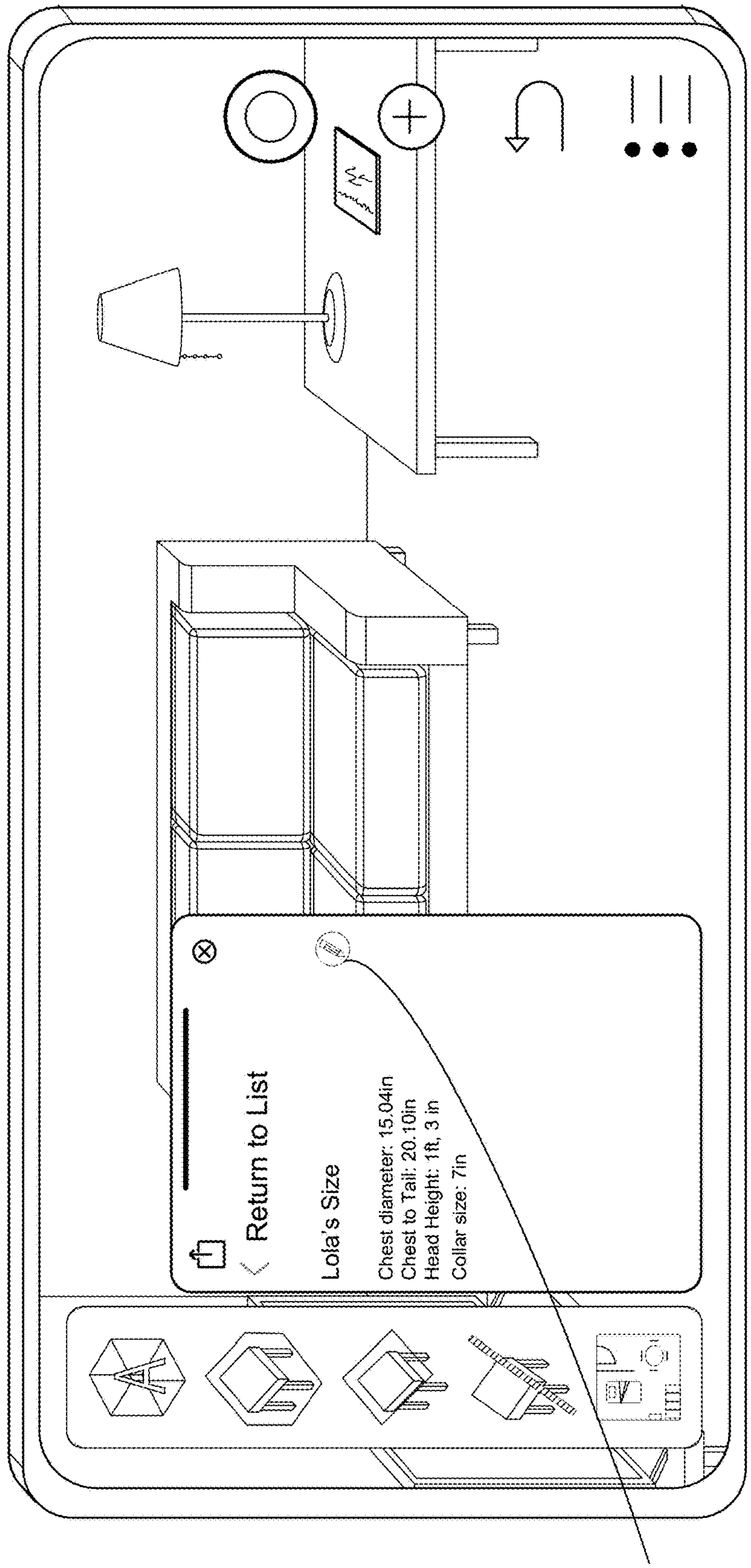
Figure 5B:
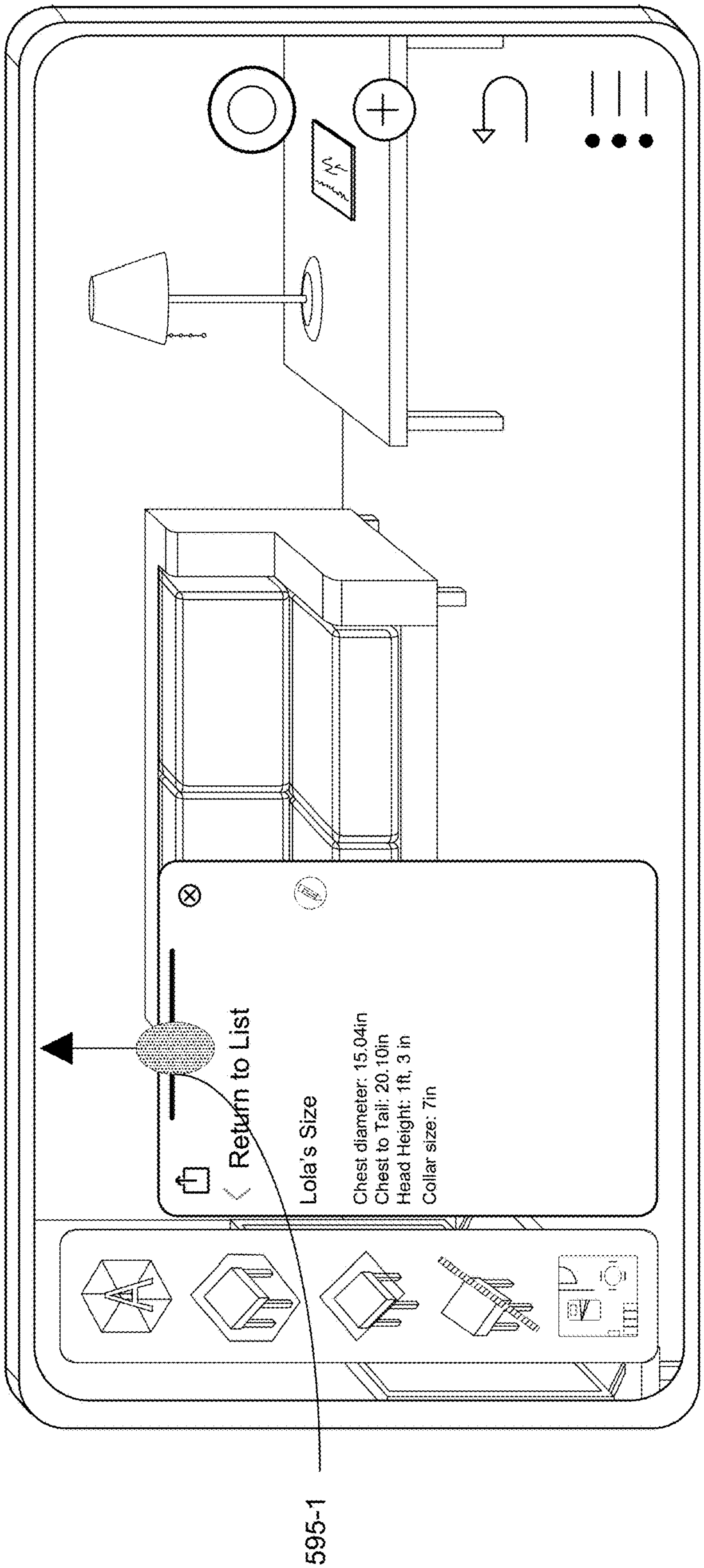
Figure 5B:
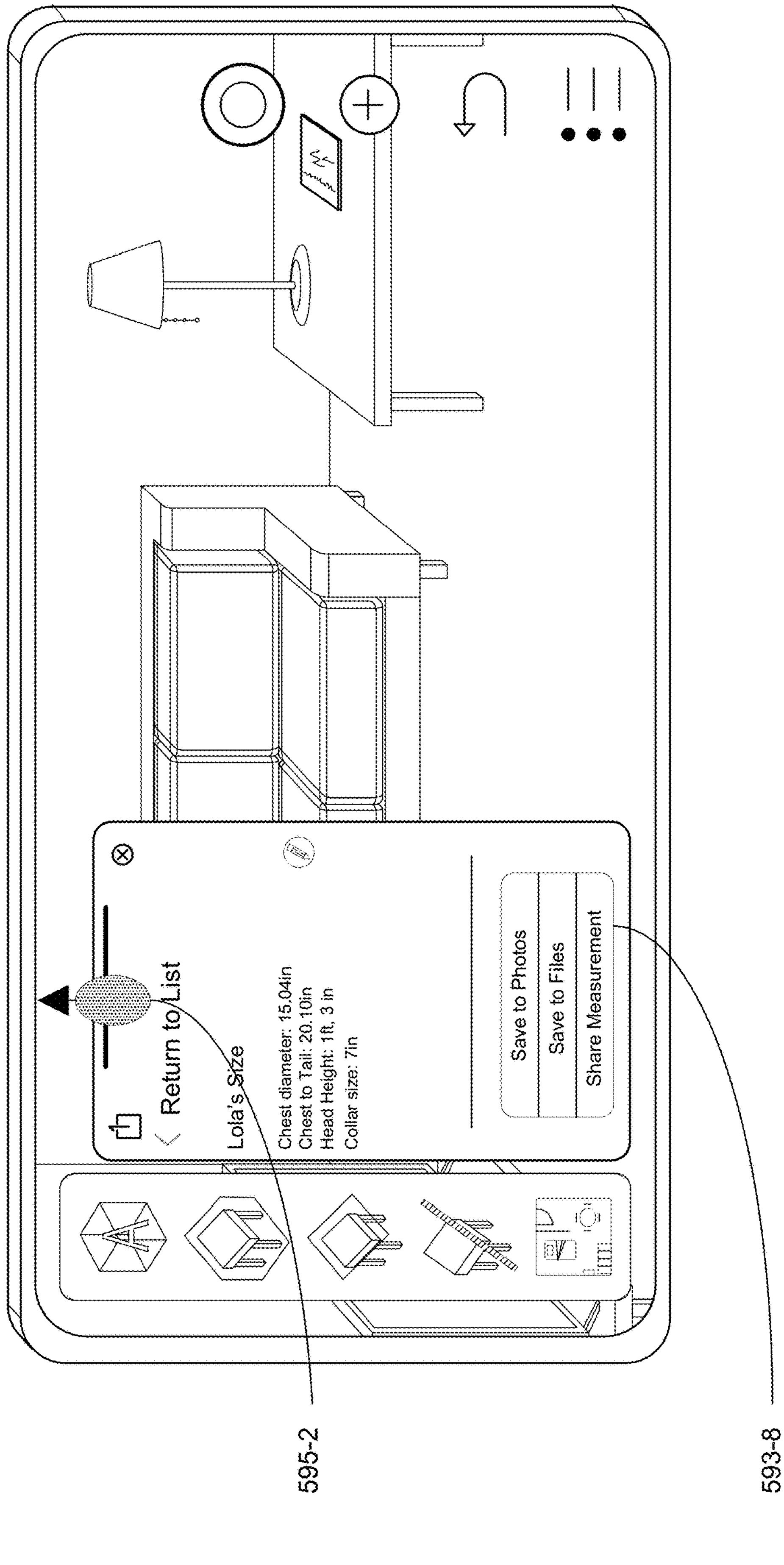
Figure 5B:
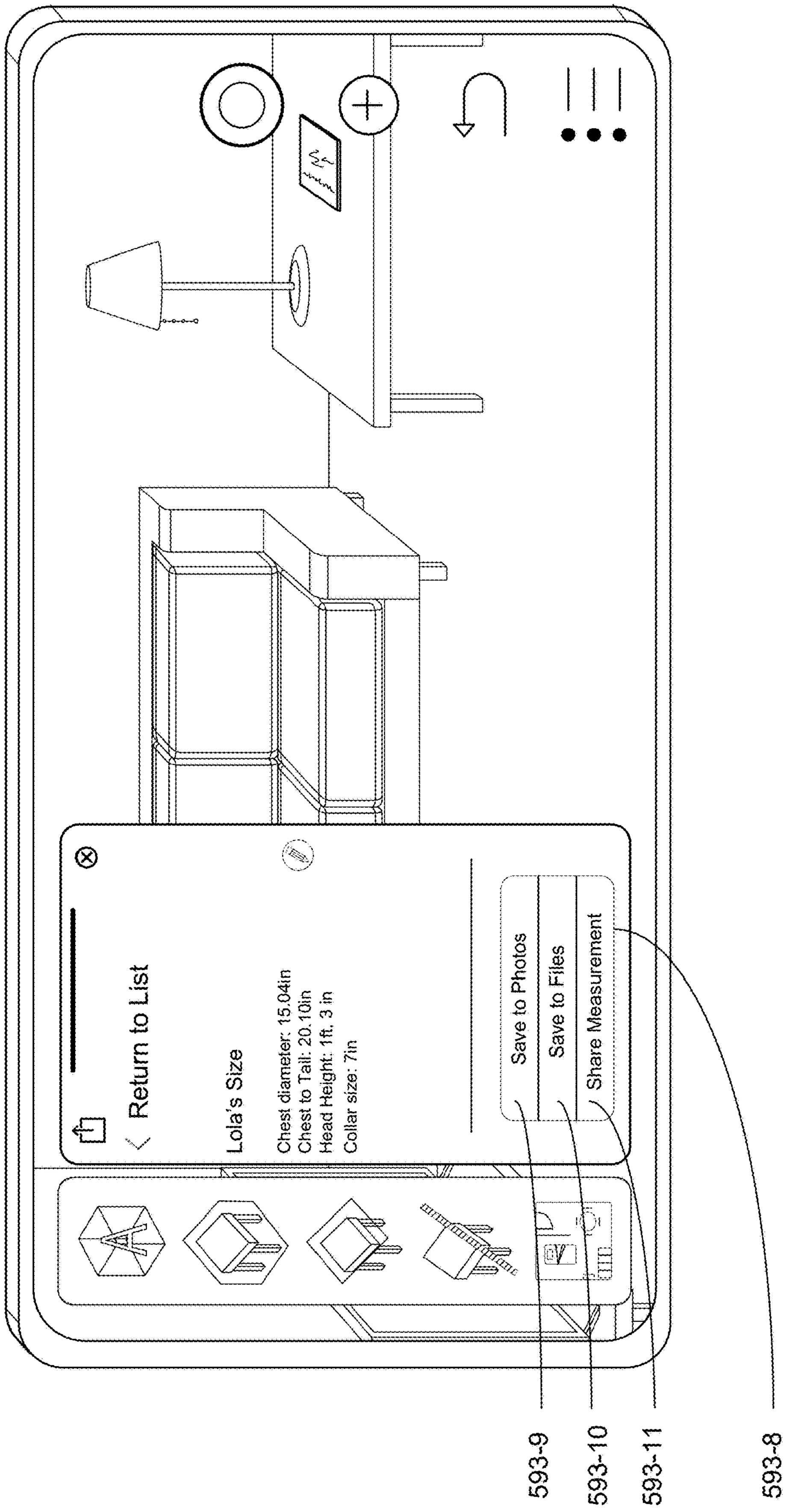
Figure 5B:
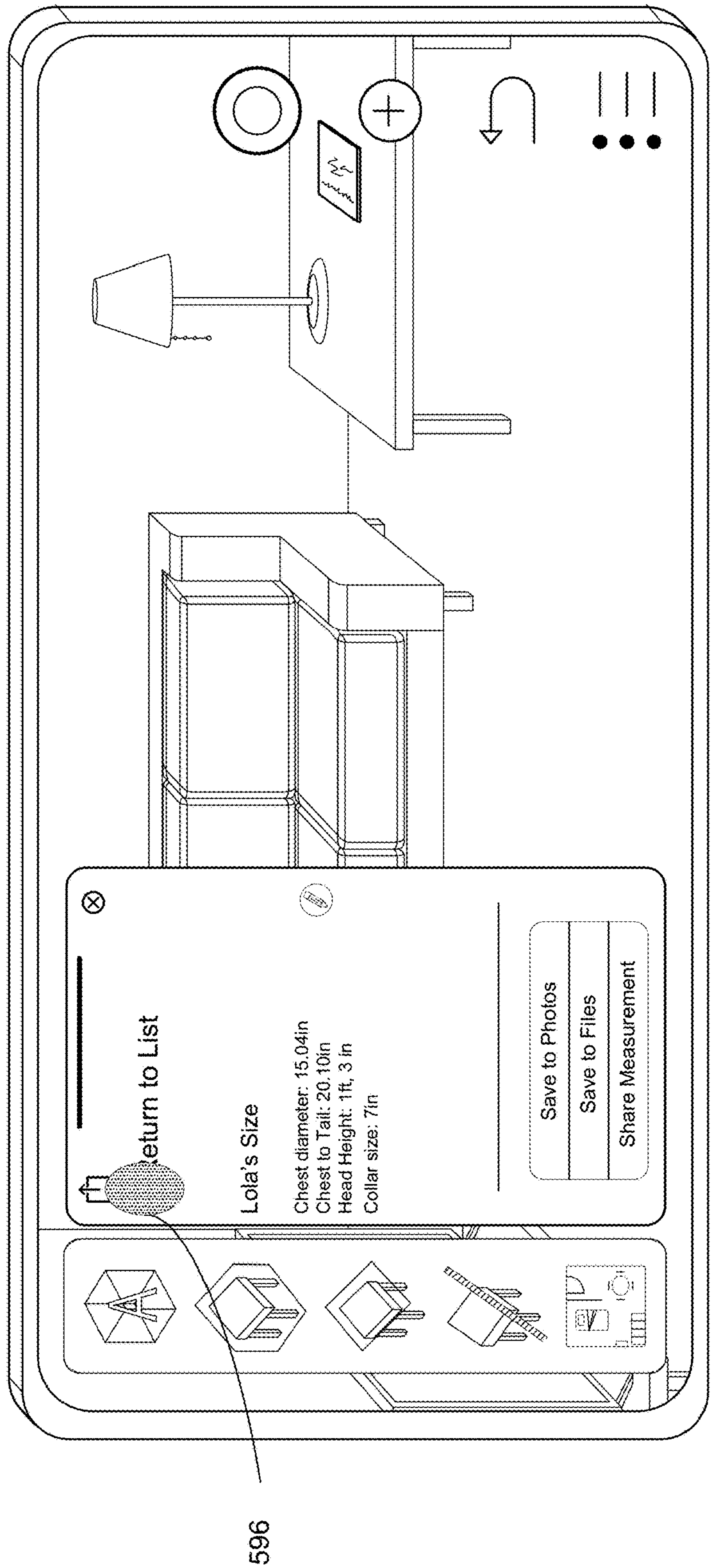
Figure 5B:
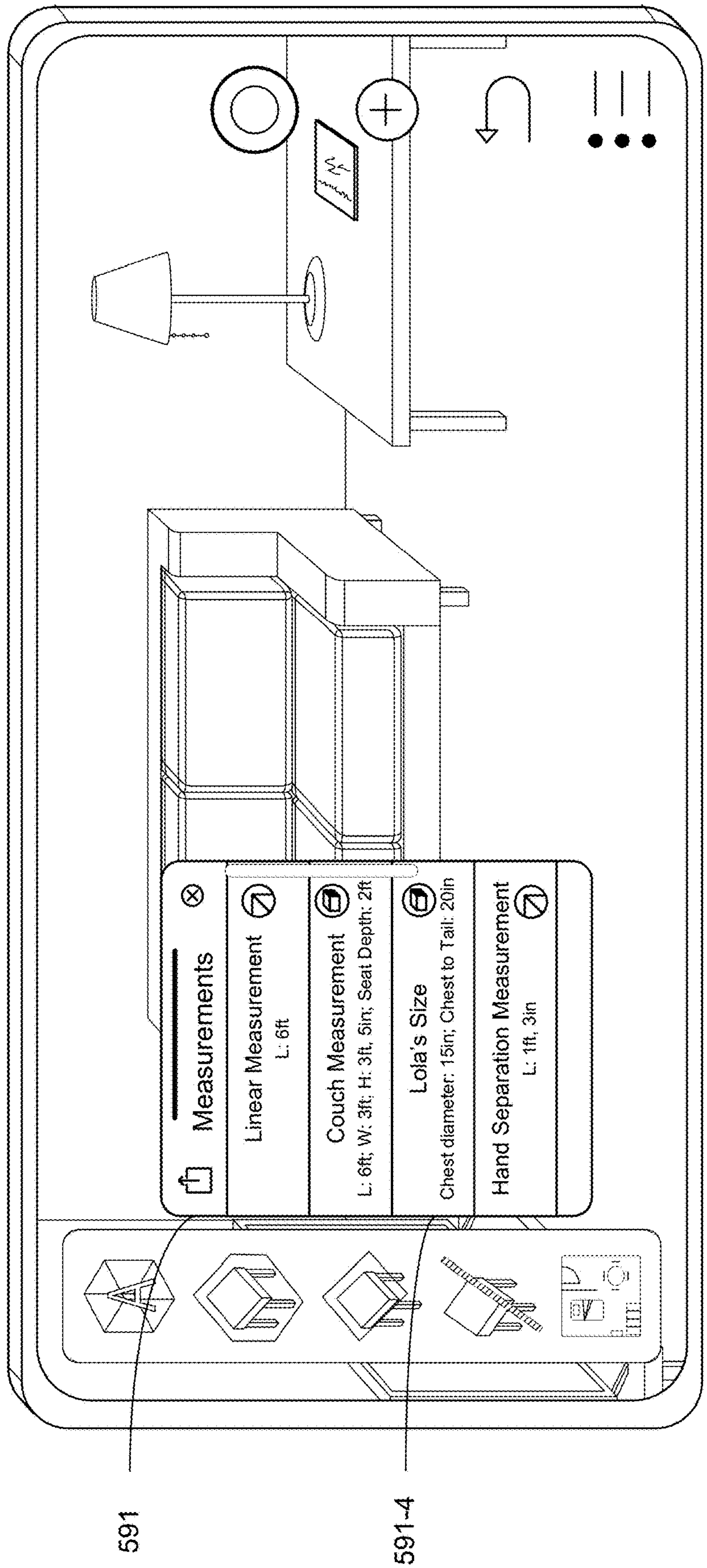
Figure 5B:
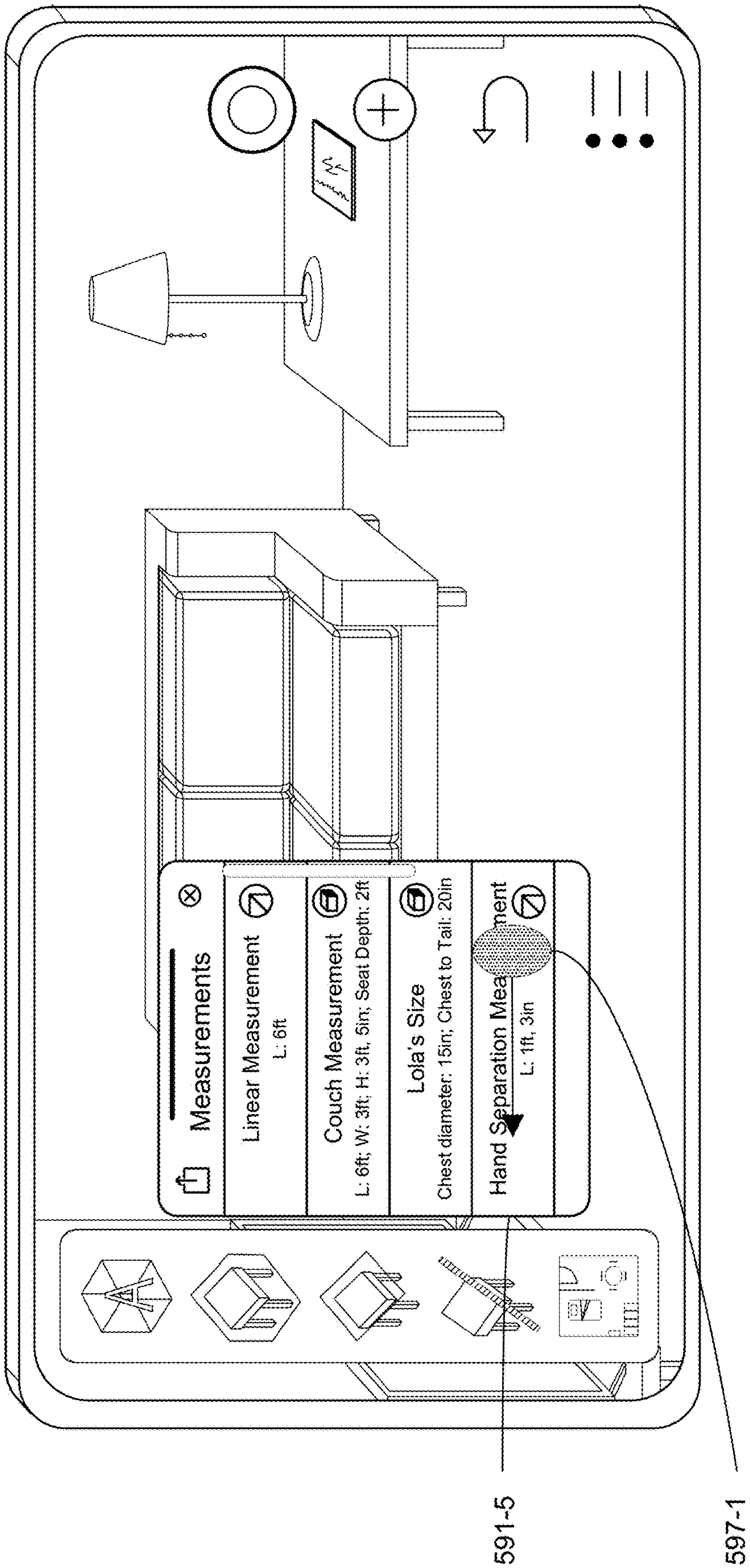
Figure 5B:
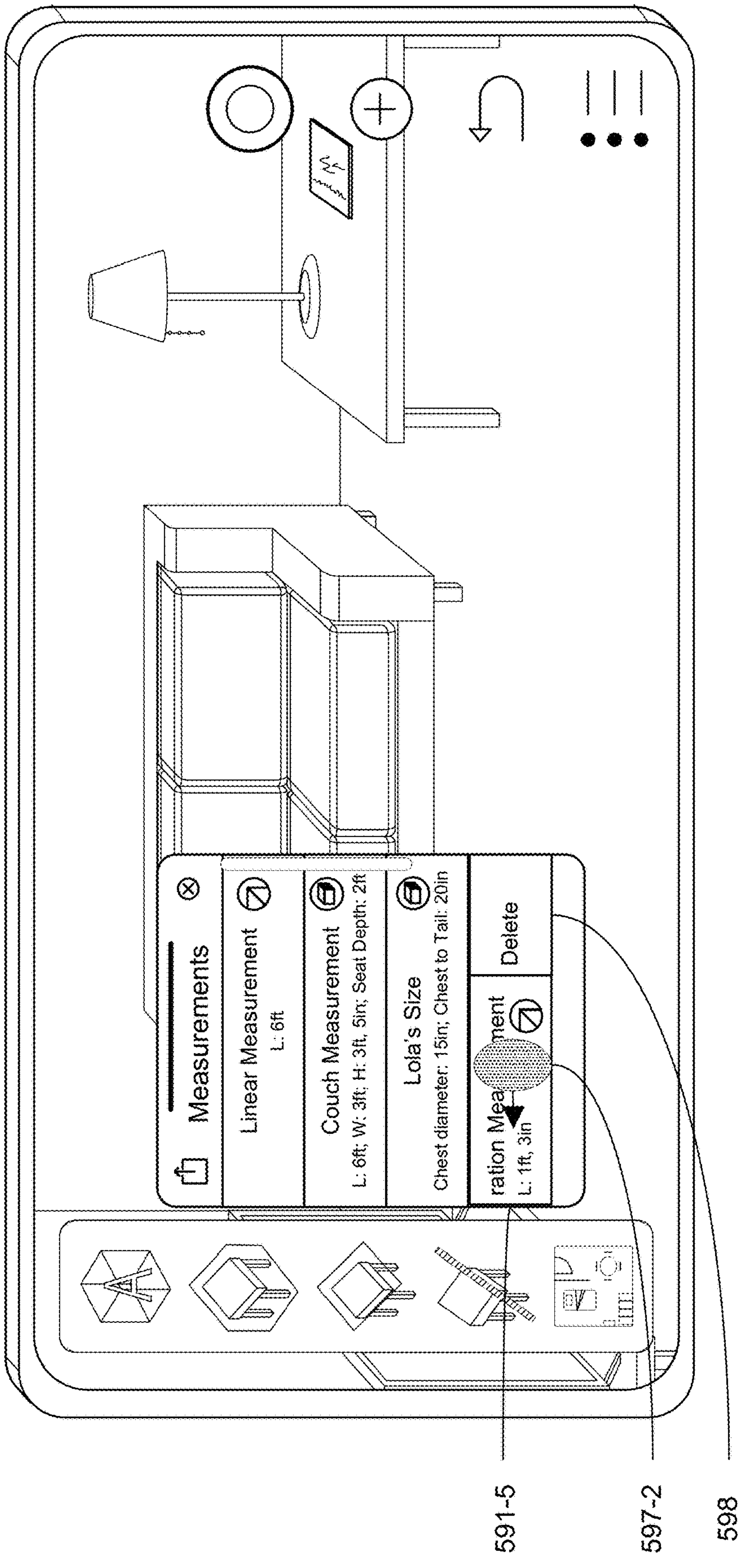
Figure 5B:
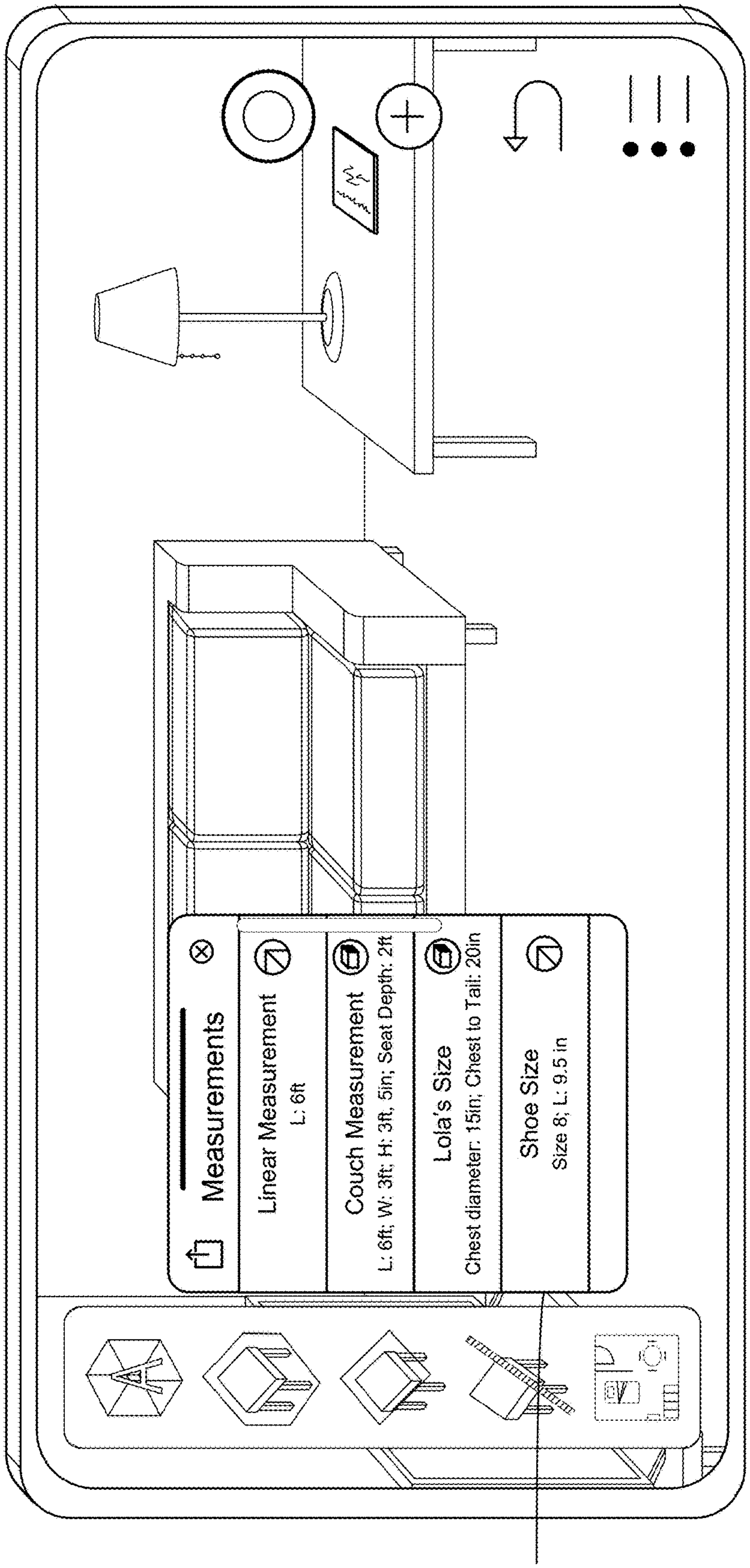
Figure 5B:
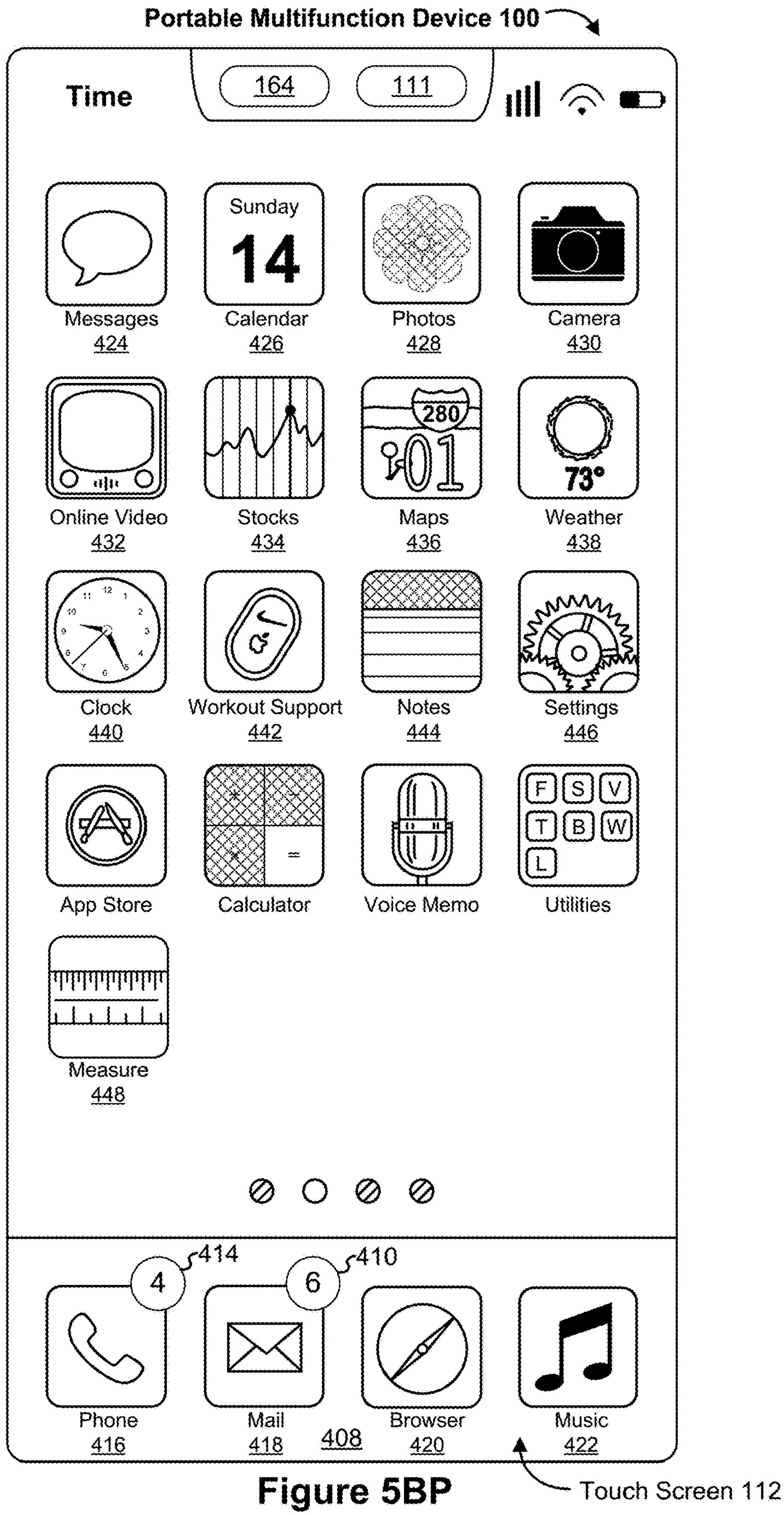
Figure 5B:
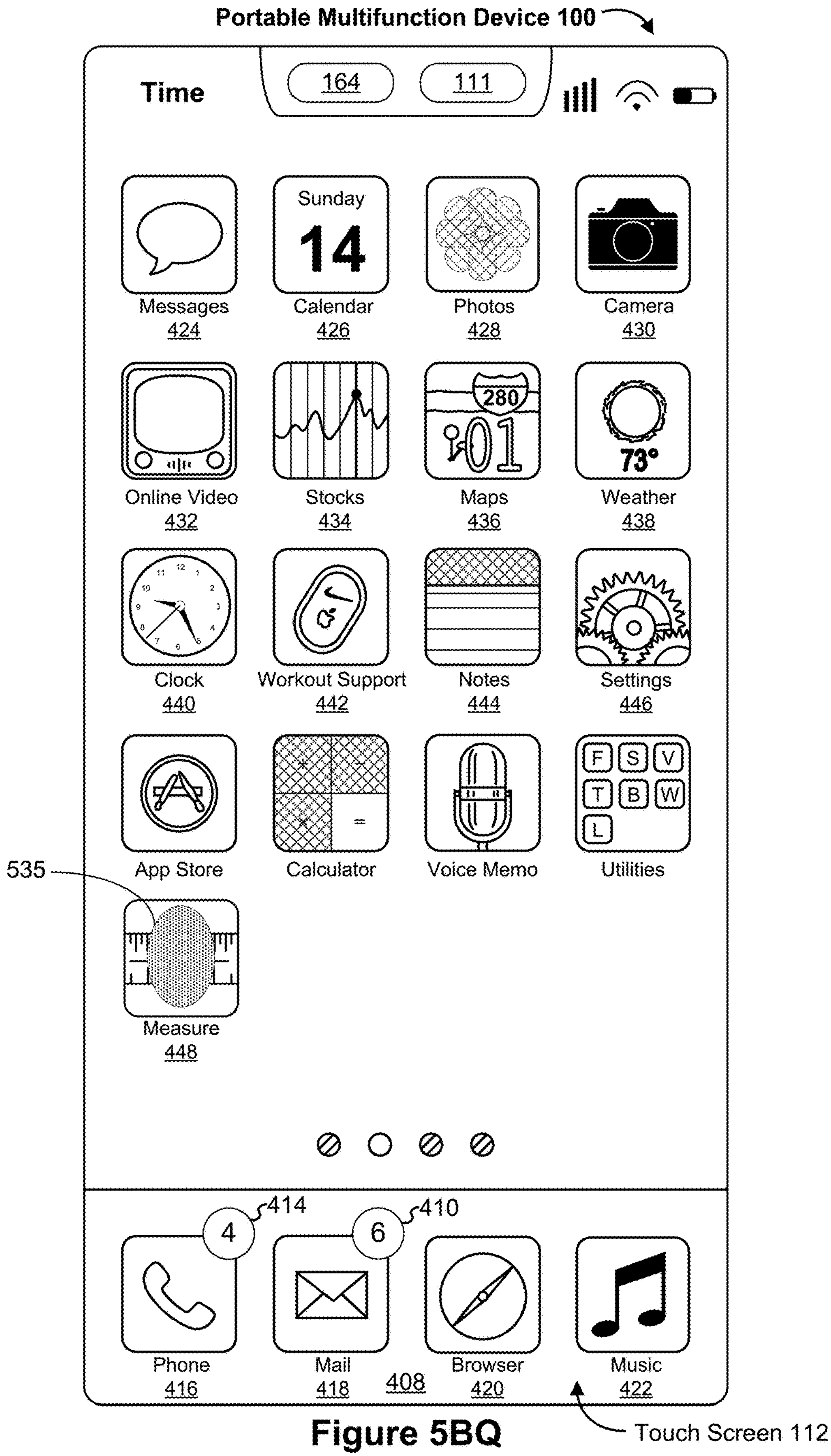
Figure 5B:
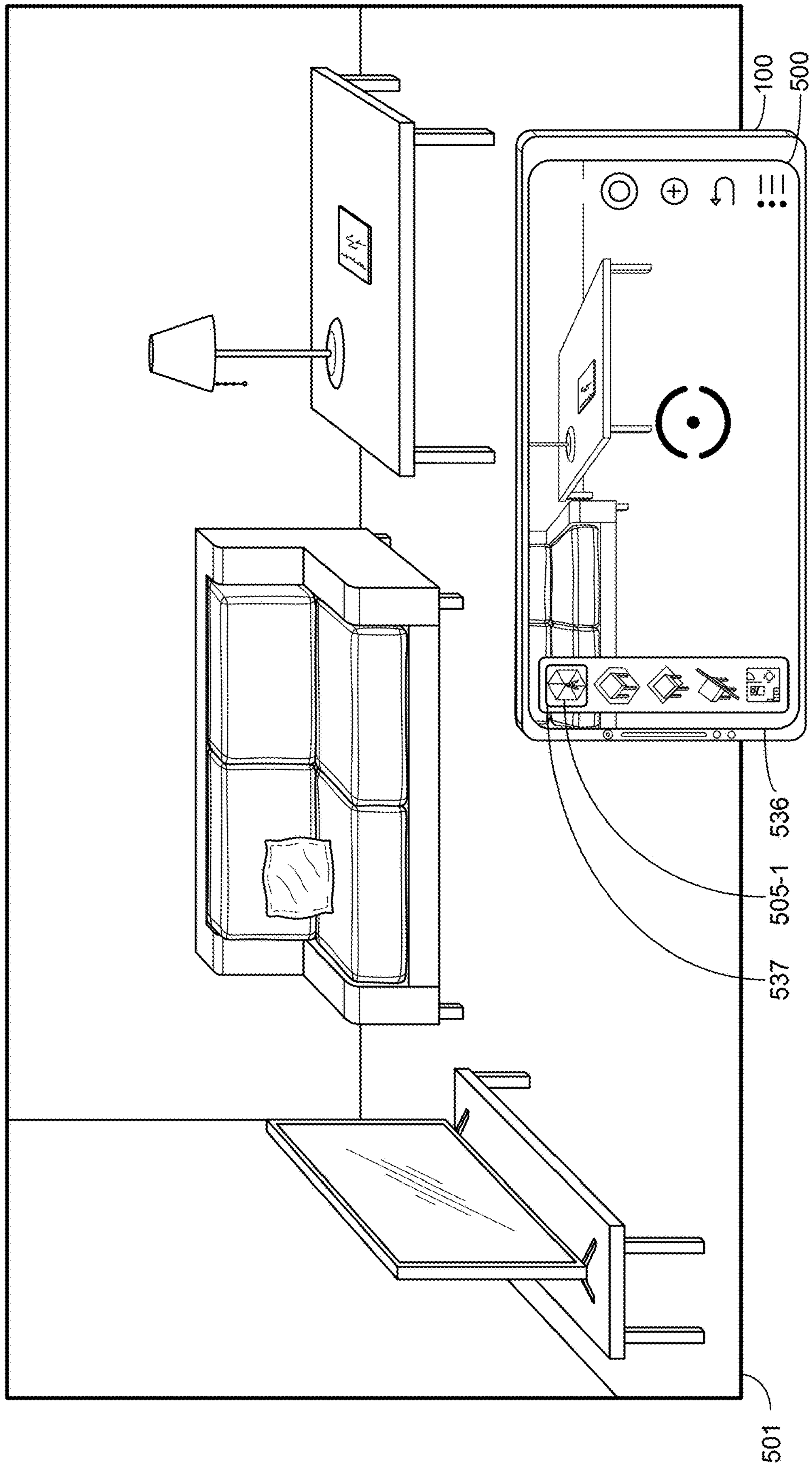
Figure 5B:
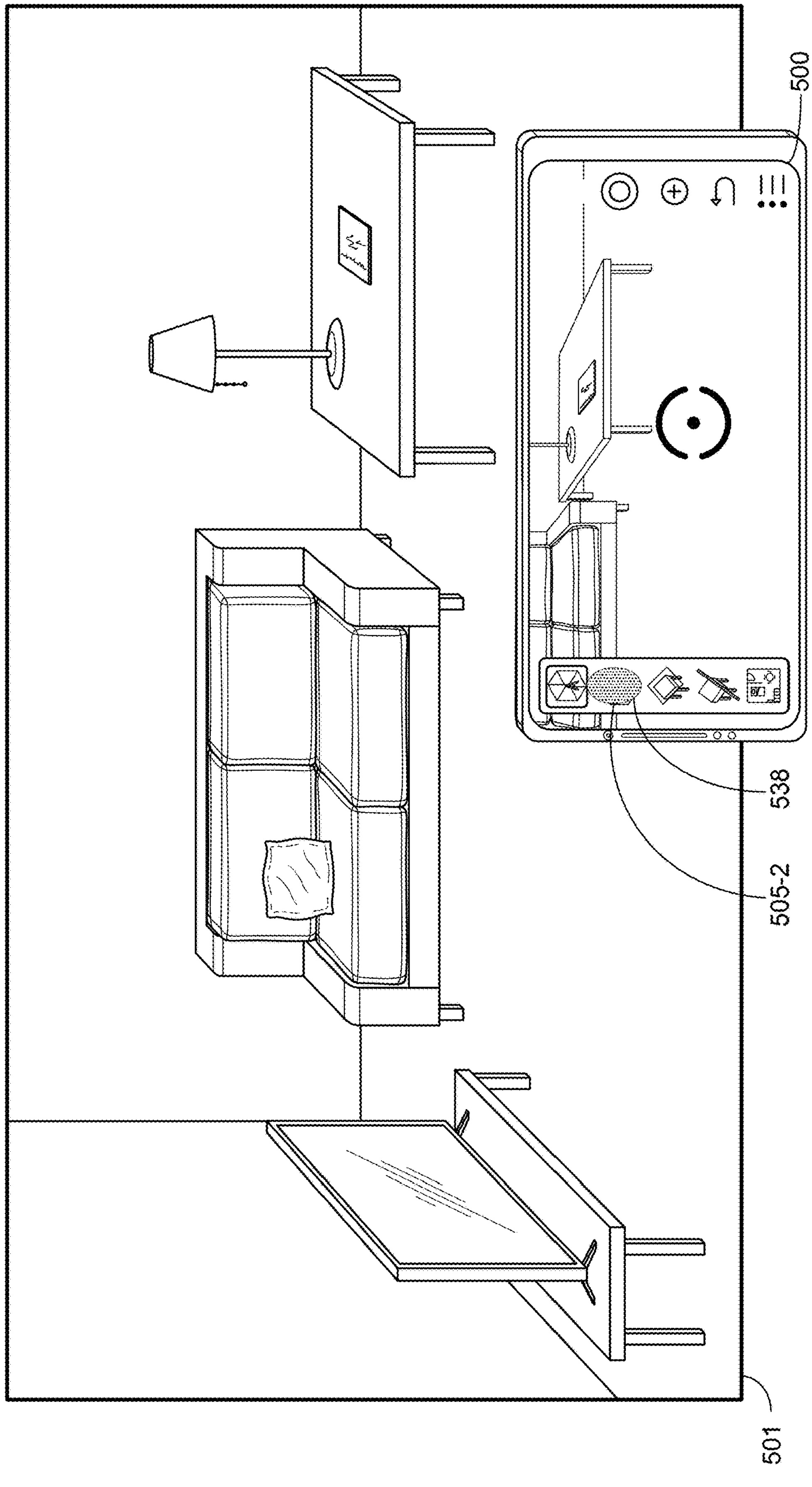
Figure 5B:
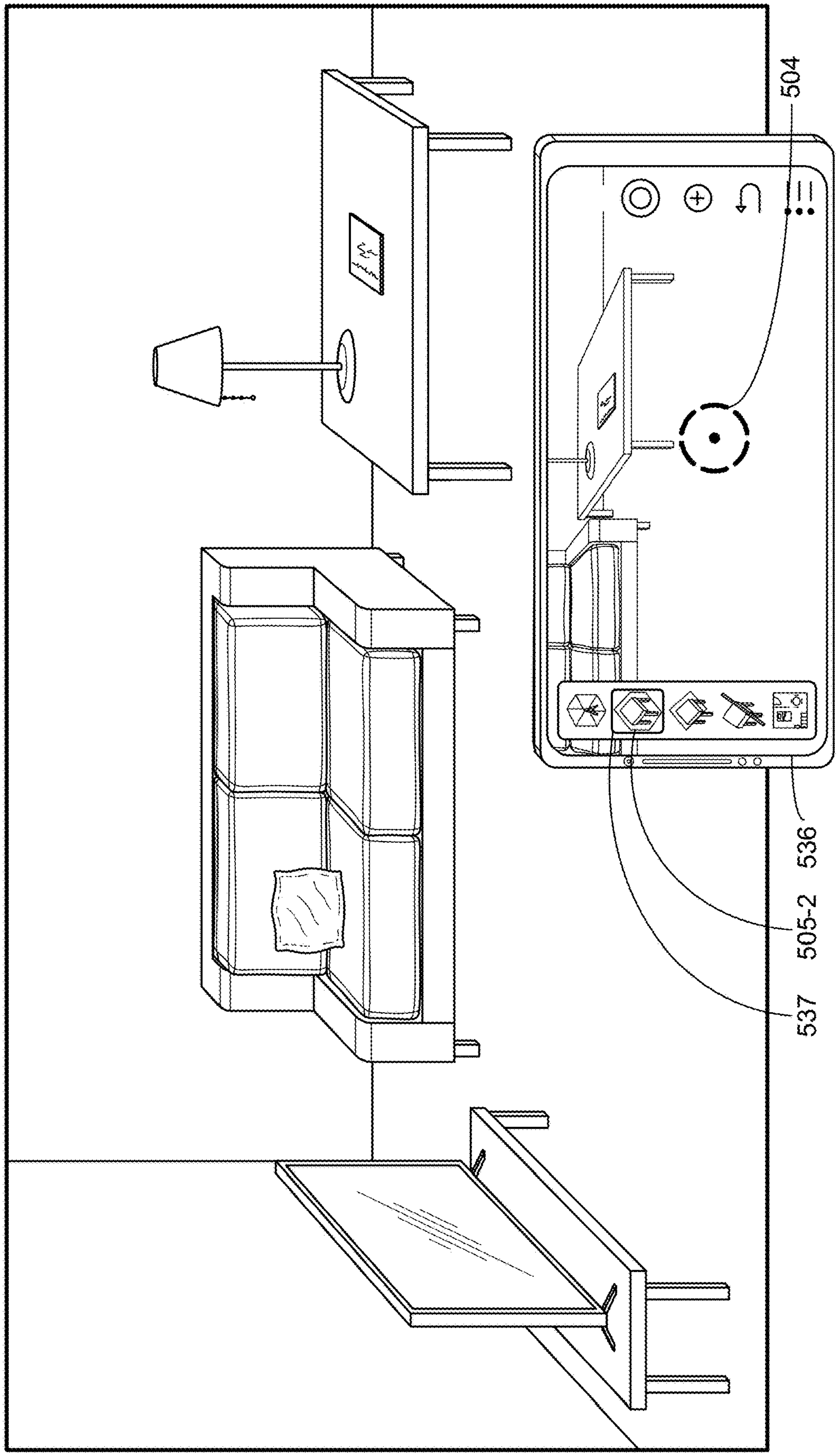
Figure 5B:
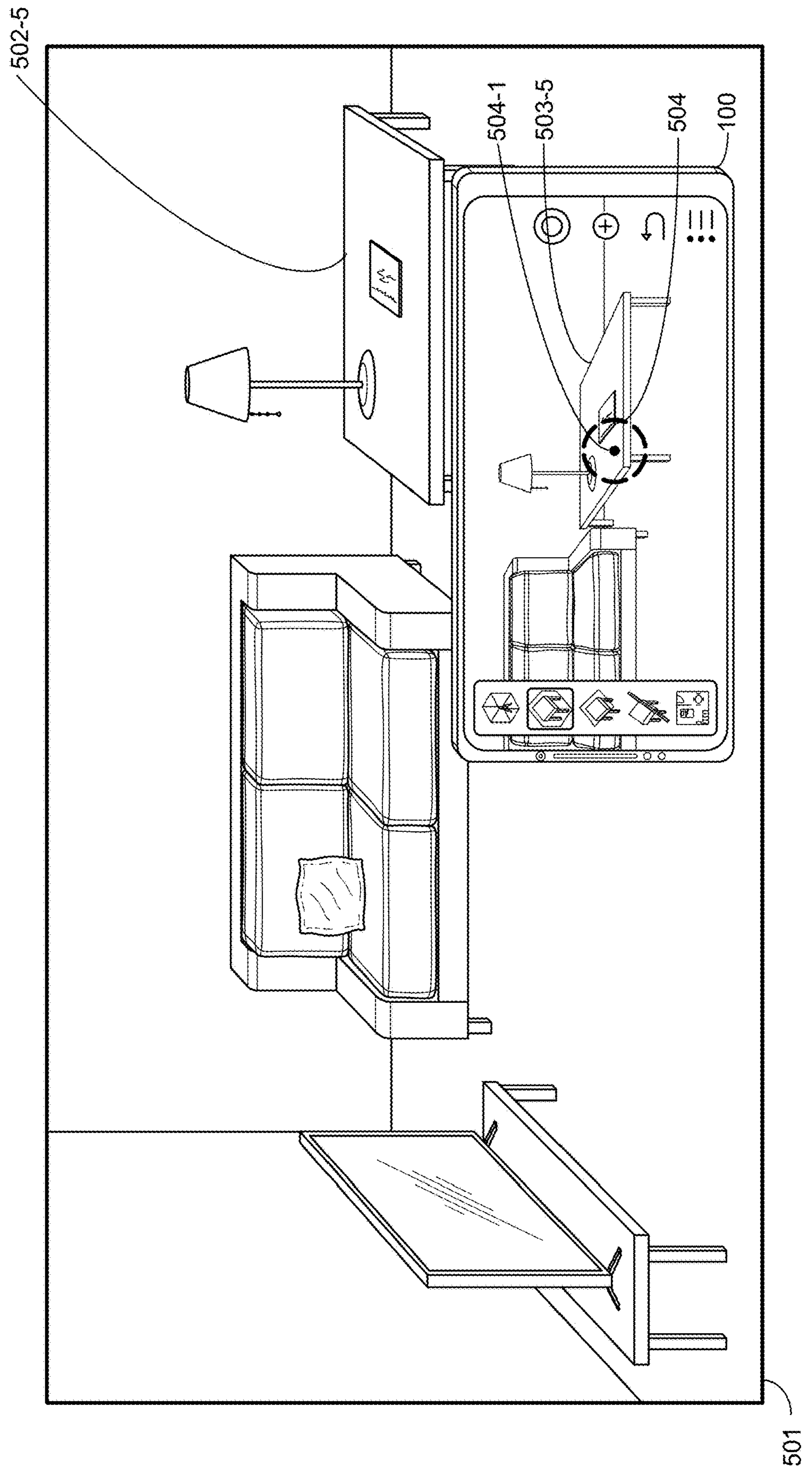
Figure 5B:
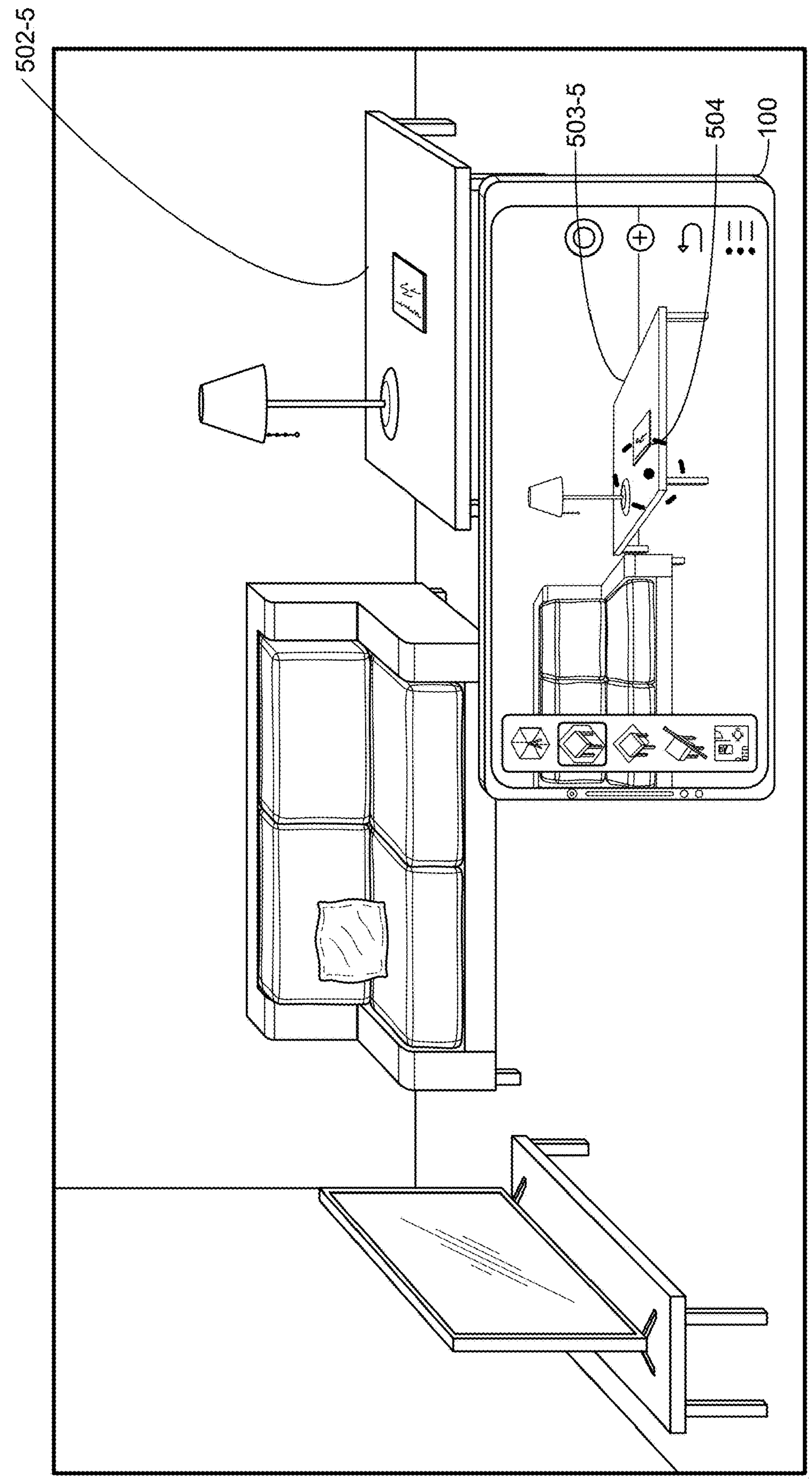
Figure 5B:
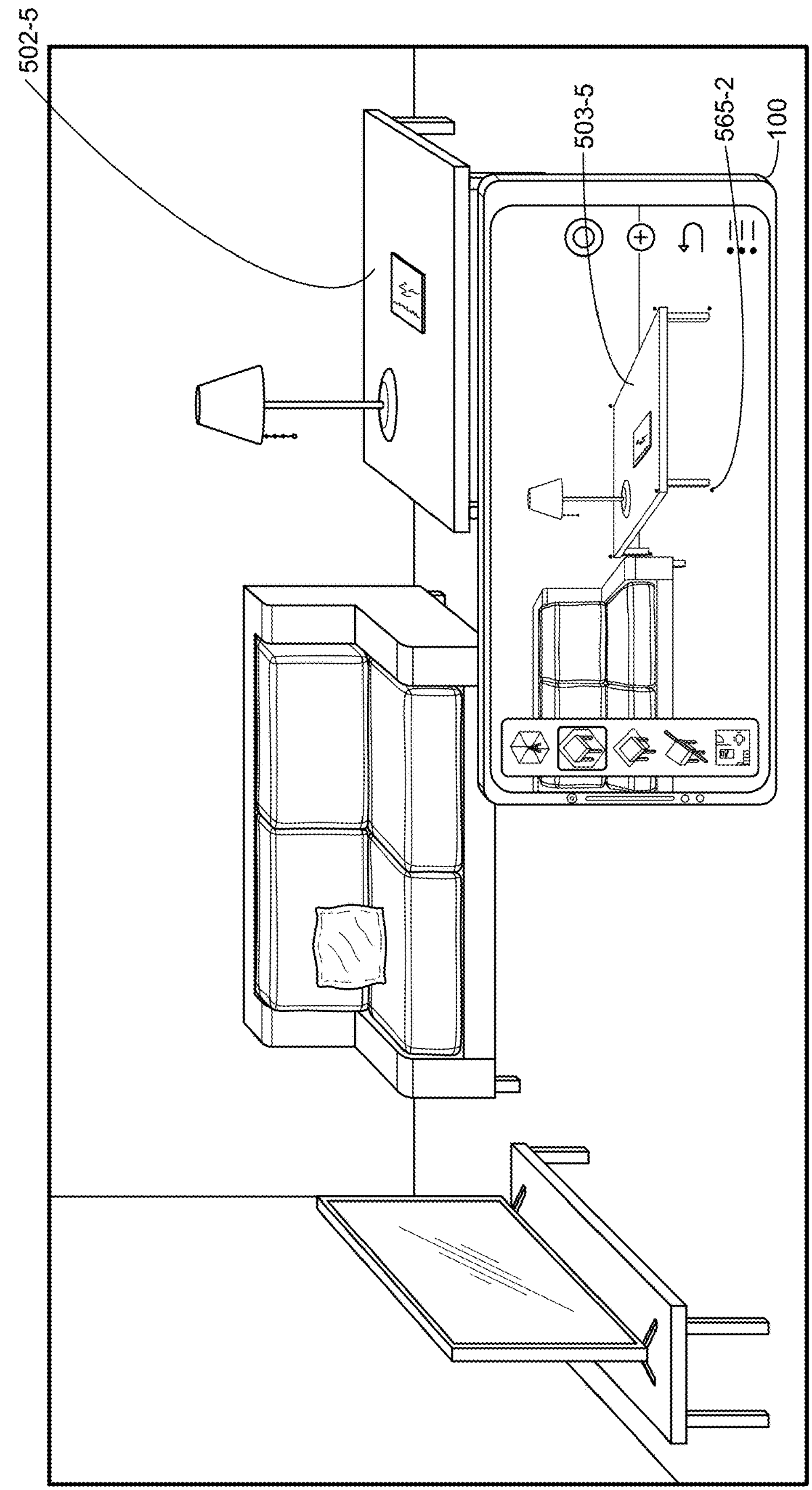
Figure 5B:
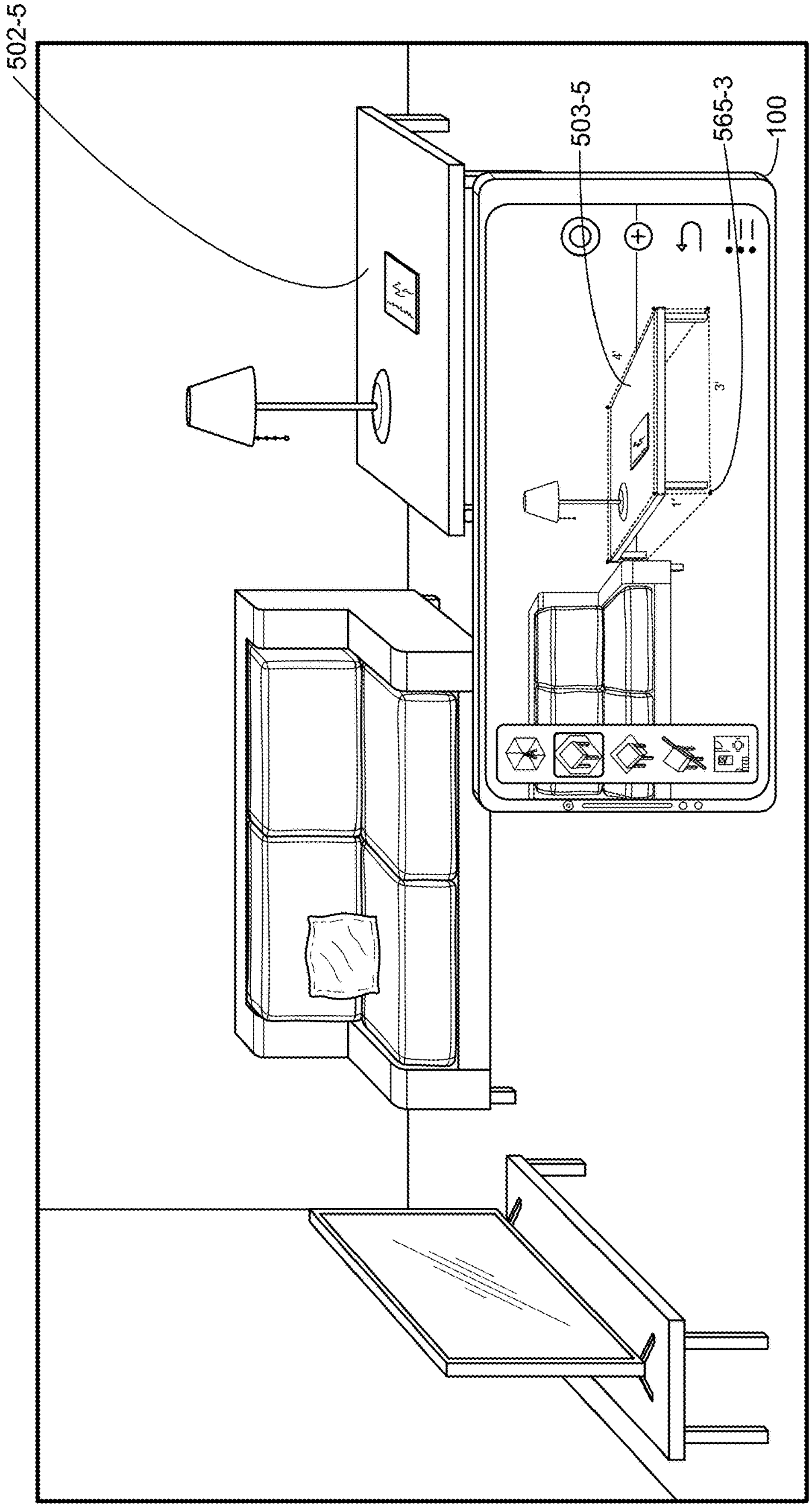
Figure 5B:
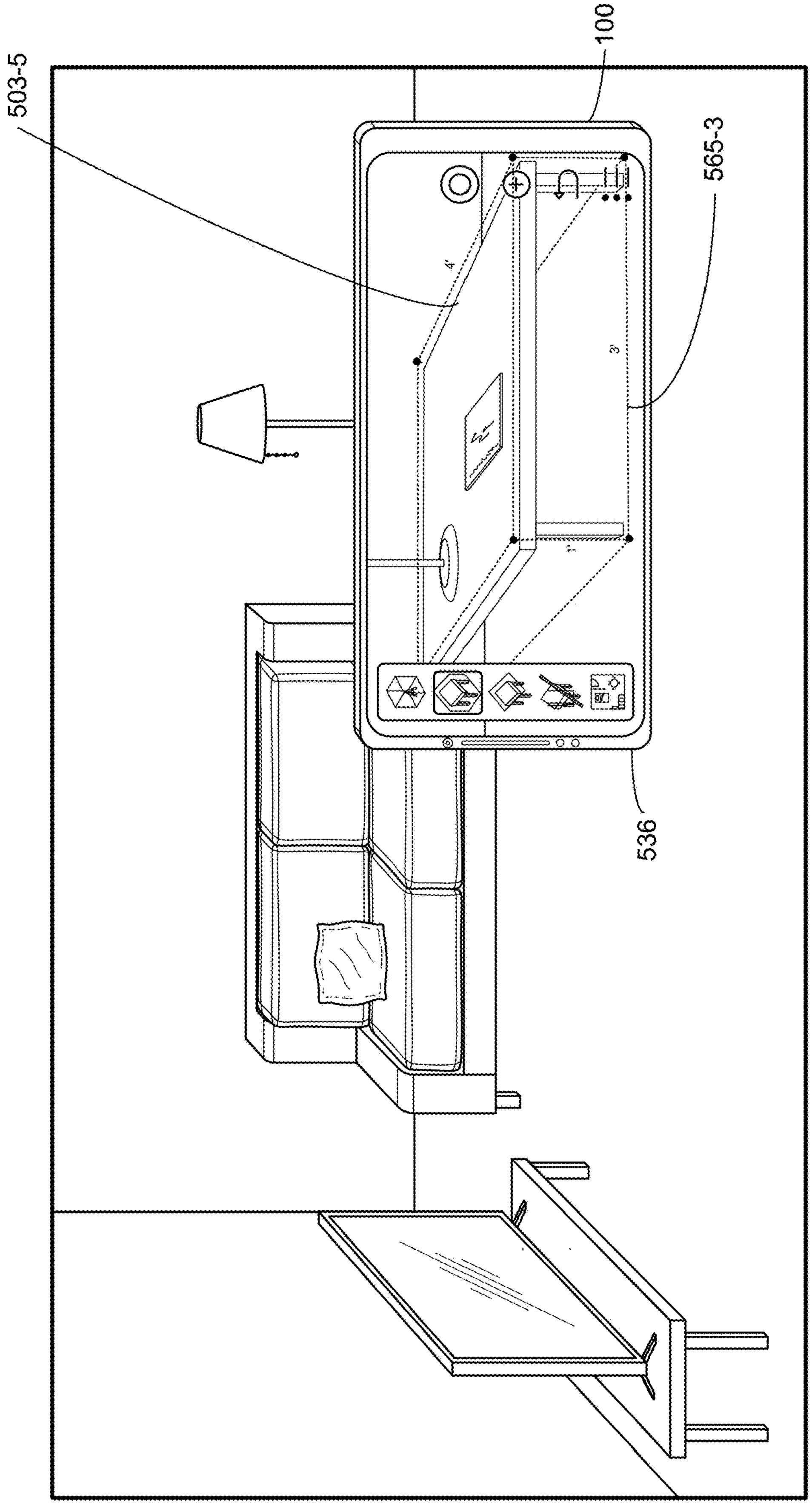
Figure 5B:
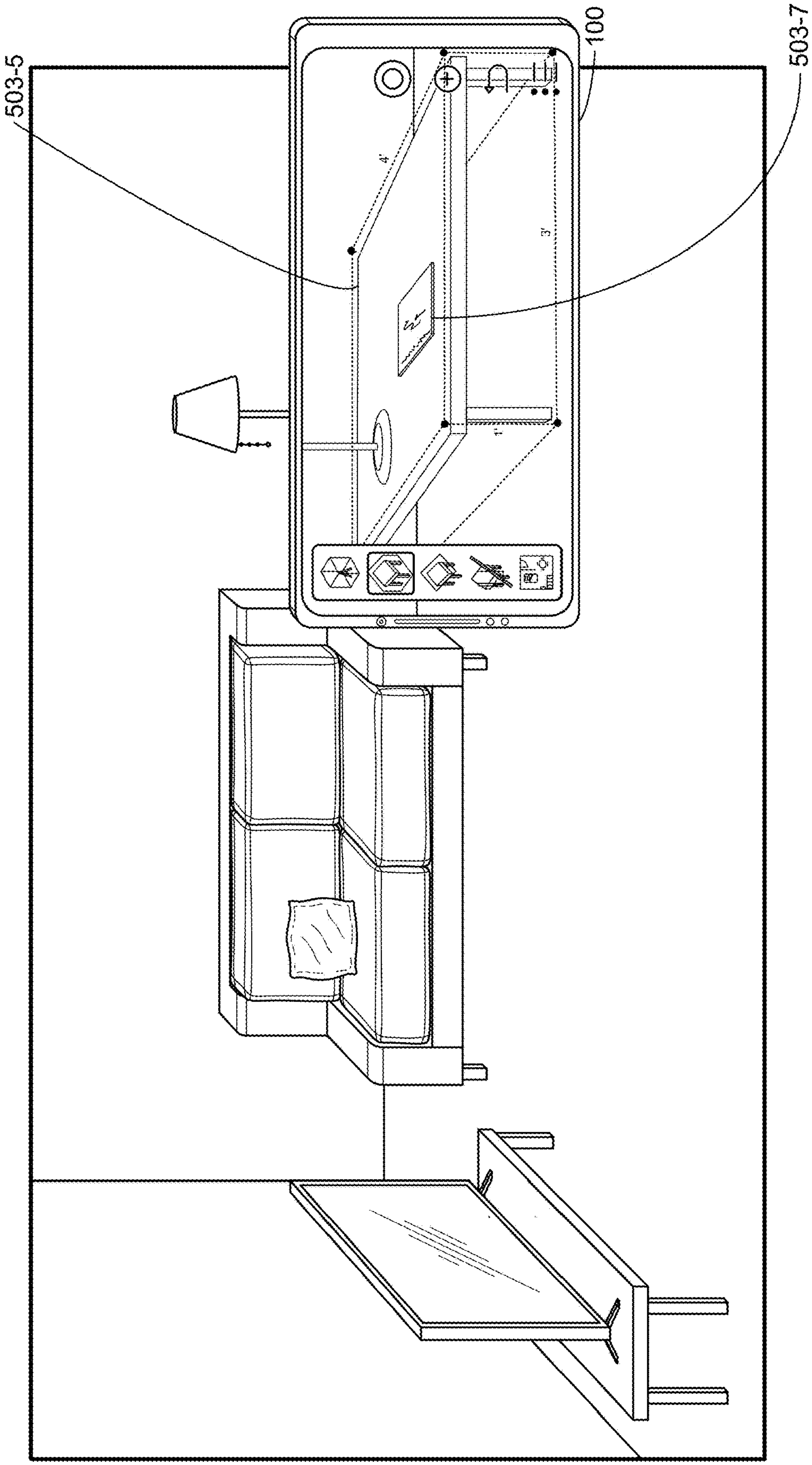
Figure 5C:
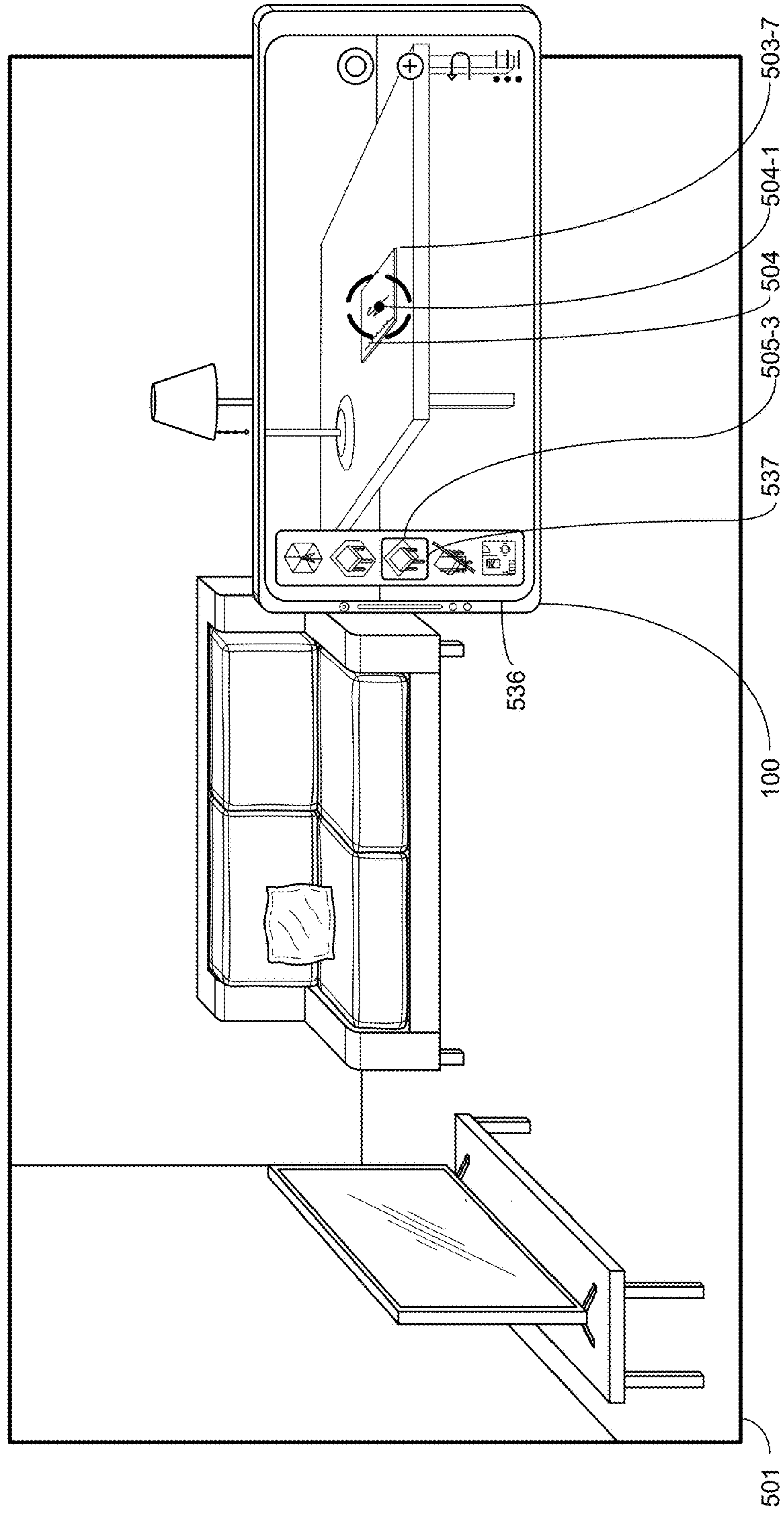
Figure 5C:
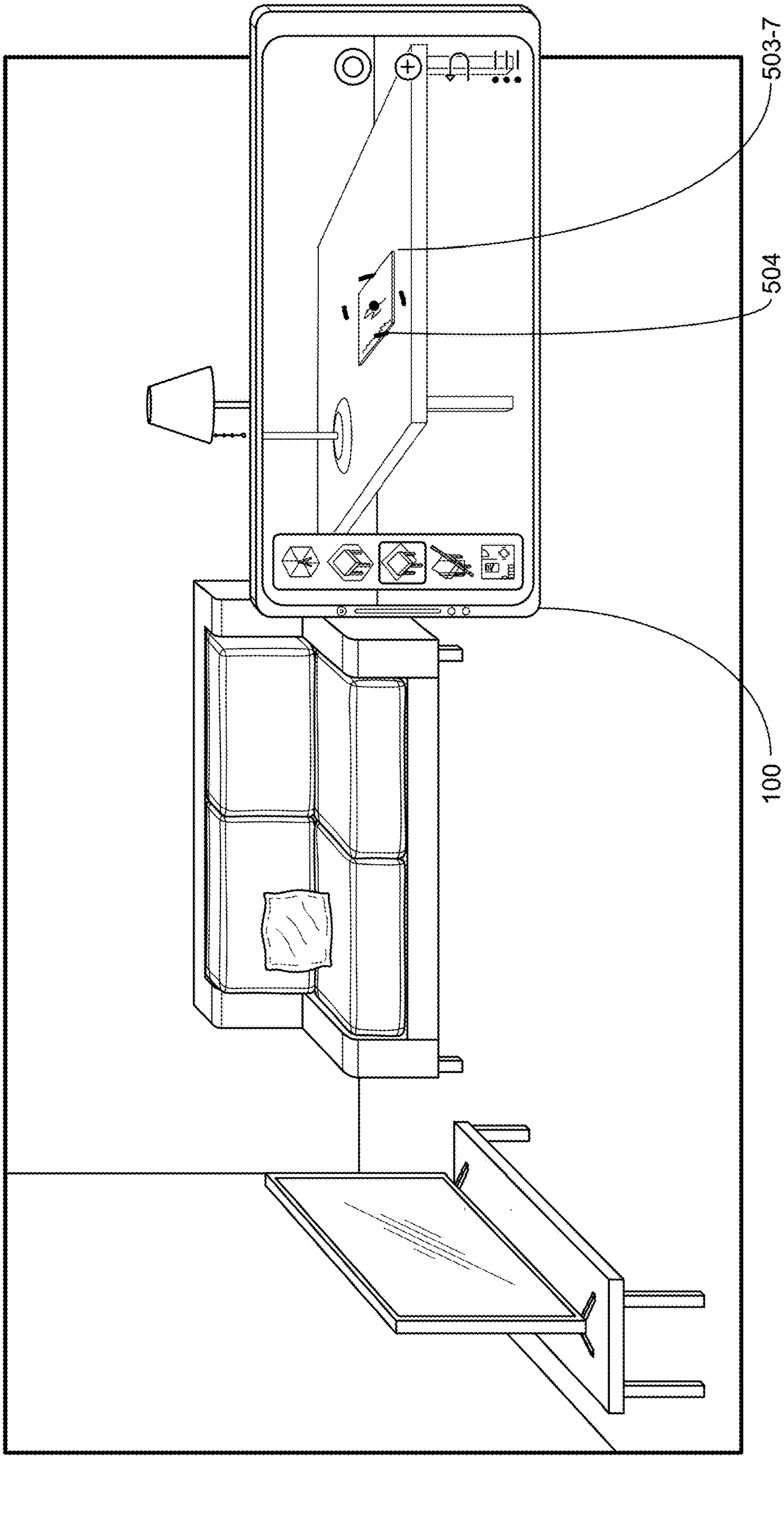
Figure 5C:
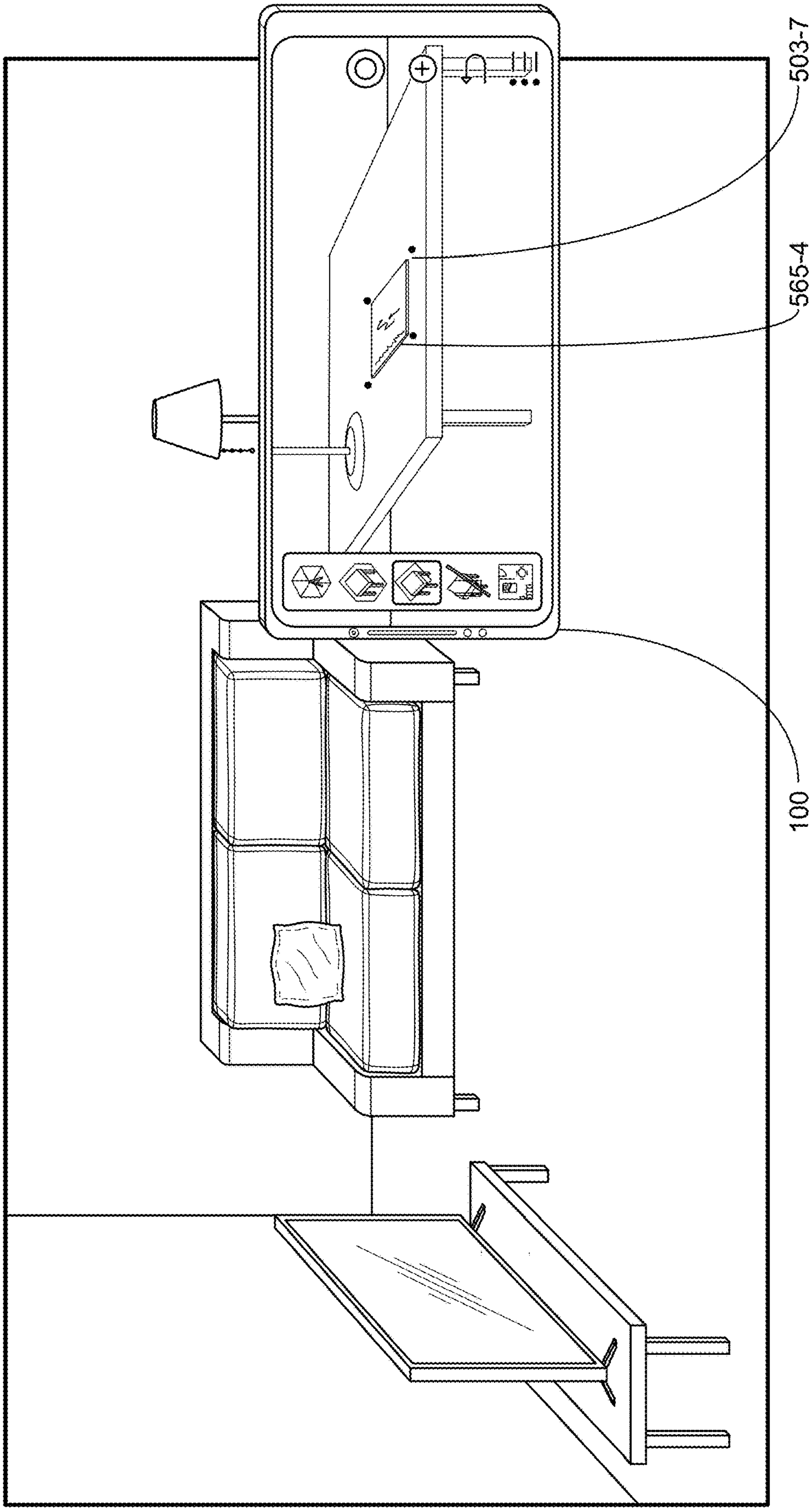
Figure 5C:
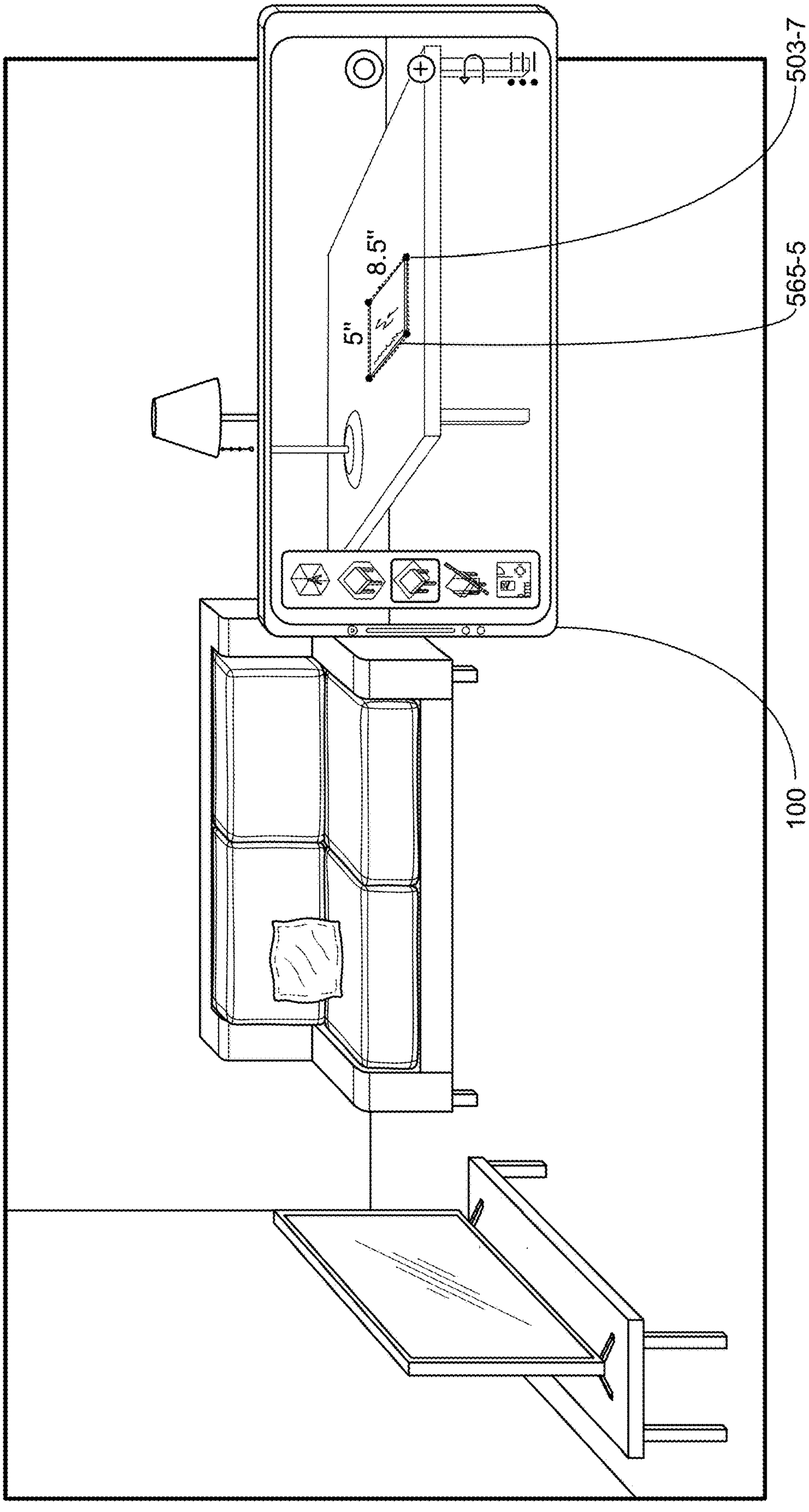
Figure 5C:
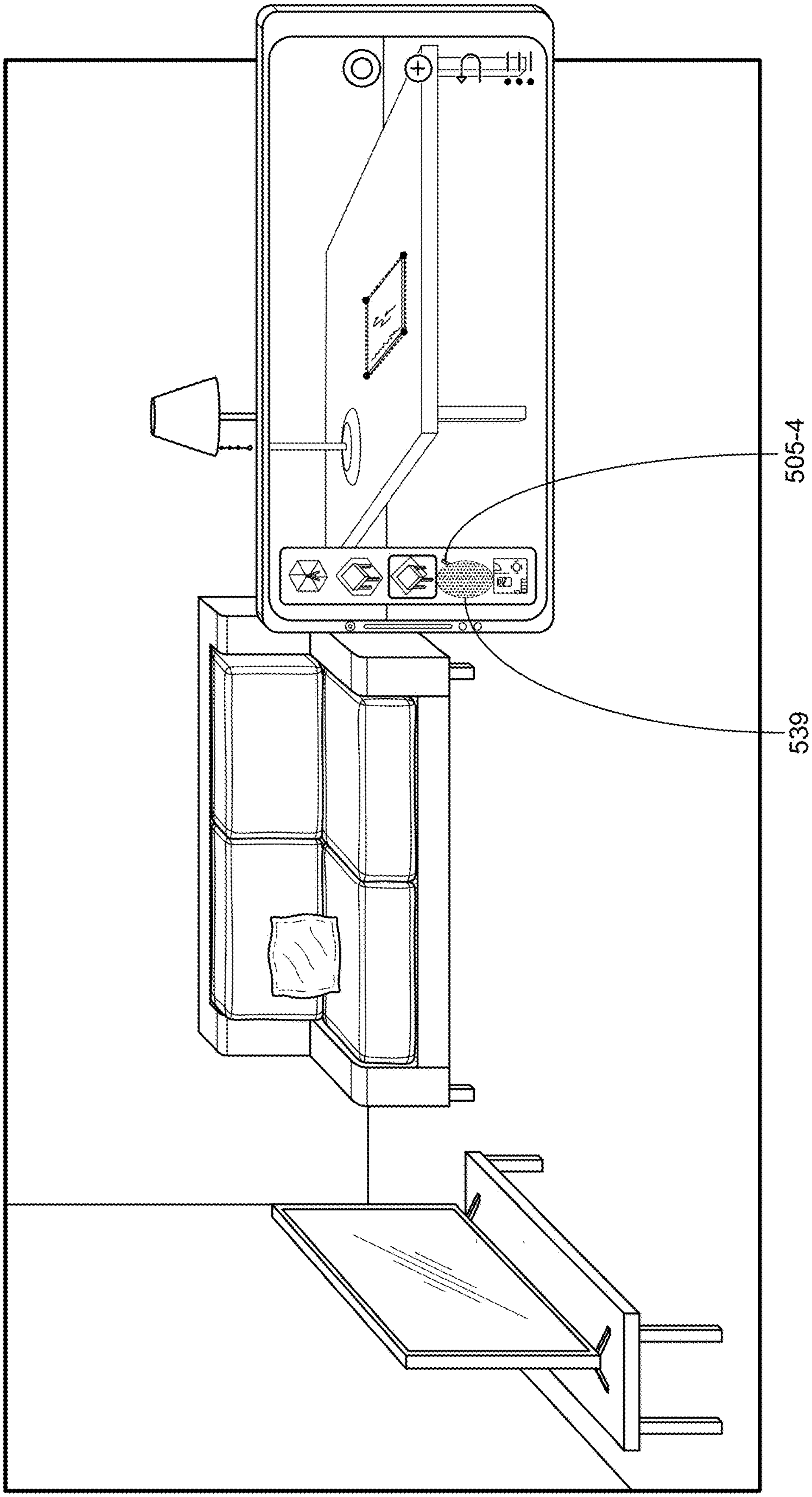
Figure 5C:
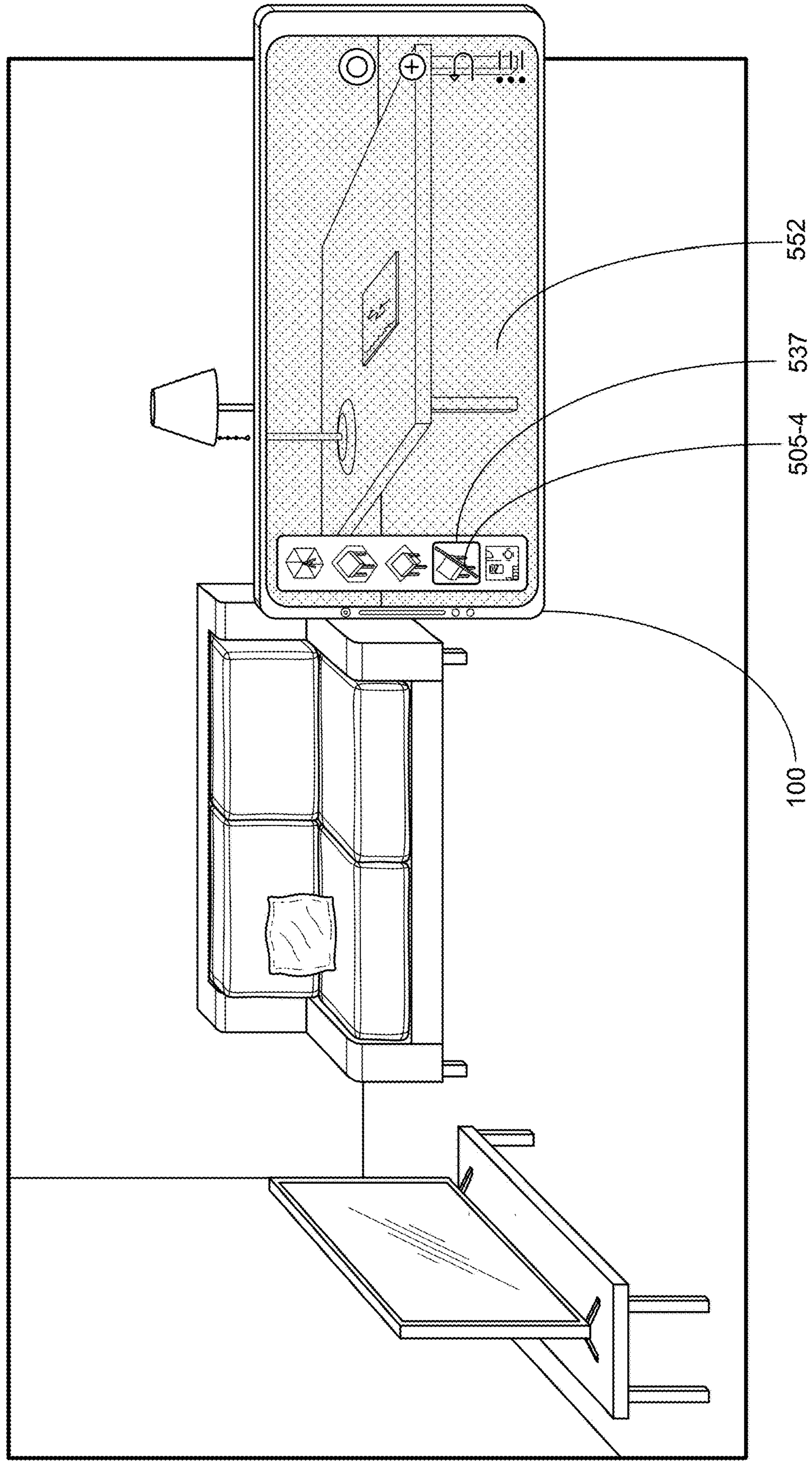
Figure 5C:
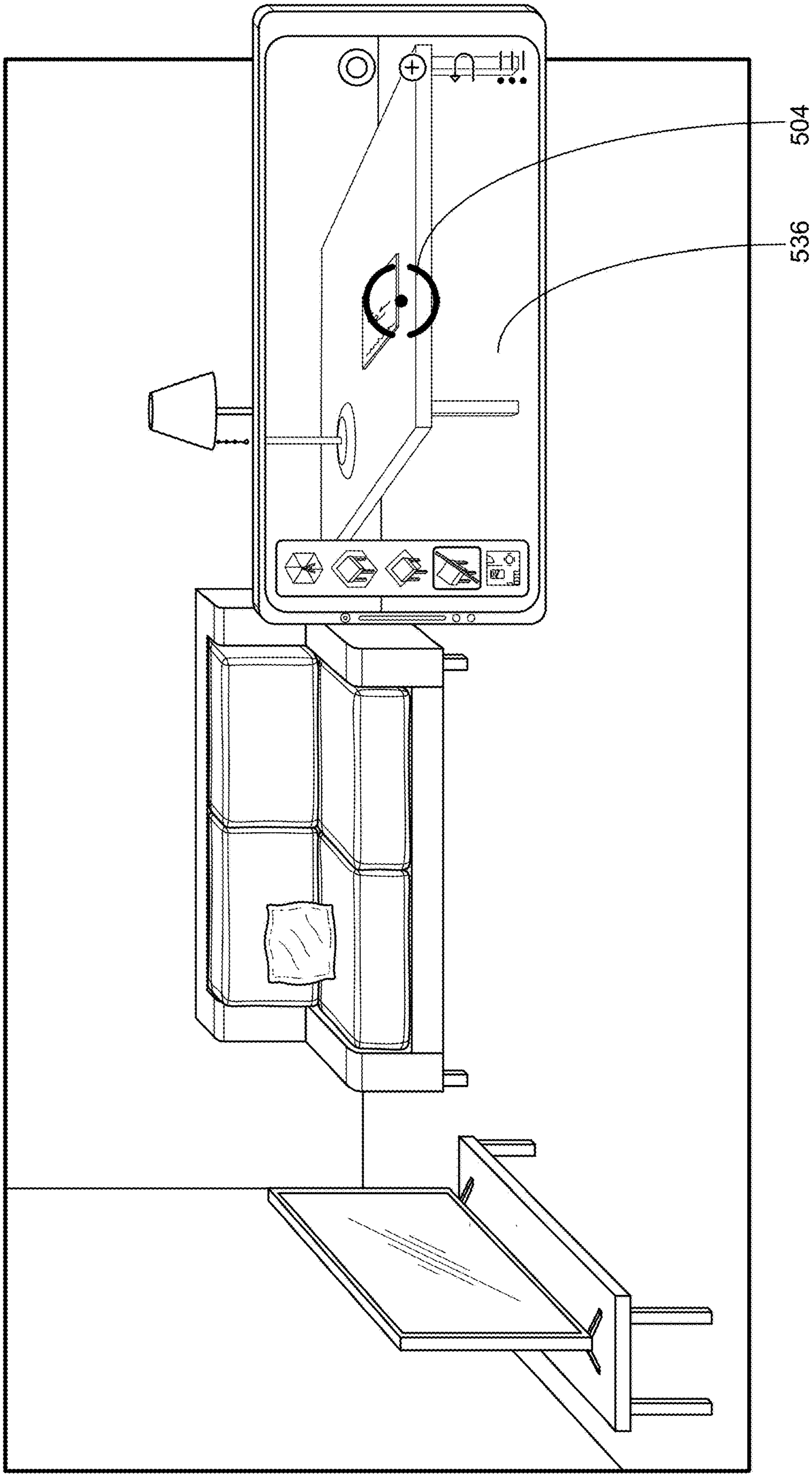
Figure 5C:
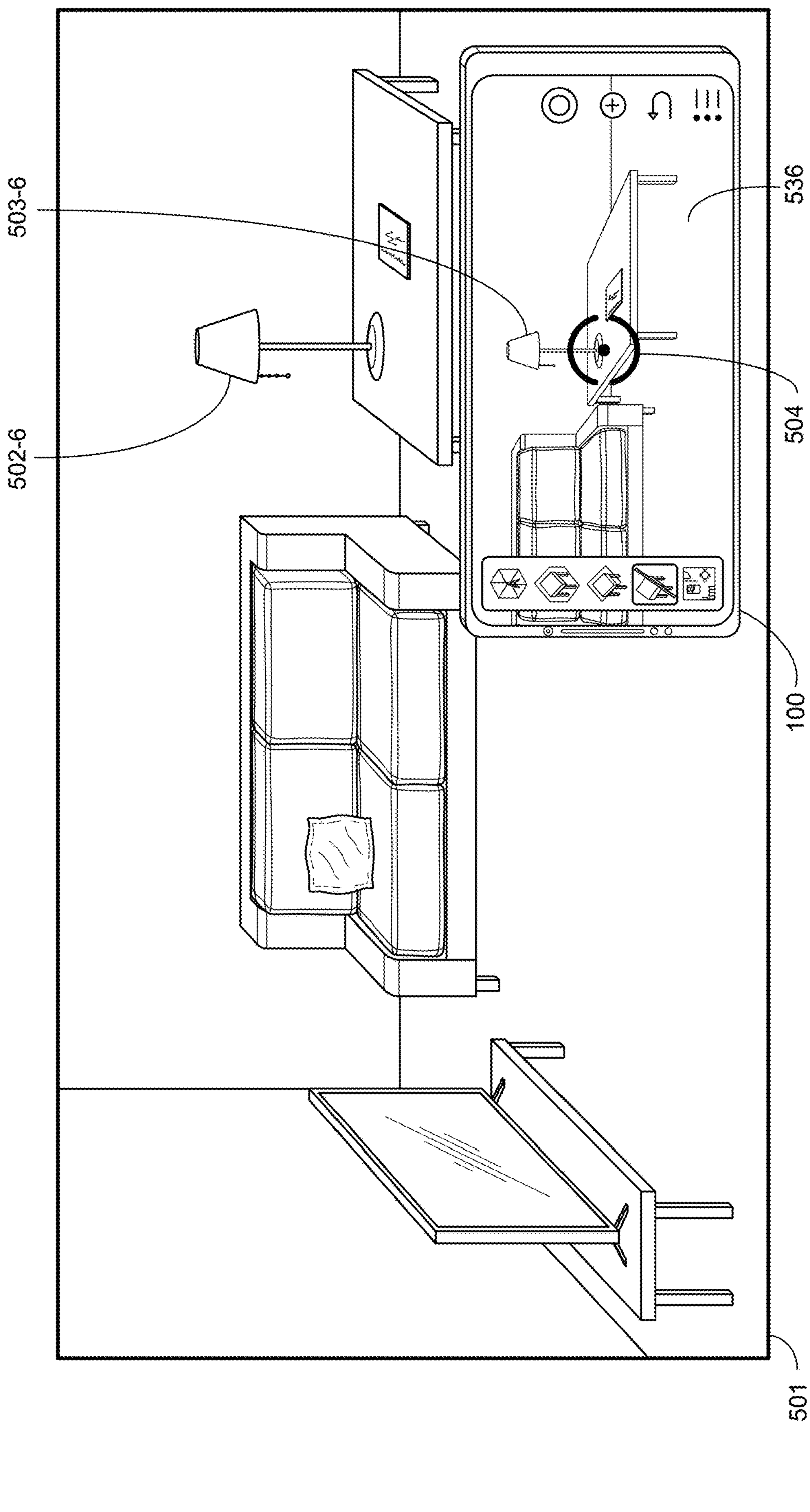
Figure 5C:
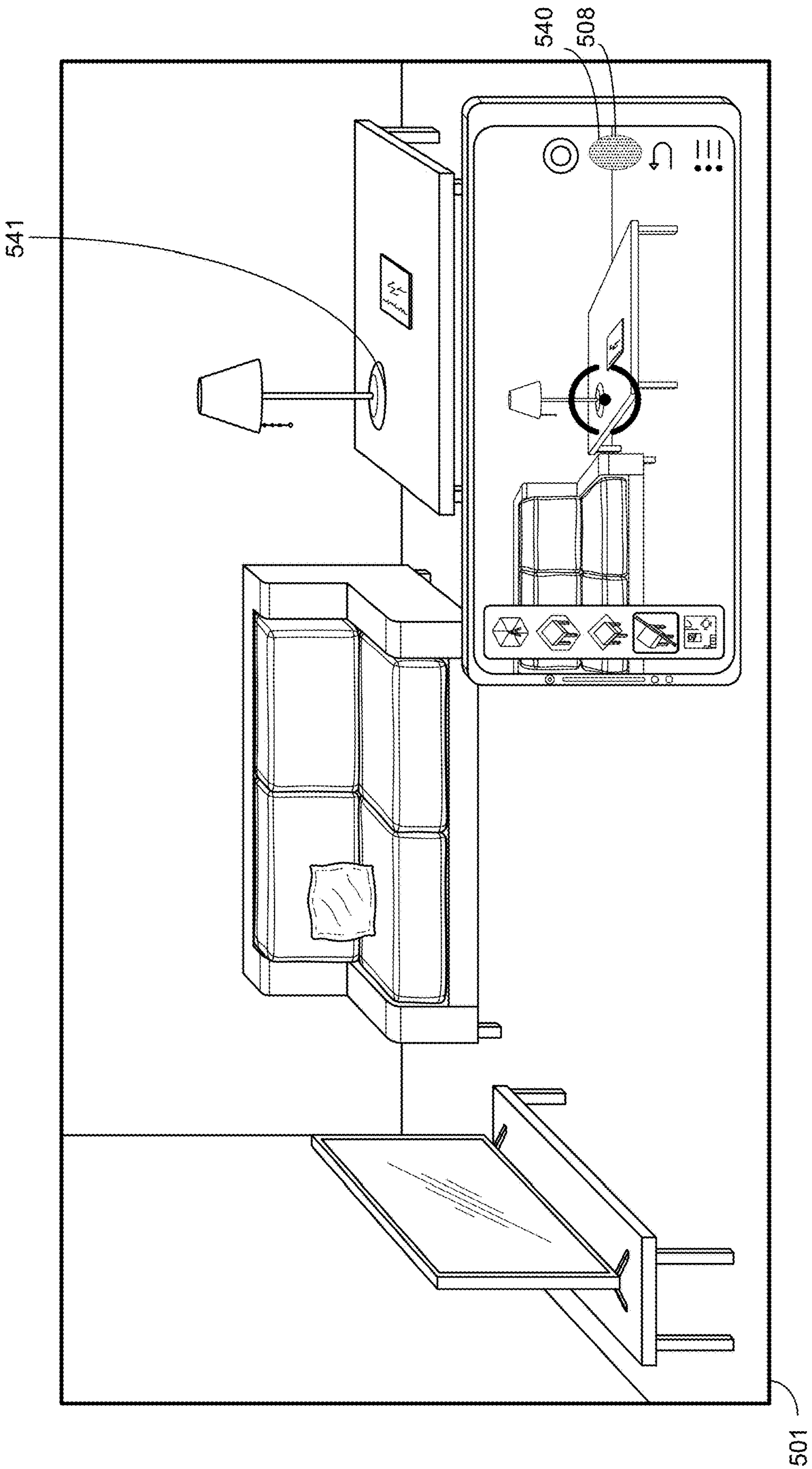
Figure 5C:
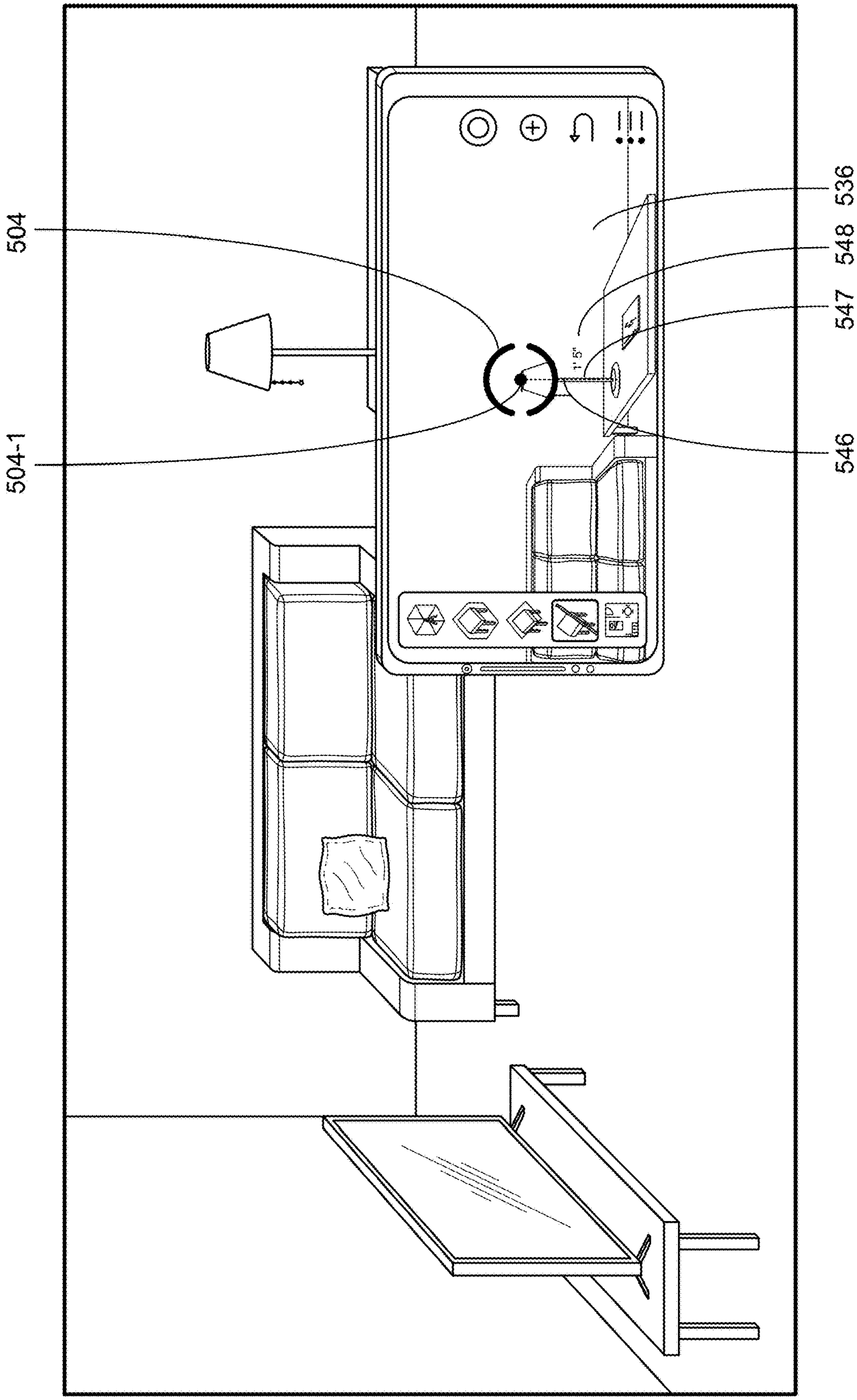
Figure 5C:
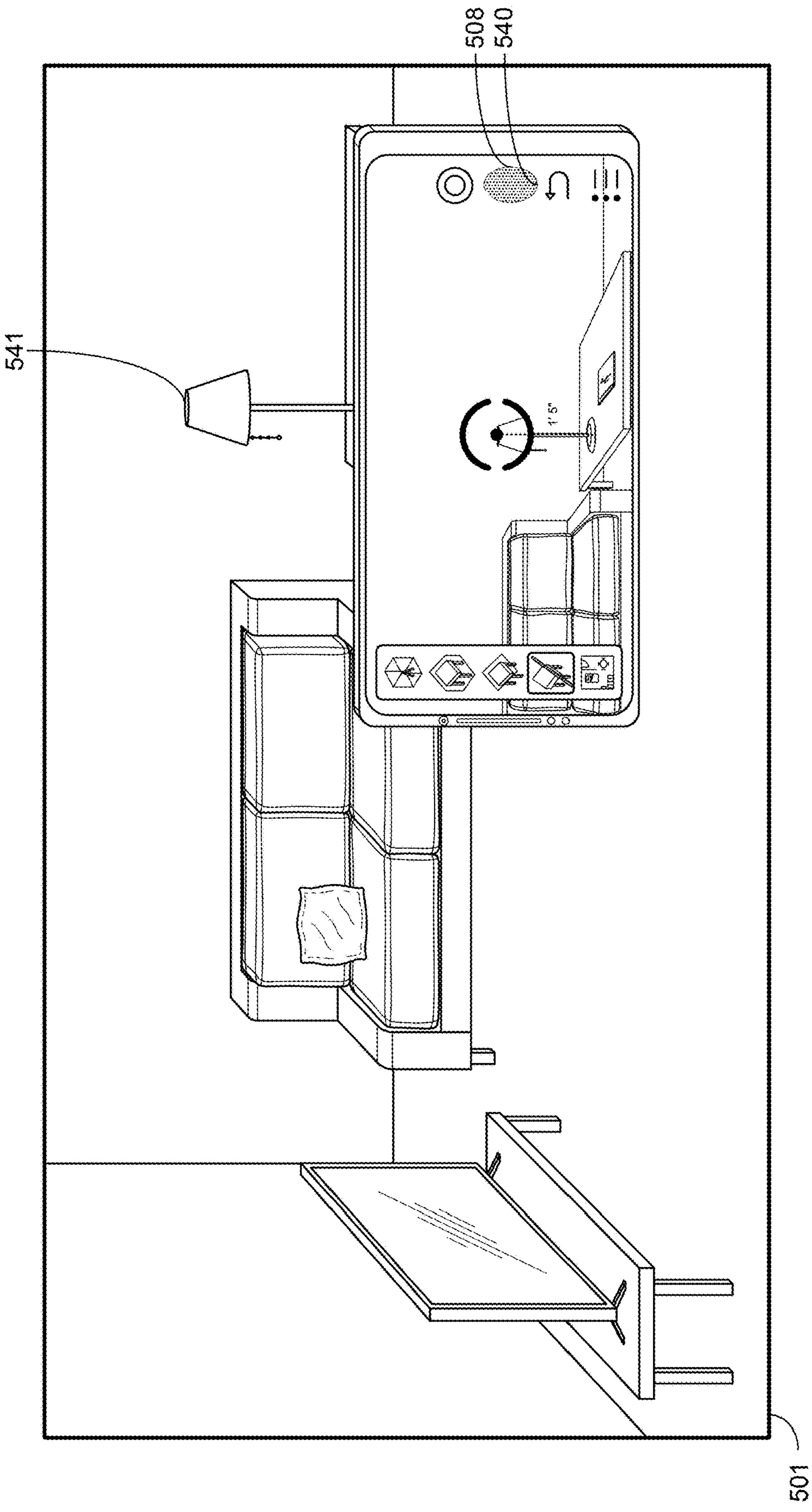
Figure 5C:
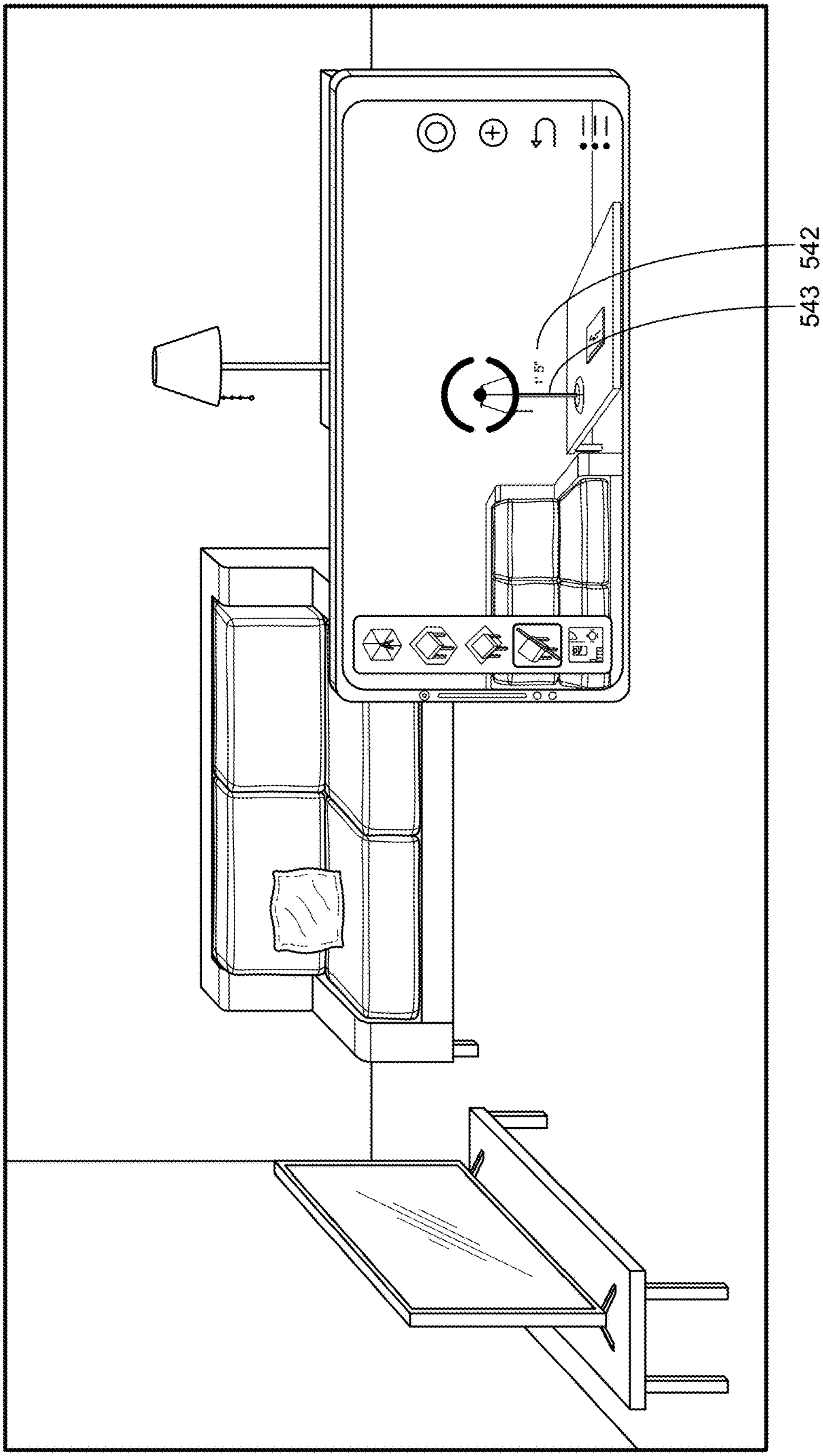
Figure 5C:
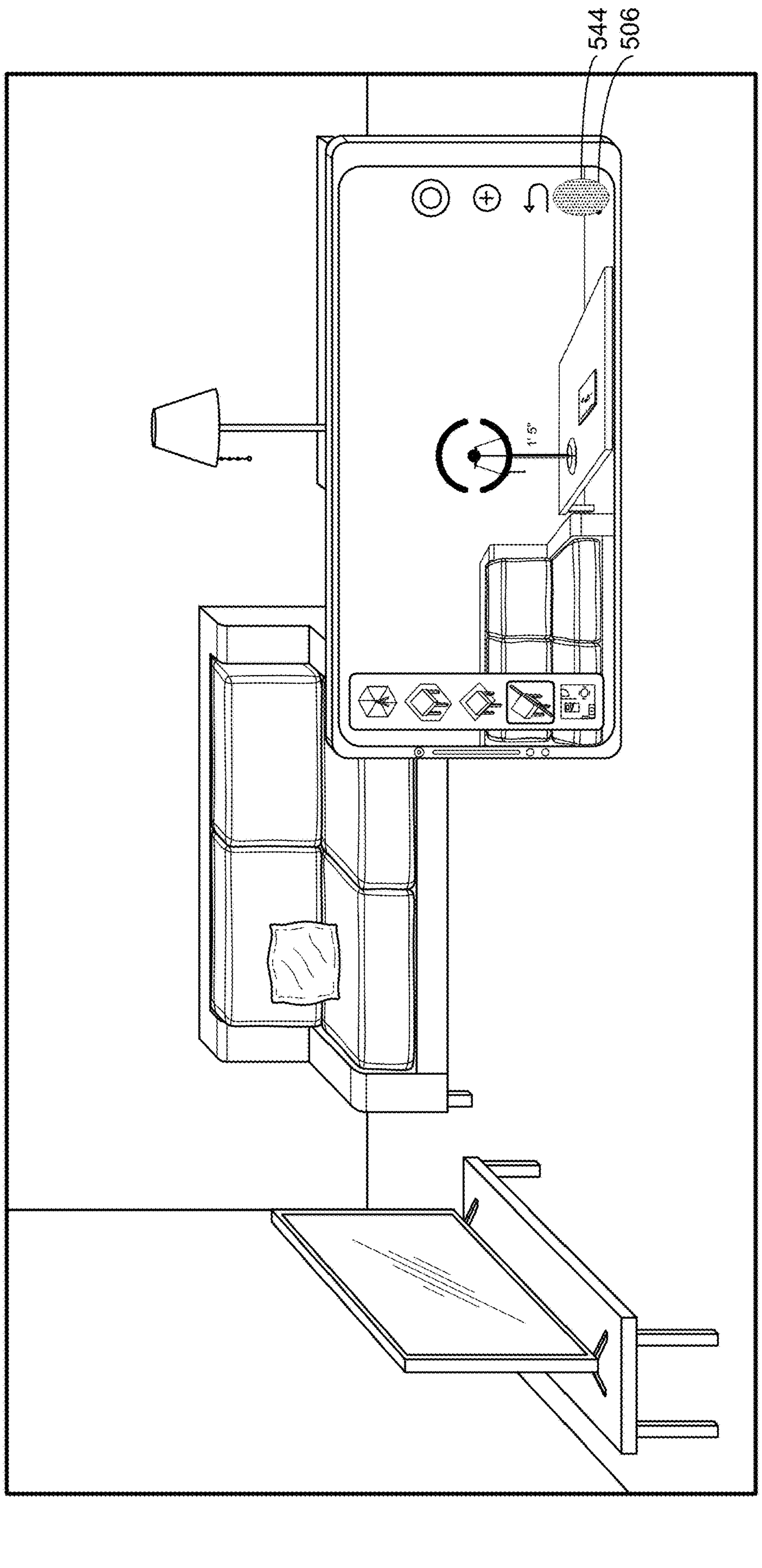
Figure 5C:
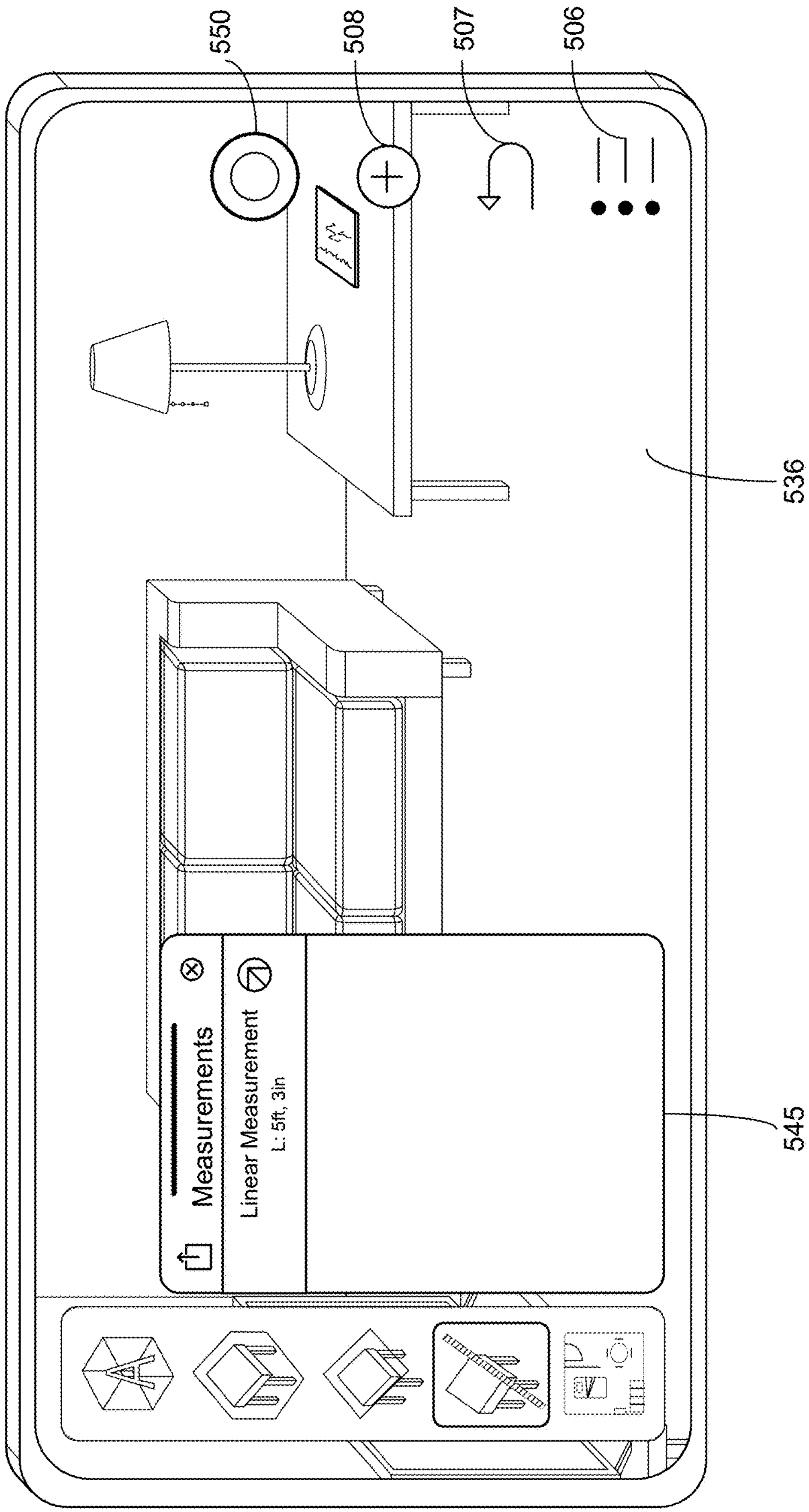

In some embodiments, in response to automatically detecting that a person 512 is in view, a measurement animation is shown that illustrates the height of the person 512. FIG. 5Z through FIG. 5AB show an animation of how a representation of the height of the person 512 is added to augmented reality view 500. FIG. 5Z shows, in augmented reality view 500, a measurement marker 513 at the floor where the person 512 is standing. In some embodiments, as the measurement marker 513 moves to the top of the person's 512 head, the corresponding measured distance is displayed. FIG. 5AA shows the measurement marker 513 moving to about the waistline of the representation of the person 512, with a corresponding partially measured height being displayed. FIG. 5AB shows the animation completing once the measurement marker 513 moves to the top of the person's 512 head. When the animation is complete, the representation in augmented reality view 500 of the corresponding measured distance stops changing. In some embodiments, the measurement animation moves at a slower pace as the measurement marker 513 moves closer to the top of the person's 512 head.

FIGS. 5AC through 5AG depict embodiments in which metrics other than (or in addition to) a person's height are measured. In FIG. 5AC the person 512 is holding their hands 514 apart as if they were stating how big something was (e.g., "the fish was this big"). The portable multifunction device 100 automatically detects that the person 512 is holding their hands 514 apart to signify the measurement of something. In response, the portable multifunction device 100 causes display, in augmented reality view 500, of a first measurement (e.g., 3-inches) between the person's 512 hands 514.

FIG. 5AD shows the person 512 holding their hands 514 apart at a different distance. As a result the portable multifunction device 100 causes display, in augmented reality view 500, of a second measurement (e.g., 6-inches) between the person's 512 hands 514. This measurement change can occur in real-time.

FIG. 5AE shows another orientation of the portable multifunction device 100, in which the person's head 515 is in view of the one or more optical sensors 164. In some embodiments, when predefined criteria (e.g., with respect to distance of the one of more cameras from the user's face, or with respect to the portion of augmented reality view 500 occupied by the representation of the person's face, or with respect to positioning of a reticle 504 over the user's face) are met, an interpupillary distance ("IPD") 516 is automatically displayed in augmented reality view 500.

FIG. 5AF shows another orientation of the portable multifunction device 100, in which the person's foot 517 is in view of the one or more optical sensors 164. In some embodiments, when predefined criteria (e.g., with respect to distance of the one of more cameras from the user's foot 517, or with respect to the portion of augmented reality view 500 occupied by the representation of the person's foot, or with respect to positioning of a reticle 504 over the user's foot) are met, a foot size (and or shoe size) 518 is displayed in augmented reality view 500.

FIG. 5AG shows another orientation of the portable multifunction device 100, in which dog 502-10 is in view of the one or more optical sensors 164. In some embodiments, when predefined criteria (e.g., with respect to distance of the one of more cameras from the dog, or with respect to the portion of augmented reality view 500 occupied by the representation of the dog, or with respect to positioning of a reticle 504 over the representation 503-10 of the dog, the portable multifunction device 100 will show that the dog's 503-10 measurements can be locked-in. In some embodiments, the measurements automatically shown are the dog's 503-10 chest circumference 518 and/or the dog's 503-10 chest to base of tail length 519. Optionally, additional or fewer measurements can be shown (e.g., just the neck circumference).

While FIGS. 5AH-5BO depict a couch and representations of a couch, various portions thereof, and various annotations displayed with respect to the couch, it is to be understood that the couch is but one example of a three-dimensional physical object, and that the various features shown in and described with respect to these figures, are equally applicable to augmented reality views of a wide range of physical objects. FIG. 5AH shows another orientation of the portable multifunction device 100, at which couch 502-3 is in view of the one or more optical sensors 164. FIGS. 5AH, 5AI, and 5AJ show an animation that occurs when the device detects that the reticle 504 is placed over a three dimensional object. FIG. 5AJ shows the reticle 504 of FIGS. 5AH and 5AI having been replaced by (or changed in appearance to become) a bounding box 589. FIG. 5AK shows a tap input 520 over the point-to-point measurement mode icon 505-4. FIG. 5AL shows the response to the tap input 520 over the point-to-point measurement mode icon 505-4. FIG. 5AL now shows that the point-to-point measurement mode icon 505-4 is selected, and the reticle 504 visually changes to a point-to-point measurement mode reticle 504-2 to reflect the changed mode.

FIG. 5AM shows the portable multifunction device 100, with the couch in view of the one or more optical sensors 164 of the device 100. In some embodiments, the transition from FIG. 5AL to FIG. 5AM is caused by movement of device 100, and its one or more cameras to a position closer to the couch and offset to a side of the couch such that the point-to-point measurement mode reticle 504-2 is now displayed near, but not over, an outside edge 521 of the representation 503-3 of the couch within the augmented reality view 500. FIG. 5AN shows the point-to-point measurement mode reticle 504-2 snapped to an outside edge 521 of the couch. This snapping occurs when the reticle 504-2 reaches a threshold distance to a detected edge in the augmented reality view 500. FIG. 5AN, shows that when the reticle 504-2 is over the outside edge 521, guiding line(s) 522, also herein called guides, are shown along the outside edge 521.

FIG. 5AO shows the portable multifunction device 100, with the couch in view of the one or more optical sensors 164 of the device 100. In addition, the point-to-point measurement mode reticle 504-2 is now displayed near, but not within a threshold distance of an outside corner 523 of the representation 503-3 of the couch. FIG. 5AP shows the point-to-point measurement mode reticle 504-2 snapped to the outside corner 523, which is an example of an anchor point. This snapping occurs when the reticle 504-2 is positioned (e.g., by movement and/or change in orientation of device 100) within a threshold distance of a detected corner of the couch in the augmented reality view 500. FIG. 5AP, shows that when the reticle 504-2 is over an anchor point, such as the outside corner 523 of the displayed representation of the couch, guides or guiding lines 524 are shown along edges of the object corresponding to the anchor point, e.g., all edges of the couch corresponding to the outside corner 523. It is noted that corner 523 also corresponds to a feature at which multiple surfaces of the couch meet, and that the guides 524 shown in FIG. 5AP include guides extending from the anchor point, corner 523, in directions perpendicular to each of those surfaces.

FIG. 5AQ shows an input 525 over the measurement lock-in user interface object 508, which when selected drops a point at the location of the point-to-point measurement mode reticle 504-2. In response to dropping the point at the location of the point-to-point measurement mode reticle 504-2, as shown in FIG. 5AR, additional guides (e.g., vertical guide 526-1, horizontal guide 526-2, and horizontal guide 526-3) that were not previously displayed, prior to the point being dropped, are displayed in augmented reality view 500. It is noted that in the example shown in FIG. 5AR, the anchor point for the guides 526 is located at an edge of the couch, at which two surfaces of the couch (e.g., a top surface of the couch arm and an obscured vertical side surface of the couch) meet, and the guides 526 shown in FIG. 5AR include guides extending from the anchor point, in directions perpendicular to each of those surfaces.

FIG. 5AS shows the reticle 504-2 moving along the horizontal guide 526-3, but when the reticle 504-2 reaches another geometric feature (e.g., the end of the couch arm) additional guides are displayed. In FIG. 5AS additional vertical guide 567-1 and horizontal guide 567-2 are displayed.

FIG. 5AT shows the reticle 504-2 moving along the horizontal guide 526-3 (e.g., in response to movement of device 100), and in response to the movement of reticle 504-2 past the geometric feature (FIG. 5AS), the other guides (e.g., vertical guide 567-1, horizontal guide 567-2-2) are ceased to be displayed. Additionally, as the reticle 504-2 continues to be moved along the horizontal guide 526-3, in response to corresponding movement of the device 100, the horizontal guide 526-3 is overlaid by a progressively longer measurement line 527.

FIG. 5AU shows the measurement line 527 and the reticle 504-2 snapping to another outside edge 528 of the couch 503-3. In some embodiments, when the reticle 504-2 is snapped to another outside edge 528 of the couch 503-3, new guides are displayed. FIG. 5AU also shows an input 529 at the measurement lock-in user interface object 508, while reticle 504-2 is over the other outside edge 528 of the couch 503-3. The display of the measurement lock-in user interface object 508 in augmented reality view 500 signifies that the measurement line 527 line is no longer getting longer, and the measurement is complete and available for lock-in. FIG. 5AU also shows guides 568 for aid in potential future placement of the reticle 504-2. FIG. 5AV shows that after the measurement is complete, guides 568 may still be displayed to aid the user in placing their next measurement.

FIG. 5AW shows measurement 530 being displayed. Measurement 530 corresponds to the final length of measurement line 527 line. FIG. 5AW also illustrates the reticle 504-2 now overlaying no representations of measurable physical objects in the physical environment, and as a result no guides are displayed.

FIG. 5AX shows the portable multifunction device 100, with a representation 503-3 of couch, which is in view of the one or more optical sensors 164 of device 100. In addition, the point-to-point measurement mode reticle 504-2 is now displayed on a couch cushion 531, away from any edge of the couch or couch cushion 531. While the point-to-point measurement mode reticle 504-2 is selected, a vertical guide 533 is displayed. FIG. 5AY shows an input 534 over the measurement list button 506.

FIG. 5AZ shows an example of a response to an input 534 over the measurement list user interface object 506. FIG. 5AZ omits physical environment 501 in the background of the portable multifunction device 100 for simplicity and in order to show a larger view of the portable multifunction device 100. FIG. 5AZ displays, in user interface 591, a list of measurements that have been taken during the annotation session (e.g., a session is a period where the application is running in the foreground). Within the list of measurements user interface 590 there is a scrollable list of measurements taken during the current session; if the scrollable list includes more measurements than can be concurrently displayed, only a subset of the measurements taken are concurrently displayed. In the example shown in FIG. 5AZ, the measurements that are currently displayed are as follows: "Linear Measurement" user interface object 591-2; "Couch Measurement" user interface object 591-3; "Pet Measurement" user interface object 591-4; and "Hand Separation" user interface object 591-5. In some embodiments, measurement names are automatically generated and included in [in] user interface 591, and are based on the detected objects that have been measured. For example, the device can tell when a pet, couch, shoe or other object has been measured and will name the measurement accordingly (e.g., "dog measurement," "couch measurement," "shoe measurement," or "pet measurement"). In some embodiments, each measurement in user interface 591 also includes an icon indicating what type of measurement was taken (e.g., a three dimensional measurement, a two-dimensional measurement, or a curved two dimensional measurement, etc.).

FIG. 5BA illustrates an input 592 over the "Pet Measurement" user interface object 591-4 that's located within the list of measurements in user interface 591. FIG. 5BB shows a detailed object measurement (e.g., "Pet Measurement") user interface 593 that is displayed in response to an input 592 over a respective measurement list user interface object (e.g., the "Pet Measurement" user interface object 591-4). "Pet Measurement" user interface 593 includes an editable measurement name section 593-1. In order to edit the measurement's name, an input can be made to the editing user interface icon 593-2 to edit the measurements name. In some embodiments, the measurement may be editable without clicking on an icon first. FIG. 5BB also shows a list of measurements (e.g., pet measurements) 593-3. In some embodiments, additional measurements that were not previously displayed in the list of measurements user interface 591 are displayed within the detailed object measurement user interface 593. In this example, the displayed measurements in detailed object measurement user interface 593 include: chest diameter; chest to tail, head height, and collar size. Additionally, a "Return to List" user interface object 593-4 is shown, which when selected displays the previous user interface as shown in 5BA. There is also a sharing user interface object 593-5 for sharing this measurement and other measurements with others (e.g., via email, or text messaging). Lastly, there is also an exit icon 593-6 for closing out of the list of measurements user interface 591 or the "Pet Measurement" user interface 593.

FIG. 5BC shows an input 594 over the user interface icon 593-2 (obscured by the input 594) to edit the measurements name. FIG. 5BD shows that the user interface icon 593-2 to edit the measurements name changes to a "Done" user interface object 593-7 to indicate that editing of the measurement's name is enabled. FIGS. 5BE and 5BF illustrate the editable measurement name section 593-1 being retitled from "Pet Measurement" to "Lola's Size." In some embodiments, the retitling occurs in response to inputs received at a virtual keyboard (not shown in these figures) that is displayed over at least a portion of the displayed user interface or that is displayed concurrently with a rescaled user interface 593. In some embodiments, an external keyboard can be used.

FIG. 5BF shows an input 594 being received at the "Done" user interface object 593-7. In response to the receiving the input at the "Done" user interface object 593-7, as shown in FIG. 5BG, an editing user interface icon 593-2 replaces the "Done" user interface object 593-7.

FIGS. 5BH and 5BI show a swiping gesture 595-1 and 595-2, in this example a swiping gesture moving in the upward direction. In response to the swiping gesture, e.g., swiping gesture 595-1 and 595-2, a user interface element displaying additional options 593-8 is revealed, as shown in FIG. 5BJ. The resulting user interface, an example of which is shown in FIG. 5BJ, includes additional options (e.g., user interface objects) such as: a "Save to Photos" user interface object 593-9 for saving the measurement as a photo for viewing within a photo viewing/editing application; a "Save to Files" user interface object 593-10 for storing the measurement to a file system either locally or remotely; and/or a "Share Measurement" user interface object 593-11 for sharing the measurement (e.g., by email or text message).

FIG. 5BK shows an input 596 occurring over the "Return to List" user interface object 593-4 (partially obscured by the input 596). FIG. 5BL shows an example of a response to selection of the "Return to List" user interface object 593-4. FIG. 5BL now shows the list of measurements user interface 591, but with the "Pet Measurement" user interface object 591-4 retitled as "Lola's Size."

FIG. 5BM illustrates a swipe gesture, in the leftward direction in this example, over a respective user interface element in the list of measurements user interface 591 (e.g., over the "Hand Separation Measurement" user interface object 591-5). Although a swipe in the leftward direction 597-1 is shown, it should be appreciated that any other suitable swipe direction can also be used. In some embodiments, a swipe in a predefined direction, such as the leftward direction, is used to indicate that a respective measurement is to be deleted. FIG. 5BN illustrates the swipe in the leftward direction 597-2 continuing in the leftward direction. As the respective user interface object 591-5 over which the swipe gesture is being performed moves in accordance with the swipe in the leftward direction 597-2, a delete notification 598 starts to be displayed. In some embodiments, a delete notification 598 replaces the entirety of the respective user interface object (e.g., the "Hand Separation" user interface object 591-5) as it is fully swiped away from view.

FIG. 5BO illustrates that after the respective user interface object (e.g., the "Hand Separation" user interface object 591-5) is swiped from display (e.g., removed or deleted), and thus deleted from the list of measurements in user interface 591, the measurement that was below it in the list of measurements is now displayed in the location formerly occupied by the deleted (respective) user interface object. For example, FIG. 5BO shows the "Shoe Size" user interface element 599 is now displayed in place of the "Hand Separation Measurement" user interface object 591-5.

FIG. 5BP illustrates redisplay of the home screen user interface in response to exiting the measuring application 448.

FIG. 5BQ shows another input, input 535, directed to measuring application icon 448 to relaunch the measuring application. After the relaunch the measuring application, a user interface 536 of the measuring application 448 is displayed, e.g., as shown in FIG. 5BR. In some embodiments, exiting the measuring application 448 marks the end of an annotation session, sometimes called a measurement session, which in turn results in the list of annotations (e.g., measurements) taken during that session being cleared. In some embodiments, launching the measuring application begins a new annotation session.

FIG. 5BR illustrates user interface 536 of the measuring application 448, including augmented reality view 500 that includes a view of the portion of three-dimensional physical environment 501 that is in the field of view of one or more cameras of device 100. As shown in FIG. 5BR, the measuring application is operating in an automatic measurement mode, as indicated by selection indicator 537 over automatic measurement mode icon 505-1.

FIG. 5BS shows input 538 directed to three-dimensional measurement mode icon 505-2 corresponding to the three-dimensional measurement mode of the measuring application.

FIG. 5BT shows user interface 536 of the measuring application, which is operating in the three-dimensional measurement mode in response to input 538. In some embodiments, as shown in FIG. 5BT, operation in the three-dimensional measurement mode is indicated by selection indicator 537 over three-dimensional measurement mode icon 505-2. In some embodiments, as also shown in FIG. 5BT, operation in the three-dimensional measurement mode is indicated by reticle 504 having an appearance that is associated with three-dimensional measuring, such as the six-segmented appearance shown in FIG. 5BT.

FIG. 5BU shows device 100 (e.g., one or more cameras of device 100) at a different location relative to physical environment 501 than in FIG. 5BT, e.g., in response to movement of the device from the position shown in FIG. 5BT to the position shown in FIG. 5BU. Accordingly, the live view of the one or more cameras that is displayed in user interface 536 has been updated to reflect the portion of physical environment 501 that now is in the field of view of the one or more cameras. In FIG. 5BU, the annotation placement user interface element (e.g., reticle 504, and more specifically, focus point 504-1 in reticle 504) is over a portion of representation 503-5 of table 502-5. Table 502-5 is fully in view of the one or more cameras of device 100.

FIGS. 5BV-5BX illustrate, in accordance with the one or more cameras of device 100 being positioned such that reticle 504 is displayed over a portion of a representation of a three-dimensional object, such as table 502-5, that can be measured by device 100 (and optionally in accordance with a determination that user interface 536 includes a representation of all or substantially all of table 502-5), device 100 initiating making a three-dimensional measurement of table 502-5. For example, FIGS. 5BV-5BX illustrate the progression of an animation in which reticle 504 is transformed into indication 565-2 (e.g., a first indication, including marks at corners of the three-dimensional object, shown in FIG. 5BW, and/or a second indication, including a bounding box 565-3, shown in FIG. 5BX) overlaid on representation 503-5 of table 502-5, to indicate that one or more measurements of table 502-5 can be made by device 100.

FIG. 5BY shows device 100 at a different location relative to physical environment 501 than in FIG. 5BT, e.g., in response to the device 100 being moved from the position shown in FIG. 5BT to the position shown in FIG. 5BX and then to the position shown in FIG. 5BY. For example, device 100 is closer to table 502-5 (obscured by the device 100) in FIG. 5BY than in FIG. 5BX. Accordingly, the live view of the one or more cameras displayed in user interface 536 has been updated to reflect the portion of physical environment 501 that now is in the field of view of the one or more cameras. In FIG. 5BY, less of table 502-5 is in the field of view of the one or more cameras than when the device 100 is in the position shown in FIG. 5BX. In some embodiments, the measuring application automatically transitions to the two-dimensional measurement mode in accordance with the reticle 504 being displayed over a portion of a partial representation of table 503-5, where the partial representation 503-5 includes a view of at least a threshold amount of a two-dimensional surface of table 502-5 (e.g., the tabletop) without including a view of at least a threshold amount of a third dimension of the table.

FIGS. 5BZ and 5CA show device 100 at a similar distance to table 502-5 than in FIG. 5BY and moved slightly rightward such that reticle 504 (e.g., more specifically, focus point 504-1 of reticle 504, as shown in FIG. 5CA) is over a portion of representation 503-7 (obscured by the device 100) of magazine 502-7 positioned on table 502-5. Magazine 502-7 is fully in view of the one or more cameras of device 100.

FIG. 5CA illustrates that, in accordance with the one or more cameras of device 100 being positioned such that reticle 504, including its focus point 504-1, is displayed over a portion of a representation of a two-dimensional feature, for example magazine 502-7, that can be measured by device 100 (and optionally in accordance with a determination that user interface 536 includes a representation of all or substantially all of the two-dimensional feature), the measuring application has transitioned (e.g., from the three-dimensional measurement mode shown in FIG. 5BZ) to the two-dimensional measurement mode, indicated for example by selection indicator 537 over two-dimensional measurement mode icon 505-3, and as another example by reticle 504 having an appearance that is associated with two-dimensional measuring, such as the four-segmented appearance shown in FIG. 5CA. It is noted that although magazine 502-7 is a three-dimensional object in physical environment 501, magazine 502-7 is sufficiently thin that the two-dimensional area of the pages of magazine 502-7 is more likely to be of interest to the user of device 100 than a three-dimensional set of measurements of the magazine 502-7. Accordingly, in some embodiments, a thin three-dimensional object such as magazine 502-7 is considered by device 100 to be a two-dimensional feature rather than a three-dimensional object.

FIGS. 5CA-5CD illustrate, in accordance with the one or more cameras of device 100 being positioned such that reticle 504 is displayed over the portion of the representation of magazine 503-7, device 100 initiating making a two-dimensional measurement of magazine 502-7. For example, FIGS. 5CB-5CD illustrate the progression of an animation in which reticle 504 is transformed into an indication (e.g., as represented by indication 565-4 in FIG. 5CC and indication 565-5 in FIG. 5CD) overlaid on representation 503-7 of magazine 502-7, to indicate that one or more measurements of magazine 502-7 can be made by device 100.

FIG. 5CE shows input 539 directed to point-to-point (e.g., one-dimensional) measurement mode icon 505-4 corresponding to the one-dimensional measurement mode of the measuring application.

In response to input 539, the measuring application is transitioned to the one-dimensional measurement mode. Accordingly, in FIG. 5CF, selection indicator 537 is displayed over point-to-point measurement mode icon 505-4. FIG. 5CF also shows a transition of user interface 552 of the measuring application in response to input 539. In accordance with some embodiments, in response to manual selection of a measurement mode via selection of the corresponding icon, an animated transition is displayed while transitioning the measuring application from one measurement mode (e.g., a measurement mode in which the measuring application is operating when the manual selection is received) to another measurement mode (e.g., the selected measurement mode). In some embodiments, an animated transition between measurement modes is not displayed while transitioning the measurement mode automatically (e.g., no animated transition was displayed during the automatic transition from the three-dimensional measurement mode in FIG. 5BZ to the two-dimensional measurement mode in FIG. 5CA). In some embodiments, the displayed transition includes dimming of one or more portions of user interface 536. In the particular example in FIG. 5CF, the displayed transition includes dimming and/or blurring of the representation of the field of view of the one or more cameras of device 100 (e.g., optionally without dimming and/or blurring the controls of the measuring application). In addition, in some embodiments, as in the example transition in FIG. 5CB, reticle 504 ceases to be displayed during the transition to the manually selected measurement mode.

FIG. 5CG shows user interface 536 of the measuring application, which is operating in the one-dimensional measurement mode. Accordingly, reticle 504 is displayed with an appearance that is associated with one-dimensional (e.g., point-to-point) measuring, such as the two-segmented appearance shown in FIG. 5CG.

FIG. 5CH shows device 100 at a different location relative to physical environment 501 than in FIG. 5CG, e.g., due to movement of device 100 from the location shown in FIG. 5CG to the position shown in FIG. 5CH. Accordingly, the live view of the one or more cameras that is displayed in user interface 536 has been updated to reflect the portion of physical environment 501 that now is in the field of view of the one or more cameras. In FIG. 5CH, device 100 is positioned such that reticle 504 (e.g., more specifically, focus point 504-1 of reticle 504) is over a point in representation 503-6 of lamp 502-6.

FIG. 5CI shows input 540 directed to annotation creation button 508, to start the creation of a measurement annotation, with the current position of the focus point 504-1 of the reticle 504 indicating a starting point for a one-dimensional measurement. In the example shown in FIG. 5CH, the starting point is a location in physical environment 501 at the base of lamp 541.

FIG. 5CJ illustrates adding, in user interface 536, an annotation (e.g., a measurement annotation), representation 546 of a measurement that extends from the starting point, as described with reference to FIG. 5CI, and that extends to a current point in physical environment 501 that corresponds to focus point 504-1 of reticle 504. Representation 546 the measurement includes measurement segment 547 and label 548. Measurement segment 547 is displayed with an appearance (e.g., dashed) that indicates that the measurement is still in progress (e.g., the ending point of the one-dimensional measurement has not yet been specified). Label 548 indicates a current length of the measurement (e.g., a distance between the starting point and the current point in physical environment 501).

FIG. 5CK shows input 540 directed to annotation creation button 508, to finish or conclude the creation of a measurement annotation, with the focus point 501-4 of reticle 504 specifying the ending point for the one-dimensional measurement that was initiated in FIG. 5CH and in progress in FIG. 5CJ. In the example shown in FIG. 5CK, the ending point is a location in physical environment 501 at the top of lamp 541.

FIG. 5CL illustrates the finalized representation 542 of the measurement in response to input 540 while focus point 501-4 of reticle 504 specifies the ending point for the measurement, in accordance with which measurement segment 543 is displayed with an appearance (e.g., a solid appearance) indicating that the measurement has been completed.

FIG. 5CM shows input 544 directed to measurement list button 506.

FIG. 5CN omits physical environment 501 in the background of device 100 for simplicity and in order to show a larger view of device 100. In FIG. 5CN, in response to input 544, device 100 displays measurement list user interface 545. In the example shown in FIG. 5CN, measurement list user interface 545 is displayed over a portion of user interface 536 of the measuring application, concurrently with one or more other portions of user interface 536 such as the controls (e.g., the mode indication user interface 505, measurement list button 506, undo user interface object 507, measurement lock-in user interface object 508, and record user interface object 550) for the measuring application and/or a live view of the one or more cameras. Measurement list user interface 545 in FIG. 5CN lists only the measurements made during the current measurement session, since relaunching the measuring application as described herein with reference to FIG. 5BQ. Accordingly, measurement list user interface 545 in FIG. 5CN includes linear measurement 543 (described with reference to 5CJ-5CL). Measurement list user interface 536 in FIG. 5CN does not include any of the measurements described with reference to FIGS. 5A-5BO, which were made during a prior measurement session that was previously ended (e.g., as described herein with reference to FIGS. 5BP and 5BQ).

Figure 6A:
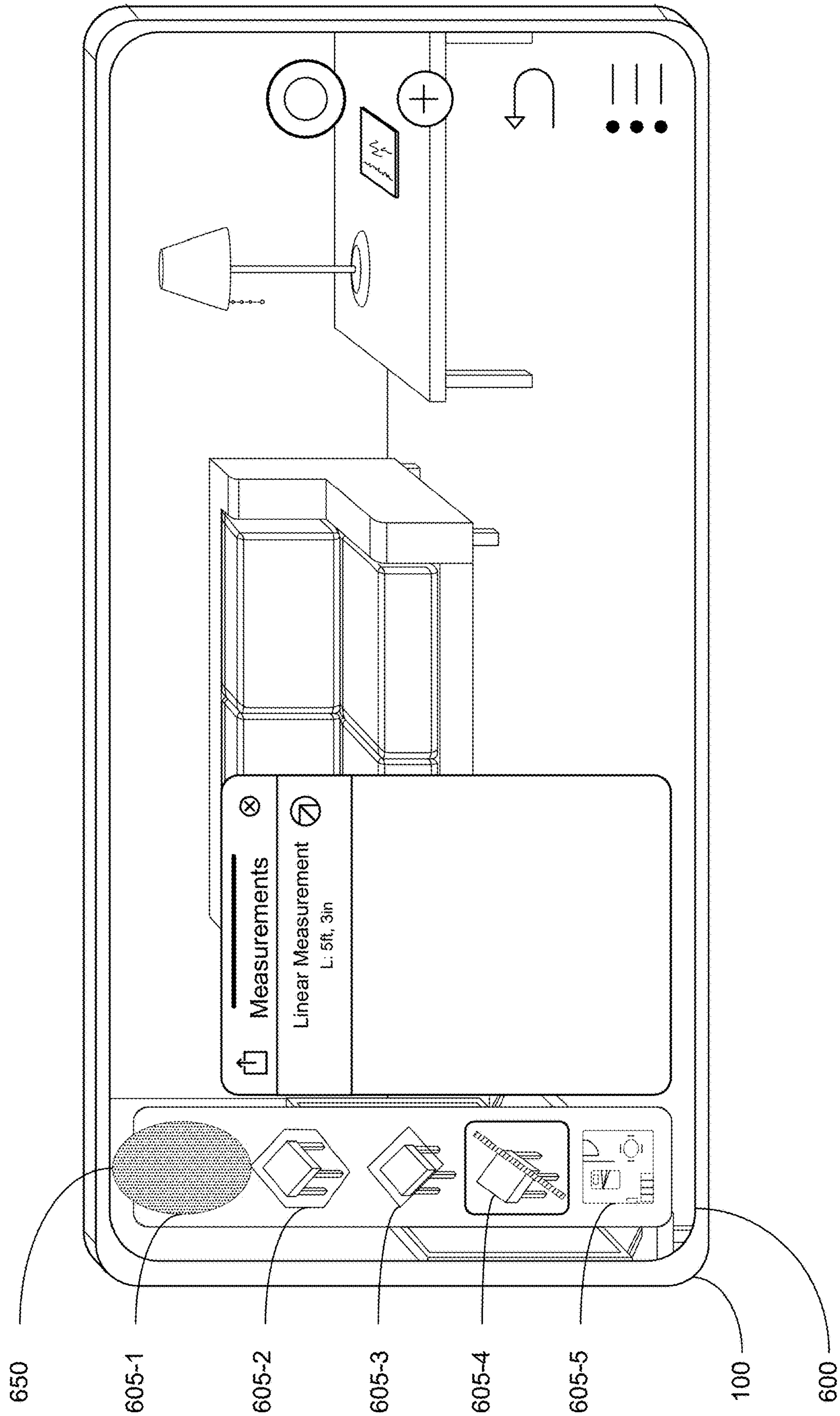
FIGS. 6A-6Y illustrate example user interfaces for annotating and measuring a physical environment using augmented reality in accordance with some embodiments and retrieving measurement information from stored media items in accordance with some embodiments.
Figure 6B:
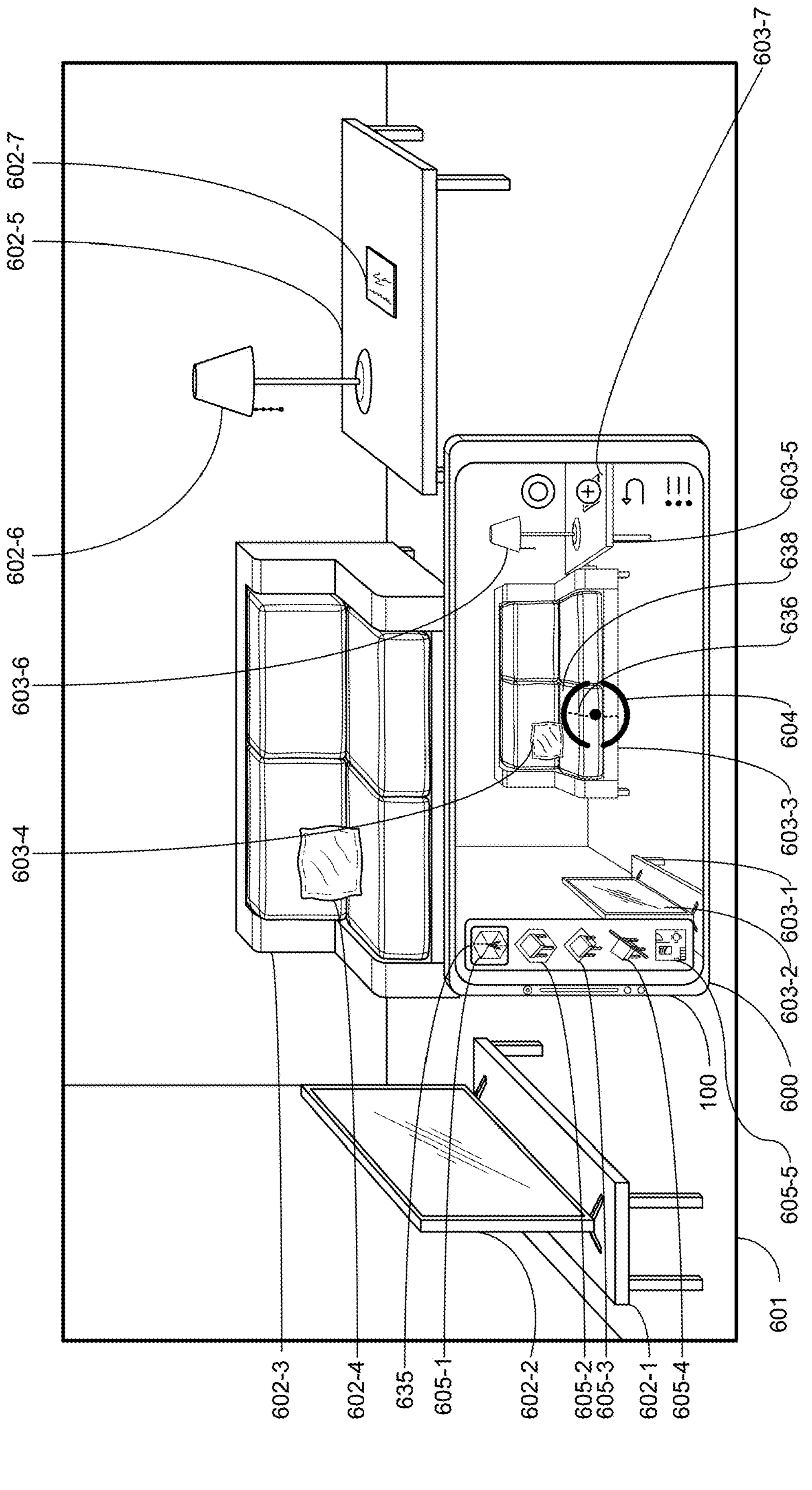
Figure 6C:
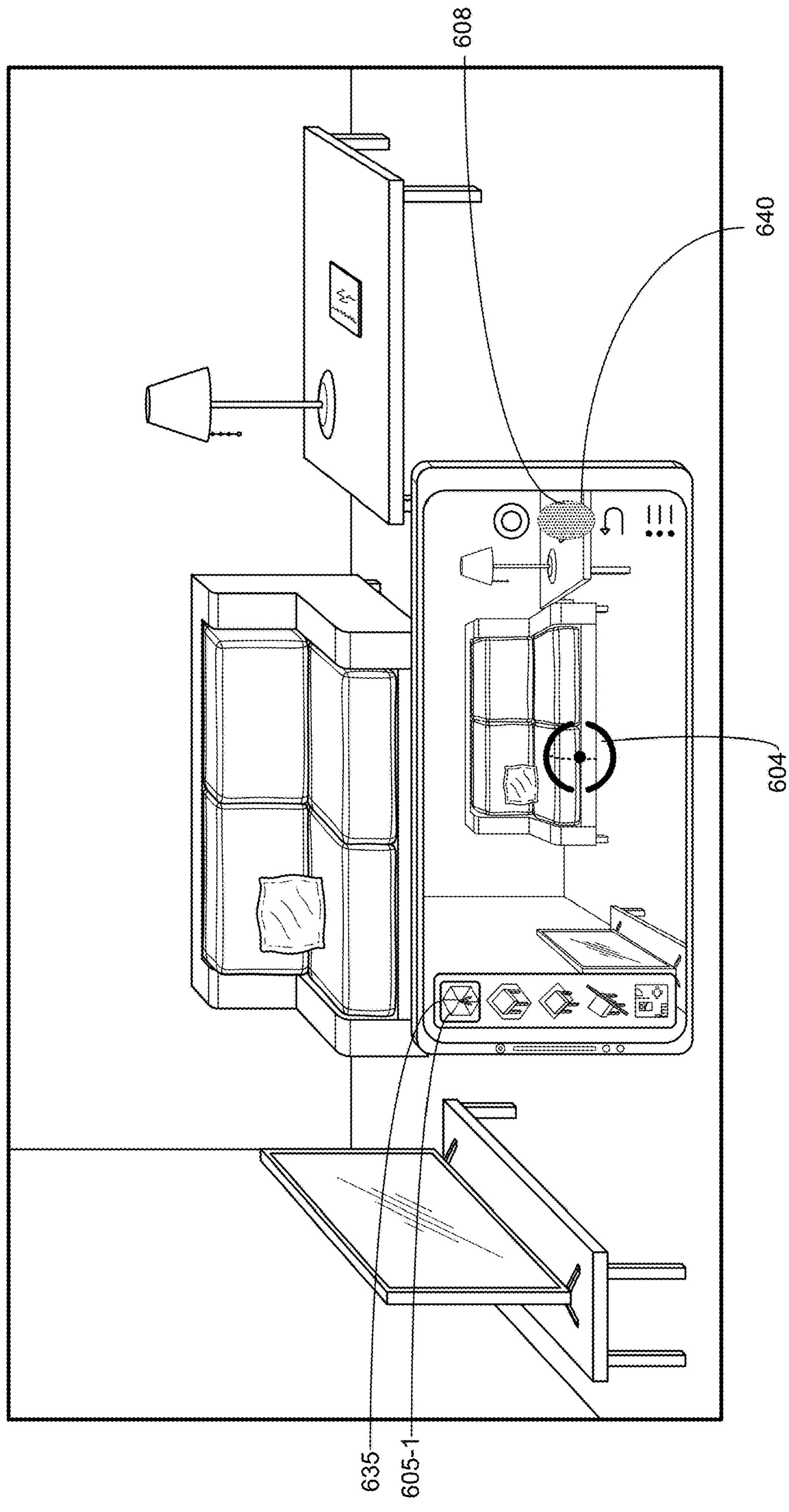
Figure 6D:
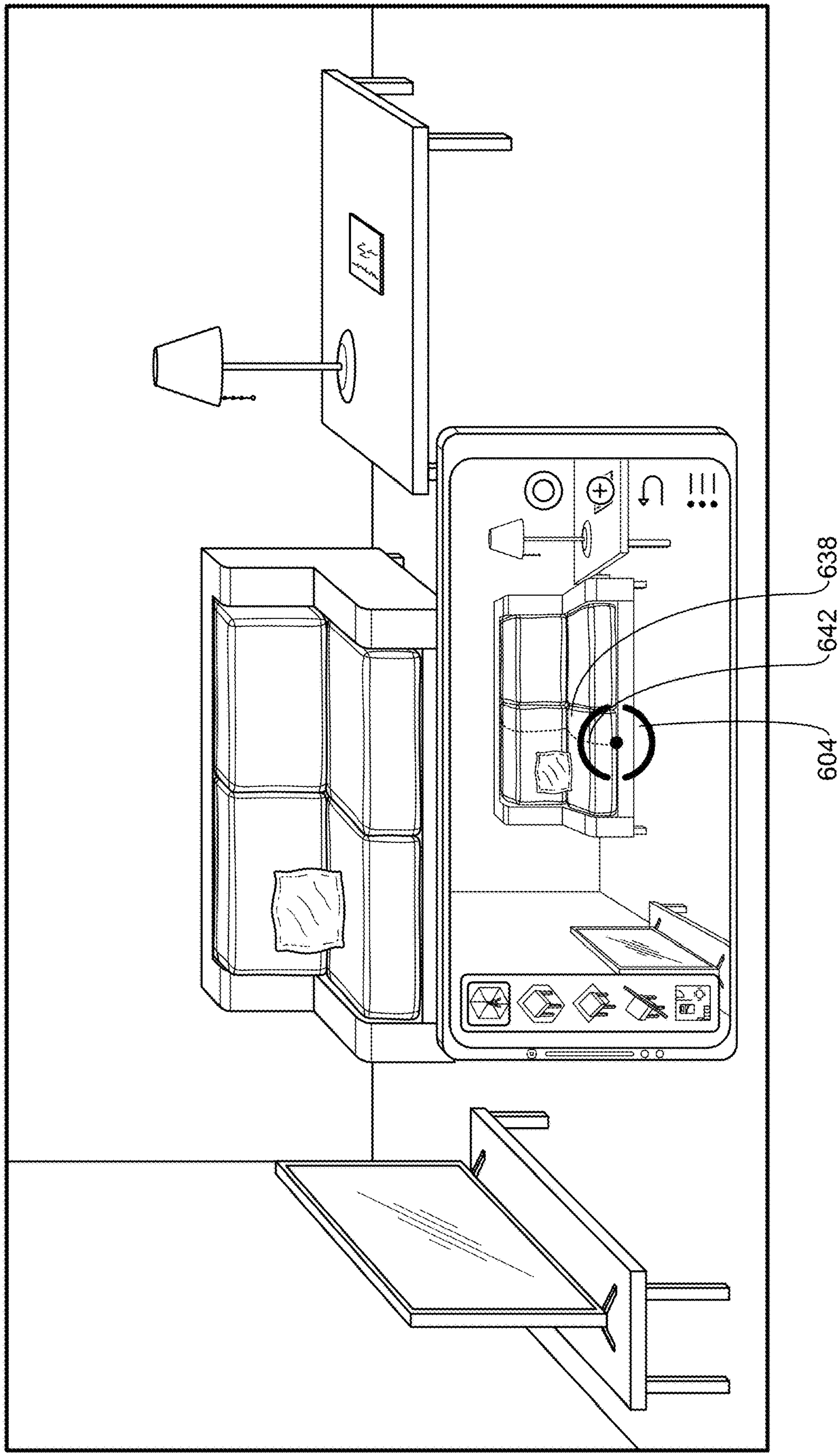
Figure 6E:
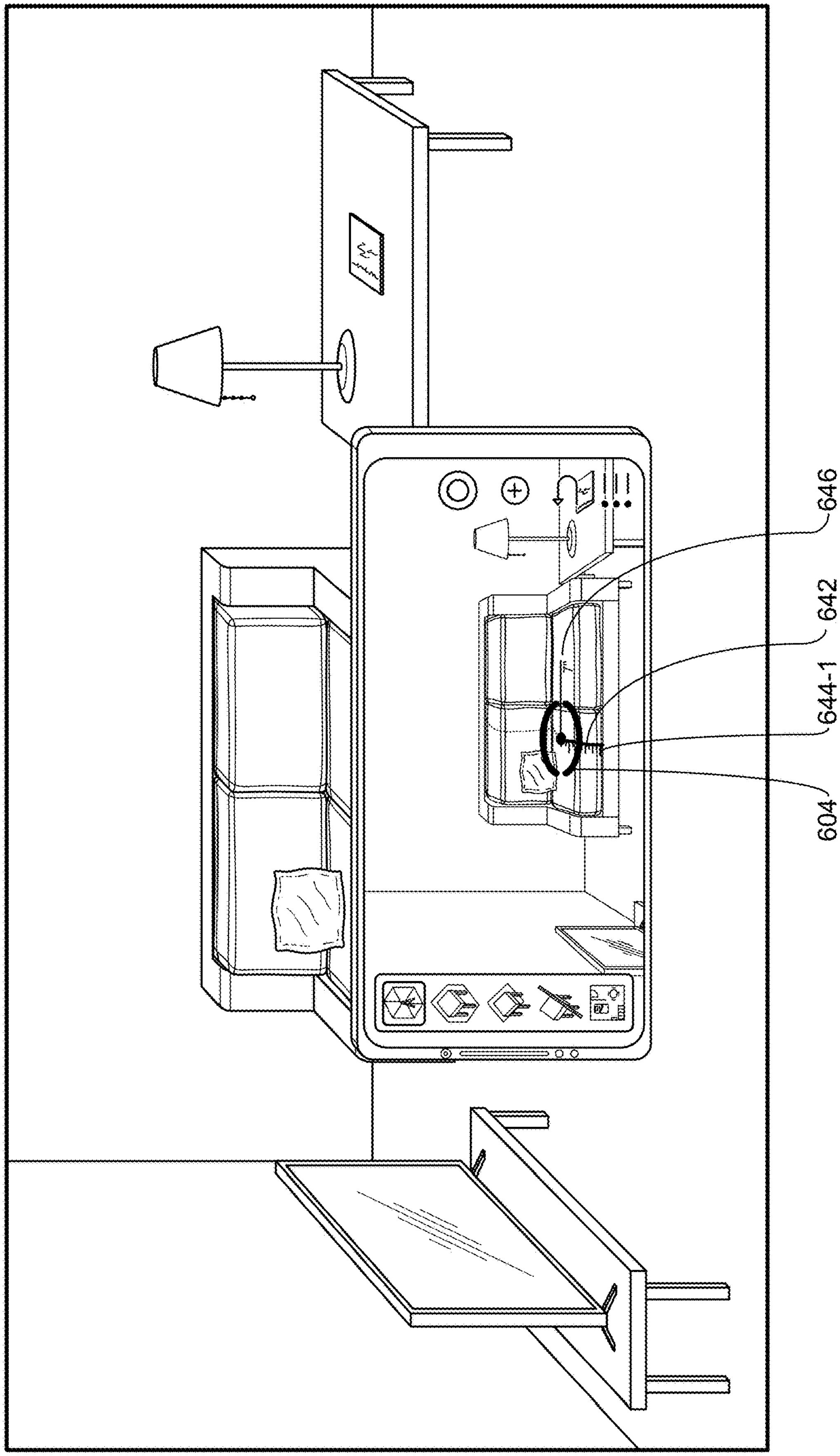
Figure 6F:
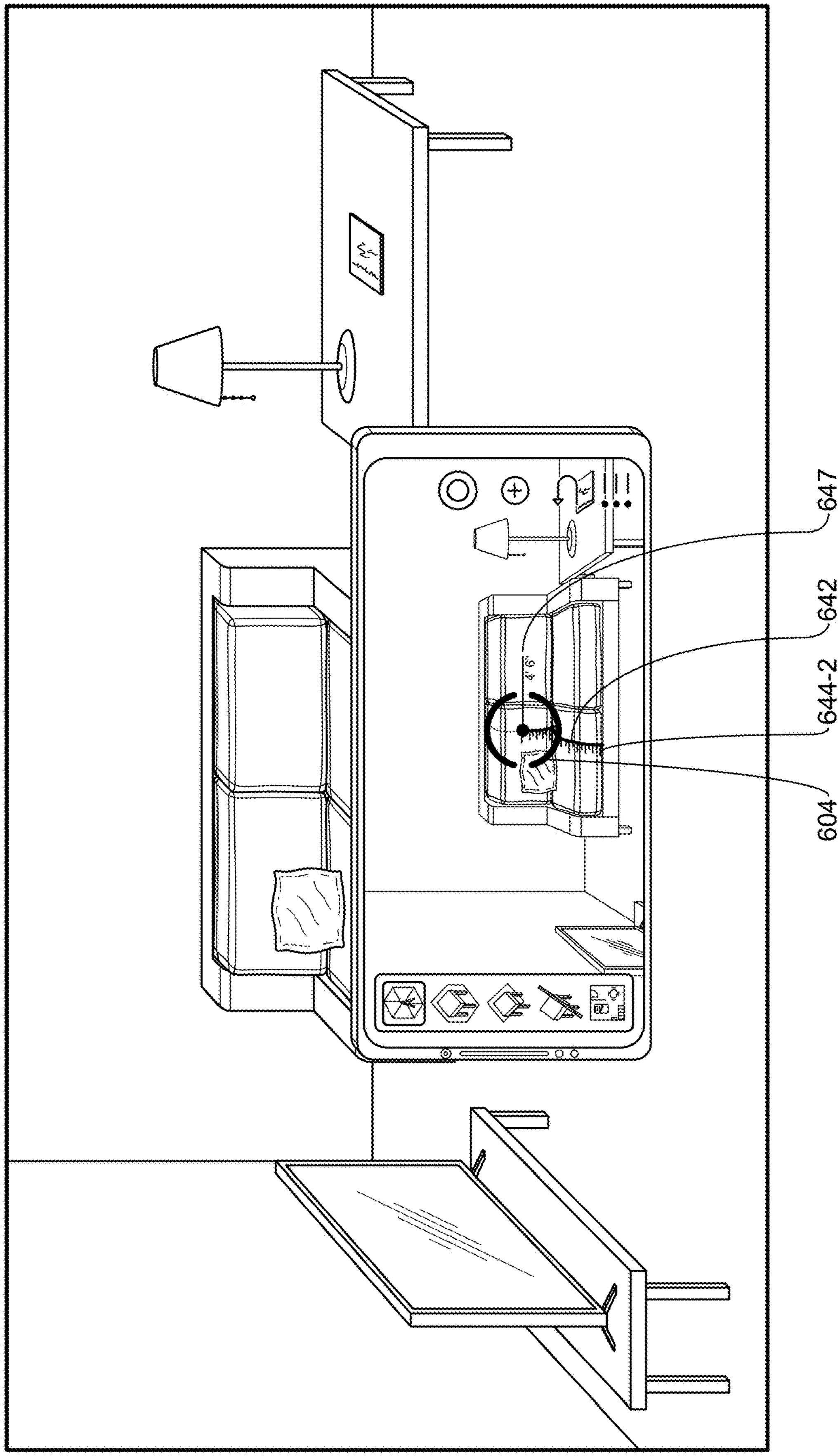
Figure 6G:
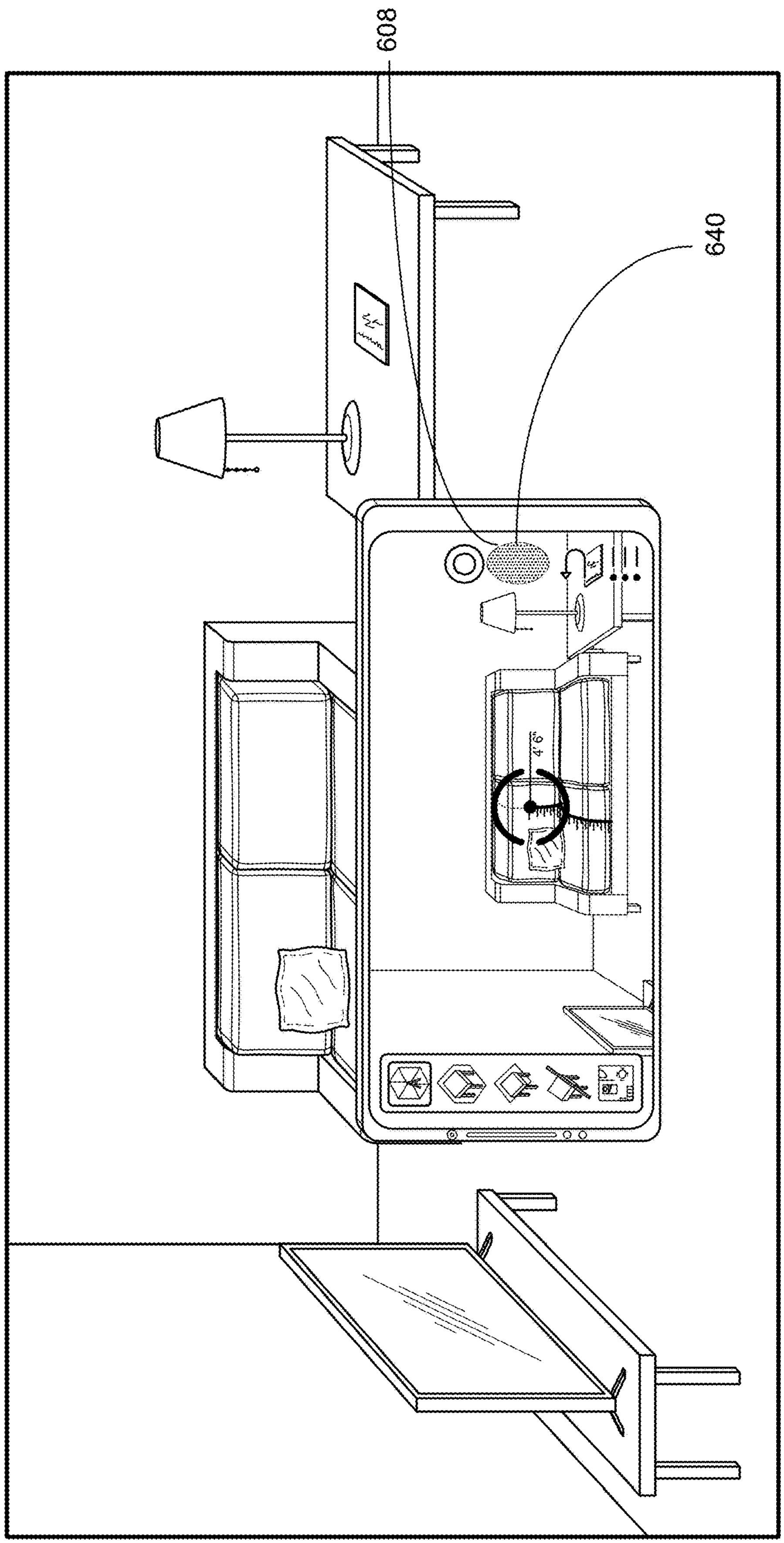
Figure 6H:
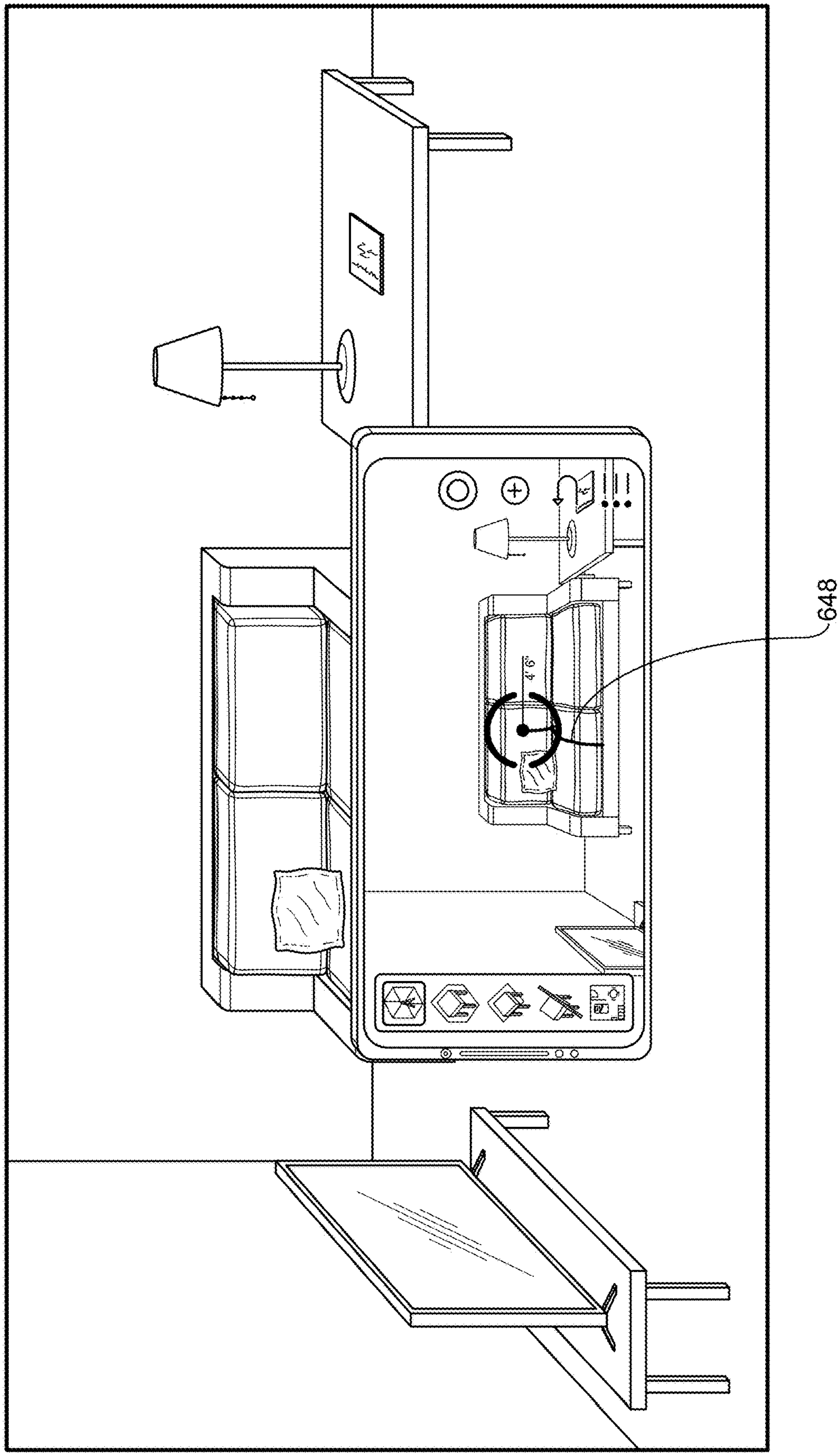
Figure 6I:
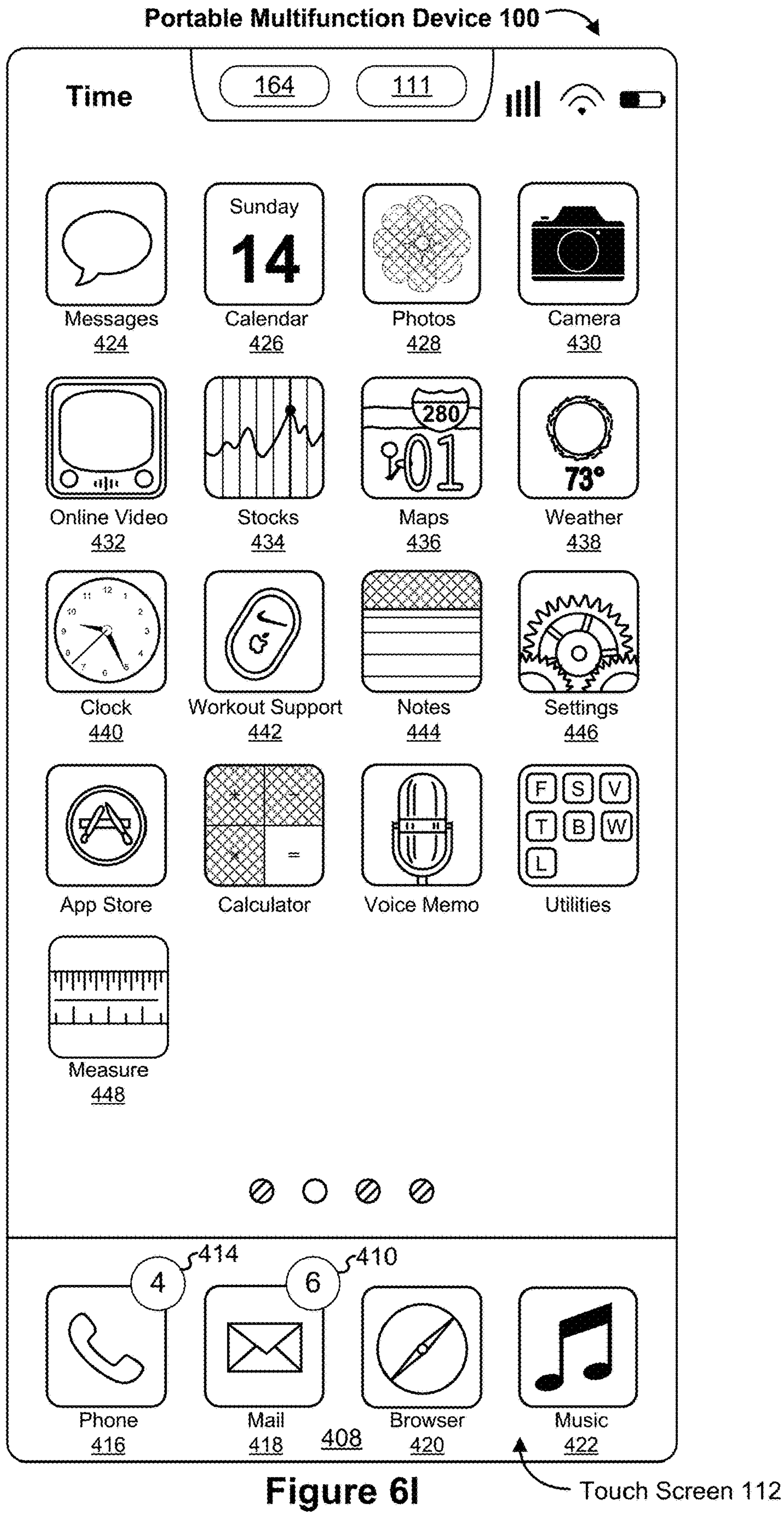
Figure 6J:
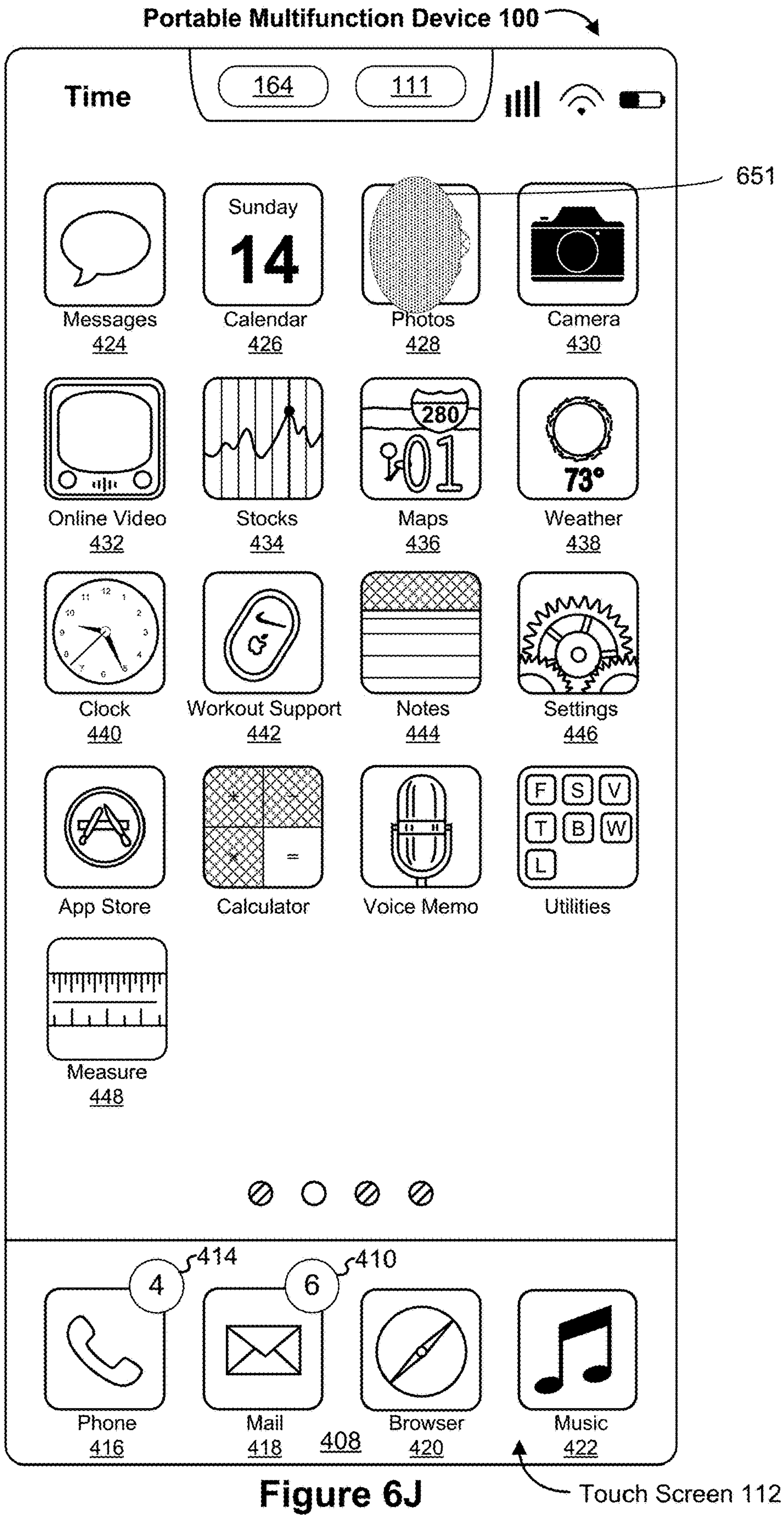
Figure 6K:
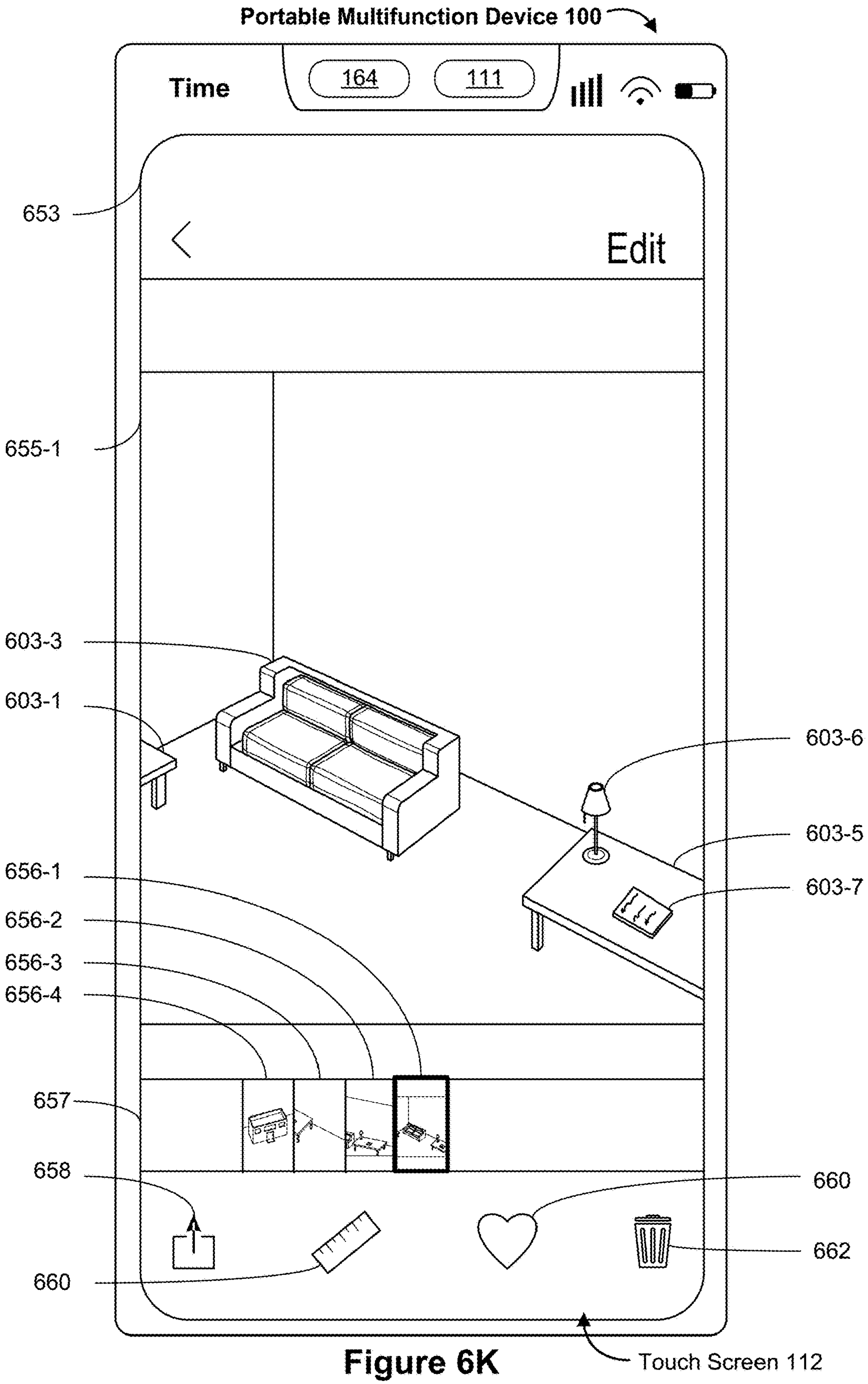
Figure 6L:
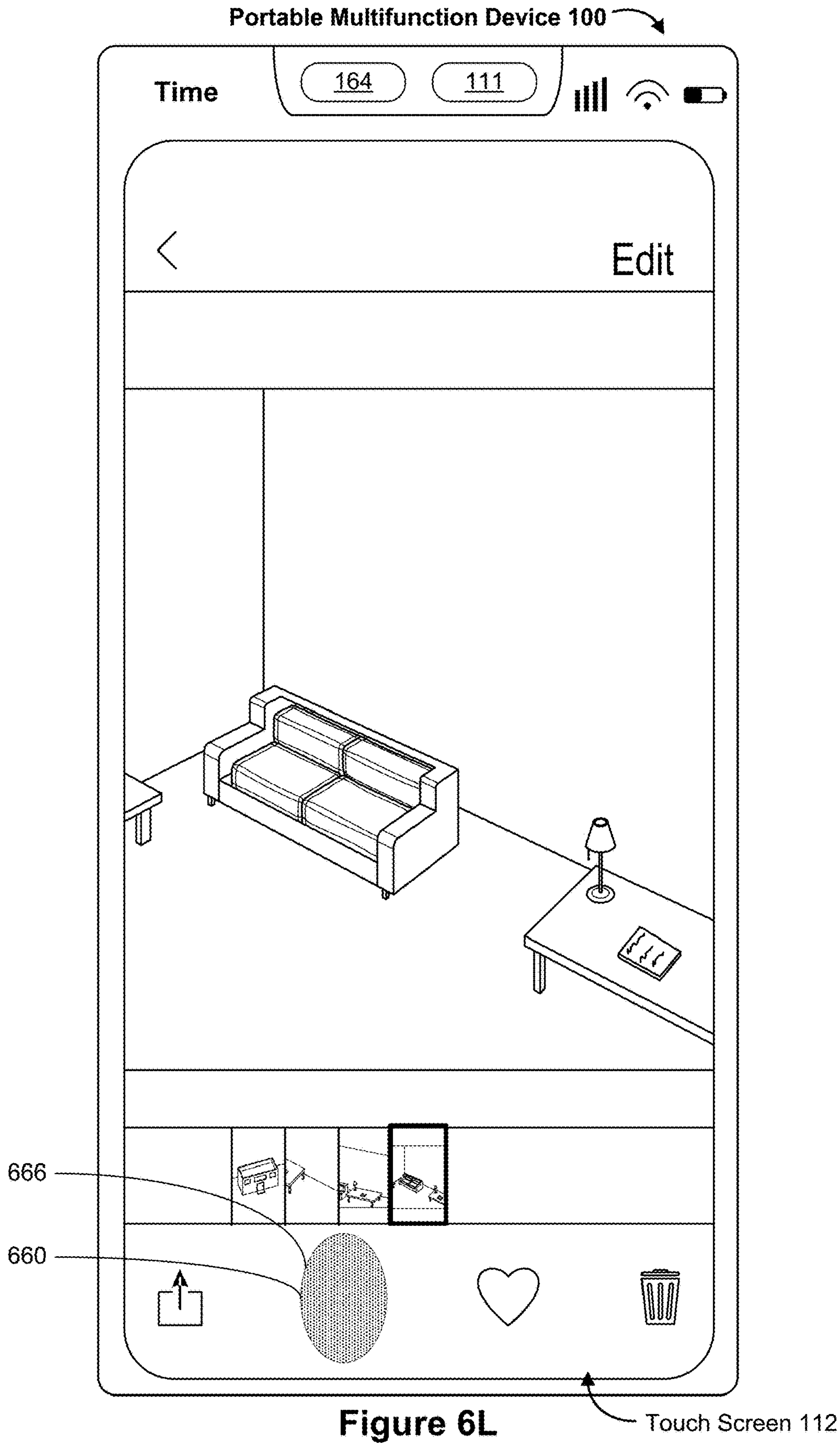
Figure 6M:
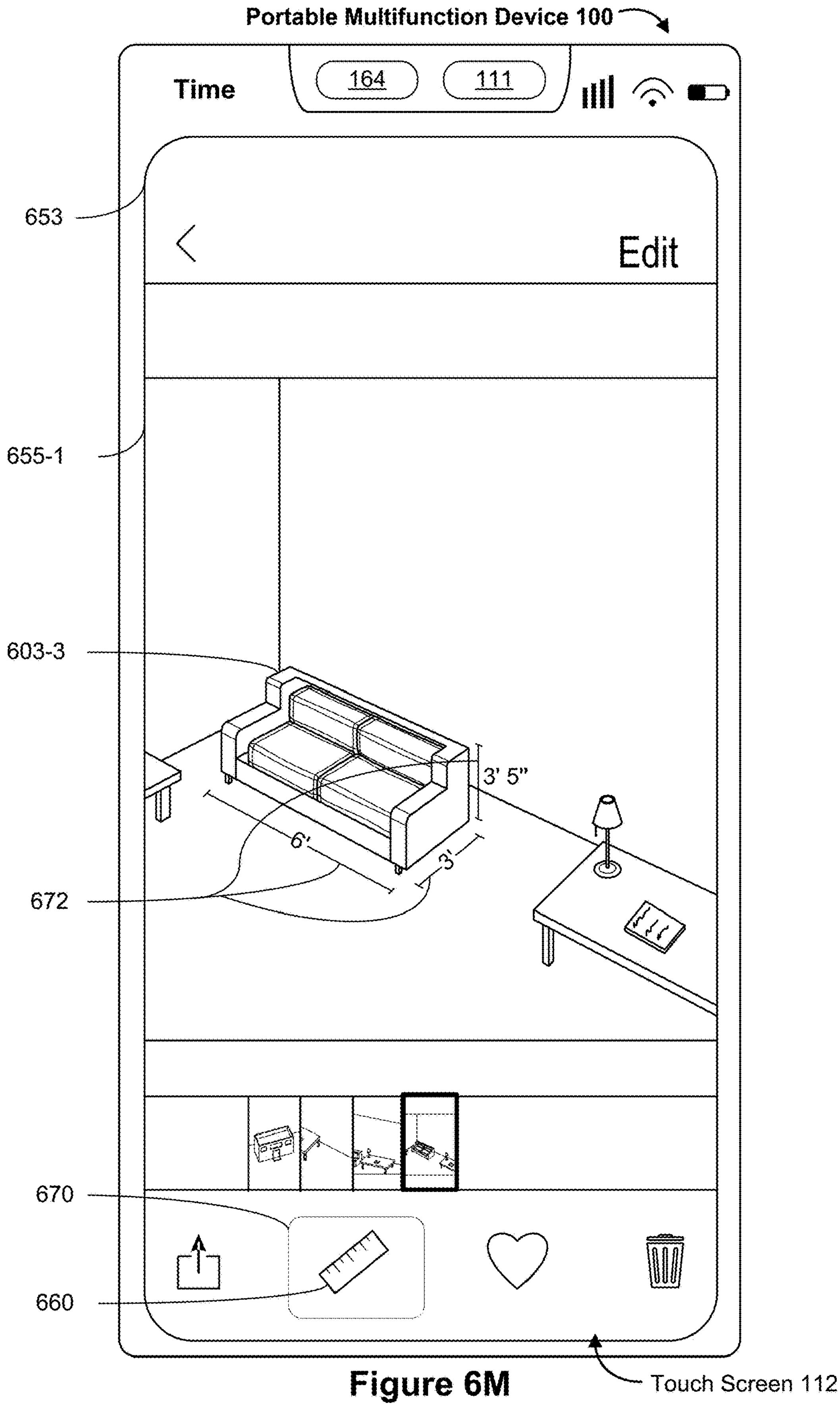
Figure 6N:
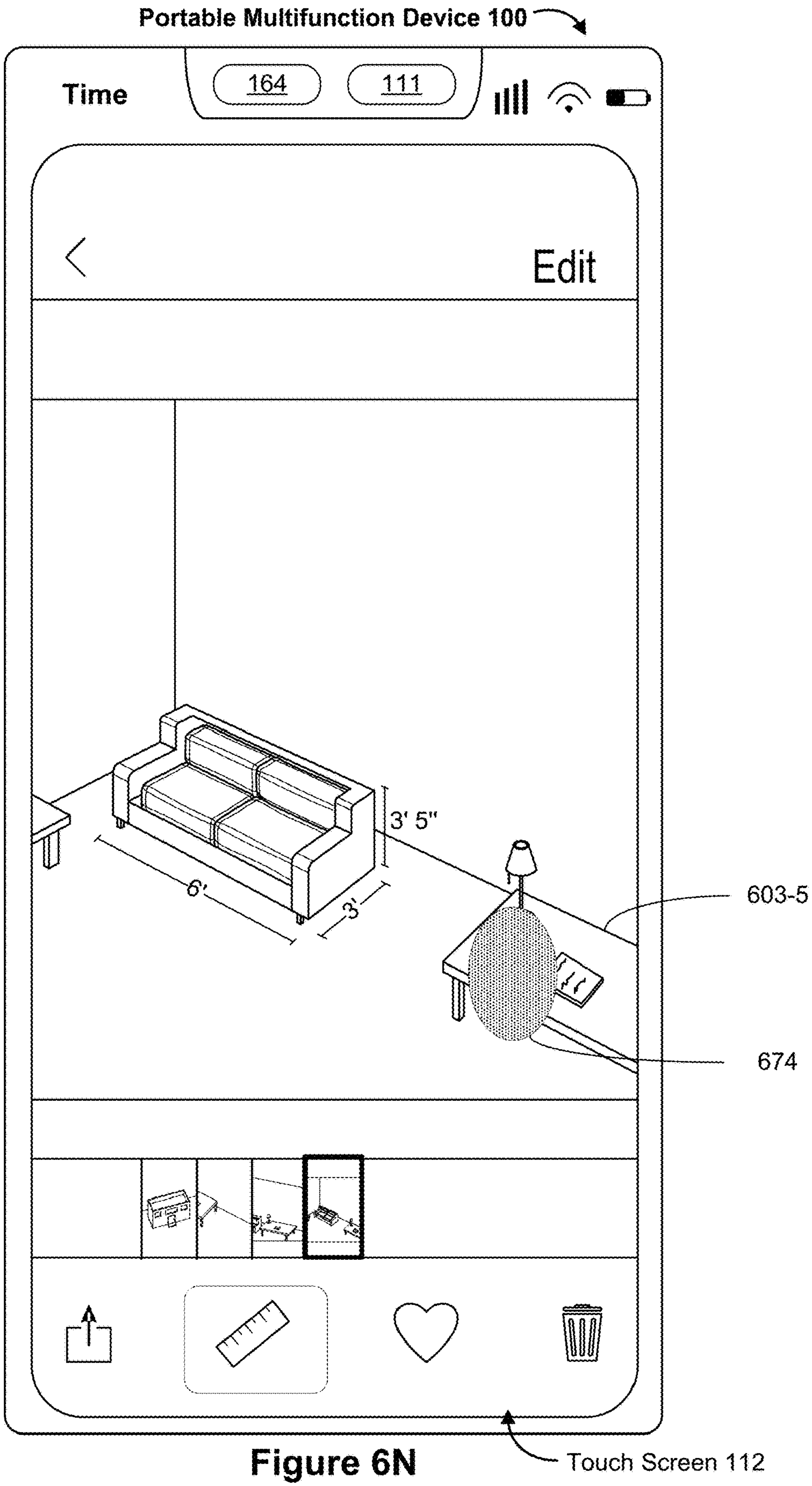
Figure 6O:
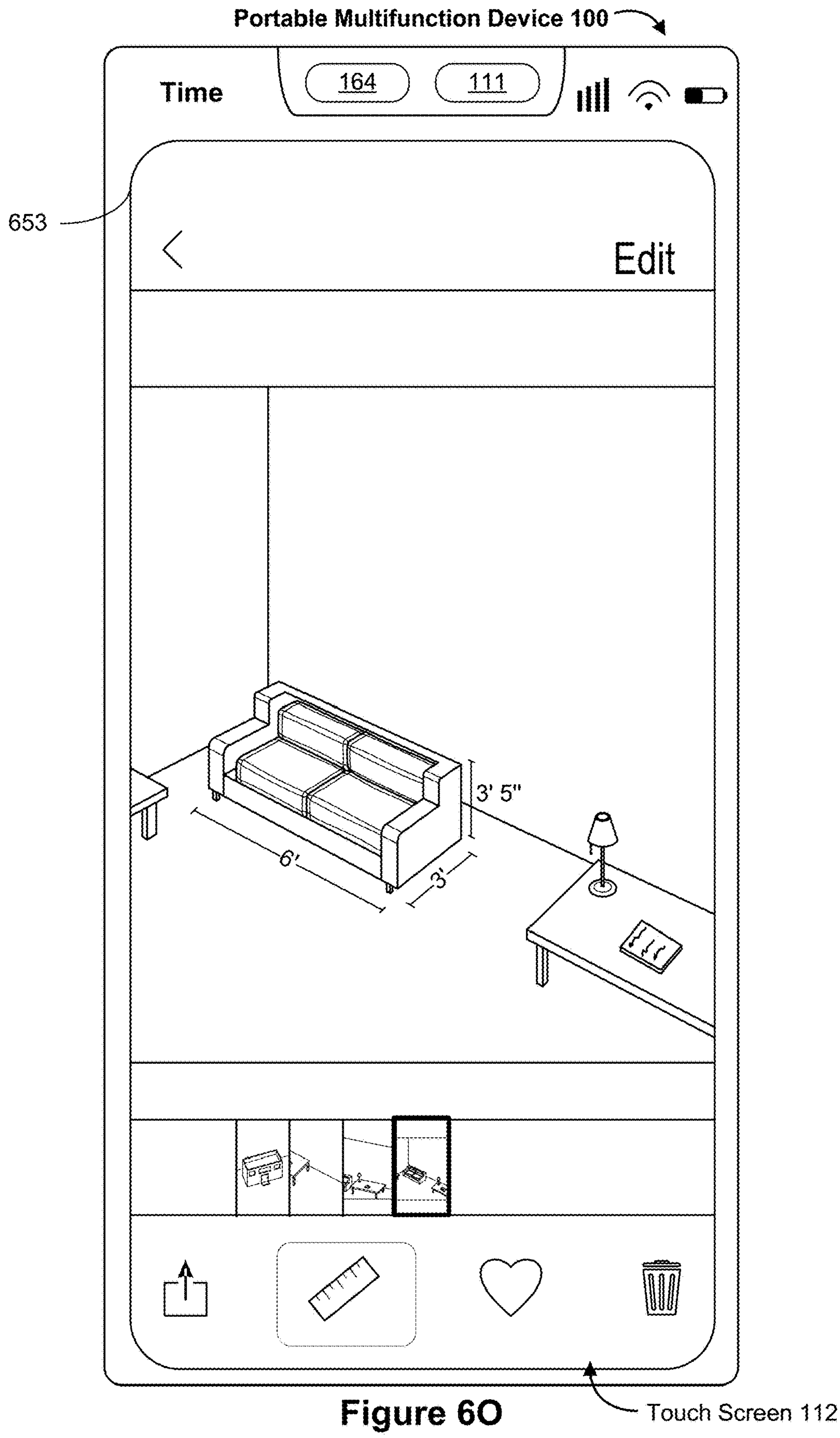
Figure 6P:
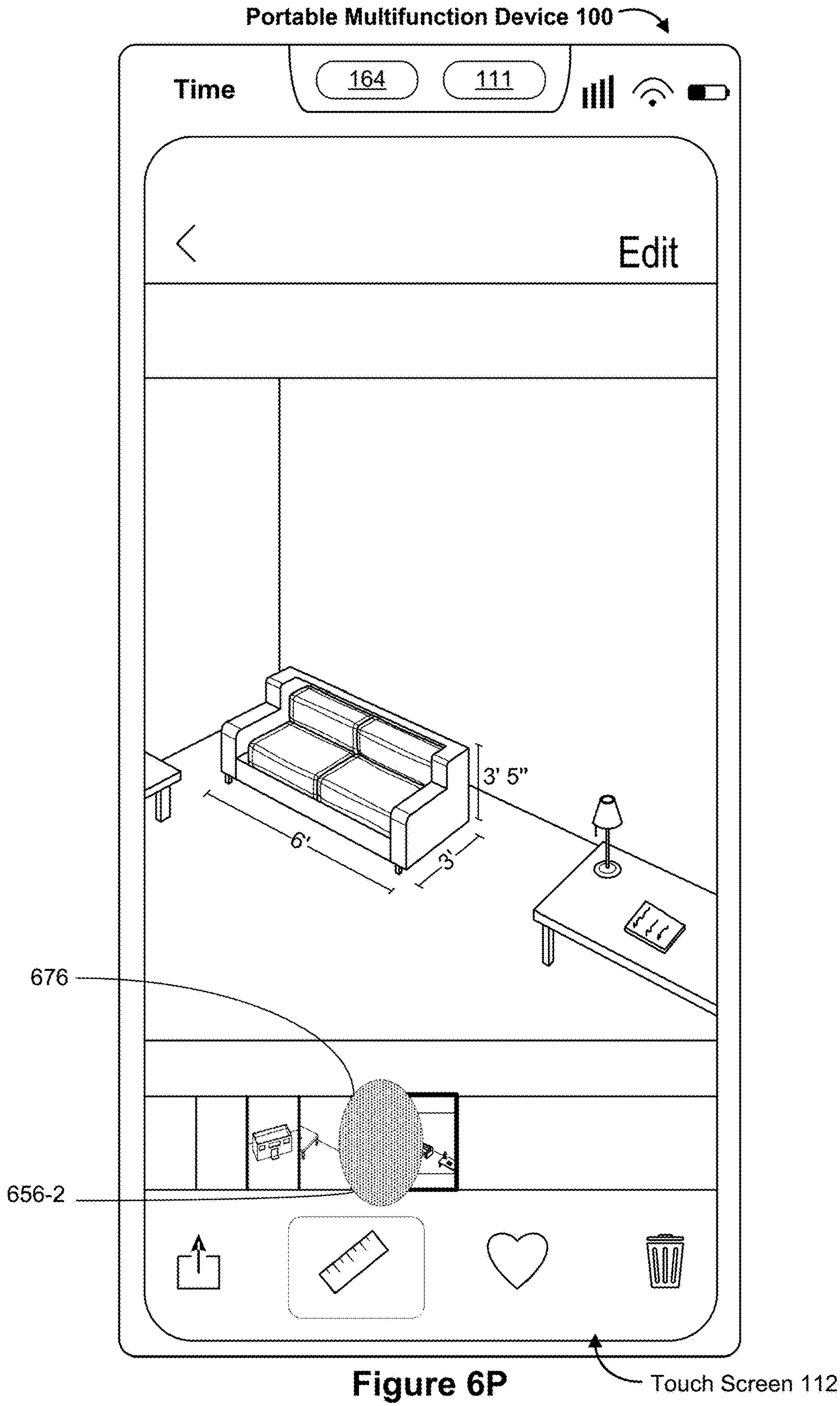
Figure 6Q:
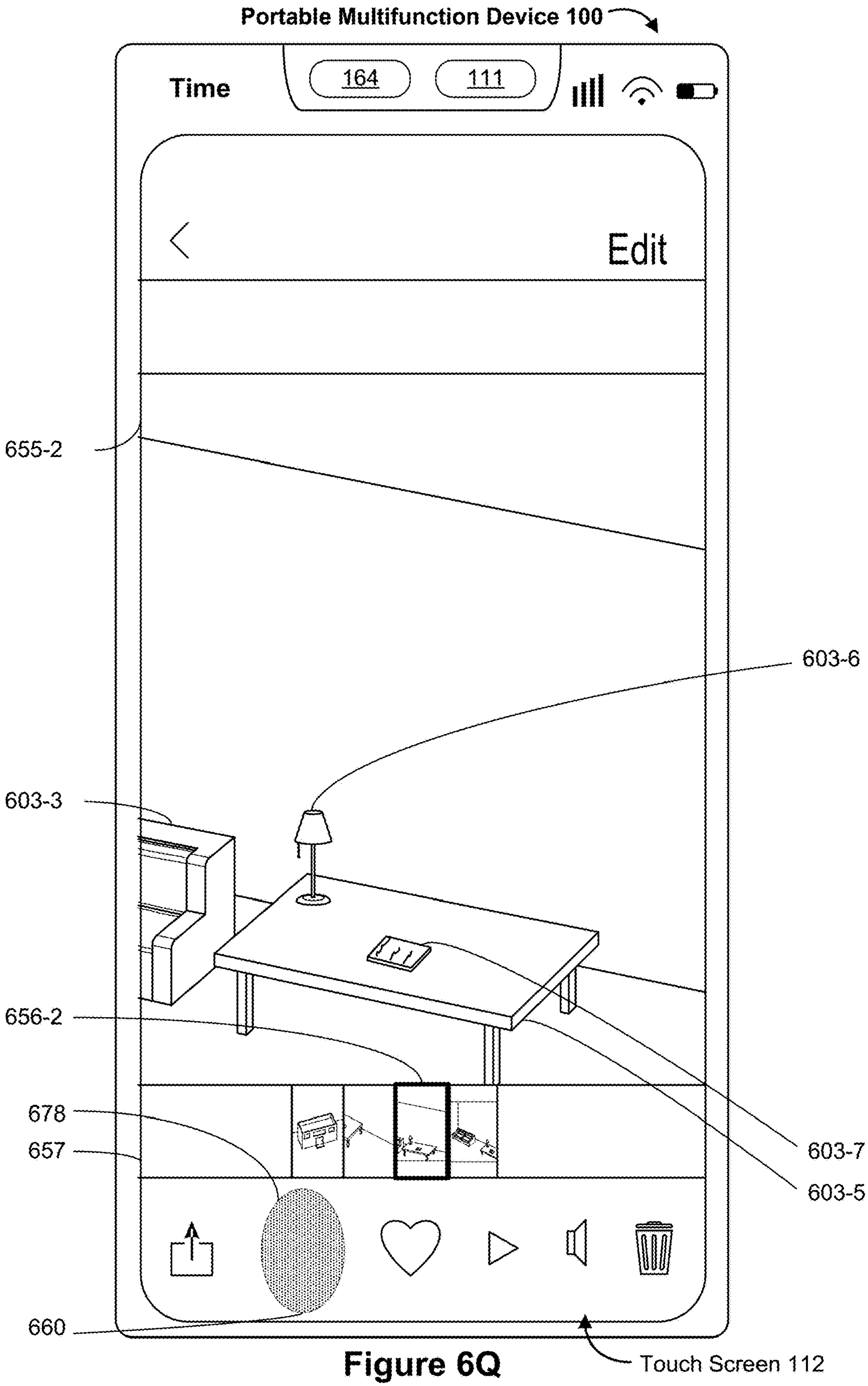
Figure 6R:
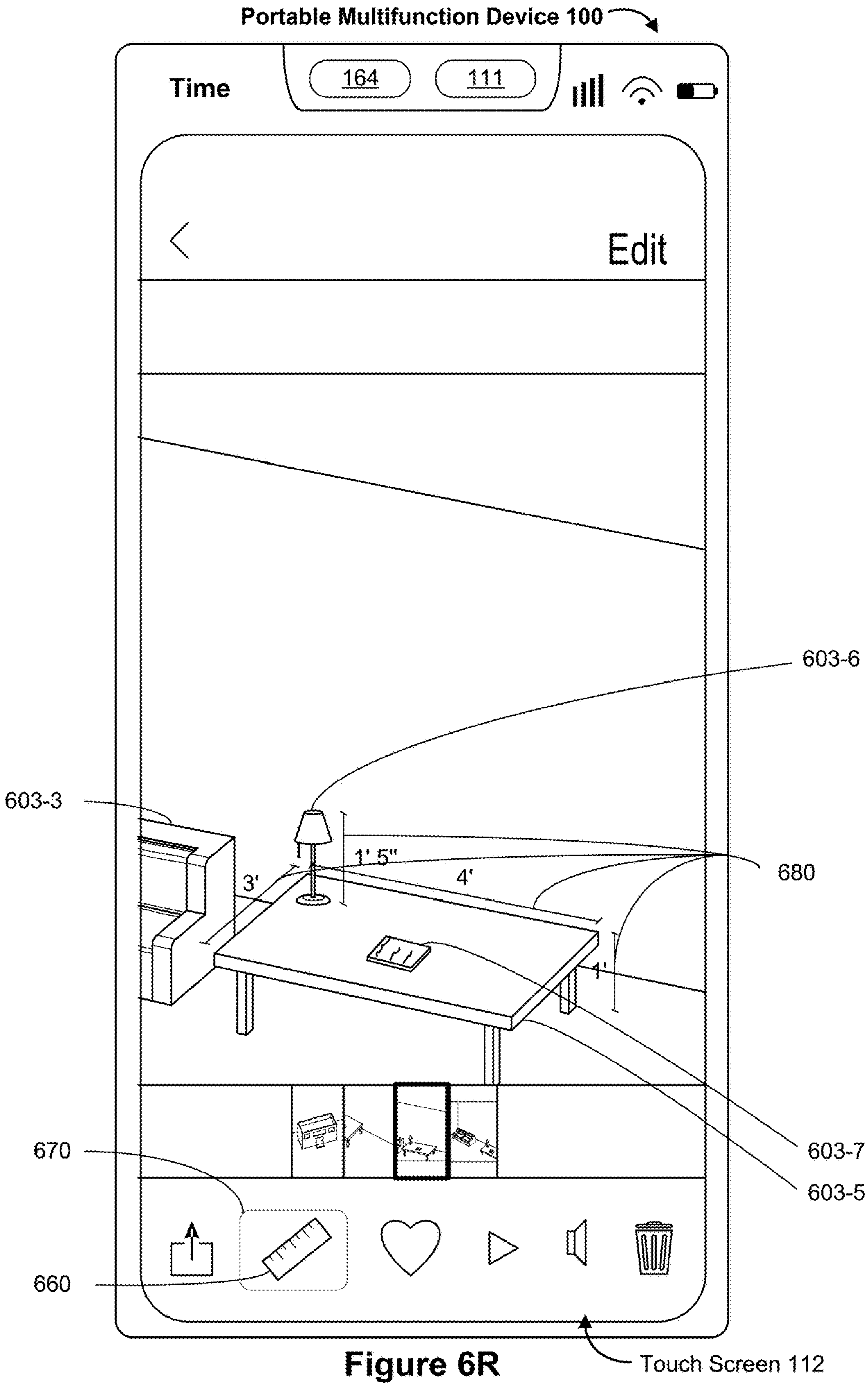
Figure 6S:
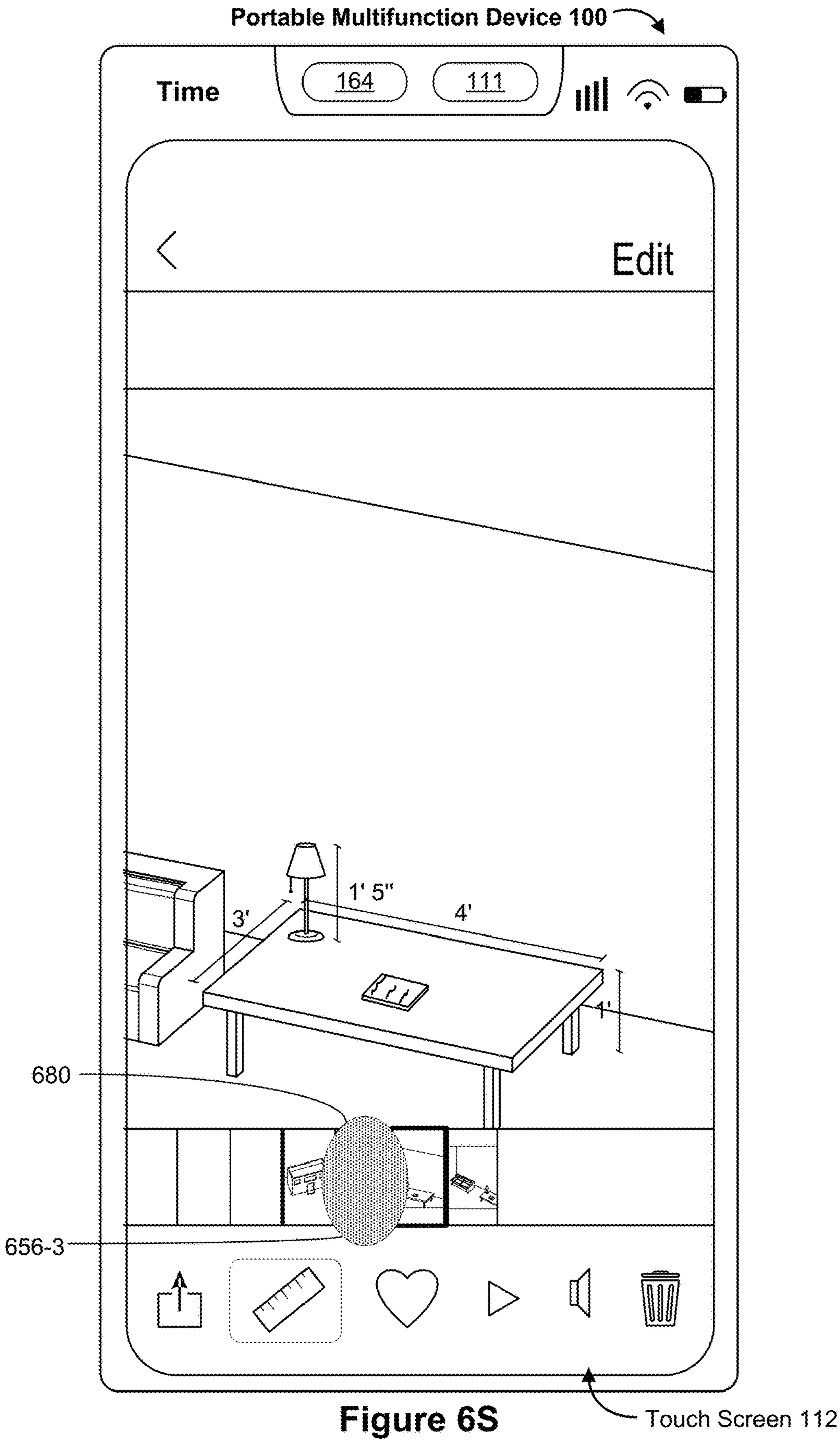
Figure 6T:
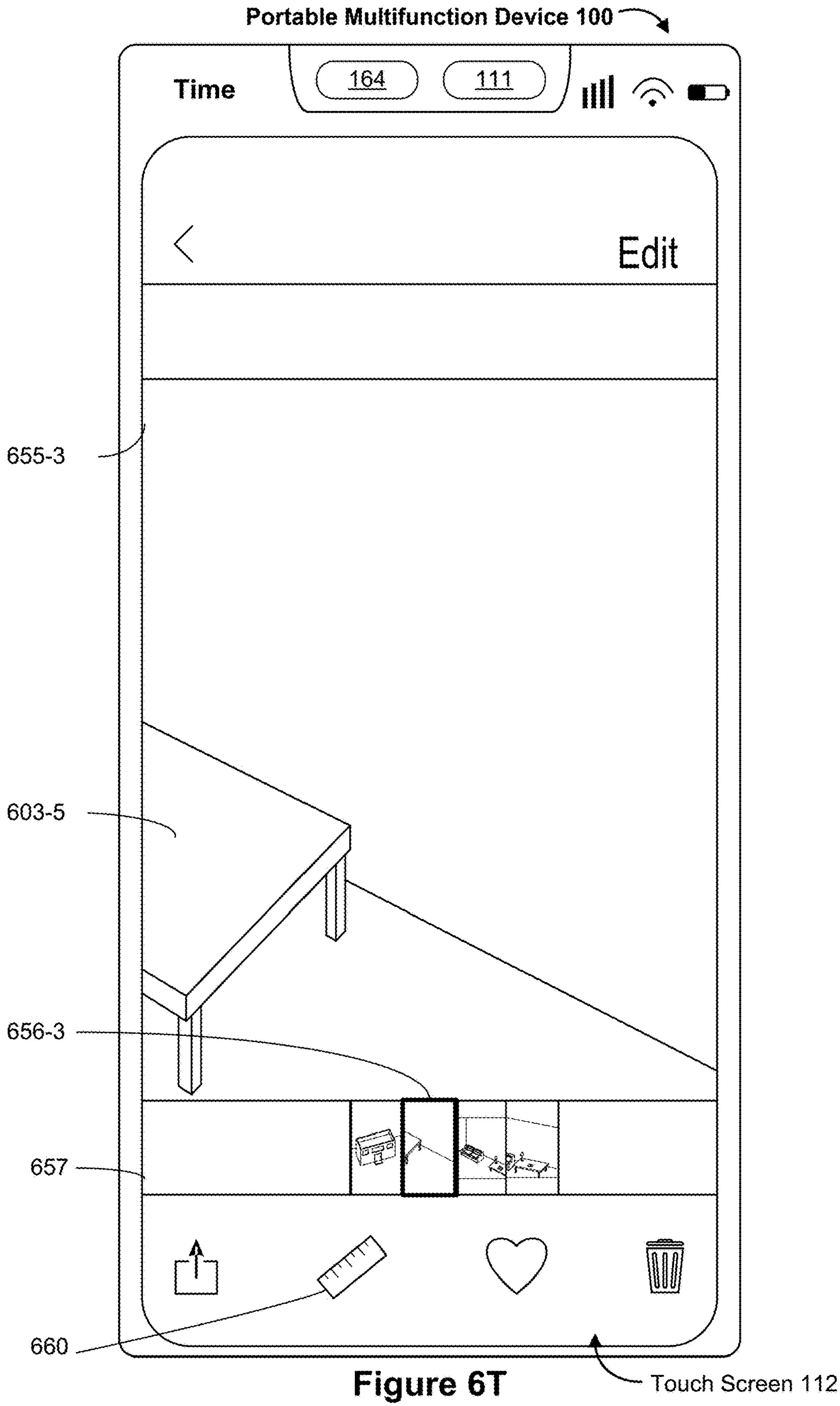
Figure 6U:
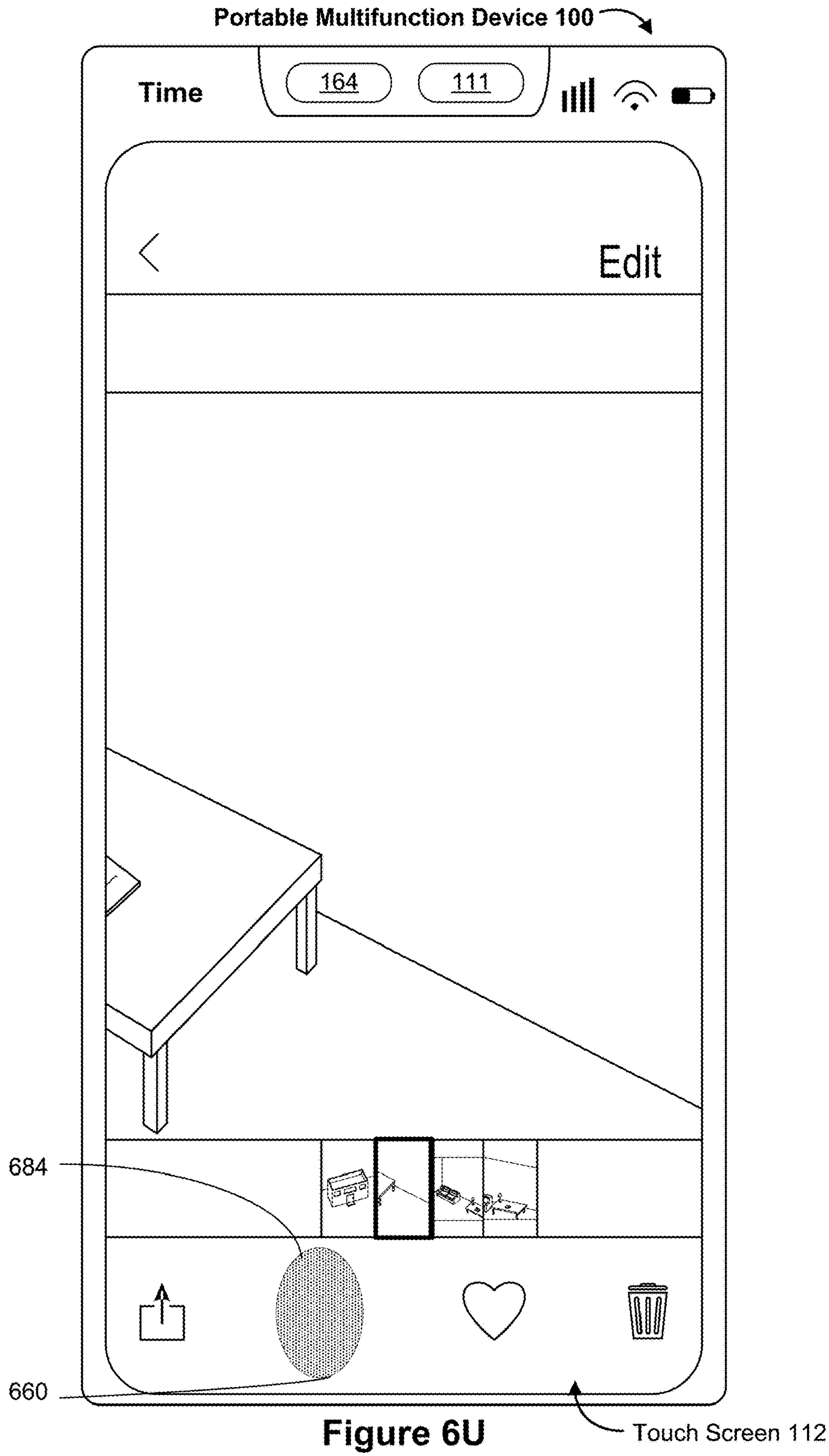
Figure 6V:
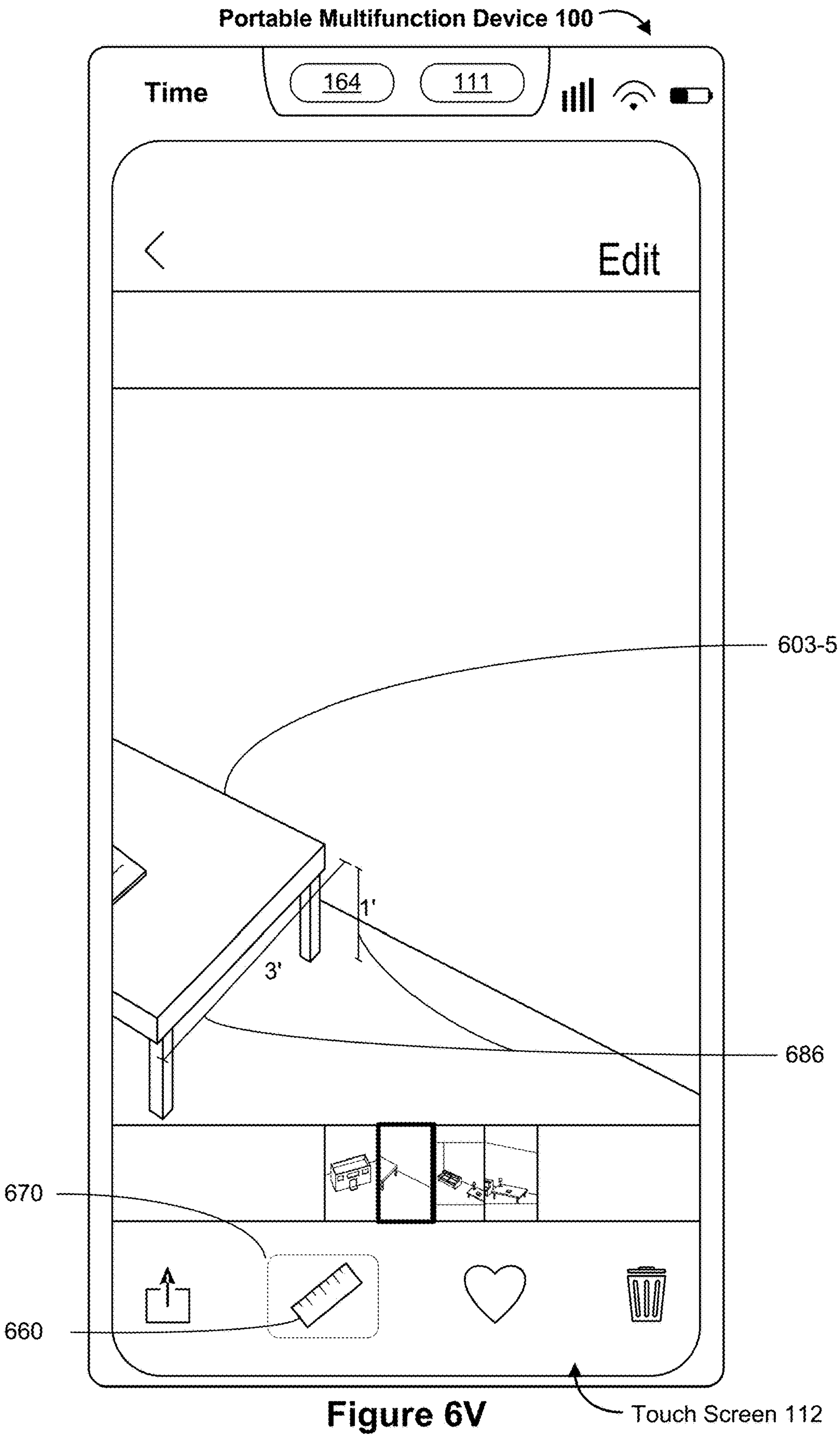
Figure 6W:
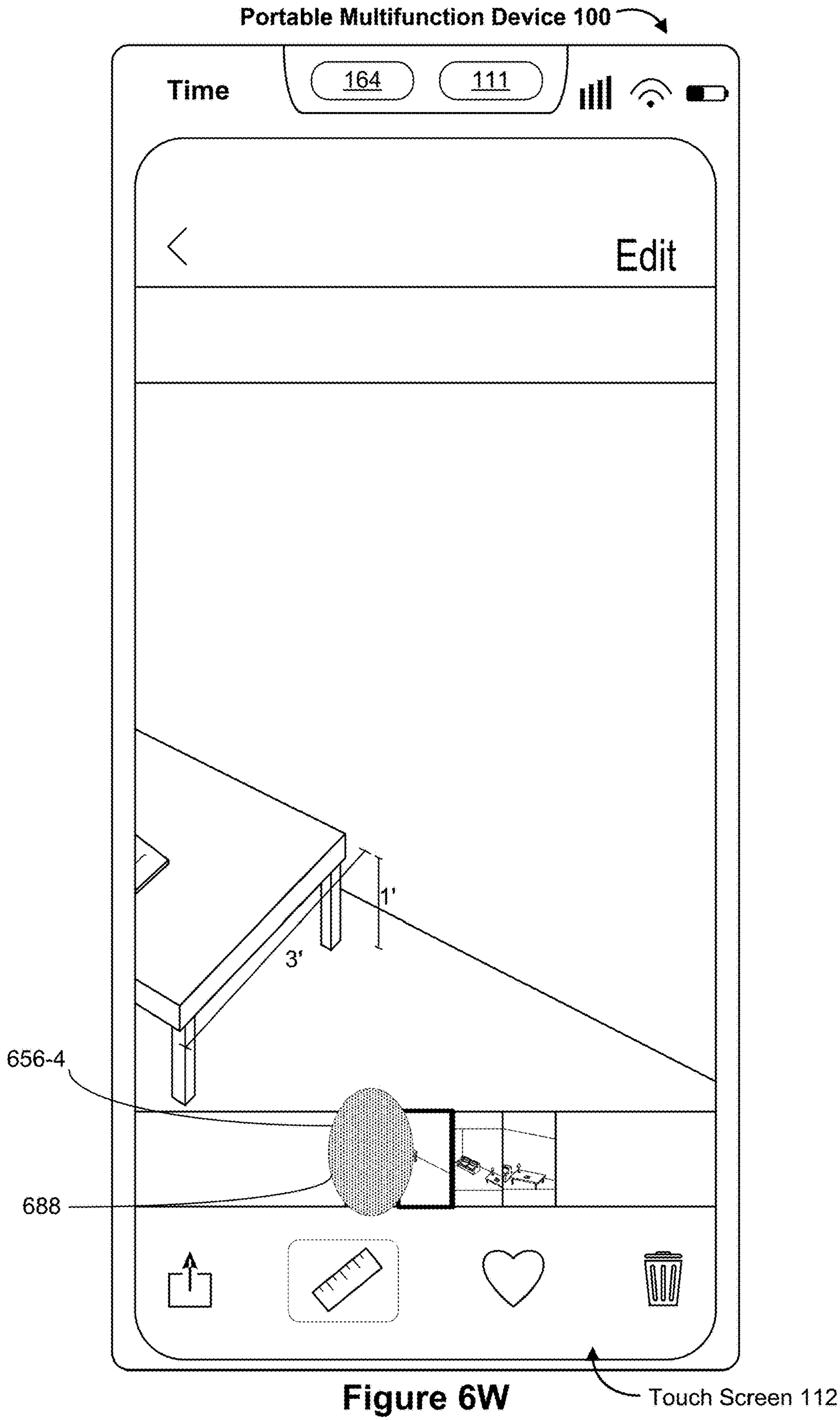
Figure 6X:
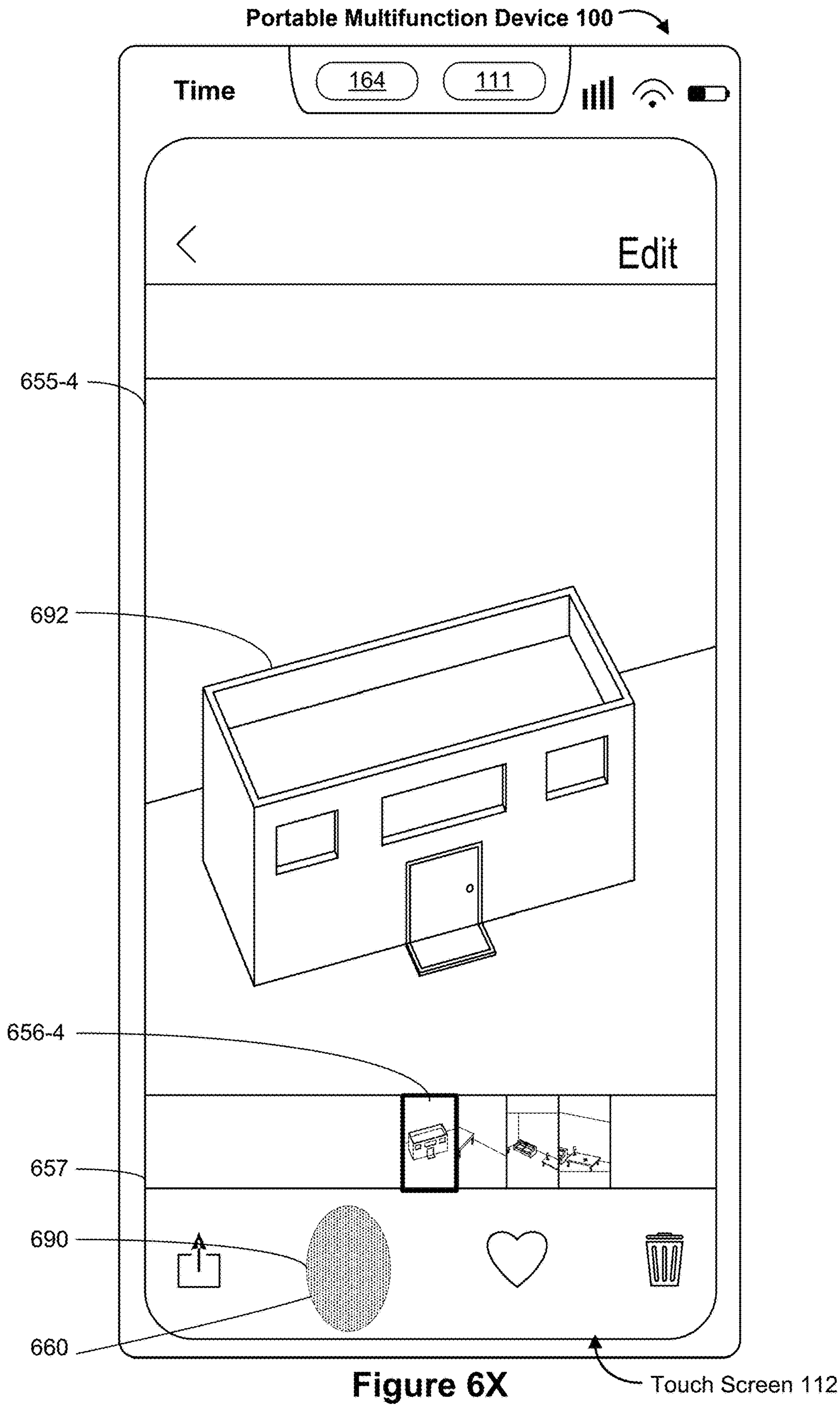
Figure 6Y:
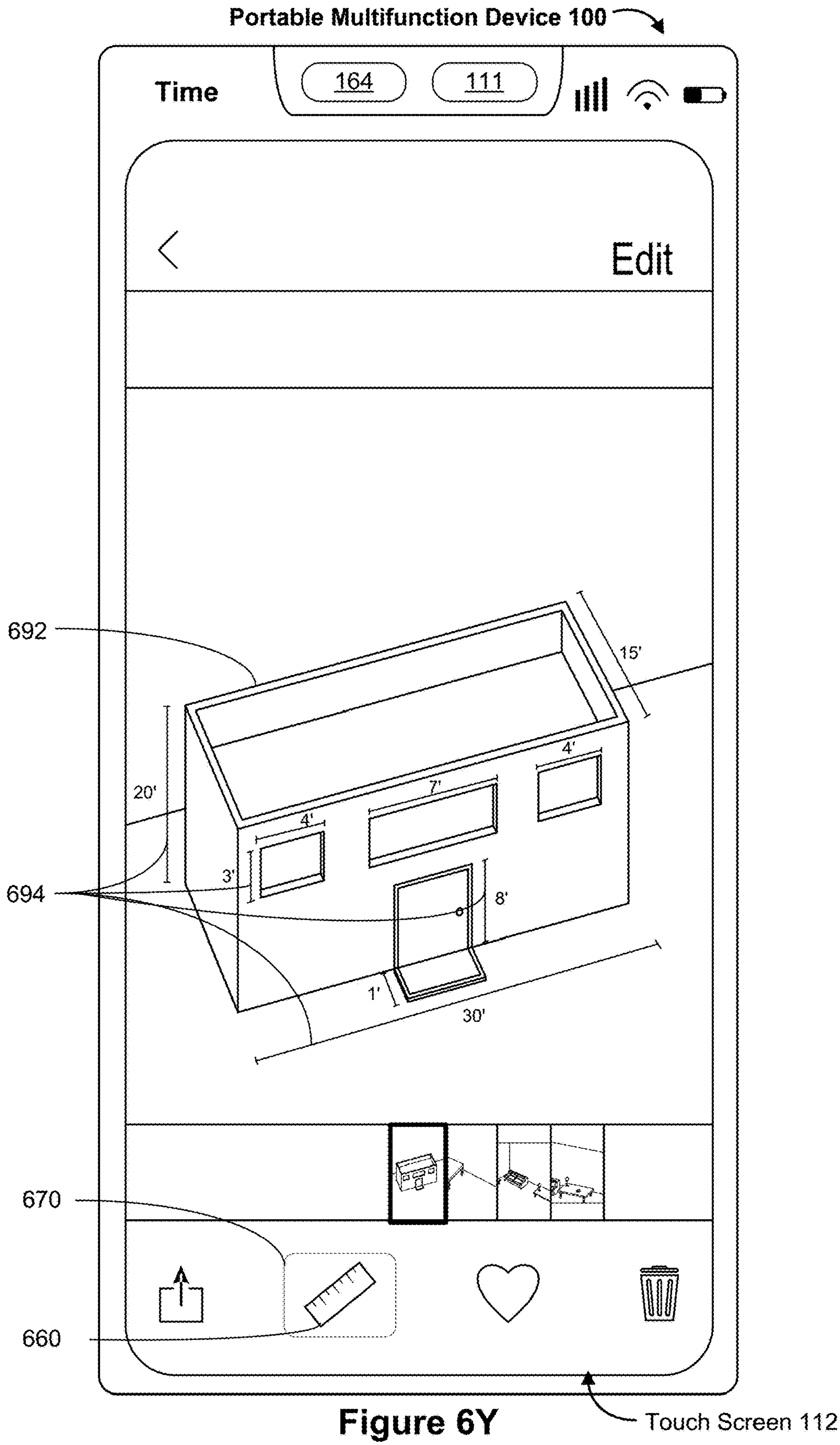

FIGS. 6A-6Y illustrate example user interfaces for measuring non-linear surfaces (e.g., curved surfaces) and for retrieving measurement information from previously captured media items in accordance with some embodiments.

FIG. 6A shows selection, via input 650 of an automatic measurement mode icon 605-1. The automatic measurement mode icon 605-1, when selected, can cause the portable multifunction device 100 to automatically detect the surface or object a reticle is overlaying (e.g., a three-dimensional object, a two-dimensional surface, etc.), and based on that determination, the device can automatically indicate that the surface or object is measurable. A three-dimensional measurement mode icon 605-2, a two-dimensional surface measurement mode icon 605-3, and a point-to-point measurement mode icon 605-4, when selected allows the user to measure in either three-dimensions (e.g., length, width, and height), two dimensions (e.g., two dimensions selected from either length, width, or height), or from one point to another point (e.g., the length of an edge of a table), respectively. In some embodiments, the is also a floor plan measurement mode icon 605-5, which when selected, allows the user to scan the three-dimensional physical environment 601 to produce a floor plan (e.g., a bird's eye-view). In some embodiments, any combination of these mode icons may displayed. For example, in some embodiments, only the automatic mode and the floor plan mode may be displayed. In some embodiments, additional modes icons may be added, such as a curved surface mode.

FIG. 6B shows the some aspects of the device's operation after the automatic measurement mode icon 605-1 has been selected. FIG. 6B shows that the portable multifunction device 100 is displaying an augmented reality view 600. The augmented reality view 600 is created based on a three-dimensional physical environment 601 that is in the field of view of the one or more optical sensors 164. This augmented reality view 600 is used to display annotations (e.g., measurements, bounding boxes, etc.) on or near objects found in the three-dimensional physical environment 601.

FIG. 6B, also shows that the three-dimensional physical environment 601 includes a plurality of items, such as a TV stand 602-1, a TV (and/or any other type of display) 602-2, a couch 602-3, a pillow 602-4, a table 602-5, a lamp 602-6, and a magazine 602-7. The augmented reality view 600 includes corresponding representations of the plurality of items shown in the three-dimensional physical environment 601. In this example, the corresponding representations of the plurality of items include representations of a TV stand 603-1, a TV 603-2, a couch 603-3, a pillow 603-4, a table 603-5, a lamp 603-6, and a magazine 603-7. The augmented reality view 600 shown on the portable multifunction device 100 has a plurality of user interface objects that overlay the augmented reality view 600. These user interface objects are used to control what is displayed in the augmented reality, and to also aid the user in taking and overlaying measurements (e.g., metrics) of the objects shown in the three-dimensional physical environment 601. In some embodiments, one of the user interface objects is an annotation placement user interface object, e.g., a reticle 604, which indicates to the user where the measurement, if inserted (e.g., dropped), would start.

Specifically, FIG. 6B shows that the point-to-point measurement mode icon 605-4 is now unselected and a selection indicator 635 is now over the automatic measurement mode icon 605-1. In some embodiments, a reticle 604 is visually altered depending on which mode the user has selected, which illustrates to the user which mode is currently in use. FIG. 6B also shows a partial curved guide 636 conforming to a couch cushion's surface 638, following the surface in three-dimensional space.

FIG. 6C shows, while the automatic measurement mode icon 605-1 is selected, an input 640 over the measurement lock-in user interface object 608.

FIG. 6D shows the response to the input 640 over the measurement lock-in user interface object 608. In response to the input 640 over the measurement lock-in user interface object 608, the partial curved guide 636 conforming to the couch cushion's surface 638 is replaced with a complete curved guide 642. This curved guide 642 is suitable for making a measurement along the curved surface of the couch, with the curved guide 642 draping over the surface conforming to the curves in the surface of the couch, in contrast to a straight (e.g., linear) guide line for measuring the distance from one point to another (e.g., a curved measurement, which takes into account the irregular shape of the physical surface, will be longer than a linear point-to-point measurement).

FIG. 6E shows the reticle 604 moving along the complete curved guide 642, moving from a vertical surface or plane of in FIG. 6D to a horizontal surface or plane in FIG. 6E. Additionally, tick marks 644-1 are also, optionally, displayed along at least a portion of curved guide 642. Also, optionally, a live measurement readout 646 can also be displayed to indicate a distance from a starting point of the guide 642 to a current position of the reticle 604.

FIG. 6F shows the reticle 604 continuing to move along the complete curved guide 642, and tick marks 644-2 are displayed along the portion of curved guide 642 between a starting point of the guide and a current position of the reticle's focus point 504-1. Also, optionally, a live measurement readout 647 can also be displayed to indicate a distance from a starting point of the guide 642 to a current position of the reticle 604.

FIG. 6G shows an input 640 over the measurement lock-in user interface object 608. Such an input indicates that the measurement is complete. FIG. 6H shows the response to the input 640 over the measurement lock-in user interface object 608. Specifically, FIG. 6H shows the locked-in measurement 648, sometimes called a completed measurement.

FIGS. 6I-6Y show how measurements can be viewed within stored media items (e.g., photographs, videos, etc.). FIG. 6I shows the device 100 returning to the home screen, which includes a photos application icon 428.

FIG. 6J shows an input 651 over the media application icon 428. FIG. 6K shows that in response to the input 651 over the media application icon a photos application user interface 653 is displayed on the device 100. Within the media application user interface 653 a first media item 655-1 is selected and displayed in an expanded view. Additionally, a thumbnail scrubber bar 657 is shown below the first media item 655-1. The scrubber bar 657 is used to display thumbnail images of media items (e.g., first media item thumbnail 656-1, second media item thumbnail 656-2, third media item thumbnail 656-3, and fourth media item thumbnail 656-4). These thumbnail images correspond with first media item 655-1, second media item 655-2 (see FIG. 6Q), third media item 655-3 (see FIG. 6T), and fourth media item 655-4 (see FIG. 6X), respectively. Each one of these thumbnail images when selected causes the device 100 to display the selected media item in an expanded view.

FIG. 6K also shows a plurality of user interface objects for interacting with user interface 653. First a share button 658 is displayed for sharing media items. Second a display measurement button 660 is shown, which when selected displays all available measurements for an expanded media item. Third, a like button 660 is shown, for selecting media items that the user likes. Fourth a delete icon 662 is shown, which when selected causes the media in view (e.g., the expanded media item) to be deleted.

FIG. 6K also shows that within the first media item 655-1, a partial display of TV stand 603-1 is shown, couch 603-3 is in full view, table 603-5 is partially displayed, lamp 603-6 is in full view, and magazine 603-7 is also in full view.

FIG. 6L shows an input 666 over measurement button 660. FIG. 6M shows that in response to receiving input 666, (1) measurement button 660 is shown as being selected (e.g., activated) and (2) the first media item 655-1 is overlaid with all available measurements, e.g., measurements based on the first media item including information, such as depth information, about physical features in the portion of the physical environment represented by the first media item. In some embodiments, the measurement button 660 can be toggled on and off, to either display or hide the available measurements. Specifically, measurement button 660 is now surrounded by a selection indicator 670. The available measurements for the first media item include the couch's measurements 672.

FIG. 6N shows an input 674 over the table 603-5 to bring up additional measurements. FIG. 6O shows that in response to input 674 no additional measurements are shown within the media application user interface 653. In some embodiments, since all measurements are displayed when the measurement button 660 is selected, no additional measurements are shown in response to input 674.

FIG. 6P shows an input 676 over second media item thumbnail 656-2 to bring up second media item 655-2 in an expanded state. FIG. 6Q shows second media item 655-2 replacing display of first media item 655-1. Additionally, the measurement button 660 becomes deactivated when another media item is displayed. In some embodiments, optionally, the measurement button 660 can be persistently activated when changing through media items (e.g., available measurements will be displayed automatically when respective media items are selected). FIG. 6Q also shows an input 678 over the measurement button 660 to cause display of measurements in second media item 655-2. Second media item 655-2 is a media item corresponding to a different portion of the same physical environment as first media item 655-1. Second media item 655-2 includes a partial display of couch 603-3, and full views of table 603-5, lamp 603-6, and magazine 603-7. FIG. 6Q also shows that the scrubber bar 657 has scrolled from its position in FIGS. 6K-6P to show that second media item thumbnail 656-2 is selected.

FIG. 6R shows that in response to input 678, the available measurements in second media item 655-2 are displayed. In this second media item 655-2, the media item includes information, such as depth information, sufficient to determine measurements 680 of only the table 603-5 and lamp 603-6. FIG. 6R also shows the measurement button 660 is now surrounded by a selection indicator 670.

FIG. 6S shows an input 682 over third media item thumbnail 656-3 to bring up third media item 655-3 in an expanded state. FIG. 6T shows third media item 655-3 replacing display of second media item 655-2. Additionally, the measurement button 660 becomes deactivated when another media item is displayed. In some embodiments, optionally, the measurement button 660 can be persistently activated when changing through media items (e.g., available measurements will be displayed at automatically when respective media items are selected). Third media item 655-3 is a media item of another portion of the same physical environment as first media item 655-1 and second media item 655-2. Third media item 655-3 includes a partial display of table 603-5 and does not include the other objects shown in the first media item 655-1 and second media item 655-2. FIG. 6T also shows that the scrubber bar 657 has scrolled to a new position to show that third media item thumbnail 656-3 is selected.

FIG. 6U also shows an input 684 over the measurement button 660 to cause display of measurements in third media item 655-2. FIG. 6V shows that in response to input 684, the available measurements are displayed. Third media item 655-3 includes information, such as depth information, sufficient to determine measurements for only part of the table 603-5, enabling measurements 686 of table 603-5 to be determined and displayed in response to input 684. FIG. 6V also shows the measurement button 660 is now surrounded by a selection indicator 670.

FIG. 6W shows an input 688 over fourth media item thumbnail 656-4 to bring up fourth media item 655-4 in an expanded state. FIG. 6X shows fourth media item 655-4 replacing display of third media item 655-3. Fourth media item 655-4 is a media item of a different physical environment than the physical environment of the first media item 655-1, second media item 655-2, and third media item, 655-3. Fourth media item 655-4 includes display of building 692.

FIG. 6Y shows that in response to input 690, the available measurements are displayed. In this fourth media item 655-4, information, such depth information, regarding physical features of building 692 is recorded, enabling measurements 694 to be determined and displayed. FIG. 6Y also shows the measurement button 660 is now surrounded by a selection indicator 670.

Figure 7A:
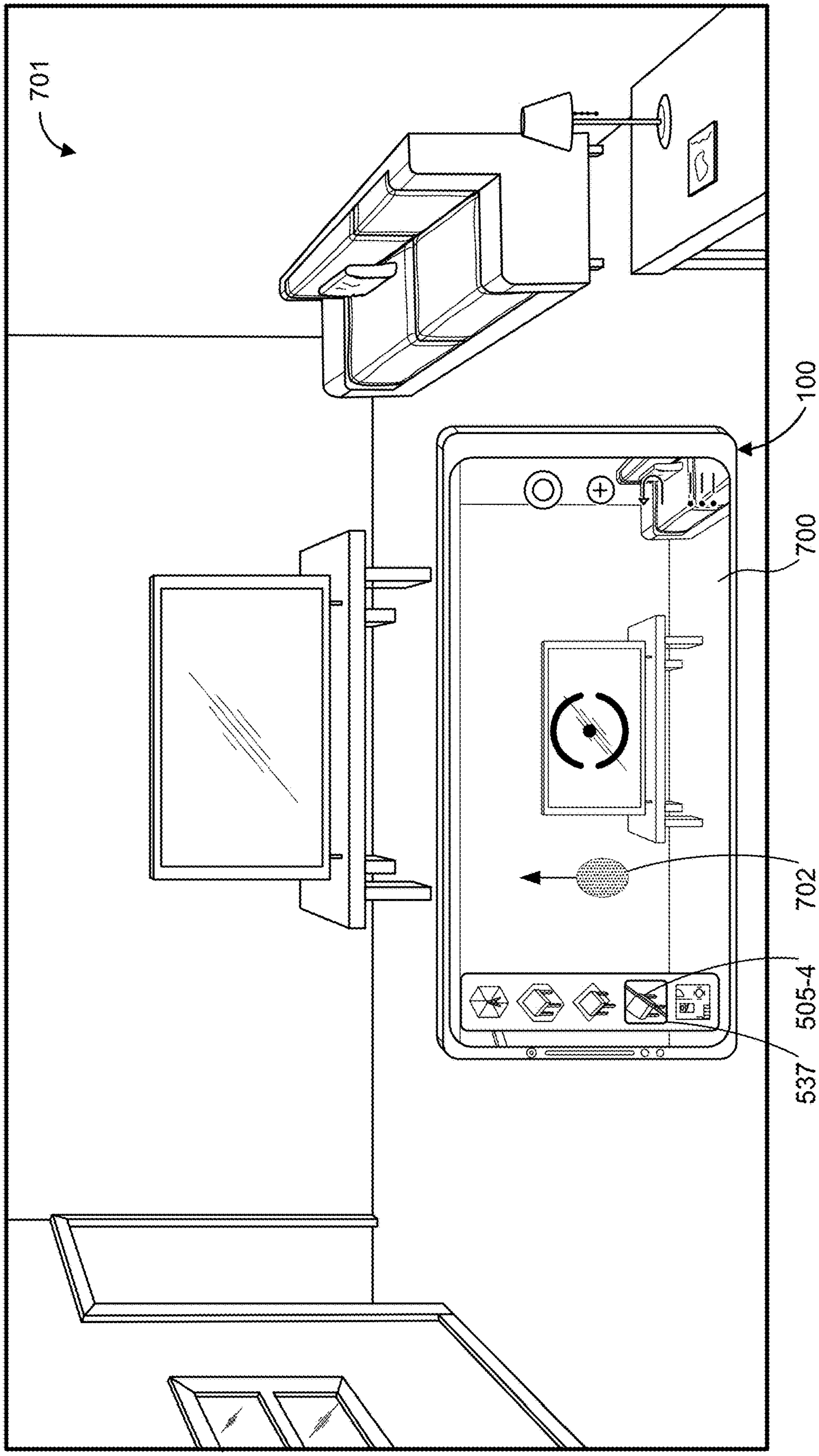
FIGS. 7A-7AT illustrate example user interfaces for scanning and modeling an environment, and interacting with a generated schematic representation thereof in accordance with some embodiments.

FIGS. 7A-7AT illustrate example user interface for scanning and modeling an environment, and interacting with a generated schematic representation thereof in accordance with some embodiments.

FIG. 7A illustrates an example transition from FIG. 5CG. In particular, FIG. 7A shows user interface 700 of the measuring application while the measuring application is operating in the one-dimensional measurement mode, indicated by selection indicator 537 displayed over (e.g., outlining) point-to-point measurement mode icon 505-4. FIG. 7A also shows input 702 (e.g., a swipe gesture) at a location in user interface 700 that corresponds to the live view of the one or more cameras of device 100 (e.g., and not to any of the controls of the measuring application).

Figure 7B:
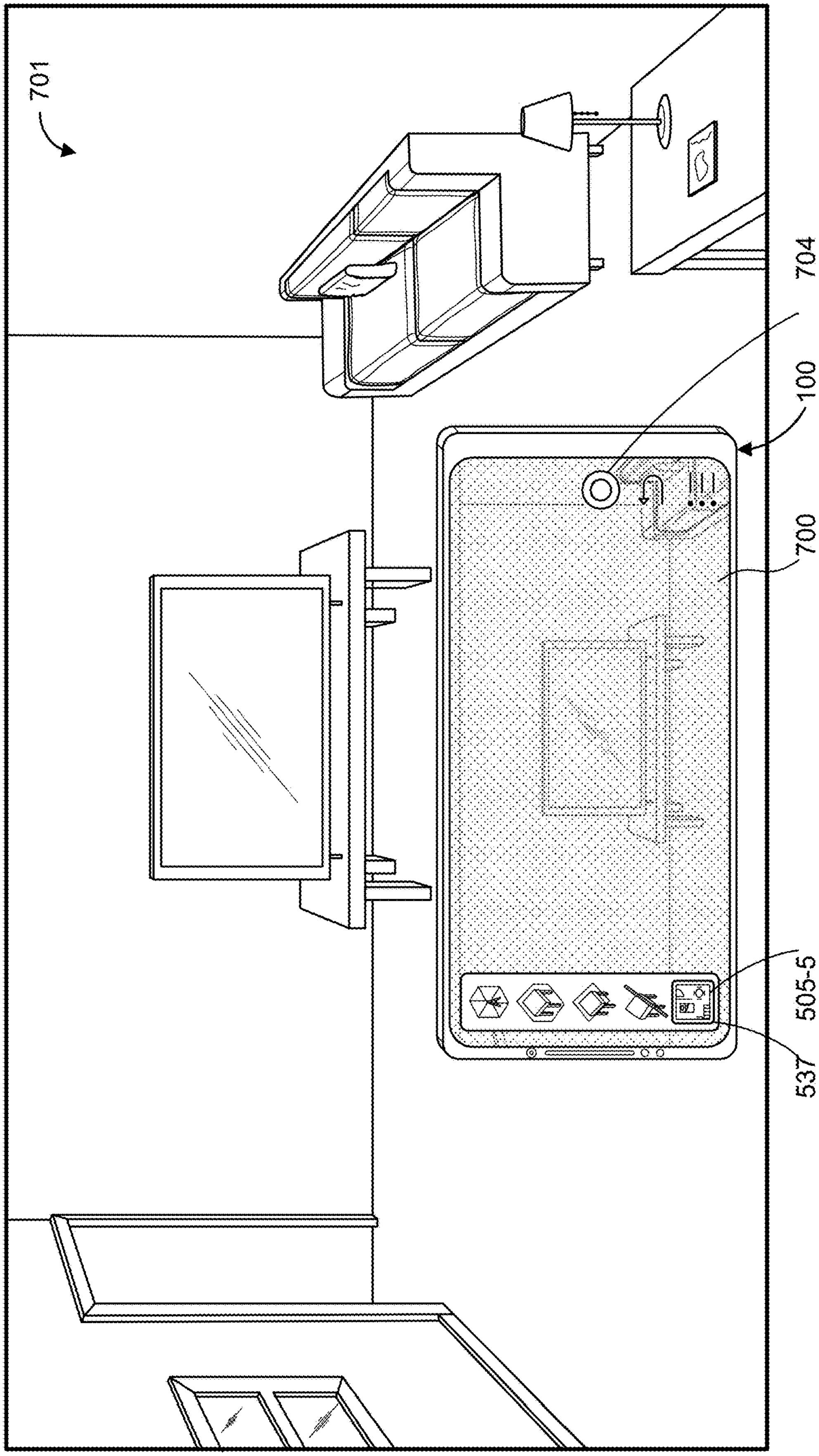

In response to input 702 (FIG. 7A), the measuring application is transitioned to the next measurement mode in mode indication user interface 705. In the example shown in FIG. 7A, the next measurement mode after the point-to-point-measurement mode is the floor plan modeling mode (also called herein a floor plan measurement mode), represented by floor plan modeling mode icon 505-5. Accordingly, FIG. 7B shows selection indicator 537 displayed over floor plan modeling mode icon 505-5. In addition, in some embodiments, the floor plan measurement mode includes scanning start/stop button 704 that, when activated, toggles environment scanning on or off (e.g., while scanning is not in progress, scanning start/stop button 704 is displayed as a scanning start button for initiating scanning, and while scanning is in progress, scanning start/stop button 704 is displayed as a scanning stop button for terminating scanning).

FIG. 7B also illustrates an example transition of user interface 700 in accordance with some embodiments in which an animated transition is displayed to transition (e.g., while transitioning) the measuring application from one measurement mode to another measurement mode (e.g., in response to a user input, rather than automatically based on objects detected in the field of view of the one or more cameras). In the example in FIG. 7B, the displayed transition includes temporary (e.g., for a time period of less than 1 second, or less than 2 seconds) dimming and/or blurring of the live view of the one or more cameras of device 100, as described herein with reference to FIG. 5CF.

Figure 7C:
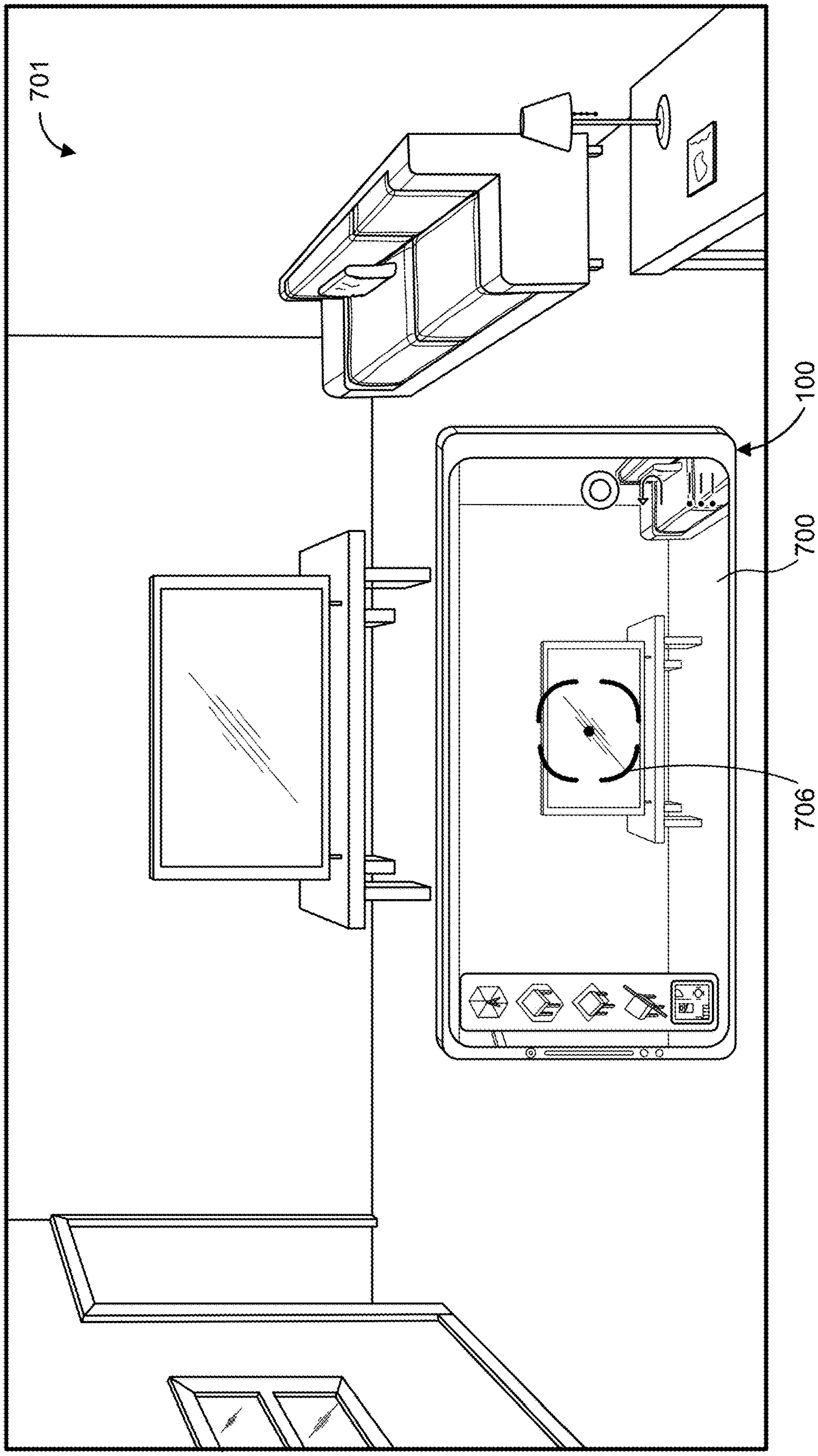
Figure 7D:
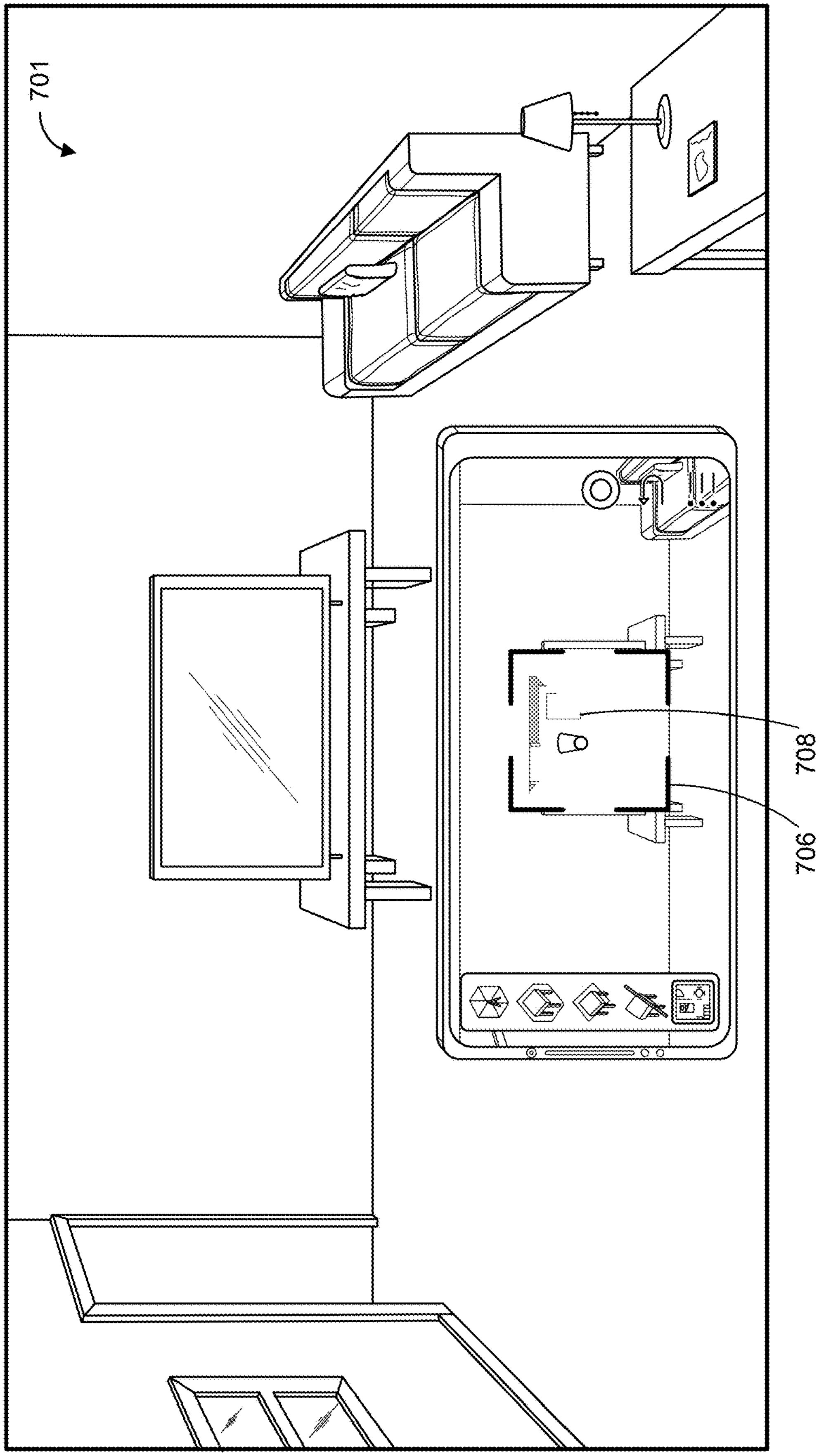

FIGS. 7C-7D illustrate a transformation of reticle 706 from the appearance associated with one-dimensional measuring (FIG. 7A) to an appearance that is associated with floor plan modeling, upon the measurement application transitioning to the floor plan modeling mode. In the example shown in FIG. 7C, reticle 706 has changed to a four-segmented appearance with the segments moving outward from the center of 706, and in the example shown in FIG. 7D, the four segments of reticle 706 have moved out to the corners of a rectangle or square.

Figure 7E:
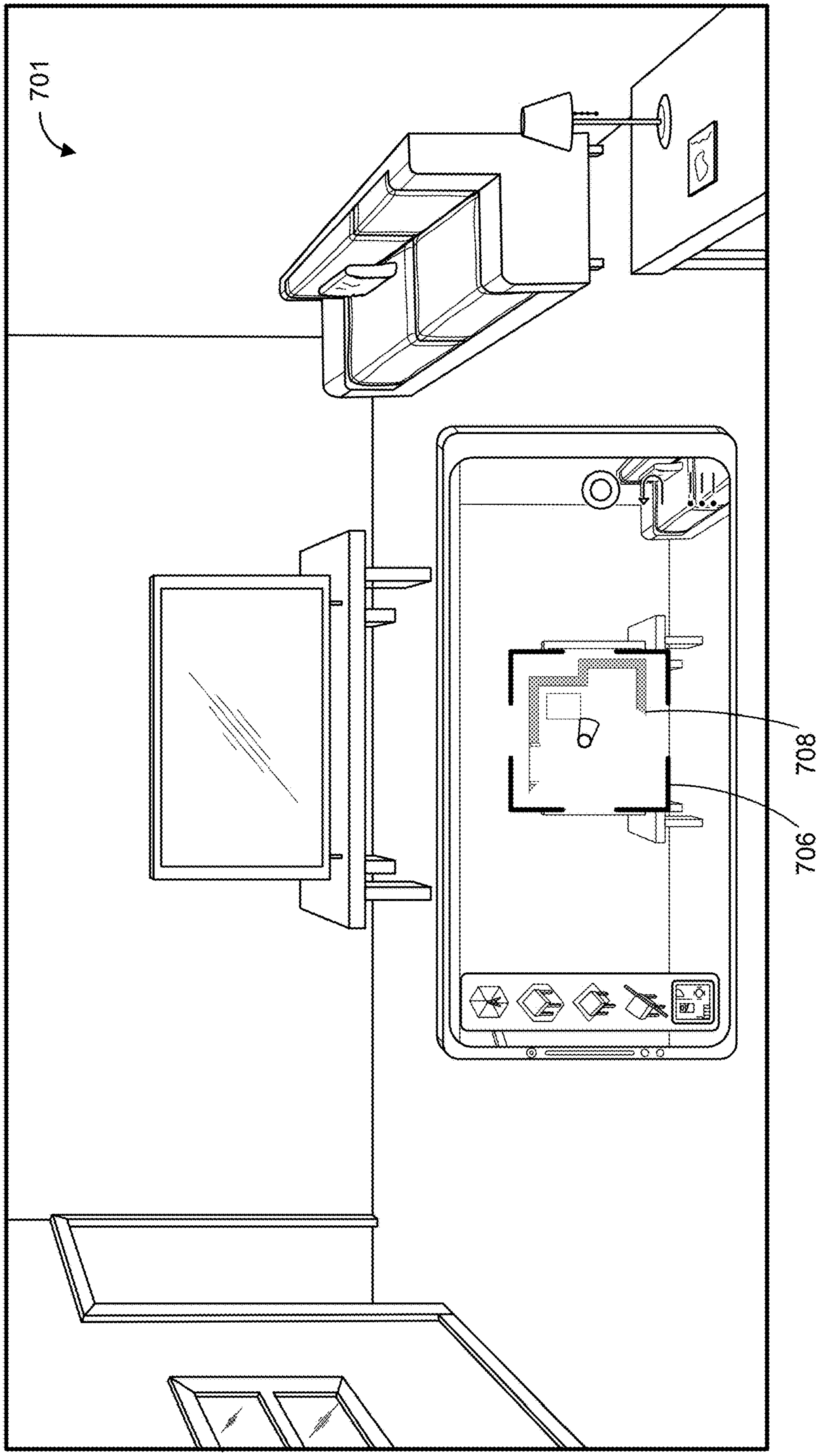
Figure 7F:
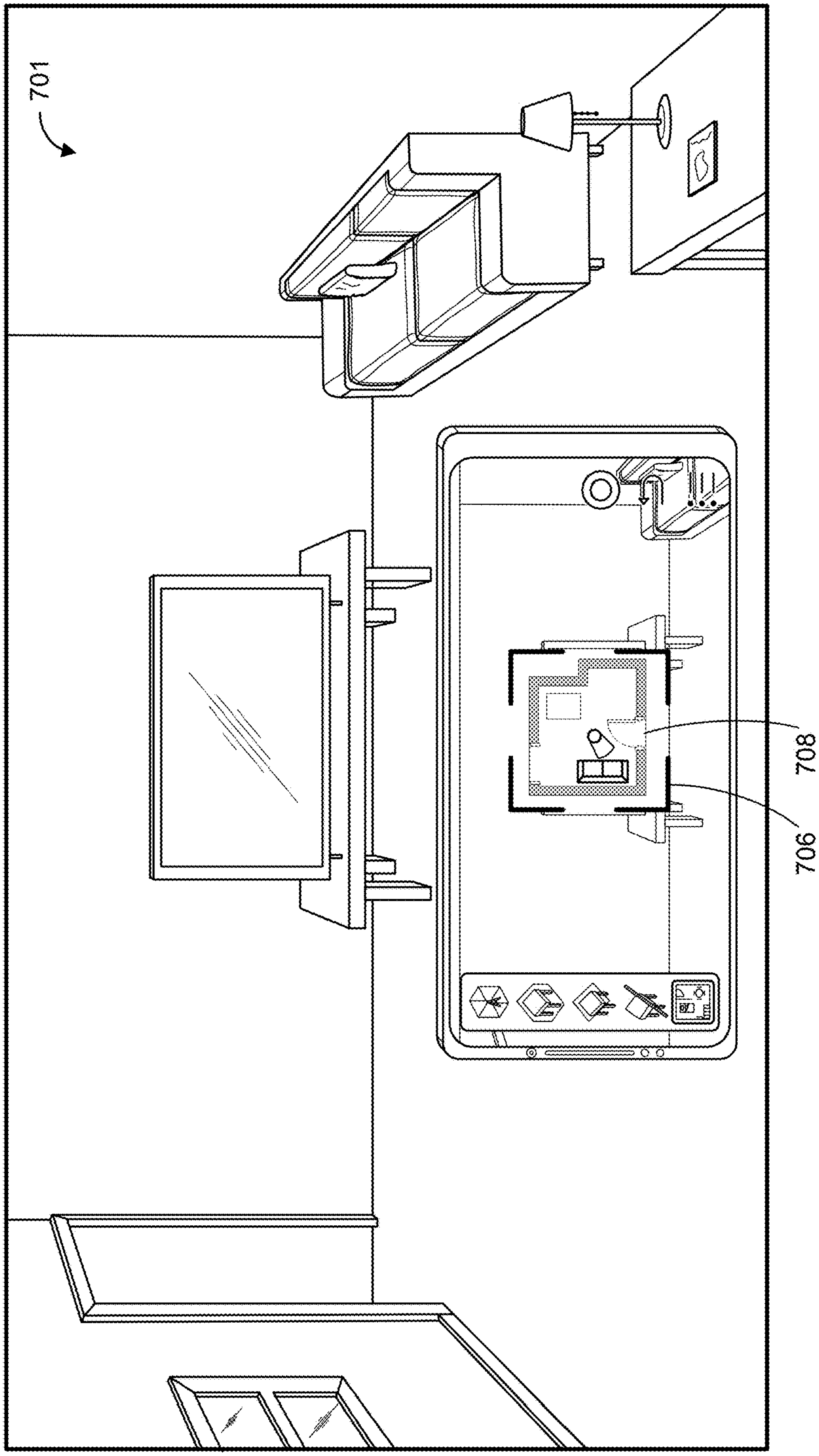
Figure 7G:
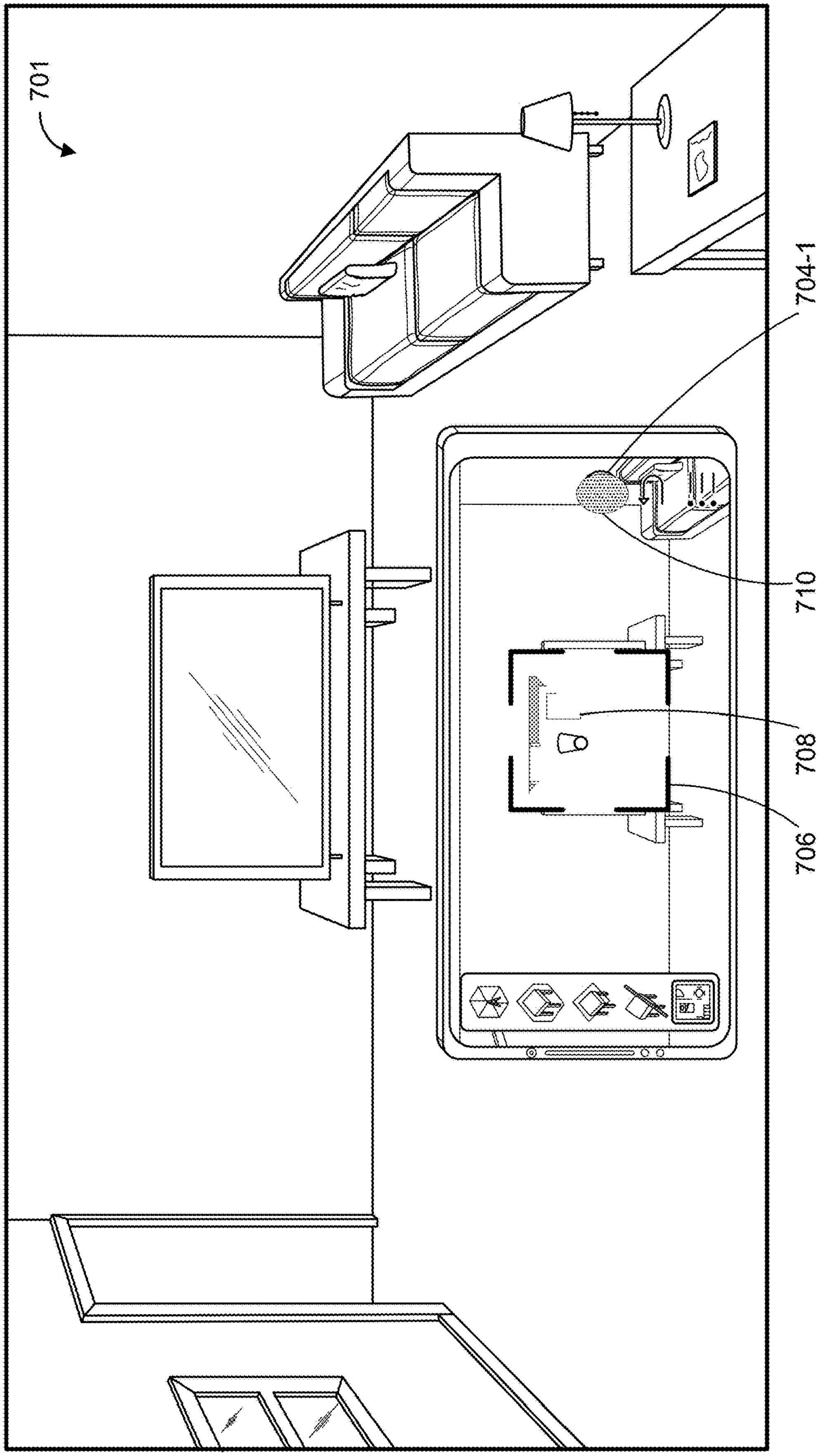

FIGS. 7D-7G illustrate an example reticle animation that illustrates a process of scanning a physical environment to progressively map out a floor plan 708 of the physical environment, while the user moves about the surrounding physical environment. In some embodiments, the reticle animation is displayed upon transitioning the measuring application to the floor plan modeling mode prior to scanning of the physical environment. In some embodiments, the reticle animation loops repeatedly (e.g., after the reticle animation is played through, as shown in FIG. 7D, FIG. 7E, and FIG. 7F, the reticle animation restarts from the beginning, as shown in FIG. 7G). In some embodiments, the reticle animation is played while the measuring application is in the floor plan modeling mode and whenever scanning of the physical environment is not in progress (e.g., the reticle animation is replayed after scanning of the physical environment has been terminated and before subsequent scanning of the physical environment has begun). In some embodiments, instructions prompting the user to move about the physical environment are displayed (e.g., an animation of a representation of the user moving around a representation of a physical environment).

FIG. 7G shows input 710 directed to scanning start button 704-1 to initiate scanning of physical environment 701.

Figure 7H:
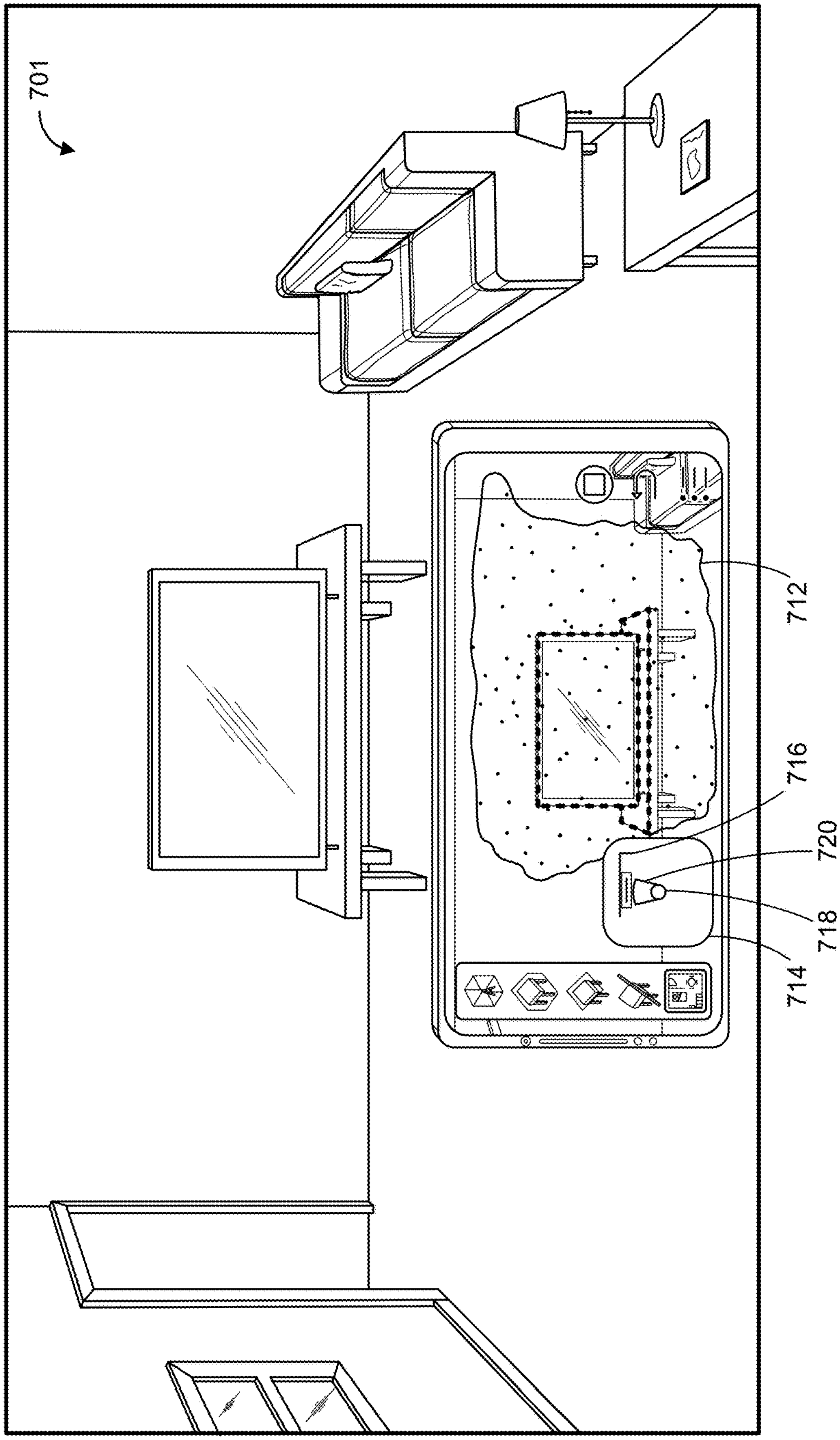

In response to input 710 (FIG. 7G), scanning of physical environment 701 to capture information (e.g., depth or other topographical information) indicative of physical environment 701, that can be used to generate a floor plan, is initiated. In FIG. 7H, the portion of physical environment 701 that has been scanned (e.g., for which information has been captured) is indicated by overlay 712 displayed on the representation of the field of view of the one or more cameras in user interface 700. Overlay 712 provides a first-person perspective view of the portion(s) of physical environment 701 that have been scanned. In addition, inset 714 includes a map 716 that provides a different view (e.g., an overhead view) of the portion(s) of physical environment 701 that have been scanned. Map 716 optionally indicates the current camera location 718 and/or the current camera field of view 720 of the one or more cameras of device 100 relative to map 716, and thus relative to physical environment 701. In addition, as shown in FIG. 7H, in some embodiments, significant objects (e.g., edges of those objects) in physical environment 701, such as television 502-2 and television stand 502-1, are visually emphasized (e.g., highlighted) within overlay 712 in user interface 700.

Figure 7I:
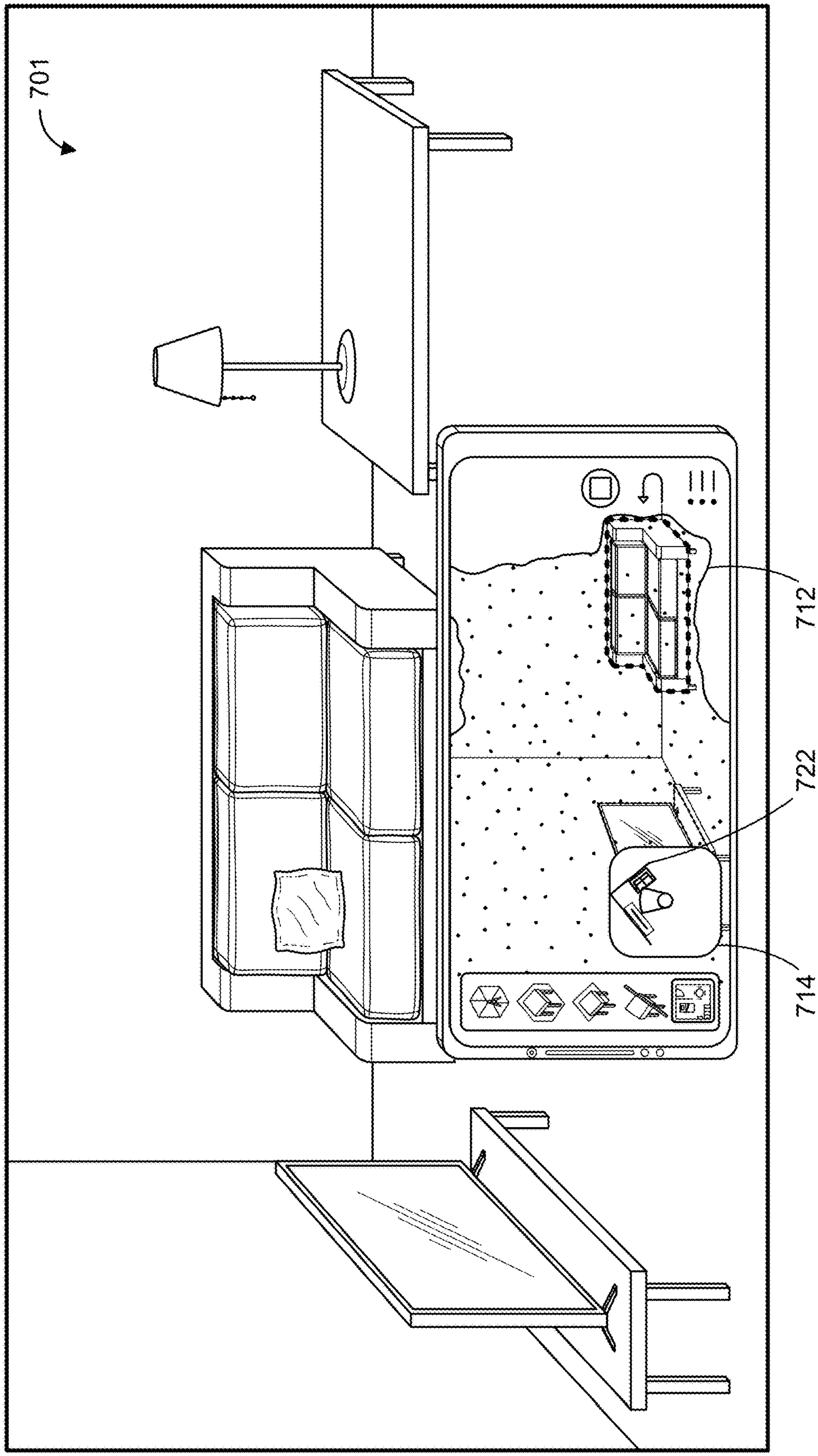

FIG. 7I illustrates a transition from FIG. 7H as device 100 (e.g., the one or more cameras of device 100) is moved relative to physical environment 701 (e.g., turned from facing television 502-2 to facing couch 502-3). As device 100 is moved, device 100 captures information indicative of additional portions of physical environment 701, as indicated by the expansion of overlay 712 in user interface 700 and, in some embodiments, reflected in the updating of map 722 in inset 714 to include representations of the additional captured portions of physical environment 701. For example, couch 502-3 (e.g., the edges of couch 502-3) is visually emphasized within overlay 712 in user interface 700. The edges of television 502-2 and television stand 502-1 are also visually emphasized, but, in this example, to a lesser degree than couch 502-3, having faded over time since their physical characteristics were first captured by the device. The visual emphasis of couch 502-3, initially displayed with a same degree of visual emphasis as television 502-2 and television stand 502-1 in FIG. 7H, also fades over time, as shown in FIGS. 7K-7L. In addition, in the example shown in FIG. 7I, map 722 is translated and rotated in inset 714 in accordance with the lateral movement and rotation of device 100 in physical environment 701, such that camera location 718 and camera field of view 720 remain stationary relative to inset 714.

Figure 7J:
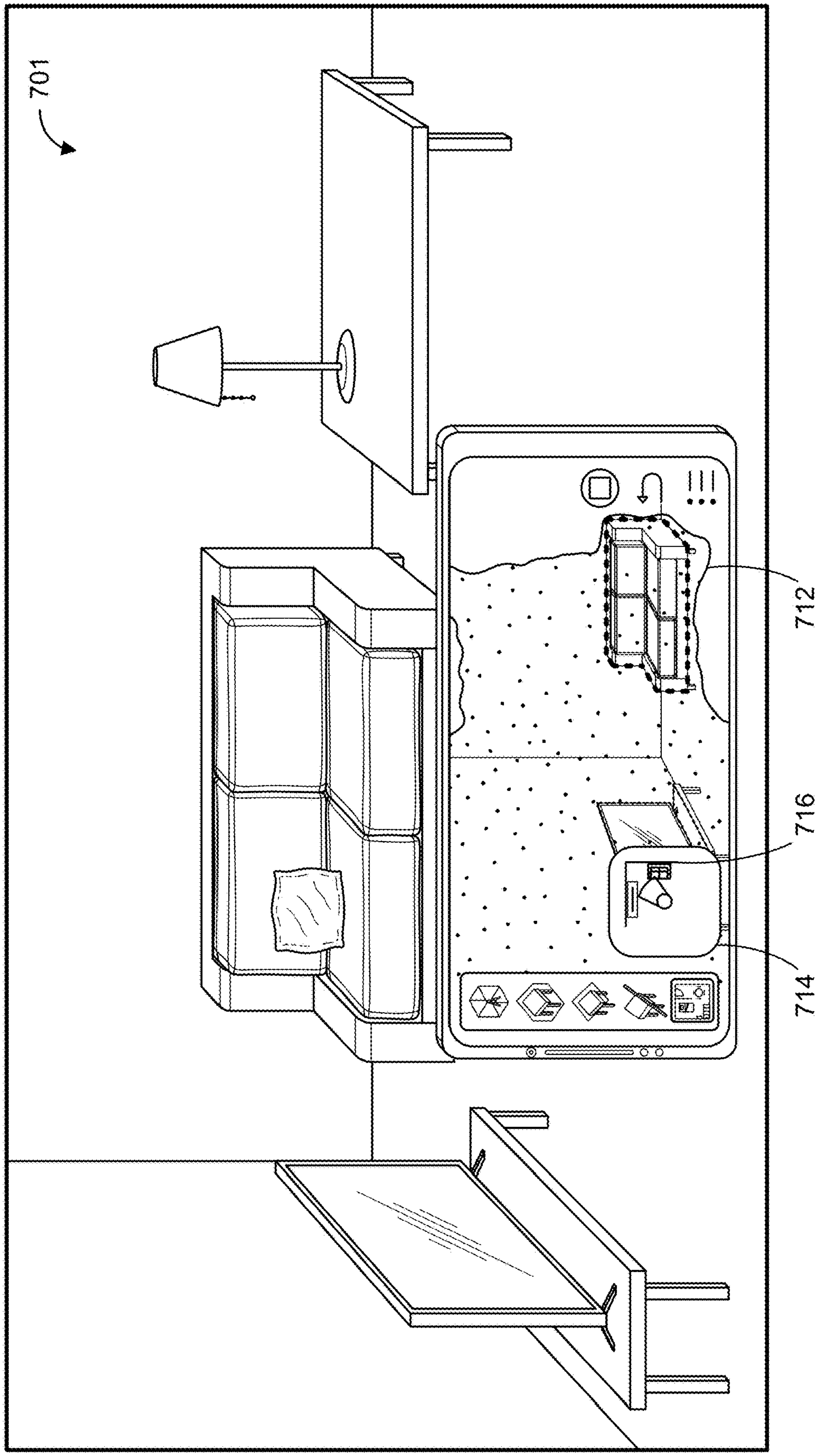
Figure 7K:
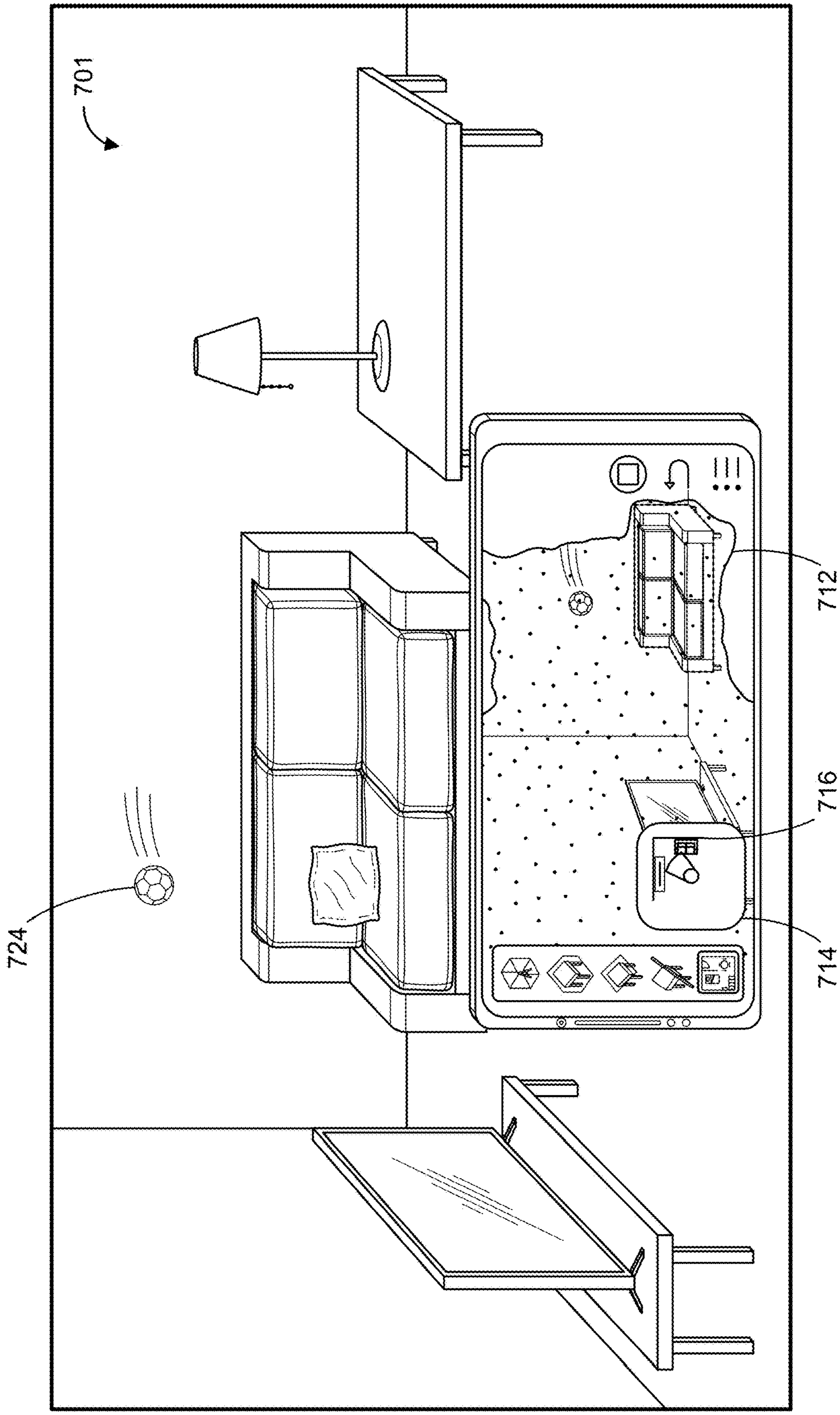
Figure 7L:
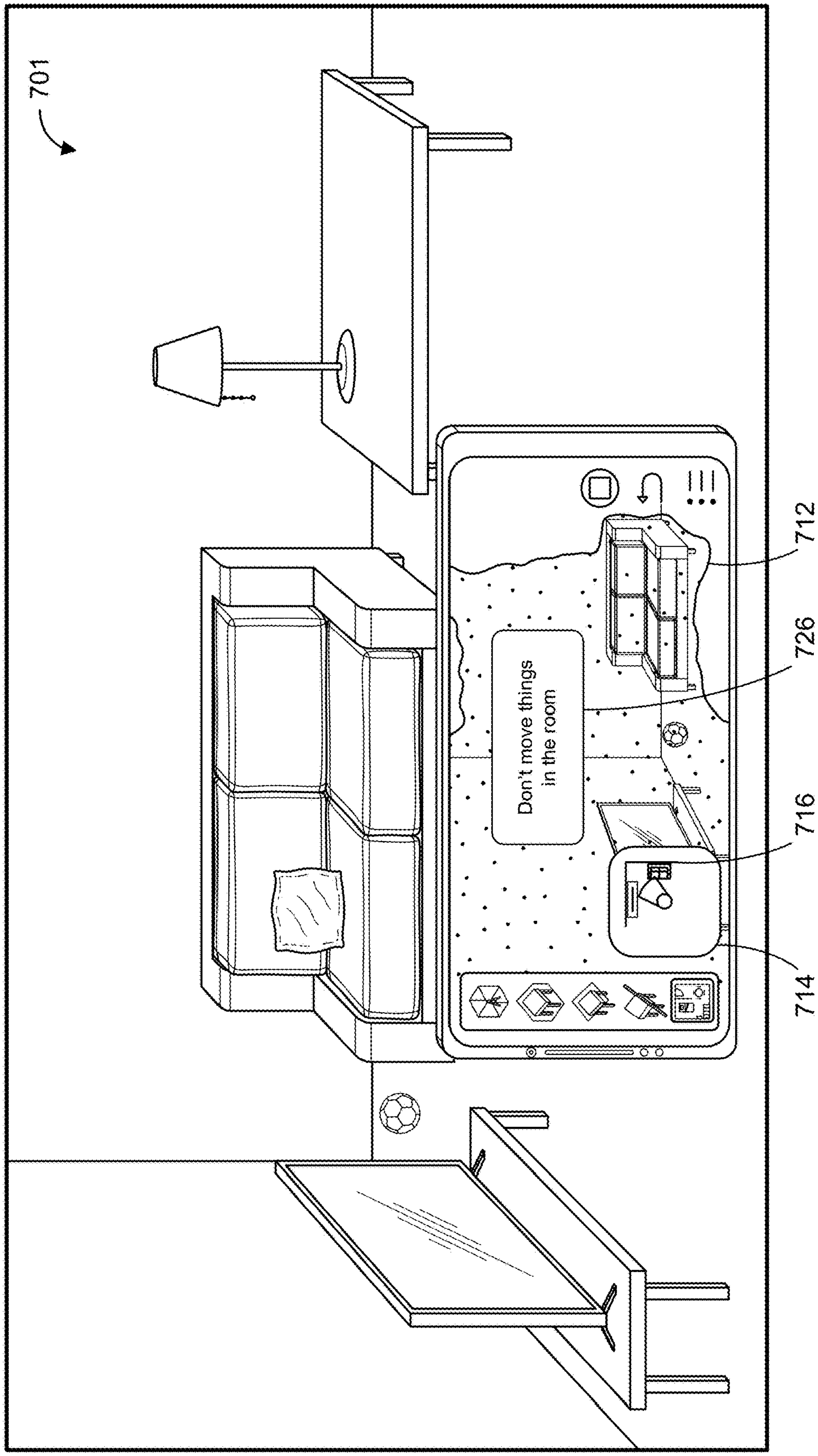

FIG. 7J illustrates an alternative transition from FIG. 7H. In contrast to FIG. 7I, map 716 in FIG. 7J is not rotated in inset 714. Instead, map 716 is displayed in inset 714 in FIG. 7J with the same orientation as in FIG. 7H, and camera location 718 and camera field of view 720 change relative to map 716, and thus relative to inset 714, to reflect the lateral movement and rotation of device 100 in physical environment 701.

FIG. 7K illustrates a change in the field of view of the one or more cameras due to ball 724, from the field of view of the one or more cameras in FIG. 7H or 7J, moving through physical environment 701 and a physical object (e.g., ball 724) entering the field of view of the one or more cameras, which is reflected in the live view of the one or more cameras that is displayed in user interface 700 of device 100.

FIG. 7L shows that, in response to detecting movement of physical objects (e.g., ball 724) in physical environment 701, device 100 displays an alert 726 (e.g., "Don't move things in the room") instructing the user not to move objects in physical environment 701 while scanning. Objects moving in a physical environment during scanning of the physical environment by the device interfere with the accurate capture of information about the physical environment, as well as being difficult themselves to scan, particularly if they are moving quickly, and thus interfere with accurate floor plan generation.

Figure 7M:
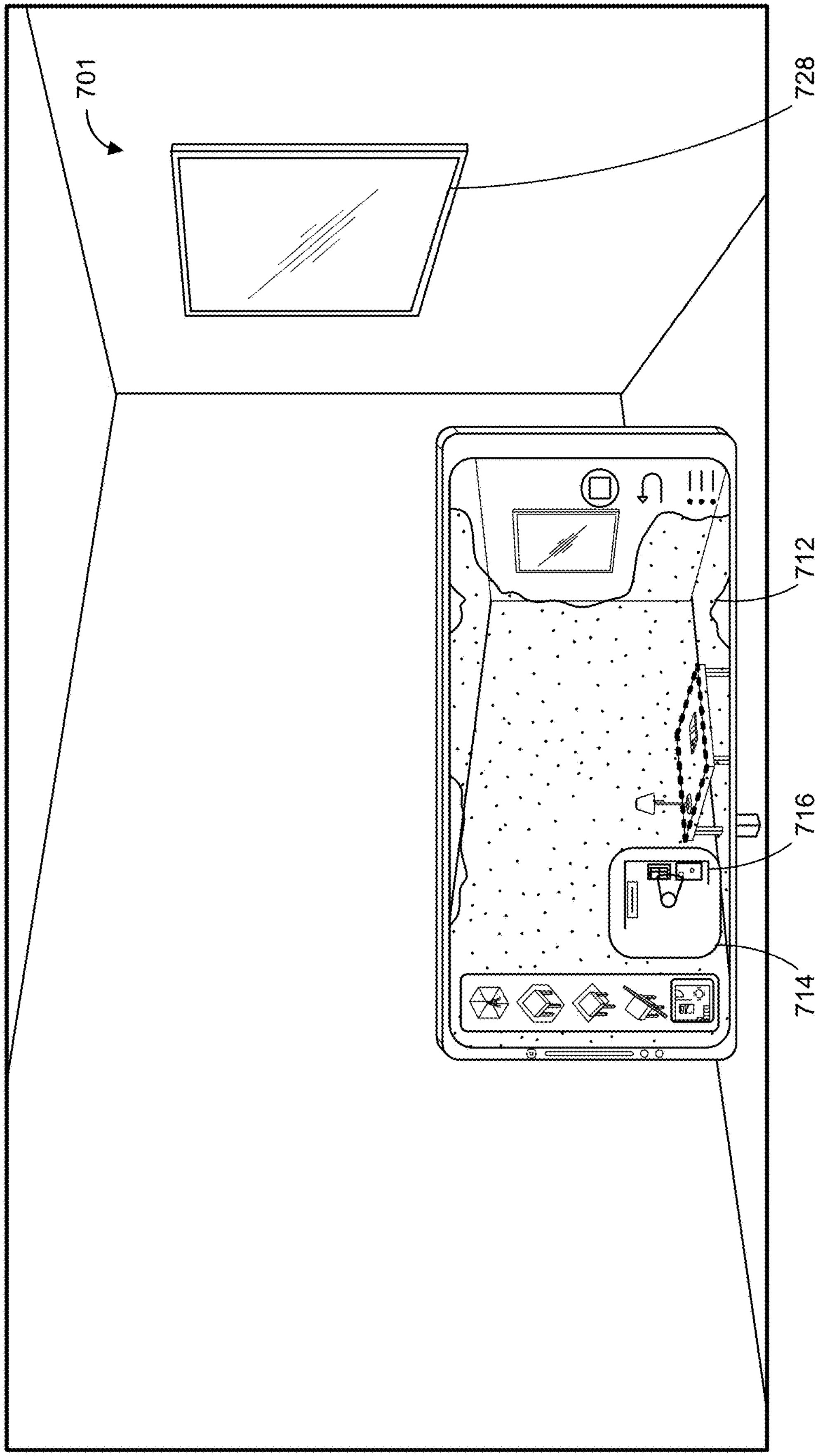
Figure 7N:
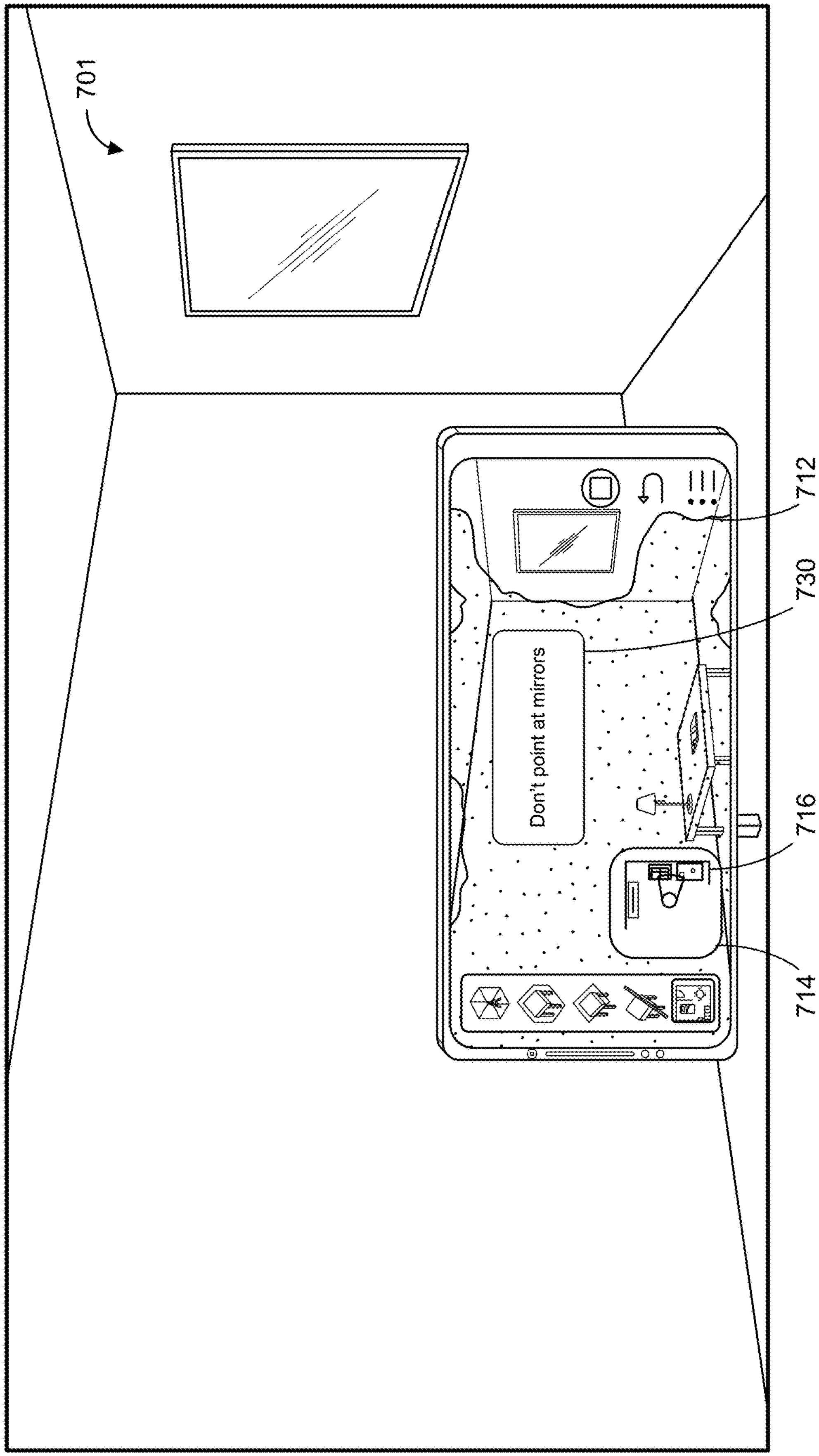

FIG. 7M illustrates the result of continued movement of device 100 in physical environment 701, e.g., in a transition from FIG. 7L, and capture of information for additional portions of physical environment 701, including further expansion of overlay 712 in user interface 700, and further updating of map 716 in inset 714. FIG. 7M also illustrates the edges of table 502-5 visually emphasized within overlay 712 in user interface 700, with the visual emphasis decreasing over time, as shown in FIG. 7N.

In FIG. 7M, the portion of physical environment 701 that is in the field of view of the one or more cameras of device 100 includes mirror 728. In FIG. 7N, in accordance with a determination that the field of view of the one or more cameras includes a mirror (e.g., in accordance with a determination that the representation of the field of view of the one or more cameras includes a representation of a mirror), device 100 displays alert 730 (e.g., "Don't point at mirrors") instructing the user not to direct the one or more cameras (e.g., the focus point of the one or more cameras, corresponding to a center point or region of the display of device 100) toward mirrors in the physical environment while scanning.

Figure 7O:
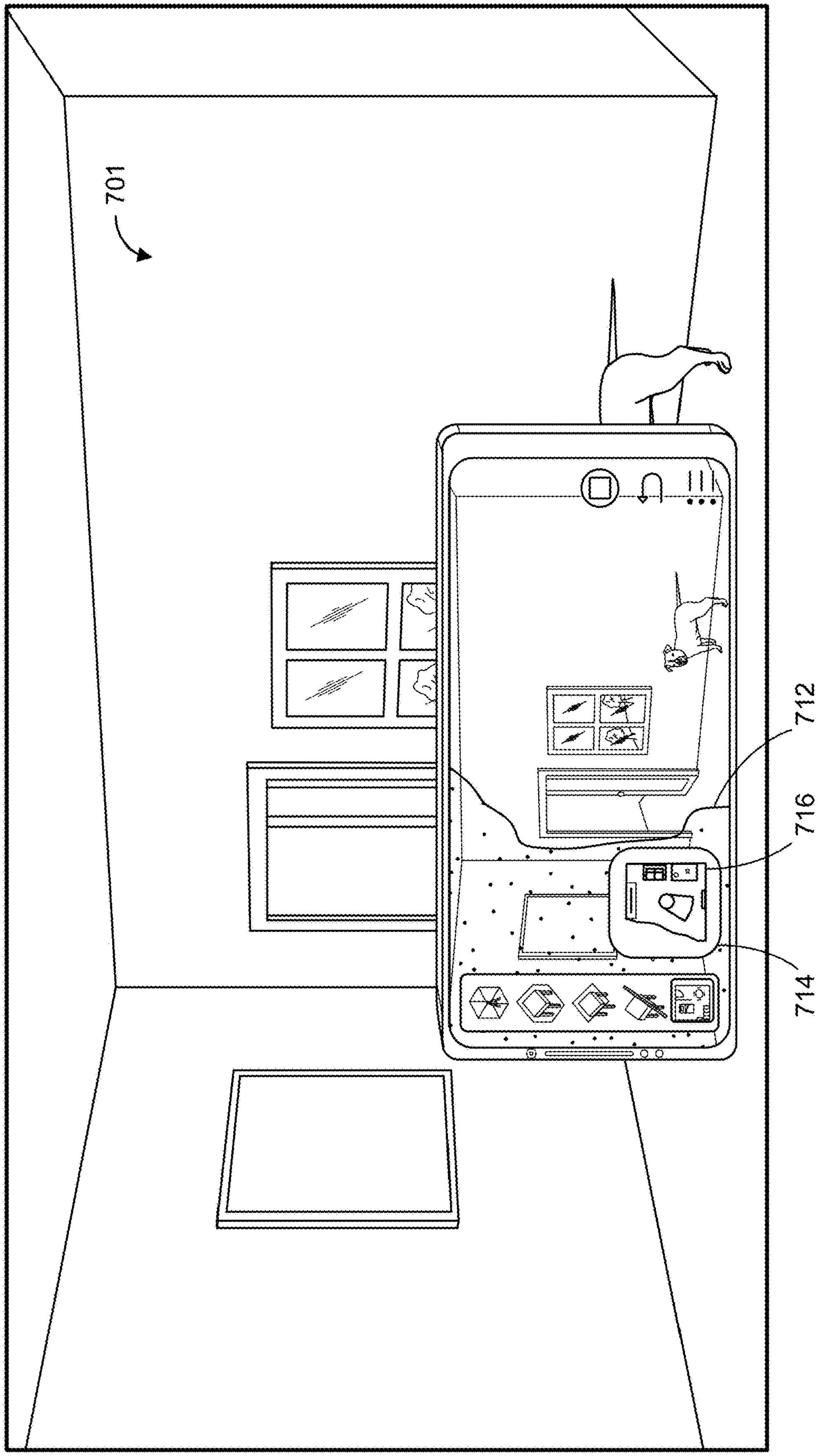

FIG. 7O illustrates the result of continued movement of device 100 in physical environment 701, e.g., in a transition from FIG. 7M, and capture of information for additional portions of physical environment 701, including further expansion of overlay 712 in user interface 700, and further updating of map 716 in inset 714.

Figure 7P:
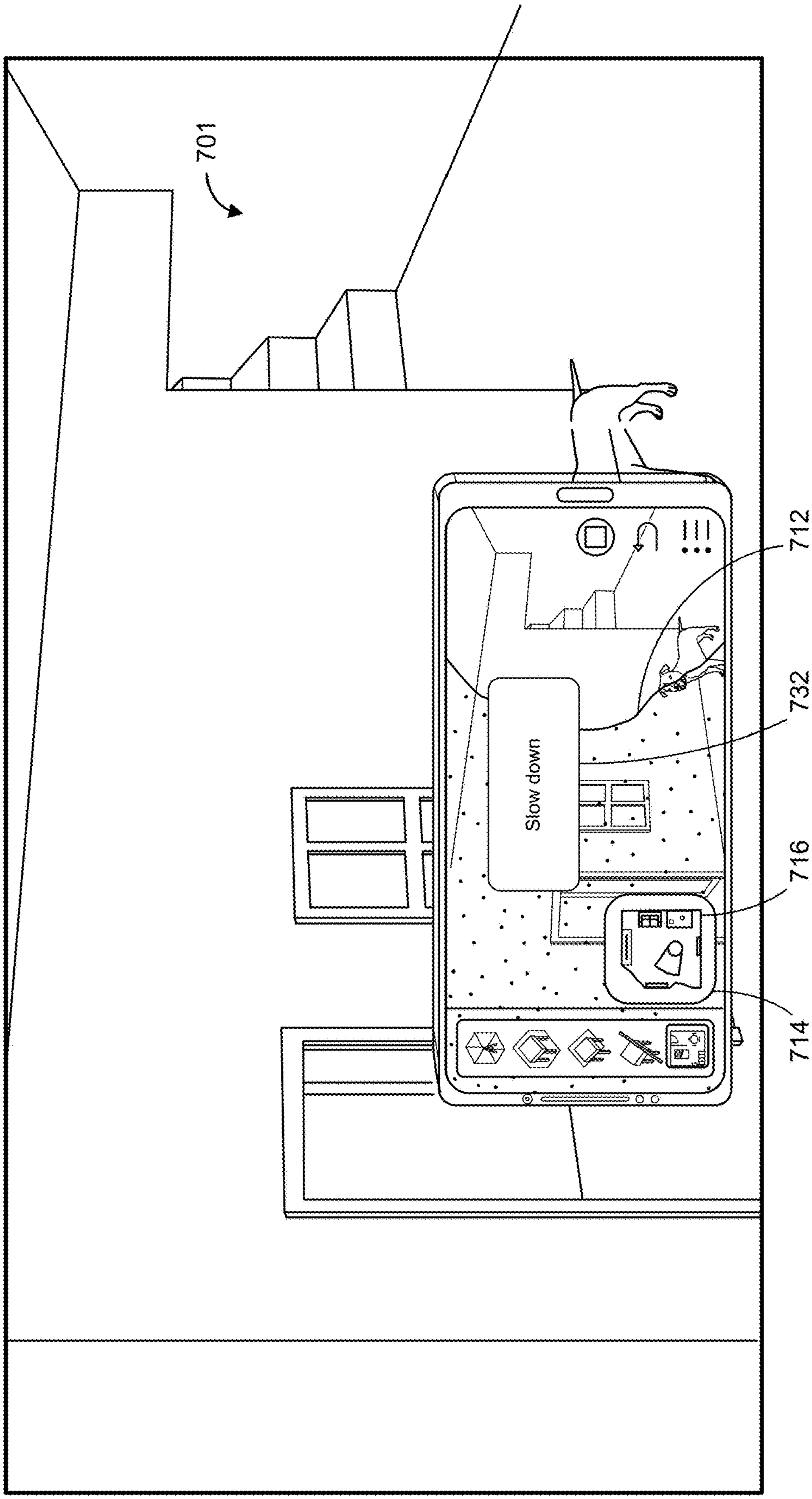

FIG. 7P illustrates the result of continued movement of device 100 in physical environment 701, e.g., in a transition from FIG. 7O, and capture of information for additional portions of physical environment 701, including further expansion of overlay 712 in user interface 700, and further updating of map 716 in inset 714. In accordance with a determination that device 100 (e.g., its one or more cameras) is being moved too quickly to allow capture of accurate information about physical environment 701 by the device, device 100 displays alert 732 (e.g., "Slow down") instructing the user to slow the movement of device 100 to allow device 100 time to capture information about physical environment 701.

Figure 7Q:
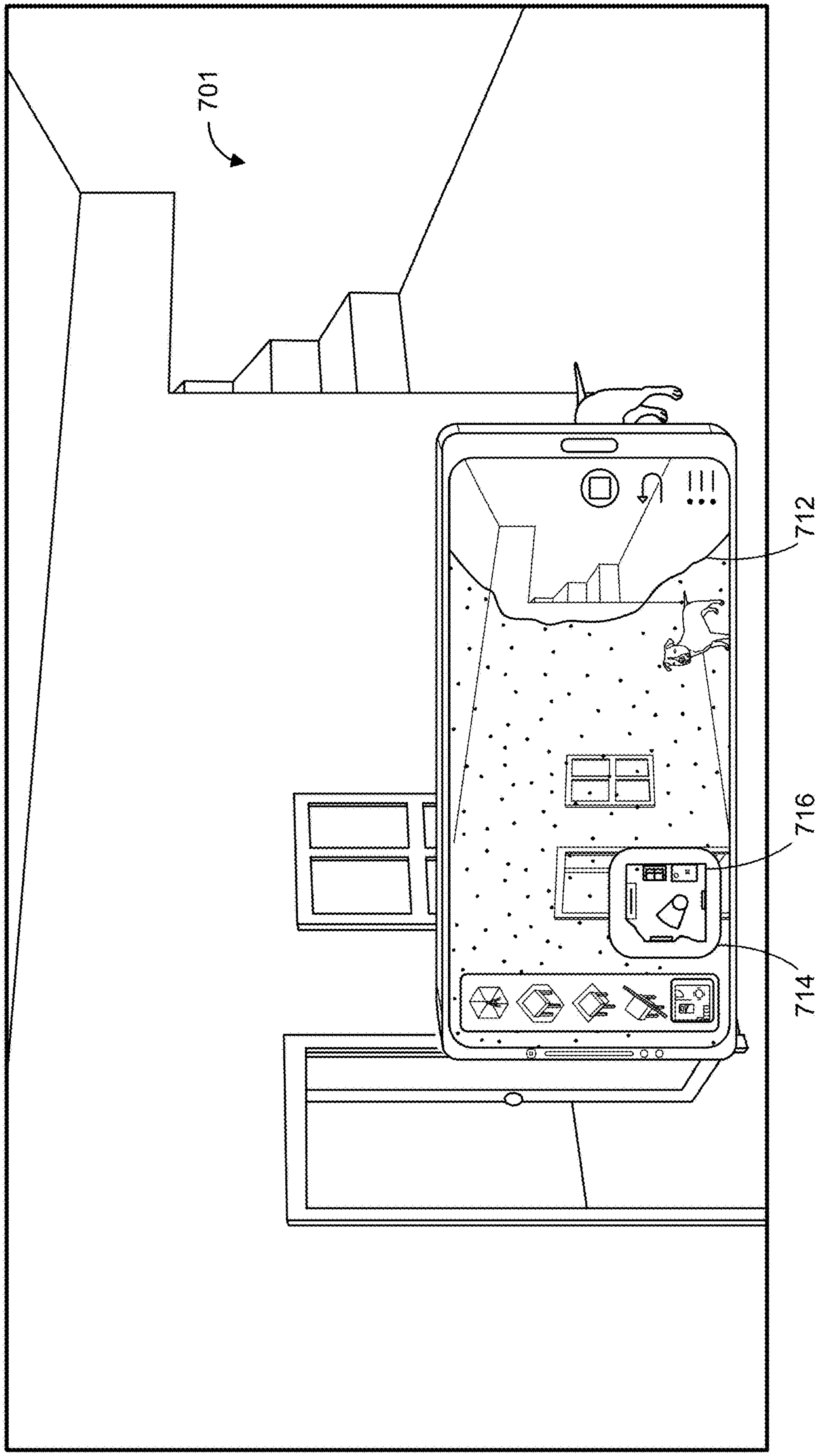

FIG. 7Q illustrates the result of continued, and slowed, movement of device 100 in physical environment 701, e.g., in a transition from FIG. 7P, and capture of information for additional portions of physical environment 701, including further expansion of overlay 712 in user interface 700, and further updating of map 716 in inset 714.

Figure 7R:
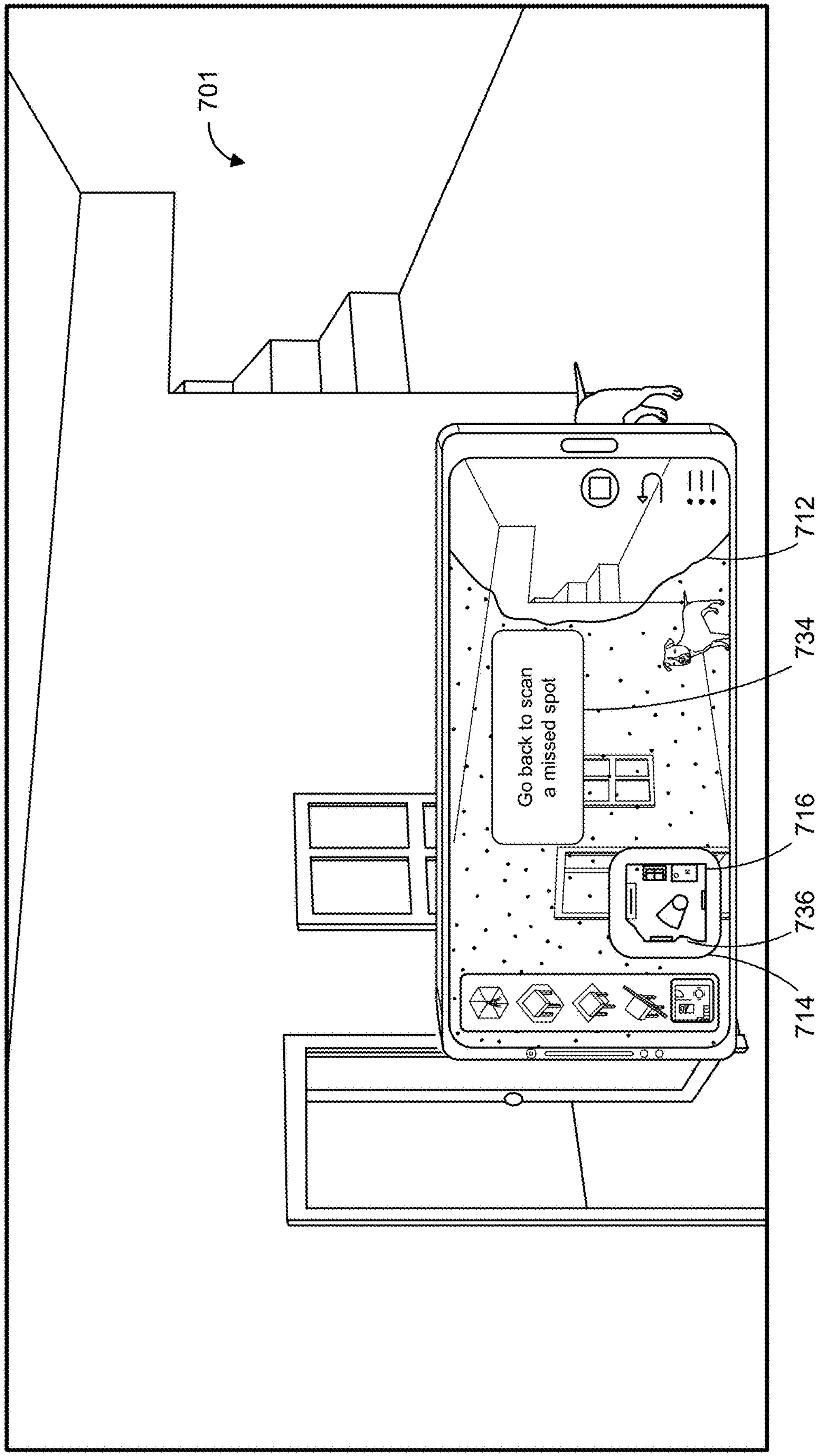

In FIG. 7R, device 100 displays alert 734 (e.g., "Go back to scan a missed spot") in accordance with a determination that the one or more cameras were moved past a portion of physical environment 701 for which information was not fully captured, for example due to the one or more cameras being moved too quickly, such as between FIG. 7O and FIG. 7P, as indicated by missing portion 736 of map 716.

Figure 7S:
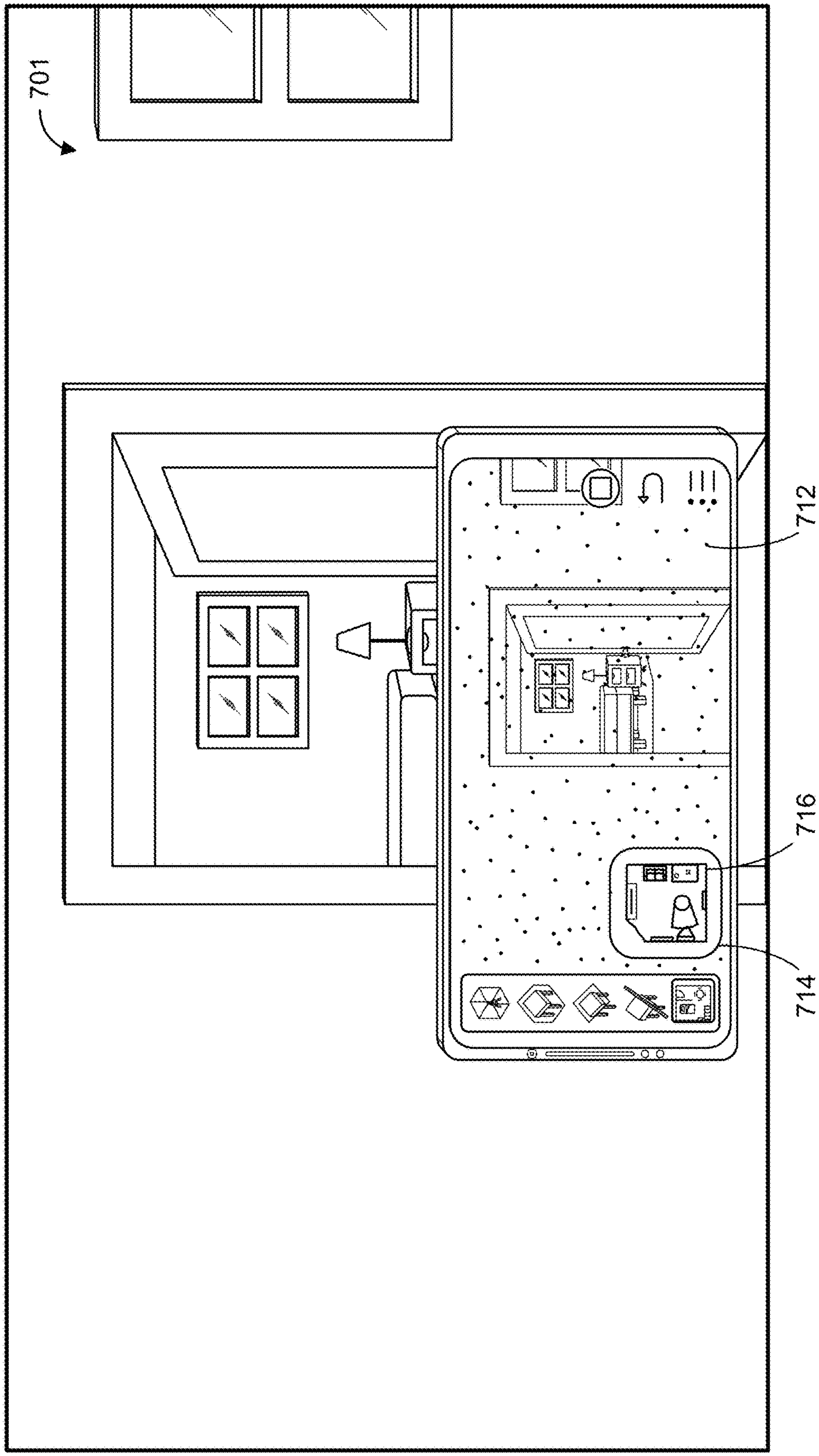

FIG. 7S illustrates that, in response to alert 734 (FIG. 7R), device 100 is moved by its user back to a location in physical environment 701 between the location of device 100 in FIG. 7O and the location of device 100 in FIG. 7P, indicated by camera location 718, to reattempt capture of information for a missed portion of physical environment 701. It is noted that in FIGS. 7P-7R, although information for physical environment 701 was at least partially missing, overlay 712 is displayed as a continuous region. That is, in some embodiments, an alert such as alert 734 is provided to instruct the user to rescan missed portions of physical environment 701 instead of displaying holes or gaps in overlay 712 to indicate regions of missing information.

Figure 7T:
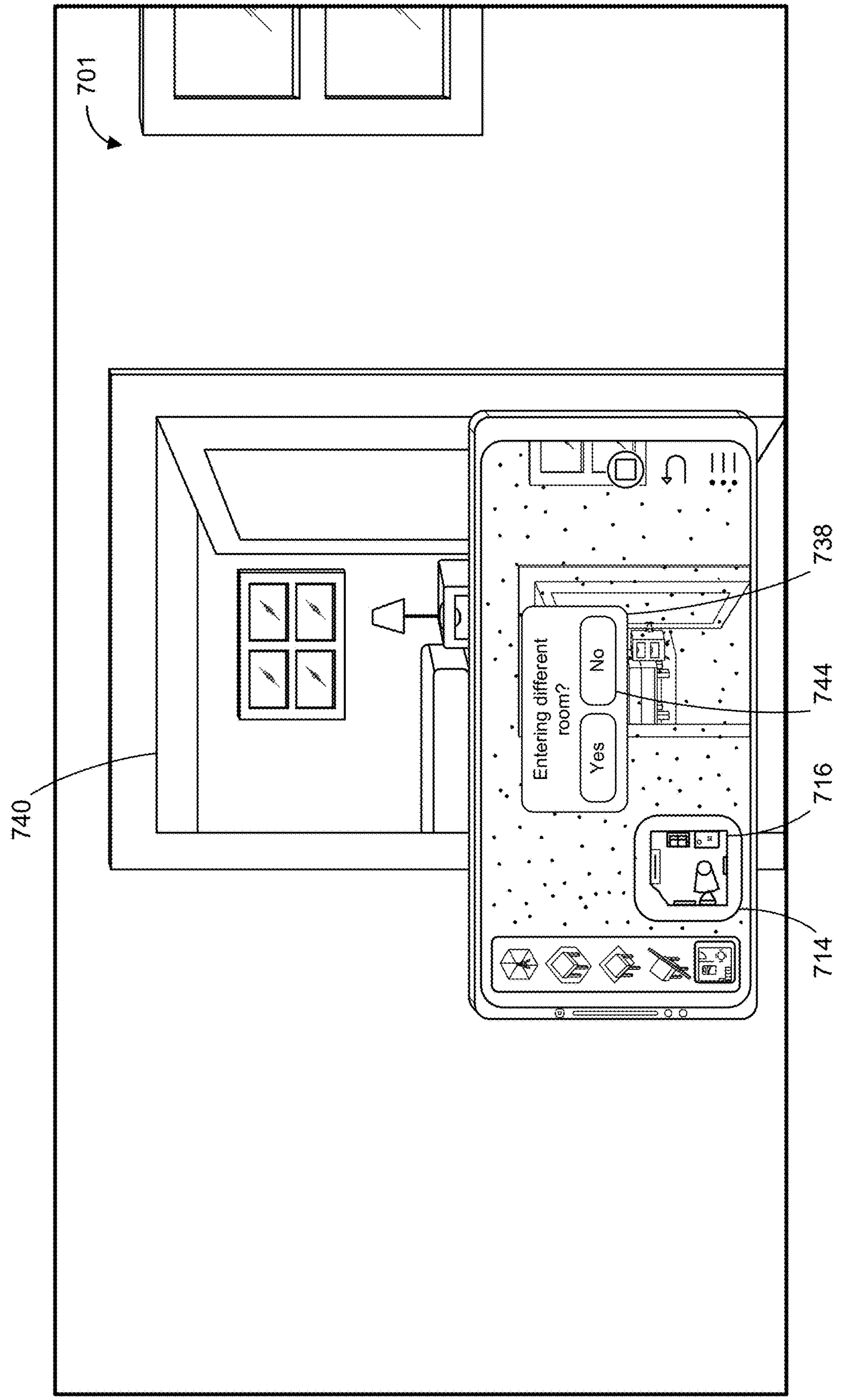
Figure 7U:
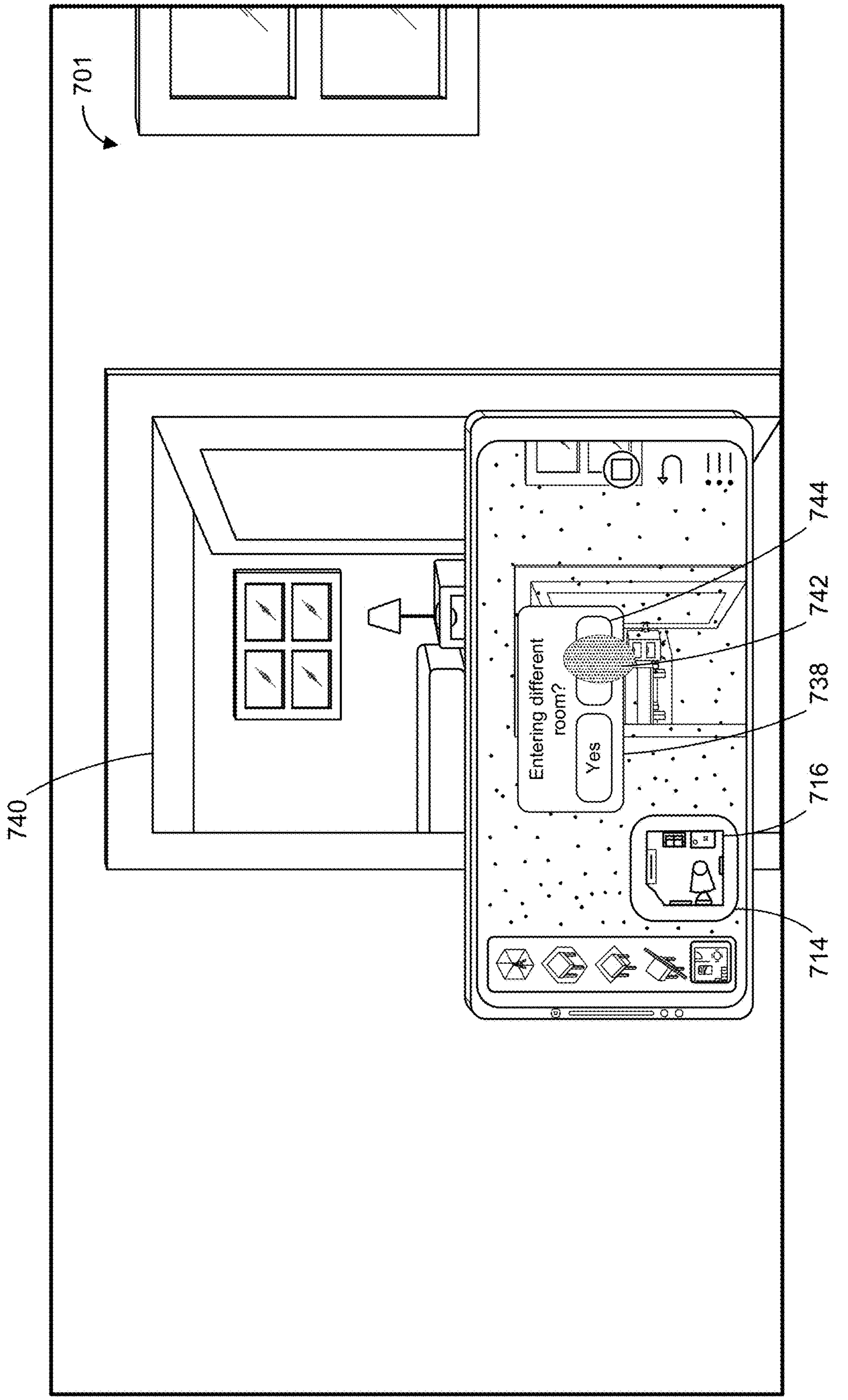

In FIG. 7S, the portion of physical environment 701 that is in the field of the one or more cameras of device 100 includes an exit of the current room in which device 100 (e.g., its one or more cameras) is currently located. In some embodiments, device 100 allows a user to mark entryways between a room in which device 100 is currently located (e.g., the room in which the user is holding device 100) and an adjoining room. An example mechanism by which a user can mark entryways between adjoining rooms is illustrated in FIG. 7T, in which device 100 displays prompt 738 asking the user to indicate whether the user will be moving from the current room in physical environment 701 through doorway 740 to the other room. FIG. 7U shows input 742 directed to "No" button 744, by which the user declines to move into the adjoining room.

Figure 7V:
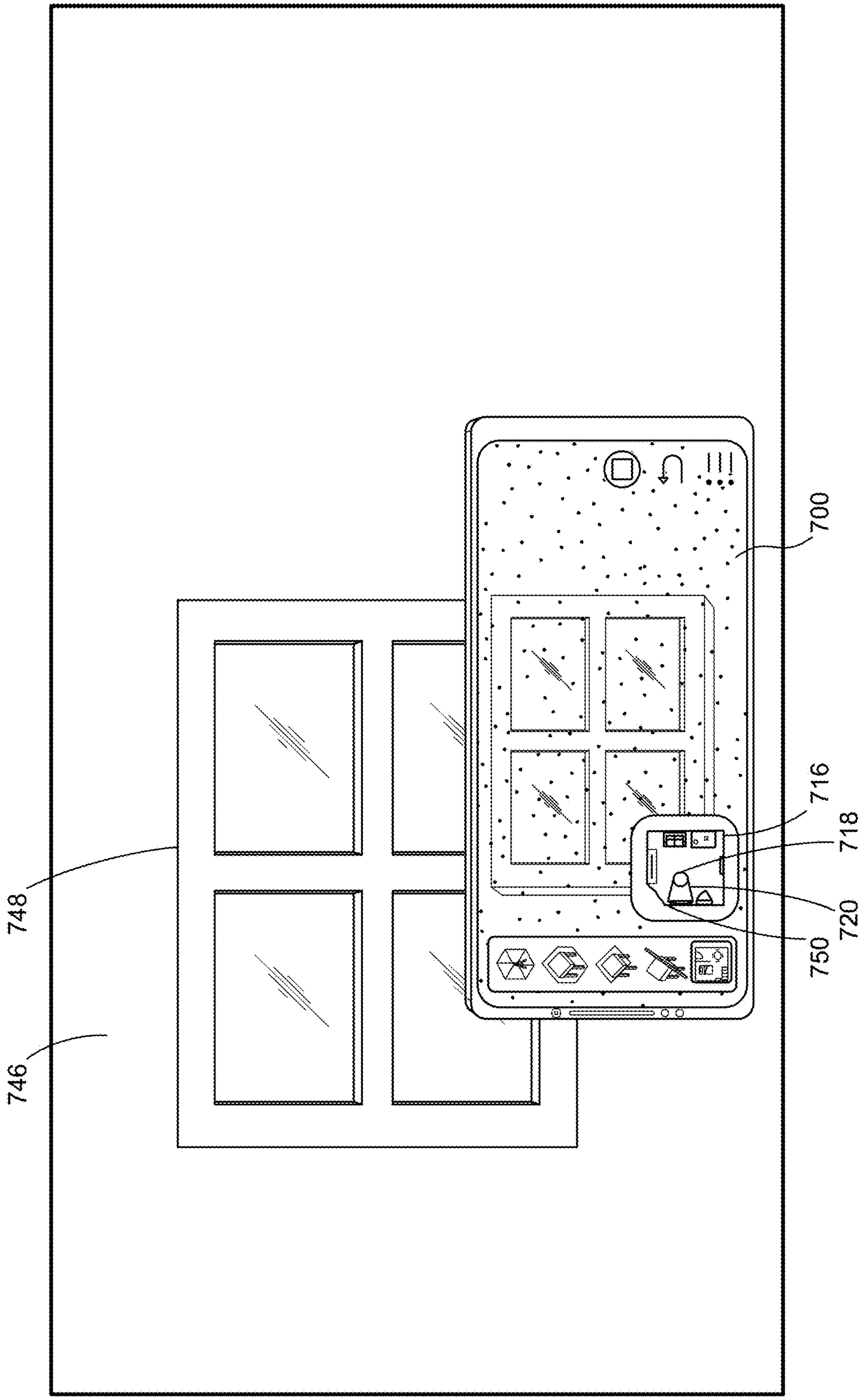
Figure 7W:
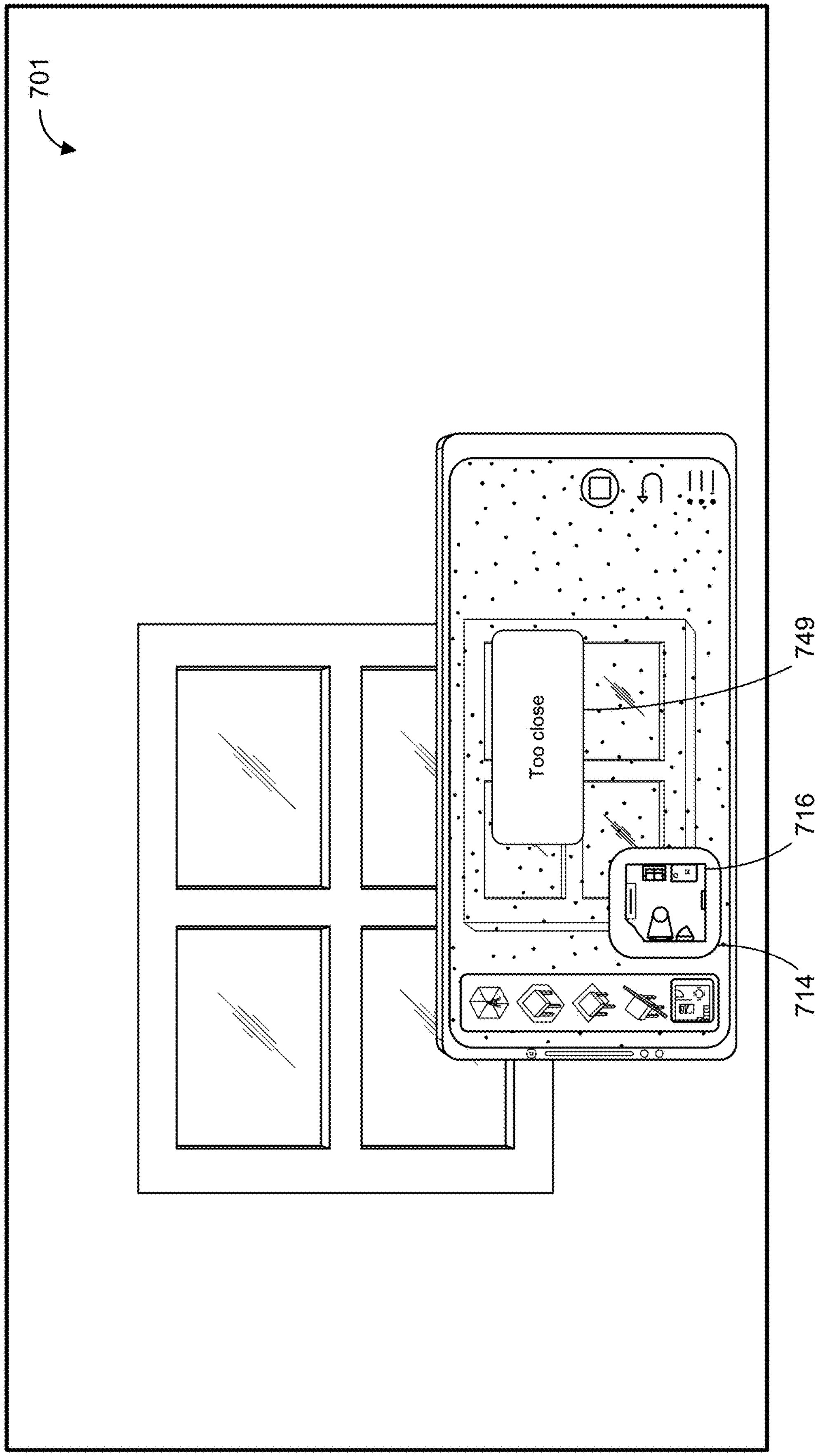
Figure 7X:
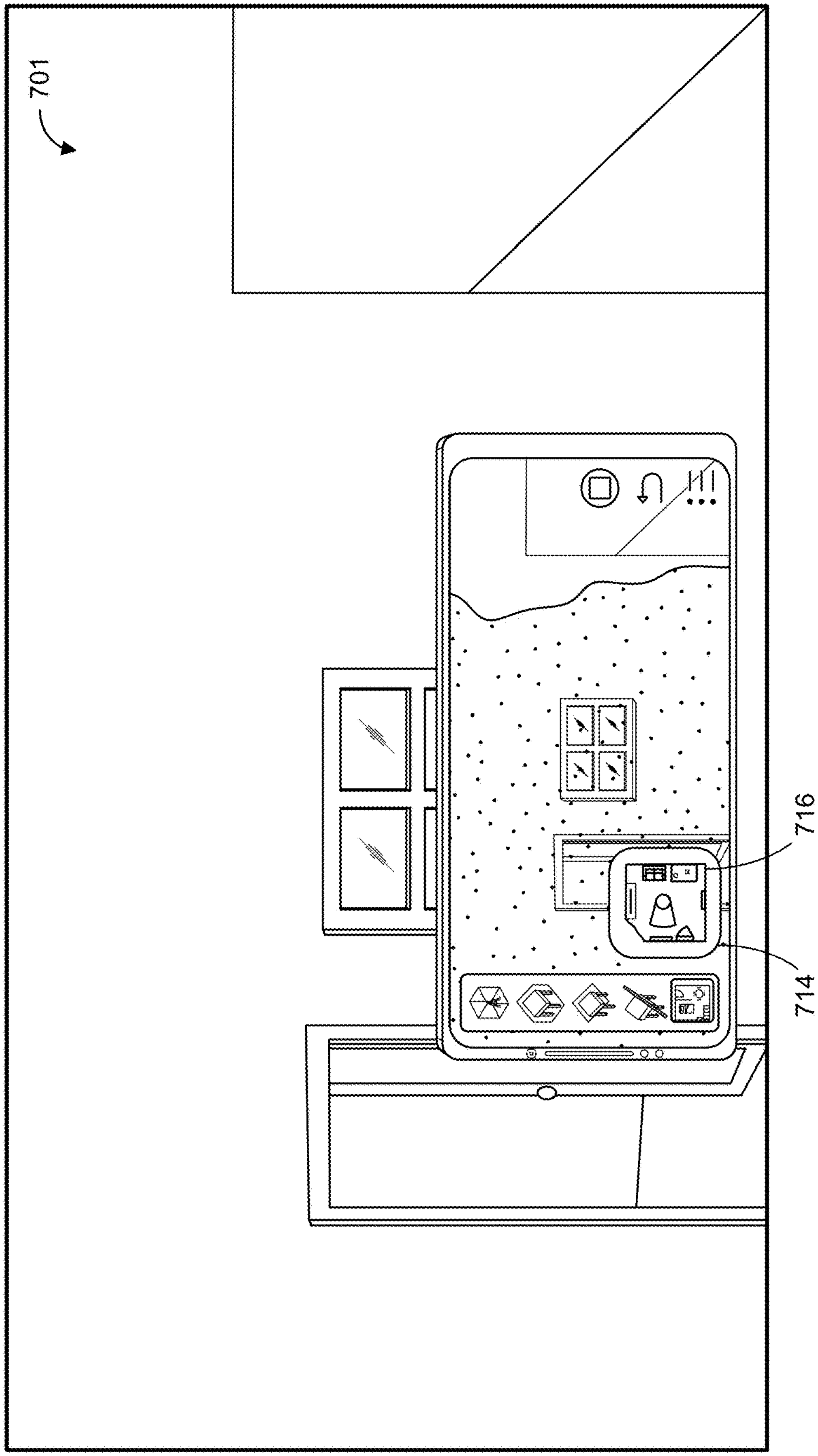

FIG. 7V illustrates the result of continued movement of device 100 in physical environment 701. In FIG. 7V, the one or more cameras of device 100 are located close to wall 746 of physical environment 701, as indicated by window 748 appearing large in the live view of the one or more cameras in user interface 700 and by camera location 718 in map 716 being close to representation 750 of wall 746 with camera field of view 720 facing toward representation 750 of wall 746. In FIG. 7W, in accordance with a determination that objects in the field of view of the one or more cameras are too close to the one or more cameras, device 100 displays alert 749 (e.g., "Too close") prompting the user to move the one or more cameras further away from the objects in the field of view, as shown in FIG. 7X.

Figure 7Y:
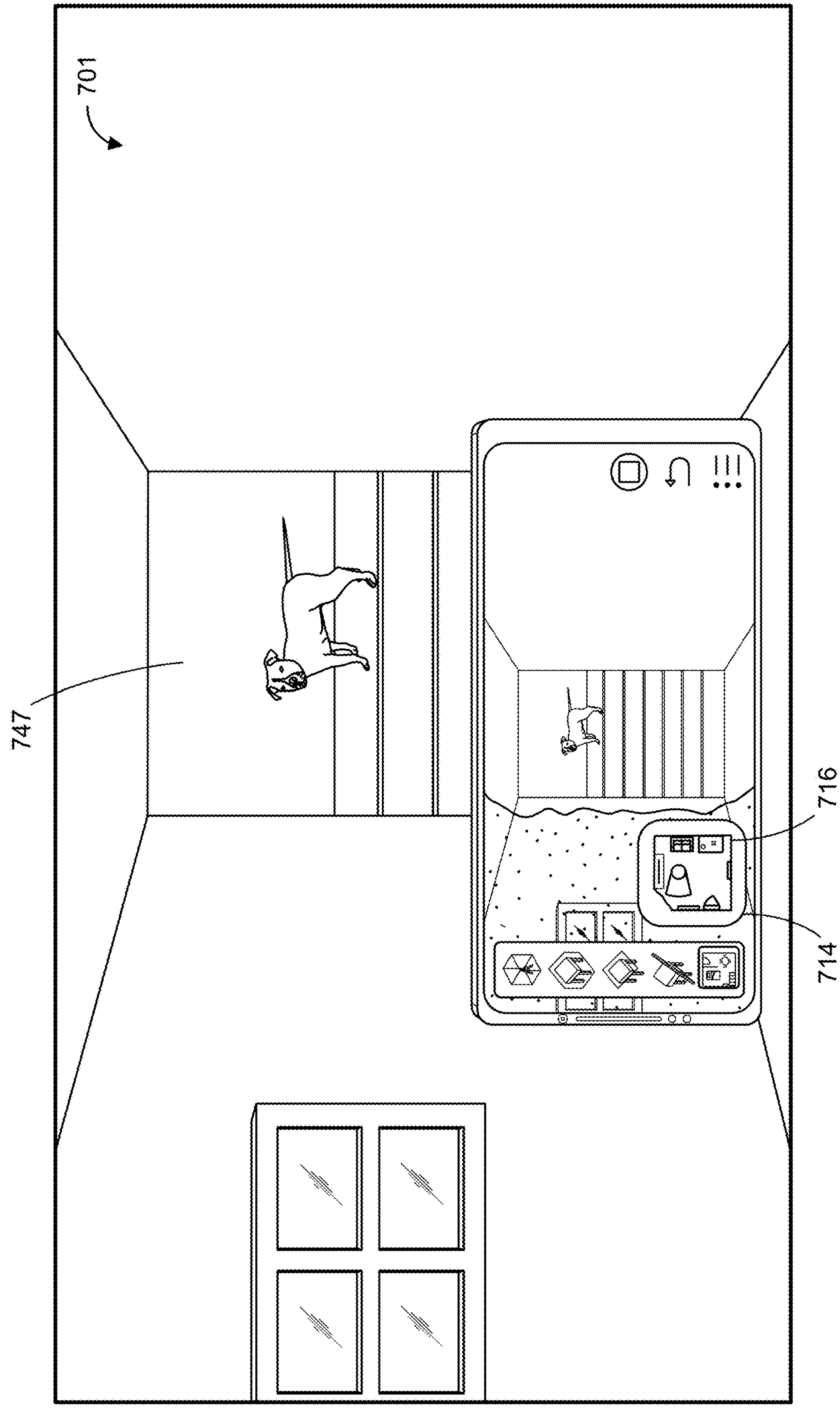
Figure 7Z:
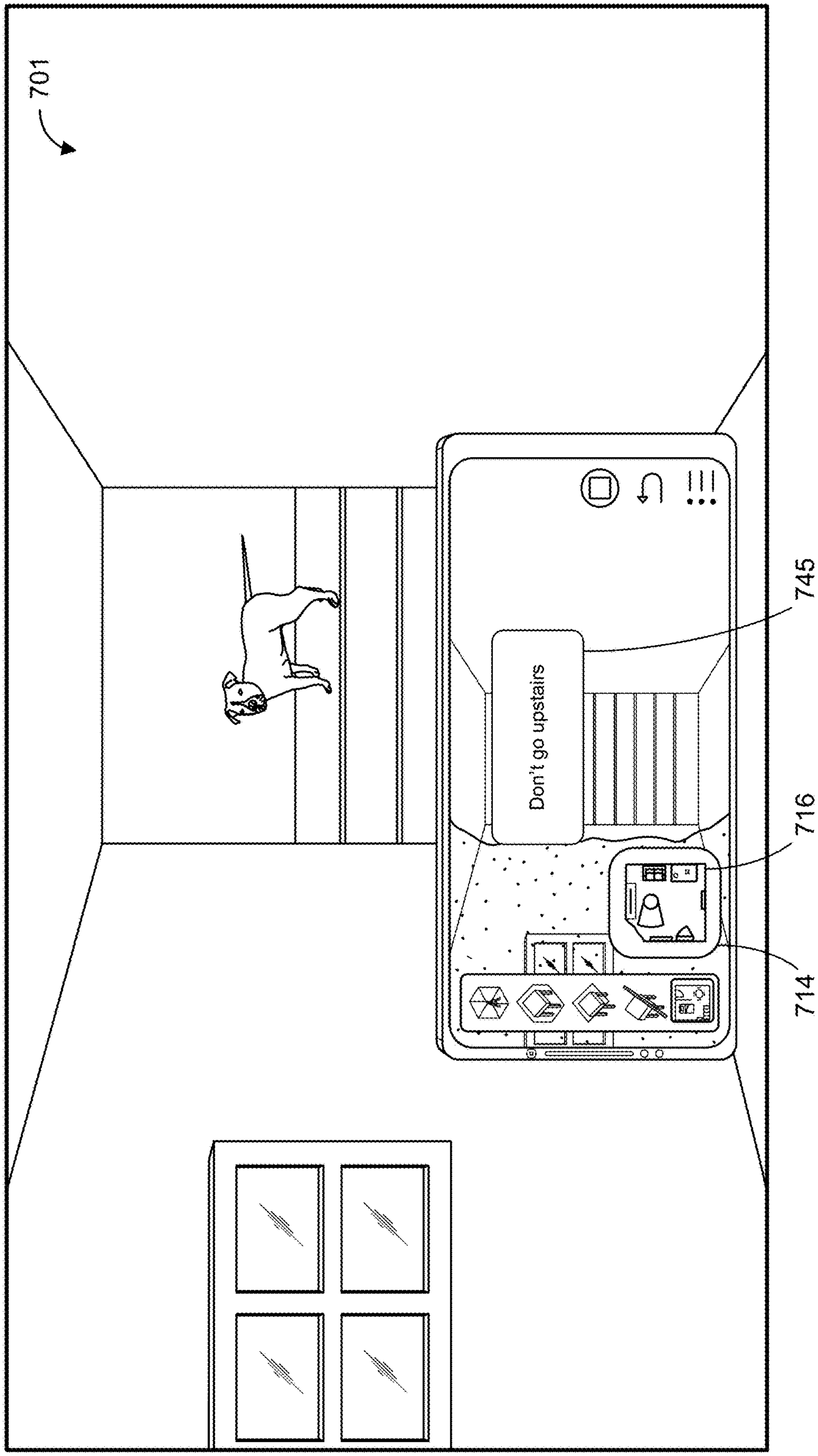
Figure 7A:
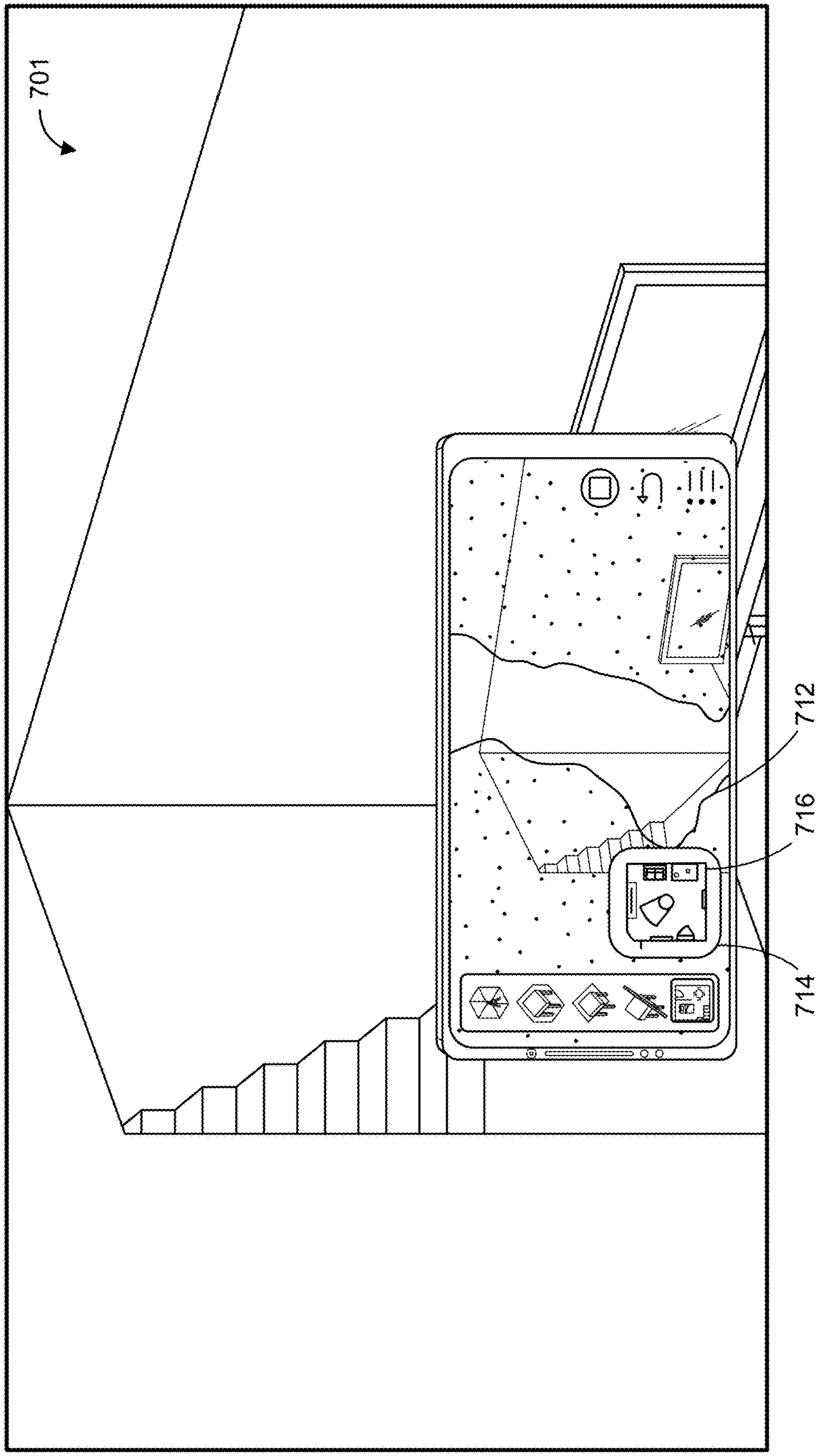
Figure 7A:
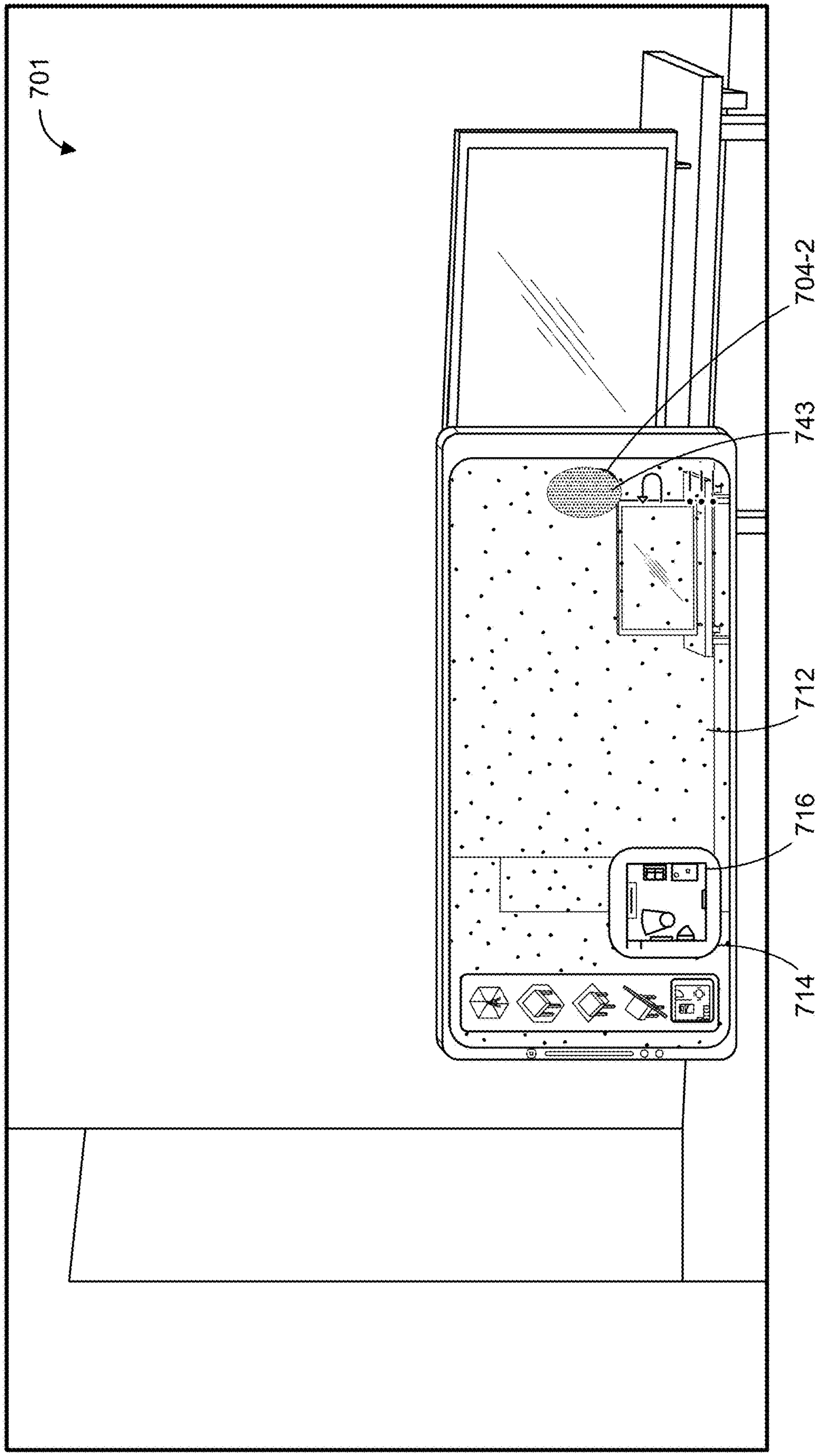
Figure 7A:
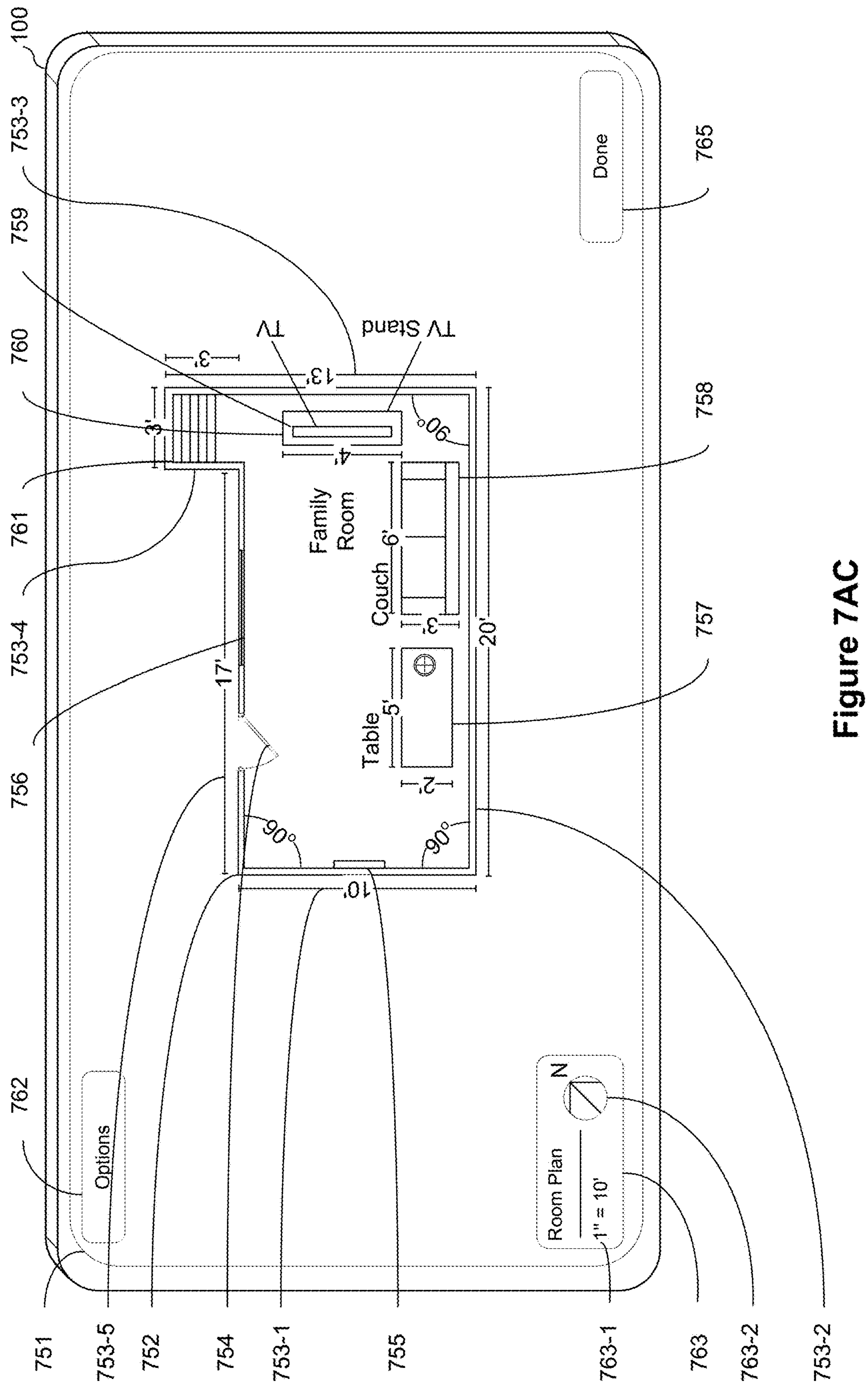
Figure 7A:
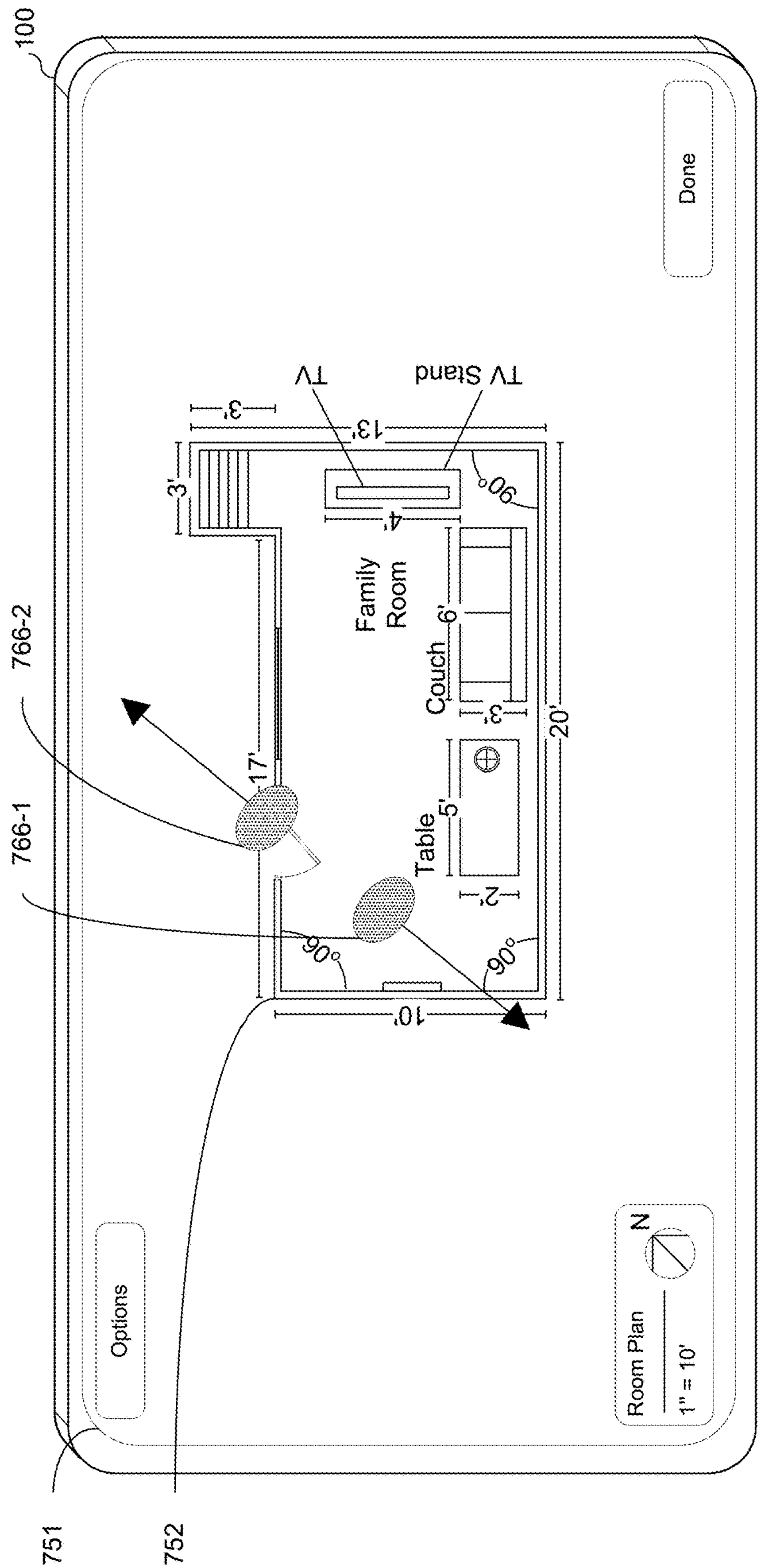
Figure 7A:
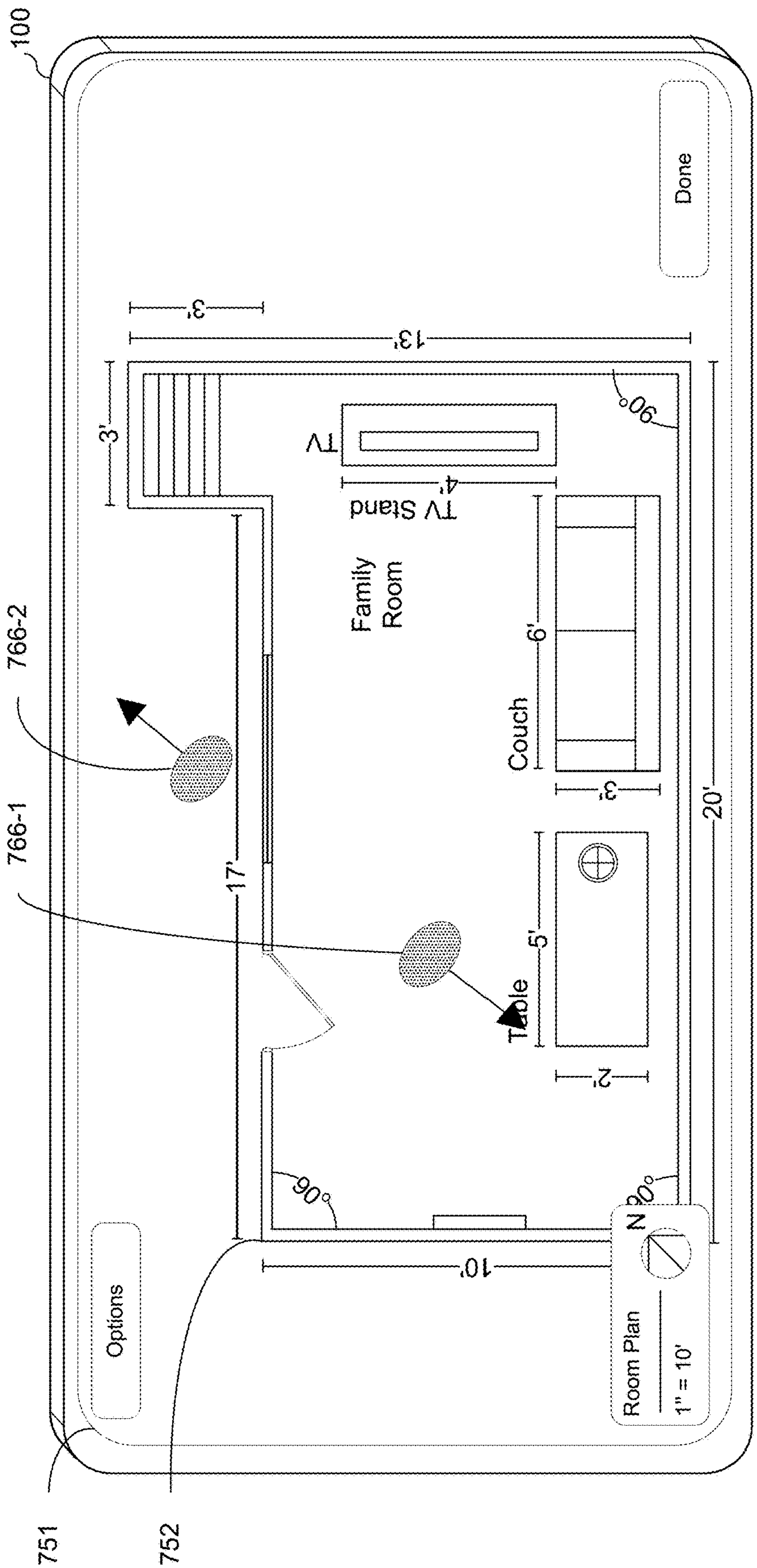
Figure 7A:
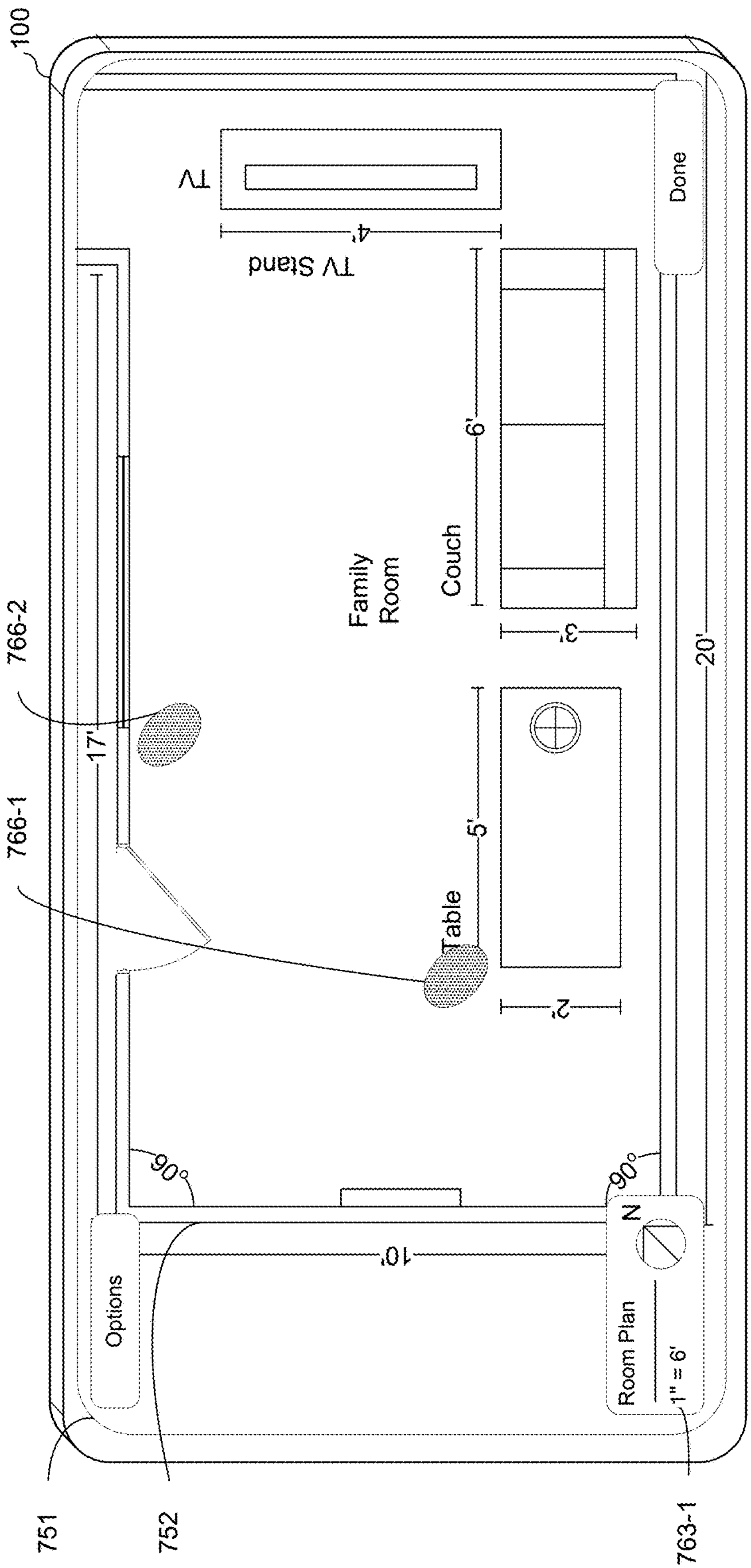
Figure 7A:
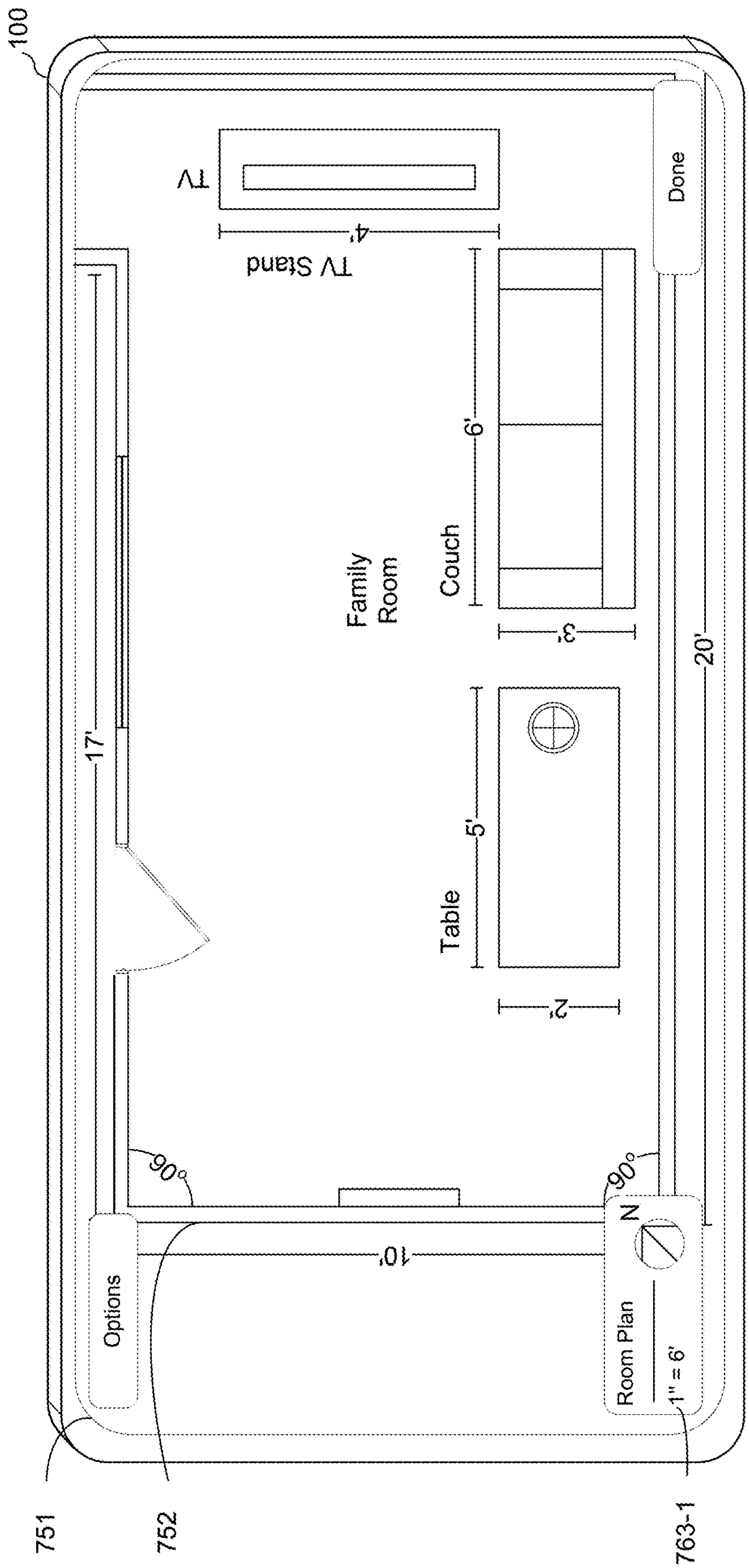
Figure 7A:
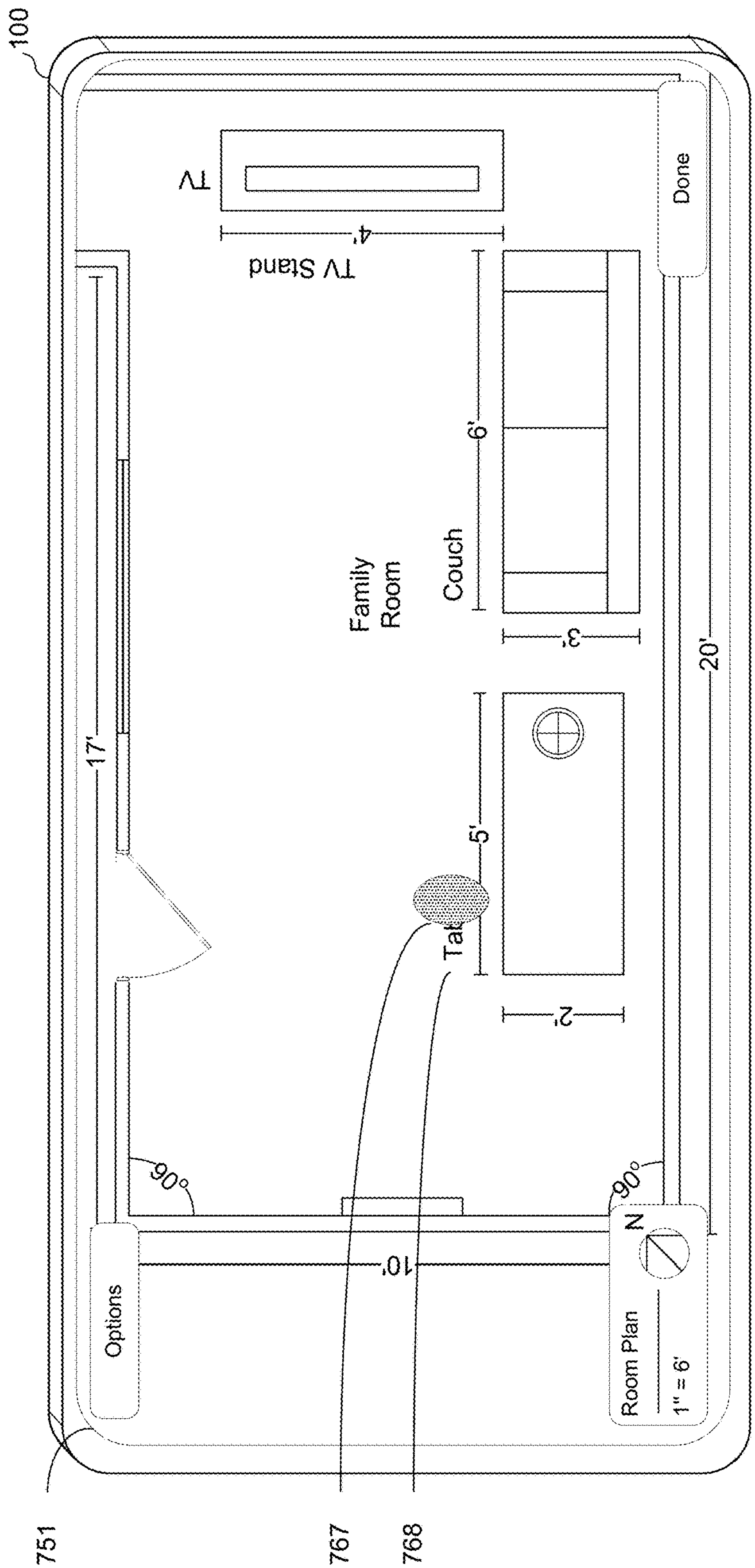
Figure 7A:
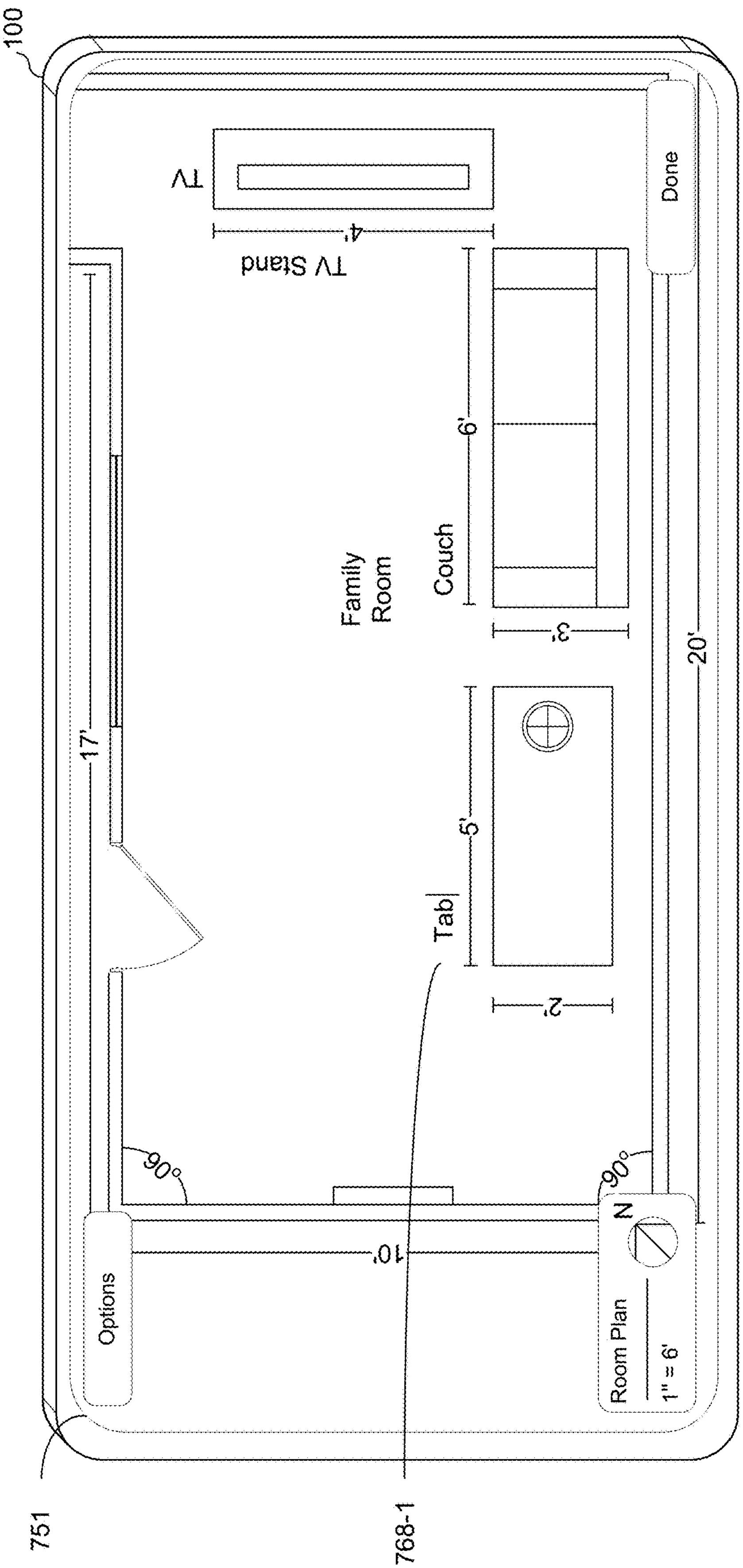
Figure 7A:
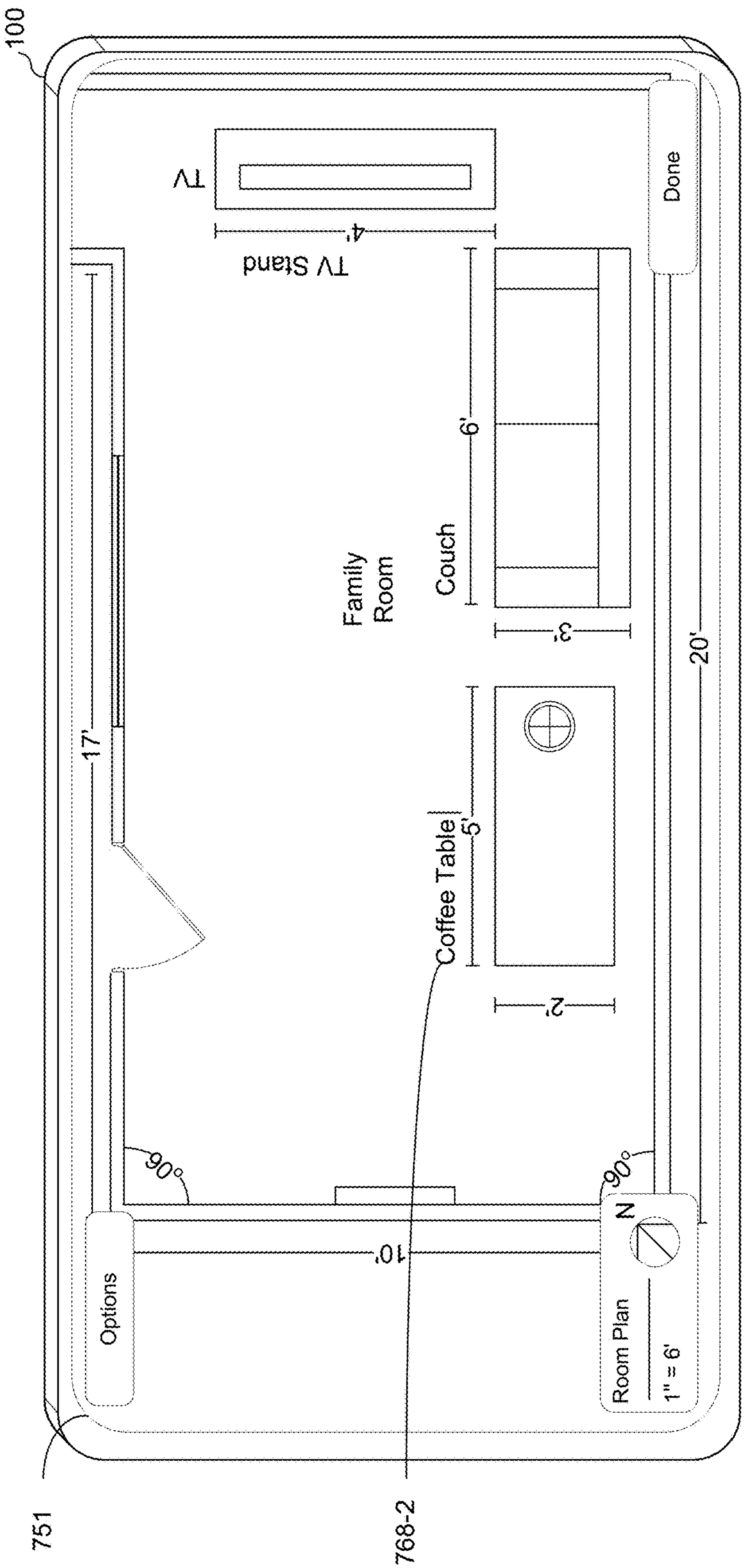
Figure 7A:
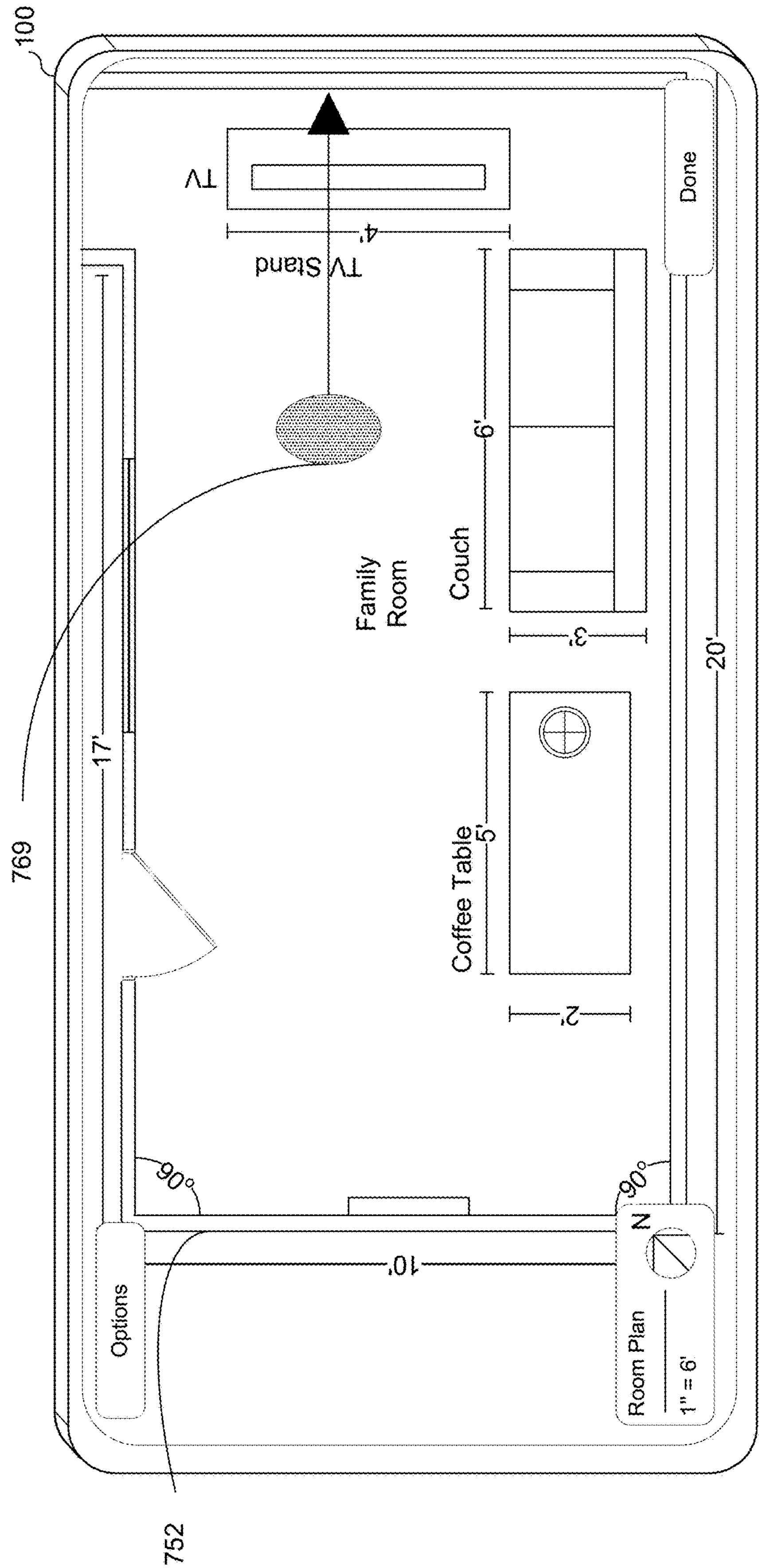
Figure 7A:
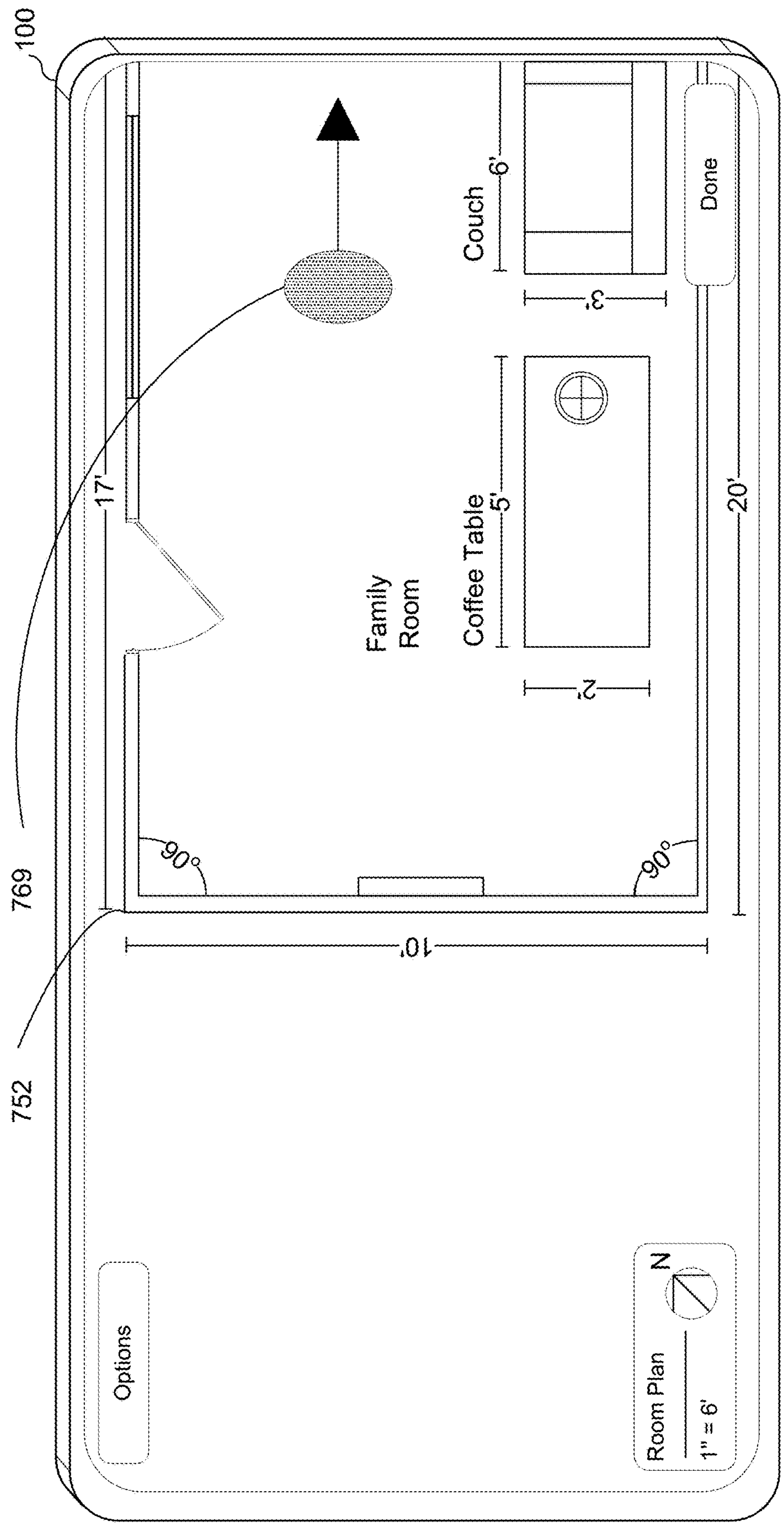
Figure 7A:
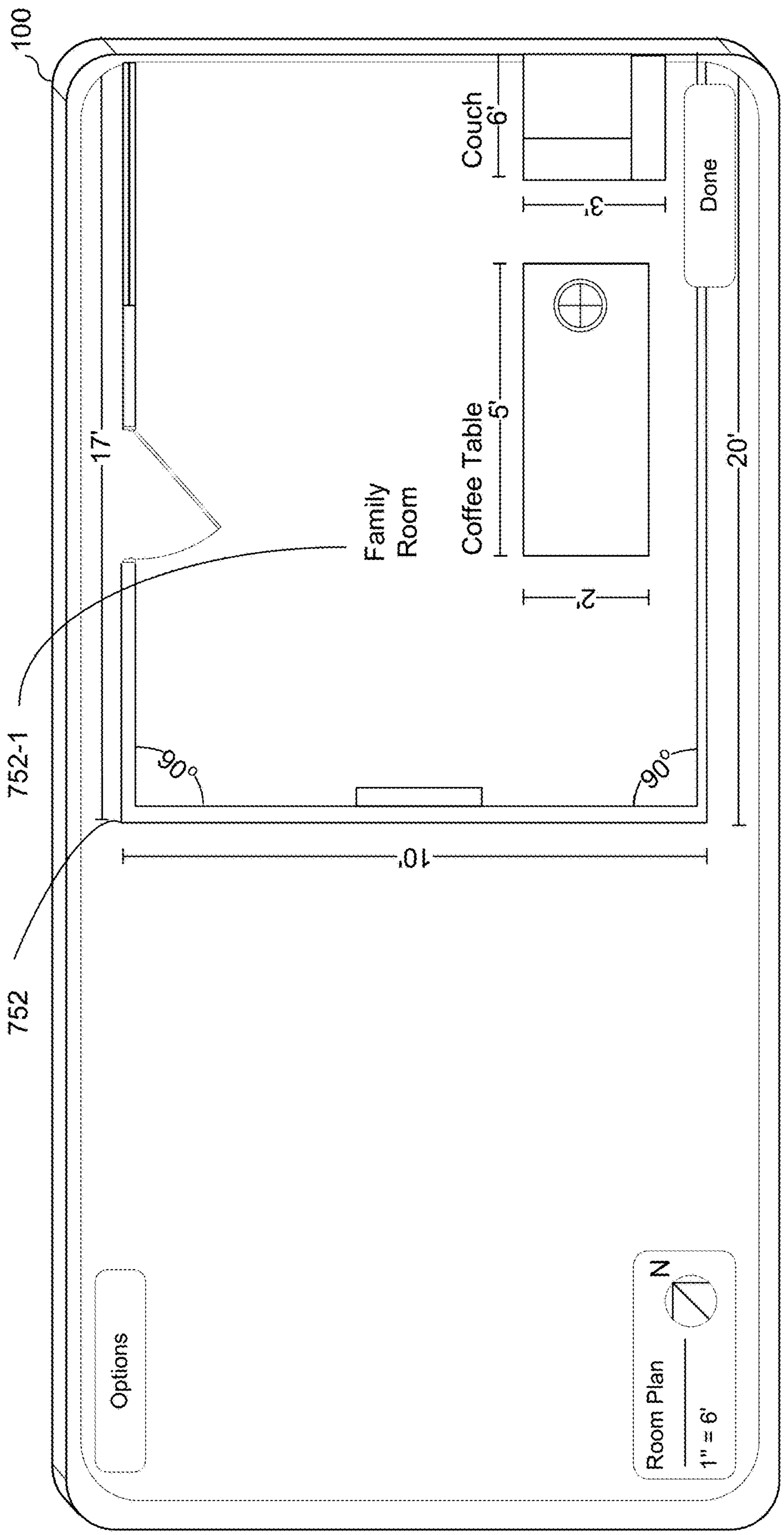
Figure 7A:
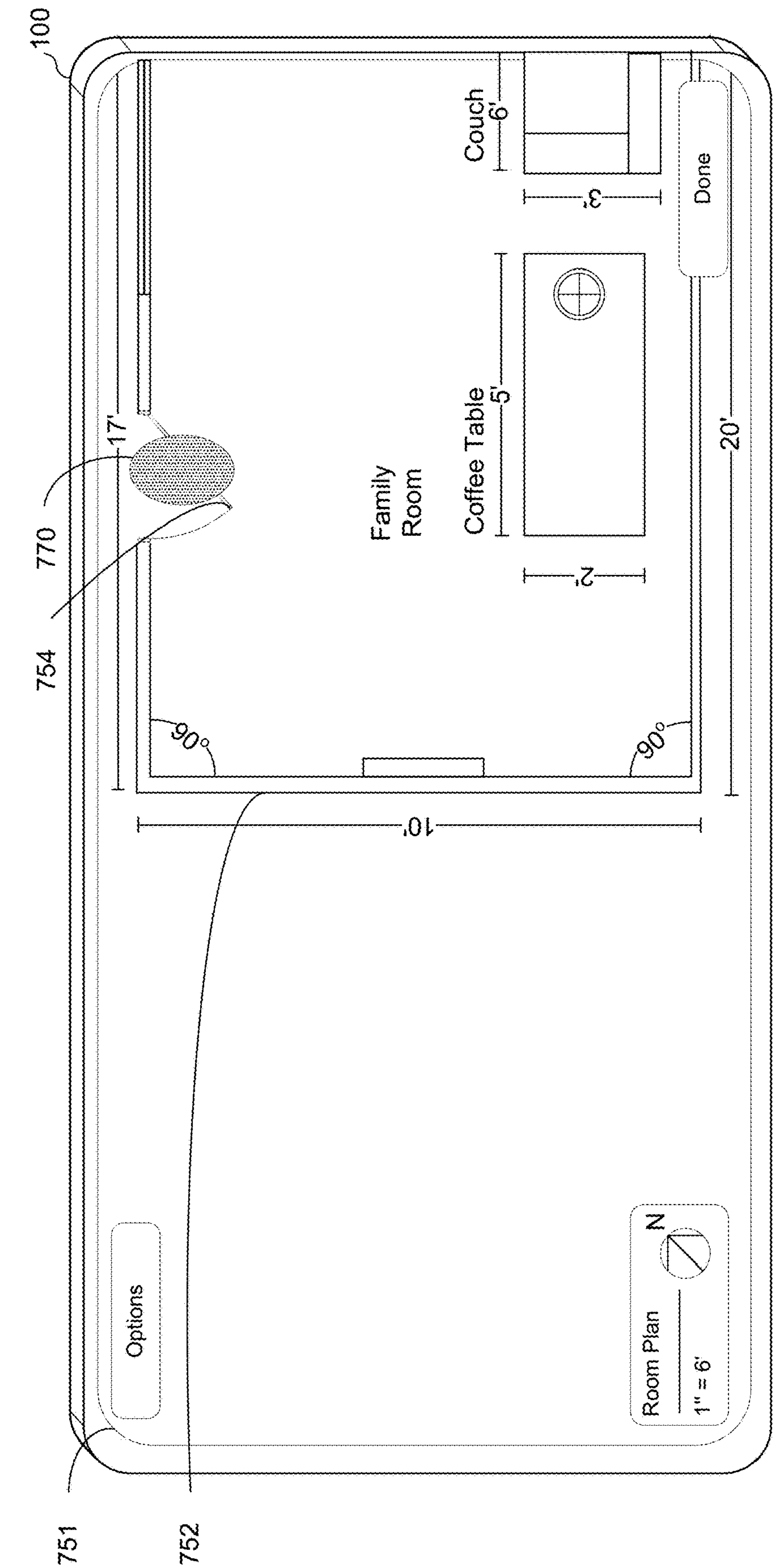
Figure 7A:
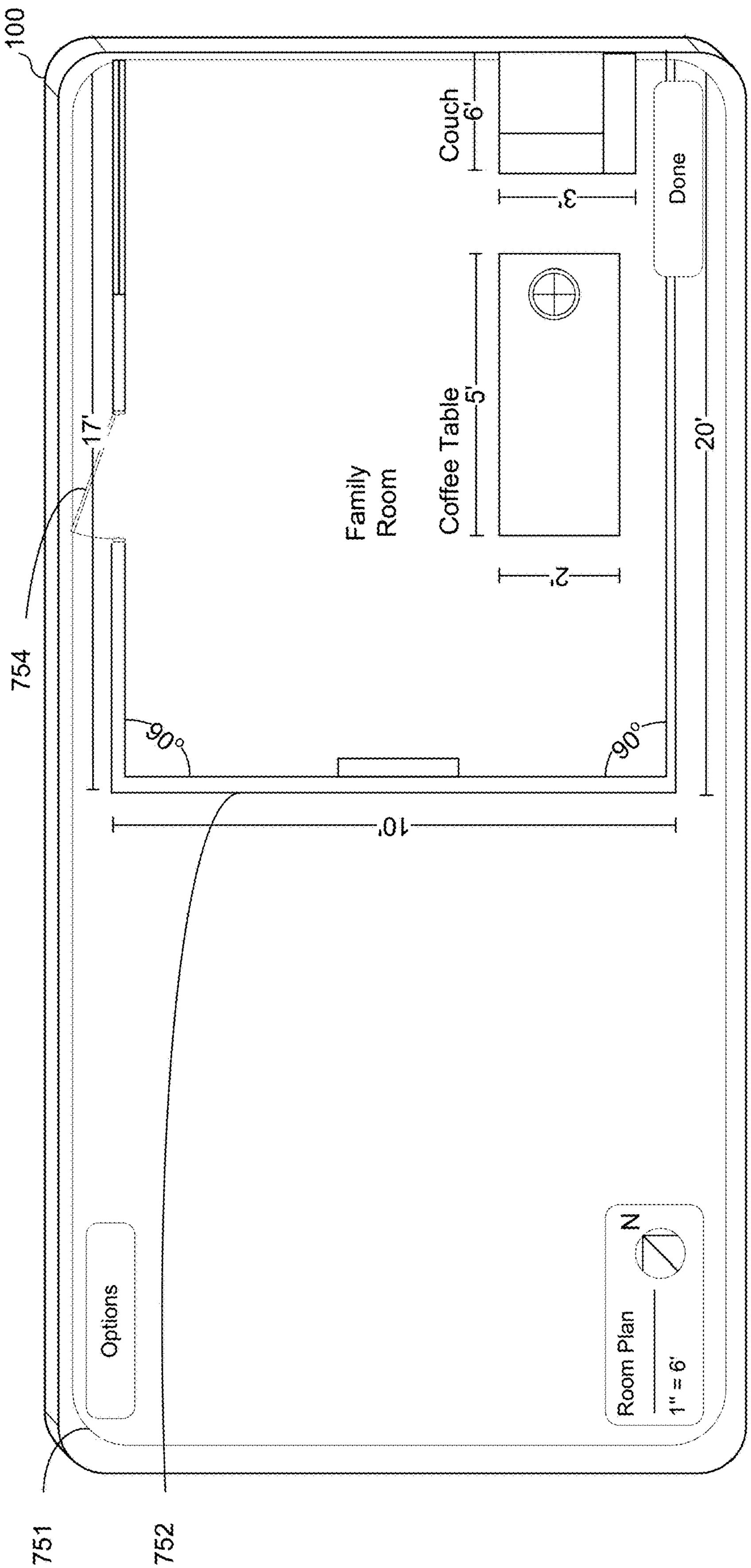
Figure 7A:
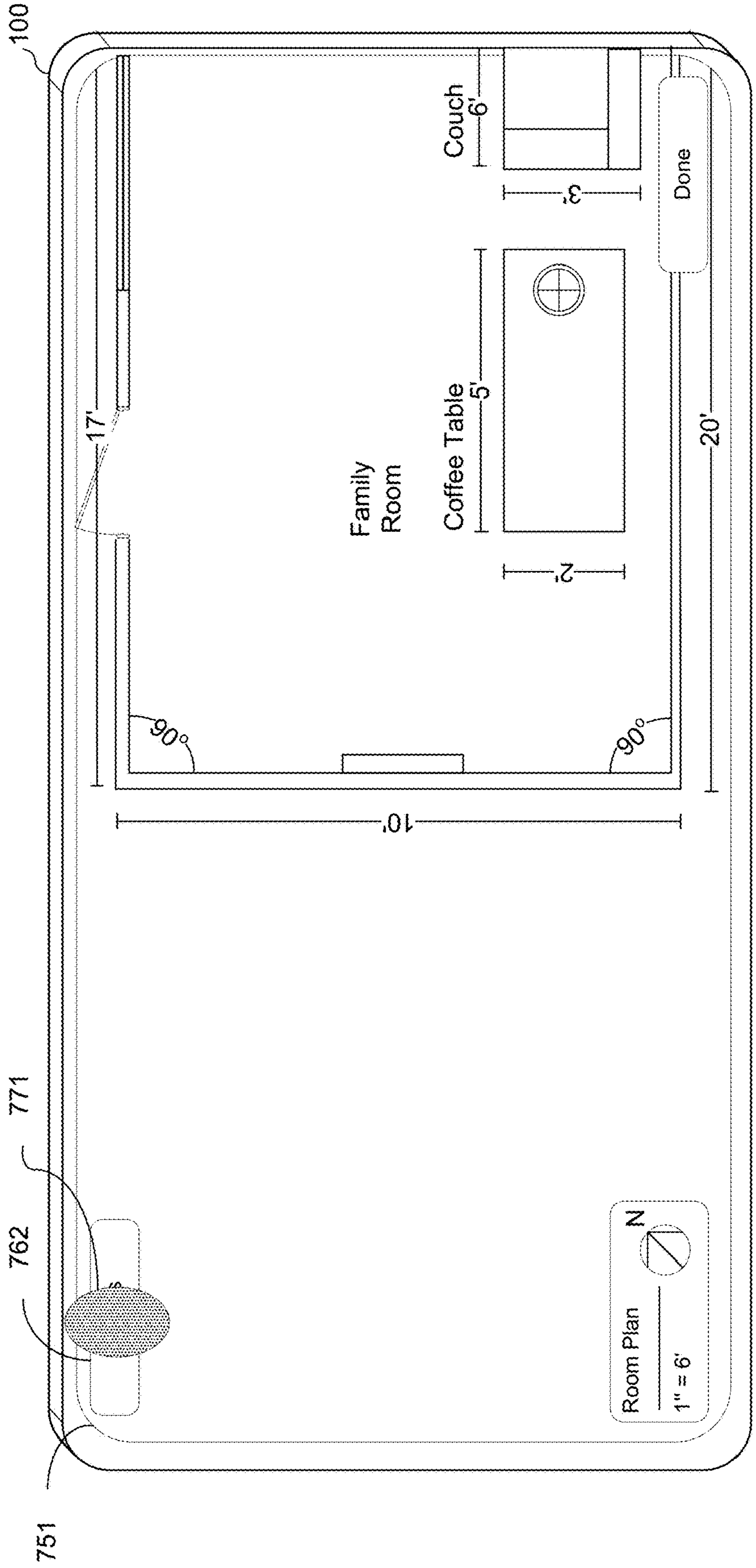
Figure 7A:
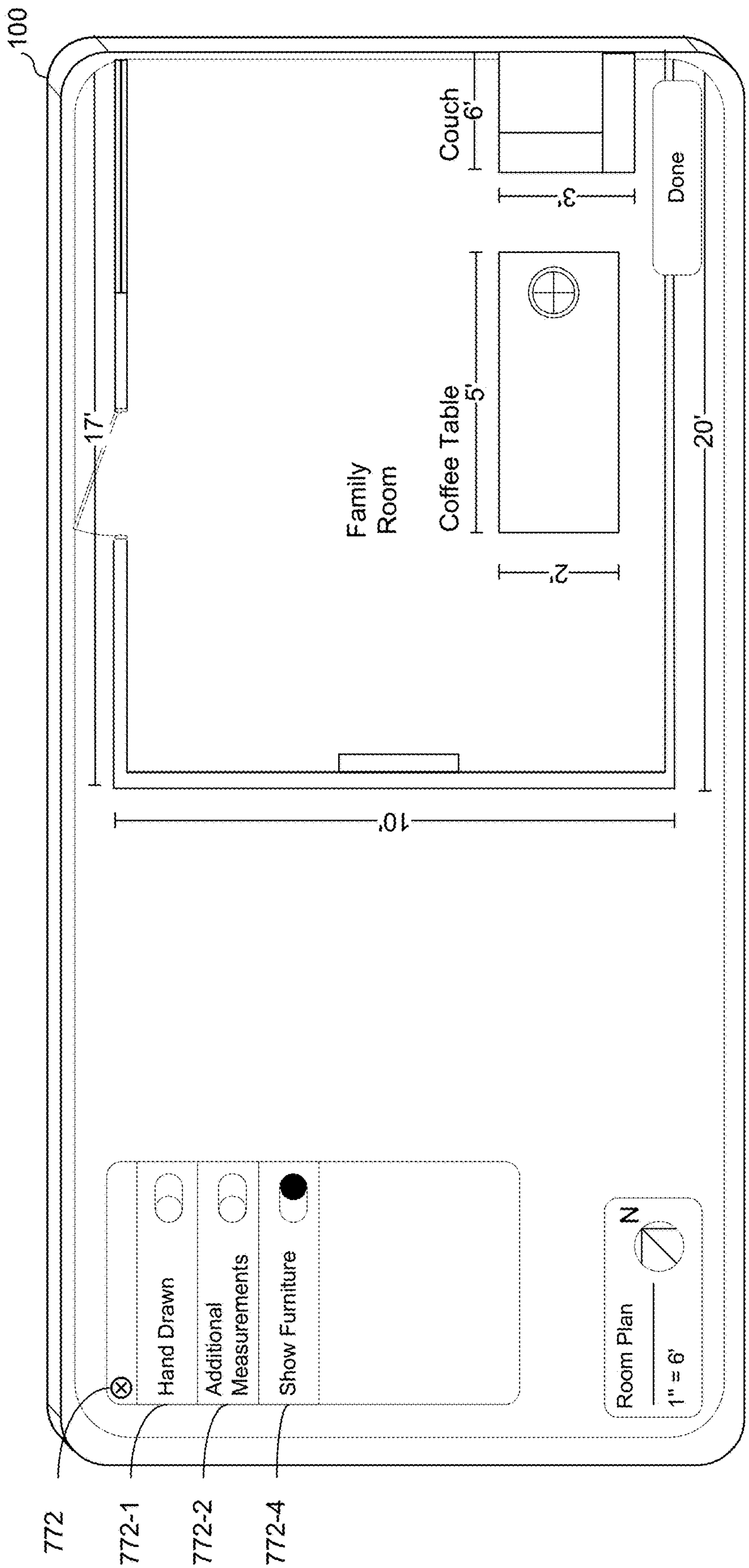
Figure 7A:
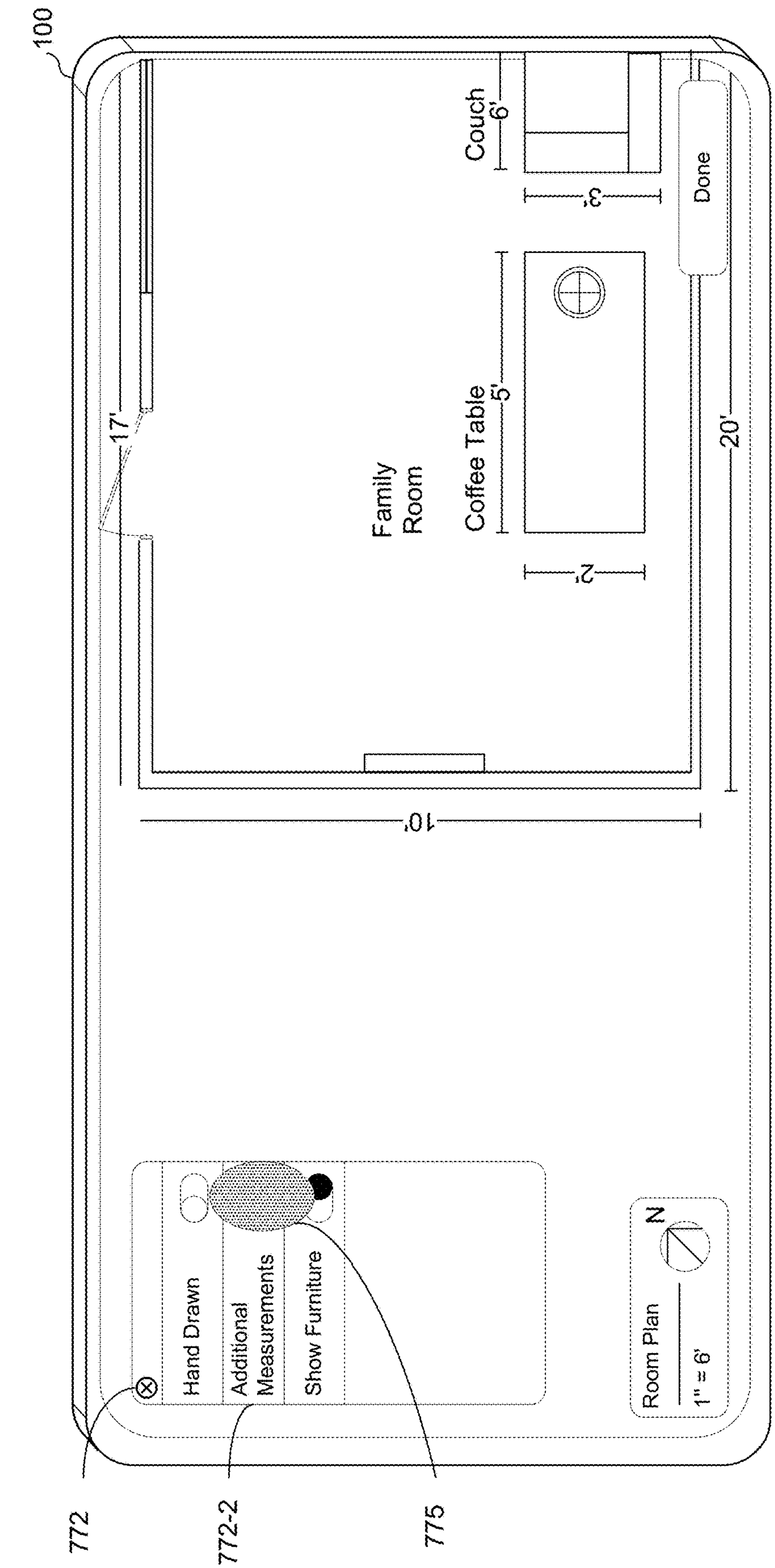
Figure 7A:
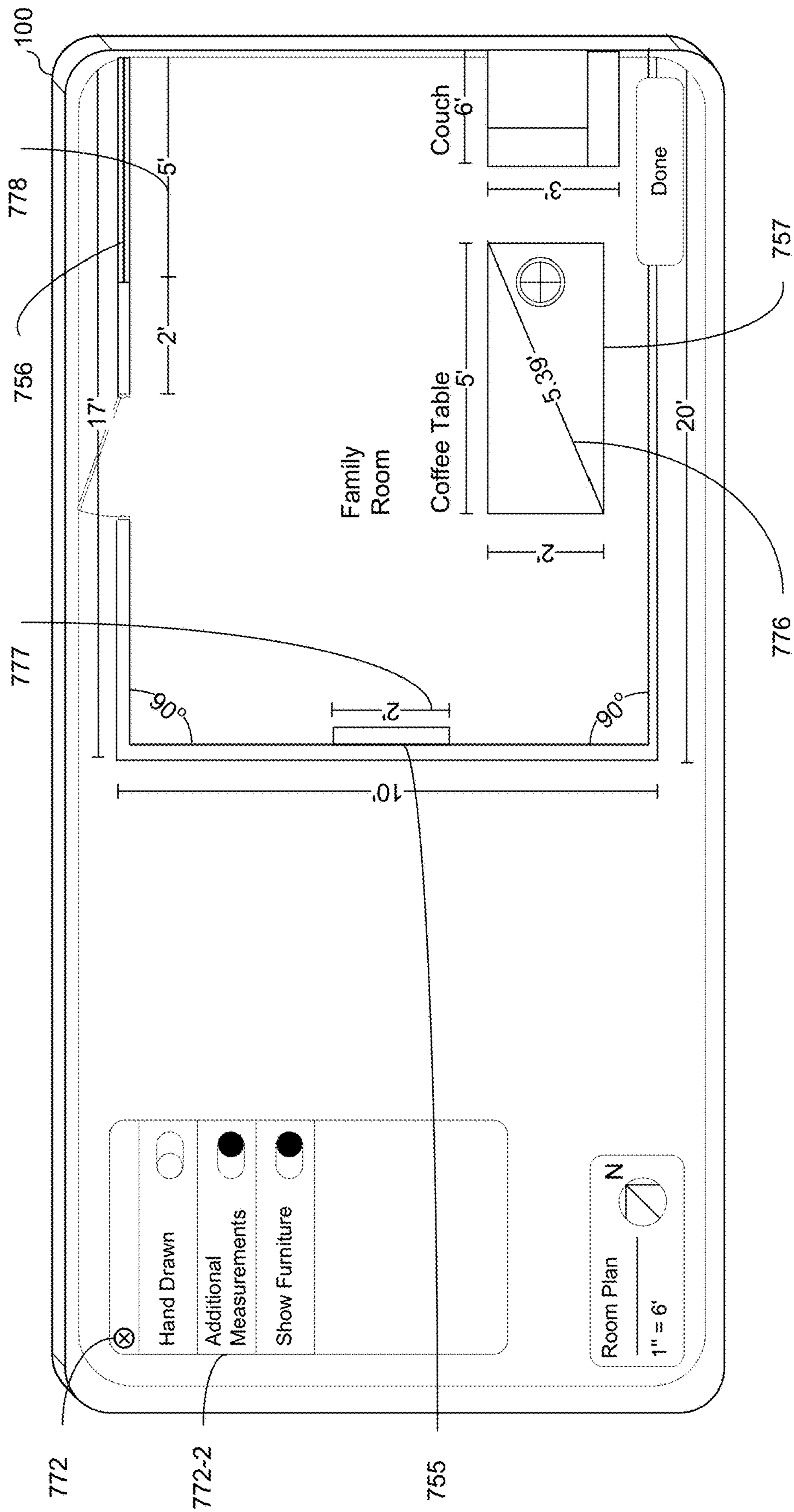
Figure 7A:
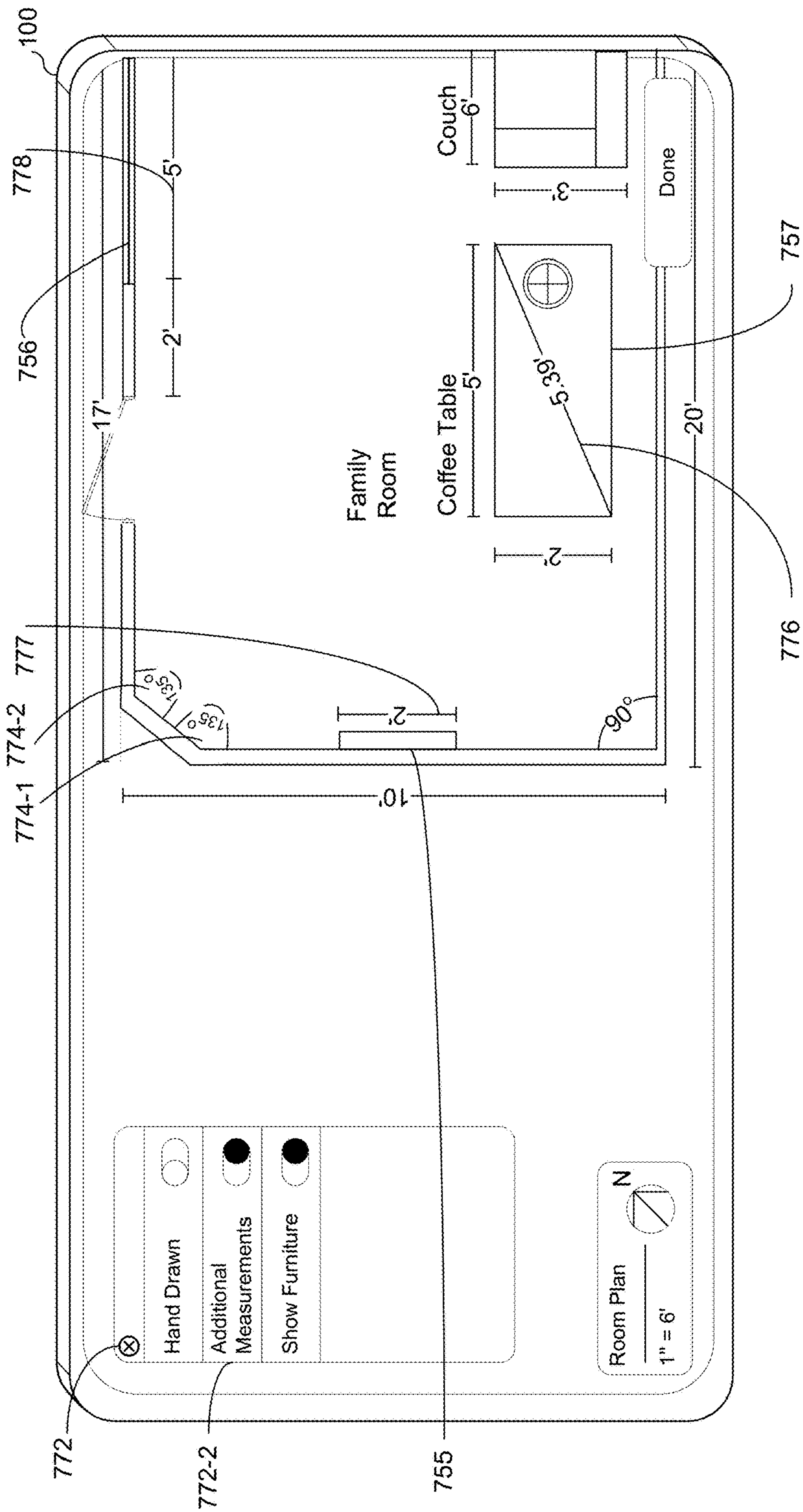
Figure 8B:
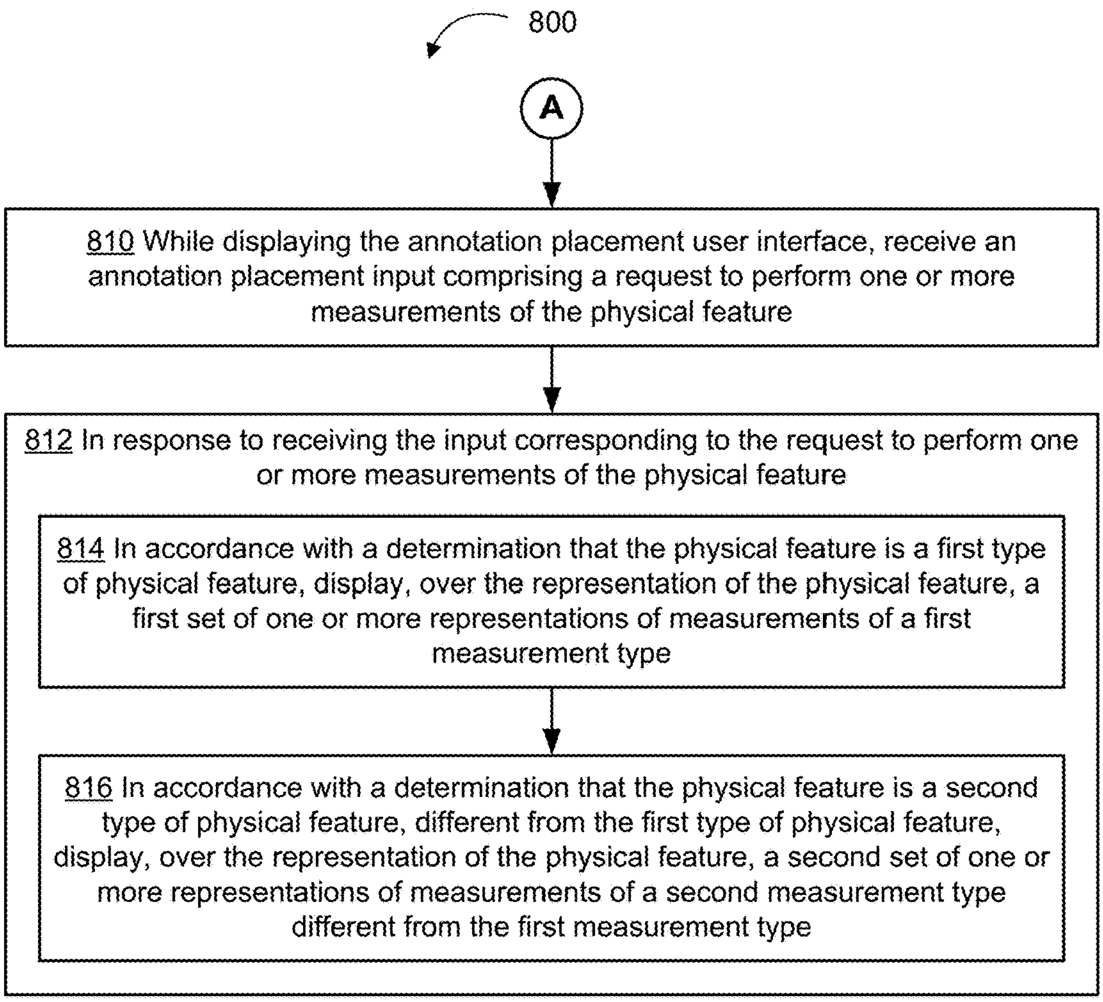

FIG. 7Y illustrates the result of continued movement of device 100 in physical environment 701, e.g., in a transition from FIG. 7S. In FIG. 7Y, the portion of physical environment 701 that is in the field of view of the one or more cameras of device 100 includes stairwell 747, which is an exit of the current room in which device 100 is currently located. In some embodiments, in accordance with a determination that the field of view of the one or more cameras includes an exit of the current room other than an entryway to an adjoining (e.g., interior) room (e.g., an outdoor exit, or stairs to a different building level), such as stairwell 747, device 100 displays an alert instructing the user not to leave the current room through that exit while scanning. In the example shown in FIG. 7Z, device 100 displays alert 745 (e.g., "Don't go upstairs") instructing the user not to take stairwell 747 to an upper building level while scanning. In another example, device 100 displays an alert (e.g., "Don't go downstairs") instructing the user not to take stairs to a lower building level while scanning. In yet another example, device 100 displays an alert (e.g., "Don't go outside") instructing the user not to exit to the outdoors while scanning.

FIG. 7AA illustrates the result of continued movement of device 100 in physical environment 701, e.g., in a transition from FIG. 7Y, and capture of information for additional portions of physical environment 701, including further expansion of overlay 712 in user interface 700, and further updating of map 716 in inset 714.

FIG. 7AB illustrates the result of continued movement of device 100 in physical environment 701, e.g., in a transition from FIG. 7AA, and capture of information for the final portions of physical environment 701, including further expansion of overlay 712 in user interface 700 such that overlay 712 is displayed over every portion of the representation of the current room physical environment 701, and further updating of map 716 in inset 714, such that map 716 provides a complete view of the current room of physical environment 701. FIG. 7AB also shows input 743 directed to scanning stop button 704-2 to end scanning of physical environment 701. In response to input 743, scanning of physical environment 701 is ended and, in some embodiments, a floor plan is generated and displayed using the information captured about physical environment 701 during the scanning process. An example of such a floor plan is described in further detail herein with reference to FIGS. 7AC-7AT.

FIG. 7AC shows the portable multifunction device 100 displaying a floor plan user interface 751 using information obtained while scanning the room (as described above with reference to FIGS. 7A-7AB). The floor plan user interface 751 includes a floor plan of a respective room, for example "Family Room" 752. The floor plan of the respective room includes multiple measurements of the bounding exterior walls 753-1 through 753-5 (e.g., their length and their angles relative to each other), a door 754, a fixture 755 (e.g., a mirror), and a window 756. Additionally, the floor plan of the respective room includes measurements of physical objects in the respective room, such as: a table 757, a couch 758, a TV 759, and a TV stand 760. In this example, stairs 761 are also shown in the floor plan of the respective room. In addition to the floor plan measurements, the floor plan user interface 751 includes an options user interface object 762, which when selected displays controls for changing visual attributes of the displayed floor plan. An information box 763 is also displayed, which includes information regarding the scale of the floor plan relative to the physical environment 763-1 (e.g., in FIG. 7AC the scale is, one-inch in the physical environment is equivalent to ten-feet in the virtual floor plan) and the room's orientation relative to cardinal directions 763-2 (e.g., by showing a representation of compass or compass pointer). Lastly, there is a "Done" button 765, which when selected closes the floor plan user interface 751, and also prompts the user to either save the floor plan to a photos application, save the floor plan to a file repository locally or remotely, or delete the floor plan.

FIG. 7AD shows a de-pinch gesture 766-1 and 766-2 occurring over the floor plan user interface 751, specifically, over the floor plan of the respective room. FIG. 7AE shows the response to the de-pinch gesture 766-1 and 766-2. In response to the de-pinch gesture 766-1 and 766-2 the room rescales; however, in some embodiments, the text labels and line thicknesses are not rescaled at the same rate as the floor plan. FIG. 7AE also shows the de-pinch gesture 766-1 and 766-2 continuing. FIG. 7AF shows the response to the continuation of the de-pinch gesture 766-1 and 766-2. In response to the continuation of the de-pinch gesture 766-1 and 766-2 the room rescales, however, the text labels and line thicknesses, again, are not rescaled at the same rate as the floor plan. FIG. 7AF shows cessation, or finishing, of the rescaling of the respective room in response to movement of the de-pinch gesture 766-1 and 766-2 stopping. FIG. 7AF also shows the scale of the floor plan relative to the physical environment 763-1 being updated.

FIG. 7AG shows the drawing scale of the rescaled floor plan of the respective room is automatically snapped to a new rescaled threshold, or to a respective drawing scale in a predefined set of drawing scales. In the example shown in FIG. 7AG, the new rescaled threshold is defined as 6 feet in the physical environment being equivalent to 1 inch in the virtual floor plan. In the rescaled environment the new scaling is reflected in by the scale of the floor plan relative to the physical environment 763-1 being updated.

In some embodiments, as shown in FIGS. 7AC to 7AG, one or more of the scanned objects (e.g., the table and the couch) are automatically identified by the device, and based on that identification, and without human intervention, the displayed representations of those objects in the floor plan are assigned titles or names. As a result, there may be instances where the user wants to change the assigned title or name of an object to a title or name specified by the user. FIGS. 7AH to FIG. 7AJ shows such an interaction.

FIG. 7AH shows an input 767 over the displayed name of an identified object, which in this example is labelled as a "Table" 768-1. FIG. 7AI shows a resulting user interface, which allows the user to change the name of the identified object. In some embodiments, the name changing (e.g., retitling) occurs in response to inputs received at a virtual keyboard that either overlays the underlying floor plan user interface 751 or is concurrently display with a rescaled version of the underlying floor plan user interface 751. In some embodiments, an external keyboard can be used, which would not cause the underlying floor plan user interface 751 to be overlaid or rescaled. FIG. 7AJ shows the identified object that was labelled as a "Table" 768-1, now labelled a "Coffee Table" 768-2.

FIG. 7AK shows a panning input 769 (e.g., a single finger swiping input, which in this example is moving in the rightward direction). FIG. 7AL shows the response to the panning input 769. FIG. 7AL shows that the floor plan of the respective room (e.g., the "Family Room" 752 in this example) is moved in accordance with the panning input 769. FIG. 7AL also shows the panning input 769 continuing over the floor plan of the respective room. FIG. 7AM shows the response to the panning input 769 continuing. The floor plan of the "Family Room" 752 is now no longer fully displayed on the display. In some embodiments, as shown in FIG. 7AM, in accordance with a determination that the panning input 769 causes portions of the floor plan of the respective room to no longer be displayed, the measurements are moved in order to keep them displayed despite their original position being no longer displayed. In addition, in some embodiments, a title or name of the respective room (e.g., the "Family Room" title 752-1 is moved so it remains on the display despite its original location no longer being displayed.

FIG. 7AN shows a tapping input 770 over the door 754. The door in FIG. 7AN shows the door 754 opening into the "Family Room" 752. In response to the tapping input 770, FIG. 7AO illustrates the door 754 opening away from the "Family Room" 752. In other words, a tapping input on a door can change the direction in which the door opens or closes.

FIG. 7AP now shows an input 771 over the options user interface object 762. FIG. 7AQ shows the response to the input 771 over the options user interface object 762. In FIG. 7AQ the options user interface object 762 is replaced or overlaid by an expanded options user interface 772. The expanded options user interface 772 includes a hand drawn toggle 772-1, an additional measurements toggle 772-2, and a show furniture toggle 772-4. The hand drawn toggle 772-1, when switched to the activated position, changes the appearance of the floor plan by making the floor plan appear as if it was hand-drawn (e.g., sketched). The additional measurements toggle 772-2, when switched to the activated position, causes the display of additional linear measurements (e.g., metrics) that were not originally displayed). In some embodiments, the additional measurements toggle 772-2, when switched to the activated position, causes the display of additional angles (e.g., angles other than 90 degree angles) that were not originally displayed. The show furniture toggle 772-4, when selected, causes furniture in the respective room that has been identified by the device to be displayed in the floor plan of the respective room.

FIG. 7AR shows an input 773 over the additional measurements toggle 772-3. FIG. 7AS shows the response to input 773. As described above, the additional measurements toggle 772-3, when switched to the activated position, causes the display (in the floor plan) of additional linear measurements (e.g., metrics) that were not originally displayed. FIG. 7AS shows additional measurements being displayed in the floor plan. For example, the new measurements included are: the table's 757 diagonal length 776, the width 777 of a fixture 755 (e.g., a mirror), and the width 778 of a window 756. While specific additional measurements are shown in this example, many other measurements may be shown in addition or instead of the ones shown.

FIG. 7AT shows an alternate embodiment where the input 775 over the additional measurements toggle 772-2 causes angles other than 90 degrees to be displayed. For example, FIG. 7AT shows additional angles (774-1 and 774-2) being displayed in response to activating the additional measurements toggle 772-2. In some embodiments, these additional angles are angles determined in the room to be greater or less than 90 degrees (e.g., 45 degrees or 135 degrees).

FIGS. 8A-8F are flow diagrams illustrating method 800 of displaying automatically determined measurements of a physical environment using augmented reality in accordance with some embodiments. Method 800 is performed at a computer system (e.g., portable multifunction device 100 (FIG. 1A), device 300 (FIG. 3A), or computer system 301 (FIG. 3B)) with a display device (e.g., a display, optionally touch-sensitive, a projector, a head-mounted display, a heads-up display, or the like, such as touch screen 112 (FIG. 1A), display 340 (FIG. 3A), or display generation component(s) 304 (FIG. 3B)), one or more cameras (e.g., optical sensor(s) 164 (FIG. 1A) or camera(s) 305 (FIG. 3B)), and optionally one or more depth sensing devices, such as depth sensors (e.g., one or more depth sensors such as time-of-flight sensor 220 (FIG. 2B)). Some operations in method 800 are, optionally, combined and/or the order of some operations is, optionally, changed.

As described herein, method 800 indicates when a reticle (e.g., reticle 504, as described in reference to FIGS. 5I-5N) in an annotation placement user interface is over a representation of a physical feature that can be measured, and, in response to a request to perform one or more measurements of the physical feature, automatically determines a type of measurement to make of the physical feature based on what type of feature the physical feature is determined to be, without requiring the user to provide inputs to specify which type of measurement to make (e.g., by selecting a particular annotation mode of the annotation placement user interface. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system displays (802), via the display device, an annotation placement user interface (e.g., a user interface of an augmented reality measurement application). The annotation placement user interface includes: a representation of a field of view of the one or more cameras, including a representation of a portion of a three-dimensional physical environment that is in the field of view of the one or more cameras (e.g., as shown in FIGS. 5C and 5D), wherein the representation of the field of view is updated over time based on changes in the field of view of the one or more cameras (e.g., the representation of the field of view is a live view that is updated based on changes in the physical environment that are within the field of view and/or based on movement of the one or more cameras that changes which portion of the physical environment is within the field of view); and a placement user interface element (e.g., reticle 504) that indicates (e.g., via a dot or other marker of the reticle) a location at which a virtual annotation (e.g., a representation of a measurement) would be placed in the representation of the field of view in response to receiving an annotation placement input (e.g., as described in reference to FIGS. 5R-5S).

In some embodiments, while displaying the annotation placement user interface, the computer system detects (804) a first movement of the one or more cameras relative to the physical environment.

In response to detecting the first movement of the one or more cameras relative to the physical environment, the computer system updates (806) the representation of the field of view based on the first movement of the one or more cameras (e.g., as described in reference to FIGS. 5C and 5D).

In accordance with a determination that the placement user interface element (e.g., as described in reference to reticle 504 being placed based on movement of the device 100) is over at least a portion of a representation of a physical feature in the physical environment that can be measured, the computer system changes (808) an appearance of the placement user interface element in accordance with one or more aspects of the representation of the physical feature (e.g., to align with or conform to one or more aspects of the representation of the physical feature, such as to highlight or mark one or more edges, vertices, boundaries, or the like of the physical feature, such that the representation of the physical feature is visually emphasized relative to the representation of the field of view and/or to indicate a type of measurement that will be performed with respect to the physical feature such as a length, height, area, and/or volume measurement) (e.g., as described in reference to reticle 504 changing in FIGS. 5I-5N, 5T-5X, and 5AI-5AJ).

While displaying the annotation placement user interface, the computer system receives (810) an annotation placement input comprising a request to perform one or more measurements of the physical feature (e.g., as described in reference to FIGS. 5G-5H, 5R-5T, and 5W-5X).

In some embodiments, one or more measurements are performed (e.g., determined) by the system without regard to (e.g., prior to or without receiving) a user input requesting the performance of the one or more measurements. In some embodiments, the received annotation placement input includes a request to display one or more measurements of a physical feature (e.g., instead of a request to perform one or more measurements of a physical feature). Stated another way, in some embodiments, a user input that is an annotation placement input includes or corresponds to a request to add or display one or more representations of one or more measurements already performed or determined by the system.

In response to receiving the input corresponding to the request to perform one or more measurements of the physical feature (812): in accordance with a determination that the physical feature is a first type of physical feature (e.g., an edge of a physical object) (814), the computer system displays, over the representation of the physical feature, a first set of one or more representations of measurements (e.g., of the physical feature) of a first measurement type (e.g., a one-dimensional measurement type that measures point-to-point distance (e.g., as described in reference to FIGS. 5F-5H and 5S-5T), for example of the length of an edge of an object, such as a table); and, in accordance with a determination that the physical feature is a second type of physical feature (e.g., a two-dimensional surface of a physical object, such as a table, wall, window, etc.) (816), different from the first type of physical feature, the computer system displays, over the representation of the physical feature, a second set of one or more representations of measurements (e.g., of the physical feature) of a second measurement type (e.g., a two-dimensional measurement type that measures area, for example of the two-dimensional surface, and optionally one or more point-to-point distances, for example of the lengths of edges of the surface that are in the field of view of the one or more cameras) different from the first measurement type (e.g., as described in reference to FIGS. 5I-5K). In some embodiments, the first type of feature can be any type of feature, such as one of the feature types described below, such as a piece of furniture (822), a person (824) or part of a person, such as the person's face, eyes (828), hand(s) (832), or foot/feet (830), an animal (826), etc. Examples of such features and their measurement are described in reference to FIGS. 5F-5AL. In some embodiments, the second type of feature can be any one of the same set of feature types, so long as the second type of feature is different from the first type of feature.

In some embodiments, the physical feature is (818) a first respective type of physical feature, the physical feature is a first portion (e.g., corresponding to a first dimension) of a physical object in the physical environment that is in the field of view of the one or more cameras, and a second portion (e.g., corresponding to a second dimension) of the physical object is at most partially in the field of view of the one or more cameras (e.g., the second portion is not fully in the field of view), examples of which are shown in FIGS. 5F-5N. In some embodiments, after displaying, over the representation of the physical feature, a first respective set of one or more representations of measurements of a first respective measurement type (e.g., in accordance with the physical feature being the first respective type of physical feature), the computer system detects a second movement of the one or more cameras relative to the physical environment such that the second portion of the physical object is (e.g., fully) in the field of view of the one or more cameras. In some embodiments, in response to detecting the second movement of the one or more cameras, the computer system updates the representation of the field of view based on the second movement of the one or more cameras, including displaying, in the representation of the field of view, a representation of the physical object that includes a representation of the second portion of the physical object (e.g., and optionally representations of one or more other portions of the physical object, such as the first portion, that are in the field of view of the one or more cameras).

In some embodiments, in accordance with a determination that the placement user interface element (e.g., reticle 504) is over at least a portion of the representation of the physical object (e.g., and in accordance with a determination that the physical object can be measured), the computer system changes the appearance of the placement user interface element in accordance with one or more aspects of the representation of the physical object including the second portion of the physical object (e.g., to take into account, by aligning to or conforming with, one or more aspects of the representation of the second portion, in addition to aspects of displayed representations of any other portions of the physical object, such as the first portion, for example to highlight or mark one or more edges, vertices, boundaries, or the like of the portion(s) of the physical object, such that the representation of the physical object is visually emphasized relative to the representation of the field of view and/or to indicate a type of measurement that will be performed with respect to the physical object such as a length, height, area, and/or volume measurement), examples of which are described above in reference to FIGS. 5F-5T.

In some embodiments, while displaying the annotation placement user interface including the representation of the physical object, the computer system receives a second annotation placement input comprising a request to perform one or more measurements of the physical object. In some embodiments, in response to receiving the input corresponding to the request to perform one or more measurements of the physical object, the computer system displays, over the representation of the physical object, a second respective set of one or more representations of measurements of a second respective measurement type that is based on the second portion of the physical object, examples of which are described above in reference to FIGS. 5I-5N.

In some embodiments, the second respective measurement type is based on the second portion and any other portions, such as the first portion, of the physical object that are in the field of view of the one or more cameras. In some embodiments, if the first portion of the physical object is no longer in the field of view of the one or more cameras, the second respective measurement type is based on the second portion of the physical object and not on the first portion of the physical object. In some embodiments, the second respective measurement type is based on the second portion and the first portion of the physical object without regard to whether the first portion is (e.g., remains) in the field of view of the one or more cameras, by using information previously obtained about the first portion. For example, the first portion of the physical object is a first edge of the physical object, and the first respective measurement type measures a point-to-point distance (e.g., the length of the first edge). In some scenarios of this example, the second portion of the physical object is a second edge of the physical object that is adjacent to the first edge, and the second respective measurement type measures area (e.g., of a surface of the physical object bounded by at least the first edge and the second edge) and, optionally, the length of the first edge and the length of the second edge. In a second example, the first portion of the physical object is a first surface of the physical object, and the first respective measurement type measures area of the first surface (and, optionally, the length(s) of the edge(s) of the first surface) (e.g., as described above in reference to FIGS. 5I-5N). In some scenarios of this second example, the second portion of the physical object is an edge of the physical object that is incident to the first surface, and the second respective measurement type measures volume of the physical object, and, optionally, the area of the first surface, the length(s) of the edge(s) of the first surface and/or the length of the incident edge.

As movement of the one or more cameras brings additional portions of a physical object in the field of view of the one or more cameras into view, changing the appearance of the placement user interface element to take into account the additional portions of the physical object provides visual feedback to the user indicating that a different type of measurement of the physical object has become available, and automatically enabling making a measurement of the different type enables the user to access additional control options without needing to navigate through complex menu hierarchies. Providing improved visual feedback to the user, and (e.g., automatically) providing additional control options when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, a first portion of a physical object in the physical environment is (820) in the field of view of the one or more cameras, the first portion of the physical object includes an edge region that is adjacent to a second portion of the physical object that is not in the field of view, or is only partially in the field of view, of the one or more cameras (e.g., the field of view of the one or more cameras includes a partial view of the physical object). In some embodiments, the computer system displays, in the representation of the field of view of the one or more cameras, a representation of the first portion of the physical object, including visually deemphasizing (e.g., fading) the representation of the edge region that is adjacent to the second portion of the physical object (e.g., as described in reference to FIGS. 5F-5G). In some embodiments, points in the edge region are progressively deemphasized the closer they are to the second portion of the physical object (e.g., a first point in the edge region that is a first distance from the boundary between the first portion and the second portion of the physical object is visually deemphasized relative to a second point in the edge region that is a second distance, greater than the first distance, from the boundary).

Visually deemphasizing (e.g., fading) representations of visible portions of a physical object that are adjacent to portions of the physical object that are not in view provides visual feedback informing the user that the physical object is not fully in view and prompting the user to move the one or more cameras if the user wishes to more fully view and/or measure the physical object. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the determination that the physical feature is the first type of physical feature includes (822) a determination by the system that the physical feature is a piece of furniture, and the measurements of the first measurement type include one or more of: a height, a width, a depth, and a volume of the physical feature.

Performing height, width, depth, and/or volume measurements of a physical feature (e.g., a physical object) determined to be a piece of furniture provides intelligent measurement functionality that measures dimensions and aspects of the physical feature that are relevant to its type and that are likely to be of interest to the user, without requiring the user to provide inputs to specify which type(s) of measurements the user would like to make of the physical feature. Performing an operation (e.g., automatically) when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the determination that the physical feature is the first type of physical feature includes (824) a determination by the system that the physical feature is a person, and the measurements of the first measurement type include a distance between a base of the person (e.g., the bottom of the person's foot, or the surface on which the person's foot is placed while standing or sitting) and a top of the person (e.g., the top of the person's head). In some embodiments, the representation of the distance from the base of the person to the top of the person includes a measurement segment from the base of the person to the top of the person and/or a text label indicating the distance (e.g., as described in reference to FIGS. 5Z-5AB). In some embodiments, if the person is standing, the distance from the base of the person to the top of the person is the person's height. In some embodiments, if the person is sitting, the distance from the base of the person to the top of the person is the person's height while seated. In some embodiments, the set of representations of measurements for a person includes an indication of the base of the person (e.g., an annotation indicating the bottom of the person's foot or the surface on which the person's foot is planted). In some embodiments, the base of the person is identified automatically by the system without requiring user input to mark the location of the base of the person.

Performing a height measurement of a physical feature determined by the system to be a person provides intelligent measurement functionality that measures dimensions and aspects of the physical feature that are relevant to its type and that are likely to be of interest to the user, without requiring the user to provide inputs to specify which type(s) of measurements the user would like to make of the physical feature. Performing an operation (e.g., automatically) when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the determination that the physical feature is the first type of physical feature includes (826) a determination by the system that the physical feature is an animal (e.g., a pet such as a dog or cat), and the measurements of the first measurement type include one or more of: a neck circumference of the animal, a chest circumference of the animal, and a length of the animal (e.g., the length of the animal's back, from the base of the animal's neck to the base of the animal's tail) (e.g., as described in reference to FIG. 5AG).

Performing neck circumference, chest circumference, and/or length measurements of a physical feature determined by the system to be an animal (e.g., a pet) provides intelligent measurement functionality that measures dimensions and aspects of the physical feature that are relevant to its type and that are likely to be of interest to the user (e.g., in selecting apparel and accessories for the pet), without requiring the user to provide inputs to specify which type(s) of measurements the user would like to make of the physical feature. Performing an operation (e.g., automatically) when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the determination that the physical feature is the first type of physical feature includes (828) a determination by the system that the physical feature is a face of a person, and the measurements of the first measurement type include a distance between a first pupil of a first eye of the person and a second pupil of a second eye of the person (e.g., the distance between the centers of the pupils, also called "pupillary distance (PD)" or "interpupillary distance (IPD)") (e.g., as described in reference to FIG. 5AE).

Performing an interpupillary distance measurement of a physical feature determined by the system to be a person's face and eyes provides intelligent measurement functionality that measures dimensions and aspects of the physical feature that are relevant to its type and that are likely to be of interest to the user (e.g., in selecting eyeglasses), without requiring the user to provide inputs to specify which type(s) of measurements the user would like to make of the physical feature. Performing an operation (e.g., automatically) when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the determination that the physical feature is the first type of physical feature includes (830) a determination by the system that the physical feature is a foot of a person, and the measurements of the first measurement type include a length of the foot (e.g., as described in reference to FIG. 5AF). In some embodiments, the representation of the length of the foot is displayed as a shoe size corresponding to the length of the foot (e.g., the shoe size is determined based on a size chart for a current geographic location of the person or for a previously-defined geographic location or region, for example in accordance with a system-defined, or optionally user-defined, setting).

Performing a length or shoe size measurement of a physical feature determined by the system to be a person's foot (e.g., optionally accounting for whether the foot is bare or wearing a shoe) provides intelligent measurement functionality that measures dimensions and aspects of the physical feature that are relevant to its type and that are likely to be of interest to the user (e.g., in selecting a pair of shoes), without requiring the user to provide inputs to specify which type(s) of measurements the user would like to make of the physical feature. Performing an operation (e.g., automatically) when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the determination that the physical feature is the first type of physical feature includes (832) a determination by the system that the physical feature includes a first hand and a second hand (e.g., of the same person) separated in space, and the measurements of the first measurement type include a distance between the first hand and the second hand (e.g., distance between corresponding points on the first and second hands, such as a distance between the center of the palm of the first hand and the center of the palm of the second hand) (e.g., as described in reference to FIGS. 5AC-5AD).

Performing a distance measurement between the two hands of a physical feature determined by the system to include a pair of hands (e.g., with palms facing) provides intelligent measurement functionality that measures dimensions and aspects of the physical feature that are relevant to its type and that are likely to be of interest to the user (e.g., where a subject in the field of view of the one or more cameras is holding his or her hands apart to demonstrate the size of an object), without requiring the user to provide inputs to specify which type(s) of measurements the user would like to make of the physical feature. Performing an operation (e.g., automatically) when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, while displaying a respective set of one or more representations of measurements over the representation of the physical feature (834), wherein the respective set includes a first representation of a measurement, the first representation (e.g., optionally) including a first measurement label and a first measurement segment that is displayed using a first level of detail (e.g., a first granularity) while the one or more cameras are located a first distance from the physical feature (e.g., in accordance with a determination that the first distance is within a first range of distances that corresponds to the first level of detail), the computer system detects movement of the one or more cameras that places the one or more cameras at a second distance, less than the first distance, from the physical feature (e.g., the one or more cameras have moved closer to the portion of the physical feature corresponding to the first representation of a measurement). In some embodiments, while the one or more cameras are located at the second distance from the physical feature (e.g., in accordance with a determination that the second distance is within a second range of distances, different from the first range of distances, that corresponds to the second level of detail), the computer system forgoes displaying the first measurement label. Alternatively, in some embodiments, display of the first measurement label is maintained. In some embodiments, while the one or more cameras are located at the second distance from the physical feature, the computer system displays the first measurement segment using a second level of detail that is different from (e.g., greater than) the first level of detail (e.g., the second level of detail is associated with a second granularity that is finer than the first granularity) (e.g., as described above in reference to FIGS. 5O-5T).

Displaying a measurement of a physical feature using different levels of detail (e.g., with sets of scale markers of different granularities), as the distance between the one or more cameras and the physical feature changes, intelligently provides information about a measurement at a level of detail (e.g., scale markers at a respective level of granularity) that is relevant to the current distance and that is likely to be of interest to the user, without requiring the user to provide inputs to specify the level of detail at which the user would like to view the measurement. In addition, ceasing to display a measurement label for a measurement segment when displaying scale markers for the measurement segment reduces clutter in the user interface and avoids the measurement label obscuring the scale markers or vice versa. Performing an operation (e.g., automatically) when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, displaying the first measurement segment using the second level of detail includes (836) displaying a set of scale markers (e.g., tick marks) at intervals along the first measurement segment (e.g., as described in reference to FIGS. 5P-5S). In some embodiments, while displaying the first measurement segment using the second level of detail, in accordance with a determination by the system that the placement user interface element is over a respective scale marker (or in some embodiments, the placement user interface element or a selection indicator of the placement user interface element is within a threshold distance of the respective scale marker or an anchor point on the respective scale marker) (e.g., in accordance with a determination that the placement user interface element is over a single scale marker, or in accordance with a determination that a distance between a center of the placement user interface element and the respective scale marker is shorter than a distance between the center of the placement user interface element and any other scale marker in the set of scale makers), the computer system changes an appearance of the placement user interface element to indicate that an annotation would be placed at an anchor point on the respective scale marker (e.g., a midpoint or endpoint of the scale marker) in response to receiving an annotation placement input (e.g., by snapping the reticle to the anchor point, where snapping includes for example moving the reticle from a default position in the annotation placement user interface to the anchor point, or moving the selection indicator (e.g., a dot or other marker) of the reticle from a default position within the reticle (e.g., the center of the reticle) to the anchor point (e.g., the selection indicator being moved independently of other portions of the reticle) and/or enlarging the selection indicator relative to an outline of the reticle). Examples are shown in FIGS. 5P-5T.

Snapping the placement user interface element to anchor points on respective scale markers displayed for a measurement segment provides visual feedback to the user indicating that an annotation will be added to an identified anchor point and makes it easier for the user to add annotations at the locations indicated by the scale markers, which are typically useful reference points along a measurement (e.g., feet or inches, meters or centimeters, or simple fractions thereof), without requiring the user to carefully position the placement user interface element. Providing improved visual feedback to the user and reducing the number and/or extent of inputs needed to perform an operation by performing the operation (e.g., automatically) when a set of conditions has been met enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, while displaying the first measurement segment using the second level of detail (838), the computer system receives an input (e.g., an annotation placement input) corresponding to a request to add an annotation at a respective location in the representation of the field of view that is indicated by the second level of detail and that corresponds to a respective physical location in the physical environment (e.g., displaying the first measurement segment using the second level of detail includes displaying a set of scale markers (e.g., tick marks) at intervals along the first measurement segment, and the input corresponds to a request to add an annotation at a respective scale marker, for example by a user moving the reticle over the respective scale marker and, while the reticle is snapped to the respective scale marker, providing an annotation placement input). In some embodiments, in response to the input corresponding to the request to add an annotation, the computer system adds an annotation at the respective location indicated by the second level of detail.

In some embodiments, after adding the annotation, the computer system detects movement of the one or more cameras that places the one or more cameras at (or, alternatively, within) the first distance from the physical feature (e.g., as described in reference to FIGS. 5O-5P). In some embodiments, in response to detecting the movement of the one or more cameras that places the one or more cameras at the first distance from the physical feature, the computer system updates the representation of the field of view based on the movement of the one or more cameras (e.g., as described in reference to FIG. 5S-5T, where partially moving away causes the tick marks to disappear). In some embodiments, while the one or more cameras are located at (or, alternatively, within) the first distance from the physical feature (e.g., in accordance with a determination that the third distance is within the first range of distances that corresponds to the first level of detail) the computer system displays the first measurement segment using the first level of detail, the first measurement label, and the annotation at a respective location in the updated representation of the field of view that corresponds to the respective physical location in the physical environment (e.g., which was previously indicated by the second level of detail) without regard to whether the respective location is indicated by the first level of detail (e.g., displaying the first measurement segment using the first level of detail includes forgoing displaying any scale markers or displaying a different set of scale markers at larger intervals along the first measurement segment than the intervals of the second level of detail, and the annotation is maintained at a location in the representation of the field of view that corresponds to the same respective physical location as before the movement of the one or more cameras back to the first distance even if the first level of detail does not include a scale marker corresponding to the location of the annotation).

Maintaining annotations added at anchor points on respective scale markers along a measurement, even after the one or more cameras have been moved (e.g., further from the measured physical feature) such that the respective scale markers are no longer displayed, provides improved visual feedback to the user indicating that the annotation is located at a reference point (e.g., feet or inches, meters or centimeters, or simple fractions thereof), along the measurement, that the user has found useful and previously marked, without continuing to clutter the user interface with overly detailed measurements. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

It should be understood that the particular order in which the operations in FIGS. 8A-8F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 1100, 1200, 1300, 1400, 1500, and 1600) are also applicable in an analogous manner to method 800 described above with respect to FIGS. 8A-8F. For example, the user interfaces, user interface elements, physical environments and features and objects therein, feature types, annotations, representations of measurements, measurement types, and scale markers described above with reference to method 800 optionally have one or more of the characteristics of the user interfaces, user interface elements, physical environments and features and objects therein, feature types, annotations, representations of measurements, measurement types, and scale markers described herein with reference to other methods described herein (e.g., methods 900, 1000, 1100, 1200, 1300, 1400, 1500, and 1600). For brevity, these details are not repeated here.

FIGS. 9A-9C are flow diagrams illustrating method 900 of providing alignment guides based on automatically determined anchor points in an augmented reality environment in accordance with some embodiments. Method 900 is performed at a computer system (e.g., portable multifunction device 100 (FIG. 1A), device 300 (FIG. 3A), or computer system 301 (FIG. 3B)) with a display device (e.g., a display, optionally touch-sensitive, a projector, a head-mounted display, a heads-up display, or the like, such as touch screen 112 (FIG. 1A), display 340 (FIG. 3A), or display generation component(s) 304 (FIG. 3B)), one or more cameras (e.g., optical sensor(s) 164 (FIG. 1A) or camera(s) 305 (FIG. 3B)), and optionally one or more depth sensing devices, such as depth sensors (e.g., one or more depth sensors such as time-of-flight sensor 220 (FIG. 2B)). Some operations in method 900 are, optionally, combined and/or the order of some operations is, optionally, changed.

As described herein, when a reticle in an annotation placement user interface is snapped to an anchor point of a representation of a physical feature, method 900 displays a set of guides extending in one or more directions from the anchor point to provide visual feedback to the user identifying directions in which one or more measurements of the physical feature may be made (e.g., as described in reference to FIGS. 5AN and 5AP), thus helping the user to make measurements that may be of interest to the user. In addition, method 900 intelligently displays different guides based on what type of feature the physical feature is determined to be, without requiring the user to provide inputs to specify which type of guide to display. Providing improved visual feedback to the user and performing an operation (e.g., automatically) without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system displays (902), via the display device, an annotation placement user interface (e.g., a user interface of an augmented reality measurement application). The annotation placement user interface includes: a representation of a field of view of the one or more cameras, including a representation of a portion of a three-dimensional physical environment that is in the field of view of the one or more cameras, wherein the representation of the field of view is updated over time based on changes in the field of view of the one or more cameras (e.g., the representation of the field of view is a live view that is updated based on changes in the physical environment that are within the field of view and/or based on movement of the one or more cameras that changes which portion of the physical environment is within the field of view) (e.g., as described in reference to FIGS. 5AM-5AY); and a placement user interface element (e.g., a reticle) that indicates (e.g., via a dot or other marker of the reticle) a location at which a virtual annotation (e.g., a representation of a measurement) would be placed in the representation of the field of view in response to receiving an annotation placement input (e.g., as described in reference to FIGS. 5AU and 5AQ).

While displaying the annotation placement user interface, the computer system detects (904) movement of the one or more cameras relative to the physical environment.

In response to detecting the movement of the one or more cameras relative to the physical environment (906), the computer system updates (908) the representation of the field of view based on the movement of the one or more cameras (e.g., as described in reference to FIGS. 5AM-5AY).

In response to detecting the movement of the one or more cameras relative to the physical environment (906), in accordance with a determination that the placement user interface element (e.g., at least a portion of the placement user interface element) is (910) over at least a portion of a representation of a first type of feature in the physical environment (e.g., an edge of a physical object in the physical environment) (or in some embodiments, the placement user interface element or a selection indicator of the placement user interface element is within a threshold distance of a respective scale marker or an anchor point on the respective scale marker), the computer system: changes the appearance of the placement user interface element to indicate that an annotation would be placed at an anchor point corresponding to the first type of feature (e.g., within the portion of the representation of the first type of feature) in response to an annotation placement input (e.g., snapping the reticle to the anchor point corresponding to the first type of feature, where snapping the reticle includes for example moving the reticle from a default position in the annotation placement user interface to the anchor point, or moving the selection indicator (e.g., a dot or other marker) of the reticle from a default position within the reticle (e.g., the center of the reticle) to the anchor point (e.g., the selection indicator being moved independently of other portions of the reticle)

and/or enlarges the selection indicator relative to an outline of the reticle); and displays a first set of one or more guides corresponding to at least a portion of the representation of the first type of feature (e.g., a single guide along at least a portion of the edge of the physical object). In some embodiments, each guide in the first set of one or more guides includes the location of the anchor point (e.g., if the first set includes multiple guides, the guides meet or intersect at the anchor point) (e.g., as described in reference to FIGS. 5AN and 5AP).

In response to detecting the movement of the one or more cameras relative to the physical environment (906), in accordance with a determination that the placement user interface element (e.g., at least a portion of the placement user interface element) is over at least a portion of a representation of a second type of feature in the physical environment (912), wherein the second type of feature is different from the first type of feature (e.g., a vertex (e.g., a corner) (e.g., couch corner 523, shown in FIGS. 5AO and 5AP) of a physical object in the physical environment), the computer system: changes the appearance of the placement user interface element to indicate that an annotation would be placed at an anchor point corresponding to the second type of feature (e.g., within the portion of the representation of the second type of feature) in response to an annotation placement input (e.g., snapping the reticle to the anchor point corresponding to the second type of feature); and displays a second set of one or more guides, different from the first set of one or more guides, corresponding to at least a portion of the representation of the second type of feature (e.g., a plurality of distinct guides along distinct edges, or portions thereof, incident to the vertex of the physical object) (e.g., compare the guides shown in FIG. 5AP with those shown in FIG. 5A). In some embodiments, the second set of one or more guides is displayed prior to receiving an annotation placement input to place an annotation at the anchor point corresponding to the second type of feature (e.g., as described in reference to FIGS. 5AN and 5AP). In some embodiments, each guide in the second set of one or more guides includes (e.g., intersects, or has an endpoint at) the location of the anchor point (e.g., if the second set includes multiple guides, the guides meet or intersect at the anchor point). In some embodiments, the second set of one or more guides includes at least one type of guide that is different from the type(s) of guides in the first set of one or more guides. In some embodiments, the second set of guides includes a different number of guides (e.g., two, three, or more guides) than the first set of guides (e.g., one guide) (e.g., as described in reference to FIGS. 5AN, 5AP-5AS, and 5AU).

In some embodiments, in accordance with a determination that the anchor point is located on one or more edges in the physical environment (914) (e.g., the anchor point is a point along a single edge or a point at which multiple edges meet (e.g., a vertex)), the displayed respective set of one or more guides includes, for each edge of the one or more edges, a respective guide that extends from the anchor point along the respective edge (e.g., as shown in FIGS. 5AN, 5AP-5AS, and 5AU). For example, if a respective type of feature is an edge of a physical object in the physical environment, the anchor point is a point along the edge, and the respective set of one or more guides includes a guide corresponding to the edge (e.g., the guide is displayed along (e.g., superimposed over) the representation of the edge). In another example, if a respective type of feature is a vertex of a physical object in the physical environment, the respective set of one or more guides includes a plurality of guides corresponding to (e.g., all) edges incident to the vertex (e.g., for each incident edge, a respective guide is displayed along the representation of the respective edge) (e.g., as described in reference to FIG. 5AP).

Displaying guides that extend from the anchor point along each edge on which the anchor point is located provides visual feedback to the user identifying the edges and thus the directions in which one or more measurements that may be of interest to the user may be made. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, in accordance with a determination that the anchor point is located where at least a first detected surface in the physical environment and a second detected surface in the physical environment meet (916) (e.g., the anchor point is a point along an edge at which the first and second physical surfaces meet, or the anchor point is a vertex at which three or more surfaces, including the first and second surfaces, meet), the displayed respective set of one or more guides includes at least a first guide that extends from the anchor point in a direction perpendicular to the first detected surface and a second guide that extends from the anchor point in a direction perpendicular to the second detected surface (e.g., as shown in FIGS. 5AP and 5AR). In some embodiments, the respective set of one or more guides includes respective guides that extend from the anchor point in respective directions that are perpendicular to two or more of the detected surfaces that meet at the anchor point, examples of which are shown in FIGS. 5AP, 5AR-5AS, and 5AU. For example, if the anchor point corresponds to a vertex of a three-dimensional physical object at which the first detected surface, the second detected surface, and a third detected surface in the physical environment all meet, the respective set of one or more guides includes the first guide, the second guide, and a third guide that extends from the anchor point in a third direction that is perpendicular to the third detected surface (e.g., as shown FIGS. 5AP, 5AR-5AS, and 5AU).

Displaying guides that extend perpendicularly from surfaces that meet where the anchor point is located provides visual feedback to the user identifying directions in which one or more measurements that may be of interest to the user may be made. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, in response to detecting the movement of the one or more cameras relative to the physical environment (918) and in accordance with a determination that the placement user interface element (e.g., at least a portion of the placement user interface element) is over at least a portion of a representation of a third type of feature in the physical environment (e.g., a physical surface in the physical environment, away from any edge of the physical surface) that is different from the first type of feature and the second type of feature, wherein the placement user interface element indicates a respective location in the representation of the field of view at which a virtual annotation would be placed in response to receiving an annotation placement input, the computer system displays a guide extending from the respective location in a direction in the representation of the field of view that corresponds to a vertical direction (e.g., in the physical environment) from the third type of feature (e.g., as shown in FIGS. 5AX-5AY).

Displaying a guide that extends vertically from the point of focus of the reticle (e.g., optionally without snapping the reticle to any anchor point), when the point of focus corresponds to a location on a physical surface that is away from any edge of the physical surface, provides visual feedback to the user that the point of focus is away from any edge of the physical surface and that identifies a direction in which a measurement that may be of interest to the user may be made. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, displaying a respective set of one or more guides includes (920), for each guide in the respective set, visually emphasizing a first portion of the respective guide relative to a second portion of the respective guide, wherein the first portion corresponds to (e.g., indicates, extends through (in a virtual sense), or is displayed superimposed over) locations in physical space that are occupied by a physical object in the physical environment, and the second portion corresponds to (e.g., indicates, extends through (in a virtual sense), or is displayed superimposed over) locations in physical space that are not occupied by a physical object in the physical environment (e.g., not occupied by any solid object or liquid, and occupied only by air or other gases) (e.g., as shown in FIGS. 5AS-5AU).

Visually emphasizing portions of guides that correspond to locations occupied by physical objects (e.g., portions of guide that intersect an object rather than extending through air) relative to portions of guides that correspond to locations not occupied by physical objects provides visual feedback to the user as to the location of the guides relative to physical object as well as improving the visibility of portions of guides that may be obscured by representations of physical objects (e.g., as shown in FIGS. 5AN, 5AP-5AS, 5AU-5AV, and 5AX-5AY). Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments (e.g., for each respective guide in the respective set of one or more guides), the second portion of a respective guide includes a first point that is a first distance from (e.g., an endpoint of) the first portion of the respective guide and a second point that is a second distance, greater than the first distance, from (e.g., the endpoint of) the first portion of the respective guide (922); and the second point is visually deemphasized (e.g., faded) relative to the first point (e.g., and both points are visually deemphasized relative to the first portion of the respective guide). In some embodiments, a point along the second portion that corresponds to a point in physical space in the physical environment that is further from a physical object (e.g., the physical object to which the first portion corresponds) is visually deemphasized relative to a point along the second portion that corresponds to a point in physical space that is closer to the physical object (e.g., as shown in FIGS. 5AR-5AS). In some embodiments, the second portion of the respective guide is progressively deemphasized (e.g., faded) the further it extends "away from" the physical object (e.g., points along the second portion progressively fade away the further the corresponding points in physical space are from the physical object; stated another way, in some scenarios, the second portion of the respective guide progressively fades the further it extends from the representation of the physical object in the annotation placement user interface).

Progressively visually deemphasizing portions of guides that correspond to locations not occupied by physical objects provides visual feedback to the user that the deemphasized portions indicate regions or directions in which the user may be less interested in making measurements. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, displaying a respective set of one or more guides includes (924) displaying an animation showing the one or more guides progressively extending from the anchor point over time (e.g., as shown in FIGS. 5AR-5AU). In some embodiments, the animation is played when the respective set of one or more guides is initially displayed in combination with the change in appearance of the placement user interface element with respect to the anchor point corresponding to a respective type of feature. In some embodiments, after the animation is played, the display of the respective set of one or more guides is maintained (e.g., without animation) while the placement user interface element is maintained over the portion of the representation of the respective type of feature (e.g., until movement of the one or more cameras causes the placement user interface element to be displayed over a different portion of the representation of the field of view of the one or more cameras that does not include the anchor point).

Displaying an animation showing one or more guides progressively extending from the point of focus of the reticle (which in some cases is an anchor point) over time provides visual feedback to the user indicating directions to move the one or more cameras to make measurements that may be of interest to the user. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

It should be understood that the particular order in which the operations in FIGS. 9A-9C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 1000, 1100, 1200, 1300, 1400, 1500, and 1600) are also applicable in an analogous manner to method 900 described above with respect to FIGS. 9A-9C. For example, the user interfaces, user interface elements, physical environments and features and objects therein, feature types, guides, animations, and annotations described above with reference to method 900 optionally have one or more of the characteristics of the user interfaces, user interface elements, physical environments and features and objects therein, feature types, guides, animations, and annotations described herein with reference to other methods described herein (e.g., methods 800, 1000, 1100, 1200, 1300, 1400, 1500, and 1600). For brevity, these details are not repeated here.

FIGS. 10A-10C are flow diagrams illustrating method 1000 of providing dynamic alignment guides in response to user input in an augmented reality environment in accordance with some embodiments. Method 1000 is performed at a computer system (e.g., portable multifunction device 100 (FIG. 1A), device 300 (FIG. 3A), or computer system 301 (FIG. 3B)) with a display device (e.g., a display, optionally touch-sensitive, a projector, a head-mounted display, a heads-up display, or the like, such as touch screen 112 (FIG. 1A), display 340 (FIG. 3A), or display generation component(s) 304 (FIG. 3B)), one or more cameras (e.g., optical sensor(s) 164 (FIG. 1A) or camera(s) 305 (FIG. 3B)), and optionally one or more depth sensing devices, such as depth sensors (e.g., one or more depth sensors such as time-of-flight sensor 220 (FIG. 2B)). Some operations in method 1000 are, optionally, combined and/or the order of some operations is, optionally, changed.

As described herein, method 1000 intelligently changes which guides are displayed when an annotation is added at a location indicated by a reticle, in part by displaying one or more guides that were not previously displayed, to provide visual feedback to the user identifying possible directions of interest from the location of the annotation, which may be different from directions that were possibly of interest prior to the annotation being added. Providing improved visual feedback to the user and performing an operation (e.g., automatically) without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system (1002) displays, via the display device, an annotation placement user interface (e.g., a user interface of an augmented reality measurement application), the annotation placement user interface including: a representation of a field of view of the one or more cameras, including a representation of a portion of a three-dimensional physical environment that is in the field of view of the one or more cameras, wherein the representation of the field of view is updated over time based on changes in the field of view of the one or more cameras (e.g., the representation of the field of view is a live view that is updated based on changes in the physical environment that are within the field of view and/or based on movement of the one or more cameras that changes which portion of the physical environment is within the field of view); and a placement user interface element (e.g., a reticle 504-2) that indicates (e.g., via a dot or other marker of the reticle) a location at which a virtual annotation (e.g., a representation of a measurement) would be placed in the representation of the field of view in response to receiving an annotation placement input.

While the placement user interface element indicates a first location (e.g., a first anchor point) in the representation of the field of view (e.g., that corresponds to a first physical location in the physical environment), the computer system receives (1004) a first annotation placement input (e.g., an input corresponding to a request to add a virtual annotation, such as a virtual measurement point, at the first location in the representation of the field of view) (e.g., as shown in FIG. 5AQ).

In response to receiving the first annotation placement input (1006): the computer system displays (1008) an (e.g., virtual) annotation (e.g., a measurement point) at the first location in the representation of the field of view; and displays (1010) one or more first guides (e.g., measurement guides) that extend from the first location in the representation of the field of view (e.g., as described in reference to 5AR). In some embodiments, the one or more first guides indicate physical locations in the physical environment along rays (e.g., or lines or line segments) that extend through physical space from the first physical location corresponding to the drop location of the annotation in the representation of the field of view (e.g., as described in reference to 5AR). In some embodiments, the placement user interface element is constrained to indicate locations along a respective guide (e.g., "snaps to the guide") if the placement user interface element (e.g., reticle) corresponds to a physical location that is within a threshold distance of the ray corresponding to the guide (e.g., the placement user interface element would indicate a location in the representation of the field of view that corresponds to a physical location that is within a threshold distance of the ray) (e.g., as shown in FIGS. 5AO to 5AR).

In some embodiments, while the placement user interface element indicates the first location in the representation of the field of view, prior to receiving the first annotation placement input, the computer system displays (1012) one or more second guides (e.g., measurement guides) that extend from the first location in the representation of the field of view (e.g., one or more guides as described with reference to method 900); and in response to receiving the first annotation placement input, the computer system ceases to display at least a subset of the one or more second guides. In some embodiments, all of the one or more second guides cease to be displayed (e.g., the one or more first guides are entirely different from the one or more second guides) (e.g., as shown in FIGS. 5AU-5AV) in response to the first annotation placemen input. In some embodiments, a first subset of the one or more second guides ceases to be displayed, and the one or more first guides displayed in response to receiving the first annotation placement input are a second subset of the one or more second guides that remains displayed after the first subset ceases to be displayed (e.g., as shown in FIGS. 5AU-5AV).

In some embodiments, after receiving the first annotation placement input and displaying the annotation at the first location and the one or more first guides that extend from the first location, the system detects movement of the one or more cameras such that the placement user interface element indicates a second location, different from the first location (e.g., a second anchor point different from the first anchor point), in the representation of the field of view (e.g., that corresponds to a second physical location in the physical environment). In some embodiments, while the placement user interface element indicates the second location, and prior to receiving an annotation placement input, the system displays a respective set of one or more guides (e.g., analogous to the one or more first guides, or analogous to the one or more second guides) that extend from the second location (e.g., as shown in FIG. 5AS). In some embodiments, in response to receiving a second annotation placement input while the placement user interface element indicates the second location, the system displays a different set of one or more guides (e.g., analogous to the one or more second guides, or analogous to the one or more first guides) that extend from the second location (e.g., as shown in FIGS. 5AU-5AV).

Removing one or more guides that were displayed prior to adding the annotation provides the user with visual feedback indicating that the directions in which the removed guides extended are likely no longer of interest to the user and avoids cluttering the user interface with unnecessary guides without requiring the user to provide inputs to remove unwanted guides. Providing improved visual feedback to the user and performing an operation (e.g., automatically) without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, after detecting the first annotation placement input and displaying the one or more first guides that extend from the first location in the representation of the field of view (1014), the computer system detects movement of the one or more cameras relative to the physical environment, and in response to detecting the movement of the one or more cameras relative to the physical environment, the computer system ceases to display a subset of the one or more first guides (e.g., including ceasing to display guides that do not extend in a direction of movement of the one or more cameras) (e.g., as shown in FIGS. 5AV-5AW).

Removing one or more guides in response to movement of the one or more cameras avoids displaying guides that are likely no longer of interest to the user (e.g., due to the removed guides extending in directions other than the direction of movement) without requiring the user to provide inputs to remove unwanted guides. Performing an operation (e.g., automatically) and reducing clutter in the user interface enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the movement of the one or more cameras relative to the physical environment includes (1016) movement in a first direction, and ceasing to display the subset of the one or more first guides includes ceasing to display any guide that does not extend in the first direction (e.g., as shown in FIG. 5AT). For example, where multiple guides corresponding to perpendicular lines in physical space are displayed, and the movement of the one or more cameras is in a direction corresponding to one of the perpendicular lines, display of the guide for that perpendicular line is maintained, and guides corresponding to the other perpendicular line(s) cease to be displayed.

Removing one or more guides that extend in directions other than the direction of movement of the one or more cameras avoids displaying guides that are likely no longer of interest to the user without requiring the user to provide inputs to remove unwanted guides. Performing an operation (e.g., automatically) and reducing clutter in the user interface enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, in accordance with the movement of the one or more cameras, the placement user interface element indicates (1018) a second location, different from the first location, and ceasing to display the subset of the one or more first guides includes ceasing to display any guide, of the one or more first guides, that corresponds to the first location and does not correspond to the second location (e.g., as shown in FIGS. 5AR-5AS).

Removing one or more guides that extend from a particular location when movement of the one or more cameras moves the placement user interface element away from that location avoids displaying guides that are likely no longer of interest to the user without requiring the user to provide inputs to remove unwanted guides. Performing an operation (e.g., automatically) and reducing clutter in the user interface enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, after detecting the first annotation placement input and displaying the one or more first guides that extend from the first location in the representation of the field of view, the computer system detects (1020) movement of the one or more cameras relative to the physical environment that includes movement in a first direction; and in response to detecting the movement of the one or more cameras in the first direction, in accordance with a determination that a respective guide of the one or more first guides extends in the first direction, the computer system maintains display of at least a portion of the respective guide (e.g., as shown in FIGS. 5AS-5AU).

Continuing to display one or more guides that extend in the direction of movement of the one or more cameras provides visual feedback to the user identifying a likely direction of interest and helps the user continue to move the one or more cameras in the same direction. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, maintaining display of at least a portion of the respective guide includes (1022) maintaining display of a portion (e.g., any portion) of the respective guide that extends from the first location in the first direction, and ceasing to display a portion (e.g., any portion) of the respective guide that extends from the first location in a direction opposite the first direction (e.g., as shown in FIGS. 5AR-5AS). For example, the first guide follows a line that includes the first location, such that the line includes a first ray that extends from the first location in a first direction and a second ray that extends from the first location in a direction directly opposite (e.g., 180 degrees from) the first ray; in response to detecting the movement of the one or more cameras, a first portion of the first guide that corresponds to (e.g., overlaps with) the first ray continues to be displayed, and a second portion of the first guide that corresponds to (e.g., overlaps with) the second ray ceases to be displayed.

Where a guide that extends in the direction of movement of the one or more cameras is displayed, removing a portion of the guide that extends from the added annotation opposite the direction of movement of the one or more cameras (e.g., along the opposite ray to the movement of the one or more cameras) avoids displaying guides and portions of guides that are likely no longer of interest to the user without requiring the user to provide inputs to remove unwanted guides. Performing an operation (e.g., automatically) and reducing clutter in the user interface enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

It should be understood that the particular order in which the operations in FIGS. 10A-10C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1100, 1200, 1300, 1400, 1500, and 1600) are also applicable in an analogous manner to method 1000 described above with respect to FIGS. 10A-10C. For example, the user interfaces, user interface elements, physical environments and features and objects therein, feature types, guides, animations, and annotations described above with reference to method 1000 optionally have one or more of the characteristics of the described herein with reference to other methods described herein (e.g., methods 800, 900, 1100, 1200, 1300, 1400, 1500, and 1600). For brevity, these details are not repeated here.

FIGS. 11A-11E are flow diagrams illustrating method 1100 of automatically changing annotation mode based on the types of physical features that are in view in an augmented reality environment in accordance with some embodiments. Method 1100 is performed at a computer system (e.g., portable multifunction device 100 (FIG. 1A), device 300 (FIG. 3A), or computer system 301 (FIG. 3B)) with a display device (e.g., a display, optionally touch-sensitive, a projector, a head-mounted display, a heads-up display, or the like, such as touch screen 112 (FIG. 1A), display 340 (FIG. 3A), or display generation component(s) 304 (FIG. 3B)), one or more cameras (e.g., optical sensor(s) 164 (FIG. 1A) or camera(s) 305 (FIG. 3B)), and optionally one or more depth sensing devices, such as depth sensors (e.g., one or more depth sensors such as time-of-flight sensor 220 (FIG. 2B)). Some operations in method 1100 are, optionally, combined and/or the order of some operations is, optionally, changed.

As described herein, method 1100 intelligently changes the annotation mode of an annotation placement user interface as the reticle is moved based on the different types of physical features over which the reticle is placed, thus providing visual feedback to the user as to the types of physical features that are at the point of focus of the reticle and helping the user to annotate the physical features with annotations that are relevant to the particular types of the physical features, without requiring the user to provide inputs to specify which annotation mode to use (e.g., as shown in FIGS. 5BT-5CD). Providing improved visual feedback to the user and performing an operation (e.g., automatically) without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system displays (1102), via the display device, an annotation placement user interface (e.g., a user interface of an augmented reality measurement application), the annotation placement user interface including: a representation of a field of view of the one or more cameras, including a representation of a portion of a three-dimensional physical environment that is in the field of view of the one or more cameras, wherein the representation of the field of view is updated over time based on changes in the field of view of the one or more cameras (e.g., the representation of the field of view is a live view that is updated based on changes in the physical environment that are within the field of view and/or based on movement of the one or more cameras that changes which portion of the physical environment is within the field of view); and a placement user interface element (e.g., a reticle) that indicates a location at which a virtual annotation (e.g., a measurement point or segment) would be placed in the representation of the field of view in response to receiving an annotation placement input (e.g., as shown in FIGS. 5BT-5BZ, and 5CG-5CH).

While displaying the annotation placement user interface, the computer system detects (1104) movement of the one or more cameras relative to the physical environment (e.g., as shown in FIGS. 5BT-5BZ, and 5CG-5CH).

In response to detecting the movement of the one or more cameras relative to the physical environment (1106), the computer system: updates the representation of the field of view based on the movement of the one or more cameras and, in accordance with a determination that the placement user interface element is over at least a portion of a representation of a first type of physical feature (e.g., a three-dimensional object) that is in the physical environment, displays a first mode indication (e.g., a mode-dependent appearance of the placement user interface element and/or a selection indicator that indicates a current annotation mode) indicating that the annotation placement user interface is operating in a first annotation mode that is associated with adding annotations of a first type (e.g., a three-dimensional measurement mode associated with adding measurements of three-dimensional objects, such as measurements of length, width, height, area, and/or volume) (e.g., as shown in FIGS. 5BU-5BX). In some embodiments, the first mode indication is displayed in combination with transitioning the annotation placement user interface to the first annotation mode (e.g., from a respective annotation mode other than the first annotation mode, and optionally in combination with ceasing to display a respective mode indication for the respective annotation mode).

While displaying the first mode indication, the computer system detects (1108) subsequent movement of the one or more cameras relative to the physical environment (e.g., as shown in FIGS. 5BX-5BY).

In response to detecting the subsequent movement of the one or more cameras relative to the physical environment (1110), the computer system: updates the representation of the field of view based on the subsequent movement of the one or more cameras, and, in accordance with a determination that the placement user interface element is over at least a portion of a representation of a second type of physical feature (e.g., a two-dimensional (e.g., planar or flat) surface of a three-dimensional physical object) that is in the physical environment, displays a second mode indication (e.g., an annotation mode-dependent appearance of the placement user interface element and/or a selection indicator that indicates a current annotation mode) indicating that the annotation placement user interface is operating in a second annotation mode, different from the first annotation mode, that is associated with adding annotations of a second type, different from the first type (e.g., the second mode indication may indicate a two-dimensional measurement mode associated with adding measurements of two-dimensional object features, such as measurements of length, width, and/or area of surfaces of physical objects) (e.g. wherein the second mode indication is displayed in combination with transitioning the annotation placement user interface from the first annotation mode to the second annotation mode and ceasing to display the first mode indication) (e.g., as shown in FIGS. 5BZ-5CD).

In some embodiments, the aforementioned types of physical features include three-dimensional objects, two-dimensional (e.g., planar, flat) surfaces, one-dimensional features (e.g., straight object edges), floor plans, etc. (e.g., physical features of the table shown in FIGS. 5BU-5BX, and the magazine shown in FIGS. 5BX-5BZ, and 5CA-5CD).

In some embodiments, in accordance with a determination that the placement user interface element is over (e.g., has moved over) at least a portion of a representation of a third type of physical feature (e.g., a one-dimensional object), that is in the physical environment, an indication is displayed that the annotation placement user interface is operating in a third annotation mode associated with adding annotations of a third type (e.g., a one-dimensional measurement mode associated with adding measurements of one-dimensional object features, such as measurements of lengths of line segments in the physical environment (e.g., straight edges of physical objects)) (e.g., as shown in FIGS. 5CH-5CL).

In some embodiments, a respective type of physical feature is a three-dimensional object (1112); and the respective mode indication displayed in accordance with the determination that the placement user interface element is over at least a portion of a representation of a three-dimensional object indicates that the annotation placement user interface is operating in a respective annotation mode that is associated with adding annotations of three-dimensional objects (e.g., measurements of length, width, height, area of one or more surfaces, and/or volume of the three-dimensional physical object) (e.g., as shown in FIG. 5BZ).

Automatically changing the annotation mode to a three-dimensional object annotation mode in accordance with the reticle being positioned over a three-dimensional object enables the user to annotate three-dimensional features and helps ensure that the annotations are relevant to the particular type of physical feature that is at the point of focus without requiring the user to provide inputs to specify which annotation mode to use. Providing additional control options (e.g., automatically) without cluttering the user interface with additional displayed controls or requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, a respective type of physical feature is a two-dimensional surface (1114); and the respective mode indication displayed in accordance with the determination that the placement user interface element is over at least a portion of a representation of a two-dimensional surface indicates that the annotation placement user interface is operating in a respective annotation mode that is associated with adding annotations of two-dimensional surfaces (e.g., measurements of length, width, and/or area of the physical surface) (e.g., as shown in FIGS. 5CA-5CD).

Automatically changing the annotation mode to a two-dimensional surface (e.g., area) annotation mode in accordance with the reticle being positioned over a two-dimensional feature enables the user to annotate two-dimensional features and helps ensure that the annotations are relevant to the particular type of physical feature that is at the point of focus without requiring the user to provide inputs to specify which annotation mode to use. Providing additional control options (e.g., automatically) without cluttering the user interface with additional displayed controls or requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, a respective type of physical feature is a one-dimensional feature (1116) (e.g., a line segment, such as a straight edge where two surfaces meet); and the respective mode indication displayed in accordance with the determination that the placement user interface element is over at least a portion of a representation of a one-dimensional feature indicates that the annotation placement user interface is operating in a respective annotation mode that is associated with adding annotations of one-dimensional features (e.g., measurements of distance (e.g., lengths of line segments in the physical environment) between physical locations corresponding to a pair of measurement points, selected by user input, in the representation of the field of view) (e.g., as shown in FIGS. 5CH-5CL).

Automatically changing the annotation mode to a one-dimensional (e.g., point-to-point) distance annotation mode in accordance with the reticle being positioned over a one-dimensional feature enables the user to annotate one-dimensional features and helps ensure that the annotations are relevant to the particular type of physical feature that is at the point of focus without requiring the user to provide inputs to specify which annotation mode to use. Providing additional control options (e.g., automatically) without cluttering the user interface with additional displayed controls or requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (1118) an input corresponding to a request to select an orthographic modeling mode; and in response to receiving the input corresponding to the request to select the orthographic modeling mode, the computer system displays an indication that the annotation placement user interface is operating in an orthographic modeling mode. The indication that the annotation placement user interface is operating in the orthographic modeling mode is described in further detail herein with reference to method 1500. In some embodiments, the orthographic modeling mode is a mode in which information (e.g., depth information) about the physical environment is captured and optionally used to generate an orthographic view (e.g., a top orthographic view, or floorplan) of the physical environment. In some embodiments, the input corresponding to the request to select an orthographic modeling mode includes a user input selecting a respective user interface element corresponding to the orthographic modeling mode or requesting transition from a current annotation mode (e.g., that is not the orthographic modeling mode) to a next or previous annotation mode (e.g., and the orthographic modeling mode is the next or previous annotation mode, respectively). In some embodiments, the input corresponding to the request to select the orthographic modeling mode includes movement of the one or more cameras such that the annotation placement user interface is over at least a portion of a representation of a type of physical feature that is associated with the orthographic modeling mode (e.g., the floor of a physical environment).

Providing an orthographic modeling mode of the annotation placement user interface, and displaying an indication that the annotation placement user interface is operating in the orthographic modeling mode in response to selection thereof provides the user with additional control options and improved visual feedback about the current annotation mode in which the annotation placement user interface is operating. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the annotation placement user interface includes (1120) a plurality of user interface elements each corresponding to a respective annotation mode of a plurality of annotation modes including the first and second annotation modes; and displaying the second mode indication includes displaying a selection indicator over a respective user interface element, of the plurality of user interface elements, that corresponds to the second annotation mode (e.g., selection indicator 537 in FIGS. 5CA and 5CF). In some embodiments, while displaying the second mode indication indicating that the annotation placement user interface is operating in the second annotation mode, the computer system receives a user input corresponding to a request to select a third annotation mode that is different from the second annotation mode (e.g., the third annotation mode is any one of the plurality of annotation modes other than the second annotation mode). In some embodiments, in response to receiving the user input corresponding to the request to select the third annotation mode, the computer system displays an indication that the annotation placement user interface is operating in the third annotation mode, including displaying the selection indicator over a third user interface element, in the plurality of user interface elements, that corresponds to the third annotation mode, wherein the third user element is different from the respective user element (e.g., the third user interface element is any one of the plurality of user interface elements other than the respective user interface element).

In some embodiments, the user input corresponding to the request to select the third annotation mode is a user input other than movement of the one or more cameras. In some embodiments, the user input includes a touch input (e.g., a tap gesture) at a location on a touch-sensitive surface that corresponds to the third user interface element. In some embodiments, the user input includes a touch input (e.g., a swipe gesture) that includes movement across a touch-sensitive surface at locations that correspond to the annotation placement user interface (e.g., though not necessarily the third user interface element), to request transition to a next or previous annotation mode in the plurality of annotation modes (e.g., according to a predefined order of the plurality of annotation modes) (e.g., as described in reference to FIGS. 7A-7D). In some embodiments, movement of the touch input in a first direction corresponds to a request to transition to the next mode. In some embodiments, movement of the touch input in a second direction opposite the first direction corresponds to a request to transition to the previous annotation mode. In some embodiments, in response to receiving the user input, an animated transition (e.g., briefly dimming and/or blurring the annotation user interface) is displayed to indicate the transition from the second annotation mode to the user-selected third annotation mode. In some embodiments, in accordance with transitioning the annotation placement user interface to the third annotation mode in response to receiving the user input, the appearance of the placement user interface element is changed from an appearance that corresponds to the second annotation mode to an appearance that corresponds to the third annotation mode.

Displaying a plurality of user interface elements, each corresponding to a respective annotation mode of the annotation placement user interface and activatable to transition the annotation placement user interface into the corresponding respective annotation mode, provides the user with quick and easy access to available functionality of the annotation placement user interface without requiring the user to navigate through complex menu hierarchies. Providing additional control options and reducing the number of inputs needed to perform an operation enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the annotation placement user interface includes (1122) a plurality of user interface elements each corresponding to a respective annotation mode of a plurality of annotation modes including the first and second annotation modes; displaying the first mode indication includes displaying the annotation placement user interface element (e.g., reticle 504) with a first appearance associated with the first annotation mode; and displaying the second mode indication includes displaying the annotation placement user interface element with a second appearance, different from the first appearance, associated with the second annotation mode (e.g., FIGS. 5BU-5BV, 5CA-5CD, and 5CG-5CM shown reticle 504 with three different appearances for three different annotation modes).

Displaying the placement user interface element with different appearances for different annotation modes provides visual feedback to the user about the current annotation mode in which the annotation placement user interface is operating and about the types of features that are at a point of focus (e.g., indicated by the reticle) of the annotation placement user interface and that may be measured. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, displaying the first mode indication includes displaying a selection indicator (e.g., selection indicator 537) over a first user interface element, of the plurality of user interface elements, that corresponds to the first annotation mode (1124) (e.g., as shown in FIG. 5BT). In some embodiments, the selection indicator is displayed over the first user interface element in response to a user input (e.g., as shown in FIG. 5BS), received prior to the determination that the annotation placement user interface element is over at least the portion of the representation of the first type of physical object, corresponding to a request to select the first user interface element or a request to change annotation mode to the first annotation mode. In some embodiments, the selection indicator is displayed over the first user interface element in accordance with the determination that the annotation placement user interface element is over at least the portion of the representation of the first type of physical object (e.g., without receiving a user input corresponding to a request to select the first user interface element). In some embodiments, the selection indicator is displayed over the first user interface element in accordance with a determination that the annotation placement user interface is not (e.g., also) operating in a fourth annotation mode (e.g., an automatic measurement mode).

In some embodiments, displaying the second mode indication includes displaying the selection indicator over a second user interface element, of the plurality of user interface elements, that corresponds to the second annotation mode, wherein the second user interface element is different from the first user interface element (e.g., as shown in FIG. 5CA). In some embodiments, the selection indicator is displayed over the second user interface element in accordance with the determination that the placement user interface element is over at least the portion of the representation of the second type of physical object (e.g., without receiving a user input corresponding to a request to select the second user interface element). In some embodiments, the selection indicator is displayed over the second user interface element in accordance with a determination that the annotation placement user interface is not (e.g., also) operating in a fourth annotation mode (e.g., an automatic measurement mode).

Displaying a selection indicator over different user interface elements representing different annotation modes of the annotation placement user interface as the annotation mode changes provides visual feedback to the user about the current annotation mode in which the annotation placement user interface is operating. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, displaying the first mode indication includes (1126) displaying a selection indicator over a fourth user interface element, of the plurality of user interface elements, that corresponds to a fourth annotation mode (e.g., an automatic measurement mode in which measurement mode is automatically changed (e.g., between other annotation modes in the plurality of annotation modes) based on which type of object is in the representation of the field of view at the location of the placement user interface element), different from the first annotation mode and the second annotation mode (e.g., as shown in FIG. 6B, with selection indicator 635 over automatic measurement mode icon 605-1). In some embodiments, displaying the second mode indication includes displaying the selection indicator over the user interface element that corresponds to the fourth annotation mode (e.g., the same user interface element, corresponding to the same automatic measurement mode). In some embodiments, the fourth annotation mode is a mode of operation in which annotation mode is automatically changed between other annotation modes in the plurality of annotation modes (e.g., based on which type of object is in the representation of the field of view at the location of the placement user interface element), and thus operation in the fourth annotation mode can be concurrent with operation in another annotation mode such as the first annotation mode or second annotation mode, and the selection indicator remains displayed over the user interface element that corresponds to the fourth annotation mode while automatically changing annotation mode (e.g., until a different user interface element corresponding to a different annotation mode is manually selected by a user).

Displaying the placement user interface element with different appearances for different annotation modes while maintaining display of a selection indicator over a same user interface element representing a particular annotation mode of the annotation placement user interface provides visual feedback to the user that the current annotation mode in which the annotation placement user interface is operating (e.g., indicated by the selection indicator) is one in which multiple types of annotations can be added, while also providing visual feedback to the user about the types of features that are at a point of focus (e.g., indicated by the reticle) of the annotation placement user interface and that may be measured. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

It should be understood that the particular order in which the operations in FIGS. 11A-11E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1200, 1300, 1400, 1500, and 1600) are also applicable in an analogous manner to method 1100 described above with respect to FIGS. 11A-11E. For example, the user interfaces, user interface elements, physical environments and features and objects therein, feature types, annotation modes, and mode indications described above with reference to method 1100 optionally have one or more of the characteristics of the user interfaces, user interface elements, physical environments and features and objects therein, feature types, annotation modes, and mode indications described herein with reference to other methods described herein (e.g., methods 800, 900, 1000, 1200, 1300, 1400, 1500, and 1600). For brevity, these details are not repeated here.

FIGS. 12A-12C illustrate method 1200 of displaying a session history including a list of annotations added using an annotation placement user interface during an annotation session in accordance with some embodiments. Method 1200 is performed at a computer system (e.g., portable multifunction device 100 (FIG. 1A), device 300 (FIG. 3A), or computer system 301 (FIG. 3B)) with a display device (e.g., a display, optionally touch-sensitive, a projector, a head-mounted display, a heads-up display, or the like, such as touch screen 112 (FIG. 1A), display 340 (FIG. 3A), or display generation component(s) 304 (FIG. 3B)), one or more cameras (e.g., optical sensor(s) 164 (FIG. 1A) or camera(s) 305 (FIG. 3B)), and optionally one or more depth sensing devices, such as depth sensors (e.g., one or more depth sensors such as time-of-flight sensor 220 (FIG. 2B)). Some operations in method 1200 are, optionally, combined and/or the order of some operations is, optionally, changed.

As described herein, method 1200 provides a session history user interface (e.g., as shown in FIG. 5AZ), in which the system presents a list (e.g., a scrollable list) of all annotations that have been added in an annotation placement user interface during a current annotation session, enabling the user to view the annotations together and manage (e.g., rename, export, delete, etc.) the annotations without requiring the user to navigate through complex menu hierarchies or to locate and interact with each annotation individually. Providing additional control options without cluttering the user interface with numerous displayed controls while reducing the number of inputs needed to perform an operation enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system receives (1202) a first input corresponding to a request to display an annotation placement user interface (e.g., a user interface of an augmented reality measurement application, or a user interface of an augmented reality measurement mode of another application such as an image-viewing application) (e.g., input 534 over the measurement list button 506, as shown in FIG. 5AY).

In response to receiving the first input, the computer system displays (1204), via the display device, the annotation placement user interface, the annotation placement user interface including: a representation of a field of view of the one or more cameras, including a representation of a portion of a three-dimensional physical environment that is in the field of view of the one or more cameras, wherein the representation of the field of view is updated over time based on changes in the field of view (e.g., the representation of the field of view is a live view that is updated based on changes in the physical environment that are within the field of view and/or based on movement of the one or more cameras that changes which portion of the physical environment is within the field of view); interface element (e.g., a reticle) that indicates (e.g., via a dot or other marker of the reticle) a location at which a virtual annotation (e.g., a representation of a measurement) would be placed in the representation of the field of view in response to receiving an annotation placement input; and a session history user interface element (e.g., activatable to display of a list of annotations made during the current annotation session) (e.g., as shown in any of FIGS. 5C-5AY).

While displaying the annotation placement user interface (e.g., while continuously displaying the annotation placement user interface, including continually updating the annotation placement user interface based on a refresh rate of the display device and/or changes in the field of view of the one or more cameras): the computer system receives (1206) a set of inputs corresponding to a plurality of requests to annotate the representation of the field of view; and in response to receiving the set of inputs, the computer system adds a first annotation and a second annotation to the representation of the field of view of the one or more cameras. In some embodiments, the first annotation (e.g., the first representation of the first measurement) and the second annotation (e.g., the second representation of the second measurement) are displayed concurrently. In some embodiments, the first annotation ceases to be displayed before the second annotation is displayed. In some embodiments, the first annotation is separate from the second annotation (e.g., the first annotation is not connected to the second annotation and/or the first annotation is associated with a first portion of the three-dimensional physical environment and the second annotation is associated with a second portion of the three-dimensional physical environment that is different from the first portion of the three-dimensional physical environment) (e.g., FIGS. 5E-5AX show measurements being taken).

After adding the first annotation and the second annotation to the representation of the field of view of the one or more cameras (or in some embodiments after measuring the first portion and the second portion of the physical environment, and optionally displaying the first representation of the first measurement and/or the second representation of the second measurement) (and optionally while continuing to display the annotation placement user interface), the computer system receives (1208) an input corresponding to activation of the session history user interface element (e.g., as shown in FIGS. 5AY-5AZ).

In some embodiments, in response to receiving the input corresponding to activation of the session history user interface element, the computer system displays (1210) (e.g., over at least a portion of the annotation placement user interface) at least a portion of a list of annotations that includes the first annotation and the second annotation, including concurrently displaying a representation of the first annotation and a representation of the second annotation (e.g., as shown in FIG. 5AZ). In some embodiments, the list of annotations (e.g., or the portion thereof) is displayed while continuing to display the annotation placement user interface (e.g., the list is displayed in the annotation placement user interface or in a user interface that is partially overlaid on the annotation placement user interface). In some embodiments, the list is displayed in a user interface that replaces display of the annotation placement user interface.

In some embodiments, the system receives a set of inputs corresponding to a plurality of requests to measure the representation of the field of view (e.g., including a first request to measure a first portion of the representation of the field of view that corresponds to a first portion of the physical environment, and including a second request to measure a second portion of the representation of the field of view that corresponds to a second portion of the physical environment) (e.g., FIGS. 5E-5AX show measurements being taken). In some embodiments, in response to receiving the set of inputs, the system measures the first portion of the physical environment, optionally displaying (e.g., adding to the representation of the field of view) a first representation of a first measurement of the first portion of the physical environment, and measures a second portion of the physical environment, optionally displaying a second representation of a second measurement of the second portion of the physical environment. In some embodiments, the first representation of the first measurement and the second representation of the second measurement are displayed concurrently. In some embodiments, the first representation of the first measurement ceases to be displayed before the second representation of the second measurement is displayed. In some embodiments, the first representation of the first measurement is separate from the second representation of the second measurement. In some embodiments, after measuring the first portion and the second portion, and optionally displaying the first representation of the first measurement and/or the second representation of the second measurement (and optionally while continuing to display the annotation placement user interface), the system receives an input corresponding to activation of the session history user interface element and, in response, the system displays at least a portion (e.g., part or all) of a list of measurements that include the first measurement and the second measurement. In some embodiments, displaying at least the portion of the list of measurements includes concurrently displaying a representation of the first measurement (e.g., a first list element that corresponds to the first measurement and that includes the first representation of the first measurement) and a representation of the second measurement (e.g., a second list element that corresponds to the second measurement and that includes the second representation of the second measurement) (e.g., as shown in FIG. 5AZ).

In some embodiments, the displayed portion of the list of annotations is displayed (1212) over a portion of the annotation placement user interface (e.g., in a list user interface panel) (e.g., as shown in FIG. 5AZ). In some embodiments, the displayed portion of the list of annotations includes the entire list of annotations. In some embodiments, the displayed portion of the list of annotations includes a partial set of annotations in the list of annotations, and additional annotations in the list are viewable by scrolling the list (e.g., additional annotations are displayed, and a corresponding number of displayed annotations cease to be displayed, in response to an input, such as an upward or downward drag gesture, corresponding to a request to scroll the displayed list of annotations). In some embodiments, the display of at least the portion of the list of annotations replaces display of the annotation placement user interface on the display.

Presenting the list of annotations that have been added in an annotation placement user interface during a current annotation session over a portion of the annotation placement user interface enables the user to view and interact with the list of annotations while also allowing the user to continue to view and interact with at least a portion of the annotation placement user interface (e.g., with a live view of one or more cameras in the background) rather than requiring the user to exit the list of annotations in order to use the annotation placement user interface. Providing additional control options that reduce the number of inputs needed to perform operations enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, a respective annotation in the list of annotations corresponds (1214) to a physical feature in the physical environment, and a representation of the respective annotation displayed in the displayed portion of the list of annotations includes a text label describing the physical feature, examples of which are shown in FIG. 5AZ. In some embodiments, the text of the text label is qualitatively determined (e.g., automatically) by the system based on feature and object recognition performed on the representation of the field of view of the one or more cameras (e.g., including object recognition performed on the representation of the physical feature in the representation of the field of view of the one or more cameras). In some embodiments, each list item in the list of annotations corresponds to a respective physical feature and, if displayed, includes a text label describing the corresponding physical feature (e.g., as shown in FIGS. 5AZ-5BA).

Providing, in the list of annotations, descriptions of the annotated physical features provides visual feedback to the user with information about the physical features that the user has annotated, optionally based on determinations about the physical features made by the system without requiring the user to specify the information. Providing improved visual feedback to the user, and optionally performing an operation (e.g., automatically) when a set of conditions has been met without requiring further user input, enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the physical feature is a physical object (1216), and the text label describing the physical feature classifies the physical object as a respective type of object (e.g., as a chair, table, lamp, etc.) (e.g., as shown in FIGS. 5AZ-5BA).

Providing classifying descriptions of the annotated physical features provides visual feedback to the user with information about the physical features that the user has annotated, optionally based on determinations about the physical features made by the system without requiring the user to specify the information. Providing improved visual feedback to the user, and optionally performing an operation (e.g., automatically) when a set of conditions has been met without requiring further user input, enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the respective annotation corresponds (1218) to a measurement of the physical feature, and the representation of the respective annotation includes a numeric value of the measurement (e.g., as shown in FIGS. 5AZ-5BA). In some embodiments, the numeric value of the measurement is quantitatively determined (e.g., automatically) by the system measuring the physical feature using depth information about the physical feature and the physical environment. In some embodiments, a text label in the representation of the respective annotation includes a classification of the measurement as a type of measurement (e.g., as a height, width, depth, angle, area, volume, etc.), optionally based on object recognition performed on the representation of the physical feature, examples of which are shown in FIGS. 5AZ-5BA).

Providing measurements of physical features as part of the annotations of the physical features provides visual feedback to the user with information about the physical features that the user has annotated, optionally based on determinations about the physical features made by the system without requiring the user to specify the information. Providing improved visual feedback to the user, and optionally performing an operation (e.g., automatically) when a set of conditions has been met without requiring further user input, enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (1220), at a location corresponding to a representation of a respective annotation in the displayed portion of the list of annotations, a first input (e.g., a tap gesture); and in response to receiving the first input (e.g., and in accordance with a determination that the input is a particular type of gesture, such as a tap gesture), the computer system displays the representation of the respective annotation without displaying representations of other annotations (e.g., ceasing to display any other displayed representations of annotations in the list of annotations) (e.g., as described in reference to 5BA-5BB). In some embodiments, display of the representations of the other annotations is maintained while displaying the representation of the respective annotation in response to receiving the first input (e.g., the representation of the respective annotation, optionally including additional information about the respective annotation, is displayed in or over a different portion of the annotation user interface than the displayed portion of the list of annotations, and the displayed portion of the list of annotations is optionally maintained) (e.g., as described in reference to 5BA-5BB).

Displaying a representation of a single annotation from the list of annotations without displaying representations of other annotations provides information about the single annotation without distraction, making it easier to interact with just the single annotation and optionally allowing additional interaction options for the single annotation to be presented to the user. Providing improved visual feedback to the user and providing additional control options without cluttering the user interface with additional displayed controls enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the representation of the respective annotation includes (1222) a text label describing the respective annotation (e.g., a name for the respective annotation or a description of a physical feature to which the respective annotation corresponds). In some embodiments, while displaying the representation of the respective annotation without displaying representations of other annotations, the computer system receives, at a location corresponding to the text label describing the respective annotation, a second input (e.g., a second tap gesture); and in response to receiving the second input (e.g., and in accordance with a determination that the second input is a particular type of gesture, such as a tap gesture), the computer system displays a set of user interface elements for editing text of the text label (e.g., displaying a text editing region that displays the current text of the text label, and optionally displaying a keyboard user interface) (e.g., as described in reference to 5BB-5BG).

Allowing the user to edit a text label for an annotation provides the user with control over how annotations are labeled in the user interface and enables the user to assign preferred or more easily understood names to annotations, which better informs the user about the annotation upon later review. Providing improved visual feedback to the user and providing additional control options without cluttering the user interface with additional displayed controls (e.g., by optionally displaying text editing user interface elements upon selection of a label, and optionally hiding the text editing user interface elements after the user has finished editing) enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, while displaying the representation of the respective annotation without displaying representations of other annotations, the computer system receives (1224), at a location corresponding to the respective annotation, a third input (e.g., corresponding to a request to display additional options for interacting with the respective annotation, such as an upward drag gesture); and in response to receiving the third input (e.g., and in accordance with a determination that the third input is a particular type of gesture (e.g., a different type of gesture from the second input)), the computer system displays a set of user interface elements corresponding to additional options for the respective annotation (e.g., expanding a portion of the user interface in which the representation of the respective annotation is displayed, and displaying the additional user interface elements in the expanded portion) (e.g., as shown in FIGS. 5BH-5BJ).

In some embodiments, the representation of the respective annotation includes one or more measurements of a physical feature corresponding to the respective annotation, and the additional options for the respective annotation include additional measurements. For example, the corresponding physical feature is a three-dimensional physical object, the representation of the respective annotation includes measurements of length, width, and/or height of the physical object, and the additional options include measurements of areas of one or more surfaces of the physical object and/or volume of the physical object, etc. In some embodiments, the additional options include options for interacting with the respective annotation include options for sharing information about the respective annotation, including for example a user interface element for copying the information about the respective annotation, a user interface element for initiating sending of a message (e.g., SMS/MMS, email, etc.) that includes the information about the respective annotation, and/or a user interface element for initiating wireless transfer (e.g., to a nearby system) of a file that includes information about the respective annotation. In some embodiments, display of the representations of the other annotations is maintained while displaying the set of user interface elements corresponding to the additional options for interacting with the respective annotation in response to receiving the third input (e.g., the representation of the respective annotation and/or the additional interaction options are displayed in or over a different portion of the annotation user interface than the displayed portion of the list of annotations, and the displayed portion of the list of annotations is optionally maintained).

Providing additional options for interacting with an annotation in response to an input corresponding to a displayed representation of a single annotation provides the additional options for the single annotation without distraction from other annotations in the list, and makes it easier to interact with just the single annotation, as well as avoiding cluttering the user interface with the additional options while representations of other annotations in the list are also displayed. Providing additional control options without cluttering the user interface with additional displayed controls enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (1226), at a location corresponding to a representation of a respective annotation in the list of annotations, an input that is a first type of gesture (e.g., a swipe gesture); and in response to receiving the input that is the first type of gesture, the computer system removes the representation of the respective annotation from the displayed portion of the list of annotations (e.g., as described above in reference to FIGS. 5BM-5BO).

Removing the representation of an annotation in response to an input that is a particular type of gesture allows the user to quickly delete annotations that are no longer wanted or needed without requiring display of a dedicated user interface element for deleting annotations or requiring the user to navigate through complex menu hierarchies. Reducing the number of inputs needed to perform an operation, and providing additional control options without cluttering the user interface with additional displayed controls, enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the annotation placement user interface is (1228) displayed in connection with an annotation session (e.g., a first annotation session) that is initiated after displaying the annotation placement user interface in connection with a prior (e.g., second) annotation session during which one or more third annotations were added to the representation of the field of view of the one or more cameras. In some embodiments, the list of annotations that includes the first annotation and the second annotation does not include the one or more third annotations that were added during the prior annotation session. In some embodiments, a list of annotations added during a current annotation session is cleared when the current annotation session ends, and/or when a new annotation session begins. In some embodiments, ceasing to display the annotation placement user interface (e.g., where the annotation placement user interface is a user interface of an associated application, closing the application) ends the current annotation session. In some embodiments, initiating display of the annotation placement user interface (e.g., launching the associated application) begins a new annotation session (e.g., as described above with reference to FIG. 5BQ).

Displaying, in a list of annotations, only annotations that have been added during a current annotation session without displaying annotations added during a prior annotation session provides the user with information about recent annotations that have been made (and in some cases, for which data such as measurements remains accurate due to limitations in visual odometry requiring continuous and/or localized capture of information indicative of the physical environment) in an organized manner without providing information about older annotations that may no longer be relevant or accurate. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

It should be understood that the particular order in which the operations in FIGS. 12A-12C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100, 1300, 1400, 1500, and 1600) are also applicable in an analogous manner to method 1200 described above with respect to FIGS. 12A-12C. For example, the user interfaces, user interface elements, physical environments and features and objects therein, annotations, text labels, and measurements described above with reference to method 1200 optionally have one or more of the characteristics of the user interfaces, user interface elements, physical environments and features and objects therein, annotations, text labels, and measurements described herein with reference to other methods described herein (e.g., methods 800, 900, 1000, 1100, 1300, 1400, 1500, and 1600). For brevity, these details are not repeated here.

FIGS. 13A-13D are flow diagrams illustrating method 1300 of measuring paths along physical surfaces, taking shape and curvature of the physical surfaces into account, in accordance with some embodiments. Method 1300 is performed at a computer system (e.g., portable multifunction device 100 (FIG. 1A), device 300 (FIG. 3A), or computer system 301 (FIG. 3B)) with a display device (e.g., a display, optionally touch-sensitive, a projector, a head-mounted display, a heads-up display, or the like, such as touch screen 112 (FIG. 1A), display 340 (FIG. 3A), or display generation component(s) 304 (FIG. 3B)), one or more cameras (e.g., optical sensor(s) 164 (FIG. 1A) or camera(s) 305 (FIG. 3B)), and optionally one or more depth sensing devices, such as depth sensors (e.g., one or more depth sensors such as time-of-flight sensor 220 (FIG. 2B)). Some operations in method 1300 are, optionally, combined and/or the order of some operations is, optionally, changed.

As described herein, method 1300 measures between different physical locations in a physical environment that correspond to user-specified points or locations in a representation of field of view, and, where the different physical locations are located on a physical surface that is not flat, the measurement between the physical locations automatically takes into account the shape of the physical surface, thus providing improved measurement functionality that helps the user measure the physical environment more accurately. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system displays (1302), via the display device, an annotation placement user interface (e.g., a user interface of an augmented reality measurement application), the annotation placement user interface including a representation of a field of view of the one or more cameras (e.g., as shown in FIG. 6A), the representation of the field of view including a representation of a portion of a three-dimensional physical environment that is in the field of view of the one or more cameras. The representation of the field of view is updated over time based on changes in the field of view of the one or more cameras (e.g., the representation of the field of view is a live view that is updated based on changes in the physical environment that are within the field of view and/or based on movement of the one or more cameras that changes which portion of the physical environment is within the field of view).

In some embodiments, the computer system receives (1304) one or more first inputs that correspond to a request to measure from a first location in the representation of the field of view to a second location, different from the first location, in the representation of the field of view, wherein the first location in the representation of the field of view corresponds to a first physical location on a (e.g., detected) physical surface in the physical environment, and the second location in the representation of the field of view corresponds to a second physical location, different from the first physical location, on the physical surface (e.g., as shown in FIGS. 6C-6H).

In some embodiments, in response to receiving the one or more first inputs, the computer system displays (1306), via the display device, a representation of a first measurement from the first location in the representation of the field of view to the second location in the representation of the field of view (e.g., the representation of the first measurement includes a length of a path from the first physical location to the second physical location), including, in accordance with a determination that the physical surface is not a flat surface (e.g., the physical surface is at least partially curved and/or includes two or more intersecting surfaces), accounting for the shape of the physical surface (e.g., between the first physical location and the second physical location, along the path from the first physical location to the second physical location) when displaying the representation of the first measurement (e.g., as described above in reference to FIGS. 6B-6H).

In some embodiments, the representation of the first measurement measures a simulated surface that corresponds (e.g., conforms) to the physical surface. In some embodiments, the representation of the first measurement includes a measurement segment that is constrained in accordance with depth information about the physical environment (e.g., including depth information about the physical surface, obtained using any of the methodologies and sensors described herein). In some embodiments, in accordance with the determination that the physical surface is not a flat surface, the measurement follows a path that corresponds to a non-linear path in the physical environment (e.g., as described above in reference to FIG. 6D). In some embodiments, in accordance with a determination that the physical surface is a flat surface, the measurement follows a linear path (e.g., along the flat surface) in the physical environment. In some embodiments, the representation of the first measurement includes a label describing the first measurement (e.g., a label indicating the length of the first measurement constrained along the physical surface) (e.g., as described above in reference to FIGS. 6E-6H). In some embodiments, the shape of the physical surface is determined from information indicative of the physical environment, such as depth information obtained using one or more depth sensors of the system.

In some embodiments, displaying (1306) the representation of the first measurement includes displaying (1308) a representation of a first path in the physical environment (e.g., displaying a measurement segment), wherein the first path extends from the first physical location to the second physical location; and in accordance with the determination that the physical surface is not a flat surface, the representation of the first path has a shape determined based on the shape of the physical surface between the first physical location and the second physical location (e.g., the first path follows the shape of the physical surface, based on curvature of the physical surface in three-dimensional space) (e.g., as described above in reference to FIGS. 6B-6H).

Displaying a representation of a path of the measurement between user-specified points corresponding to physical locations, including displaying the representation of the path with a shape determined based on the shape of the physical surface between the user-specified points if the physical surface is not flat, provides visual feedback to the user that indicates the measurement path and, where applicable, that the measurement path is not straight (e.g., the measurement path is along a surface that is not flat). Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first path conforms (1310) to (e.g., tracks or follows) the shape of the physical surface between the first physical location and the second physical location (e.g., as described in reference to FIGS. 6B-6H). In some embodiments, the first path is a path that is determined (e.g., by the system) to be the shortest path along the physical surface between the first physical location and the second physical location. In some embodiments, the first path is a projection, onto the physical surface, of a direct path (e.g., a shortest path through physical space) from the first physical location to the second physical location.

Conforming the path of the measurement between user-specified points to the shape of the physical surface between the user-specified points, particularly if the physical surface is not flat, provides visual feedback to the user that indicates that the measurement path is along a physical surface that is not flat and that the measurement takes into account the irregular shape of the physical surface (e.g., as described in reference to FIGS. 6B-6H). Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system displays (1312) one or more scale markers at intervals along the representation of the first path (e.g., as part of or in combination with displaying the representation of the first path), wherein, in accordance with the determination that the physical surface is not a flat surface, the intervals at which the one or more scale markers are displayed account for the shape of the physical surface (e.g., the scale markers are displayed at intervals along the representation of the first path that indicate regular intervals along the physical surface between the first physical location and the second physical location; however, due to the shape (e.g., curvature) of the physical surface, the intervals at which the scale markers are displayed may appear irregularly spaced in the displayed user interface). In some embodiments, in accordance with a determination that the physical surface is a flat surface, the scale markers are displayed at regular intervals along the representation of the first path (e.g., the intervals indicate regular intervals along the physical surface between the first location and the second location and also appear regularly spaced). In some embodiments, the one or more scale markers (e.g., of a respective set of scale markers) are displayed in accordance with a determination that the one or more cameras are within a threshold range of distances from the first path along the physical surface, for example as described herein with reference to method 800 (e.g., as described in reference to FIGS. 5O and 8A-8F).

Displaying scale markers along a representation of a path of a measurement between user-specified points, and displaying the scale markers in a manner that accounts for the shape of the physical surface between the user-specified points, for example by displaying the scale markers at slightly irregularly spaced intervals, provides the user with additional detail about the extent (e.g., length) of the measurement as well as an indication that the measurement path is not straight. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (1314) one or more second inputs that correspond to a request to measure from the first location in the representation of the field of view to a third location in the representation of the field of view, wherein the third location is different from the first location and the second location and corresponds to a third physical location on the physical surface in the physical environment. In some embodiments, in response to receiving the one or more second inputs, the computer system displays, via the display device, a representation of a second measurement from the first location in the representation of the field of view to the third location in the representation of the field of view. In some embodiments, displaying the representation of the second measurement includes displaying a representation of a second path, different from the first path, in the physical environment; the second path extends from the first physical location to the third physical location and conforms to the shape of the physical surface between the first physical location and the third physical location; and a shape of the representation of the second path is different from the shape of the representation of the first path.

Displaying a representation of a first path, which is between a first pair of physical locations, with a different shape from the shape of the representation of a second path, which is between a second pair of physical locations, provides visual feedback to the user that indicates that the paths are different paths, that at least one of the paths is along a physical surface that is not flat, and that the measurements of the two paths take into account the irregular shape of the corresponding physical surface(s) that the paths follow. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the one or more first inputs are received (1316) while the annotation placement user interface is operating in a first mode (e.g., a curved measurement mode) (e.g., accounting for the shape of the physical surface is performed in accordance with a determination that the annotation placement user interface is operating in the first mode as well as the determination that the physical surface is not a flat surface). In some embodiments, the computer system receives one or more third inputs that correspond to a request to measure from the first location in the representation of the field of view to the second location in the representation of the field of view; and in response to receiving the one or more third inputs: in accordance with a determination that the one or more third inputs are received while the annotation placement user interface is operating in a second mode (e.g., a straight line measurement mode) different from the first mode, the computer system displays, via the display device, a representation of a third measurement without accounting for the shape of the physical surface. In some embodiments, a value of the third measurement, which does not account for the shape of the physical surface, is different from a value of the first measurement, which does account for the shape of the physical surface (e.g., if the physical surface is not a flat surface). In some embodiments, in accordance with a determination that the one or more third inputs are received while the annotation placement user interface is operating in the first mode (e.g., the curved measurement mode), a representation of a measurement that accounts for the shape of the physical surface is displayed.

Providing a separate mode of operation that enables measuring along paths that are not straight (e.g., paths that are curved) and that is distinct from a mode of operation in which measurements are made along paths that are straight provides the user with greater measurement functionality, and displaying different types of representations of measurements for the different modes (e.g., a representation of a measurement that accounts for surface shape while in the curved measurement mode, in contrast to a representation of a measurement that does not account for surface shape while in the straight line measurement mode) provides visual feedback to the user that indicates the current mode of operation and whether the measurement path is straight or not. Providing additional control options and improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the one or more first inputs consist of (1318) an input selecting the first location in the representation of the field of view and an input selecting the second location in the representation of the field of view. In some embodiments, the one or more first inputs include an input selecting the first location in the representation of the field of view and an input selecting the second location in the representation of the field of view without including an input specifying the shape of the physical surface. In some embodiments, the one or more first inputs are received after receiving an input corresponding to a request to transition the annotation mode to a curved measurement mode, and while the annotation placement user interface is operating in the curved measurement mode. In some embodiments, the shape of the physical surface is determined by the system based on information indicative of the physical environment (e.g., depth information) obtained by the system using one or more depth sensors (e.g., without requiring a user to provide information about the shape of the physical surface).

Displaying a representation of a measurement between two user-specified points that takes into account the shape of the physical surface between the user-specified points without requiring the user to specify the shape of the physical surface provides improved measurement functionality that helps the user measure the physical environment more quickly and accurately. Performing an operation (e.g., automatically) when a set of conditions has been met in a manner that reduces the number of inputs needed to perform the operation enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first measurement measures (1320) a path from the first physical location to the second physical location, and a portion of the path extends at least partially in a first direction different from (e.g., perpendicular to) a direction along a straight line that passes through the first physical location and the second physical location in the physical environment. In some embodiments, the path is two-dimensional in a plane that includes the straight line and a line that is perpendicular to the straight line, and the path lies in the plane to one side of the straight line (e.g., in the direction of a first ray (half line), of the perpendicular line, that extends from the intersection of the perpendicular line and the straight line). In some embodiments, the physical surface is concave between the first physical location and the second physical location (e.g., the straight line segment between the first physical location and the second physical location passes above the physical surface, for example through air).

Displaying a representation of a path of a measurement between user-specified points corresponding to physical locations, where the path curves away from a straight line that passes through the physical locations, provides visual feedback to the user indicating that the measurement path is not straight. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first measurement measures (1322) a path from the first physical location to the second physical location, and a portion of the path extends at least partially in a second direction perpendicular to a straight line that passes through the first physical location and the second physical location in the physical environment (e.g., the path extending along the curved guide 642 in FIG. 6F). In some embodiments, the path is two-dimensional in a plane that includes the straight line and the line that is perpendicular to the straight line, and the path meets the straight line only at the endpoints of the path. In some embodiments, the physical surface is convex between the first physical location and the second physical location (e.g., the straight line segment between the first physical location and the second physical location passes beneath the physical surface, through a physical object whose outer surface includes the physical surface).

Displaying a representation of a path of a measurement between user-specified points corresponding to physical locations, where the path curves away from a straight line that passes through the physical locations, provides visual feedback to the user indicating that the measurement path is not straight. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first measurement measures (1324) a path from the first physical location to the second physical location, and the path extends at least partially in a first direction perpendicular to a straight line that passes through the first physical location and the second physical location in the physical environment, and at least partially in a second direction that is perpendicular to the straight line and opposite the first direction (e.g., as shown in FIG. 6H). In some embodiments, the path is two-dimensional in a plane that includes the straight line and the line that is perpendicular to the straight line, and the path lies in the plane on both sides of the straight line (e.g., the path meets or intersects the straight line at three or more points (e.g., the endpoints of the path and at least one other point)). In some embodiments, the physical surface between the first physical location and the second physical location is partially convex and partially concave (e.g., one or more portions of the straight line segment between the first physical location and the second physical location pass beneath the physical surface, through a physical object whose outer surface includes the physical surface, and one or more portions of the straight line segment pass above the physical surface).

Displaying a representation of a path of a measurement between user-specified points corresponding to physical locations, where the path curves away from a straight line that passes through the physical locations, provides visual feedback to the user indicating that the measurement path is not straight. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system displays (1326) a guide over the representation of the field of view (e.g., over a representation of the physical surface in the representation of the field of view) that indicates the shape of the physical surface (e.g., as shown in FIG. 6D). In some embodiments, the guide is displayed in accordance with the determination that the physical surface is not a flat surface. As described herein with reference to method 900, in some embodiments the guide is displayed in response to a placement user interface element of the annotation user interface indicating the first location in the representation of the field of view (e.g., based on movement of the placement user interface element over the first location and/or snapping of the placement user interface element to the first location). As described herein with reference to method 1000, in some embodiments the guide is displayed in response to an input corresponding to a request to annotate (e.g., add a measurement point) at the first location in the representation of the field of view (e.g., an annotation placement input received while the placement user interface element indicates the first location).

Displaying a guide indicating the shape of the physical surface, particularly if the physical surface is not flat, provides visual feedback to the user indicating not only the shape of the physical surface but also the probable shape of an annotation or measurement that starts from or includes the current point of focus. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the annotation placement user interface includes (1328) an annotation placement user interface element (e.g., a reticle) that indicates (e.g., via a dot or other marker of the reticle) a location at which a virtual annotation (e.g., a measurement point or other representation of a measurement) would be placed in the representation of the field of view in response to receiving an annotation placement input. While the annotation placement user interface element indicates a respective location in the representation of the field of view, in accordance with a determination that the respective location in the representation of the field of view corresponds to a respective physical location on a physical surface that is not a flat surface, the placement user interface element indicates the shape of the physical surface (e.g., the appearance of the placement user interface element is based on (e.g., conforms to or is contoured to) the shape of the physical surface, for example such that the placement user interface element appears projected onto or draped over the physical surface) (e.g., as shown in FIGS. 6B-6G).

Displaying a placement user interface element with an appearance that indicates the shape of the physical surface, particularly if the physical surface is not flat, provides visual feedback to the user indicating not only the shape of the physical surface but also the probable shape of an annotation or measurement that starts from or includes the current point of focus (e.g., indicated by the placement user interface element). Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

It should be understood that the particular order in which the operations in FIGS. 13A-13D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100, 1200, 1400, 1500, and 1600) are also applicable in an analogous manner to method 1300 described above with respect to FIGS. 13A-13D. For example, the user interfaces, user interface elements, physical environments and features and objects therein, physical surfaces, paths, annotation modes, annotations, representations of measurements, scale markers, and guides described above with reference to method 1300 optionally have one or more of the characteristics of the user interfaces, user interface elements, physical environments and features and objects therein, physical surfaces, paths, annotation modes, annotations, representations of measurements, scale markers, and guides described herein with reference to other methods described herein (e.g., methods 800, 900, 1000, 1100, 1200, 1400, 1500, and 1600). For brevity, these details are not repeated here.

FIGS. 14A-14D are flow diagrams illustrating method 1400 of measuring physical features represented in previously-captured media in accordance with some embodiments. Method 1400 is performed at a computer system (e.g., portable multifunction device 100 (FIG. 1A), device 300 (FIG. 3A), or computer system 301 (FIG. 3B)) with a display device (e.g., a display, optionally touch-sensitive, a projector, a head-mounted display, a heads-up display, or the like, such as touch screen 112 (FIG. 1A), display 340 (FIG. 3A), or display generation component(s) 304 (FIG. 3B)), optionally one or more cameras (e.g., optical sensor(s) 164 (FIG. 1A) or camera(s) 305 (FIG. 3B)), and optionally one or more depth sensing devices, such as depth sensors (e.g., one or more depth sensors such as time-of-flight sensor 220 (FIG. 2B)). Some operations in method 1400 are, optionally, combined and/or the order of some operations is, optionally, changed.

As described herein, method 1400 displays measurements of one or more physical features represented in previously-captured media (e.g., automatically) in response to a request to display a representation of the previously-captured media (e.g., an image, such as a photo or a frame of a video), which provides the user with information about dimensions of the physical features captured in the image, in some embodiments without requiring the user to provide any inputs requesting display of the measurements (other than the input requesting display of the representation of the previously-captured media itself). Performing operations in a manner that reduces the number of inputs needed or without requiring further user input at all enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system displays (1402), via the display device, a first user interface of an application executing on the computer system (e.g., as shown in FIG. 6K).

While displaying the first user interface of the application, the computer system receives (1404) one or more inputs corresponding to a request to display a second user interface of the application for displaying an annotated representation of first previously-captured media (e.g., a still image) (e.g., as described in reference to FIGS. 6L-6M). In some embodiments, the application is a media (e.g., image or video) viewing application, and the first user interface is a media viewing user interface. In some embodiments, the one or more inputs correspond to a request to display an annotation user interface in a user interface of the media viewing application (e.g., a request to enable an annotation mode, such as a measurement mode, of the media viewing application).

In response to receiving the one or more inputs corresponding to the request to display the second user interface for displaying the annotated representation of the first previously-captured media, the computer system displays (1406) the second user interface, including: displaying the annotated representation of the first previously-captured media (e.g., a still image), wherein the annotated representation of the first previously-captured media includes a representation of a first portion of a three-dimensional physical environment in which the first previously-captured media was captured; and in accordance with a determination that the representation of the first previously-captured media includes one or more regions corresponding to one or more first physical features in the physical environment that can be measured (e.g., based on the previously-captured media including or being associated with depth information about the physical features in the physical environment), displaying (e.g., automatically) one or more representations of measurements of the one or more first physical features (e.g., as shown in FIGS. 6M-6P, 6R-6S, 6V, 6W, and 6Y).

In some embodiments, the system displays the one or more representations of measurements without regard to whether a user input corresponding to a request to measure the one or more physical features (e.g., separate from the request to display the second user interface) has been received. In some embodiments, determining that a respective physical feature can be measured includes determining that the respective physical feature can be measured by the system, based on information indicative of the respective physical feature, such as depth information obtained about the respective physical feature using one or more depth sensors of the system, and optionally included in or associated with corresponding previously-captured media that includes a representation of the respective physical feature. In some embodiments, determining that a respective physical feature cannot be measured includes determining that the respective physical feature cannot be measured by the system, based on (e.g., due to) insufficient information indicative of the respective physical feature (e.g., information that is incomplete, lacking in fidelity, or lacking altogether), such as depth information, being included in or associated with corresponding previously-captured media that includes a representation of the respective physical feature.

In some embodiments, displaying the one or more representations of measurements includes (1408) concurrently displaying: a first representation of a first measurement (e.g., of a first physical feature of the one or more physical features); and a second representation of a second measurement (e.g., of a second physical feature of the one or more physical features) (e.g., as shown in FIGS. 6M-6P, 6S, 6V, 6W, and 6Y). In some embodiments, displaying the one or more representations of measurements includes concurrently displaying respective representations of multiple (e.g., two, three, four, five, or more) measurements (e.g., including the first and second measurements) in response to receiving the one or more inputs corresponding to the request to display the second user interface for annotating the representation of the previously-captured media.

Concurrently displaying multiple representations of measurements efficiently provides the user with information about dimensions of multiple aspects of an image (e.g., multiple physical features captured in the image) without requiring the user to provide inputs to request display of and view each measurement individually in turn. Performing operations in a manner that reduces the number of inputs needed or without requiring further user input at all enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, in accordance with a determination that the representation of the first previously-captured media includes one or more regions corresponding to one or more first physical features in the physical environment for which information that enables measurement is not available (e.g., the previously-captured media does not include or is not associated with depth information about the physical features), the computer system forgoes (1410) displaying one or more (e.g., any) representations of measurements of the one or more physical features that cannot be measured (e.g., as described in reference to 6U-6V).

Forgoing displaying representations of measurements for physical features that the system is unable to measure (e.g., due to insufficient depth information available for those physical features) avoids providing the user with inaccurate information that would clutter the user interface and distract from representations of measurements that the system was able to properly make. Providing improved visual feedback to the user and reducing clutter in the user interface enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the representation of the first previously-captured media includes (1412) a representation of a respective physical feature (e.g., as described above in reference to FIGS. 6K-6Y). In some embodiments, the computer system receives a user input corresponding to a request to measure the respective physical feature, and forgoes displaying a representation of a measurement corresponding to the respective physical feature in response to receiving the user input (e.g., ignoring the user input corresponding to the request to measure the respective physical feature). In some embodiments, user inputs corresponding to requests to measure physical features are ignored.

Forgoing adding a representation of a measurement for a physical feature in a representation of previously-captured media in response to a user input requesting to measure the physical feature provides feedback to the user that the requested physical feature cannot be measured by the system (e.g., in embodiments where measurements for all physical features that can be measured are already automatically displayed). Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (1414) one or more inputs corresponding to a request to display a representation of a second previously-captured media (e.g., as described above in reference to FIGS. 6P-6R). In some embodiments, the one or more inputs correspond to a request to switch from displaying the representation of the first previously-captured media to displaying the representation of the second previously-captured media. In some embodiments, the one or more inputs include selection of a user interface element (e.g., thumbnail image) corresponding to the representation of the second previously-captured media. In some embodiments, the one or more inputs include a gesture associated with navigating to a next or previous representation of previously-captured media in a list or collection of previously-captured media (the representation of the second previously-captured media being the next or previous representation in the list or collection).

In some embodiments, in response to receiving the one or more inputs corresponding to the request to display the representation of the second previously-captured media, the computer system displays the representation of the second previously-captured media, wherein: the representation of the second previously-captured media includes a representation of the first portion of the three-dimensional physical environment (e.g., a same portion captured in the representation of the first media); and the representation of the second previously-captured media includes a plurality of regions corresponding to a plurality of physical features in the physical environment that can be measured, the plurality of physical features including the one or more first physical features, of the first previously-captured media, that can be measured and at least one additional physical feature that can be measured (e.g., the second previously-captured media includes or is associated with more information about the physical environment). In some embodiments, the second previously-captured media includes more representations of measurable physical features than the first previously-captured media (e.g., as shown in FIGS. 6M-6P, and 6R-6S).

In some embodiments, the measurable physical features captured in the second previously-captured media are a superset of the measurable physical features of the first previously-captured media. In some embodiments, the number of regions, in the representation of the second previously-captured media, that correspond to physical features that can be measured is greater than the number of regions, in the representation of the first previously-captured media, that correspond to physical features that can be measured. In some embodiments, possible reasons for more information about the physical environment being available in the second previously-captured media than in the first previously-captured media include an improvement in lighting in the room, a change in position of the one or more cameras or depth sensors that enables higher resolution or greater visibility of features such as physical objects or edges thereof in the physical environment, removal of elements obscuring the one or more cameras or depth sensors, etc.

In some embodiments, in response to receiving the one or more inputs corresponding to the request to display the representation of the second previously-captured media, the computer system displays a plurality of representations of measurements of the plurality of physical features (e.g., by displaying a respective representation of a measurement of each of the plurality of physical features) (e.g., as shown in FIGS. 6R-6S).

When switching to displaying a representation of media that captures more physical features that can be measured (e.g., through including more depth information), displaying more representations of measurements for the greater number of physical features provides the user with visual feedback that a different representation of media that includes more information about physical features is being displayed, and provides the user with additional information about dimensions of the particular physical features captured in the currently-displayed representation of media without requiring the user to provide inputs to request display of the additional information. Providing improved visual feedback (e.g., automatically) without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (1416) one or more inputs corresponding to a request to display a representation of a third previously-captured media (e.g., as described above in reference to FIGS. 6S-6T). In some embodiments, the one or more inputs correspond to a request to switch from displaying a currently-displayed representation of previously-captured media (e.g., such as the first or second previously-captured media) to displaying the representation of the third previously-captured media. In some embodiments, the one or more inputs include selection of a user interface element (e.g., thumbnail image) corresponding to the representation of the third previously-captured media. In some embodiments, the one or more inputs include a gesture associated with navigating to a next or previous representation of previously-captured media in a list or collection of previously-captured media (the representation of the third previously-captured media being the next or previous representation in the list or collection).

In some embodiments, in response to receiving the one or more inputs corresponding to the request to display the representation of the third previously-captured media, the computer system displays the representation of the third previously-captured media, wherein: the representation of the third previously-captured media includes a representation of the first portion of the three-dimensional physical environment (e.g., a same portion captured in the representation of the first media and the representation of the third media); and the representation of the third previously-captured media includes one or more regions corresponding to one or more second physical features in the physical environment, different from the one or more first physical features, that can be measured (e.g., the third previously-captured media includes or is associated with different information about the physical environment than the first previously-captured media) (e.g., as shown in FIGS. 6M-6P and 6V-6W).

In some embodiments, in response to receiving the one or more inputs corresponding to the request to display the representation of the third previously-captured media, the computer system displays one or more representations of measurements of the one or more second physical features (e.g., by displaying a respective representation of a measurement of each of the one or more second physical features) (e.g., as shown in FIGS. 6V-6W). In some embodiments, the one or more second physical features include at least one physical feature that is not in the one or more first physical features. In some embodiments, the one or more first physical features include at least one physical feature that is not in the one or more second physical features. In some embodiments, the one or more second physical features include at least one physical feature that is also in the one or more first physical features. In some embodiments, possible reasons for different information about the physical environment being available in the third previously-captured media than in the first previously-captured media include a change in lighting in the room, a change in position of the one or more cameras or depth sensors that enables different resolution or visibility of features such as physical objects or edges thereof in the physical environment, addition or removal of elements obscuring the one or more cameras or depth sensors, etc.

When switching to displaying a representation of media that captures different physical features that can be measured, displaying different representations of measurements for the different physical features provides the user with visual feedback that a different representation of media that includes different information about physical features is being displayed, and provides the user with information about dimensions of the particular physical features captured in the currently-displayed representation of media without requiring the user to provide inputs to request display of the different information. Providing improved visual feedback (e.g., automatically) without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (1418) one or more inputs corresponding to a request to display a representation of a fourth previously-captured media. In some embodiments, in response to receiving the one or more inputs corresponding to the request to display the representation of the fourth previously-captured media, the computer system displays the representation of the fourth previously-captured media, wherein: the representation of the fourth previously-captured media includes a representation of the first portion of the three-dimensional physical environment (e.g., the same portion captured in the representation of the first media); and the representation of the fourth previously-captured media includes one or more regions corresponding to a subset of the one or more physical features, of the first previously-captured media, that can be measured (e.g., the fourth previously-captured media includes or is associated with less information about the physical environment). In some embodiments, the fourth previously-captured media includes fewer representations of measurable physical features than the first previously-captured media. In some embodiments, the number of regions, in the representation of the fourth previously-captured media, that correspond to physical features that can be measured is less than the number of regions, in the representation of the first previously-captured media, that correspond to physical features that can be measured.

In some embodiments, in response to receiving the one or more inputs corresponding to the request to display the representation of the fourth previously-captured media, the computer system displays one or more representations of measurements of the subset of the one or more physical features (e.g., fewer representations of measurements are displayed for the fourth media than for the first media). In some embodiments, possible reasons for less information about the physical environment being available in the fourth previously-captured media than in the first previously-captured media include a decrease in lighting in the room, a change in position of the one or more cameras or depth sensors that enables lower resolution or less visibility of features such as physical objects or edges thereof in the physical environment, addition or removal of elements obscuring the one or more cameras or depth sensors, etc.

When switching to displaying a representation of media that captures fewer physical features that can be measured, displaying fewer representations of measurements for the lesser number of physical features provides the user with visual feedback that a different representation of media that includes less information about physical features is being displayed, and provides the user with information about dimensions of the particular physical features captured in the currently-displayed representation of media without requiring the user to provide inputs to request display of the information. Providing improved visual feedback (e.g., automatically) without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (1420) one or more inputs corresponding to a request to display a representation of a fifth previously-captured media (e.g., as shown in FIG. 6W). In some embodiments, in response to receiving the one or more inputs corresponding to the request to display the representation of the fifth previously-captured media: the computer system displays the representation of the fifth previously-captured media, wherein the representation of the fifth previously-captured media includes a representation of a second portion, different from the first portion, of the three-dimensional physical environment (or in some embodiments, a representation of a different three-dimensional environment from that captured in the first media) (e.g., the representation of the fifth previously-captured media does not include a representation of the first portion of the physical environment); and in accordance with a determination that the representation of the fifth previously-captured media includes one or more regions corresponding to one or more physical features in the second portion of the physical environment that can be measured, the computer system displays one or more representations of measurements of the one or more physical features in the second portion of the physical environment (e.g., as shown in FIG. 6Y). In some embodiments, the measurements of the physical features in the second portion of the physical environment are different from the measurements of the physical features in the first portion of the physical environment.

When switching to displaying a representation of media that captures different physical features that can be measured, particularly where the media captures a different portion of a physical environment (or a different physical environment altogether), displaying different representations of measurements for the different physical features provides the user with visual feedback that a different representation of media that includes different information about physical features is being displayed, and provides the user with information about dimensions of the particular physical features captured in the currently-displayed representation of media without requiring the user to provide inputs to request display of the different information. Providing improved visual feedback (e.g., automatically) without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the representation (1422) of the first previously-captured media is one of a photograph (e.g., a still image) or a video (e.g., including a sequence of images).

Displaying measurements of one or more physical features represented in previously-captured photos and videos, for example based on captured depth information associated with or included in the previously-captured photos and videos, provides the user with additional detail about the photos and videos without requiring the user to provide inputs specifically to capture the additional detail. Providing improved visual feedback to the user and reducing the number of inputs needed to perform an operation enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the application is (1424) a media (e.g., image and/or video) viewing application, the first user interface of the application is a user interface for viewing the first previously-captured media, and the one or more inputs correspond to a request to enable an annotation (e.g., measurement) mode of the media viewing application (e.g., activation of an annotation mode user interface element displayed in the first user interface of the media viewing application).

Providing a user interface for viewing or displaying an annotated representation of media that is accessible from a user interface for viewing the representation of media within a media viewing application provides the user with the option to view more detailed information about the representation of media that is being viewed without displaying the more detailed information by default. Providing additional control options to mitigate cluttering the user interface with excessive detail enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the application is (1426) an annotation application (e.g., a measurement application), the first user interface is a user interface for adding annotations (e.g., representations of measurements) to a representation of a field of view of one or more cameras of the computer system (e.g., a representation of the field of view that is a live view that is updated to reflect changes in the field of view of the one or more cameras), and the one or more inputs correspond to a request to display the representation of the first previously-captured media (e.g., the representation of the previously-captured media is accessible from the first user interface of the annotation application, for example via selection of a user interface element that is displayed in the first user interface and that corresponds to the previously-captured media). In some embodiments, the previously-captured media was captured in response to activation of a media capture user interface element displayed in the first user interface of the annotation application.

Providing a user interface for viewing or displaying an annotated representation of media that is accessible from a user interface for annotating a representation of a field of view of one or more cameras within an annotation application provides the user with the option to revisit a previously-captured, previously-annotated representation of media, such as a previously-annotated representation of a field of view, within the same annotation application without requiring the user to exit the annotation application and launch a separate media-viewing application. Reducing the number of inputs needed to perform an operation enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

It should be understood that the particular order in which the operations in FIGS. 14A-14D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100, 1200, 1300, 1500, and 1600) are also applicable in an analogous manner to method 1400 described above with respect to FIGS. 14A-14D. For example, the applications, user interfaces, user interface elements, physical environments and features and objects therein, media, annotations, and representations of measurements described above with reference to method 1400 optionally have one or more of the characteristics of the applications, user interfaces, user interface elements, physical environments and features and objects therein, media, annotations, and representations of measurements described herein with reference to other methods described herein (e.g., methods 800, 900, 1000, 1100, 1200, 1300, 1500, and 1600). For brevity, these details are not repeated here.

FIGS. 15A-15D are flow diagrams illustrating method 1500 of scanning a physical environment to capture depth information for modeling the physical environment in accordance with some embodiments. Method 1500 is performed at a computer system (e.g., portable multifunction device 100 (FIG. 1A), device 300 (FIG. 3A), or computer system 301 (FIG. 3B)) with a display device (e.g., a display, optionally touch-sensitive, a projector, a head-mounted display, a heads-up display, or the like, such as touch screen 112 (FIG. 1A), display 340 (FIG. 3A), or display generation component(s) 304 (FIG. 3B)), one or more cameras (e.g., optical sensor(s) 164 (FIG. 1A) or camera(s) 305 (FIG. 3B)), and optionally one or more depth sensing devices, such as depth sensors (e.g., one or more depth sensors such as time-of-flight sensor 220 (FIG. 2B)). Some operations in method 1500 are, optionally, combined and/or the order of some operations is, optionally, changed.

As described herein, as a physical environment is scanned to captured depth information, method 1500 displays a representation of the physical environment and displays an indication of the extent of scanning that has been completed overlaid on the representation of a portion of the physical environment for which depth information has been captured, and updates the indication to be overlaid on representations of additional portions of the physical environment as depth information is captured for those additional portions. Displaying a representation of the physical environment that includes representations of portions that have been scanned, with the indication overlaid thereon, as well as representations of portions of the physical environment that have not yet been scanned helps orient the user in the physical environment and provides the user with feedback as to which portions of the physical environment have been scanned and which portions have not, which informs the user as to which direction(s) the user should move or turn to progress the depth information capture process (e.g., as shown in FIGS. 7H-7J). Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system displays (1502), in a first region of a user interface (e.g., a user interface of an augmented reality measurement application), a representation of a field of view of the one or more cameras, wherein the one or more cameras are in a three-dimensional physical environment, and the representation of the field of view includes a representation of a first view (e.g., a first-person perspective view) of a first respective portion of the physical environment that is in the field of view of the one or more cameras (e.g., as shown in FIG. 7A).

The computer system captures (1504) depth information indicative of a first subset of the first respective portion of the physical environment (e.g., the first subset can include part or all of the first respective portion of the physical environment).

In some embodiments, the computer system displays (1506), over the representation of the field of view, a first indication that indicates an extent of the first respective portion of the physical environment for which depth information has been captured (e.g., including indicating that depth information indicative of the first subset has been captured in accordance with capturing the depth information indicative of the first subset), including displaying the first indication overlaid on at least a first portion of the representation of the field of view that includes a representation of the first subset (e.g., the first portion of the representation of the field of view corresponds to portion(s) of the physical environment, including the first subset, for which depth information has been captured), and displaying at least a second portion of the representation of the field of view (e.g., corresponding to portion(s) of the physical environment for which depth information has not been captured) without the first indication overlaid (e.g., thereon, over the second portion of the representation of the physical environment). In some embodiments, the first indication is a region (e.g., a continuous region) whose boundary indicates the extent of the physical environment for which depth information has been captured (e.g., that has been scanned by the one or more cameras and/or one or more depth sensors of the system). In some embodiments, the first indication is partially transparent (e.g., translucent) such that the first portion of the representation of the field of view is partially visible (e.g., as if underneath and visible "through" the first indication overlay) (e.g., as described in reference to 7H-7M).

In some embodiments, the computer system detects (1508) movement of the one or more cameras that moves the field of view to include a second respective portion of the physical environment. In some embodiments, the second respective portion is different from the first respective portion of the physical environment. In some embodiments, the second respective portion partially overlaps with the first respective portion of the physical environment (e.g., as shown in FIGS. 7H-7I).

In some embodiments, in response to detecting (1510) the movement of the one or more cameras, the computer system: updates the representation of the field of view of the one or more cameras to include a representation of the first view (e.g., a first-person perspective view) of the second respective portion of the physical environment; captures depth information indicative of a second subset of the second respective portion of the physical environment (e.g., the second subset includes some or all of the second respective portion of the physical environment); and updates the first indication, displayed over the updated representation of the field of view, to indicate an extent of the second respective portion of the physical environment for which depth information has been captured (e.g., the first indication is updated to indicate that depth information for the second subset has been captured), including displaying the first indication overlaid on the second portion of the representation of the field of view, the second portion of the representation of the field of view including a representation of the second subset (e.g., the second portion of the representation of the field of view corresponds to portion(s) of the physical environment, including the second subset, for which depth information has been captured) (e.g., as shown in FIGS. 7H-7I). In some embodiments, where the first portion of the representation of the field of view remains displayed (e.g., in full or in part) after the movement of the one or more cameras, the first indication is displayed over both the first and second portions of the representation of the field of view (e.g., as shown in FIGS. 7H-7I). In some embodiments, updating the first indication includes, as depth information is captured for additional portions of the physical environment, displaying an animation that progressively expands the first indication to cover representations of the additional portions of the physical environment in the representation of the field of view (e.g., as shown in FIGS. 7H-7I, 7M, 7Q, 7S, and 7X).

In some embodiments, the computer system displays (1512), in the representation of the field of view, one or more representations of one or more portions of the physical environment for which depth information has not been captured (e.g., as shown in FIGS. 7H-7AB). In some embodiments, depth information has not been captured for a respective portion of the physical environment when no depth information has been captured for the respective portion of the physical environment, or when captured depth information is insufficient (e.g., incomplete and/or lacking in fidelity) (e.g., as described in reference to 7H-7R, and 7X-7AA). In some embodiments, in accordance with a determination that the representation of the field of view includes one or more representation of one or more portions of the physical environment for which depth information has not been captured, the computer system displays the representations of the one or more portions without the first indication overlaid on the representations of the one or more portions. For example, as described above with reference to operations 1506 of method 1500, when displaying, over the representation of the field of view, the first indication that indicates the extent of the first respective portion of the physical environment for which depth information has been captured, the first indication is overlaid on at least a first portion of the representation of the field of view that corresponds to portion(s) of the physical environment for which depth information has been captured, and not overlaid on at least a second portion of the representation of the field of view that corresponds to portion(s) of the physical environment for which depth information has not been captured. Similarly, in some circumstances, after updating the first indication to indicate the extent of the second respective portion of the physical environment for which depth information has been captured, the first indication is overlaid on at least a first portion of the updated representation of the field of view that corresponds to portion(s) of the physical environment for which depth information has been captured, and not overlaid on at least a second portion of the updated representation of the field of view that corresponds to portion(s) of the physical environment for which depth information has not been captured (e.g., at least the second portion of the updated representation of the field of view is displayed without the first indication overlaid) (e.g., as shown in Figures reference to 7H-7R, and 7X-7AB).

Displaying representations of portions of the physical environment that have not yet been scanned allows the user to preview those portions of the physical environment parts and decide upfront whether to scan those portions, which would not be possible if representations of portions of the physical environment were withheld until after those portions had already been scanned. This provides visual feedback that helps orient the user in the physical environment and gives the user greater control over scanning through the ability to decide whether to continue scanning. Providing improved visual feedback to the user and providing additional control options without cluttering the user interface with additional displayed controls enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system smooths (1514) one or more edges of the first indication. For example, even if the portion of the physical environment for which depth information has been captured has an irregular (e.g., jagged or rough) edge, the first indication is displayed with a smoothed edge (e.g., as described in reference to 7A-7AB).

Smoothing the edges of the first indication provides the user with feedback as to which portions of the physical environment have been scanned without making the feedback overly detailed and thus distracting, to inform the user as to which direction(s) the user should move or turn to progress the depth information capture process. Providing improved visual feedback to the user without cluttering the user interface (e.g., with jagged or rough edges of the first indication) enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first indication is a continuous region (1516) (e.g., and is overlaid on a continuous region of the representation of the field of view and user interface) (e.g., as shown in FIG. 7H). For example, where depth information is captured for at least the outermost (e.g., edge) regions of a portion of the physical environment, even if depth information is missing for one or more regions in the middle of the captured portion, the first indication is overlaid on the representation of the entire portion of the physical environment (e.g., the first indication is continuous and extends to cover the edge regions).

Presenting the first indication as a continuous region provides the user with feedback as to which portions of the physical environment have been scanned without making the feedback overly detailed and thus distracting, to inform the user as to which direction(s) the user should move or turn to progress the depth information capture process. Where depth information for one or more portions of the physical environment is insufficient, instead of displaying corresponding holes or gaps in the first indication, an alert may instead be provided (e.g., as described herein with reference to operation 1538) to prompt the user to redirect the one or more cameras towards the portions of the physical environment for which depth information has not been fully captured. Providing improved visual feedback to the user without cluttering the user interface (e.g., with discontinuities in or jagged or rough edges of the first indication) enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, before detecting the movement of the one or more cameras (and optionally before capturing the depth information indicative of the first subset of the first respective portion of the physical environment and/or displaying the representation of the field of view of the one or more cameras), the computer system displays (1518) an instruction prompting a user to move the one or more cameras around the physical environment. In some embodiments, the instruction includes an animation of a representation of the user moving around a representation of a physical environment. In some embodiments, the instruction includes text instructing the user to move around his/her surrounding physical environment (e.g., as shown in FIG. 7R).

Displaying an instruction prompting the user to move the one or more cameras around the physical environment to capture depth information about the physical environment (e.g., optionally upon transitioning to an orthographic modeling mode) provides visual feedback to the user prompting the user to perform an action needed to progress the depth information capture process. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system displays (1520) a first user interface element (e.g., a capture, or scanning, initiation user interface element) that, when activated, initiates capturing depth information indicative of a physical environment in which the one or more cameras are located (e.g., indicative of one or more portions of the physical environment that are in the field of view of the one or more cameras) (e.g., as described in reference to FIG. 7G). In some embodiments, the first user interface element is displayed while displaying the instruction prompting the user to move the one or more cameras around the physical environment. In some embodiments, the computer system receives an input activating the first user interface element; and after (e.g., in response to) receiving the input activating the first user interface element, the computer system captures depth information indicative of the physical environment, wherein the capturing of depth information includes the capturing of the depth information indicative of the first subset and the capturing of the depth information indicative of the second subset in accordance with the movement of the one or more cameras.

Displaying a first user interface element that, when activated, initiates capturing of depth information about the surrounding physical environment provides the user with immediate control over when the depth information capture process without requiring the user to navigate through complex menu hierarchies. Providing additional control options that reduce the number of inputs needed to perform an operation enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system displays (1522) a second user interface element (e.g., a capture, or scanning, termination user interface element, such as scanning stop button 704-2 in FIG. 7AB) that, when activated, initiates (e.g., generating and) displaying an orthographic view of portions of a physical environment for which depth information has been captured. In some embodiments, the second user interface element is displayed while capturing depth information indicative of the physical environment (e.g., after display and activation of the first user interface element). In some embodiments, the computer system receives an input activating the second user interface element; and after (e.g., in response to) receiving the input activating the second user interface element, the computer system displays an orthographic view of (e.g., at least a portion of) the physical environment. In some embodiments, the computer system, in response to the input activating the second user interface element, generates the orthographic view of the physical environment, for example based on the captured depth information indicative of the physical environment, prior to displaying the orthographic view. In some embodiments, activating the second user interface element ends the capturing of depth information (e.g., until a subsequent activation of the capture initiation user interface element or a transition to a different mode of the respective application).

Displaying a second user interface element that, when activated, results in display of an orthographic view of the surrounding physical environment based on captured depth information, and optionally results in termination of the depth information capture session, provides the user with immediate control over the point in the depth information capture process at which an orthographic view based on the captured depth information is displayed, without requiring the user to navigate through complex menu hierarchies. Providing additional control options that reduce the number of inputs needed to perform an operation enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system displaying (1524) the first indication includes visually emphasizing a portion of the first indication that is overlaid on a representation of a physical feature of a set of predefined feature types (e.g., the set of predefined feature types includes edges of physical objects) detected in the representation of the field of view (e.g., representations of one or more particular types of features, such as object edges, within the region over which the first indication is displayed are visually emphasized relative to representations of other types of features, such as object surfaces). In some embodiments, the visual emphasis is displayed for a predetermined period of time (e.g., with brief highlighting or flashing that fades out over time after the feature has been identified) (e.g., as described in reference to FIGS. 7H-7I and 7N).

Visually emphasizing a portion of the first indication that is overlaid on a representation of a particular type of physical feature provides the user with feedback that depth information about a physical feature, which may be of particular interest to the user, has been captured, and in some cases also helps the user navigate around the physical environment during scanning without bumping into objects in the physical environment. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, visually emphasizing the portion of the first indication that is overlaid on the representation of the physical feature includes (1526) highlighting the portion of the first indication for a predetermined period of time (e.g., a time period of 0.5 to 2.0 seconds, or 0.5 to 5.0 seconds).

Due to the nature of edge detection in a physical environment being based on discontinuities in a captured representation of the physical environment, and the resulting potential for discontinuities in the captured depth information corresponding to a physical edge, displaying the first indication as an overlay based on the captured depth information could result in imperfections and discontinuities in the first indication. Highlighting (e.g., and optionally smoothing) the portions of the first indication overlaid on the representation of the edge for a predetermined (e.g., initial, brief) period of time provides the user with feedback that depth information about a physical feature, which may be of particular interest to the user, has been captured without making the feedback overly detailed and thus distracting. Providing improved visual feedback to the user without cluttering the user interface (e.g., with discontinuities in the first indication) enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system progressively ceases (1528) to visually emphasize the portion of the first indication over time (e.g., as described in reference to FIGS. 7H-7I). In some embodiments, the visual emphasis is displayed for the predetermined period of time and subsequently removed (e.g., gradually faded) such that the portion of the first indication that is overlaid on the representation of the physical feature is no longer visually emphasized relative to other portions of the first indication.

Progressively decreasing the visual emphasis of visually emphasized portions of the first indication over time avoids continuing to visually emphasize representations of physical features that may no longer be of interest to the user and accumulation of visual emphasis in the user interface. Performing an operation when a set of conditions has been met without requiring further user input, and reducing clutter in the user interface enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the user interface is a user interface of a respective application (1530) (e.g., executing on the computer system); and displaying the first indication (e.g. operation 1506), detecting the movement of the one or more cameras (e.g., operation 1508), and, in response to detecting the movement of the one or more cameras, updating the representation of the field of view, capturing the depth information indicative of the second subset, and updating the first indication (e.g., operation 1510) are performed while the respective application is operating in a first mode (e.g., an orthographic modeling mode) of a plurality of modes of the respective application. In some embodiments, in the orthographic modeling mode, the system captures information indicative of a physical environment (e.g., depth information) and optionally generates, from the captured information, an orthographic view of the physical environment. In some embodiments, the generated orthographic view is a top orthographic view (e.g., a floorplan), and the orthographic modeling mode is a floorplan mode. In some embodiments, displaying the representation of the field of view and capturing the depth information indicative of the first subset (e.g., operations 1504) are also performed while the respective application is operating in the first mode. In some embodiments, the plurality of modes of the respective application include, in addition to the orthographic modeling mode, a one-dimensional annotation (e.g., measurement) mode, a two-dimensional annotation mode, a three-dimensional annotation mode, and/or an automatic annotation mode (e.g., as described above in reference to FIGS. 5C and 7A).

Providing a mode of operation for capturing depth information indicative of a physical environment as part of a respective application, particularly in embodiments where the respective application is transitioned to the depth information capture mode through activation of a displayed user interface element corresponding to the mode, provides the user with quick and easy access to depth information capturing capabilities of the system without requiring the user to navigate through complex menu hierarchies. Providing additional control options and reducing the number of inputs needed to perform an operation enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system displays (1532), in a second region of the user interface, a representation of a second view (e.g., a top orthographic view, also called a top-down view or a floorplan view) of (e.g., at least a portion of) the physical environment, wherein: in accordance with capturing the depth information indicative of the first subset of the first respective portion of the physical environment, the representation of the second view indicates the extent of the physical environment for which depth information has been captured, including indicating that depth information indicative of the first subset has been captured (e.g., by displaying a representation of the first subset in the representation of the second view); and in response to detecting the movement of the one or more cameras: the computer system updates the representation of the second view (e.g., the top orthographic view) of (e.g., at least a portion of) the physical environment to indicate the extent of the physical environment for which depth information has been captured, including indicating that depth information indicative of the first subset and the second subset have been captured (e.g., by updating the representation of the second view to include a representation of the second subset in addition to the representation of the first subset) (e.g., as shown in FIGS. 7H-7I).

In some embodiments, the second region of the user interface at least partially overlaps with the first region of the user interface (e.g., the representation of the second view is displayed over at least a portion of the first region of the user interface). In some embodiments, the system displays, in the second region of the user interface, an indication (e.g., representation) of a current location of the one or more cameras (which in some embodiments is the current location of the system), where the indication of the current location is optionally updated as the one or more cameras move. In some embodiments, the system displays, in the second region of the user interface, an indication (e.g., representation) of a current field of view of the one or more cameras, where the indication of the current field of view is optionally updated as the one or more cameras move.

Displaying a representation of a second view of the physical environment that is updated to reflect the extent of the physical environment for which depth information has been captured as the one or more cameras are moved around the physical environment provides the user with feedback about the extent of scanning that supplements the feedback provided to the user by the first view and the first indication. For example, where the first view includes a first person perspective view (e.g., a live view of the field of view of the one or more cameras), and the second view includes a top orthographic view of the physical environment that is mapped out as the one or more cameras are moved, the second view provides information about portions of the physical environment that are outside of the field of view of the one or more cameras, which may not be conveyed by the first view. In some embodiments where the second view indicates the position and field of view of the one or more cameras in the physical environment, the second view also informs the user as to which direction(s) the user should move or turn to progress the depth information capture process. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the movement of the one or more cameras includes (1534) rotation of the one or more cameras about a respective axis (e.g., a yaw axis) by a respective amount (e.g., a respective number of (angular) degrees of rotation). In response to detecting the movement of the one or more cameras, the computer system rotates (e.g., in the second region of the user interface) the representation of the second view of the physical environment by the respective amount (e.g., as shown in FIG. 7I).

Rotating the representation of the second view of the physical environment to follow rotation of the one or more cameras about a respective axis (e.g., a yaw axis) of the one or more cameras provides the second view as a navigation view that is oriented to the user's frame of reference, in that a particular direction in the second view (e.g., a positive y-direction, or "upward" in the user interface) is continually correlated with a particular direction in the first view (e.g., a direction in which the one or more cameras are facing, corresponding to a "forward" direction along a z-axis "into" the user interface), which provides visual feedback that helps the user navigate in the physical environment. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the movement of the one or more cameras includes (1536) rotation of the one or more cameras about a yaw axis by a respective amount (e.g., a respective number of (angular) degrees of rotation), and in response to detecting the movement of the one or more cameras, the computer system maintains (e.g., keeps constant) an orientation of the second view of the physical environment in the user interface (e.g., by displaying the representation of the second view of the physical environment without rotating the representation of the second view of the physical environment by the first degree) (e.g., as shown in FIG. 7J).

Maintaining the orientation of the representation of the second view of the physical environment (e.g., without rotation) provides the second view as a fixed-orientation map view, and in some embodiments where the representation of the second view includes an indication of the current field of view of the one or more cameras, rotating the indication of the field of view (e.g., instead of the representation of the second view) provides visual feedback to the user indicating the user's orientation relative to a fixed reference direction (e.g., a cardinal direction, such as north) in the physical environment. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments (e.g., in response to detecting movement of the one or more cameras), the computer system displays (1538) one or more alerts with information about the position or movement of the one or more cameras. In some embodiments, the one or more alerts include one or more of the alerts described herein (e.g., as described in reference to FIGS. 7L, 7N, 7P, 7R, 7T-7U, 7W, and 7Z).

In some embodiments, the one or more alerts include an alert indicating that a distance from the one or more cameras to an object in the field of view of the one or more cameras (e.g., an object at a predefined location, such as the center, of the field of view of the one or more cameras) is outside of a threshold distance (e.g., the one or more cameras are too close to or too far from objects in the field of view) (e.g., as described in reference to FIG. 7W). In some embodiments, in accordance with a determination that an error condition, based on the one or more cameras being too close to objects in the field of view, has occurred, an alert is displayed to indicate that the one or more cameras are too close to objects in the field of view (e.g., to prompt the user to move the one or more cameras further away from the objects) (e.g., as described in reference to FIG. 7W). In some embodiments, in accordance with a determination that an error condition, based on the one or more cameras being too far from objects in the field of view, has occurred, an alert is displayed to indicate that the one or more cameras are too far from objects in the field of view (e.g., to prompt the user to move the one or more cameras closer toward the objects).

In some embodiments, the one or more alerts include an alert indicating that a speed of movement of the one or more cameras is outside of a threshold speed (e.g., the movement of the one or more cameras is too fast for accurate depth information about the physical environment to be captured) (e.g., as described in reference to FIG. 7P). In some embodiments, in accordance with a determination that an error condition, based on the one or more cameras moving faster than a threshold speed, has occurred, an alert is displayed to indicate that the one or more cameras are moving too quickly (e.g., to prompt the user to slow down the movement of the one or more cameras) (e.g., as shown in FIG. 7P).

In some embodiments, the one or more alerts include an alert indicating that the one or more cameras need to remain within a predetermined portion of (e.g., a subset of) the physical environment (e.g., the one or more cameras must not be moved to a different level of the physical environment, such as to a floor upstairs or downstairs from the current location of the one or more cameras, and/or the one or more cameras must not be moved outside if the physical environment is an interior space) (e.g., as described in reference to 7T and 7Z). In some embodiments, the alert indicating that the one or more cameras need to remain within the physical environment is displayed in accordance with a determination that the one or more cameras are approaching a boundary of the physical environment, such as a stairwell or doorway (e.g., to warn the user that the one or more cameras should not be moved beyond the boundary) (e.g., as described in reference to FIG. 7Z).

In some embodiments, the one or more alerts include an alert indicating that the field of view of the one or more cameras needs to be directed away from one or more reflective surfaces (e.g., one or more mirrors) in the physical environment. In some embodiments, the alert indicating that the one or more cameras need to be directed away from mirrors is displayed in accordance with a determination that the field of view of the one or more cameras includes a mirror (e.g., as described in reference to FIG. 7N).

In some embodiments, the one or more alerts include an alert indicating that objects in the field of view of the one or more cameras need to be kept substantially stationary (e.g., with less than a threshold amount of movement relative to fixed elements of the physical environment such as walls and the floor of the physical environment) (e.g., as described in reference to FIGS. 7K-7L). In some embodiments, the alert indicating that objects in the field of view of the one or more cameras need to be kept stationary is displayed in accordance with a determination that one or more objects in the field of view of the one or more cameras have moved (e.g., as described in reference to FIGS. 7K-7L).

In some embodiments, the one or more alerts include an alert indicating that the one or more cameras need to be moved (e.g., returned) to a prior position of the one or more cameras (e.g., during the current depth information capture session) at which at least some depth information for a respective portion of the physical environment that was in the field of view of the one or more cameras at the prior position was not captured (e.g., in accordance with a determination that depth information for the respective portion was not fully or adequately captured) (e.g., as described in reference to FIG. 7R).

In some embodiments, the one or more alerts include an alert indicating that the one or more cameras need to be moved (e.g., returned) to an initial position at which the one or more cameras were located when capturing depth information indicative of the physical environment was initiated (e.g., for the current depth information capture session). In some embodiments, where the system includes multiple cameras, a "position" of the one or more cameras refers to a set of positions (e.g., a particular camera configuration) that includes the respective position of each of the multiple cameras. In some embodiments, the initial position is the position at which the one or more cameras were located at the time of the most recent initiation of depth information capture, for example in response to a most recent prior activation of the first user interface element (e.g., the scanning initiation user interface element).

Providing one or more alerts with information about the position or movement of the one or more cameras guides the user during the depth information capture process to improve the accuracy of the captured depth information. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (1540) a user input indicating a boundary between a first space within the physical environment (e.g., a first room) and a second space within the physical environment that is different from and adjacent to the first space (e.g., a second, adjoining room) (e.g., as described in reference to 7T-7U). In some embodiments, an orthographic view of the physical environment, displayed after receiving the user input indicating the boundary between the first space and the second space (e.g., in response to activation of the second user interface element), includes an indication of the boundary between the first space and the second space (e.g., as described in reference to FIGS. 7S-7U).

In some embodiments, the generated orthographic view is a representation of the physical environment that extends to the boundaries of the first space without including a representation of the second space (e.g., or of any other space in the physical environment) (e.g., as described in reference to 7U-7V). In some embodiments, after receiving the user input indicating the boundary between the first space and the second space, the one or more cameras are moved around the second space, and the system captures depth information indicative of at least a portion of the physical environment that is part of the second space. In some embodiments, the generated orthographic view (e.g., displayed after activation of the second user interface element after scanning at least a portion of the second space) includes a representation of at least a portion of the second space that is adjacent to the first space and optionally indicates the boundary between the first space and the second space. More generally, in some embodiments, the generated orthographic view delineates boundaries between adjacent physical spaces in a physical environment (e.g., the physical environment is the interior of a building, and the generated orthographic view is a floorplan that delineates boundaries and/or entryways between adjoining rooms or spaces in the building that have been scanned).

Accepting user input that indicates boundaries between different spaces within the physical environment for which depth information is being captured provides the user with control over the extent of the physical environment for which depth information is captured and enables the user to specify where boundaries should be indicated in a model of the physical environment that is subsequently generated based on the captured depth information, as well as helping the system accurately determine the relative location of different features in the physical environment. Providing additional control options and improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

It should be understood that the particular order in which the operations in FIGS. 15A-15D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100, 1200, 1300, 1400, and 1600) are also applicable in an analogous manner to method 1500 described above with respect to FIGS. 15A-15D. For example, the user interfaces, user interface elements, physical environments and features and objects therein, views of the physical environment, annotation application modes, and alerts described above with reference to method 1500 optionally have one or more of the characteristics of the user interfaces, user interface elements, physical environments and features and objects therein, views of the physical environment, annotation application modes, and alerts described herein with reference to other methods described herein (e.g., methods 800, 900, 1000, 1100, 1200, 1300, 1400, and 1600). For brevity, these details are not repeated here.

FIGS. 16A-16E are flow diagrams illustrating method 1600 of viewing and interacting with a schematic representation of an environment in accordance with some embodiments. Method 1600 is performed at a computer system (e.g., portable multifunction device 100 (FIG. 1A), device 300 (FIG. 3A), or computer system 301 (FIG. 3B)) with a display device (e.g., a display, optionally touch-sensitive, a projector, a head-mounted display, a heads-up display, or the like, such as touch screen 112 (FIG. 1A), display 340 (FIG. 3A), or display generation component(s) 304 (FIG. 3B)), optionally one or more cameras (e.g., optical sensor(s) 164 (FIG. 1A) or camera(s) 305 (FIG. 3B)), and optionally one or more depth sensing devices, such as depth sensors (e.g., one or more depth sensors such as time-of-flight sensor 220 (FIG. 2B)). Some operations in method 1600 are, optionally, combined and/or the order of some operations is, optionally, changed.

As described herein, method 1600 shifts a representation of a metric in a schematic representation of an environment if the representation of a feature corresponding to the metric remains at least partially displayed in the schematic representation as the portion of the schematic representation that is displayed changes (e.g., as the schematic representation is zoomed or shifted). In doing so, the method continually provides the user with information (e.g., representations of corresponding metrics) describing features that are at least partially in view in any respective displayed portion of the schematic representation, without requiring the user to manually reposition or redisplay representations of metrics that have been shifted at least partially out of view. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system displays (1602) a first portion of a schematic representation of an environment, wherein the first portion of the schematic representation includes: a first representation of a first feature in the environment (e.g., the floor of a room); and a representation of a first metric corresponding to the first feature (e.g., dimensions of the floor area) and displayed at a first location in the first portion of the schematic representation of the environment (e.g., a first location in a first portion of an orthographic view corresponding to a first physical location in a physical environment). Several examples are shown in FIG. 7AC.

The computer system receives (1604) a first input corresponding to a request to display a second portion of the schematic representation of the environment (e.g., a request to perform one or more transformations such as zooming in or out and/or scrolling (e.g., laterally shifting) the schematic representation) (e.g., as described in reference to FIGS. 7AD-7AF).

In response to receiving the first input: the computer system displays (1606) the second portion of the schematic representation of the environment (e.g., the second portion of the schematic representation corresponds to the result of performing the one or more transformations of the schematic representation on the first portion of the schematic representation); and in accordance with a determination that a portion of the first representation of the first feature is displayed in the second portion of the schematic representation of the environment and that the second portion of the schematic representation of the environment does not include the first location (e.g., the first physical location is not included in the second portion of the orthographic view of the physical environment), the computer system displays the representation of the first metric at a second location in the second portion of the schematic representation of the environment (e.g., as shown in FIGS. 7AK-7AM). In some embodiments, the schematic representation is an orthographic view of the environment (e.g., as shown in FIG. 7AK) that is different from a perspective view (e.g., a live or simulated first-person camera view, as shown in FIG. 7I). In some embodiments, in accordance with the determination that a portion of the first representation of the first feature is displayed in the second portion of the schematic representation and a determination that the second portion of the schematic representation includes the first location, the computer system displays the representation of the first metric at the first location in the second portion of the schematic representation.

In some embodiments, the schematic representation of the environment is an orthographic view of a physical environment (1608) (e.g., a top orthographic view, also called a top-down view or a floorplan view), and the orthographic view is generated based on a representation of a field of view of one or more cameras (e.g., a representation of the field of view that is updated as the one or more cameras move) and includes representations of one or more primary features of the physical environment (e.g., structural non-movable features such as walls, floors, ceilings, doors, windows, etc.). In some embodiments, the orthographic view of the physical environment is generated based on depth information indicative of the physical environment and captured for example using method 1500.

Displaying a schematic representation that is an orthographic view of a physical environment based on a representation of a field of view of one or more cameras of the system enables modeling of a physical environment in which the one or more cameras of the system are located based on information obtained by the system about the physical environment without requiring a user to manually input information about (e.g., parameters of and dimensions of) the physical environment. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first portion of the schematic representation further includes (1610) (e.g., displayed concurrently with the first representation of the first feature and the representation of the first metric): a second representation of a second feature in the environment (e.g., different from the first representation of the first feature); and a representation of a second metric (e.g., different from the first metric) corresponding to the second feature and displayed at a third location (e.g., different from the first location) in the first portion of the schematic representation of the environment. In some embodiments, the first portion of the schematic representation includes any number of respective representations of features in the environment, and corresponding representations of metrics. In some embodiments, the first portion of the schematic representation is displayed in response to an input corresponding a request to display the schematic representation (e.g., as described herein with reference to operation 1522 of method 1500), and multiple representations of features, with corresponding representations of metrics, are concurrently displayed in the first portion of the schematic representation without requiring additional input other than the input corresponding to the request to display the schematic representation (e.g., as described in reference to FIGS. 7AB-7AC).

Displaying representations of multiple metrics concurrently provides the user with information about multiple features in the environment without requiring the user to request display of the information for each feature separately or in turn. Reducing the number of inputs needed to perform operations enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, in response to receiving the first input: in accordance with a determination that a portion of the second representation of the second feature is displayed in the second portion of the schematic representation of the environment and that the second portion of the schematic representation of the environment includes the third location, the computer system displays (1612) the representation of the second metric at the third location in the second portion of the schematic representation of the environment (e.g., as described in reference to FIGS. 7AK-7AM). In some embodiments, shifting display of the schematic representation of the environment from the first portion to the second portion causes the representation of one metric (e.g., the first metric) to be moved at least partially out of view (e.g., while at least a portion of the corresponding first representation of the first feature is at least partially in view in the second portion of the schematic representation) but does not cause the representation of one or more other metrics (e.g., the second metric) to be moved at least partially out of view (e.g., the representation of the second metric, and the corresponding second representation of the second feature, are fully in view in the second portion of the schematic representation); accordingly, the representation of the metric that has been moved at least partially out of view (e.g., the first metric) is moved (e.g., from the first to the second location) so as to remain in view, while the representation of the other metric(s) (e.g., the second metric) remain at the same location(s) (e.g., the third location), which is/are still in view (e.g., fully in view) (e.g., as shown in FIGS. 7AK-7AN).

Moving a representation of a first metric, corresponding to a first representation of a first feature that remains at least partially in view in a displayed portion of the schematic representation, so that the representation of the metric remains fully in view provides the user with information about the first feature without requiring the user to manually reposition or redisplay the representation of the first metric, which otherwise would have been moved at least partially out of view. In addition, maintaining the location, relative to the schematic representation, of a representation of a second metric whose corresponding feature remains represented in the schematic representation and who has not been moved at least partially out of view provides visual feedback to the user of the change to which portion of the schematic representation is displayed without excessive movement of metrics. Performing an operation (e.g., automatically) when a set of conditions has been met without requiring further user input, and providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, in response to receiving the first input: in accordance with a determination that a portion of the second representation of the second feature is displayed in the second portion of the schematic representation of the environment and that the second portion of the schematic representation of the environment does not include the third location, the computer system displays (1614) the representation of the second metric at a fourth location in the second portion of the schematic representation of the environment. In some embodiments, shifting display of the schematic representation of the environment from the first portion to the second portion causes representations of multiple metrics (e.g., the first metric and the second metric), corresponding to representations of features (e.g., the first feature and the second feature) that are (e.g., that remain) at least partially in view in the second portion of the schematic representation, to be moved at least partially out of view; accordingly, the representations of the metrics (e.g., the first and second metrics) are moved (e.g., from the first to the second and from the third to the fourth locations, respectively) so as to be (e.g., to remain) in view (e.g., in accordance with the corresponding representations of features being at least partially in view in the second portion of the schematic representation).

Moving representations of multiple metrics, corresponding to representations of features that remain at least partially in view in a displayed portion of the schematic representation, so that the representations of the metrics remain fully in view provides the user with information about the features without requiring the user to manually reposition or redisplay each representation of a metric that otherwise would have been moved at least partially out of view. Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments or in some circumstances, the first portion of the schematic representation further includes (1616): a third representation of a third feature in the environment (e.g., different from the first representation of the first feature and the second representation of the second feature); and a representation of a third metric (e.g., different from the first metric and the second metric) corresponding to the third feature and displayed at a fifth location (e.g., different from the first location and the third location) in the first portion of the schematic representation of the environment. In accordance with a determination that a portion of the third representation of the third feature is displayed in the second portion of the schematic representation of the environment and that the second portion of the schematic representation of the environment includes the fifth location, the computer system displays the representation of the third metric at the fifth location in the second portion of the schematic representation of the environment.

In some embodiments or in some circumstances, shifting display of the schematic representation of the environment from the first portion to the second portion causes the representations of some metrics (e.g., the first and second metrics), corresponding to features (e.g., the first and second features) that are at least partially in view in the second portion of the schematic representation, to be moved at least partially out of view, but does not cause the representations of one or more other metrics (e.g., the third metric), corresponding to one or more other features (e.g., the third feature) that are at least partially in view in the second portion of the schematic representation, to be moved at least partially out of view (e.g., the representation of the third metric at the third location remains fully in view in the second portion of the schematic representation); accordingly, the representations of the metrics that have been moved at least partially out of view (e.g., the first and second metrics) are moved so as to be (e.g., fully) in view, while the representations of the metrics that have not been moved at least partially out of view (e.g., the third metric) remain at the same location(s), which is/are still in view (e.g., FIGS. 7AK-7AM show a couch length metric that is moved in response to shifting display of the schematic representation of the environment, while a coffee table length metric remains at the same location, relative to the environment, as it had before the shifting of schematic representation of the environment).

Moving representations of multiple metrics, corresponding to representations of features that remain at least partially in view in a displayed portion of the schematic representation, so that the representations of the metrics remain fully in view provides the user with information about the features without requiring the user to manually reposition or redisplay each representation of a metric that otherwise would have been moved at least partially out of view. In addition, maintaining the respective locations, relative to the schematic representation, of representations of one or more other metrics whose corresponding features remain represented in the schematic representation and who have not been moved at least partially out of view provides visual feedback to the user of the change to which portion of the schematic representation is displayed without excessive movement of metrics. Performing an operation (e.g., automatically) when a set of conditions has been met without requiring further user input, and providing improved visual feedback to the user, enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first portion of the schematic representation is displayed (1618) at a first scale (e.g., a zoom scale or drawing scale, as described in further detail herein); the representation of the first metric, displayed at the first location in the first portion of the schematic representation, includes text displayed at a first text size; the first input includes a zoom input (e.g., a pinch or de-pinch gesture received via an input device, such as a touch-sensitive surface, of the system) that corresponds to a request to change a scale of the schematic representation; and in response to receiving the first input: the second portion of the schematic representation is displayed at a second scale that is different from the first scale; and the representation of the first metric, displayed at the second location in the second portion of the schematic representation, includes the text displayed at the first text size. In some embodiments, in response to receiving a zoom input (e.g., a pinch or de-pinch gesture received via an input device, such as a touch-sensitive surface, of the system) that corresponds to a request to change a scale of the schematic representation, the system changes the scale of the schematic representation without changing a scale of text displayed in the schematic representation (e.g., changing the scale of elements in the schematic representation other than text, and maintaining the scale of text in the schematic representation, such as text labels that are part of representations of metrics, as the schematic representation is zoomed) (e.g., as shown in FIGS. 7AD-7AF).

Keeping text at a fixed size while zooming the schematic representation of the environment improves the readability of the text while optimizing the amount of information displayed in the user interface. For example, proportionally increasing text size as the schematic representation is zoomed in might result in text being zoomed partially out of view (e.g., the text becomes too large to fit in the user interface) and/or that would occupy significant portions of the schematic representation and obscure or prevent display of other elements in the schematic representation (e.g., representations of features in the environment). In another example, proportionally decreasing text size as the schematic representation is zoomed out might result in text that is too small to read or difficult to discern among other elements in the schematic representation that have been brought into view by zooming the schematic representation out. Providing improved visual feedback to the user, by keeping text readable and avoiding cluttering the user interface, enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments or in some circumstances, the first portion of the schematic representation is displayed (1620) at a first scale and includes one or more lines (e.g., drawing lines, different from text) displayed at a first line thickness corresponding to the first scale; the first input includes a zoom input (e.g., a pinch or de-pinch gesture received via an input device, such as a touch-sensitive surface, of the system) that corresponds to a request to change a scale of the schematic representation; and in response to receiving the first input: the second portion of the schematic representation is displayed at a second scale that is different from the first scale. In accordance with a determination that a second line thickness corresponding to the second scale exceeds a threshold line thickness (e.g., is greater than a maximum line thickness or is less than a minimum line thickness), one or more lines in the second portion of the schematic representation are displayed at (e.g., at most) the threshold line thickness (e.g., no lines in the second portion of the schematic representation are displayed at greater than the threshold line thickness); and in accordance with a determination that the second line thickness does not exceed the threshold line thickness, the one or more lines in the second portion of the schematic representation are displayed at the second line thickness.

In some embodiments, in response to receiving a zoom input (e.g., a pinch or de-pinch gesture received via an input device, such as a touch-sensitive surface, of the system) that corresponds to a request to change a scale of the schematic representation, the system changes the scale of the schematic representation, including changing the line thickness of lines in the schematic representation in accordance with (e.g., proportionally to) the change in scale of the schematic representation. In some embodiments, the change in line thickness is limited to a threshold line thickness (e.g., when zooming out, if decreasing the line thickness would result in a line thickness that is below a minimum line thickness, the line thickness is decreased only to a threshold minimum line thickness; in another example, when zooming in, if increasing the line thickness would result in a line thickness that is above a maximum line thickness, the line thickness is increased only to the threshold maximum line thickness).

Rescaling line thickness while zooming the schematic representation of the environment provides an intuitive zooming experience in general, and limiting line thickness to a threshold thickness (e.g., a predefined range between a threshold maximum line thickness and a threshold minimum line thickness) improves the readability of the schematic representation while optimizing the amount of information displayed in the user interface. For example, proportionally increasing line thickness without limit as the schematic representation is zoomed in might result in unnecessarily thick lines that occupy significant portions of the schematic representation and obscure or prevent display of other elements in the schematic representation (e.g., other representations of features in the environment and/or text describing the features). In another example, proportionally decreasing line thickness as the schematic representation is zoomed out might result in lines that are too thin to see clearly or difficult to discern among other elements in the schematic representation that have been brought into view by zooming the schematic representation out. Providing improved visual feedback to the user, by improving the readability of the schematic representation and avoiding cluttering the user interface, enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first portion of the schematic representation is displayed (1622) at a first drawing scale of a predefined set of drawing scales. In some embodiments, a respective drawing scale specifies a respective distance (e.g., how many feet in length) in the environment that is represented by a unit length (e.g., one inch) in the schematic representation. Alternatively, in some embodiments, a respective drawing scale specifies a respective length (e.g., a respective fraction of an inch) in the schematic representation that represents a unit distance (e.g., one foot in length) in the environment. In some embodiments, while displaying a respective portion of the schematic representation at a respective drawing scale, an indication of the respective drawing scale is displayed. In some embodiments, the displayed indication of the respective drawing scale is updated as the zoom scale of the schematic representation is changed.

In some embodiments, the first input includes a zoom input that corresponds to a request to change a scale of the schematic representation; and in response to receiving the first input: in accordance with a determination that the zoom input corresponds to a request to change the scale of the schematic representation to a respective scale that is within a threshold of a second drawing scale in the predefined set of drawing scales (e.g., within a range of scales that includes (e.g., is centered about) the second drawing scale from the predefined set of drawing scales and that does not include any other scale from the predefined set of drawing scale) (e.g., without regard to whether the respective scale equals the second drawing scale), the computer system displays the second portion of the schematic representation at the second drawing scale (e.g., snapping the scale of the schematic representation to the second drawing scale).

In some embodiments or in some circumstances (e.g., based on the amount of movement in the zoom input), the second drawing scale is the first drawing scale. In some embodiments, the second drawing scale is different from the first drawing scale. In some embodiments, if the requested respective scale of the schematic representation is outside of a threshold of a respective drawing scale in the predefined set of drawing scales, the system displays the schematic representation at the respective drawing scale (e.g., there exists a range of scales between consecutive drawing scales in the predefined set within which the scale of the schematic representation is not snapped to a drawing scale from the predefined set). In some embodiments, the predefined set of drawing scales include drawing scales that correspond to integer ratios (e.g., simple fractions) between a length in the schematic representation and the corresponding represented distance in the environment (e.g., one inch in the schematic representation representing an integer number of feet in the environment, one centimeter in the schematic representation representing an integer number of meters in the environment, or a simple fraction (e.g., one-half, one-quarter, one-sixth, etc.) of an inch representing one foot in the environment, etc.). In some embodiments, the predefined set of drawing scales include only drawing scales that correspond to integer ratios (e.g., simple fractions) between a length in the schematic representation and the corresponding represented distance in the environment.

Snapping the zoom scale of the schematic representation to predefined drawing scales (e.g., that correspond to integer ratios or simple fractions between a length in the schematic representation and the corresponding represented distance in the environment) provides visual feedback to the user indicating useful zoom scales for viewing the schematic representation of the environment and helps the user select one of the predefined drawing scales more quickly and easily. Providing improved visual feedback to the user and reducing the number and/or extent of inputs needed to perform an operation enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system displays (1624), in a respective portion of the schematic representation, a representation of a respective feature in the environment (e.g., that is a predefined type of feature, such as a door or fixture), wherein a visual property (e.g., orientation) of the representation of the respective feature has a first value (e.g., representation of a door is displayed as opening in a first direction, such opening outward with respect to an adjacent room) corresponding to a first value of a property of the respective feature (e.g., the orientation of the door in the environment) (e.g., as described in reference to FIGS. 7AN-7AO). In some embodiments, the computer system receives an input corresponding to selection of the representation of the respective feature (e.g., an input directed to the representation of the respective feature, such as a tap input at a location, on a touch-sensitive surface, that corresponds to the representation of the respective feature); and in response to receiving the input corresponding to selection of the representation of the respective feature, the computer system displays the representation of the respective feature with the visual property having a second value different from the first value (e.g., changing the orientation of the representation of a door to open in a second direction, such as opening inward with respect to the adjacent room), wherein the second value of the visual property of the representation of the respective feature corresponds to a second value of the property of the respective feature.

In some embodiments, representations of the respective features of the predefined type are visually emphasized, at least briefly, to indicate that they are editable (e.g., via inputs corresponding to selection thereof). In some embodiments, in response to a different type of input corresponding to the representation of the respective feature, the system displays a user interface for editing the representation of the respective feature instead of (e.g., automatically) modifying the representation of the respective feature by changing the value of the visual property. In some embodiments, in response to selection of a text region, rather than a representation of a respective feature that is a predefined type of feature, the system displays a user interface for editing the text in the text region rather than (e.g., automatically) changing a value of a visual property of the text region (e.g., as described in reference to FIGS. 7AH-7AJ).

Modifying a value of a visual property, such as changing an orientation, of a displayed representation of a feature to reflect a different value of a corresponding property, such as an orientation, of the feature in the environment in response to an input (e.g., from the user) selecting the representation of the feature provides the user with control over how features in the environment are represented in the schematic representation so that the schematic representation of the environment accurately portrays the features in the environment. Providing additional control options without cluttering the user interface with additional controls, and reducing the number of inputs needed to perform an operation enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the schematic representation includes (1626) a text label (e.g., a region of text, such as a title block) describing the schematic representation, and the method includes displaying the text label overlaid on a displayed portion of the schematic representation without regard to whether the displayed portion of the schematic representation includes a default location in the schematic representation for display of the text label. In some embodiments, when the entire schematic representation is displayed, the text label is displayed at the default location. In some embodiments, as the portion of the schematic representation that is displayed changes (e.g., in response to inputs corresponding to requests to zoom, translate, rotate, or otherwise transform the schematic representation), the text label is displayed in or overlaid on the respective displayed portion of the schematic representation, optionally at a predefined location relative to the display device or user interface in which the respective portion of the schematic representation is displayed, regardless of which portion of the schematic representation is displayed (e.g., as described in reference to 7AH-7AJ).

Continually displaying a text label that describes the overall schematic representation (e.g., a title block) regardless of which portion of the schematic representation is displayed and whether the displayed portion includes a default display location of the text label provides visual feedback informing the user as to which schematic representation (or portion thereof) is being displayed without requiring the user to provide additional input, which might otherwise require navigation through complex menu hierarchies, to obtain the information conveyed by the text label. Providing improved visual feedback to the user, by keeping the text label (e.g., title block) in view, without requiring further user input, thereby reducing the number of inputs needed to view the information conveyed by the text label, enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the schematic representation of the environment (e.g., any displayed portion of the schematic representation) is displayed in a first drawing style that is a mechanical drawing style (1628) (e.g., a formal, industrial drawing in which lines are cleanly and sharply drawn, and text is displayed using typographical font). In some embodiments, hand-drawn or handwritten elements (e.g., such as text), provided for the schematic representation through user input, are converted to elements in the mechanical drawing style using object and/or character recognition (e.g., handwritten text that follows the user's hand movement is converted to typographical font, which is displayed in the schematic representation in the mechanical drawing style instead of the handwritten text). In some embodiments, the computer system receives an input corresponding to a request to display the schematic representation in a second drawing style that is a hand-drawn style (e.g., an informal, rough sketch in which lines and text appear as if drawn by hand (e.g., exactly following a user's hand movement), optionally stylized as if drawn using a pencil). In some embodiments, the input corresponding to the request to display the schematic representation in the second drawing style includes activation of a user interface element that corresponds to the second drawing style, and that, when activated, results in the schematic representation being displayed in the second drawing style. In some embodiments, activation of the user interface element toggles the drawing style between the first drawing style and the second drawing style. In some embodiments, in response to receiving the input corresponding to the request to display the schematic representation in the second drawing style, the computer system displays the schematic representation (e.g., or a portion of the schematic representation) in the second drawing style.

Displaying the schematic representation in a hand-drawn style provides visual feedback that conveys to the user that the information in the hand-drawn version of the schematic representation is approximate rather than meeting predefined accuracy criteria (e.g., as might be suggested by a formal, mechanical drawing style). Providing improved feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, display of representations of a first set of (e.g., one or more) metrics that includes (1630) the first metric is enabled, and display of representations of a second set of (e.g., one or more) metrics is not enabled for display. In some embodiments, the computer system receives an input corresponding to a request to enable display of representations of the second set of metrics; and in response to receiving the input corresponding to the request to display representations of the second set of metrics, the computer system displays, for each metric in the second set of metrics, a representation of the respective metric (e.g., as described in reference to FIGS. 7AR-7AT). In some embodiments, the display of the representations of the first set of metrics is enabled by default, and cannot be disabled. In some embodiments, the display of the representations of the second set of metrics can be enabled or disabled through user input (e.g., as described in reference to FIGS. 7AR-7AT). In some embodiments, the input corresponding to the request to display representations of the second set of metrics includes activation of a user interface element that corresponds to the second set of metrics (e.g., activation of the user interface element toggles display of the representations of the second set of metrics on or off) (e.g., as described in reference to FIGS. 7AR-7AT).

Where additional metrics (e.g., additional dimensions of the environment), which are not necessarily represented to the user by default, are available to or can be determined by the system, displaying the additional metrics in response to an input (e.g., from the user) enabling display of the additional metrics presents the additional metrics to the user only when requested, and avoids cluttering the user interface with too much information otherwise. Providing improved visual feedback under the control of the user without unnecessarily cluttering the user interface enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, a respective displayed portion of the schematic representation includes (1632) a representation of a corner in the environment (e.g., where two or more walls in the environment meet at a non-zero angle). In some embodiments, in accordance with a determination that the corner forms a right angle (e.g., an angular measure of the corner is 90 degrees or 270 degrees), the computer system forgoes displaying an angular measure of the corner; and in accordance with a determination that the corner does not form a right angle (e.g., the corner forms an acute or obtuse angle or a reflex angle other than 90 degrees or 270 degrees), the computer system displays an angular measure of the corner. In some embodiments, a metric (e.g., angular measure) is displayed for each corner represented in the displayed portion of the schematic representation that is not a right angle. In some embodiments, the angular metrics are part of the second set of metrics, displayed when display of representations of the second set of metrics is enabled, and not part of the first set of metrics that are displayed by default (e.g., as described in reference to FIG. 7AT).

Where additional metrics (e.g., of a particular type, such as angles corresponding to corners in the environment) are available to or can be determined by the system, displaying representations of only a subset of the additional metrics (e.g., angular values only for angles that are not right angles) provides visual feedback that informs the user of the values of the subset of metrics while also implying that metrics without displayed representations have a conventional or standard value (e.g., 90 or 270 degrees for angles at which walls meet), thereby conveying additional information beyond what is displayed. Providing improved visual feedback to the user in a manner that reduces clutter in the user interface enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the environment includes (1634) one or more pieces of furniture (e.g., the schematic representation includes or is associated with data representing the one or more pieces of furniture in the environment). In some embodiments, the computer system receives an input corresponding to a request to toggle (e.g., on or off) display of representations of furniture in the environment; and in response to receiving the input corresponding to the request to toggle display of representations of furniture in the environment: in accordance with a determination that representations of the one or more pieces of furniture are displayed in the schematic representation, the computer system ceases to display, in the schematic representation, the representations of the one or more pieces of furniture (e.g., turning off display of representations of furniture); and in accordance with a determination that the representations of the one or more pieces of furniture are not displayed in the schematic representation, the computer system displays in the schematic representation, the representations of the one or more pieces of furniture (e.g., turning on display of representations of furniture) (e.g., as described in reference to 7AH-7AJ).

Where additional elements of the schematic representation (e.g., representations of particular types of features in the environment such as furniture, or more generally features that are members of a respective class of features in a plurality of predefined classes of features), which are not necessarily displayed by default, are available for display, displaying the additional elements in response to an input (e.g., from the user) enabling display of the additional elements presents the additional elements to the user only when requested, and avoids cluttering the user interface with too much information otherwise. Providing improved visual feedback under the control of the user without unnecessarily cluttering the user interface enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

It should be understood that the particular order in which the operations in FIGS. 16A-16E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, 1100, 1200, 1300, 1400, and 1500) are also applicable in an analogous manner to method 1600 described above with respect to FIGS. 16A-16E. For example, the user interfaces, environments (such as physical environments) and features and objects therein, and metrics (such as measurements) described above with reference to method 1600 optionally have one or more of the characteristics of the user interfaces, environments (such as physical environments) and features and objects therein, and metrics (such as measurements) described herein with reference to other methods described herein (e.g., methods 800, 900, 1000, 1100, 1200, 1300, 1400, and 1500). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:

at a computer system with a display device and one or more cameras:

displaying, in a first region of a user interface, a representation of a field of view of the one or more cameras, wherein the one or more cameras are in a three-dimensional physical environment, and the representation of the field of view includes a representation of a first view of a first respective portion of the physical environment that is in the field of view of the one or more cameras;

capturing depth information indicative of a first subset of the first respective portion of the physical environment;

displaying, over the representation of the field of view, a first indication that indicates an extent of the first respective portion of the physical environment for which depth information has been captured, including displaying the first indication overlaid on at least a first portion of the representation of the field of view that includes a representation of the first subset, and displaying at least a second portion of the representation of the field of view without the first indication overlaid;

detecting movement of the one or more cameras that moves the field of view to include a second respective portion of the physical environment;

in response to detecting the movement of the one or more cameras:

updating the representation of the field of view of the one or more cameras to include a representation of the first view of the second respective portion of the physical environment;

capturing additional depth information indicative of a second subset of the second respective portion of the physical environment; and updating a spatial arrangement of the first indication relative to the physical environment, displayed over the updated representation of the field of view, to indicate an extent of the second respective portion of the physical environment for which depth information has been captured, including displaying the first indication overlaid on the second portion of the representation of the field of view, wherein:

the second portion of the representation of the field of view includes a representation of the second subset of the second respective portion of the physical environment; and the first indication with the updated spatial arrangement indicates additional depth information that was captured in response to detecting movement of the one or more cameras.

2. The method of claim 1, including displaying, in the representation of the field of view, one or more representations of one or more portions of the physical environment for which depth information has not been captured.

3. The method of claim 1, including smoothing one or more edges of the first indication.

4. The method of claim 1, wherein the first indication is a continuous region.

5. The method of claim 1, including, before detecting the movement of the one or more cameras, displaying an instruction prompting a user to move the one or more cameras around the physical environment.

6. The method of claim 1, including:

displaying a first user interface element that, when activated, initiates capturing depth information indicative of a physical environment in which the one or more cameras are located;

receiving an input activating the first user interface element; and after receiving the input activating the first user interface element, capturing depth information indicative of the physical environment, wherein the capturing of depth information includes the capturing of the depth information indicative of the first subset and the capturing of the depth information indicative of the second subset in accordance with the movement of the one or more cameras.

7. The method of claim 1, including:

displaying a second user interface element that, when activated, initiates displaying an orthographic view of portions of a physical environment for which depth information has been captured;

receiving an input activating the second user interface element; and after receiving the input activating the second user interface element, displaying an orthographic view of the physical environment.

8. The method of claim 1, wherein displaying the first indication includes visually emphasizing a portion of the first indication that is overlaid on a representation of a physical feature of a set of predefined feature types detected in the representation of the field of view.

9. The method of claim 8, wherein visually emphasizing the portion of the first indication that is overlaid on the representation of the physical feature includes highlighting the portion of the first indication for a predetermined period of time.

10. The method of claim 8, including progressively ceasing to visually emphasize the portion of the first indication over time.

11. The method of claim 1, wherein:

the user interface is a user interface of a respective application; and displaying the first indication, detecting the movement of the one or more cameras, and, in response to detecting the movement of the one or more cameras, updating the representation of the field of view, capturing the depth information indicative of the second subset, and updating the first indication are performed while the respective application is operating in a first mode of a plurality of modes of the respective application.

12. The method of claim 1, including displaying, in a second region of the user interface, a representation of a second view of the physical environment, wherein:

in accordance with capturing the depth information indicative of the first subset of the first respective portion of the physical environment, the representation of the second view indicates the extent of the physical environment for which depth information has been captured, including indicating that depth information indicative of the first subset has been captured; and the method includes, in response to detecting the movement of the one or more cameras:

updating the representation of the second view of the physical environment to indicate the extent of the physical environment for which depth information has been captured, including indicating that depth information indicative of the first subset and the second subset have been captured.

13. The method of claim 12, wherein the movement of the one or more cameras includes rotation of the one or more cameras about a respective axis by a respective amount, and the method includes, in response to detecting the movement of the one or more cameras, rotating the representation of the second view of the physical environment by the respective amount.

14. The method of claim 12, wherein the movement of the one or more cameras includes rotation of the one or more cameras about a respective axis by a respective amount, and the method includes, in response to detecting the movement of the one or more cameras, maintaining an orientation of the second view of the physical environment in the user interface.

15. The method of claim 1, including displaying one or more alerts with information about a position or movement of the one or more cameras, wherein the one or more alerts include:

an alert indicating that a distance from the one or more cameras to an object in the field of view of the one or more cameras is outside of a threshold distance;

an alert indicating that a speed of movement of the one or more cameras is outside of a threshold speed;

an alert indicating that the one or more cameras need to remain within a predetermined portion of the physical environment;

an alert indicating that the field of view of the one or more cameras need to be directed away from one or more reflective surfaces in the physical environment;

an alert indicating that objects in the field of view of the one or more cameras need to be kept substantially stationary;

an alert indicating that the one or more cameras need to be moved to a prior position of the one or more cameras at which at least some depth information for a respective portion of the physical environment that was in the field of view of the one or more cameras at the prior position was not captured; and/or an alert indicating that the one or more cameras need to be moved to an initial position at which the one or more cameras were located when capturing depth information indicative of the physical environment was initiated.

16. The method of claim 1, including:

receiving a user input indicating a boundary between a first space within the physical environment and a second space within the physical environment that is different from and adjacent to the first space; and wherein an orthographic view of the physical environment, displayed after receiving the user input indicating the boundary between the first space and the second space, includes an indication of the boundary between the first space and the second space.

17. A computer system, comprising:

a display device;

one or more cameras;

one or more processors; and memory storing one or more programs, wherein the one or more programs are configured to be executed by the one or more processors, the one or more programs including instructions for:

displaying, in a first region of a user interface, a representation of a field of view of the one or more cameras, wherein the one or more cameras are in a three-dimensional physical environment, and the representation of the field of view includes a representation of a first view of a first respective portion of the physical environment that is in the field of view of the one or more cameras;

capturing depth information indicative of a first subset of the first respective portion of the physical environment;

displaying, over the representation of the field of view, a first indication that indicates an extent of the first respective portion of the physical environment for which depth information has been captured, including displaying the first indication overlaid on at least a first portion of the representation of the field of view that includes a representation of the first subset, and displaying at least a second portion of the representation of the field of view without the first indication overlaid;

detecting movement of the one or more cameras that moves the field of view to include a second respective portion of the physical environment;

in response to detecting the movement of the one or more cameras:

updating the representation of the field of view of the one or more cameras to include a representation of the first view of the second respective portion of the physical environment;

capturing additional depth information indicative of a second subset of the second respective portion of the physical environment; and updating a spatial arrangement of the first indication relative to the physical environment, displayed over the updated representation of the field of view, to indicate an extent of the second respective portion of the physical environment for which depth information has been captured, including displaying the first indication overlaid on the second portion of the representation of the field of view, wherein:

the second portion of the representation of the field of view includes a representation of the second subset of the second respective portion of the physical environment; and the first indication with the updated spatial arrangement indicates additional depth information that was captured in response to detecting movement of the one or more cameras.

18. The computer system of claim 17, wherein the one or more programs include instructions for displaying, in the representation of the field of view, one or more representations of one or more portions of the physical environment for which depth information has not been captured.

19. The computer system of claim 17, wherein the one or more programs include instructions for smoothing one or more edges of the first indication.

20. The computer system of claim 17, wherein the first indication is a continuous region.

21. The computer system of claim 17, wherein the one or more programs include instructions for, before detecting the movement of the one or more cameras, displaying an instruction prompting a user to move the one or more cameras around the physical environment.

22. The computer system of claim 17, wherein the one or more programs include instructions for:

displaying a first user interface element that, when activated, initiates capturing depth information indicative of a physical environment in which the one or more cameras are located;

receiving an input activating the first user interface element; and after receiving the input activating the first user interface element, capturing depth information indicative of the physical environment, wherein the capturing of depth information includes the capturing of the depth information indicative of the first subset and the capturing of the depth information indicative of the second subset in accordance with the movement of the one or more cameras.

23. The computer system of claim 17, wherein the one or more programs include instructions for:

displaying a second user interface element that, when activated, initiates displaying an orthographic view of portions of a physical environment for which depth information has been captured;

receiving an input activating the second user interface element; and after receiving the input activating the second user interface element, displaying an orthographic view of the physical environment.

24. The computer system of claim 17, wherein displaying the first indication includes visually emphasizing a portion of the first indication that is overlaid on a representation of a physical feature of a set of predefined feature types detected in the representation of the field of view.

25. The computer system of claim 24, wherein visually emphasizing the portion of the first indication that is overlaid on the representation of the physical feature includes highlighting the portion of the first indication for a predetermined period of time.

26. The computer system of claim 24, wherein the one or more programs include instructions for progressively ceasing to visually emphasize the portion of the first indication over time.

27. The computer system of claim 17, wherein:

the user interface is a user interface of a respective application; and displaying the first indication, detecting the movement of the one or more cameras, and, in response to detecting the movement of the one or more cameras, updating the representation of the field of view, capturing the depth information indicative of the second subset, and updating the first indication are performed while the respective application is operating in a first mode of a plurality of modes of the respective application.

28. The computer system of claim 17, wherein the one or more programs include instructions for displaying, in a second region of the user interface, a representation of a second view of the physical environment, wherein:

in accordance with capturing the depth information indicative of the first subset of the first respective portion of the physical environment, the representation of the second view indicates the extent of the physical environment for which depth information has been captured, including indicating that depth information indicative of the first subset has been captured; and the one or more programs include instructions for, in response to detecting the movement of the one or more cameras:

updating the representation of the second view of the physical environment to indicate the extent of the physical environment for which depth information has been captured, including indicating that depth information indicative of the first subset and the second subset have been captured.

29. The computer system of claim 28, wherein the movement of the one or more cameras includes rotation of the one or more cameras about a respective axis by a respective amount, and the one or more programs include instructions for, in response to detecting the movement of the one or more cameras, rotating the representation of the second view of the physical environment by the respective amount.

30. The computer system of claim 28, wherein the movement of the one or more cameras includes rotation of the one or more cameras about a respective axis by a respective amount, and the one or more programs include instructions for, in response to detecting the movement of the one or more cameras, maintaining an orientation of the second view of the physical environment in the user interface.

31. The computer system of claim 17, wherein the one or more programs include instructions for displaying one or more alerts with information about a position or movement of the one or more cameras, wherein the one or more alerts include:

an alert indicating that a distance from the one or more cameras to an object in the field of view of the one or more cameras is outside of a threshold distance;

an alert indicating that a speed of movement of the one or more cameras is outside of a threshold speed;

an alert indicating that the one or more cameras need to remain within a predetermined portion of the physical environment;

an alert indicating that the field of view of the one or more cameras need to be directed away from one or more reflective surfaces in the physical environment;

an alert indicating that objects in the field of view of the one or more cameras need to be kept substantially stationary;

an alert indicating that the one or more cameras need to be moved to a prior position of the one or more cameras at which at least some depth information for a respective portion of the physical environment that was in the field of view of the one or more cameras at the prior position was not captured; and/or an alert indicating that the one or more cameras need to be moved to an initial position at which the one or more cameras were located when capturing depth information indicative of the physical environment was initiated.

32. The computer system of claim 17, wherein the one or more programs include instructions for:

receiving a user input indicating a boundary between a first space within the physical environment and a second space within the physical environment that is different from and adjacent to the first space; and wherein an orthographic view of the physical environment, displayed after receiving the user input indicating the boundary between the first space and the second space, includes an indication of the boundary between the first space and the second space.

33. A non-transitory computer readable storage medium storing one or more programs, the one or more programs comprising instructions that, when executed by a computer system that includes a display device and one or more cameras, cause the computer system to:

display, in a first region of a user interface, a representation of a field of view of the one or more cameras, wherein the one or more cameras are in a three-dimensional physical environment, and the representation of the field of view includes a representation of a first view of a first respective portion of the physical environment that is in the field of view of the one or more cameras;

capture depth information indicative of a first subset of the first respective portion of the physical environment;

display, over the representation of the field of view, a first indication that indicates an extent of the first respective portion of the physical environment for which depth information has been captured, including displaying the first indication overlaid on at least a first portion of the representation of the field of view that includes a representation of the first subset, and displaying at least a second portion of the representation of the field of view without the first indication overlaid;

detect movement of the one or more cameras that moves the field of view to include a second respective portion of the physical environment;

in response to detecting the movement of the one or more cameras:

update the representation of the field of view of the one or more cameras to include a representation of the first view of the second respective portion of the physical environment;

capture additional depth information indicative of a second subset of the second respective portion of the physical environment; and update a spatial arrangement of the first indication relative to the physical environment, displayed over the updated representation of the field of view, to indicate an extent of the second respective portion of the physical environment for which depth information has been captured, including display of the first indication overlaid on the second portion of the representation of the field of view, wherein:

the second portion of the representation of the field of view includes a representation of the second subset of the second respective portion of the physical environment; and the first indication with the updated spatial arrangement indicates additional depth information that was captured in response to detecting movement of the one or more cameras.

34. The non-transitory computer readable storage medium of claim 33, wherein the one or more programs include instructions that when executed by the computer system cause the computer system to display, in the representation of the field of view, one or more representations of one or more portions of the physical environment for which depth information has not been captured.

35. The non-transitory computer readable storage medium of claim 33, wherein the one or more programs include instructions that when executed by the computer system cause the computer system to smooth one or more edges of the first indication.

36. The non-transitory computer readable storage medium of claim 33, wherein the first indication is a continuous region.

37. The non-transitory computer readable storage medium of claim 33, wherein the one or more programs include instructions that when executed by the computer system cause the computer system to, before detecting the movement of the one or more cameras, display an instruction prompting a user to move the one or more cameras around the physical environment.

38. The non-transitory computer readable storage medium of claim 33, wherein the one or more programs include instructions that when executed by the computer system cause the computer system to:

display a first user interface element that, when activated, initiates capturing depth information indicative of a physical environment in which the one or more cameras are located;

receive an input activating the first user interface element; and after receiving the input activating the first user interface element, capture depth information indicative of the physical environment, wherein the capturing of depth information includes the capturing of the depth information indicative of the first subset and the capturing of the depth information indicative of the second subset in accordance with the movement of the one or more cameras.

39. The non-transitory computer readable storage medium of claim 33, wherein the one or more programs include instructions that when executed by the computer system cause the computer system to:

display a second user interface element that, when activated, initiates displaying an orthographic view of portions of a physical environment for which depth information has been captured;

receive an input activating the second user interface element; and after receiving the input activating the second user interface element, display an orthographic view of the physical environment.

40. The non-transitory computer readable storage medium of claim 33, wherein displaying the first indication includes visually emphasizing a portion of the first indication that is overlaid on a representation of a physical feature of a set of predefined feature types detected in the representation of the field of view.

41. The non-transitory computer readable storage medium of claim 40, wherein visually emphasizing the portion of the first indication that is overlaid on the representation of the physical feature includes highlighting the portion of the first indication for a predetermined period of time.

42. The non-transitory computer readable storage medium of claim 40, wherein the one or more programs include instructions that when executed by the computer system cause the computer system to progressively cease to visually emphasize the portion of the first indication over time.

43. The non-transitory computer readable storage medium of claim 33, wherein:

the user interface is a user interface of a respective application; and displaying the first indication, detecting the movement of the one or more cameras, and, in response to detecting the movement of the one or more cameras, updating the representation of the field of view, capturing the depth information indicative of the second subset, and updating the first indication are performed while the respective application is operating in a first mode of a plurality of modes of the respective application.

44. The non-transitory computer readable storage medium of claim 33, wherein the one or more programs include instructions that when executed by the computer system cause the computer system to display, in a second region of the user interface, a representation of a second view of the physical environment, wherein:

in accordance with capturing the depth information indicative of the first subset of the first respective portion of the physical environment, the representation of the second view indicates the extent of the physical environment for which depth information has been captured, including indicating that depth information indicative of the first subset has been captured; and the one or more programs include instructions that when executed by the computer system cause the computer system to, in response to detecting the movement of the one or more cameras:

update the representation of the second view of the physical environment to indicate the extent of the physical environment for which depth information has been captured, including indicating that depth information indicative of the first subset and the second subset have been captured.

45. The non-transitory computer readable storage medium of claim 44, wherein the movement of the one or more cameras includes rotation of the one or more cameras about a respective axis by a respective amount, and the one or more programs include instructions that when executed by the computer system cause the computer system to, in response to detecting the movement of the one or more cameras, rotate the representation of the second view of the physical environment by the respective amount.

46. The non-transitory computer readable storage medium of claim 44, wherein the movement of the one or more cameras includes rotation of the one or more cameras about a respective axis by a respective amount, and the one or more programs include instructions that when executed by the computer system cause the computer system to, in response to detecting the movement of the one or more cameras, maintain an orientation of the second view of the physical environment in the user interface.

47. The non-transitory computer readable storage medium of claim 33, wherein the one or more programs include instructions that when executed by the computer system cause the computer system to display one or more alerts with information about a position or movement of the one or more cameras, wherein the one or more alerts include:

an alert indicating that a distance from the one or more cameras to an object in the field of view of the one or more cameras is outside of a threshold distance;

an alert indicating that a speed of movement of the one or more cameras is outside of a threshold speed;

an alert indicating that the one or more cameras need to remain within a predetermined portion of the physical environment;

an alert indicating that the field of view of the one or more cameras need to be directed away from one or more reflective surfaces in the physical environment;

an alert indicating that objects in the field of view of the one or more cameras need to be kept substantially stationary;

an alert indicating that the one or more cameras need to be moved to a prior position of the one or more cameras at which at least some depth information for a respective portion of the physical environment that was in the field of view of the one or more cameras at the prior position was not captured; and/or an alert indicating that the one or more cameras need to be moved to an initial position at which the one or more cameras were located when capturing depth information indicative of the physical environment was initiated.

48. The non-transitory computer readable storage medium of claim 33, wherein the one or more programs include instructions that when executed by the computer system cause the computer system to:

receive a user input indicating a boundary between a first space within the physical environment and a second space within the physical environment that is different from and adjacent to the first space; and wherein an orthographic view of the physical environment, displayed after receiving the user input indicating the boundary between the first space and the second space, includes an indication of the boundary between the first space and the second space.

* * * * *